US012755494B2

(12) United States Patent
Ravasz et al.

(10) Patent No.: US 12,755,494 B2
(45) Date of Patent: Oct. 6, 2026

(54) DEVICES, METHODS, AND GRAPHICAL USER INTERFACES FOR CAPTURING MEDIA WITH A CAMERA APPLICATION

(71) Applicant: Apple Inc., Cupertino, CA (US)

(72) Inventors: Jonathan Ravasz, Sunnyvale, CA (US); Chia Yang Lin, San Francisco, CA (US); Johnnie B. Manzari, San Francisco, CA (US); Ivan Markovic, Mill Valley, CA (US); Vedant Saran, Campbell, CA (US); William A. Sorrentino, III, Mill Valley, CA (US); Angel Suet Yan Cheung, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 18/429,138

(22) Filed: Jan. 31, 2024

(65) Prior Publication Data

US 2024/0320930 A1 Sep. 26, 2024

Related U.S. Application Data

(60) Provisional application No. 63/548,166, filed on Nov. 10, 2023, provisional application No. 63/537,801, (Continued)

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2219/2004* (2013.01); *G06T 2219/2012* (2013.01)

(58) Field of Classification Search
None
See application file for complete search history.

(56) References Cited

U.S. PATENT DOCUMENTS 6,148,113 A 11/2000 Wolverton et al.
8,073,207 B2 12/2011 Ayaki et al.
(Continued)

FOREIGN PATENT DOCUMENTS

AU 2013368443 B2 3/2016
AU 2020203489 A1 6/2020
(Continued)

OTHER PUBLICATIONS

Corrected Notice of Allowance received for U.S. Appl. No. 18/123,878, mailed on May 5, 2025, 2 pages.
(Continued)

*Primary Examiner* — Ryan M Gray
(74) *Attorney, Agent, or Firm* — YHE Law LLP

(57) ABSTRACT

The present disclosure generally relates to methods and interfaces for capturing media with a camera application. In some examples, a computer system captures media based on gaze, modifies video playback to improve viewing comfort, and/or surfaces a view setting for media playback based on media stability characteristics. In some examples, a computer system displays one or more of: a camera preview with a level indicator, a camera preview for spatial media capture with prompts to improve capture quality, a camera preview for spatial media capture with a camera movement indicator, and/or a camera preview for media capture with viewpoint stability guidance.

59 Claims, 114 Drawing Sheets

Related U.S. Application Data filed on Sep. 11, 2023, provisional application No. 63/528,409, filed on Jul. 23, 2023, provisional application No. 63/470,878, filed on Jun. 3, 2023, provisional application No. 63/453,708, filed on Mar. 21, 2023.

(56) References Cited

U.S. PATENT DOCUMENTS

| | | | | |
|---|---|---|---|---|
| 8,102,429 | B2 | 1/2012 | Molgaard | |
| 8,405,680 | B1 | 3/2013 | Gomes et al. | |
| 8,854,452 | B1 | 10/2014 | Raffle | |
| 8,922,588 | B2 | 12/2014 | Makino et al. | |
| 9,001,226 | B1 | 4/2015 | Ng et al. | |
| 9,462,169 | B2 | 10/2016 | Xie et al. | |
| 9,507,420 | B2 | 11/2016 | Tartz et al. | |
| 9,602,796 | B2 | 3/2017 | Chandra et al. | |
| 9,626,589 | B1 * | 4/2017 | Graham | A61B 8/5253 |
| 9,639,945 | B2 | 5/2017 | Oberheu et al. | |
| 9,692,964 | B2 | 6/2017 | Steinberg et al. | |
| 9,704,250 | B1 | 7/2017 | Gilmour et al. | |
| 9,747,504 | B2 | 8/2017 | Ma et al. | |
| 9,774,778 | B2 | 9/2017 | Miyakawa et al. | |
| 9,785,323 | B2 | 10/2017 | Lu et al. | |
| 9,852,768 | B1 | 12/2017 | Oh et al. | |
| 9,913,246 | B1 | 3/2018 | Carey et al. | |
| 9,928,411 | B2 | 3/2018 | Sugita et al. | |
| 9,967,467 | B2 | 5/2018 | Gao et al. | |
| 9,990,727 | B2 | 6/2018 | Yoon et al. | |
| 10,027,903 | B2 | 7/2018 | Yim | |
| 10,038,838 | B2 | 7/2018 | Castillo et al. | |
| 10,104,282 | B2 | 10/2018 | Graham et al. | |
| 10,127,639 | B2 | 11/2018 | Miura et al. | |
| 10,225,471 | B2 | 3/2019 | Poindexter, Jr. | |
| 10,303,973 | B2 | 5/2019 | Nakada et al. | |
| 10,372,765 | B2 | 8/2019 | Knaapen et al. | |
| 10,496,260 | B2 | 12/2019 | Zambetti et al. | |
| 10,528,128 | B1 | 1/2020 | Yoon et al. | |
| 10,528,243 | B2 | 1/2020 | Manzari et al. | |
| 10,574,882 | B2 | 2/2020 | Chen | |
| 10,666,856 | B1 | 5/2020 | Rueckner | |
| 10,938,758 | B2 | 3/2021 | Allen et al. | |
| 11,049,527 | B2 | 6/2021 | Zhang | |
| 11,204,692 | B2 | 12/2021 | Manzari et al. | |
| 11,468,625 | B2 | 10/2022 | Manzari et al. | |
| 11,568,517 | B2 | 1/2023 | Kaida | |
| 11,687,224 | B2 | 6/2023 | Manzari et al. | |
| 11,770,600 | B2 | 9/2023 | O'Leary et al. | |
| 12,267,622 | B2 | 4/2025 | O'Leary et al. | |
| 2004/0207635 | A1 | 10/2004 | Miller et al. | |
| 2005/0024517 | A1 | 2/2005 | Luciano | |
| 2006/0170781 | A1 | 8/2006 | Sobol | |
| 2006/0228040 | A1 | 10/2006 | Simon et al. | |
| 2007/0113099 | A1 | 5/2007 | Takikawa et al. | |
| 2007/0257992 | A1 | 11/2007 | Kato | |
| 2009/0073285 | A1 | 3/2009 | Terashima | |
| 2009/0268076 | A1 | 10/2009 | Kawamura et al. | |
| 2010/0093400 | A1 | 4/2010 | Ju et al. | |
| 2010/0328513 | A1 | 12/2010 | Ryu | |
| 2011/0032377 | A1 | 2/2011 | Kim et al. | |
| 2012/0313973 | A1 | 12/2012 | Li et al. | |
| 2013/0088614 | A1 | 4/2013 | Lee | |
| 2013/0141524 | A1 | 6/2013 | Karunamuni et al. | |
| 2013/0155474 | A1 | 6/2013 | Roach et al. | |
| 2013/0201354 | A1 | 8/2013 | Lascolea et al. | |
| 2013/0222663 | A1 | 8/2013 | Rydenhag et al. | |
| 2013/0336545 | A1 | 12/2013 | Pritikin et al. | |
| 2014/0043517 | A1 | 2/2014 | Mm et al. | |
| 2014/0047389 | A1 | 2/2014 | Aarabi | |
| 2014/0063313 | A1 | 3/2014 | Choi et al. | |
| 2014/0071061 | A1 | 3/2014 | Lin et al. | |
| 2014/0095122 | A1 | 4/2014 | Appleman et al. | |
| 2014/0118560 | A1 | 5/2014 | Bala et al. | |
| 2014/0176565 | A1 | 6/2014 | Adeyoola et al. | |
| 2014/0192217 | A1 | 7/2014 | Kim et al. | |
| 2014/0198242 | A1 | 7/2014 | Weng et al. | |
| 2014/0240471 | A1 | 8/2014 | Srinivasa et al. | |
| 2014/0267126 | A1 | 9/2014 | Åberg et al. | |
| 2014/0267867 | A1 | 9/2014 | Lee et al. | |
| 2014/0300722 | A1 | 10/2014 | Garcia | |
| 2014/0362105 | A1 | 12/2014 | Kocienda et al. | |
| 2015/0002724 | A1 | 1/2015 | Chuang et al. | |
| 2015/0043806 | A1 | 2/2015 | Sunkavalli et al. | |
| 2015/0067513 | A1 | 3/2015 | Zambetti et al. | |
| 2015/0103149 | A1 | 4/2015 | Mcnamer et al. | |
| 2015/0109417 | A1 | 4/2015 | Zirnheld | |
| 2015/0116546 | A1 | 4/2015 | Tanaka | |
| 2015/0172534 | A1 | 6/2015 | Miyakawa et al. | |
| 2015/0189138 | A1 | 7/2015 | Xie et al. | |
| 2015/0208001 | A1 | 7/2015 | Nonaka et al. | |
| 2015/0226969 | A1 * | 8/2015 | Tsukahara | G06T 19/20 359/462 |
| 2015/0229838 | A1 | 8/2015 | Hakim et al. | |
| 2015/0248583 | A1 | 9/2015 | Sekine et al. | |
| 2015/0256757 | A1 | 9/2015 | Marriott et al. | |
| 2015/0277686 | A1 | 10/2015 | Laforge et al. | |
| 2015/0286724 | A1 | 10/2015 | Knaapen et al. | |
| 2015/0302116 | A1 | 10/2015 | Howell | |
| 2015/0362729 | A1 | 12/2015 | Jang et al. | |
| 2015/0373257 | A1 | 12/2015 | Shirakawa | |
| 2016/0026371 | A1 | 1/2016 | Lu et al. | |
| 2016/0037056 | A1 | 2/2016 | Takahashi et al. | |
| 2016/0065861 | A1 | 3/2016 | Steinberg et al. | |
| 2016/0065930 | A1 | 3/2016 | Chandra et al. | |
| 2016/0117829 | A1 | 4/2016 | Yoon et al. | |
| 2016/0127645 | A1 | 5/2016 | Sudo | |
| 2016/0142649 | A1 | 5/2016 | Yim | |
| 2016/0241767 | A1 | 8/2016 | Cho et al. | |
| 2016/0246457 | A1 | 8/2016 | Goldenberg | |
| 2016/0259518 | A1 | 9/2016 | King et al. | |
| 2016/0283097 | A1 | 9/2016 | Voss et al. | |
| 2016/0284123 | A1 | 9/2016 | Hare et al. | |
| 2016/0287067 | A1 | 10/2016 | Fan | |
| 2016/0301861 | A1 | 10/2016 | Miao | |
| 2016/0307045 | A1 | 10/2016 | Ma et al. | |
| 2016/0307324 | A1 | 10/2016 | Higuchi et al. | |
| 2016/0353030 | A1 | 12/2016 | Tang et al. | |
| 2016/0357387 | A1 | 12/2016 | Bovet et al. | |
| 2016/0366323 | A1 | 12/2016 | Chen et al. | |
| 2016/0366344 | A1 | 12/2016 | Pan et al. | |
| 2017/0061635 | A1 | 3/2017 | Petrovich et al. | |
| 2017/0061953 | A1 | 3/2017 | An et al. | |
| 2017/0064200 | A1 | 3/2017 | Castillo et al. | |
| 2017/0091906 | A1 | 3/2017 | Liang et al. | |
| 2017/0094132 | A1 | 3/2017 | Miyata | |
| 2017/0094161 | A1 | 3/2017 | Graham et al. | |
| 2017/0109604 | A1 | 4/2017 | Graham et al. | |
| 2017/0272654 | A1 | 9/2017 | Poindexter, Jr. | |
| 2017/0287221 | A1 * | 10/2017 | Ghaly | G06T 7/70 |
| 2017/0352379 | A1 | 12/2017 | Oh et al. | |
| 2018/0001198 | A1 | 1/2018 | Frappiea | |
| 2018/0035031 | A1 | 2/2018 | Kwak et al. | |
| 2018/0052571 | A1 | 2/2018 | Seol et al. | |
| 2018/0096202 | A1 | 4/2018 | Stathacopoulos et al. | |
| 2018/0349008 | A1 | 12/2018 | Manzari et al. | |
| 2019/0286406 | A1 | 9/2019 | Chen | |
| 2019/0378423 | A1 | 12/2019 | Bachrach et al. | |
| 2020/0082599 | A1 | 3/2020 | Manzari | |
| 2020/0105041 | A1 | 4/2020 | Garofalo et al. | |
| 2020/0134927 | A1 * | 4/2020 | Huang | G02B 30/22 |
| 2020/0142577 | A1 | 5/2020 | Manzari et al. | |
| 2020/0174552 | A1 | 6/2020 | Stafford et al. | |
| 2020/0250874 | A1 | 8/2020 | Assouline et al. | |
| 2021/0003847 | A1 | 1/2021 | Tanaka et al. | |
| 2021/0141227 | A1 | 5/2021 | Iwasa | |
| 2021/0287343 | A1 | 9/2021 | Kaida | |
| 2021/0303855 | A1 * | 9/2021 | Anvaripour | G06Q 30/0643 |
| 2021/0318798 | A1 | 10/2021 | Manzari et al. | |
| 2021/0382559 | A1 | 12/2021 | Segev et al. | |
| 2022/0150345 | A1 | 5/2022 | Woo et al. | |
| 2022/0210337 | A1 | 6/2022 | Anvaripour et al. | |
| 2022/0245900 | A1 | 8/2022 | Tan et al. | |
| 2022/0319100 | A1 | 10/2022 | Manzari et al. | |
| 2022/0394190 | A1 | 12/2022 | Cui et al. | |

(56) References Cited

U.S. PATENT DOCUMENTS

| | | | | |
|---|---|---|---|---|
| 2022/0397759 | A1 | 12/2022 | Vignau | |
| 2023/0229297 | A1 | 7/2023 | Manzari et al. | |
| 2023/0343450 | A1 | 10/2023 | Aragones et al. | |
| 2023/0351706 | A1* | 11/2023 | Babinowich | G06T 7/579 |
| 2024/0104871 | A1 | 3/2024 | Brewer et al. | |
| 2024/0198177 | A1 | 6/2024 | Kruger et al. | |
| 2024/0303779 | A1 | 9/2024 | Feng et al. | |
| 2024/0320930 | A1* | 9/2024 | Ravasz | G06T 19/006 |
| 2024/0340371 | A1 | 10/2024 | Hua et al. | |
| 2024/0373120 | A1 | 11/2024 | Manzari et al. | |
| 2024/0373121 | A1 | 11/2024 | Manzari et al. | |
| 2024/0373122 | A1 | 11/2024 | Manzari et al. | |
| 2024/0373124 | A1 | 11/2024 | Manzari et al. | |
| 2024/0377877 | A1 | 11/2024 | Kasar et al. | |
| 2024/0404075 | A1 | 12/2024 | Lu et al. | |
| 2024/0406368 | A1 | 12/2024 | Lemay et al. | |
| 2025/0147651 | A1 | 5/2025 | Manzari et al. | |
| 2025/0330699 | A1 | 10/2025 | Manzari et al. | |
| 2025/0356608 | A1 | 11/2025 | Brewer et al. | |

FOREIGN PATENT DOCUMENTS

| | | | |
|---|---|---|---|
| CN | 101068311 | A | 11/2007 |
| CN | 101388965 | A | 3/2009 |
| CN | 101821707 | A | 9/2010 |
| CN | 101883213 | A | 11/2010 |
| CN | 201788344 | U | 4/2011 |
| CN | 102202208 | A | 9/2011 |
| CN | 102541537 | A | 7/2012 |
| CN | 102567953 | A | 7/2012 |
| CN | 103037075 | A | 4/2013 |
| CN | 104247392 | A | 12/2014 |
| CN | 104487928 | A | 4/2015 |
| CN | 104754203 | A | 7/2015 |
| CN | 104903834 | A | 9/2015 |
| CN | 105144057 | A | 12/2015 |
| CN | 105245774 | A | 1/2016 |
| CN | 105264480 | A | 1/2016 |
| CN | 105493138 | A | 4/2016 |
| CN | 105794196 | A | 7/2016 |
| CN | 106257540 | A | 12/2016 |
| CN | 111061372 | A | 4/2020 |
| CN | 115914824 | A | 4/2023 |
| EP | 3046070 | A1 | 7/2016 |
| EP | 3107065 | A1 | 12/2016 |
| EP | 3209012 | A1 | 8/2017 |
| EP | 3046070 | B1 | 10/2020 |
| EP | 4089521 | A1 | 11/2022 |
| GB | 2519363 | A | 4/2015 |
| JP | 2003-338975 | A | 11/2003 |
| JP | 2010-160581 | A | 7/2010 |
| JP | 2010-211497 | A | 9/2010 |
| JP | 2011-41092 | A | 2/2011 |
| JP | 2011-249887 | A | 12/2011 |
| JP | 2012-124608 | A | 6/2012 |
| JP | 2015-146619 | A | 8/2015 |
| JP | 2015-180987 | A | 10/2015 |
| JP | 2015-201839 | A | 11/2015 |
| JP | 2016-5224 | A | 1/2016 |
| JP | 2017-69776 | A | 4/2017 |
| KR | 10-2009-0066319 | A | 6/2009 |
| KR | 10-2014-0138346 | A | 12/2014 |
| KR | 10-2016-0016910 | A | 2/2016 |
| KR | 10-2016-0035050 | A | 3/2016 |
| KR | 10-2019-0142397 | A | 12/2019 |
| SU | 1610470 | A1 | 11/1990 |
| WO | 2008/030779 | A2 | 3/2008 |
| WO | 2008/109644 | A2 | 9/2008 |
| WO | 2009/032638 | A2 | 3/2009 |
| WO | 2011/078913 | A1 | 6/2011 |
| WO | 2013/133895 | A1 | 9/2013 |
| WO | 2013/169870 | A1 | 11/2013 |
| WO | 2014/105276 | A1 | 7/2014 |
| WO | 2014/105277 | A2 | 7/2014 |
| WO | 2014/200734 | A1 | 12/2014 |
| WO | 2015/017312 | A1 | 2/2015 |
| WO | 2015/037211 | A1 | 3/2015 |
| WO | 2015/059349 | A1 | 4/2015 |
| WO | 2015/166684 | A1 | 11/2015 |
| WO | 2016/203282 | A1 | 12/2016 |
| WO | 2017/071559 | A1 | 5/2017 |
| WO | 2018/226264 | A1 | 12/2018 |
| WO | 2019/172678 | A1 | 9/2019 |
| WO | 2022/047377 | A1 | 3/2022 |
| WO | 2023/049418 | A2 | 3/2023 |
| WO | 2023/116418 | A1 | 6/2023 |

OTHER PUBLICATIONS

Applicant-Initiated Interview Summary received for U.S. Appl. No. 18/373,171, mailed on Sep. 29, 2025, 5 pages.

Applicant-Initiated Interview Summary received for U.S. Appl. No. 18/611,281, mailed on Oct. 9, 2025, 2 pages.

Final Office Action received for U.S. Appl. No. 19/017,062, mailed on Sep. 26, 2025, 23 pages.

International Preliminary Report on Patentability received for PCT Patent Application No. PCT/US2024/020880, mailed on Oct. 2, 2025, 15 pages.

Non-Final Office Action received for U.S. Appl. No. 18/373,168, mailed on Oct. 1, 2025, 15 pages.

Non-Final Office Action received for U.S. Appl. No. 18/373,171, mailed on Jul. 24, 2025, 27 pages.

Notice of Allowance received for U.S. Appl. No. 18/370,363, mailed on Jul. 29, 2025, 9 pages.

Wesson, Kate, "How to Edit Photos On iPhone Using the Built-In Photos App", Available online at: https://web.archive.org/web/20181116025151/https://iphonephotographyschool.com/how-to-edit-photos-on-iphone/, Aug. 22, 2018, 21 pages.

Wesson, Kate, "How to Use iPhone Portrait Mode to Shoot Stunning Portrait Photos", Available online at: https://web.archive.org/web/20200920073342/https://iphonephotographyschool.com/portrait-mode/, Oct. 22, 2019, 19 pages.

NAVJOT81, "My depth control is not showing up on my i phone x", Available online at: https://discussions.apple.com/thread/253719706?sortBy=rank, Mar. 5, 2022, 5 pages.

Applicant-Initiated Interview Summary received for U.S. Appl. No. 19/017,062, mailed on May 28, 2025, 4 pages.

Decision to Grant received for Japanese Patent Application No. 2024-073909, mailed on May 29, 2025, 3 pages (1 page of English Translation and 2 pages of Official Copy).

Non-Final Office Action received for U.S. Appl. No. 19/017,062, mailed on Jun. 12, 2025, 21 pages.

Notice of Allowance received for U.S. Appl. No. 18/370,363, mailed on May 29, 2025, 14 pages.

Corrected Notice of Allowance received for U.S. Appl. No. 18/373,158, mailed on Apr. 29, 2025, 2 pages.

Non-Final Office Action received for U.S. Appl. No. 19/017,062, mailed on Apr. 23, 2025, 20 pages.

Notice of Allowance received for U.S. Appl. No. 18/123,878, mailed on Apr. 16, 2025, 11 pages.

Notice of Allowance received for U.S. Appl. No. 18/373,158, mailed on Apr. 15, 2025, 14 pages.

Extended European Search Report received for European Patent Application No. 25190718.4, mailed on Oct. 10, 2025, 8 pages.

Notice of Allowance received for U.S. Appl. No. 18/373,171, mailed on Oct. 24, 2025, 10 pages.

International Preliminary Report on Patentability received for PCT Patent Application No. PCT/US2023/033501, mailed on Apr. 3, 2025, 16 pages.

International Search Report and Written Opinion received for PCT Patent Application No. PCT/US2024/048985, mailed on Feb. 13, 2025, 19 pages.

Invitation to Pay Additional Fees and Partial International Search Report received for PCT Patent Application No. PCT/US2024/048985, mailed on Dec. 23, 2024, 13 pages.

Office Action received for Australian Patent Application No. 2024200819, mailed on Mar. 24, 2025, 4 pages.

(56) References Cited

OTHER PUBLICATIONS

Applicant-Initiated Interview Summary received for U.S. Appl. No. 19/017,062, mailed on Sep. 10, 2025, 2 pages.
Corrected Notice of Allowance received for U.S. Appl. No. 18/370,363, mailed on Aug. 26, 2025, 2 pages.
Non-Final Office Action received for U.S. Appl. No. 18/373,163, mailed on Aug. 26, 2025, 14 pages.
Applicant-Initiated Interview Summary received for U.S. Appl. No. 16/733,718, mailed on Nov. 2, 2020, 4 pages.
Applicant-Initiated Interview Summary received for U.S. Appl. No. 17/356,322, mailed on Dec. 27, 2022, 4 pages.
Channel Highway, "Virtual Makeover in Real-time and in full 3D", Available online at: https://www.youtube.com/watch?v=NgUbBzb5qZg, Feb. 16, 2016, 1 page.
Corrected Notice of Allowance received for U.S. Appl. No. 16/733,718, mailed on Aug. 18, 2021, 2 pages.
Corrected Notice of Allowance received for U.S. Appl. No. 16/733,718, mailed on Nov. 17, 2021, 2 pages.
Corrected Notice of Allowance received for U.S. Appl. No. 17/356,322, mailed on Feb. 15, 2023, 2 pages.
Corrected Notice of Allowance received for U.S. Appl. No. 17/356,322, mailed on Mar. 8, 2023, 2 pages.
Decision to Grant received for Danish Patent Application No. PA201770719, mailed on Feb. 3, 2022, 2 pages.
Decision to Grant received for European Patent Application No. 18704732.9, mailed on Aug. 18, 2023, 3 pages.
Decision to Grant received for European Patent Application No. 22151131.4, mailed on Nov. 16, 2023, 3 pages.
Decision to Grant received for Japanese Patent Application No. 2019-566087, mailed on Jan. 26, 2022, 2 pages (1 page of English Translation and 1 page of Official Copy).
Digital Trends, "ModiFace Partners With Samsung To Bring AR Makeup To The Galaxy S9", Available online at: https://www.digitaltrends.com/mobile/modiface-samsung-partnership-ar-makeup-galaxy-s9/, 2018, 16 pages.
Examiner-Initiated Interview Summary received for U.S. Appl. No. 17/356,322, mailed on Sep. 29, 2022, 4 pages.
Extended European Search Report received for European Patent Application No. 22151131.4, mailed on Mar. 24, 2022, 6 pages.
Final Office Action received for U.S. Appl. No. 15/728,147, mailed on Aug. 29, 2018, 39 pages.
Final Office Action received for U.S. Appl. No. 15/728,147, mailed on May 28, 2019, 45 pages.
Final Office Action received for U.S. Appl. No. 17/356,322, mailed on Nov. 29, 2022, 19 pages.
Gadgets Portal, "Galaxy J5 Prime Camera Review! (vs J7 Prime) 4K", Available Online at: https://www.youtube.com/watch?v=Rf2Gy8QmDqc, Oct. 24, 2016, 3 pages.
Helpvideostv, "How to Use Snap Filters on Snapchat", Retrieved from <https://www.youtube.com/watch?v=oR-7cIWPszU&feature=youtu.be>, Mar. 22, 2017, pp. 1-2.
Intention to Grant received for European Patent Application No. 18704732.9, mailed on Dec. 6, 2022, 10 pages.
Intention to Grant received for European Patent Application No. 22151131.4, mailed on Aug. 4, 2023, 10 pages.
International Preliminary Report on Patentability received for PCT Patent Application No. PCT/US2018/015591, mailed on Dec. 19, 2019, 10 pages.
International Search Report and Written Opinion received for PCT Patent Application No. PCT/US2018/015591, mailed on Jun. 14, 2018, 14 pages.
Invitation to Pay Search Fees received for European Patent Application No. 18704732.9, mailed on Jun. 2, 2021, 3 pages.
Messelodi et al., "A Kalman filter based background updating algorithm robust to sharp illumination changes.", International Conference on Image Analysis and Processing. Springer, Berlin, Heidelberg, 2005, pp. 163-170.
Mobiscrub, "Galaxy S4 mini camera review", Available Online at: https://www.youtube.com/watch?v=KYKOydw8QT8, Aug. 10, 2013, 3 pages.
Mobiscrub, "Samsung Galaxy S5 Camera Review—HD Video", Available Online on: https://www.youtube.com/watch?v=BFgwDtNKMjg, Mar. 27, 2014, 3 pages.
Modifacechannel, "Sephora 3D Augmented Reality Mirror", Available Online at: https://www.youtube.com/watch?v=wwBO4PU9EXI, May 15, 2014, 1 page.
Non-Final Office Action received for U.S. Appl. No. 15/728,147, mailed on Feb. 22, 2018, 20 pages.
Non-Final Office Action received for U.S. Appl. No. 15/728,147, mailed on Jan. 31, 2019, 41 pages.
Non-Final Office Action received for U.S. Appl. No. 16/733,718, mailed on Sep. 16, 2020, 25 pages.
Non-Final Office Action received for U.S. Appl. No. 17/356,322, mailed on Aug. 11, 2022, 17 pages.
Non-Final Office Action received for U.S. Appl. No. 18/123,878, mailed on Jan. 31, 2024, 19 pages.
Notice of Acceptance received for Australian Patent Application No. 2018279787, mailed on Dec. 10, 2019, 3 pages.
Notice of Acceptance received for Australian Patent Application No. 2020201969, mailed on Mar. 26, 2021, 3 pages.
Notice of Acceptance received for Australian Patent Application No. 2021203177, mailed on Jul. 14, 2022, 3 pages.
Notice of Acceptance received for Australian Patent Application No. 2022218463, mailed on Apr. 18, 2023, 3 pages.
Notice of Acceptance received for Australian Patent Application No. 2023204616, mailed on Oct. 31, 2023, 3 pages.
Notice of Allowance received for Chinese Patent Application No. 202010218168.5, mailed on Aug. 25, 2021, 6 pages (3 pages of English Translation and 3 pages of Official Copy).
Notice of Allowance received for Chinese Patent Application No. 202111323807.5, mailed on Jan. 10, 2023, 4 pages (1 page of English Translation and 3 pages of Official Copy).
Notice of Allowance received for Chinese Patent Application No. 202210063070.6, mailed on May 2, 2023, 2 pages (1 page of English Translation and 1 page of Official Copy).
Notice of Allowance received for Japanese Patent Application No. 2022-027861, mailed on Feb. 13, 2023, 3 pages (1 page of English Translation and 2 pages of Offcial Copy).
Notice of Allowance received for Korean Patent Application No. 10-2019-7035478, mailed on Apr. 24, 2020, 4 pages (1 page of English Translation and 3 pages of Official Copy).
Notice of Allowance received for Korean Patent Application No. 10-2020-7021870, mailed on Apr. 26, 2021, 4 pages (1 page of English Translation and 3 pages of Official Copy).
Notice of Allowance received for Korean Patent Application No. 10-2021-7020693, mailed on Dec. 27, 2021, 5 pages (1 page of English Translation and 4 pages of Official Copy).
Notice of Allowance received for Korean Patent Application No. 10-2022-7006310, mailed on Sep. 20, 2022, 8 pages (2 pages of English Translation and 6 pages of Official Copy).
Notice of Allowance received for Korean Patent Application No. 10-2022-7043663, mailed on Jul. 25, 2023, 8 pages (2 pages of English Translation and 6 pages of Official Copy).
Notice of Allowance received for U.S. Appl. No. 15/728,147, mailed on Aug. 19, 2019, 13 pages.
Notice of Allowance received for U.S. Appl. No. 16/733,718, mailed on Feb. 5, 2021, 14 pages.
Notice of Allowance received for U.S. Appl. No. 16/733,718, mailed on Jul. 29, 2021, 26 pages.
Notice of Allowance received for U.S. Appl. No. 16/733,718, mailed on Oct. 20, 2021, 24 pages.
Notice of Allowance received for U.S. Appl. No. 17/356,322, mailed on Feb. 2, 2023, 11 pages.
Notice of Allowance received for U.S. Appl. No. 17/356,322, mailed on May 8, 2023, 10 pages.
Office Action received for Australian Patent Application No. 2020201969, mailed on Sep. 25, 2020, 5 pages.
Office Action received for Australian Patent Application No. 2021203177, mailed on May 4, 2022, 7 pages.
Office Action received for Australian Patent Application No. 2022218463, mailed on Mar. 17, 2023, 2 pages.

(56) References Cited

OTHER PUBLICATIONS

Office Action received for Chinese Patent Application No. 201880036400.4, mailed on Jan. 20, 2024, 14 pages (6 pages of English Translation and 8 pages of Official Copy).
Office Action received for Chinese Patent Application No. 202010218168.5, mailed on Feb. 9, 2021, 21 pages (9 pages of English Translation and 12 pages of Official Copy).
Office Action received for Chinese Patent Application No. 202111323807.5, mailed on Jul. 15, 2022, 12 pages (6 pages of English Translation and 6 pages of Official Copy).
Office Action received for Chinese Patent Application No. 202210063070.6, mailed on Jan. 5, 2023, 12 pages (6 pages of English Translation and 6 pages of Official Copy).
Office Action received for Danish Patent Application No. PA201770563, mailed on Aug. 13, 2018, 5 pages.
Office Action received for Danish Patent Application No. PA201770563, mailed on Jan. 28, 2020, 3 pages.
Office Action received for Danish Patent Application No. PA201770563, mailed on Jun. 28, 2019, 5 pages.
Office Action received for Danish Patent Application No. PA201770719, mailed on Aug. 14, 2018, 6 pages.
Office Action received for Danish Patent Application No. PA201770719, mailed on Feb. 19, 2019, 4 pages.
Office Action received for Danish Patent Application No. PA201770719, mailed on Jan. 17, 2020, 4 pages.
Office Action received for Danish Patent Application No. PA201770719, mailed on Jun. 30, 2021, 3 pages.
Office Action received for Danish Patent Application No. PA201770719, mailed on Nov. 16, 2020, 5 pages.
Office Action received for Danish Patent Application No. PA201770719, mailed on Nov. 16, 2021, 2 pages.
Office Action received for European Patent Application No. 18704732.9, mailed on Sep. 7, 2021, 10 pages.
Office Action received for Indian Patent Application No. 201917053025, mailed on Mar. 19, 2021, 7 pages.
Office Action received for Indian Patent Application No. 202018006172, mailed on May 5, 2021, 6 pages.
Office Action received for Indian Patent Application No. 202118046032, mailed on Apr. 25, 2022, 6 pages.
Office Action received for Indian Patent Application No. 202118046033, mailed on Apr. 25, 2022, 7 pages.
Office Action received for Indian Patent Application No. 202118046044, mailed on Apr. 25, 2022, 6 pages.
Office Action received for Japanese Patent Application No. 2019-566087, mailed on Oct. 18, 2021, 10 pages (6 pages of English Translation and 4 pages of Official Copy).
Office Action received for Japanese Patent Application No. 2022-027861, mailed on Nov. 21, 2022, 4 pages (2 pages of English Translation and 2 pages of Official Copy).
Office Action received for Japanese Patent Application No. 2023-041079, mailed on Nov. 21, 2023, 6 pages (3 pages of English Translation and 3 pages of Official Copy).
Office Action received for Korean Patent Application No. 10-2019-7035478, mailed on Jan. 17, 2020, 17 pages (9 pages of English Translation and 8 pages of Official Copy).
Office Action received for Korean Patent Application No. 10-2020-7021870, mailed on Nov. 11, 2020, 11 pages (5 pages of English Translation and 6 pages of Official Copy).
Office Action received for Korean Patent Application No. 10-2021-7020693, mailed on Jul. 14, 2021, 7 pages (3 pages of English Translation and 4 pages of Official Copy).
Office Action received for Korean Patent Application No. 10-2022-7006310, mailed on Mar. 8, 2022, 6 pages (2 pages of English Translation and 4 pages of Official Copy).
Office Action received for Korean Patent Application No. 10-2022-7043663, mailed on Jan. 6, 2023, 12 pages (5 pages of English Translation and 7 pages of Official Copy).
Office Action received for Korean Patent Application No. 10-2023-7037005, mailed on Nov. 13, 2023, 13 pages (6 pages of English Translation and 7 pages of Official Copy).
Paine, Steve, "Samsung Galaxy Camera Detailed Overview—User Interface", Retrieved from: <https://www.youtube.com/watch?v=td8UYSySulo&feature=youtu.be>, Sep. 18, 2012, pp. 1-2.
Phonearena, "Sony Xperia Z5 camera app and UI overview", Retrieved from <https://www.youtube.com/watch?v=UtDzdTsmkfU&feature=youtu.be>, Sep. 8, 2015, pp. 1-3.
Search Report and Opinion received for Danish Patent Application No. PA201770563, mailed on Oct. 10, 2017, 9 pages.
Search Report received for Danish Patent Application No. PA201770719, mailed on Oct. 17, 2017, 9 pages.
Snapchat Lenses, "How To Get All Snapchat Lenses Face Effect Filter on Android", Retrieved from: <https://www.youtube.com/watch?v=0PfnF1RInfw&feature=youtu.be>, Sep. 21, 2015, pp. 1-2.
Supplemental Notice of Allowance received for U.S. Appl. No. 16/733,718, mailed on Mar. 9, 2021, 21 pages.
Supplemental Notice of Allowance received for U.S. Appl. No. 16/733,718, mailed on Mar. 29, 2021, 2 pages.
Techtag, "Samsung J5 Prime Camera Review | True Review", Available online at: https://www.youtube.com/watch?v=a_p906ai6PQ, Oct. 26, 2016, 3 pages.
Techtag, "Samsung J7 Prime Camera Review (Technical Camera)", Available Online at: https://www.youtube.com/watch?v=AJPcLP8GpFQ, Oct. 4, 2016, 3 pages.
Vickgeek, "Canon 80D Live View Tutorial | Enhance your image quality", Available online at: https://www.youtube.com/watch?v=JGNCiy6Wt9c, Sep. 27, 2016, 3 pages.
X-Tech, "Test Make up via Slick Augmented Reality Mirror Without Putting It on", Available Online at: http://x-tech.am/test-make-up-via-slick-augmented-reality-mirror-without-putting-it-on/, Nov. 29, 2014, 5 pages.
Decision to Grant received for European Patent Application No. 23204776.1, mailed on Jul. 3, 2025, 4 pages.
Non-Final Office Action received for U.S. Appl. No. 18/611,281, mailed on Jul. 14, 2025, 30 pages.
Notice of Acceptance received for Australian Patent Application No. 2024200819, mailed on Jun. 30, 2025, 3 pages.
Notice of Allowance received for U.S. Appl. No. 18/373,158, mailed on Jul. 1, 2025, 15 pages.
Applicant-Initiated Interview Summary received for U.S. Appl. No. 18/373,168, mailed on Dec. 18, 2025, 4 pages.
International Preliminary Report on Patentability received for PCT Patent Application No. PCT/US2024/024016, mailed on Dec. 11, 2025, 7 pages.
International Preliminary Report on Patentability received for PCT Patent Application No. PCT/US2024/031468, mailed on Dec. 11, 2025, 11 pages.
Clarke et al., "Reactive Video: Adaptive Video Playback Based on User Motion for Supporting Physical Activity", Available online at: https://dl.acm.org/doi/pdf/10.1145/3379337.3415591, Oct. 20-23, 2020, pp. 196-208.
Final Office Action received for U.S. Appl. No. 18/611,281, mailed on Nov. 10, 2025, 35 pages.
International Preliminary Report on Patentability received for PCT Patent Application No. PCT/US2024/026652, mailed on Nov. 20, 2025, 11 pages.
Non-Final Office Action received for U.S. Appl. No. 18/615,954, mailed on Nov. 19, 2025, 37 pages.
Intention to Grant received for European Patent Application No. 23204776.1, mailed on Feb. 25, 2025, 8 pages.
Advisory Action received for U.S. Appl. No. 18/123,878, mailed on Jun. 24, 2024, 4 pages.
Applicant-Initiated Interview Summary received for U.S. Appl. No. 18/123,878, mailed on Apr. 15, 2024, 4 pages.
Applicant-Initiated Interview Summary received for U.S. Appl. No. 18/123,878, mailed on Jun. 3, 2024, 3 pages.
Corrected Notice of Allowance received for U.S. Appl. No. 18/123,878, mailed on Nov. 5, 2024, 3 pages.
Corrected Notice of Allowance received for U.S. Appl. No. 18/123,878, mailed on Oct. 18, 2024, 2 pages.
Decision to Grant received for Japanese Patent Application No. 2023-041079, mailed on Mar. 28, 2024, 3 pages (1 page of English Translation and 2 pages of Official Copy).

(56) References Cited

OTHER PUBLICATIONS

Extended European Search Report received for European Patent Application No. 23204776.1, mailed on May 6, 2024, 8 pages.
Final Office Action received for U.S. Appl. No. 18/123,878, mailed on Apr. 26, 2024, 23 pages.
Intention to Grant received for European Patent Application No. 23204776.1, mailed on Oct. 4, 2024, 8 pages.
International Search Report and Written Opinion received for PCT Patent Application No. PCT/US2023/033501, mailed on Feb. 26, 2024, 21 pages.
International Search Report and Written Opinion received for PCT Patent Application No. PCT/US2024/020880, mailed on Aug. 26, 2024, 22 pages.
International Search Report and Written Opinion received for PCT Patent Application No. PCT/US2024/024016, mailed on Jul. 30, 2024, 10 pages.
International Search Report and Written Opinion received for PCT Patent Application No. PCT/US2024/026652, mailed on Sep. 3, 2024, 15 pages.
International Search Report and Written Opinion received for PCT Patent Application No. PCT/US2024/031468, mailed on Nov. 20, 2024, 17 pages.
Invitation to Pay Additional Fees and Partial International Search Report received for PCT Patent Application No. PCT/US2023/033501, mailed on Jan. 5, 2024, 15 pages.
Invitation to Pay Additional Fees and Partial International Search Report received for PCT Patent Application No. PCT/US2024/031468, mailed on Sep. 30, 2024, 9 pages.
Notice of Allowance received for Chinese Patent Application No. 201880036400.4, mailed on Nov. 8, 2024, 2 pages (1 page of English Translation and 1 page of Official Copy).
Notice of Allowance received for Korean Patent Application No. 10-2023-7037005, mailed on Jul. 2, 2024, 10 pages (2 pages of English Translation and 8 pages of Official Copy).
Notice of Allowance received for Korean Patent Application No. 10-2024-7032875, mailed on Oct. 10, 2024, 8 pages (2 pages of English Translation and 6 pages of Official Copy).
Notice of Allowance received for U.S. Appl. No. 18/123,878, mailed on Sep. 5, 2024, 11 pages.
Notice of Hearing received for Indian Patent Application No. 202118046032, mailed on Oct. 8, 2024, 2 pages.
Notice of Hearing received for Indian Patent Application No. 202118046033, mailed on Oct. 8, 2024, 3 pages.
Notice of Hearing received for Indian Patent Application No. 202118046044, mailed on Oct. 8, 2024, 2 pages.
Office Action received for Chinese Patent Application No. 201880036400.4, mailed on Aug. 24, 2024, 16 pages (9 pages of English Translation and 7 pages of Official Copy).
Office Action received for Japanese Patent Application No. 2024-073909, mailed on Aug. 1, 2024, 4 pages (2 pages of English Translation and 2 pages of Official Copy).
Office Action received for Japanese Patent Application No. 2024-073909, mailed on Dec. 19, 2024, 5 pages (2 pages of English Translation and 3 pages of Official copy).

* cited by examiner

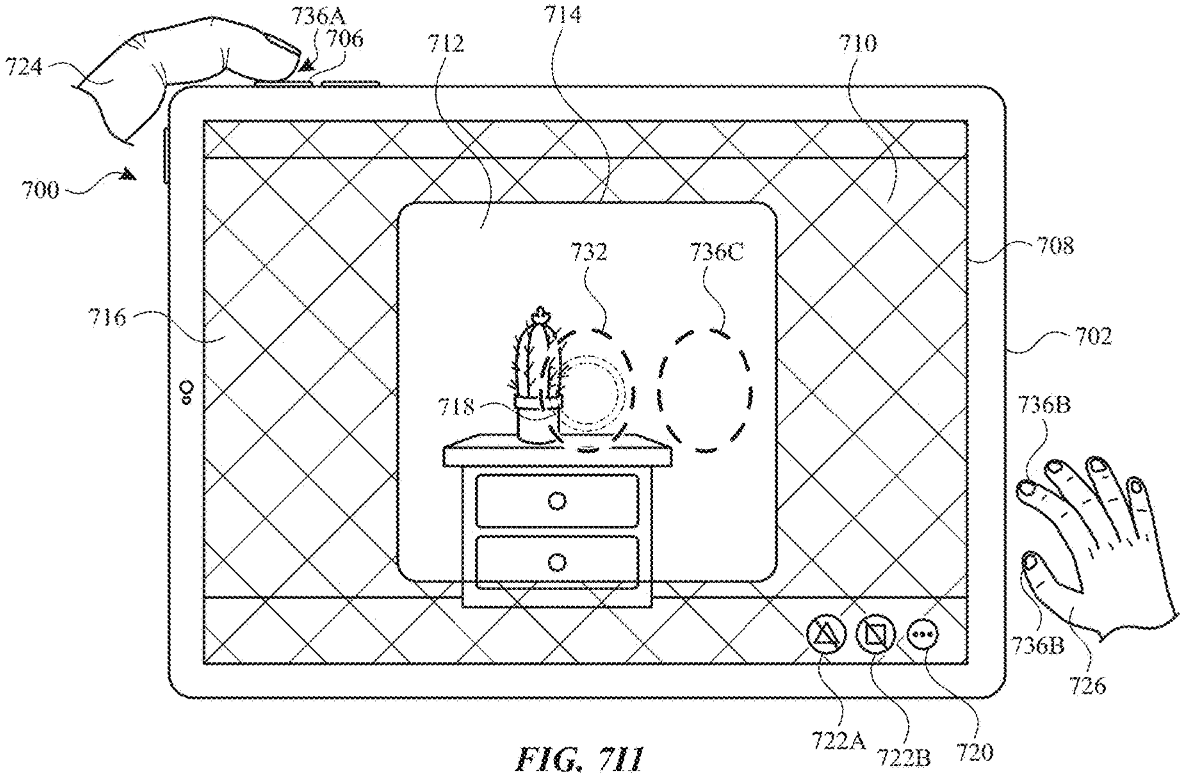
*FIG. 7I1*

*FIG. 7I2*

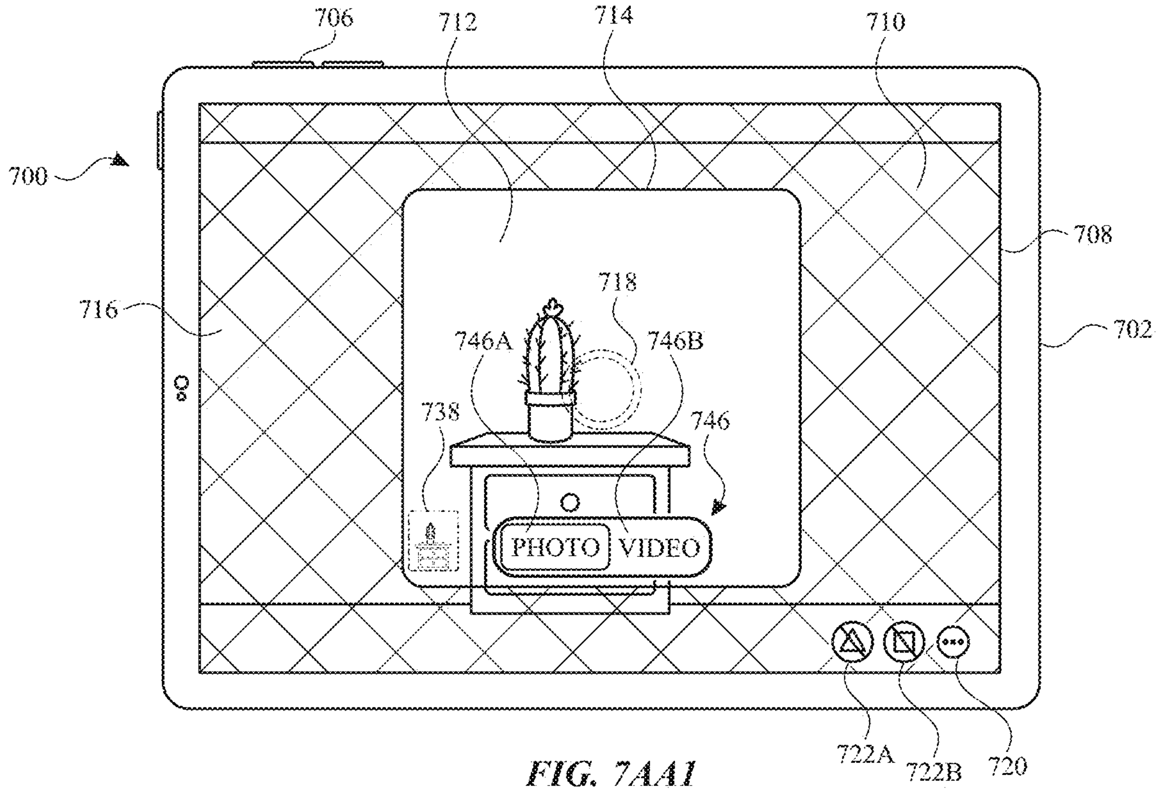
FIG. 7AA1
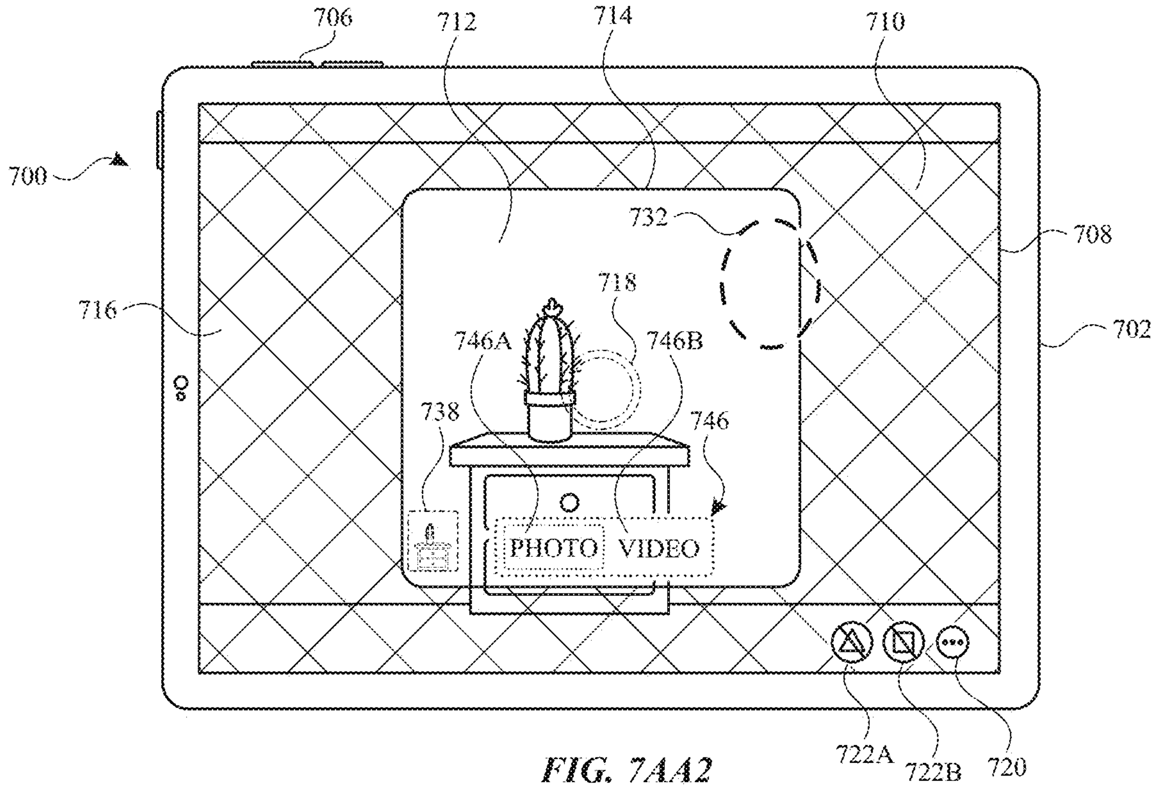
FIG. 7AA2

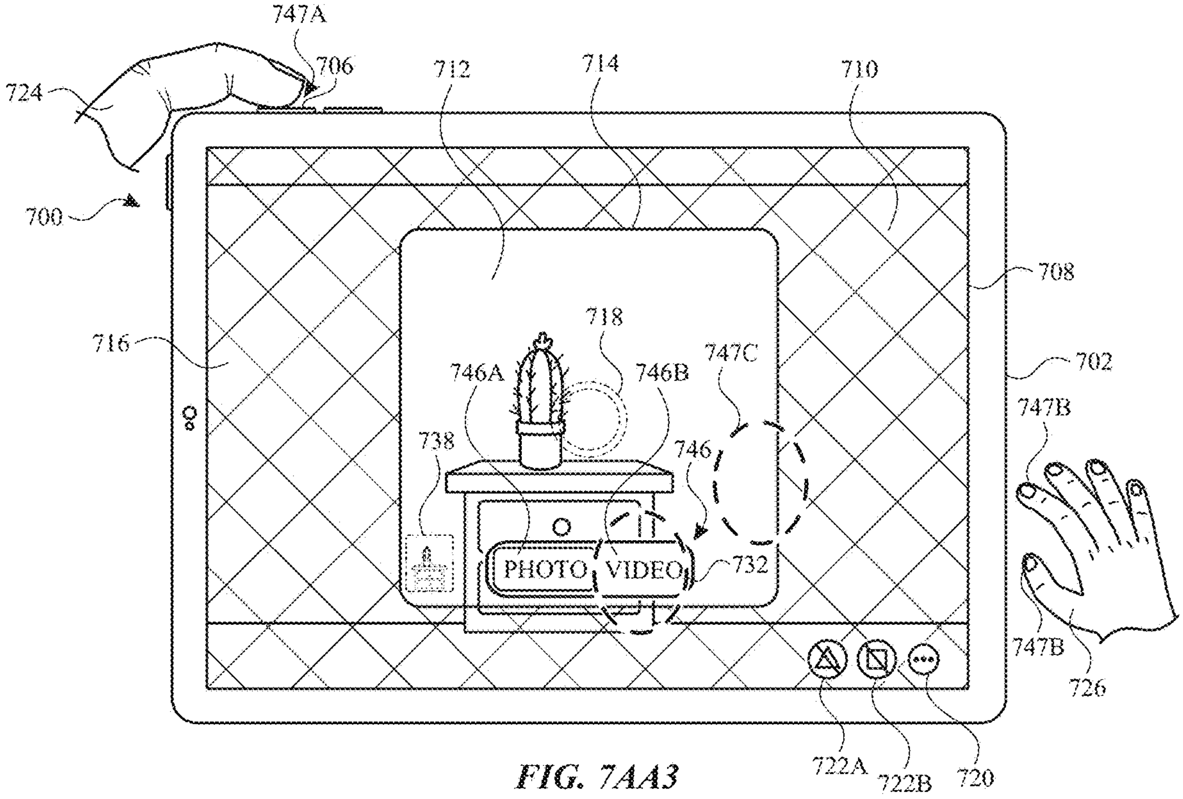
*FIG. 7AA3*
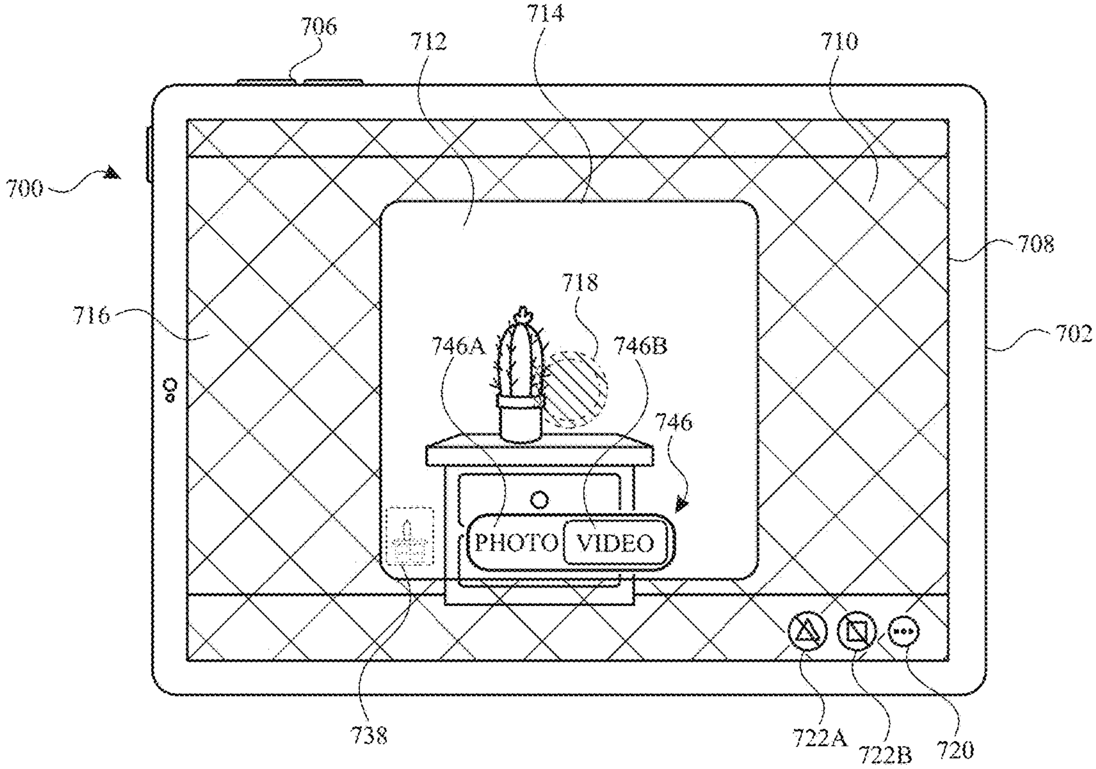
*FIG. 7AA4*

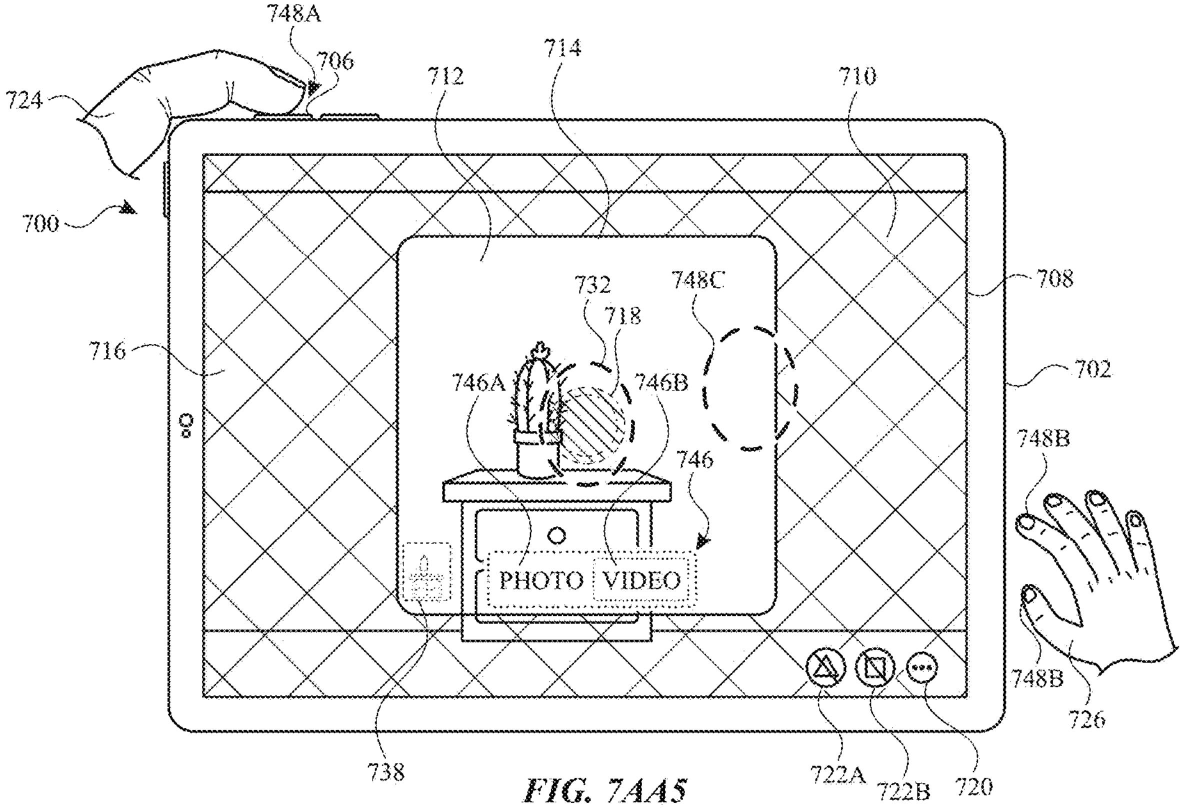
FIG. 7AA5
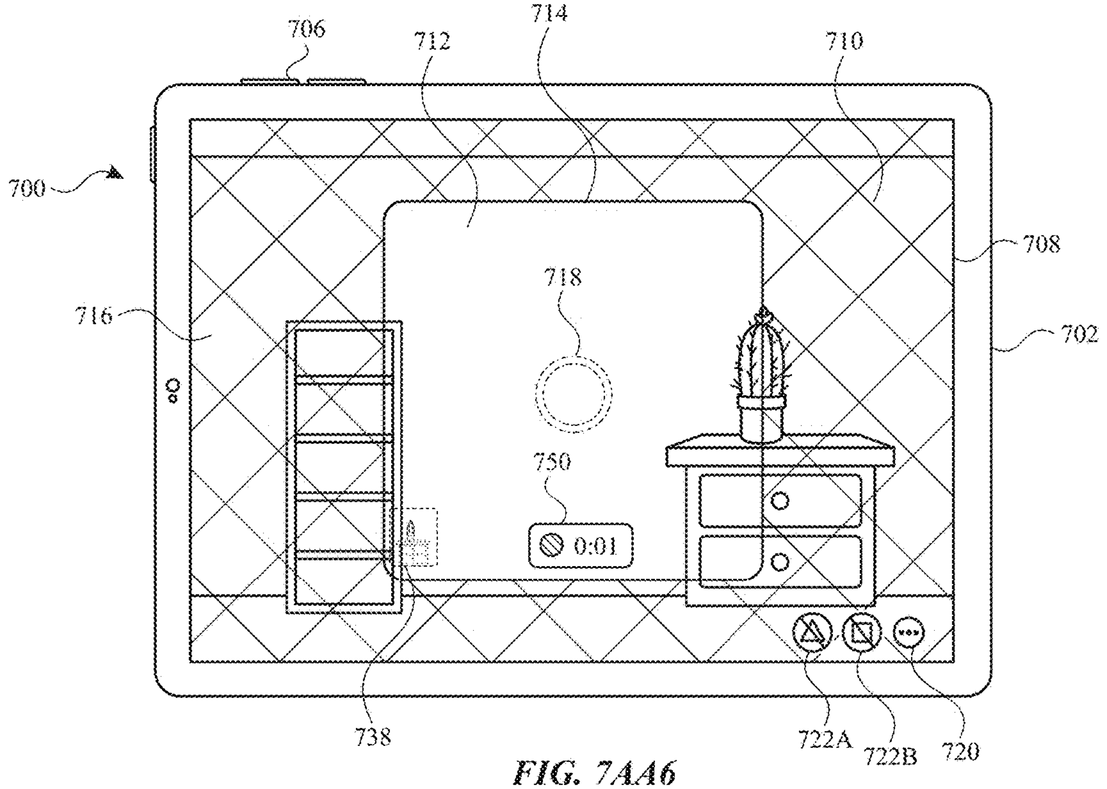
FIG. 7AA6

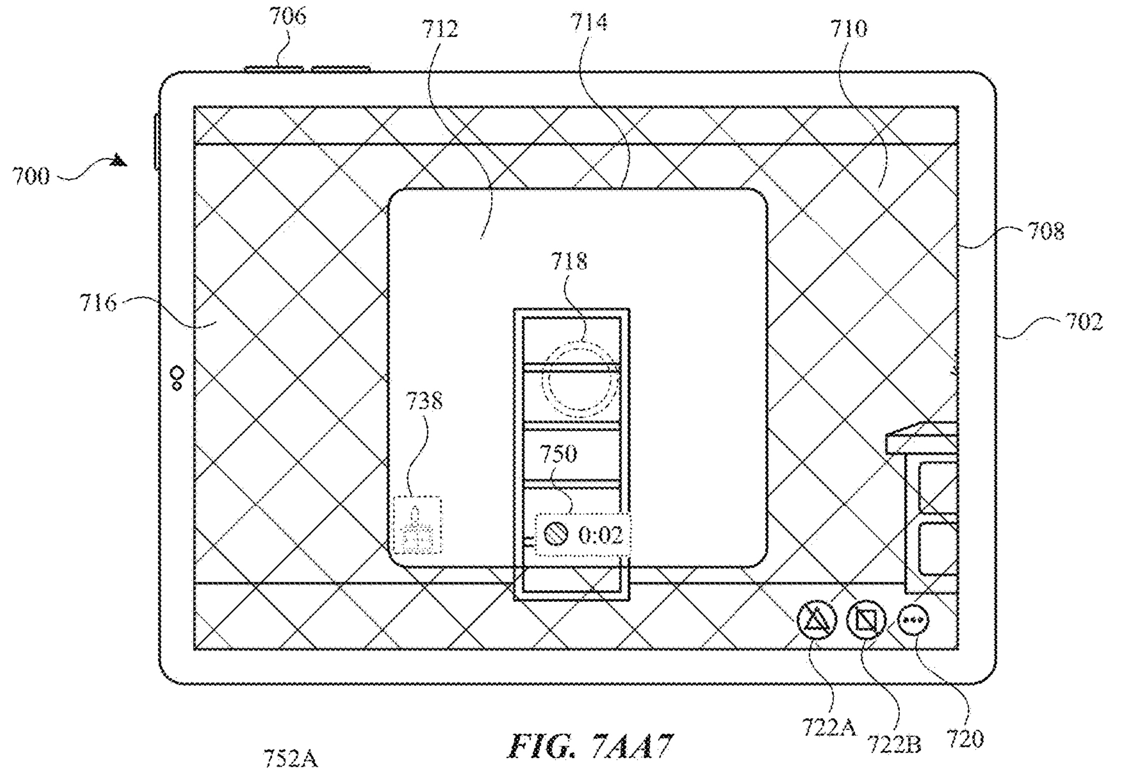
*FIG. 7AA7*
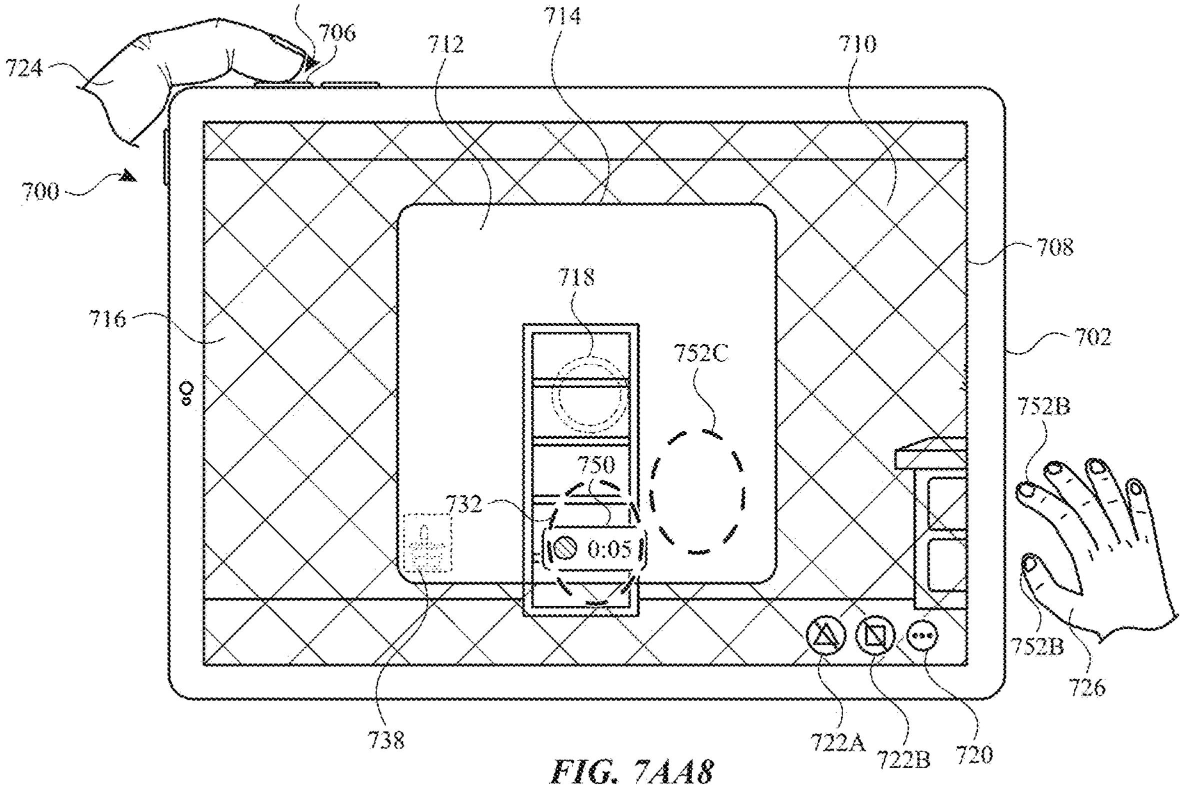
*FIG. 7AA8*

FIG. 7AA9

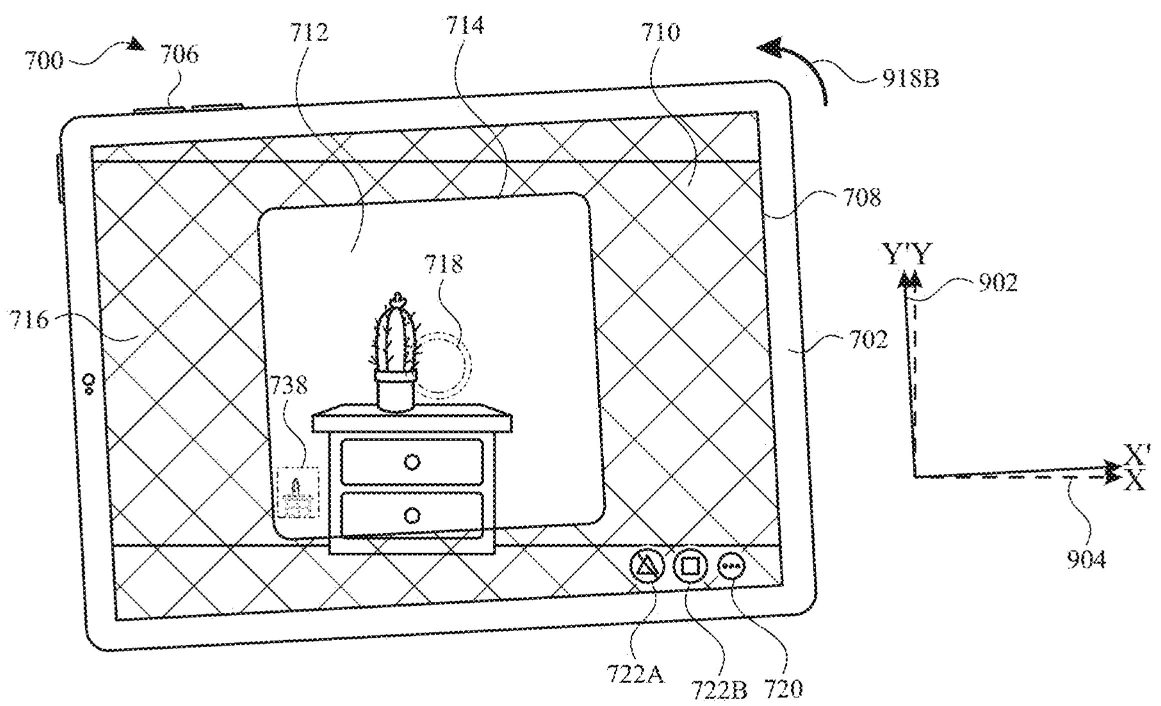
*FIG. 9C*
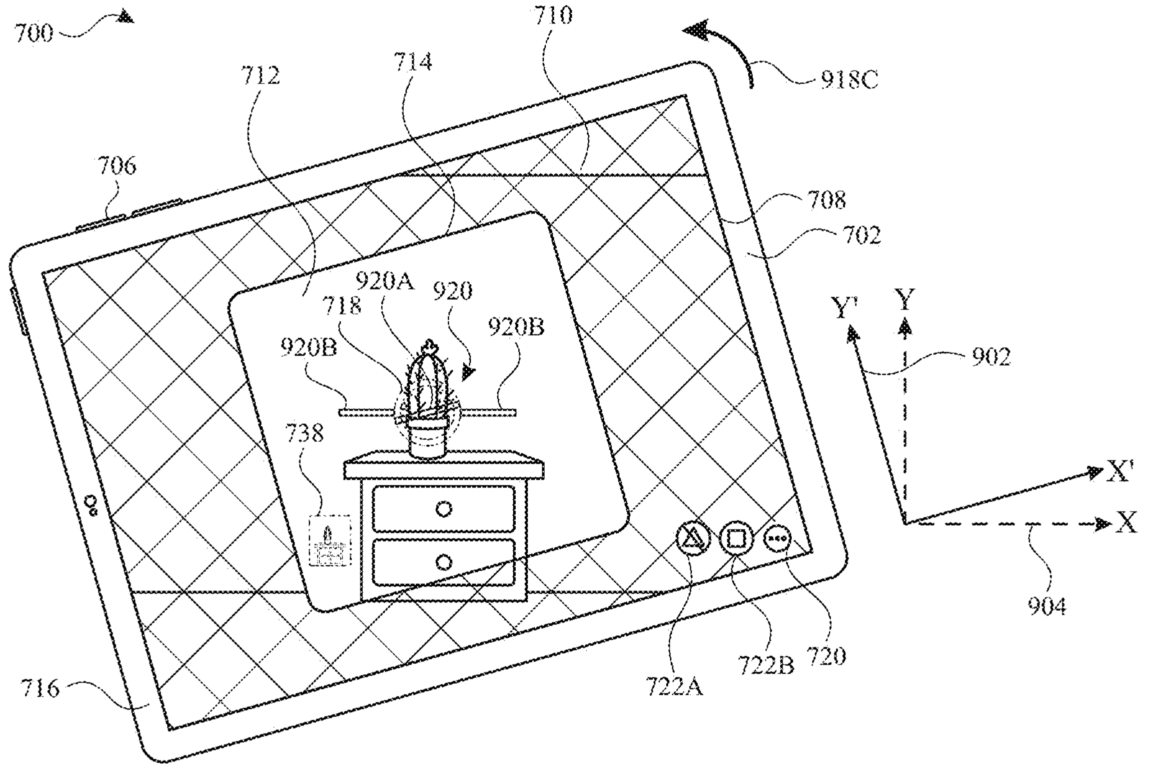
*FIG. 9D1*

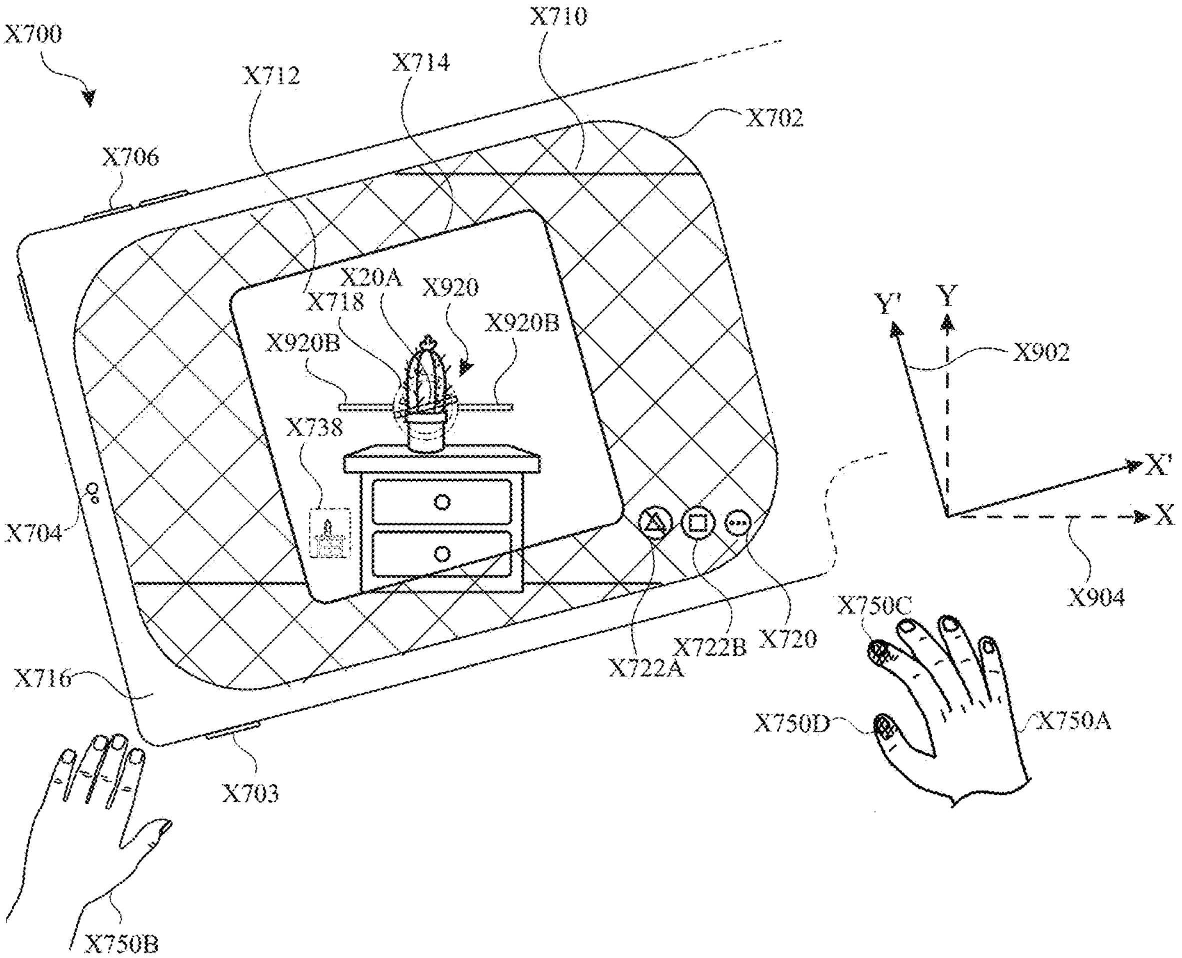
FIG. 9D2

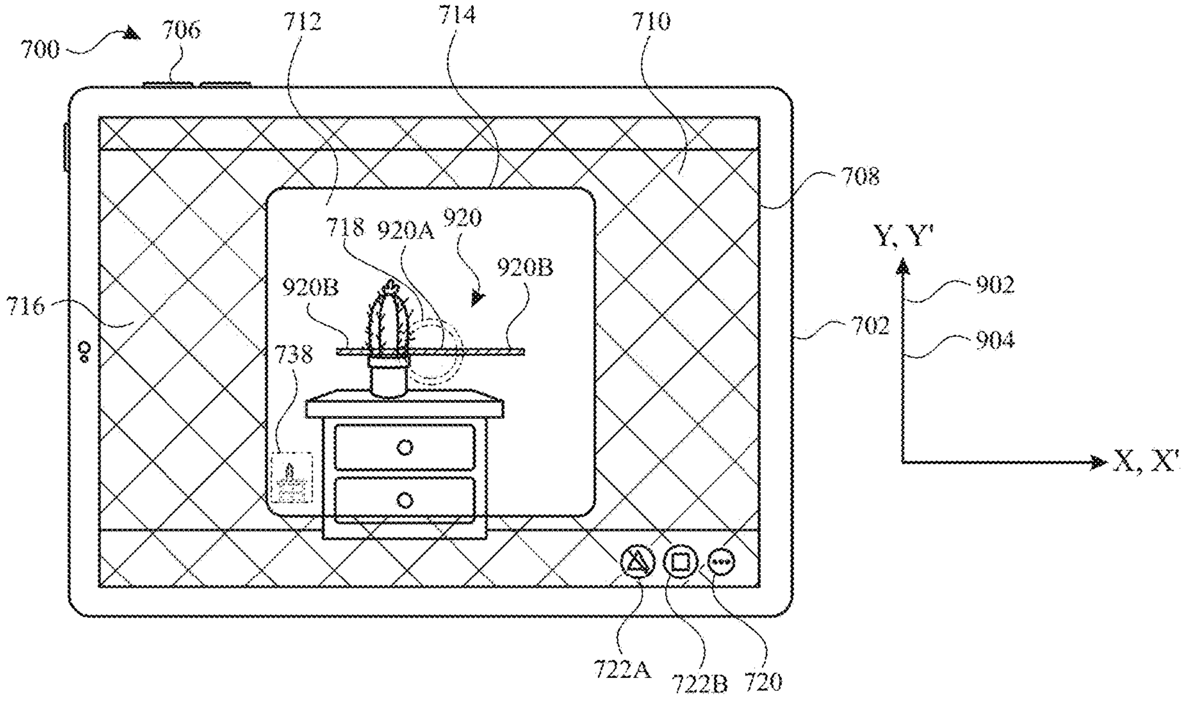
*FIG. 9G*
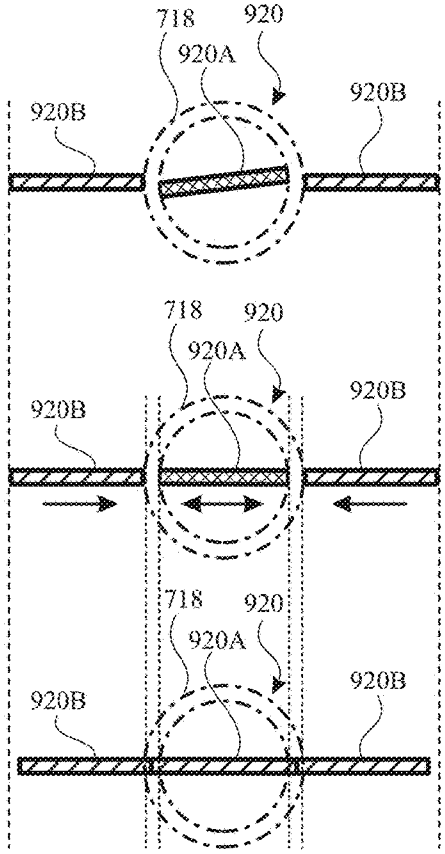
*FIG. 9G1*

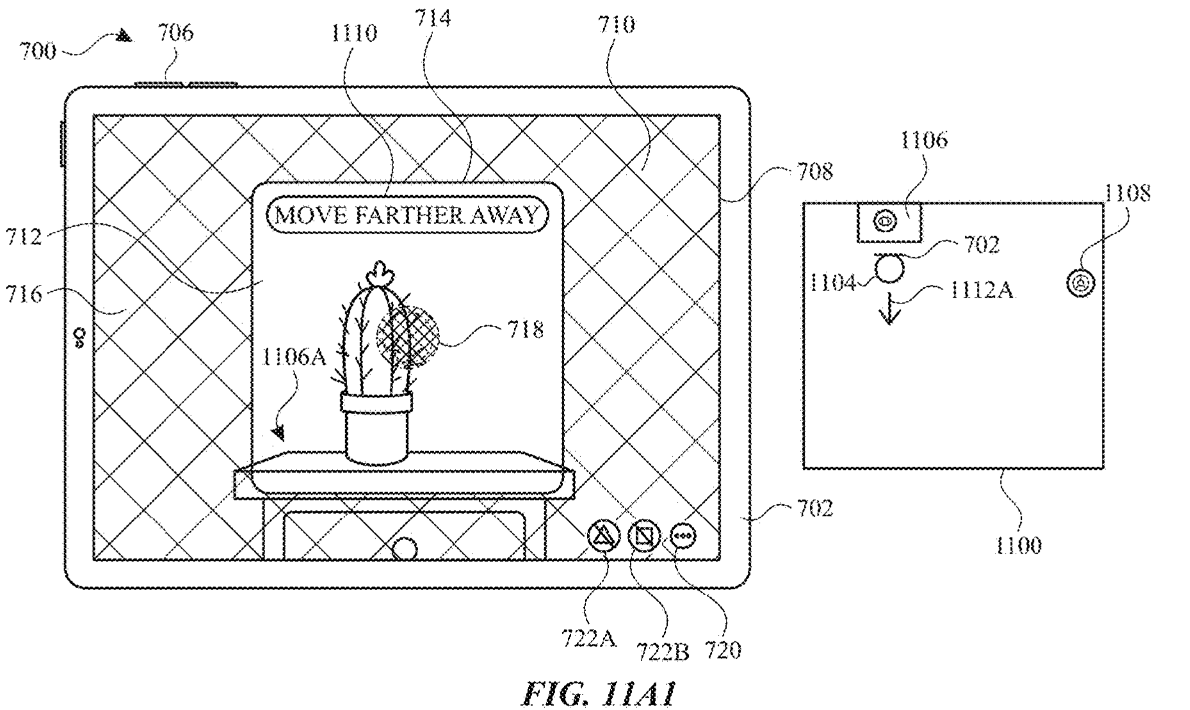
*FIG. 11A1*
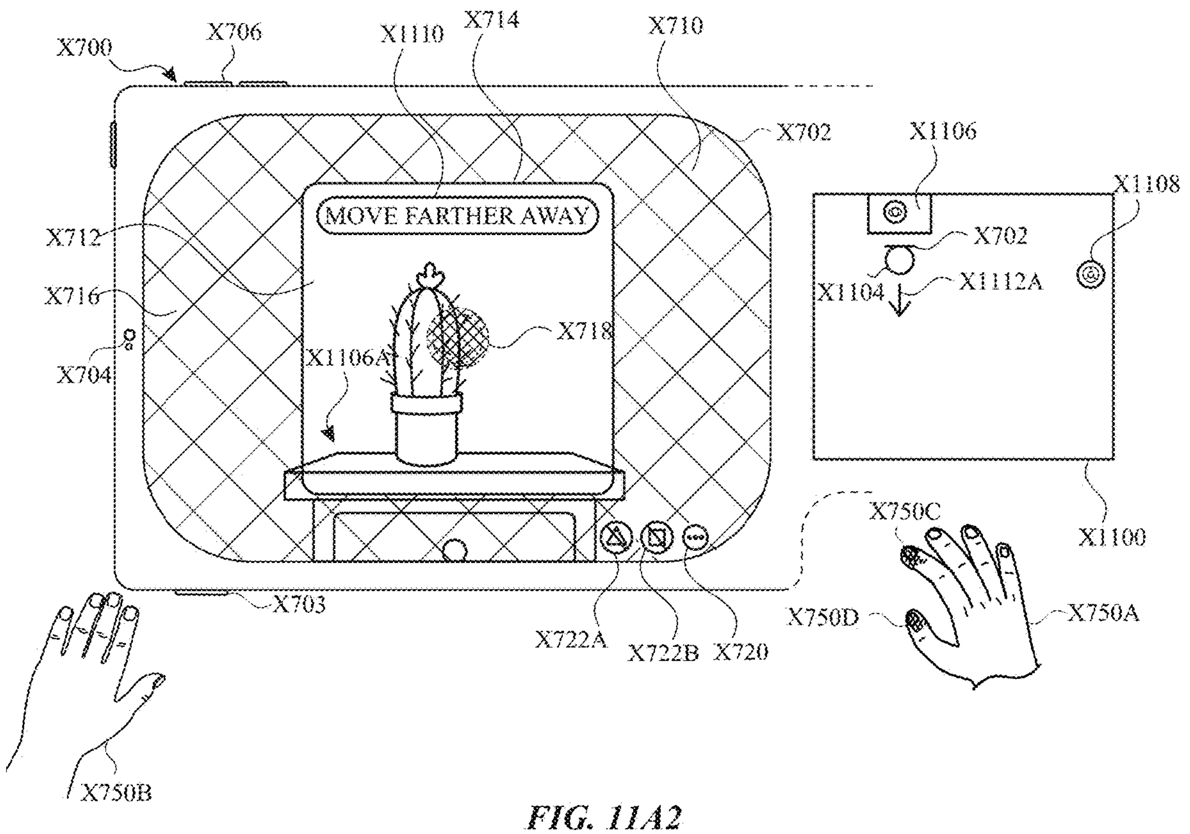
*FIG. 11A2*

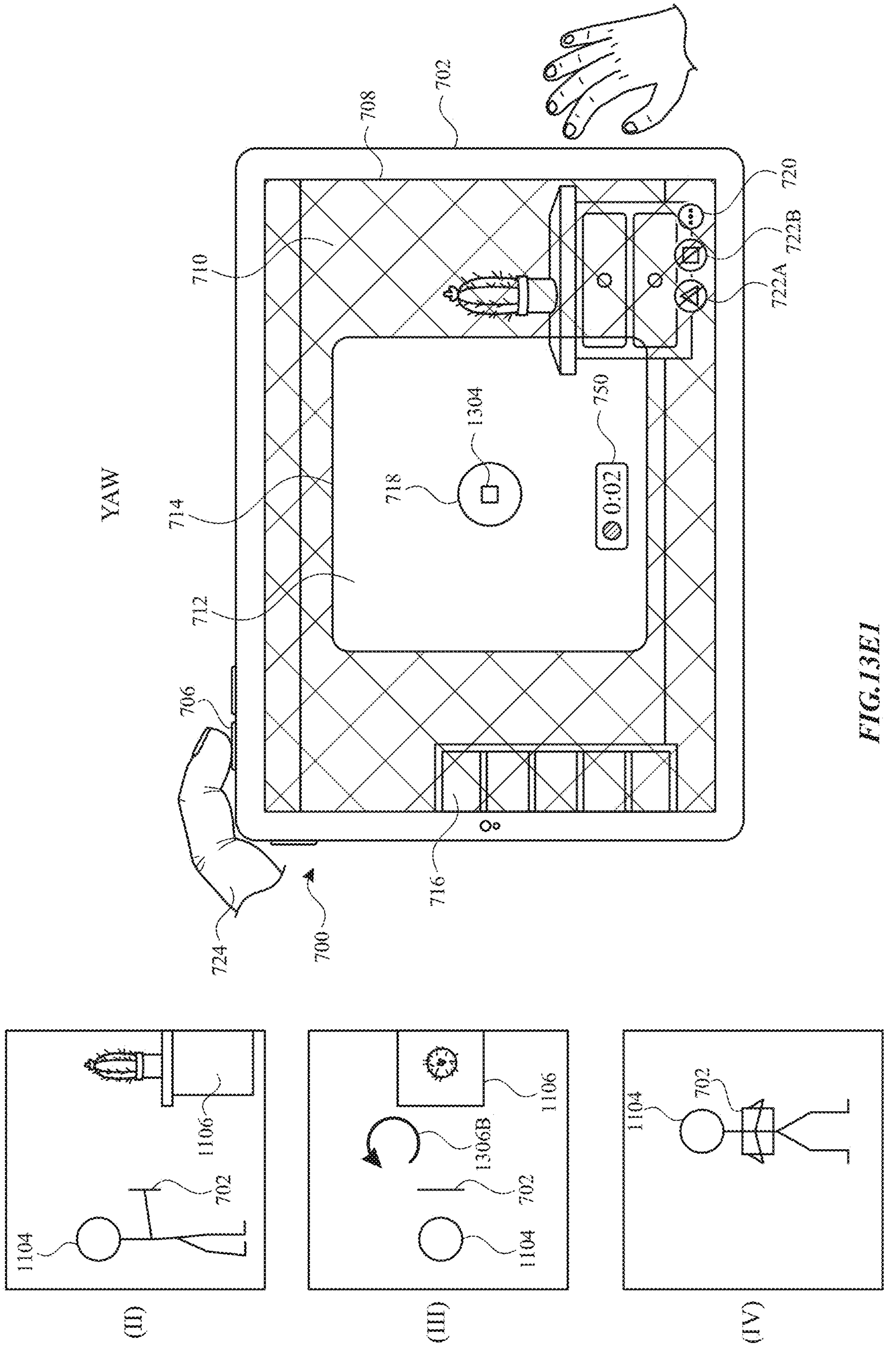
FIG. 13E1

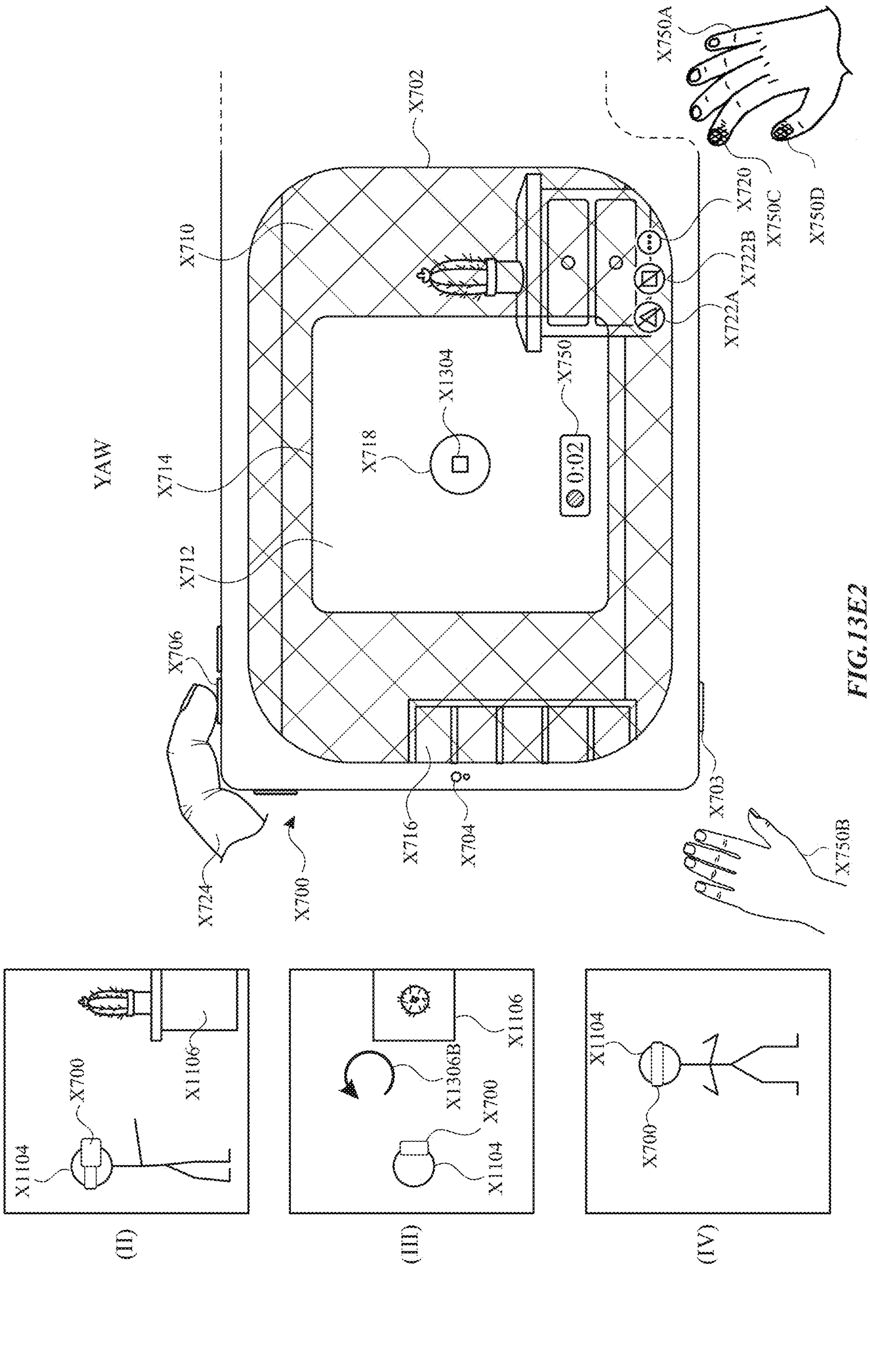
*FIG.13E2*

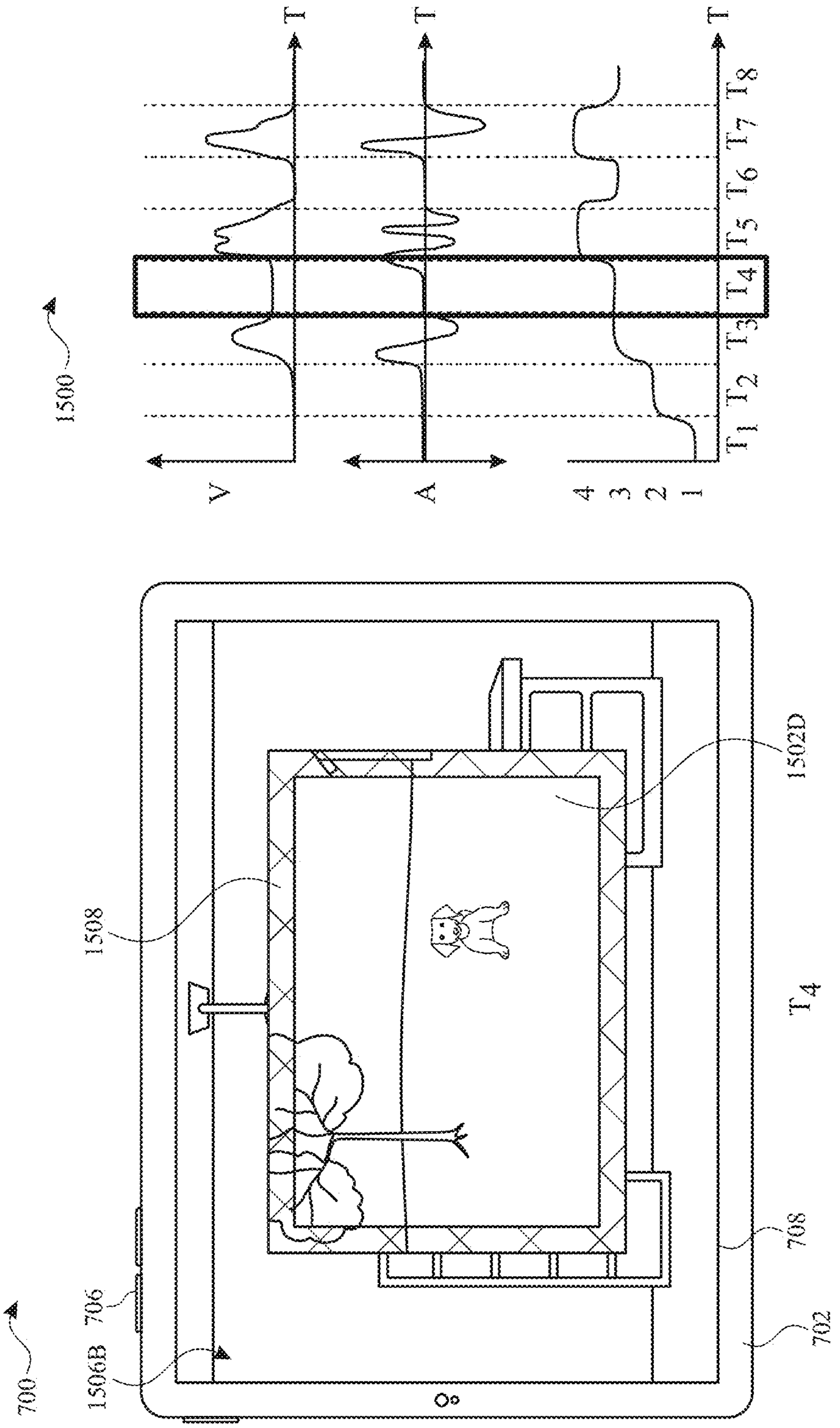
*FIG.15F1*

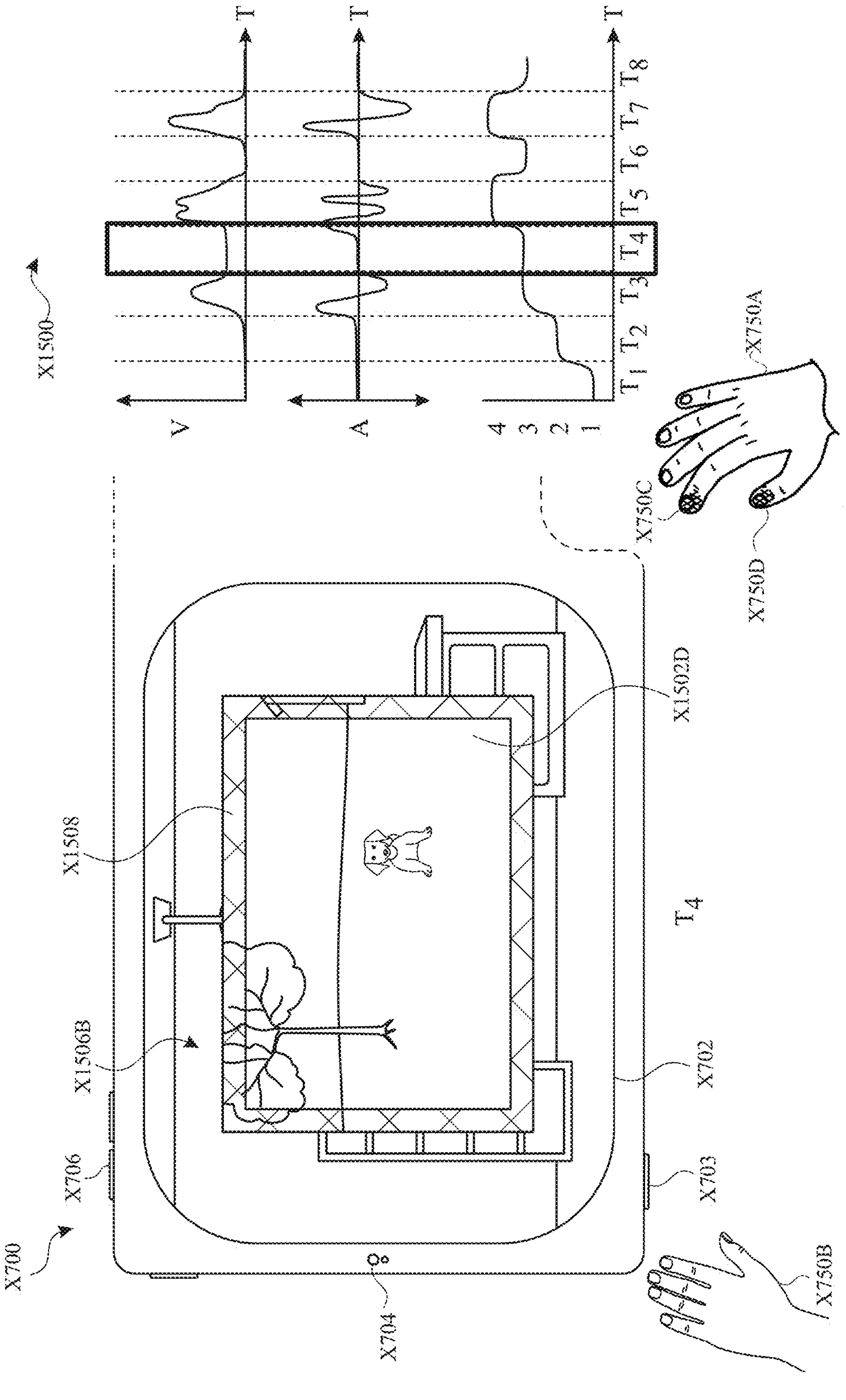
*FIG.15F2*

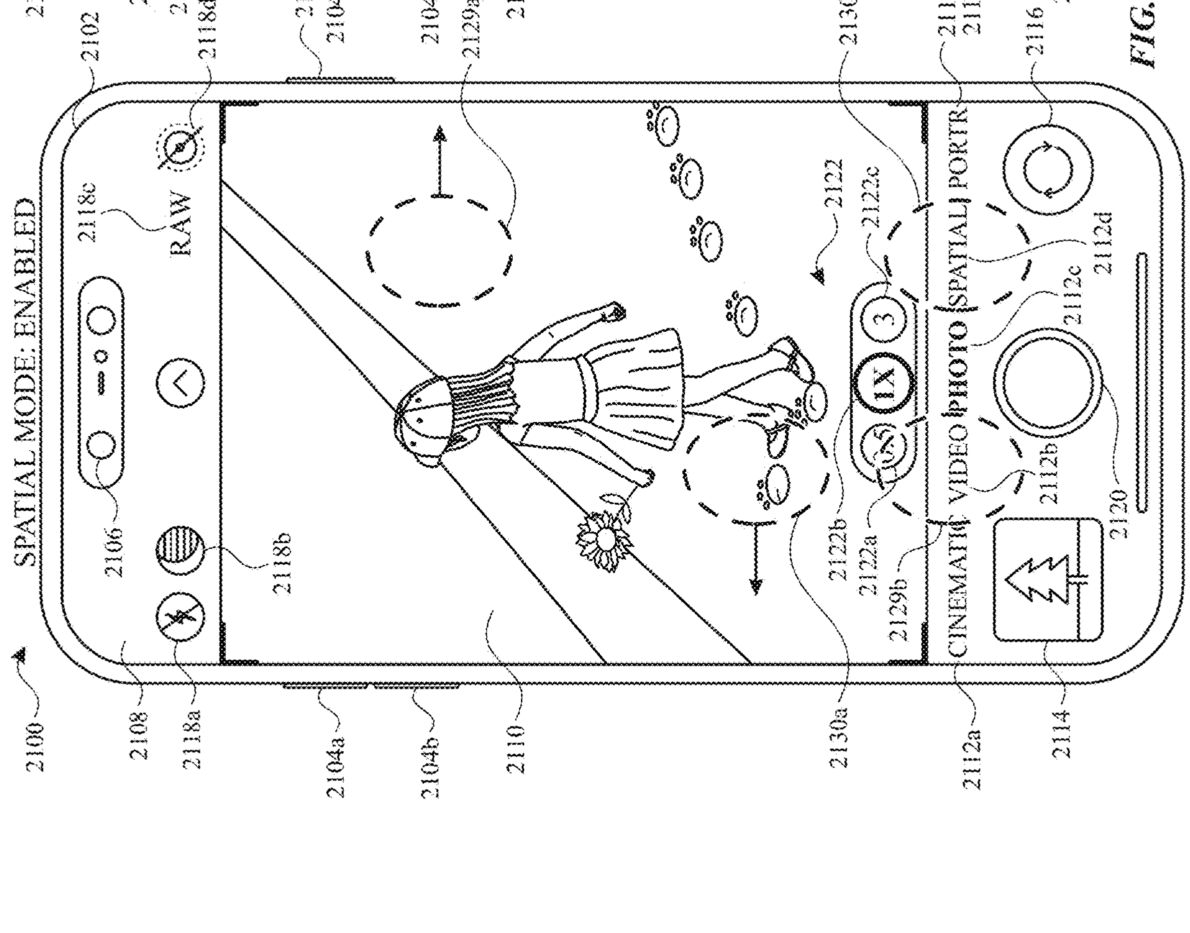
FIG. 21C
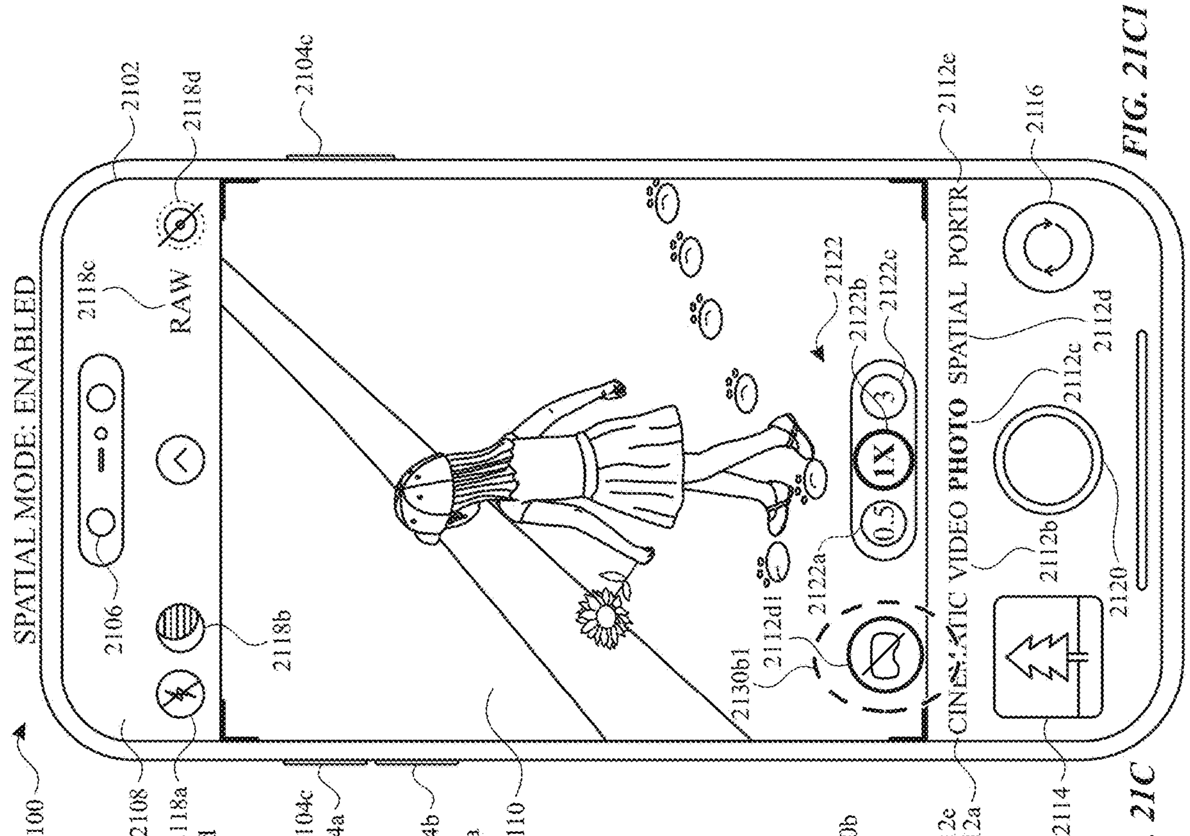
FIG. 21C1

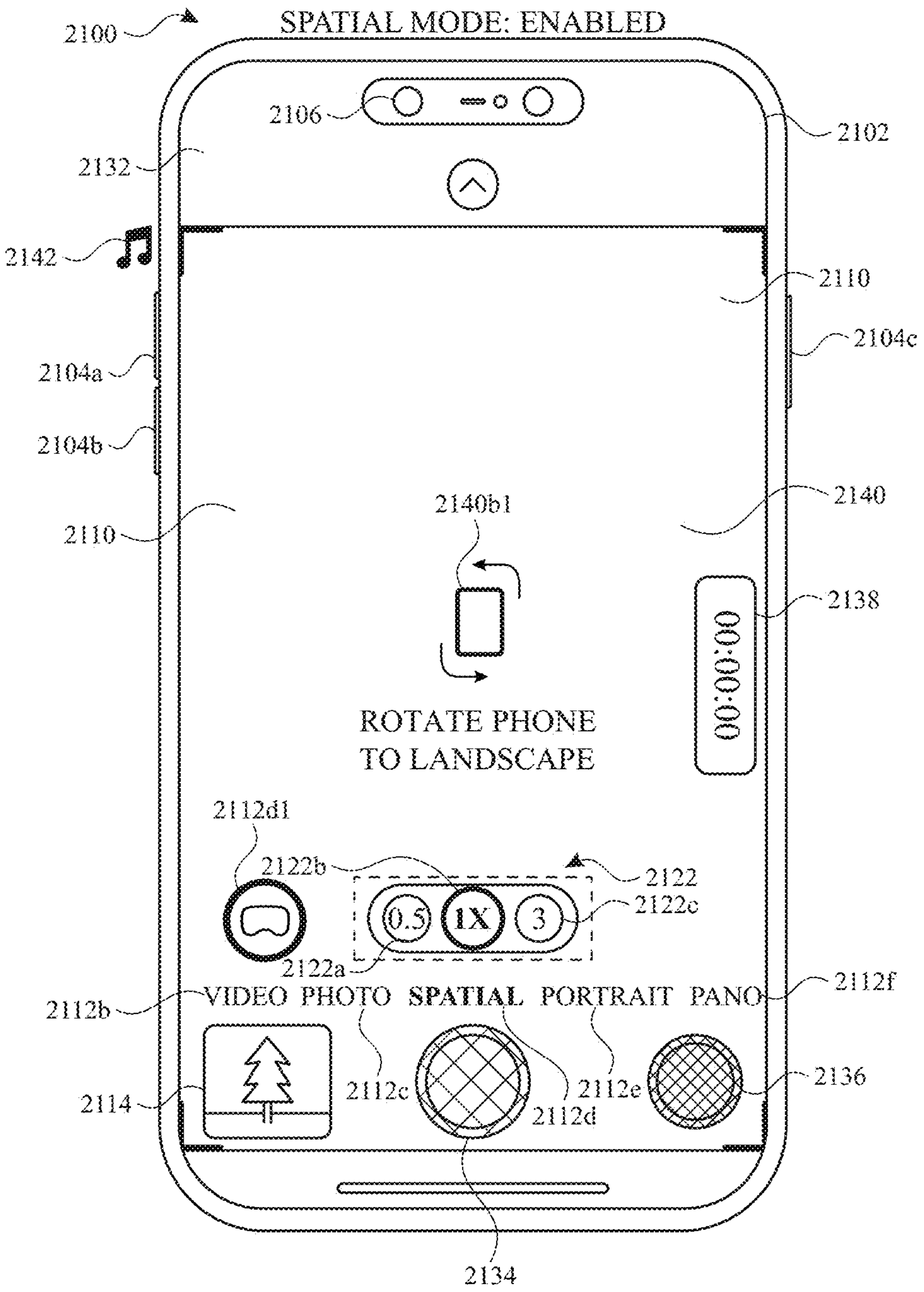
*FIG. 21E1*

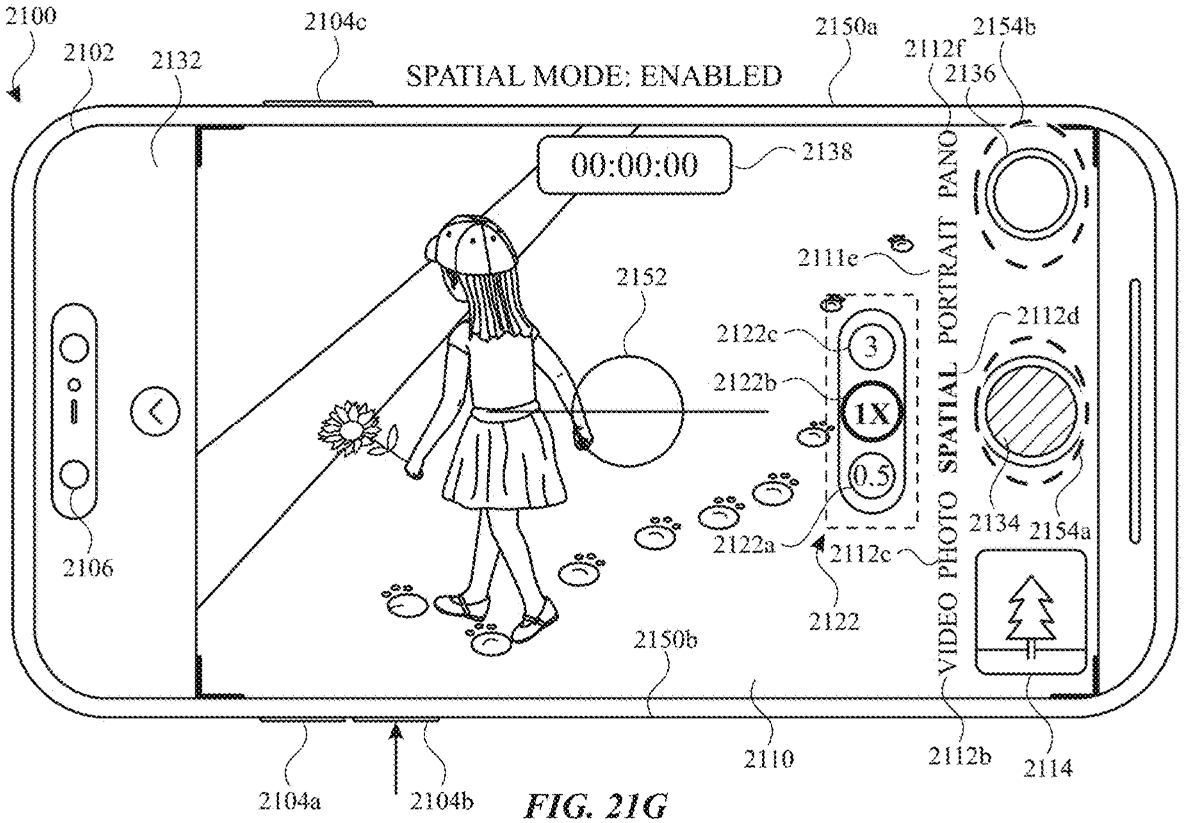
FIG. 21G
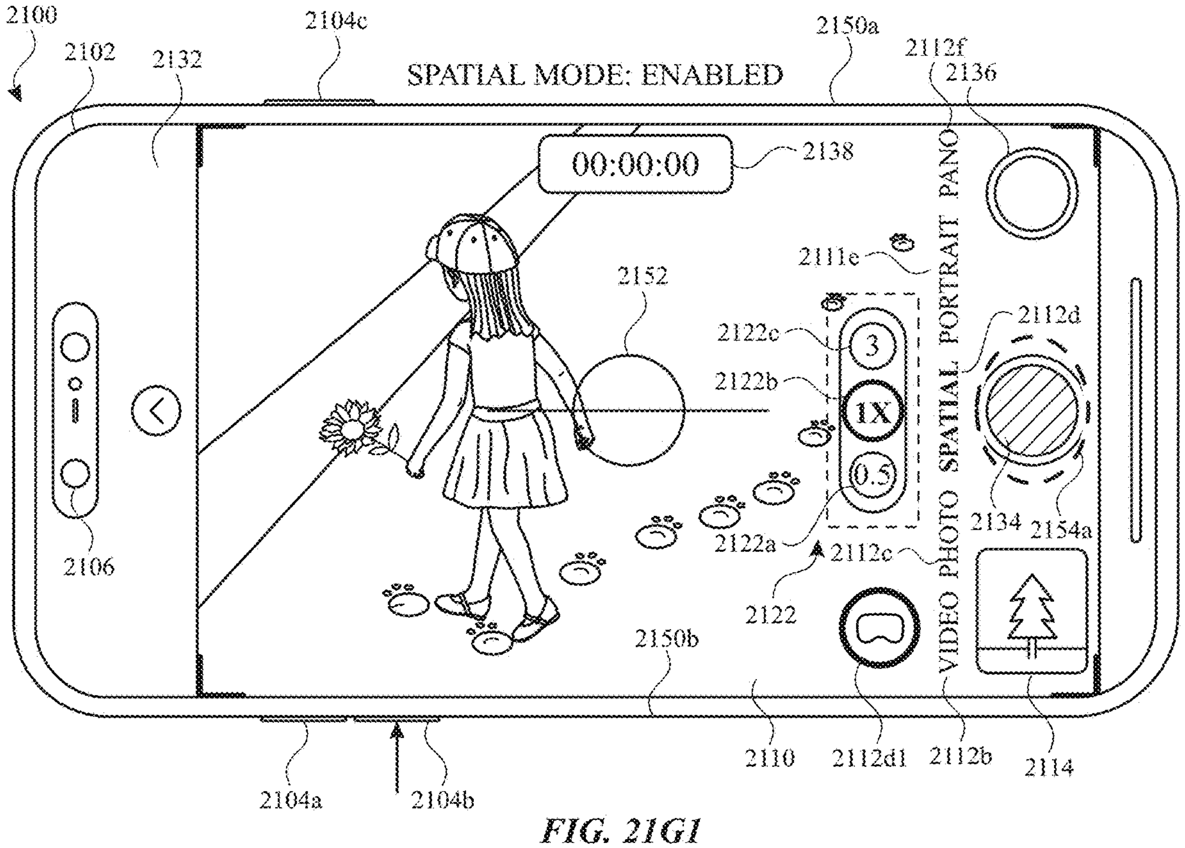
FIG. 21G1

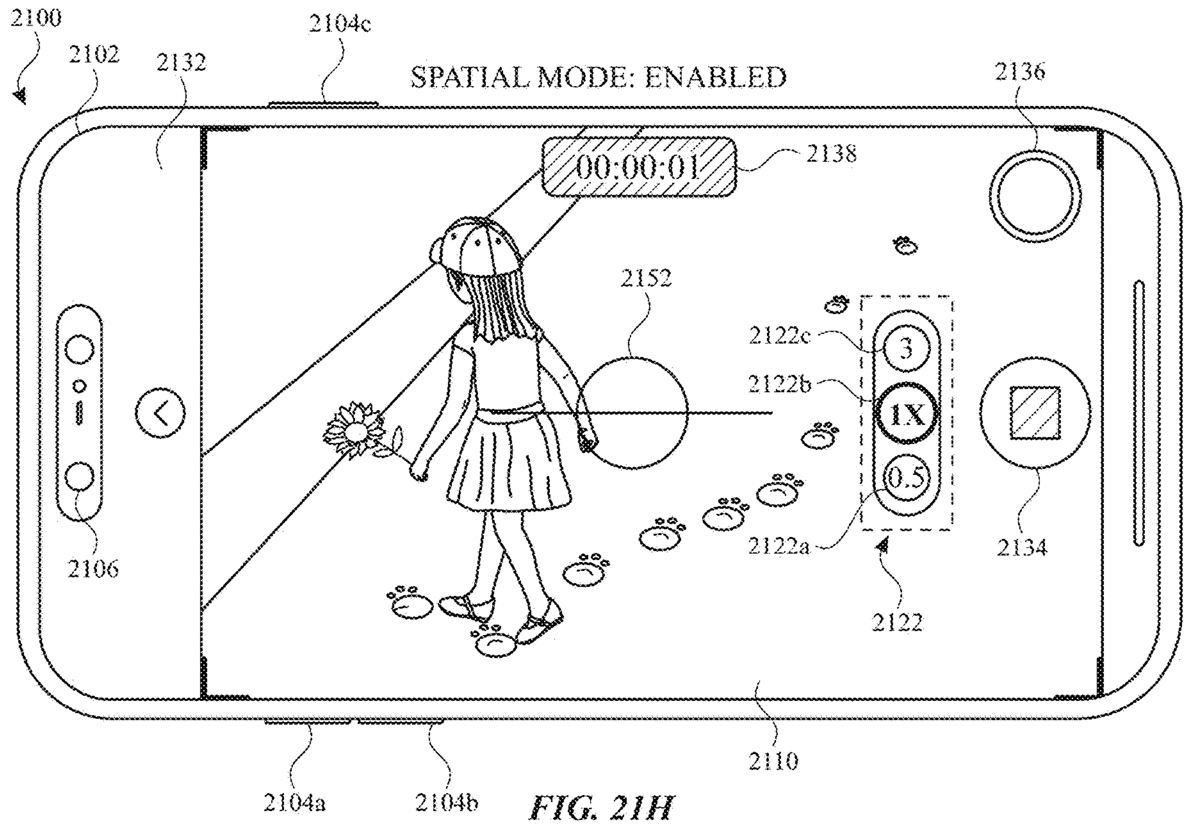
FIG. 21H
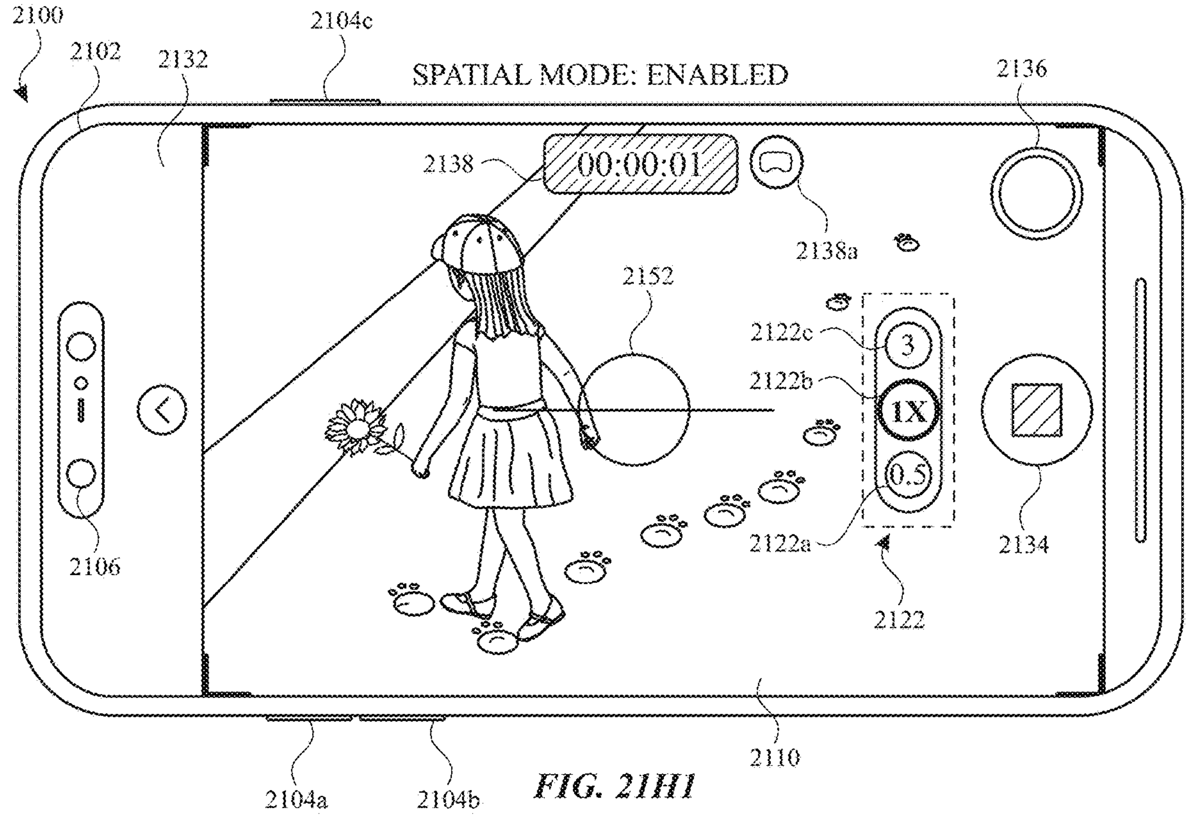
FIG. 21H1

DEVICES, METHODS, AND GRAPHICAL USER INTERFACES FOR CAPTURING MEDIA WITH A CAMERA APPLICATION

CROSS-REFERENCE TO RELATED APPLICATIONS

This application claims priority to U.S. Provisional Patent Application Ser. No. 63/453,708, entitled "DEVICES, METHODS, AND GRAPHICAL USER INTERFACES FOR CAPTURING MEDIA WITH A CAMERA APPLICATION," filed on Mar. 21, 2023, and claims priority to U.S. Provisional Patent Application Ser. No. 63/470,878, entitled "DEVICES, METHODS, AND GRAPHICAL USER INTERFACES FOR CAPTURING MEDIA WITH A CAMERA APPLICATION," filed on Jun. 3, 2023, and claims priority to U.S. Provisional Patent Application Ser. No. 63/528,409, entitled "DEVICES, METHODS, AND GRAPHICAL USER INTERFACES FOR CAPTURING MEDIA WITH A CAMERA APPLICATION," filed on Jul. 23, 2023, and claims priority to U.S. Provisional Patent Application Ser. No. 63/537,801, entitled "DEVICES, METHODS, AND GRAPHICAL USER INTERFACES FOR CAPTURING MEDIA WITH A CAMERA APPLICATION," filed on Sep. 11, 2023, and claims priority to U.S. Provisional Patent Application Ser. No. 63/548,166, entitled "DEVICES, METHODS, AND GRAPHICAL USER INTERFACES FOR CAPTURING MEDIA WITH A CAMERA APPLICATION," filed on Nov. 10, 2023. The contents of each application are hereby incorporated by reference in their entirety.

TECHNICAL FIELD

The present disclosure relates generally to computer systems that are in communication with a display generation component, a first camera, and, optionally, a second camera that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for capturing media with a camera application (e.g., while interacting with environments that include at least some virtual elements such as applications, augmented reality environments, mixed reality environments, and/or virtual reality environments) are cumbersome, inefficient, and limited. For example, systems that provide insufficient feedback on the state of the computer system while the user is trying to capture media (e.g., the readiness of the computer system to capture media, the orientation of the camera(s) used for media capture, and/or the current capture quality), systems that excessively obscure the environment while the user is trying to capture media, and systems in which inputs for controlling media capture are complex, tedious, and/or error-prone, create a significant cognitive burden on a user, and detract from the media capture experience. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make capturing media with the computer systems more efficient and intuitive for a user. Such methods and interfaces optionally complement or replace conventional methods for media capture with a camera application. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for capturing media with a camera application. Such methods and interfaces may complement or replace conventional methods for capturing media with a camera application. Such methods and interfaces provide a user with improved feedback on the state of the computer system, reduce the number, extent, and/or the nature of the inputs from a user and produce a more efficient human-machine interface. For battery-operated computing devices, such methods and interfaces conserve power and increase the time between battery charges. Such methods and interfaces reduce energy usage, thereby reducing heat emitted by the computing devices, which is particularly important for wearable computing devices such as head-mounted devices (HMDs) that can become uncomfortable for a user to wear if too much heat is produced, even when operating well within operational parameters for the device components.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

In accordance with some embodiments, a method performed at a computer system that is in communication with a display generation component and a first camera is described. The method includes: while displaying, via the display generation component, a first user interface that includes a camera viewfinder: detecting a first input; and in response to detecting the first input: in accordance with a determination that a gaze of a user of the computer system a respective region of the camera viewfinder when the first input is detected, initiating capture of first media content using the first camera; and in accordance with a determination that the gaze of the user of the computer system input is not directed to the respective region of the camera viewfinder when the first input is detected, forgoing initiating capture of the first media content.

In accordance with some embodiments, a non-transitory computer-readable storage medium is described. The non-transitory computer-readable storage medium stores one or more programs configured to be executed by one or more processors of a computer system that is in communication with a display generation component and a first camera, the one or more programs including instructions for: while displaying, via the display generation component, a first user interface that includes a camera viewfinder detecting a first input; and in response to detecting the first input: in accordance with a determination that a gaze of a user of the computer system a respective region of the camera viewfinder when the first input is detected, initiating capture of first media content using the first camera; and in accordance with a determination that the gaze of the user of the computer system input is not directed to the respective region of the camera viewfinder when the first input is detected, forgoing initiating capture of the first media content.

In accordance with some embodiments, a transitory computer-readable storage medium is described. The transitory computer-readable storage medium stores one or more programs configured to be executed by one or more processors of a computer system that is in communication with a display generation component and a first camera, the one or more programs including instructions for: while displaying, via the display generation component, a first user interface that includes a camera viewfinder: detecting a first input; and in response to detecting the first input: in accordance with a determination that a gaze of a user of the computer system a respective region of the camera viewfinder when the first input is detected, initiating capture of first media content using the first camera; and in accordance with a determination that the gaze of the user of the computer system input is not directed to the respective region of the camera viewfinder when the first input is detected, forgoing initiating capture of the first media content.

In accordance with some embodiments, a computer system is described. The computer system is configured to communicate with a display generation component and a first camera, and the computer system comprises: one or more processors; and memory storing one or more programs configured to be executed by the one or more processors, the one or more programs including instructions for: while displaying, via the display generation component, a first user interface that includes a camera viewfinder: detecting a first input; and in response to detecting the first input: in accordance with a determination that a gaze of a user of the computer system a respective region of the camera viewfinder when the first input is detected, initiating capture of first media content using the first camera; and in accordance with a determination that the gaze of the user of the computer system input is not directed to the respective region of the camera viewfinder when the first input is detected, forgoing initiating capture of the first media content.

In accordance with some embodiments, a computer system is described. The computer system is configured to communicate with a display generation component and a first camera, and the computer system comprises: means, while displaying, via the display generation component, a first user interface that includes a camera viewfinder, for: detecting a first input; and in response to detecting the first input: in accordance with a determination that a gaze of a user of the computer system a respective region of the camera viewfinder when the first input is detected, initiating capture of first media content using the first camera; and in accordance with a determination that the gaze of the user of the computer system input is not directed to the respective region of the camera viewfinder when the first input is detected, forgoing initiating capture of the first media content.

In accordance with some embodiments, a computer program product is described. The computer program product is configured to be executed by one or more processors of a computer system that is in communication with a display generation component and a first camera, the one or more programs including instructions for: while displaying, via the display generation component, a first user interface that includes a camera viewfinder: detecting a first input; and in response to detecting the first input: in accordance with a determination that a gaze of a user of the computer system a respective region of the camera viewfinder when the first input is detected, initiating capture of first media content using the first camera; and in accordance with a determination that the gaze of the user of the computer system input is not directed to the respective region of the camera viewfinder when the first input is detected, forgoing initiating capture of the first media content.

In accordance with some embodiments, a method performed at a computer system that is in communication with a display generation component and a first camera is described. The method includes: displaying, via the display generation component, a first user interface that includes a camera preview of at least a portion of a field-of-view of the first camera; detecting a change in an orientation of the field-of-view of the first camera with respect to a respective orientation; and in response to detecting the change in the orientation: in accordance with a determination that a first set of criteria are met, displaying a first indicator representing the orientation of the field-of-view of the first camera, wherein the first set of criteria includes a first criterion that is met when a difference between a current orientation of the field-of-view of the first camera and the respective orientation exceeds a first threshold amount.

In accordance with some embodiments, a non-transitory computer-readable storage medium is described. The non-transitory computer-readable storage medium stores one or more programs configured to be executed by one or more processors of a computer system that is in communication with a display generation component and a first camera, the one or more programs including instructions for: displaying, via the display generation component, a first user interface that includes a camera preview of at least a portion of a field-of-view of the first camera; detecting a change in an orientation of the field-of-view of the first camera with respect to a respective orientation; and in response to detecting the change in the orientation: in accordance with a determination that a first set of criteria are met, displaying a first indicator representing the orientation of the field-of-view of the first camera, wherein the first set of criteria includes a first criterion that is met when a difference between a current orientation of the field-of-view of the first camera and the respective orientation exceeds a first threshold amount.

In accordance with some embodiments, a transitory computer-readable storage medium is described. The transitory computer-readable storage medium stores one or more programs configured to be executed by one or more processors of a computer system that is in communication with a display generation component and a first camera, the one or more programs including instructions for: displaying, via the display generation component, a first user interface that includes a camera preview of at least a portion of a field-of-view of the first camera; detecting a change in an orientation of the field-of-view of the first camera with respect to a respective orientation; and in response to detecting the change in the orientation: in accordance with a determination that a first set of criteria are met, displaying a first indicator representing the orientation of the field-of-view of the first camera, wherein the first set of criteria includes a first criterion that is met when a difference between a current orientation of the field-of-view of the first camera and the respective orientation exceeds a first threshold amount.

In accordance with some embodiments, a computer system is described. The computer system is configured to communicate with a display generation component and a first camera, and the computer system comprises: one or more processors; and memory storing one or more programs configured to be executed by the one or more processors, the one or more programs including instructions for: displaying, via the display generation component, a first user interface that includes a camera preview of at least a portion of a field-of-view of the first camera; detecting a change in an orientation of the field-of-view of the first camera with respect to a respective orientation; and in response to detecting the change in the orientation: in accordance with a determination that a first set of criteria are met, displaying a first indicator representing the orientation of the field-of-view of the first camera, wherein the first set of criteria includes a first criterion that is met when a difference between a current orientation of the field-of-view of the first camera and the respective orientation exceeds a first threshold amount.

In accordance with some embodiments, a computer system is described. The computer system is configured to communicate with a display generation component and a first camera, and the computer system comprises: means for displaying, via the display generation component, a first user interface that includes a camera preview of at least a portion of a field-of-view of the first camera; means for detecting a change in an orientation of the field-of-view of the first camera with respect to a respective orientation; and means, in response to detecting the change in the orientation, for: in accordance with a determination that a first set of criteria are met, displaying a first indicator representing the orientation of the field-of-view of the first camera, wherein the first set of criteria includes a first criterion that is met when a difference between a current orientation of the field-of-view of the first camera and the respective orientation exceeds a first threshold amount.

In accordance with some embodiments, a computer program product is described. The computer program product is configured to be executed by one or more processors of a computer system that is in communication with a display generation component and a first camera, the one or more programs including instructions for: displaying, via the display generation component, a first user interface that includes a camera preview of at least a portion of a field-of-view of the first camera; detecting a change in an orientation of the field-of-view of the first camera with respect to a respective orientation; and in response to detecting the change in the orientation: in accordance with a determination that a first set of criteria are met, displaying a first indicator representing the orientation of the field-of-view of the first camera, wherein the first set of criteria includes a first criterion that is met when a difference between a current orientation of the field-of-view of the first camera and the respective orientation exceeds a first threshold amount.

In accordance with some embodiments, a method performed at a computer system that is in communication with a display generation component and a plurality of cameras including a first camera and a second camera. The method includes: displaying, via the display generation component, a capture preview for spatial media capture, wherein a capture input detected while the capture preview is displayed will cause the computer system to capture media from the first camera and the second camera to generate a spatial media item that includes one or more images for a right eye and one or more images for a left eye that when viewed concurrently create an illusion of a spatial representation of a field-of-view of the plurality of cameras; while displaying the capture preview for spatial media capture, detecting a location of a subject in the field-of-view of the plurality of cameras; and in response to detecting the location of the subject in the field-of-view of the plurality of cameras, in accordance with a determination that the subject location relative to the field-of-view of the plurality of cameras does not meet criteria for capturing spatial media with a threshold level of quality, displaying, via the display generation component, a prompt to change a distance between the subject and the plurality of cameras.

In accordance with some embodiments, a non-transitory computer-readable storage medium is described. The non-transitory computer-readable storage medium stores one or more programs configured to be executed by one or more processors of a computer system that is in communication with a display generation component and a plurality of cameras including a first camera and a second camera, the one or more programs including instructions for: displaying, via the display generation component, a capture preview for spatial media capture, wherein a capture input detected while the capture preview is displayed will cause the computer system to capture media from the first camera and the second camera to generate a spatial media item that includes one or more images for a right eye and one or more images for a left eye that when viewed concurrently create an illusion of a spatial representation of a field-of-view of the plurality of cameras; while displaying the capture preview for spatial media capture, detecting a location of a subject in the field-of-view of the plurality of cameras; and in response to detecting the location of the subject in the field-of-view of the plurality of cameras, in accordance with a determination that the subject location relative to the field-of-view of the plurality of cameras does not meet criteria for capturing spatial media with a threshold level of quality, displaying, via the display generation component, a prompt to change a distance between the subject and the plurality of cameras.

In accordance with some embodiments, a transitory computer-readable storage medium is described. The transitory computer-readable storage medium stores one or more programs configured to be executed by one or more processors of a computer system that is in communication with a display generation component and a plurality of cameras including a first camera and a second camera, the one or more programs including instructions for: displaying, via the display generation component, a capture preview for spatial media capture, wherein a capture input detected while the capture preview is displayed will cause the computer system to capture media from the first camera and the second camera to generate a spatial media item that includes one or more images for a right eye and one or more images for a left eye that when viewed concurrently create an illusion of a spatial representation of a field-of-view of the plurality of cameras; while displaying the capture preview for spatial media capture, detecting a location of a subject in the field-of-view of the plurality of cameras; and in response to detecting the location of the subject in the field-of-view of the plurality of cameras, in accordance with a determination that the subject location relative to the field-of-view of the plurality of cameras does not meet criteria for capturing spatial media with a threshold level of quality, displaying, via the display generation component, a prompt to change a distance between the subject and the plurality of cameras.

In accordance with some embodiments, a computer system is described. The computer system is configured to communicate with a display generation component and a plurality of cameras including a first camera and a second camera, and the computer system comprises: one or more processors; and memory storing one or more programs configured to be executed by the one or more processors, the one or more programs including instructions for: displaying, via the display generation component, a capture preview for spatial media capture, wherein a capture input detected while the capture preview is displayed will cause the computer system to capture media from the first camera and the second camera to generate a spatial media item that includes one or more images for a right eye and one or more images for a left eye that when viewed concurrently create an illusion of a spatial representation of a field-of-view of the plurality of cameras; while displaying the capture preview for spatial media capture, detecting a location of a subject in the field-of-view of the plurality of cameras; and in response to detecting the location of the subject in the field-of-view of the plurality of cameras, in accordance with a determination that the subject location relative to the field-of-view of the plurality of cameras does not meet criteria for capturing spatial media with a threshold level of quality, displaying, via the display generation component, a prompt to change a distance between the subject and the plurality of cameras.

In accordance with some embodiments, a computer system is described. The computer system is configured to communicate with a display generation component and a plurality of cameras including a first camera and a second camera, and the computer system comprises: means for displaying, via the display generation component, a capture preview for spatial media capture, wherein a capture input detected while the capture preview is displayed will cause the computer system to capture media from the first camera and the second camera to generate a spatial media item that includes one or more images for a right eye and one or more images for a left eye that when viewed concurrently create an illusion of a spatial representation of a field-of-view of the plurality of cameras; means for, while displaying the capture preview for spatial media capture, detecting a location of a subject in the field-of-view of the plurality of cameras; and means for, in response to detecting the location of the subject in the field-of-view of the plurality of cameras, in accordance with a determination that the subject location relative to the field-of-view of the plurality of cameras does not meet criteria for capturing spatial media with a threshold level of quality, displaying, via the display generation component, a prompt to change a distance between the subject and the plurality of cameras.

In accordance with some embodiments, a computer program product is described. The computer program product is configured to be executed by one or more processors of a computer system that is in communication with a display generation component and a plurality of cameras including a first camera and a second camera, the one or more programs including instructions for: displaying, via the display generation component, a capture preview for spatial media capture, wherein a capture input detected while the capture preview is displayed will cause the computer system to capture media from the first camera and the second camera to generate a spatial media item that includes one or more images for a right eye and one or more images for a left eye that when viewed concurrently create an illusion of a spatial representation of a field-of-view of the plurality of cameras; while displaying the capture preview for spatial media capture, detecting a location of a subject in the field-of-view of the plurality of cameras; and in response to detecting the location of the subject in the field-of-view of the plurality of cameras, in accordance with a determination that the subject location relative to the field-of-view of the plurality of cameras does not meet criteria for capturing spatial media with a threshold level of quality, displaying, via the display generation component, a prompt to change a distance between the subject and the plurality of cameras.

In accordance with some embodiments, a method performed at a computer system with a display generation component and one or more sensors, the one or more sensors including one or more cameras is described. The method includes: capturing video media using the one or more cameras; and while capturing the video media: detecting, via the one or more sensors, a movement of the one or more cameras; and in response to detecting the movement of the one or more of cameras: in accordance with a determination that the movement of the one or more cameras meets a set of one or more movement criteria, displaying, via the display generation component, a movement of a visual indicator relative to a displayed reference object, wherein displaying the movement of the visual indicator includes: in accordance with a determination that the movement of the one or more cameras is a movement in a first direction of camera movement, displaying the visual indicator moving, relative to the displayed reference object, in a first direction of indicator movement; and in accordance with a determination that the movement of the one or more cameras is a movement in a second direction of camera movement that is different from the first direction of camera movement, displaying the visual indicator moving, relative to the displayed reference object, in a second direction of indicator movement that is different from the first direction of indicator movement.

In accordance with some embodiments, a non-transitory computer-readable storage medium is described. The non-transitory computer-readable storage medium stores one or more programs configured to be executed by one or more processors of a computer system that is in communication with a display generation component and one or more sensors, the one or more sensors including one or more cameras, the one or more programs including instructions for: detecting, via the one or more sensors, a movement of the one or more cameras; and in response to detecting the movement of the one or more of cameras: in accordance with a determination that the movement of the one or more cameras meets a set of one or more movement criteria, displaying, via the display generation component, a movement of a visual indicator relative to a displayed reference object, wherein displaying the movement of the visual indicator includes: in accordance with a determination that the movement of the one or more cameras is a movement in a first direction of camera movement, displaying the visual indicator moving, relative to the displayed reference object, in a first direction of indicator movement; and in accordance with a determination that the movement of the one or more cameras is a movement in a second direction of camera movement that is different from the first direction of camera movement, displaying the visual indicator moving, relative to the displayed reference object, in a second direction of indicator movement that is different from the first direction of indicator movement.

In accordance with some embodiments, a transitory computer-readable storage medium is described. The transitory computer-readable storage medium stores one or more programs configured to be executed by one or more processors of a computer system that is in communication with a display generation component and one or more sensors, the one or more sensors including one or more cameras, the one or more programs including instructions for: capturing video media using the one or more cameras; and while capturing the video media: detecting, via the one or more sensors, a movement of the one or more cameras; and in response to detecting the movement of the one or more of cameras: in accordance with a determination that the movement of the one or more cameras meets a set of one or more movement criteria, displaying, via the display generation component, a movement of a visual indicator relative to a displayed reference object, wherein displaying the movement of the visual indicator includes: in accordance with a determination that the movement of the one or more cameras is a movement in a first direction of camera movement, displaying the visual indicator moving, relative to the displayed reference object, in a first direction of indicator movement; and in accordance with a determination that the movement of the one or more cameras is a movement in a second direction of camera movement that is different from the first direction of camera movement, displaying the visual indicator moving, relative to the displayed reference object, in a second direction of indicator movement that is different from the first direction of indicator movement.

In accordance with some embodiments, a computer system is described. The computer system is configured to communicate with a display generation component and one or more sensors, the one or more sensors including one or more cameras, and the computer system comprises: one or more processors; and memory storing one or more programs configured to be executed by the one or more processors, the one or more programs including instructions for: capturing video media using the one or more cameras; and while capturing the video media: detecting, via the one or more sensors, a movement of the one or more cameras; and in response to detecting the movement of the one or more of cameras: in accordance with a determination that the movement of the one or more cameras meets a set of one or more movement criteria, displaying, via the display generation component, a movement of a visual indicator relative to a displayed reference object, wherein displaying the movement of the visual indicator includes: in accordance with a determination that the movement of the one or more cameras is a movement in a first direction of camera movement, displaying the visual indicator moving, relative to the displayed reference object, in a first direction of indicator movement; and in accordance with a determination that the movement of the one or more cameras is a movement in a second direction of camera movement that is different from the first direction of camera movement, displaying the visual indicator moving, relative to the displayed reference object, in a second direction of indicator movement that is different from the first direction of indicator movement.

In accordance with some embodiments, a computer system is described. The computer system is configured to communicate with a display generation component and one or more sensors, the one or more sensors including one or more cameras, and the computer system comprises: means for capturing video media using the one or more cameras; and means for, while capturing the video media: detecting, via the one or more sensors, a movement of the one or more cameras; and in response to detecting the movement of the one or more of cameras: in accordance with a determination that the movement of the one or more cameras meets a set of one or more movement criteria, displaying, via the display generation component, a movement of a visual indicator relative to a displayed reference object, wherein displaying the movement of the visual indicator includes: in accordance with a determination that the movement of the one or more cameras is a movement in a first direction of camera movement, displaying the visual indicator moving, relative to the displayed reference object, in a first direction of indicator movement; and in accordance with a determination that the movement of the one or more cameras is a movement in a second direction of camera movement that is different from the first direction of camera movement, displaying the visual indicator moving, relative to the displayed reference object, in a second direction of indicator movement that is different from the first direction of indicator movement.

In accordance with some embodiments, a computer program product is described. The computer program product is configured to be executed by one or more processors of a computer system that is in communication with a display generation component and one or more sensors, the one or more sensors including one or more cameras, the computer program product including instructions for: capturing video media using the one or more cameras; and while capturing the video media: detecting, via the one or more sensors, a movement of the one or more cameras; and in response to detecting the movement of the one or more of cameras: in accordance with a determination that the movement of the one or more cameras meets a set of one or more movement criteria, displaying, via the display generation component, a movement of a visual indicator relative to a displayed reference object, wherein displaying the movement of the visual indicator includes: in accordance with a determination that the movement of the one or more cameras is a movement in a first direction of camera movement, displaying the visual indicator moving, relative to the displayed reference object, in a first direction of indicator movement; and in accordance with a determination that the movement of the one or more cameras is a movement in a second direction of camera movement that is different from the first direction of camera movement, displaying the visual indicator moving, relative to the displayed reference object, in a second direction of indicator movement that is different from the first direction of indicator movement.

In accordance with some embodiments, a method performed at a computer system that is in communication with a display generation component is described. The method includes: while playback of a video media item is ongoing, wherein playback of the video media item includes displaying the video media item concurrently with a border region that is outside of the video media item, changing a visual prominence of the video media item relative to the border region based on a representation of movement of a viewpoint corresponding to the video media item that occurred while the video media item was being captured, wherein changing the visual prominence of the video media item relative to the border region based on the representation of the movement of the viewpoint corresponding to the video media item includes: in accordance with a determination that the movement of the viewpoint corresponding to the video media item corresponds to a first amount of movement, changing the visual prominence of the video media item relative to the border region to a first level of relative visual prominence; and in accordance with a determination that the movement of the viewpoint corresponding to the video media item corresponds to a second amount of movement different from the first amount of movement, changing the visual prominence of the video media item relative to the border region to a second level of relative visual prominence that is different from the first level of relative visual prominence.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while playback of a video media item is ongoing, wherein playback of the video media item includes displaying the video media item concurrently with a border region that is outside of the video media item, changing a visual prominence of the video media item relative to the border region based on a representation of movement of a viewpoint corresponding to the video media item that occurred while the video media item was being captured, wherein changing the visual prominence of the video media item relative to the border region based on the representation of the movement of the viewpoint corresponding to the video media item includes: in accordance with a determination that the movement of the viewpoint corresponding to the video media item corresponds to a first amount of movement, changing the visual prominence of the video media item relative to the border region to a first level of relative visual prominence; and in accordance with a determination that the movement of the viewpoint corresponding to the video media item corresponds to a second amount of movement different from the first amount of movement, changing the visual prominence of the video media item relative to the border region to a second level of relative visual prominence that is different from the first level of relative visual prominence.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while playback of a video media item is ongoing, wherein playback of the video media item includes displaying the video media item concurrently with a border region that is outside of the video media item, changing a visual prominence of the video media item relative to the border region based on a representation of movement of a viewpoint corresponding to the video media item that occurred while the video media item was being captured, wherein changing the visual prominence of the video media item relative to the border region based on the representation of the movement of the viewpoint corresponding to the video media item includes: in accordance with a determination that the movement of the viewpoint corresponding to the video media item corresponds to a first amount of movement, changing the visual prominence of the video media item relative to the border region to a first level of relative visual prominence; and in accordance with a determination that the movement of the viewpoint corresponding to the video media item corresponds to a second amount of movement different from the first amount of movement, changing the visual prominence of the video media item relative to the border region to a second level of relative visual prominence that is different from the first level of relative visual prominence.

In accordance with some embodiments, a computer system is described. The computer system is configured to communicate with a display generation component, and the computer system comprises: one or more processors; and memory storing one or more programs configured to be executed by the one or more processors, the one or more programs including instructions for: while playback of a video media item is ongoing, wherein playback of the video media item includes displaying the video media item concurrently with a border region that is outside of the video media item, changing a visual prominence of the video media item relative to the border region based on a representation of movement of a viewpoint corresponding to the video media item that occurred while the video media item was being captured, wherein changing the visual prominence of the video media item relative to the border region based on the representation of the movement of the viewpoint corresponding to the video media item includes: in accordance with a determination that the movement of the viewpoint corresponding to the video media item corresponds to a first amount of movement, changing the visual prominence of the video media item relative to the border region to a first level of relative visual prominence; and in accordance with a determination that the movement of the viewpoint corresponding to the video media item corresponds to a second amount of movement different from the first amount of movement, changing the visual prominence of the video media item relative to the border region to a second level of relative visual prominence that is different from the first level of relative visual prominence.

In accordance with some embodiments, a computer system is described. The computer system is configured to communicate with a display generation component and a first camera, and the computer system comprises: means for, while playback of a video media item is ongoing, wherein playback of the video media item includes displaying the video media item concurrently with a border region that is outside of the video media item, changing a visual prominence of the video media item relative to the border region based on a representation of movement of a viewpoint corresponding to the video media item that occurred while the video media item was being captured, wherein changing the visual prominence of the video media item relative to the border region based on the representation of the movement of the viewpoint corresponding to the video media item includes: in accordance with a determination that the movement of the viewpoint corresponding to the video media item corresponds to a first amount of movement, changing the visual prominence of the video media item relative to the border region to a first level of relative visual prominence; and in accordance with a determination that the movement of the viewpoint corresponding to the video media item corresponds to a second amount of movement different from the first amount of movement, changing the visual prominence of the video media item relative to the border region to a second level of relative visual prominence that is different from the first level of relative visual prominence.

In accordance with some embodiments, a computer program product is described. The computer program product is configured to be executed by one or more processors of a computer system that is in communication with a display generation component, the one or more programs including instructions for: while playback of a video media item is ongoing, wherein playback of the video media item includes displaying the video media item concurrently with a border region that is outside of the video media item, changing a visual prominence of the video media item relative to the border region based on a representation of movement of a viewpoint corresponding to the video media item that occurred while the video media item was being captured, wherein changing the visual prominence of the video media item relative to the border region based on the representation of the movement of the viewpoint corresponding to the video media item includes: in accordance with a determination that the movement of the viewpoint corresponding to the video media item corresponds to a first amount of movement, changing the visual prominence of the video media item relative to the border region to a first level of relative visual prominence; and in accordance with a determination that the movement of the viewpoint corresponding to the video media item corresponds to a second amount of movement different from the first amount of movement, changing the visual prominence of the video media item relative to the border region to a second level of relative visual prominence that is different from the first level of relative visual prominence.

In accordance with some embodiments, a method performed at a computer system that is in communication with a display generation component and one or more cameras is described. The method includes: while capturing spatial video media of an environment using the one or more cameras, wherein the spatial video media includes a first video component corresponding to a viewpoint of a right eye and a second video component, different from the first video component, corresponding to a viewpoint of a left eye that when viewed concurrently create an illusion of a spatial representation of the environment, displaying, via the display generation component, a virtual indicator element of an anchor location in the environment that represents a respective viewpoint corresponding to the spatial video media, wherein the virtual indicator element is displayed while the environment is visible via the display generation component; while displaying the virtual indicator element while the environment is visible via the display generation component, detecting a first change in a viewpoint from which the spatial video media is being captured; and in response to detecting the first change in the viewpoint from which the spatial video media is being captured, changing an appearance of the virtual indicator element to indicate the respective viewpoint corresponding to the spatial video media.

In accordance with some embodiments, a non-transitory computer-readable storage medium is described. The non-transitory computer-readable storage medium stores one or more programs configured to be executed by one or more processors of a computer system that is in communication with a display generation component and one or more cameras, the one or more programs including instructions for: while capturing spatial video media of an environment using the one or more cameras, wherein the spatial video media includes a first video component corresponding to a viewpoint of a right eye and a second video component, different from the first video component, corresponding to a viewpoint of a left eye that when viewed concurrently create an illusion of a spatial representation of the environment, displaying, via the display generation component, a virtual indicator element of an anchor location in the environment that represents a respective viewpoint corresponding to the spatial video media, wherein the virtual indicator element is displayed while the environment is visible via the display generation component; while displaying the virtual indicator element while the environment is visible via the display generation component, detecting a first change in a viewpoint from which the spatial video media is being captured; and in response to detecting the first change in the viewpoint from which the spatial video media is being captured, changing an appearance of the virtual indicator element to indicate the respective viewpoint corresponding to the spatial video media.

In accordance with some embodiments, a transitory computer-readable storage medium is described. The transitory computer-readable storage medium stores one or more programs configured to be executed by one or more processors of a computer system that is in communication with a display generation component and one or more cameras, the one or more programs including instructions for: while capturing spatial video media of an environment using the one or more cameras, wherein the spatial video media includes a first video component corresponding to a viewpoint of a right eye and a second video component, different from the first video component, corresponding to a viewpoint of a left eye that when viewed concurrently create an illusion of a spatial representation of the environment, displaying, via the display generation component, a virtual indicator element of an anchor location in the environment that represents a respective viewpoint corresponding to the spatial video media, wherein the virtual indicator element is displayed while the environment is visible via the display generation component; while displaying the virtual indicator element while the environment is visible via the display generation component, detecting a first change in a viewpoint from which the spatial video media is being captured; and in response to detecting the first change in the viewpoint from which the spatial video media is being captured, changing an appearance of the virtual indicator element to indicate the respective viewpoint corresponding to the spatial video media.

In accordance with some embodiments, a computer system is described. The computer system is configured to communicate with a display generation component and one or more cameras, and the computer system comprises: one or more processors; and memory storing one or more programs configured to be executed by the one or more processors, the one or more programs including instructions for: while capturing spatial video media of an environment using the one or more cameras, wherein the spatial video media includes a first video component corresponding to a viewpoint of a right eye and a second video component, different from the first video component, corresponding to a viewpoint of a left eye that when viewed concurrently create an illusion of a spatial representation of the environment, displaying, via the display generation component, a virtual indicator element of an anchor location in the environment that represents a respective viewpoint corresponding to the spatial video media, wherein the virtual indicator element is displayed while the environment is visible via the display generation component; while displaying the virtual indicator element while the environment is visible via the display generation component, detecting a first change in a viewpoint from which the spatial video media is being captured; and in response to detecting the first change in the viewpoint from which the spatial video media is being captured, changing an appearance of the virtual indicator element to indicate the respective viewpoint corresponding to the spatial video media.

In accordance with some embodiments, a computer system is described. The computer system is configured to communicate with a display generation component and one or more cameras, and the computer system comprises: means for, while capturing spatial video media of an environment using the one or more cameras, wherein the spatial video media includes a first video component corresponding to a viewpoint of a right eye and a second video component, different from the first video component, corresponding to a viewpoint of a left eye that when viewed concurrently create an illusion of a spatial representation of the environment, displaying, via the display generation component, a virtual indicator element of an anchor location in the environment that represents a respective viewpoint corresponding to the spatial video media, wherein the virtual indicator element is displayed while the environment is visible via the display generation component; means for, while displaying the virtual indicator element while the environment is visible via the display generation component, detecting a first change in a viewpoint from which the spatial video media is being captured; and means for, in response to detecting the first change in the viewpoint from which the spatial video media is being captured, changing an appearance of the virtual indicator element to indicate the respective viewpoint corresponding to the spatial video media.

In accordance with some embodiments, a computer program product is described. The computer program product is configured to be executed by one or more processors of a computer system that is in communication with a display generation component and one or more cameras, the one or more programs including instructions for: while capturing spatial video media of an environment using the one or more cameras, wherein the spatial video media includes a first video component corresponding to a viewpoint of a right eye and a second video component, different from the first video component, corresponding to a viewpoint of a left eye that when viewed concurrently create an illusion of a spatial representation of the environment, displaying, via the display generation component, a virtual indicator element of an anchor location in the environment that represents a respective viewpoint corresponding to the spatial video media, wherein the virtual indicator element is displayed while the environment is visible via the display generation component; while displaying the virtual indicator element while the environment is visible via the display generation component, detecting a first change in a viewpoint from which the spatial video media is being captured; and in response to detecting the first change in the viewpoint from which the spatial video media is being captured, changing an appearance of the virtual indicator element to indicate the respective viewpoint corresponding to the spatial video media.

In accordance with some embodiments, a method performed at a computer system that is in communication with a display generation component is described. The method includes: while displaying, via the display generation component, a representation of a spatial media item, wherein the spatial media item includes a first component corresponding to a viewpoint of a right eye and a second component, different from the first component, corresponding to a viewpoint of a left eye that when viewed concurrently create an illusion of a spatial representation: in accordance with a determination that the spatial media item meets a set of one or more stability criteria, displaying a spatial viewing indicator with a first appearance concurrently with the representation of the spatial media item; and in accordance with a determination that the spatial media item does not meet the set of one or more stability criteria, forgoing displaying the spatial viewing indicator with the first appearance concurrently with the representation of the spatial media item.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while displaying, via the display generation component, a representation of a spatial media item, wherein the spatial media item includes a first component corresponding to a viewpoint of a right eye and a second component, different from the first component, corresponding to a viewpoint of a left eye that when viewed concurrently create an illusion of a spatial representation: in accordance with a determination that the spatial media item meets a set of one or more stability criteria, displaying a spatial viewing indicator with a first appearance concurrently with the representation of the spatial media item; and in accordance with a determination that the spatial media item does not meet the set of one or more stability criteria, forgoing displaying the spatial viewing indicator with the first appearance concurrently with the representation of the spatial media item.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while displaying, via the display generation component, a representation of a spatial media item, wherein the spatial media item includes a first component corresponding to a viewpoint of a right eye and a second component, different from the first component, corresponding to a viewpoint of a left eye that when viewed concurrently create an illusion of a spatial representation: in accordance with a determination that the spatial media item meets a set of one or more stability criteria, displaying a spatial viewing indicator with a first appearance concurrently with the representation of the spatial media item; and in accordance with a determination that the spatial media item does not meet the set of one or more stability criteria, forgoing displaying the spatial viewing indicator with the first appearance concurrently with the representation of the spatial media item.

In accordance with some embodiments, a computer system is described. The computer system is configured to communicate with a display generation component, and the computer system comprises: one or more processors; and memory storing one or more programs configured to be executed by the one or more processors, the one or more programs including instructions for: while displaying, via the display generation component, a representation of a spatial media item, wherein the spatial media item includes a first component corresponding to a viewpoint of a right eye and a second component, different from the first component, corresponding to a viewpoint of a left eye that when viewed concurrently create an illusion of a spatial representation: in accordance with a determination that the spatial media item meets a set of one or more stability criteria, displaying a spatial viewing indicator with a first appearance concurrently with the representation of the spatial media item; and in accordance with a determination that the spatial media item does not meet the set of one or more stability criteria, forgoing displaying the spatial viewing indicator with the first appearance concurrently with the representation of the spatial media item.

In accordance with some embodiments, a computer system is described. The computer system is configured to communicate with a display generation component and, and the computer system comprises: means for, while displaying, via the display generation component, a representation of a spatial media item, wherein the spatial media item includes a first component corresponding to a viewpoint of a right eye and a second component, different from the first component, corresponding to a viewpoint of a left eye that when viewed concurrently create an illusion of a spatial representation: in accordance with a determination that the spatial media item meets a set of one or more stability criteria, displaying a spatial viewing indicator with a first appearance concurrently with the representation of the spatial media item; and in accordance with a determination that the spatial media item does not meet the set of one or more stability criteria, forgoing displaying the spatial viewing indicator with the first appearance concurrently with the representation of the spatial media item.

In accordance with some embodiments, a computer program product is described. The computer program product is configured to be executed by one or more processors of a computer system that is in communication with a display generation component, the one or more programs including instructions for: while displaying, via the display generation component, a representation of a spatial media item, wherein the spatial media item includes a first component corresponding to a viewpoint of a right eye and a second component, different from the first component, corresponding to a viewpoint of a left eye that when viewed concurrently create an illusion of a spatial representation: in accordance with a determination that the spatial media item meets a set of one or more stability criteria, displaying a spatial viewing indicator with a first appearance concurrently with the representation of the spatial media item; and in accordance with a determination that the spatial media item does not meet the set of one or more stability criteria, forgoing displaying the spatial viewing indicator with the first appearance concurrently with the representation of the spatial media item.

In some embodiments, a method is described. In some embodiments, the method is performed at a computer system that is in communication with one or more display generation components and one or more cameras. The method comprises: while the computer system is in a spatial media capture mode that corresponds to spatial media that includes a first visual component corresponding to a viewpoint of a right eye and a second visual component different from the first visual component and that corresponds to a viewpoint of a left eye that, when viewed concurrently, create an illusion of a spatial representation of captured visual content and while the computer system is not capturing spatial media: in accordance with a determination that an orientation of the computer system is outside of a threshold range of orientations, outputting a first prompt that prompts the user to rotate the computer system into the threshold range of orientations.

In some embodiments, a non-transitory computer-readable storage medium is described. The non-transitory computer-readable storage medium stores one or more programs configured to be executed by one or more processors of a computer system that is in communication with one or more display generation components and one or more cameras, the one or more programs including instructions for: while the computer system is in a spatial media capture mode that corresponds to spatial media that includes a first visual component corresponding to a viewpoint of a right eye and a second visual component different from the first visual component and that corresponds to a viewpoint of a left eye that, when viewed concurrently, create an illusion of a spatial representation of captured visual content and while the computer system is not capturing spatial media: in accordance with a determination that an orientation of the computer system is outside of a threshold range of orientations, outputting a first prompt that prompts the user to rotate the computer system into the threshold range of orientations.

In some embodiments, a transitory computer-readable storage medium is described. The transitory computer-readable storage medium stores one or more programs configured to be executed by one or more processors of a computer system that is in communication with one or more display generation components and one or more cameras, the one or more programs including instructions for: while the computer system is in a spatial media capture mode that corresponds to spatial media that includes a first visual component corresponding to a viewpoint of a right eye and a second visual component different from the first visual component and that corresponds to a viewpoint of a left eye that, when viewed concurrently, create an illusion of a spatial representation of captured visual content and while the computer system is not capturing spatial media: in accordance with a determination that an orientation of the computer system is outside of a threshold range of orientations, outputting a first prompt that prompts the user to rotate the computer system into the threshold range of orientations.

In some embodiments, a computer system is described. The computer system is configured to communicate with one or more display generation components and one or more cameras, and comprises: one or more processors; and memory storing one or more programs configured to be executed by the one or more processors, the one or more programs including instructions for: while the computer system is in a spatial media capture mode that corresponds to spatial media that includes a first visual component corresponding to a viewpoint of a right eye and a second visual component different from the first visual component and that corresponds to a viewpoint of a left eye that, when viewed concurrently, create an illusion of a spatial representation of captured visual content and while the computer system is not capturing spatial media: in accordance with a determination that an orientation of the computer system is outside of a threshold range of orientations, outputting a first prompt that prompts the user to rotate the computer system into the threshold range of orientations.

In some embodiments, a computer system is described. The computer system is configured to communicate with one or more display generation components and one or more cameras, and comprises: means for, while the computer system is in a spatial media capture mode that corresponds to spatial media that includes a first visual component corresponding to a viewpoint of a right eye and a second visual component different from the first visual component and that corresponds to a viewpoint of a left eye that, when viewed concurrently, create an illusion of a spatial representation of captured visual content and while the computer system is not capturing spatial media: in accordance with a determination that an orientation of the computer system is outside of a threshold range of orientations, outputting a first prompt that prompts the user to rotate the computer system into the threshold range of orientations.

In some embodiments, a computer program product is described. The computer program product comprises one or more programs configured to be executed by one or more processors of a computer system that is in communication with one or more display generation components and one or more cameras, the one or more programs including instructions for: while the computer system is in a spatial media capture mode that corresponds to spatial media that includes a first visual component corresponding to a viewpoint of a right eye and a second visual component different from the first visual component and that corresponds to a viewpoint of a left eye that, when viewed concurrently, create an illusion of a spatial representation of captured visual content and while the computer system is not capturing spatial media: in accordance with a determination that an orientation of the computer system is outside of a threshold range of orientations, outputting a first prompt that prompts the user to rotate the computer system into the threshold range of orientations.

In some embodiments, a method is described. In some embodiments, the method is performed at a computer system that is in communication with one or more display generation components and one or more cameras. The method comprises: displaying, via the one or more display generation components, a first user interface corresponding to a camera application of the computer system; and while displaying the first user interface corresponding to the camera application of the computer system: in accordance with a determination that the computer system is associated with a head-mounted device separate from the computer system, providing a spatial media capture mode option corresponding to a spatial media capture mode for capturing spatial media that includes a first visual component corresponding to a viewpoint of a right eye and a second visual component different from the first visual component and that corresponds to a viewpoint of a left eye that, when viewed concurrently, create an illusion of a spatial representation of captured visual content; and in accordance with a determination that the computer system is not associated with a head-mounted device separate from the computer system, forgoing providing the spatial media capture mode option.

In some embodiments, a non-transitory computer-readable storage medium is described. The non-transitory computer-readable storage medium stores one or more programs configured to be executed by one or more processors of a computer system that is in communication with one or more display generation components and one or more cameras, the one or more programs including instructions for: displaying, via the one or more display generation components, a first user interface corresponding to a camera application of the computer system; and while displaying the first user interface corresponding to the camera application of the computer system: in accordance with a determination that the computer system is associated with a head-mounted device separate from the computer system, providing a spatial media capture mode option corresponding to a spatial media capture mode for capturing spatial media that includes a first visual component corresponding to a viewpoint of a right eye and a second visual component different from the first visual component and that corresponds to a viewpoint of a left eye that, when viewed concurrently, create an illusion of a spatial representation of captured visual content; and in accordance with a determination that the computer system is not associated with a head-mounted device separate from the computer system, forgoing providing the spatial media capture mode option.

In some embodiments, a transitory computer-readable storage medium is described. The transitory computer-readable storage medium stores one or more programs configured to be executed by one or more processors of a computer system that is in communication with one or more display generation components and one or more cameras, the one or more programs including instructions for: displaying, via the one or more display generation components, a first user interface corresponding to a camera application of the computer system; and while displaying the first user interface corresponding to the camera application of the computer system: in accordance with a determination that the computer system is associated with a head-mounted device separate from the computer system, providing a spatial media capture mode option corresponding to a spatial media capture mode for capturing spatial media that includes a first visual component corresponding to a viewpoint of a right eye and a second visual component different from the first visual component and that corresponds to a viewpoint of a left eye that, when viewed concurrently, create an illusion of a spatial representation of captured visual content; and in accordance with a determination that the computer system is not associated with a head-mounted device separate from the computer system, forgoing providing the spatial media capture mode option.

In some embodiments, a computer system is described. The computer system is configured to communicate with one or more display generation components and one or more cameras, and comprises: one or more processors; and memory storing one or more programs configured to be executed by the one or more processors, the one or more programs including instructions for: displaying, via the one or more display generation components, a first user interface corresponding to a camera application of the computer system; and while displaying the first user interface corresponding to the camera application of the computer system: in accordance with a determination that the computer system is associated with a head-mounted device separate from the computer system, providing a spatial media capture mode option corresponding to a spatial media capture mode for capturing spatial media that includes a first visual component corresponding to a viewpoint of a right eye and a second visual component different from the first visual component and that corresponds to a viewpoint of a left eye that, when viewed concurrently, create an illusion of a spatial representation of captured visual content; and in accordance with a determination that the computer system is not associated with a head-mounted device separate from the computer system, forgoing providing the spatial media capture mode option.

In some embodiments, a computer system is described. The computer system is configured to communicate with one or more display generation components and one or more cameras, and comprises: means for displaying, via the one or more display generation components, a first user interface corresponding to a camera application of the computer system; and means for, while displaying the first user interface corresponding to the camera application of the computer system: in accordance with a determination that the computer system is associated with a head-mounted device separate from the computer system, providing a spatial media capture mode option corresponding to a spatial media capture mode for capturing spatial media that includes a first visual component corresponding to a viewpoint of a right eye and a second visual component different from the first visual component and that corresponds to a viewpoint of a left eye that, when viewed concurrently, create an illusion of a spatial representation of captured visual content; and in accordance with a determination that the computer system is not associated with a head-mounted device separate from the computer system, forgoing providing the spatial media capture mode option.

In some embodiments, a computer program product is described. The computer program product comprises one or more programs configured to be executed by one or more processors of a computer system that is in communication with one or more display generation components and one or more cameras, the one or more programs including instructions for: displaying, via the one or more display generation components, a first user interface corresponding to a camera application of the computer system; and while displaying the first user interface corresponding to the camera application of the computer system: in accordance with a determination that the computer system is associated with a head-mounted device separate from the computer system, providing a spatial media capture mode option corresponding to a spatial media capture mode for capturing spatial media that includes a first visual component corresponding to a viewpoint of a right eye and a second visual component different from the first visual component and that corresponds to a viewpoint of a left eye that, when viewed concurrently, create an illusion of a spatial representation of captured visual content; and in accordance with a determination that the computer system is not associated with a head-mounted device separate from the computer system, forgoing providing the spatial media capture mode option.

Note that the various embodiments described above can be combined with any other embodiments described herein. The features and advantages described in the specification are not all inclusive and, in particular many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9I illustrate example techniques for displaying a camera preview with a level indicator, in some embodiments.

FIGS. 11A1-11H illustrate example techniques for displaying a camera preview for spatial media capture with prompts to improve capture quality, in some embodiments.

DESCRIPTION OF EMBODIMENTS

Figure 1A:
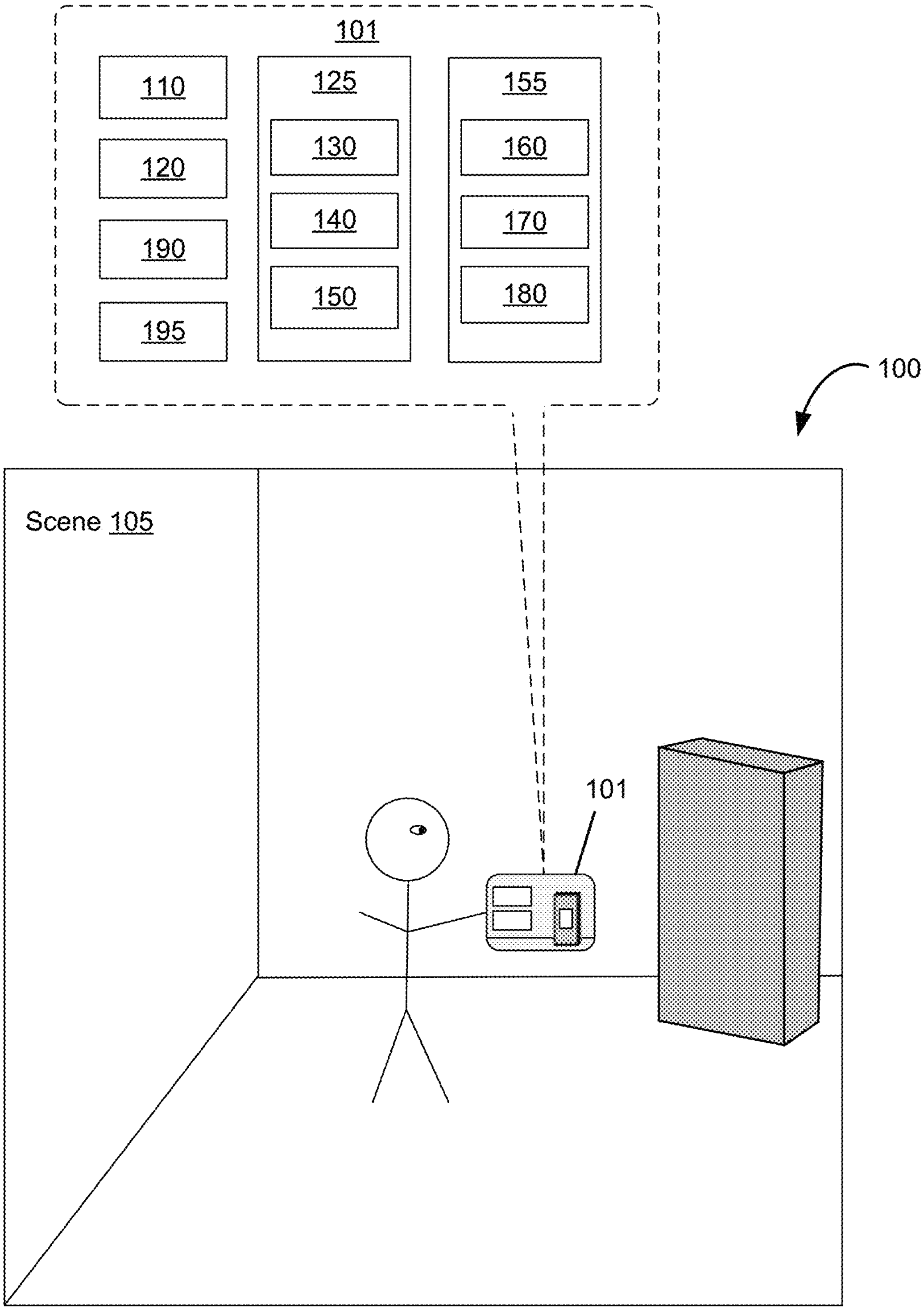
FIG. 1A is a block diagram illustrating an operating environment of a computer system for providing XR experiences in some embodiments.

The present disclosure relates to user interfaces for providing an extended reality (XR) experience to a user, in some embodiments.

The systems, methods, and GUIs described herein improve capturing media with a camera application in multiple ways.

In some embodiments, while displaying a user interface for media capture, a computer system tracks a gaze of a user while detecting potential user inputs (e.g., hardware button presses, inputs on touch sensitive surfaces, and/or air gestures). If the user is gazing at a particular region of the user interface (e.g., a central region) when an input is detected, such as at or near a media capture affordance displayed at the center of the user interface, the computer system initiates media capture, and if the user is not gazing at the particular region of the user interface when an input is detected, the does not initiate media capture. By initiating media capture only if the user is gazing at the particular region when an input is detected, unintended and/or undesirable media captures are reduced, allowing the user to freely interact with the computer system and/or the environment without accidentally capturing media. In addition, initiating media capture only if the user is gazing at the particular region when an input is detected allows the user to efficiently and intuitively capture media when desired, for example, quickly enabling media capture during transient media capture opportunities by gazing at the particular region and providing an input.

In some embodiments, a computer system detects how an orientation of the camera(s) used for media capture (e.g., an orientation of the field-of-view of the camera(s)) changes with respect to a target orientation (e.g., an orientation that is level to the horizon of the environment). In response to detecting a change in the orientation of the camera(s), if the orientation of the camera(s) differs from the target orientation by more than a threshold amount, the computer system displays a level indicator that represents the orientation of the camera(s). Displaying the level indicator when the orientation of the camera(s), and thus of any media captured by the camera(s), differs from the target orientation by more than a threshold amount reduces unintended and/or undesirable media captures by alerting the user when captured media will not appear level. In addition, displaying the level indicator allows the user to efficiently and intuitively compose a media capture with the desired orientation.

In some embodiments, a computer system displays a user interface for spatial media capture, where multiple cameras are used to generate different images for the right and left eye of a user, creating an appearance/illusion of depth (e.g., three-dimensionality, such that the relative distance of objects from the plane of capture can be perceived) in the captured media (e.g., the different images generated for the right eye and left eye of the user mimic the different images of a physical environment received at the right eye and left eye due to the positional differences between the eyes). The computer system detects where a subject of the media capture is located relative to the multiple cameras and determines whether the relative location of the subject will adversely affect the quality of the spatial media capture (e.g., the appearance/illusion of depth). For example, if a subject is located too close to the multiple cameras, the generated images for the left and right eye will differ too much to create a quality appearance/illusion of depth, while if the subject is located too far from the multiple cameras, the generated images for the left and right eye will not differ enough to create a quality appearance/illusion of depth. If the computer system determines that the relative location of the subject will adversely affect the quality of the spatial media capture, the computer system displays a prompt to the user to change the distance from the subject. Displaying the prompt to change the distance reduces unintended and/or undesirable media captures by alerting the user when capturing spatial media will not result in a quality appearance/illusion of depth. In addition, displaying the level indicator allows the user to efficiently and intuitively compose a spatial media capture of the desired quality.

In some embodiments, a computer system displays content in a first region of a user interface. In some embodiments, while the computer system is displaying the content and while a first set of controls are not displayed in a first state, the computer system detects a first input from a first portion of a user. In some embodiments, in response to detecting the first input, and in accordance with a determination that a gaze of the user is directed to a second region of the user interface when the first input is detected, the computer system displays, in the user interface, the first set of one or more controls in the first state, and in accordance with a determination that the gaze of the user is not directed to the second region of the user interface when the first input is detected, the computer system forgoes displaying the first set of one or more controls in the first state.

In some embodiments, a computer system displays content in a user interface. In some embodiments, while displaying the content, the computer system detects a first input based on movement of a first portion of a user of the computer system. In some embodiments, in response to detecting the first input, the computer system displays, in the user interface, a first set of one or more controls, where the first set of one or more controls are displayed in a first state and are displayed within a first region of the user interface. In some embodiments, while displaying the first set of one or more controls in the first state: in accordance with a determination that one or more first criteria are satisfied, including a criterion that is satisfied when attention of the user is directed to the first region of the user interface based on a movement of a second portion of the user that is different from the first portion of the user, the computer system transitions from displaying the first set of one or more controls in the first state to displaying a second set of one or more controls in a second state, where the second state is different from the first state.

Figure 10:
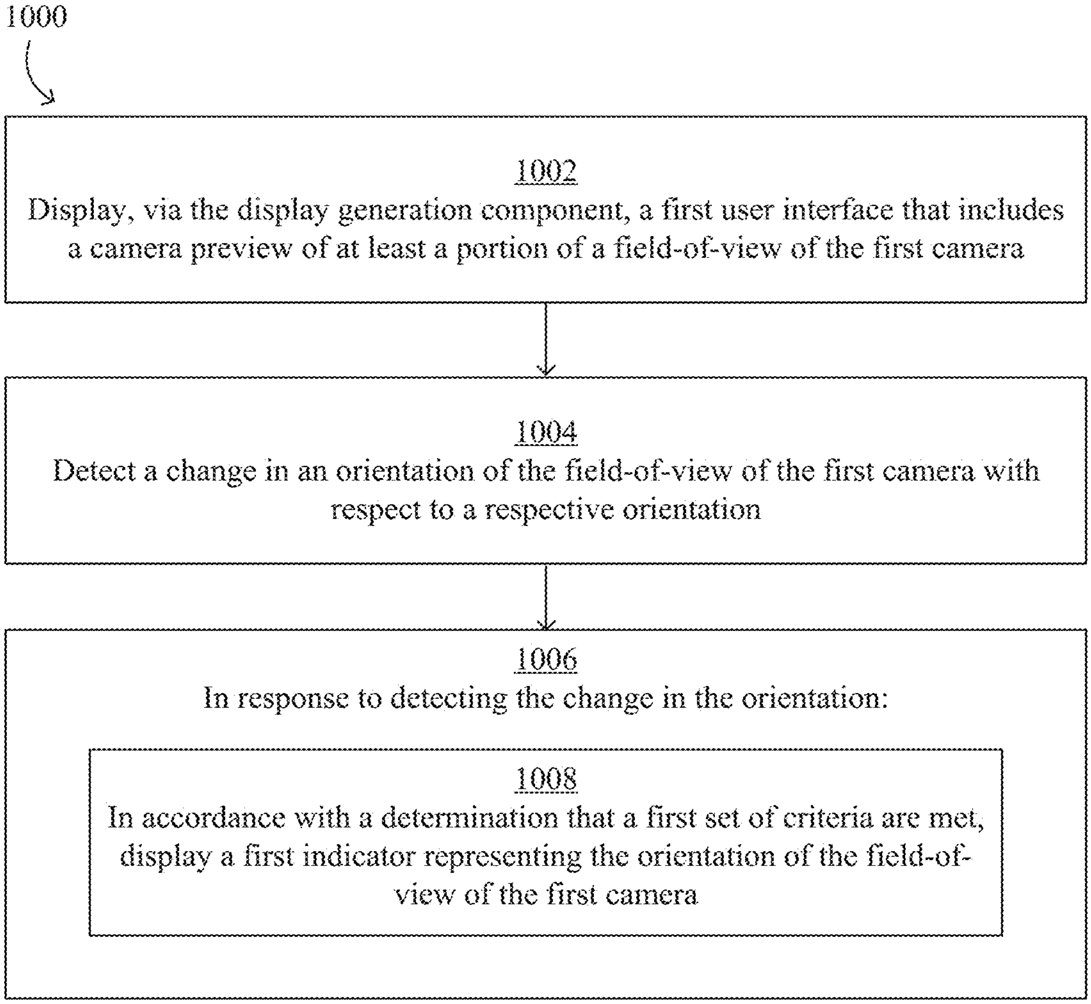
FIG. 10 is a flow diagram of methods of displaying a camera preview with a level indicator, in some embodiments.
Figure 11B:
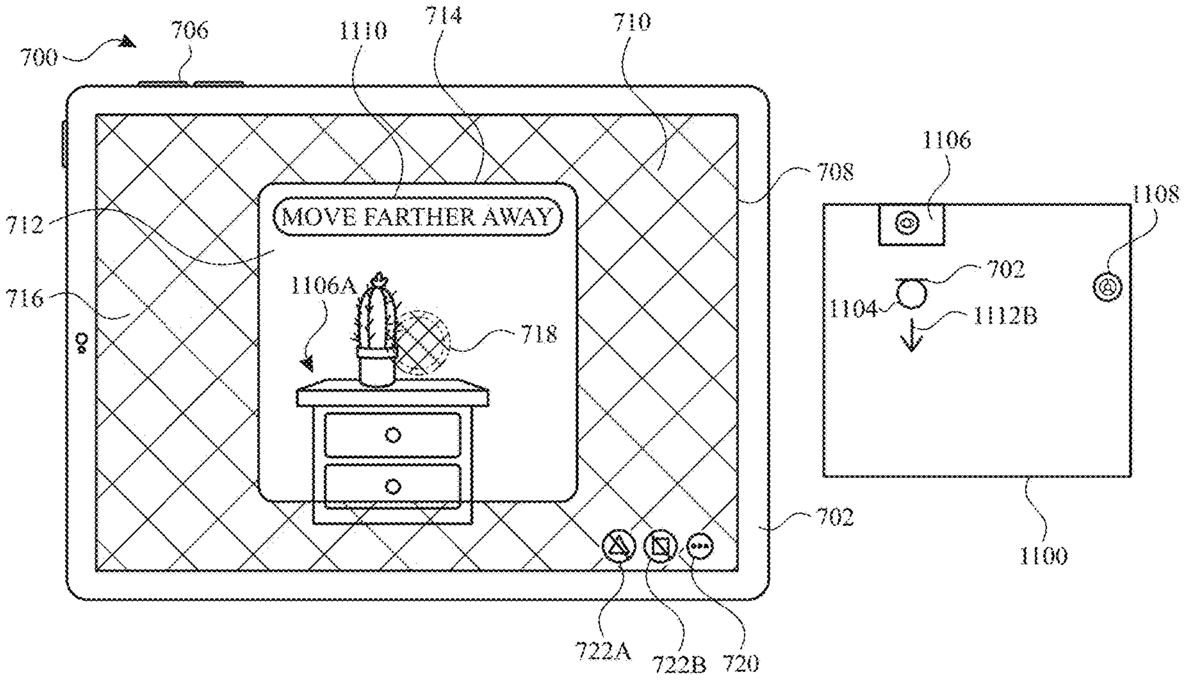
Figure 12:
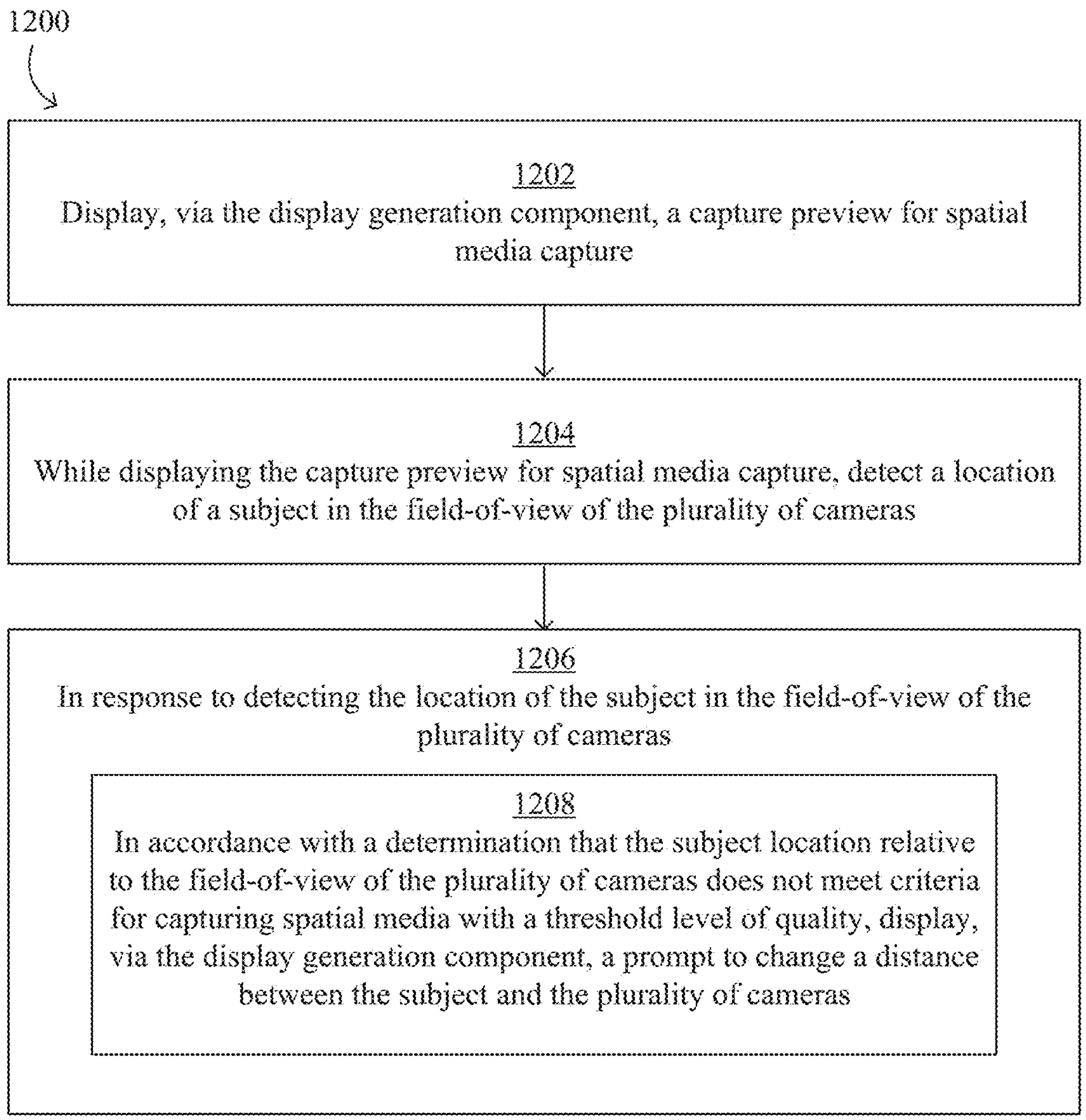
FIG. 12 is a flow diagram of methods of displaying a camera preview for spatial media capture with prompts to improve capture quality, in some embodiments.
Figure 13A:
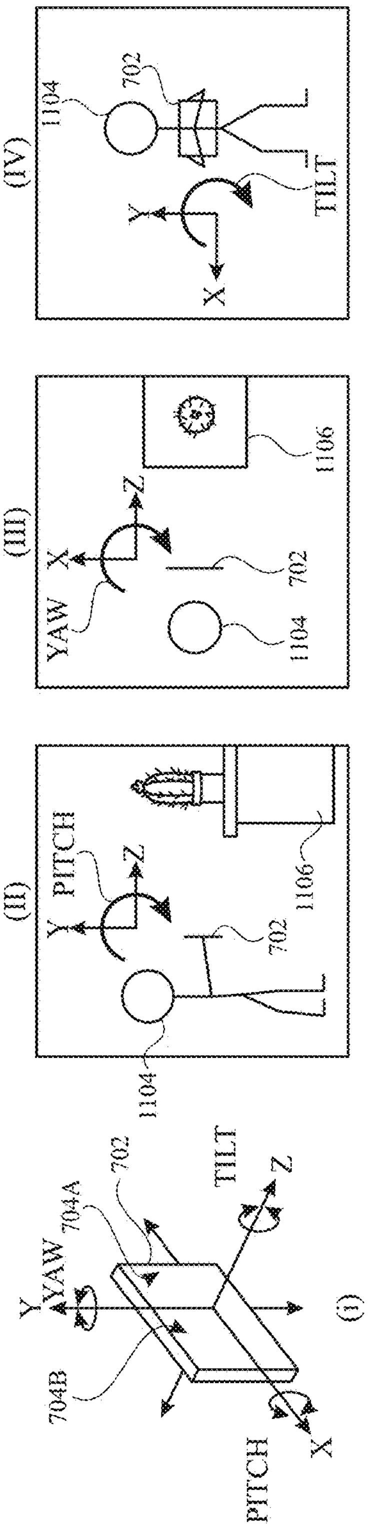
FIGS. 13A-13P illustrate example techniques for displaying a camera preview for media capture with a camera movement indicator, in some embodiments.
Figure 13P:
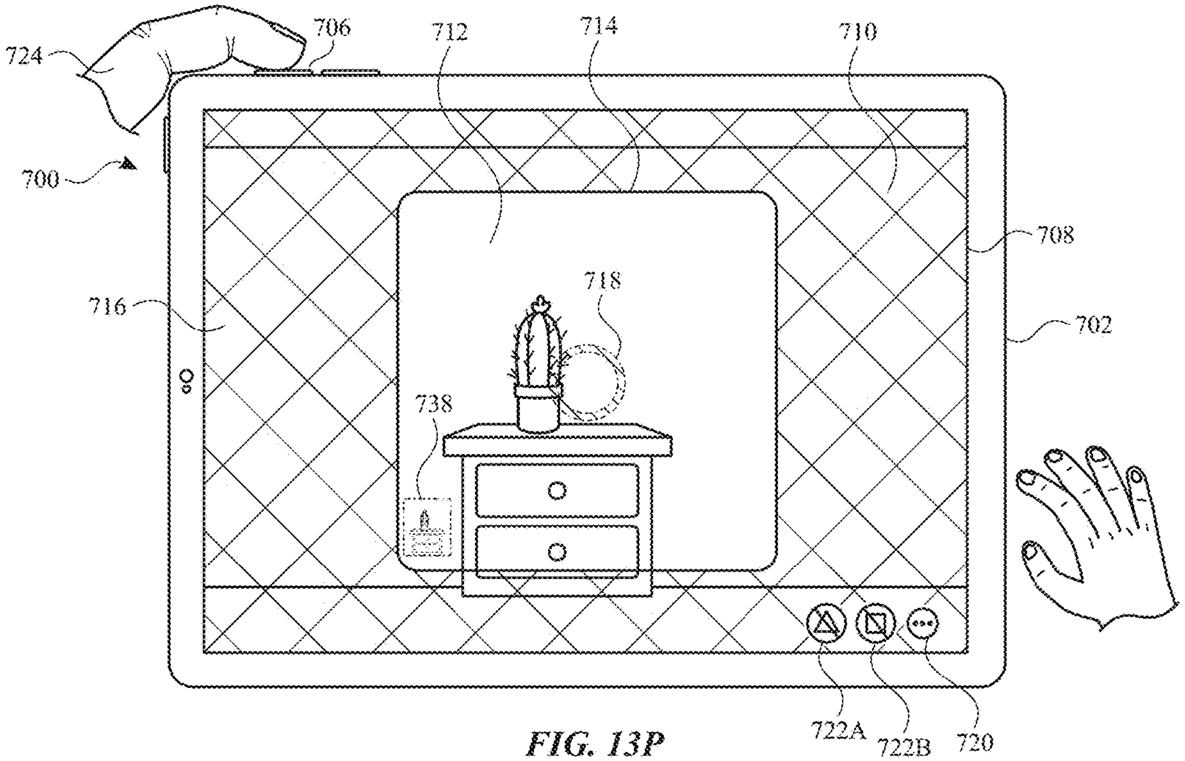
Figure 14:
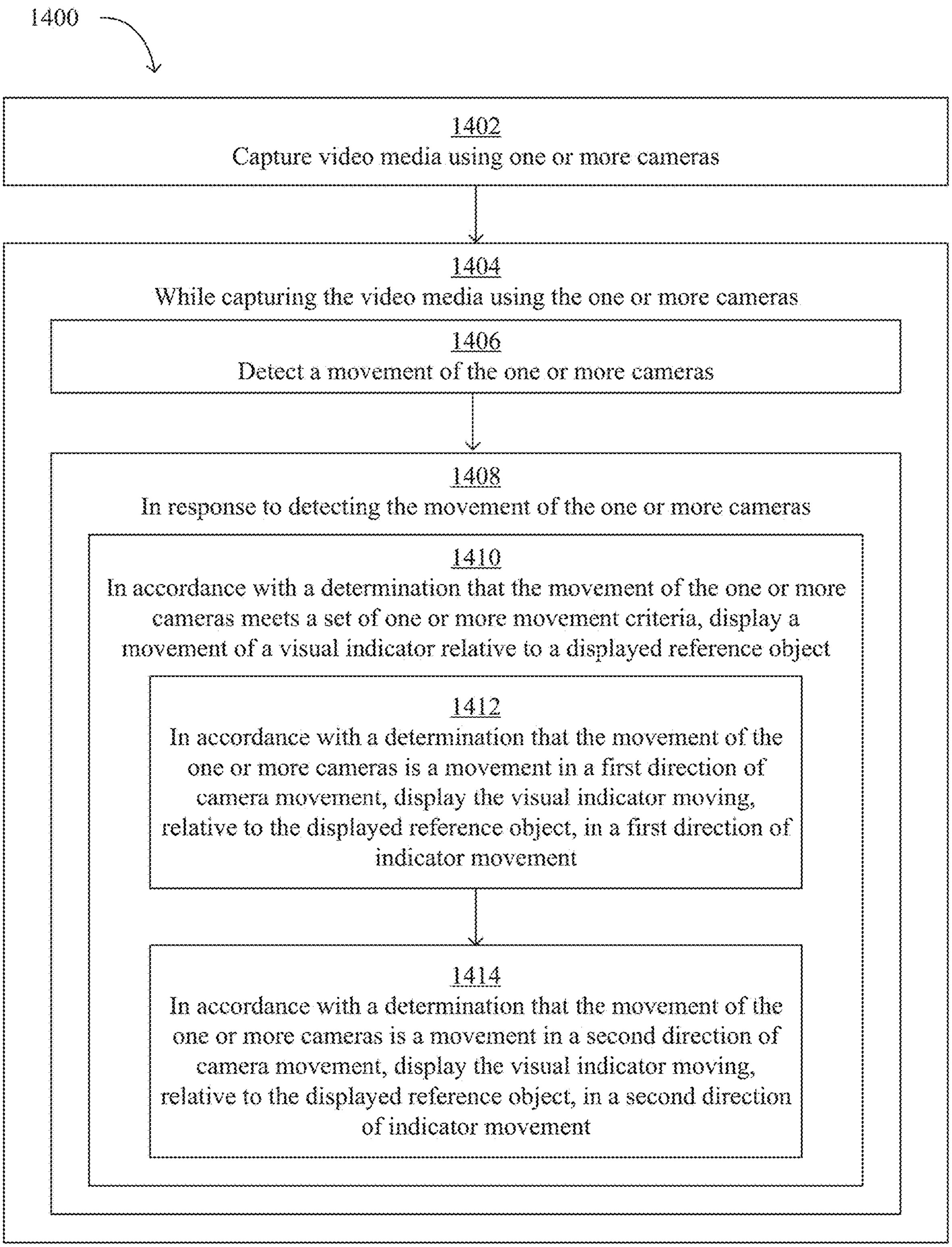
FIG. 14 is a flow diagram of methods of displaying a camera preview for spatial media capture with a camera movement indicator, in some embodiments.
Figure 15A:
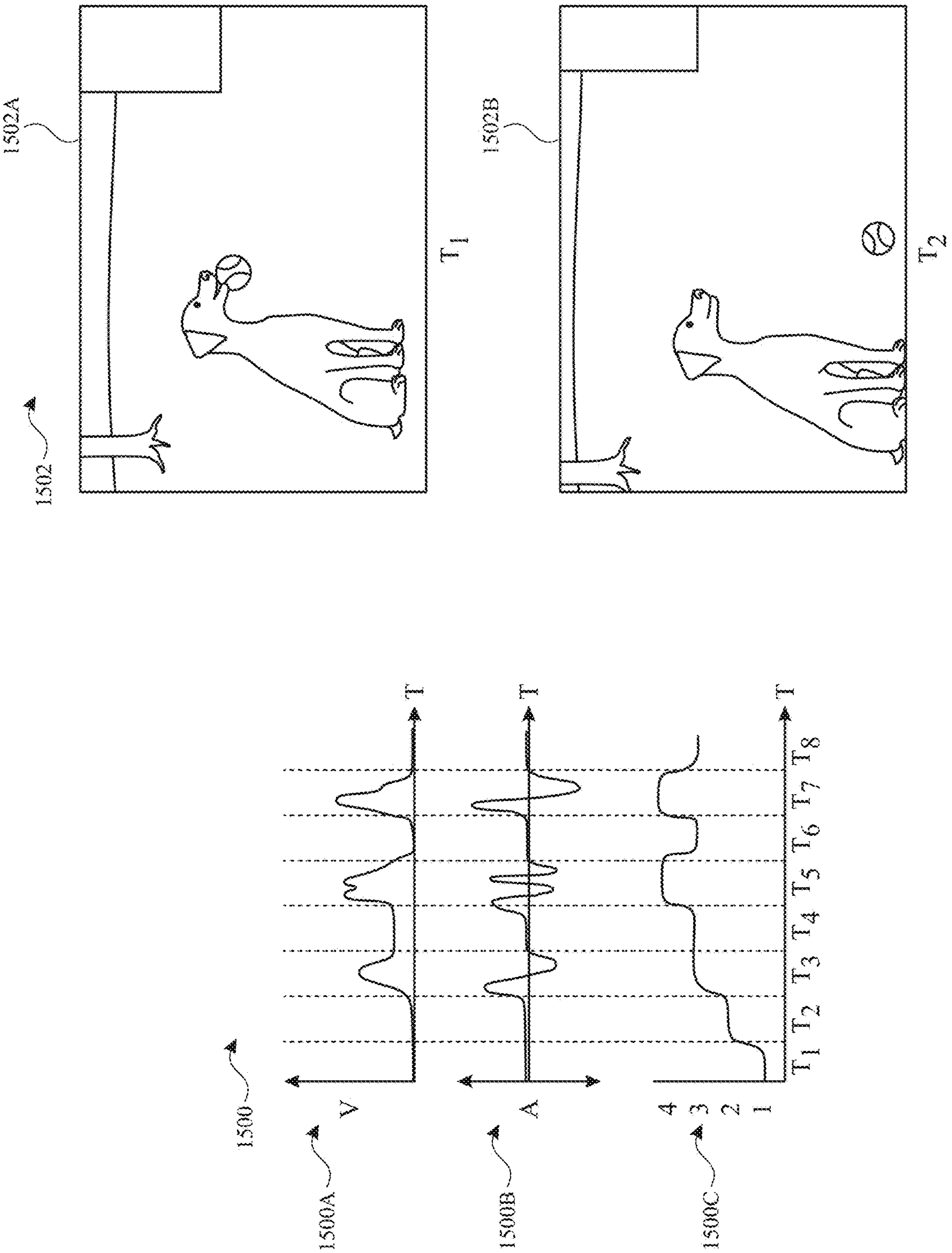
FIGS. 15A-15N illustrate example techniques for modifying video playback to improve viewing comfort, in some embodiments.
Figure 15A:
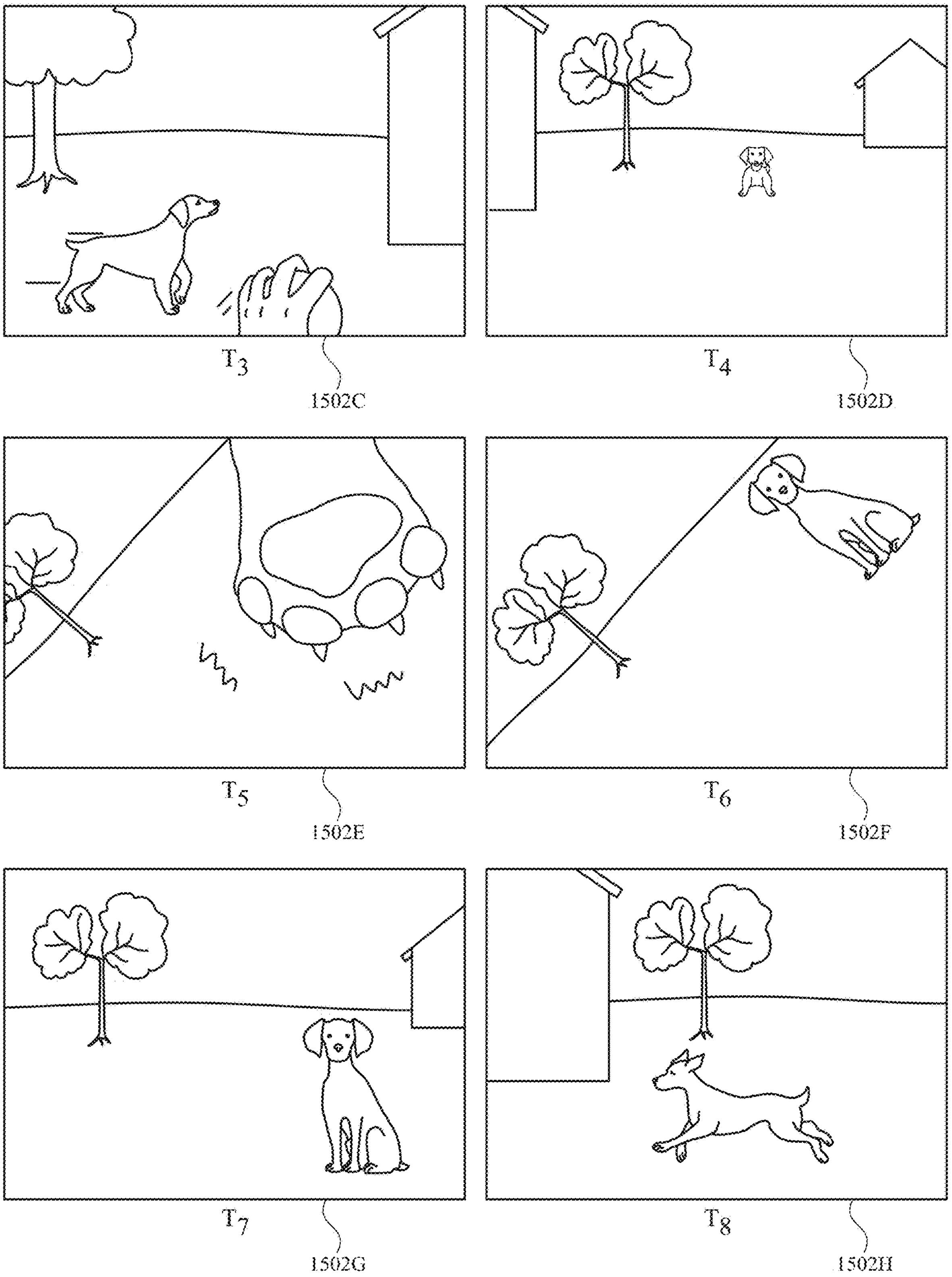
Figure 15B:
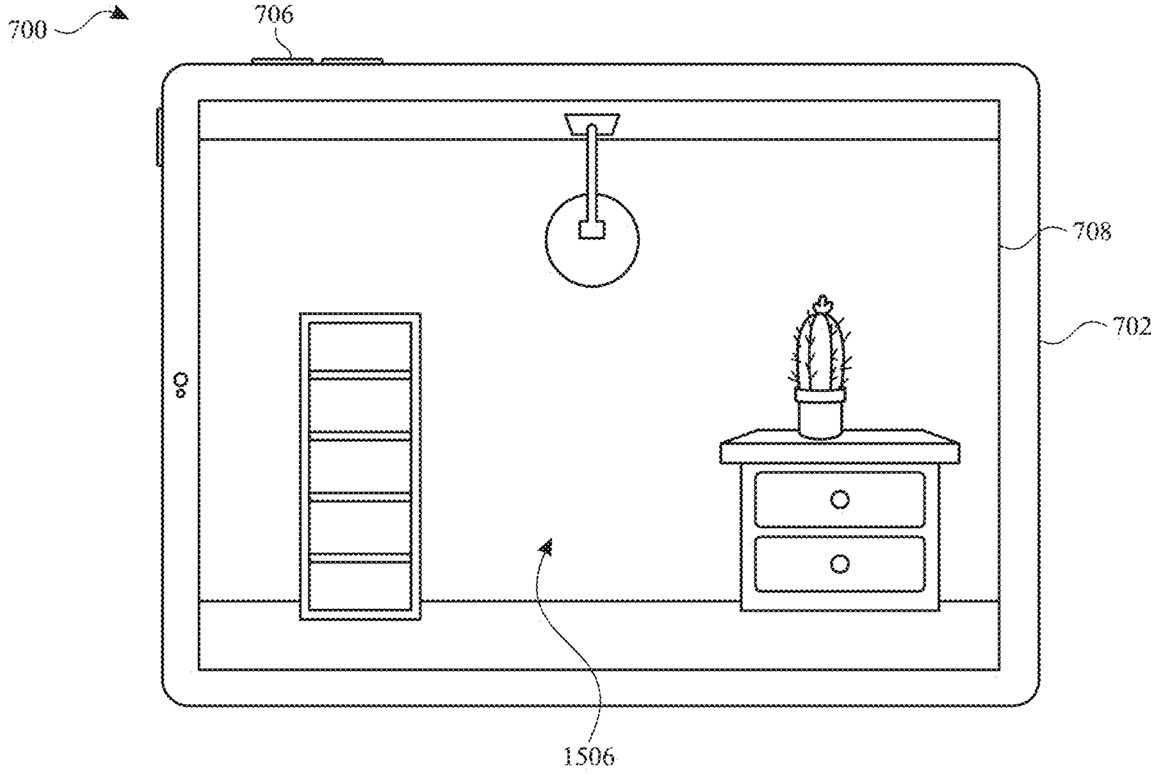
Figure 15N:
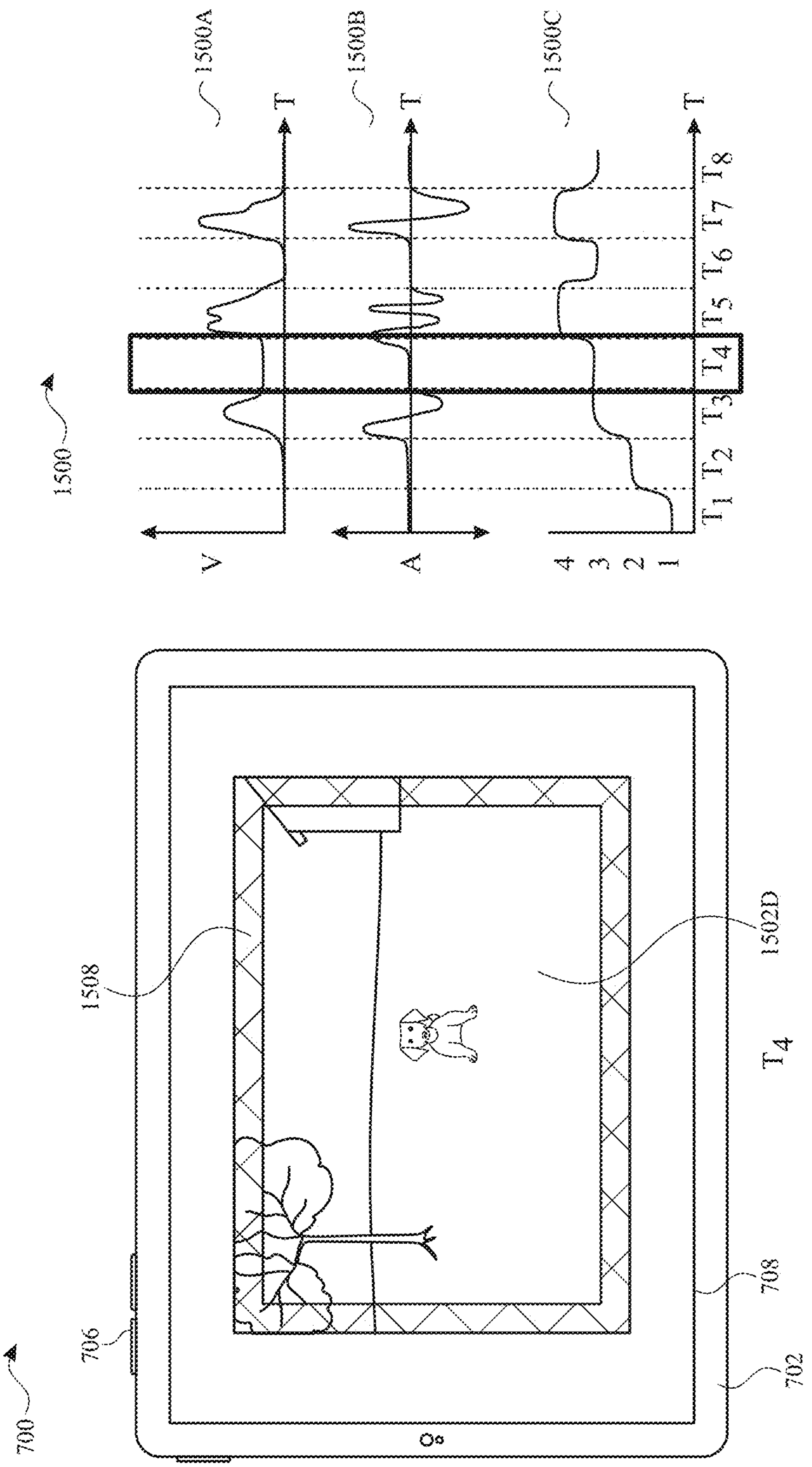
Figure 16:
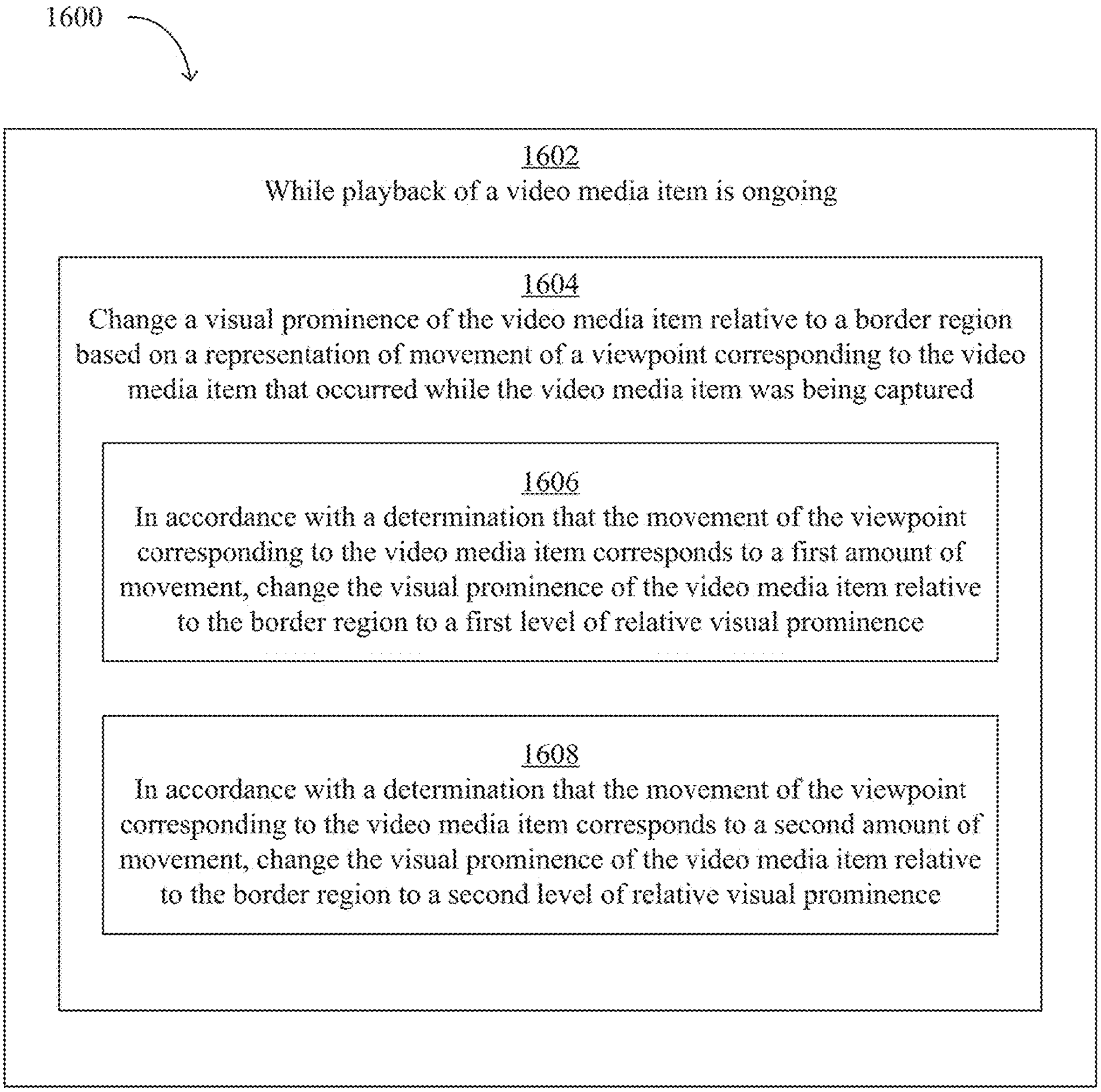
FIG. 16 is a flow diagram of methods of modifying video playback to improve viewing comfort, in some embodiments.
Figure 17A:
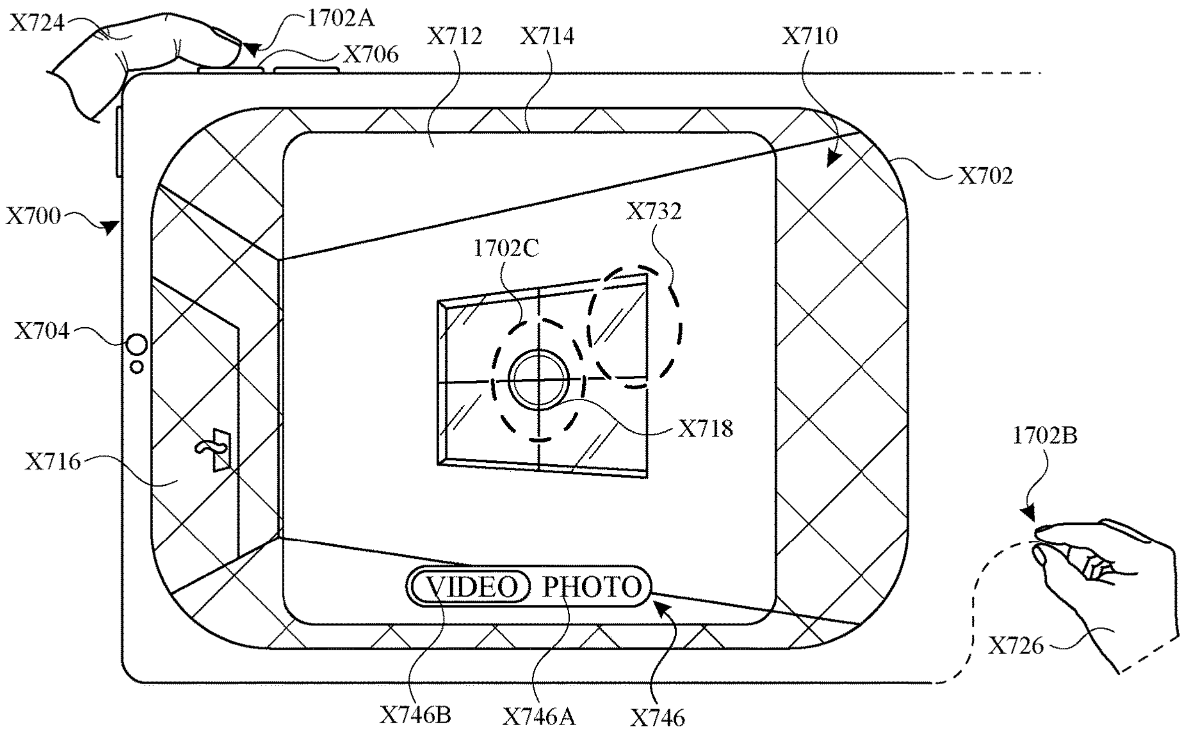
FIGS. 17A-17R illustrate example techniques for displaying a camera preview for media capture with viewpoint stability guidance, in some embodiments.
Figure 17B:
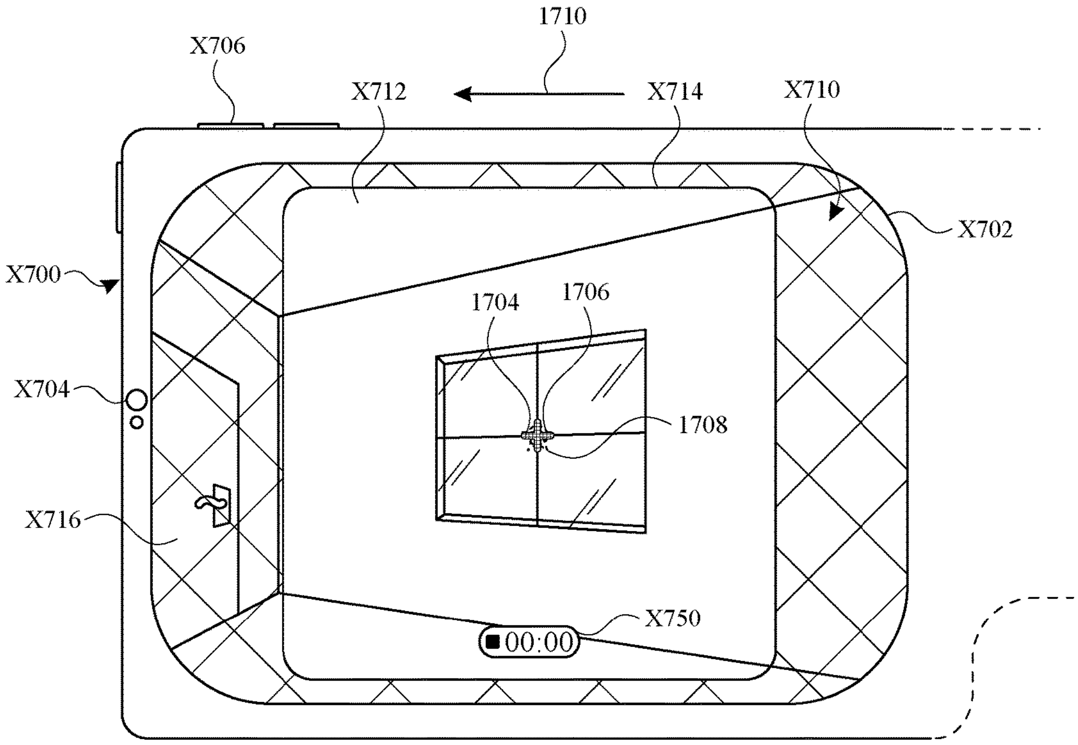
Figure 17C:
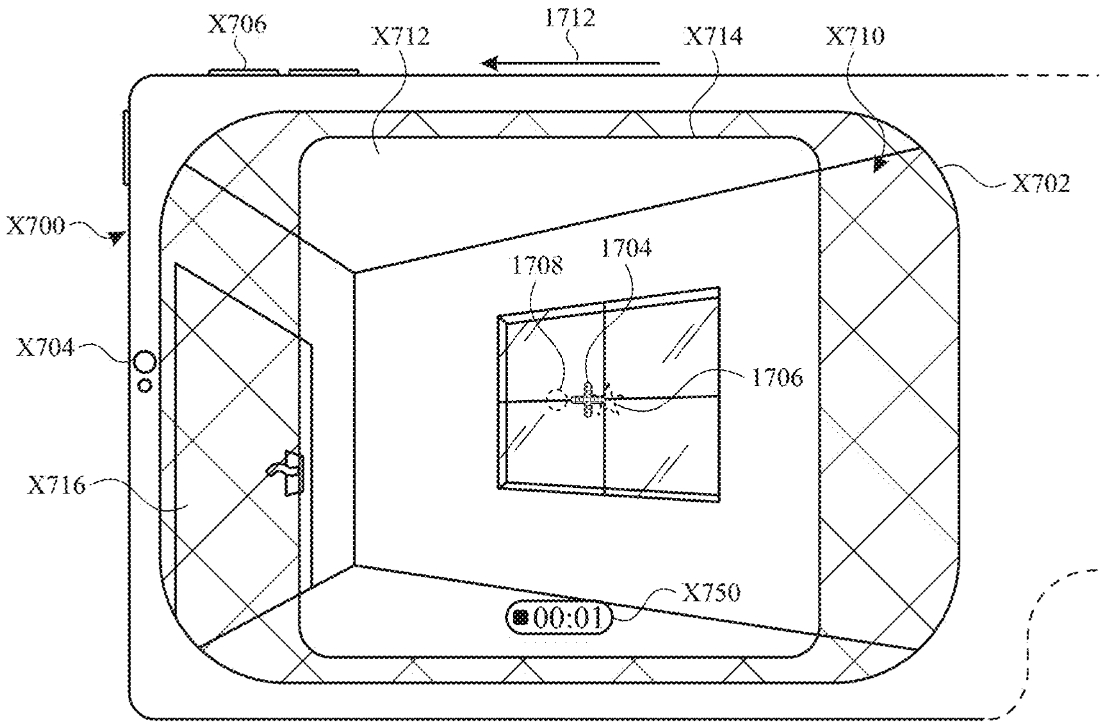
Figure 17R:
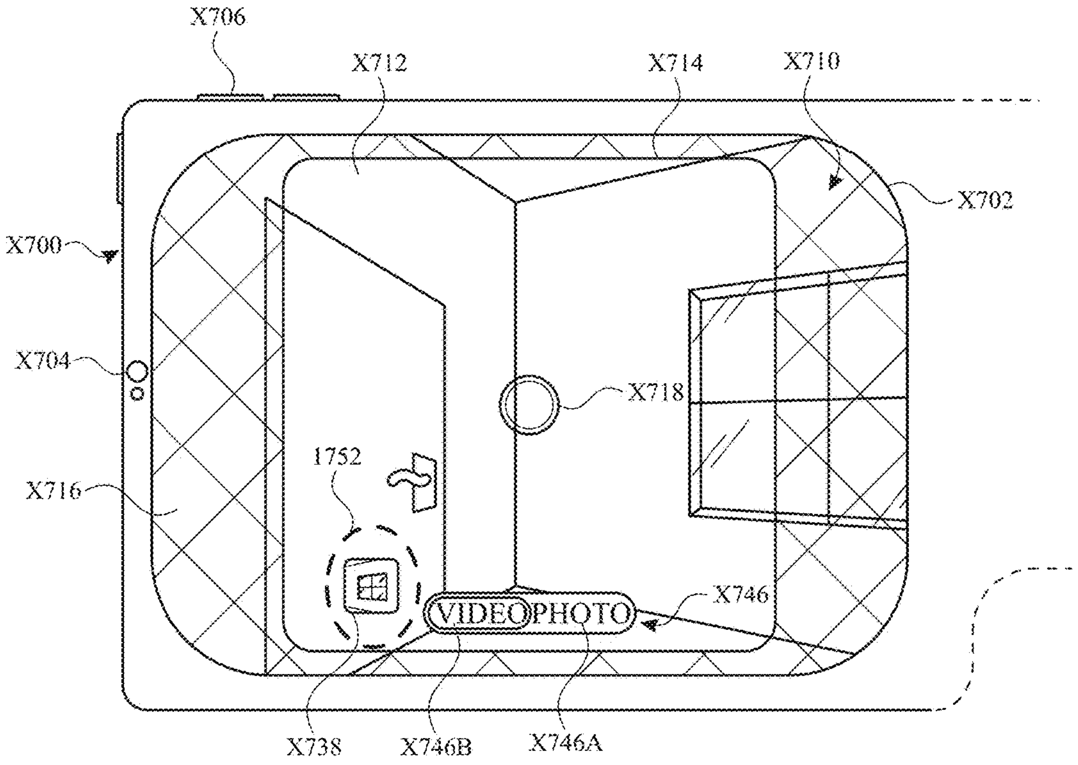
Figure 18:
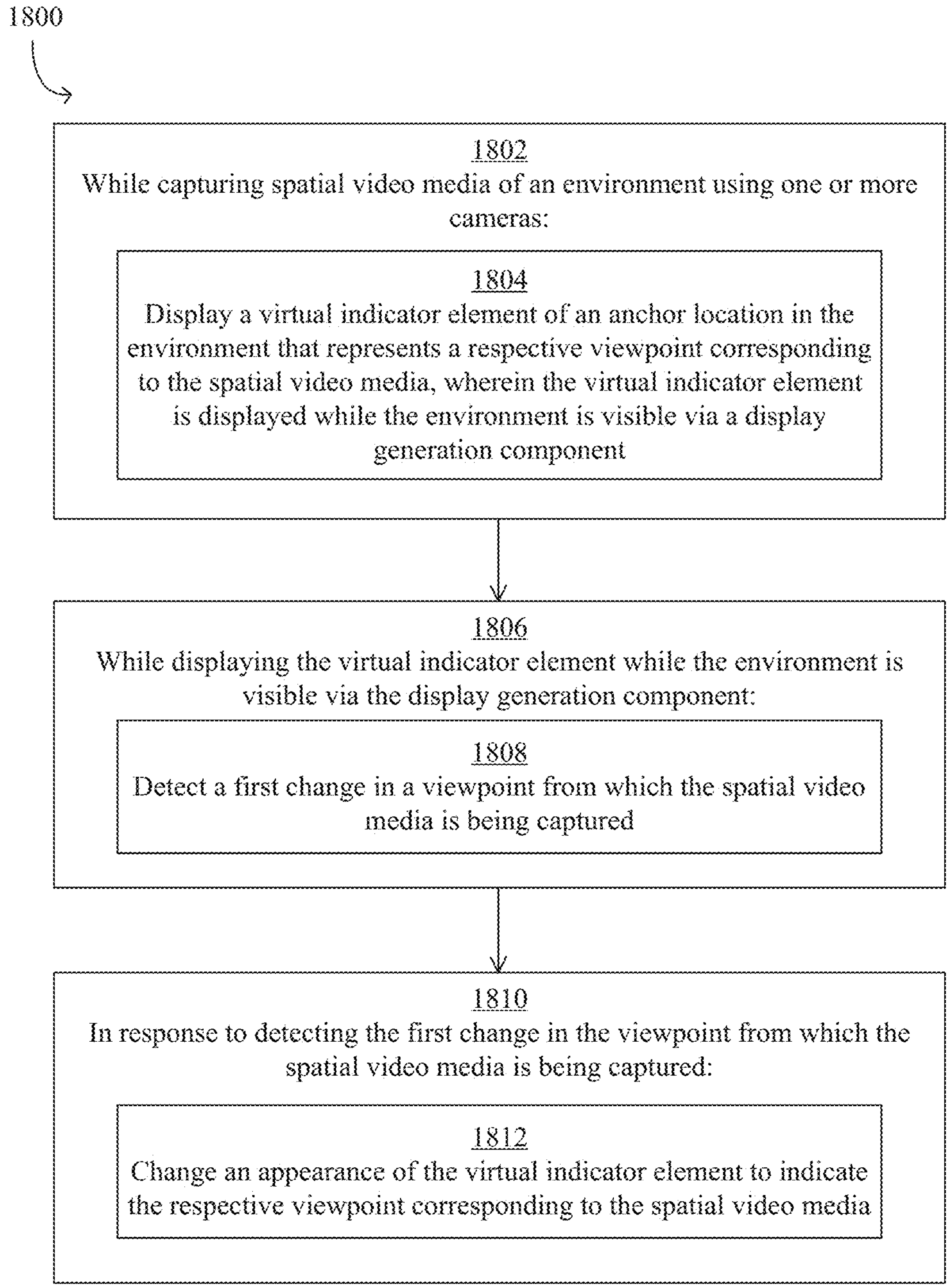
FIG. 18 is a flow diagram of methods of displaying a camera preview for media capture with viewpoint stability guidance, in some embodiments.
Figure 20:
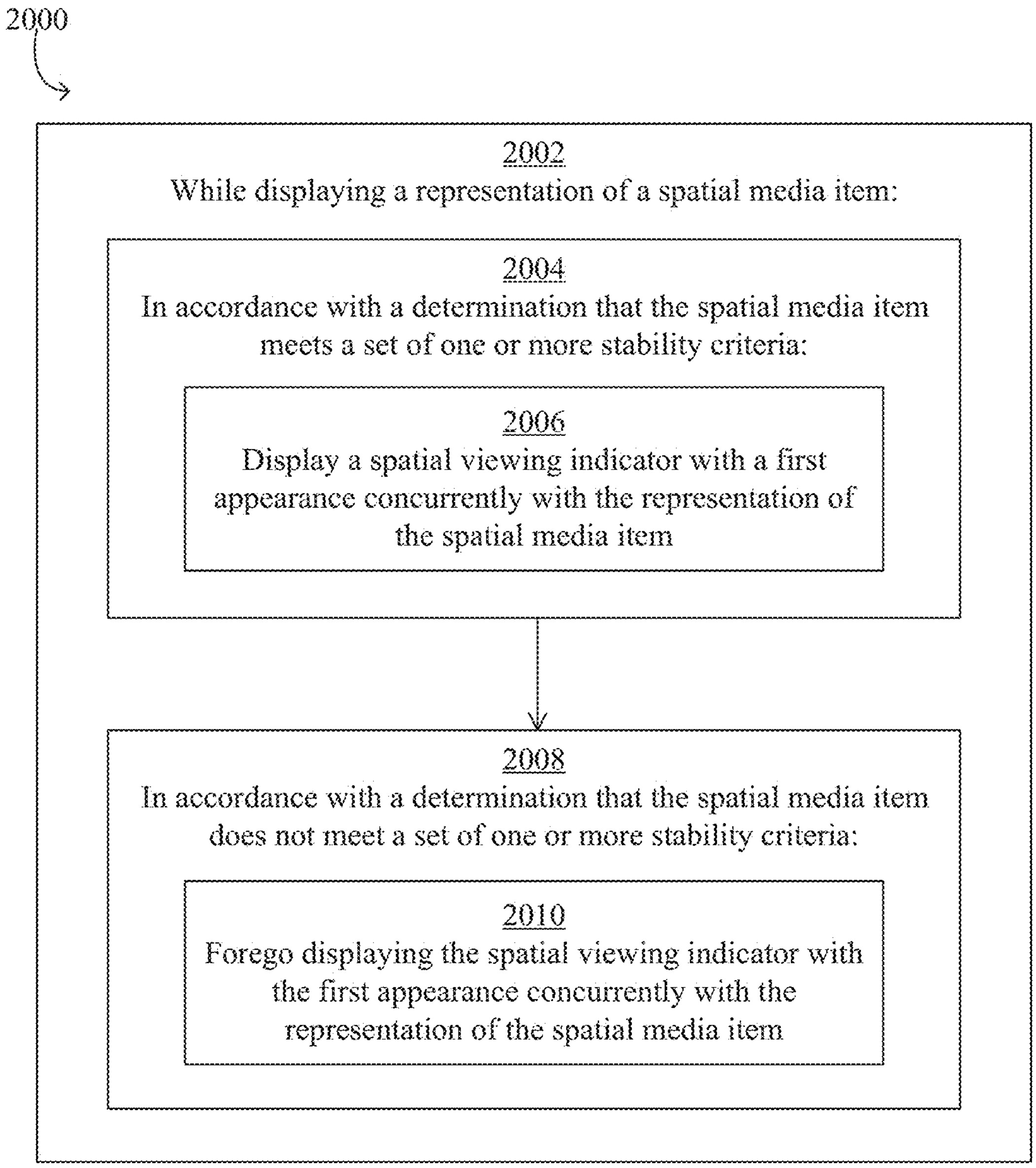
FIG. 20 is a flow diagram of methods of surfacing a view setting for media playback based on media stability characteristics, in some embodiments.
Figure 21B:
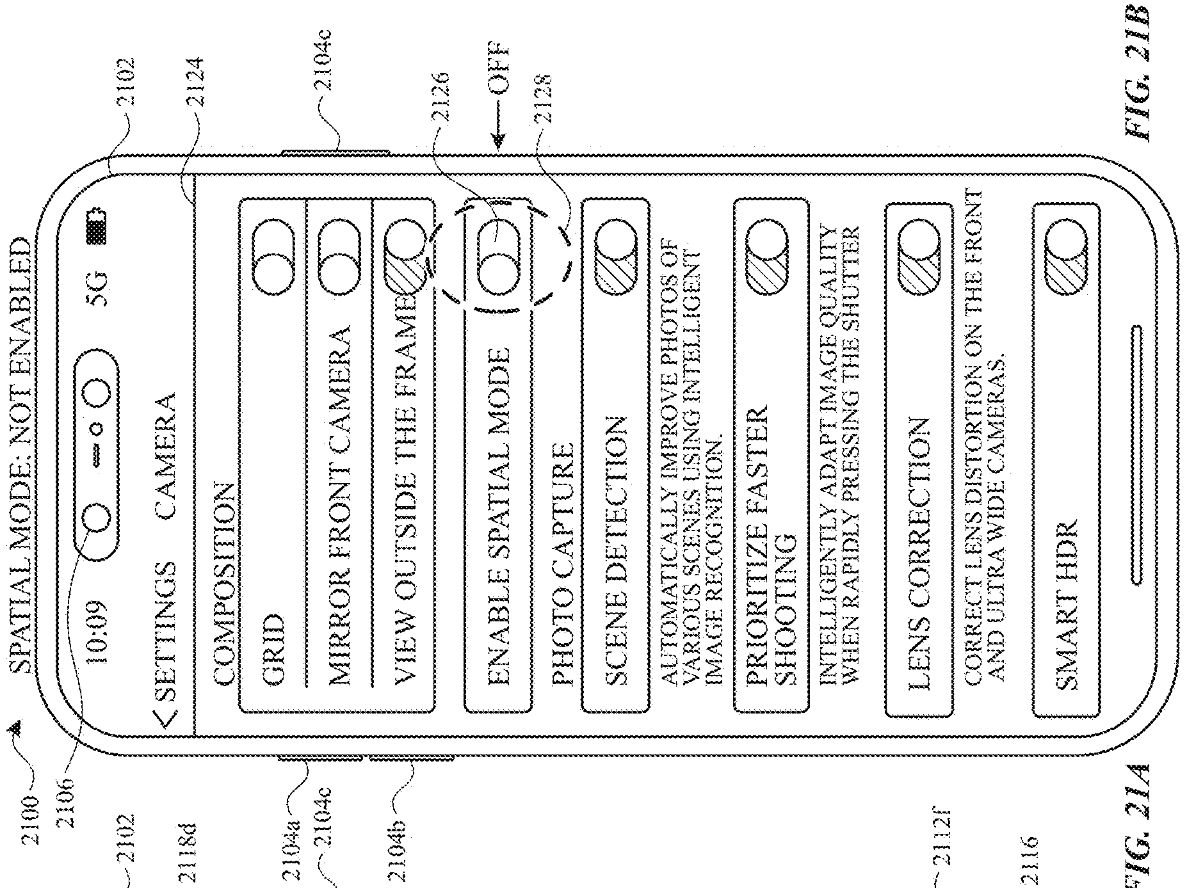
FIGS. 21A-21O illustrate example techniques for displaying one or more camera user interfaces for capture of media, in some embodiments.
Figure 22:
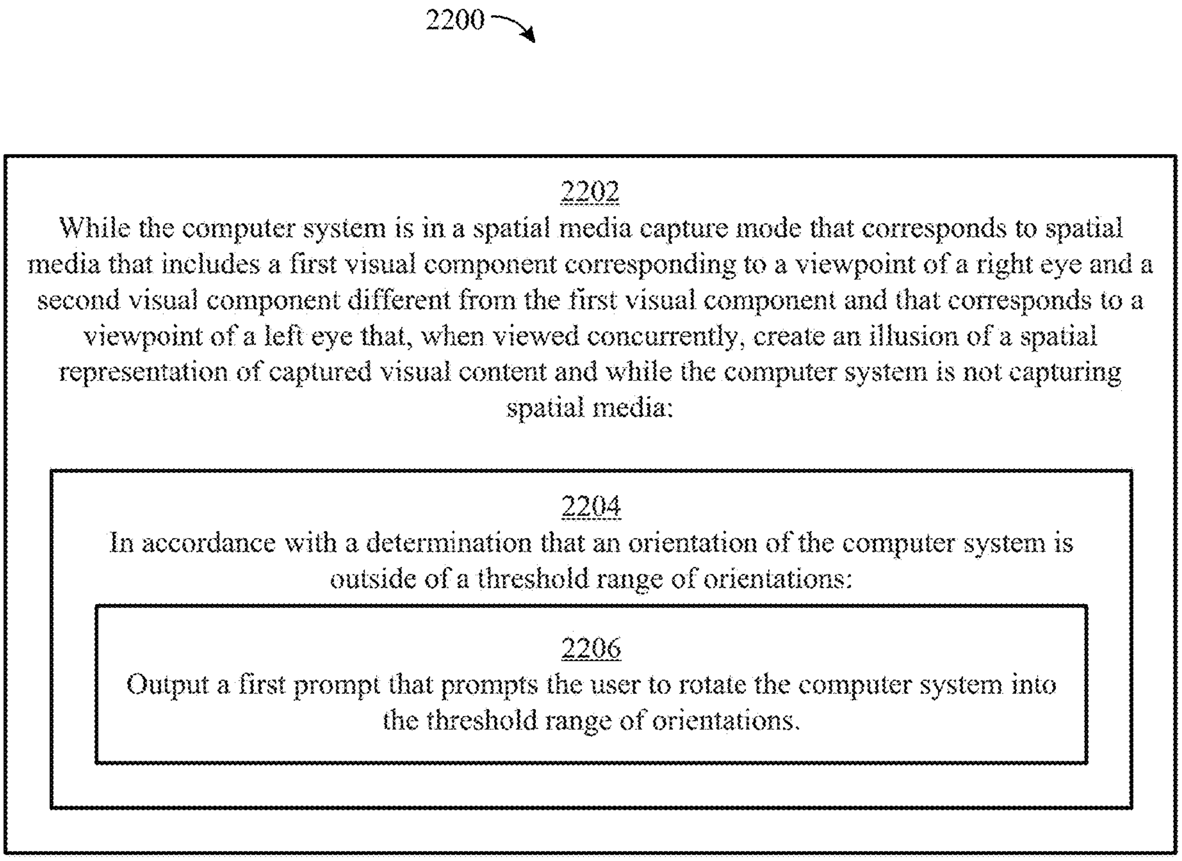
FIG. 22 is a flow diagram of methods of providing a spatial media capture mode, in some embodiments.
Figure 23:
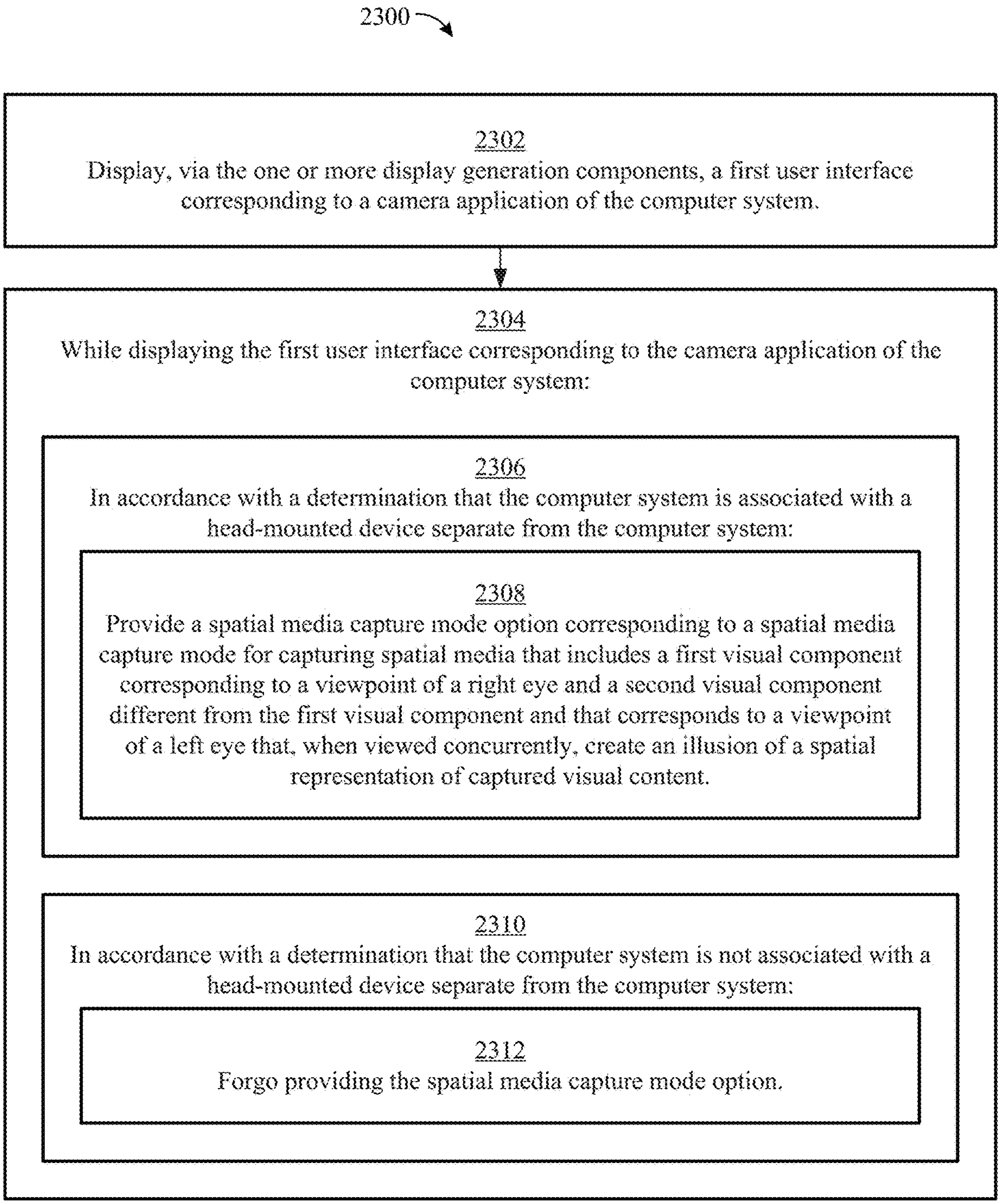
FIG. 23 is a flow diagram of methods of providing a spatial media capture mode option, in some embodiments.

FIGS. 1A-6 provide a description of example computer systems for providing XR experiences to users. FIGS. 7A-7AB illustrate example techniques for displaying a user interface for gaze-activated media capture, in some embodiments. FIG. 8 is a flow diagram of methods of displaying a user interface for gaze-activated media capture, in some embodiments. The user interfaces in FIGS. 7A-7AB are used to illustrate the processes in FIG. 8. FIGS. 9A-9I illustrate example techniques for displaying a camera preview with a level indicator, in some embodiments. FIG. 10 is a flow diagram of methods of displaying a camera preview with a level indicator, in some embodiments. The user interfaces in FIGS. 9A-9I are used to illustrate the processes in FIG. 10. FIGS. 11A1-11H illustrate example techniques for displaying a camera preview for spatial media capture with prompts to improve capture quality, in some embodiments. FIG. 12 is a flow diagram of methods of displaying a camera preview for spatial media capture with prompts to improve capture quality, in some embodiments. FIGS. 13A-13P illustrate example techniques for displaying a camera preview for media capture with a camera movement indicator, in some embodiments. FIG. 14 is a flow diagram of methods of displaying a camera preview for media capture with a camera movement indicator, in some embodiments. The user interfaces in FIGS. 13A-13P are used to illustrate the processes in FIG. 14. FIGS. 15A-15N illustrate example techniques for modifying video playback to improve viewing comfort, in some embodiments. FIG. 16 is a flow diagram of methods of modifying video playback to improve viewing comfort, in some embodiments. The user interfaces in FIGS. 15A-15N are used to illustrate the processes in FIG. 16. FIGS. 17A-17R illustrate example techniques for displaying a camera preview for media capture with viewpoint stability guidance, in some embodiments. FIG. 18 is a flow diagram of methods of displaying a camera preview for media capture with viewpoint stability guidance, in some embodiments. The user interfaces in FIGS. 17A-17R are used to illustrate the processes in FIG. 18. FIGS. 19A-19M illustrate example techniques for surfacing a view setting for media playback based on media stability characteristics, in some embodiments. FIG. 20 is a flow diagram of methods of surfacing a view setting for media playback based on media stability characteristics, in some embodiments. The user interfaces in FIGS. 19A-19M are used to illustrate the processes in FIG. 20. FIGS. 21A-21O illustrate example techniques for displaying one or more camera user interfaces for capture of media, in some embodiments. FIG. 22 is a flow diagram of methods of providing a spatial media capture mode, in some embodiments. FIG. 23 is a flow diagram of methods of providing a spatial media capture mode option, in some embodiments. The user interfaces in FIGS. 21A-21O are used to illustrate the processes in FIG. 22 and FIG. 23.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
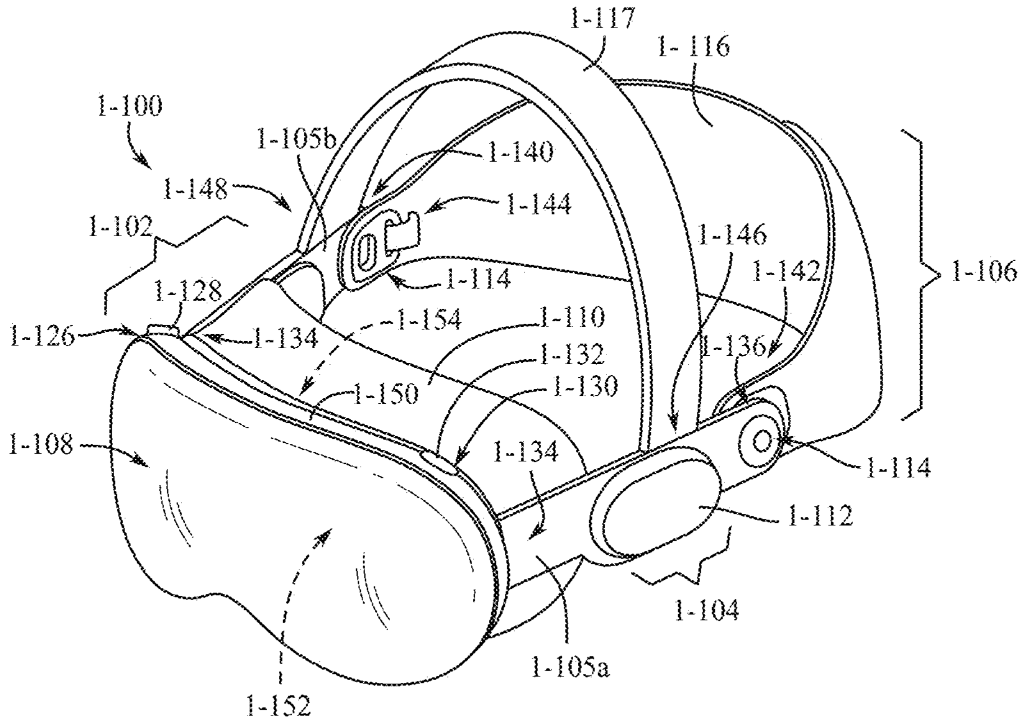
FIGS. 1B-1P are examples of a computer system for providing XR experiences in the operating environment of FIG. 1A.
Figure 1C:
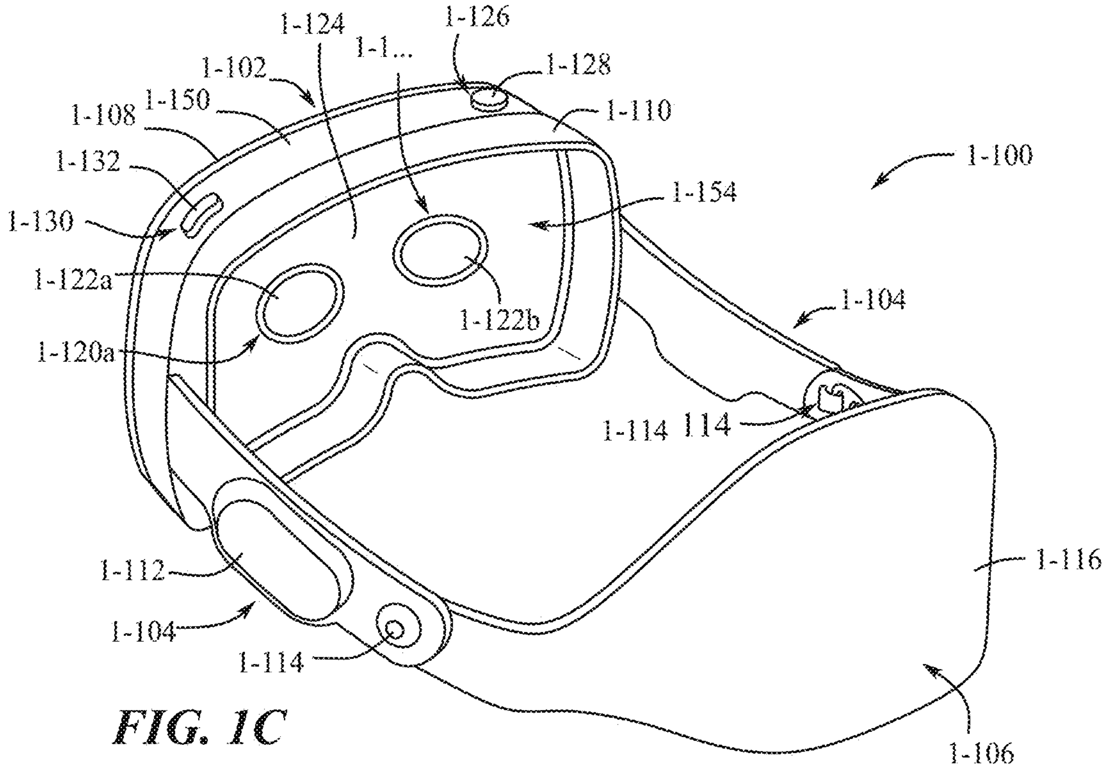
Figure 1D:
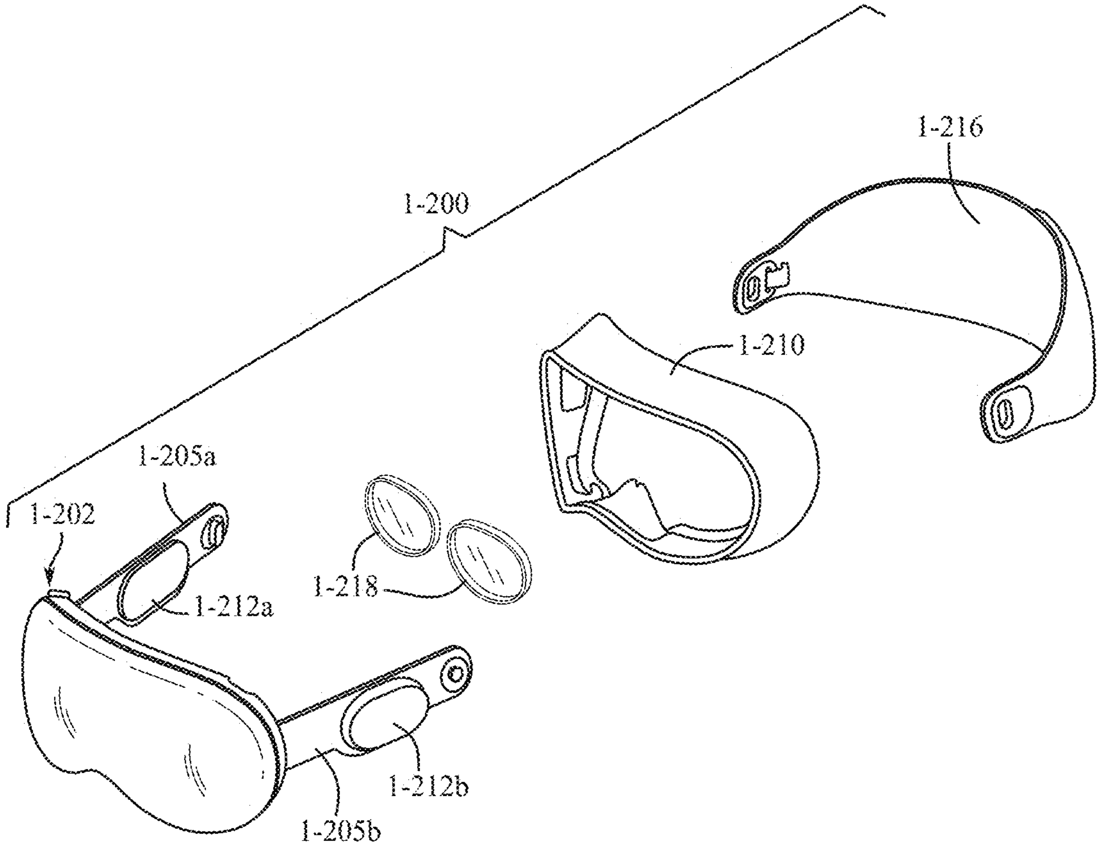
Figure 1E:
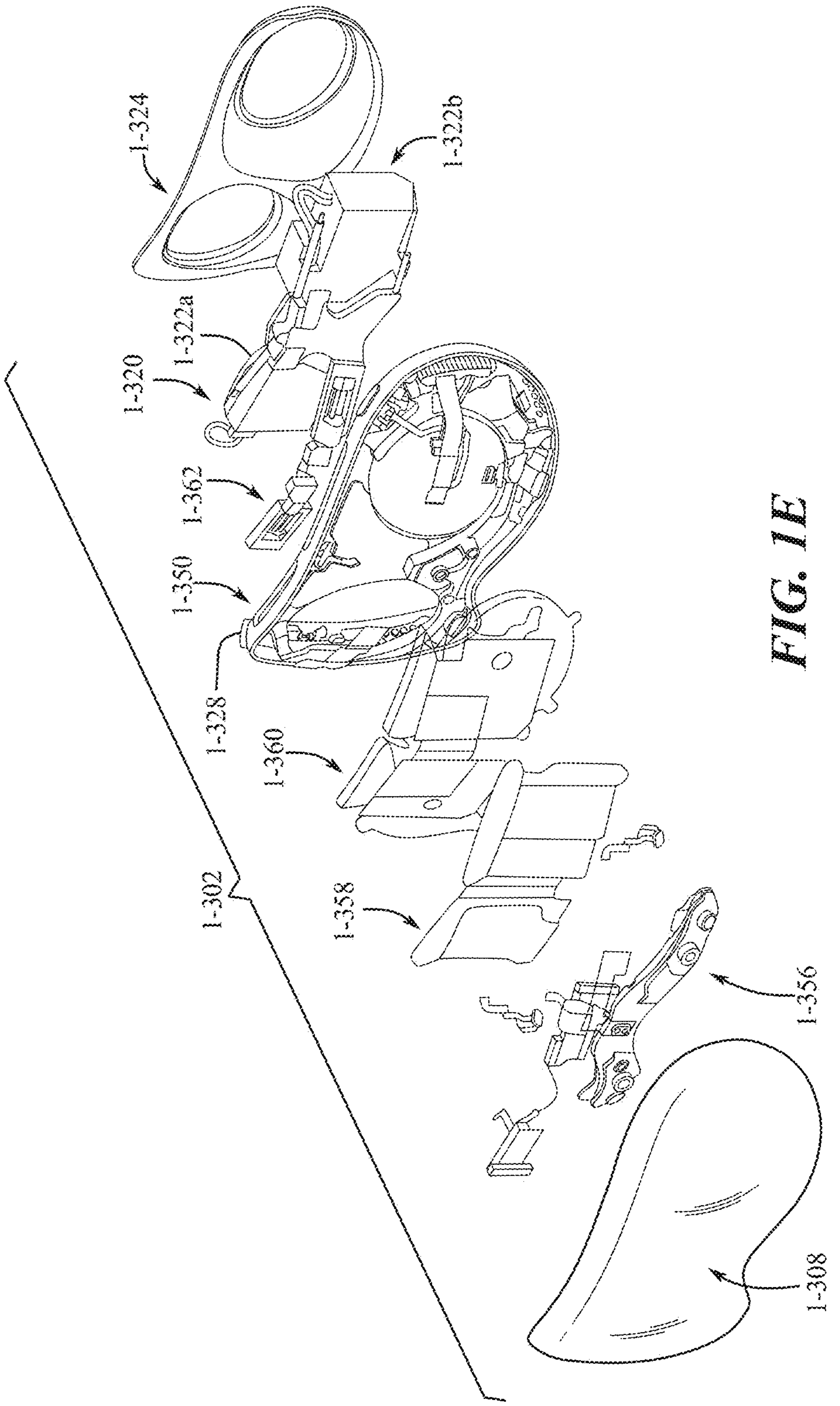
Figure 1F:
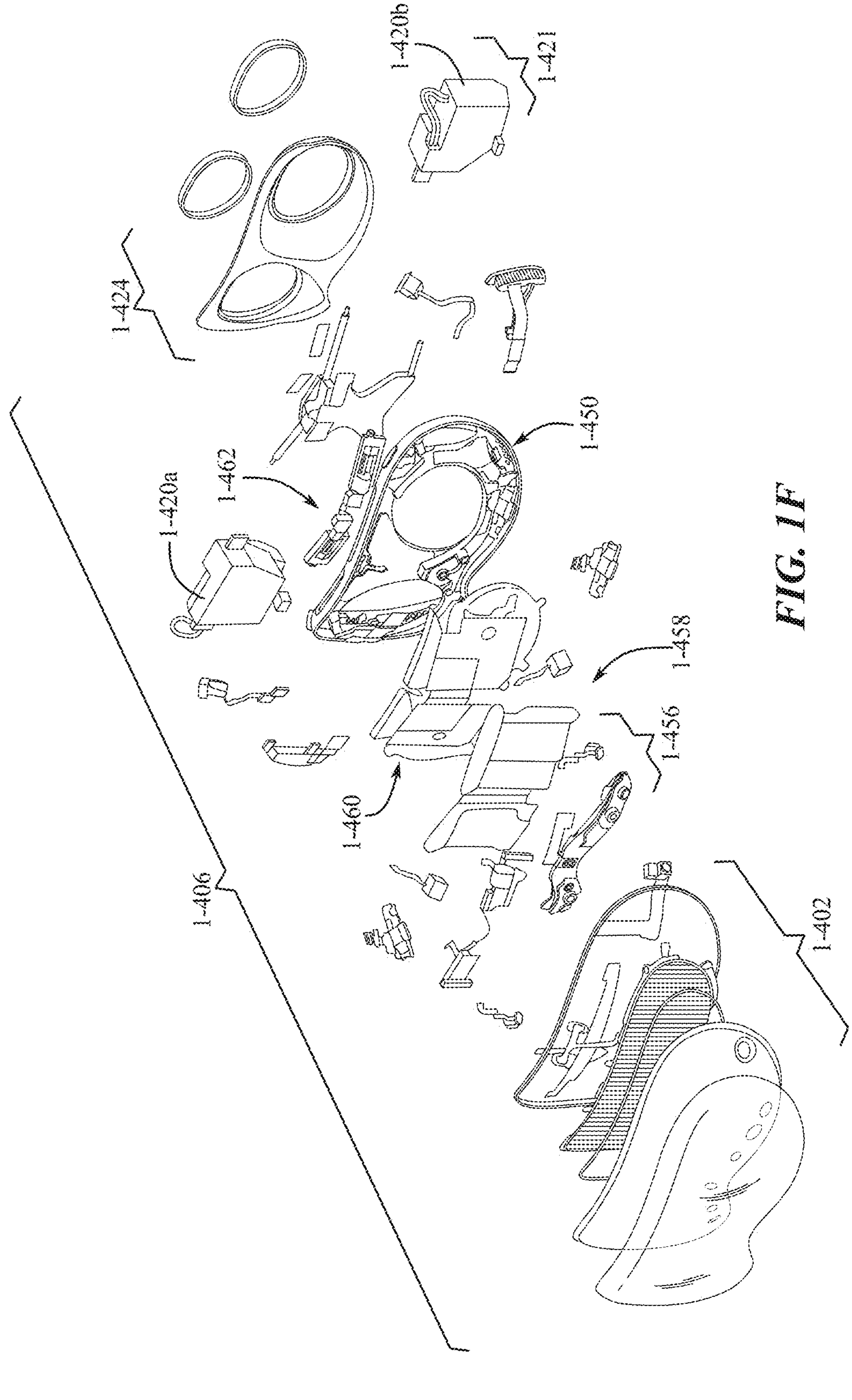
Figure 1G:
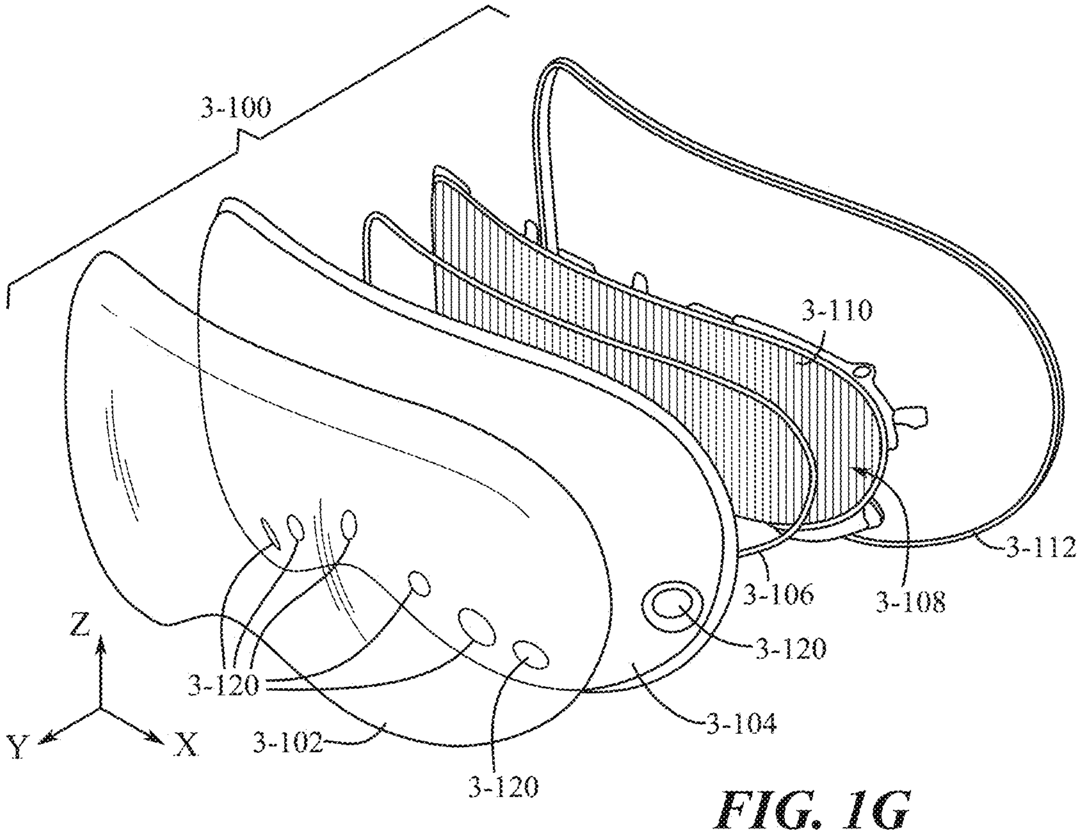
Figure 1H:
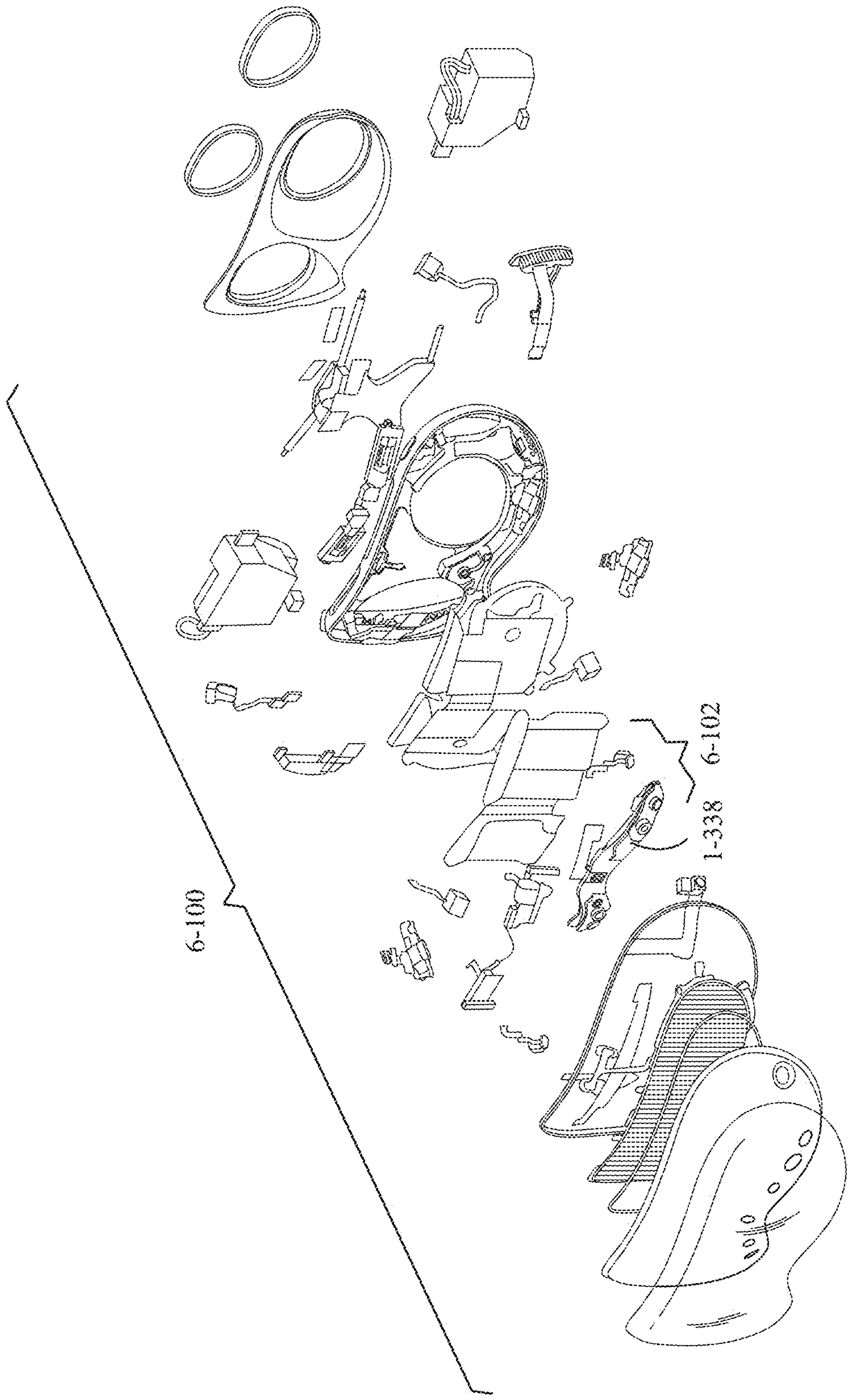
Figure 1I:
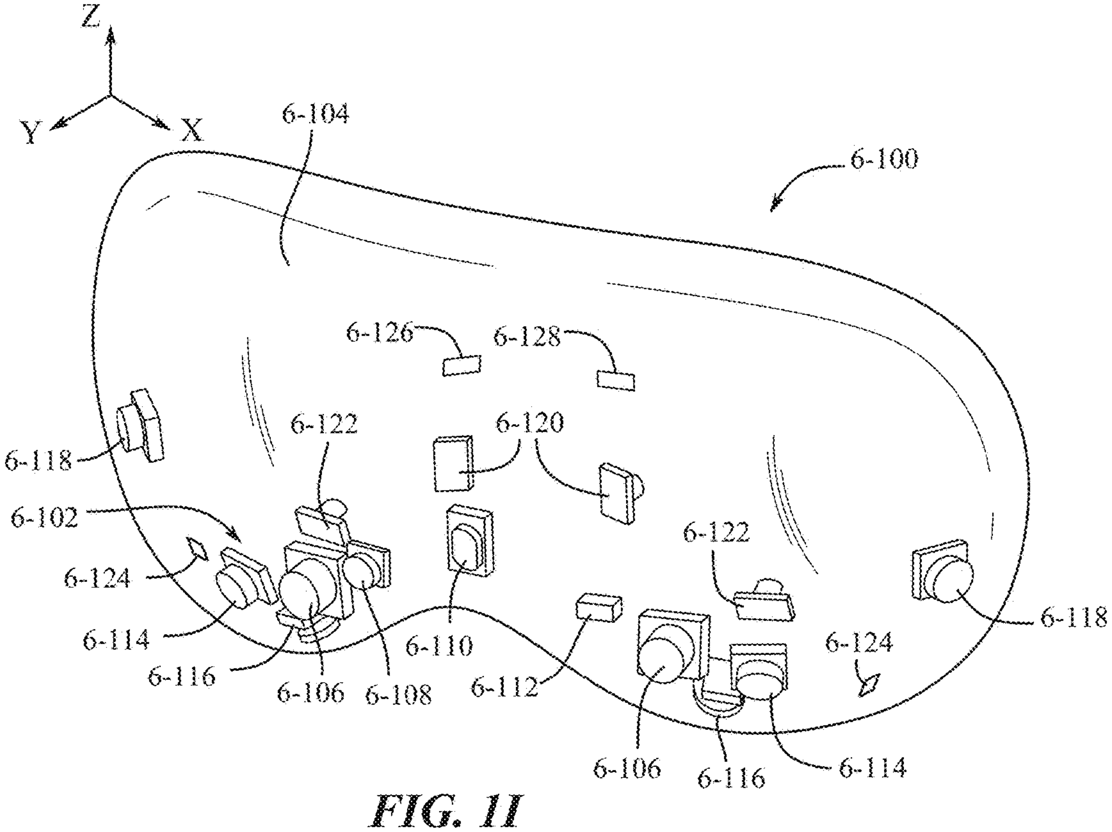
Figure 1J:
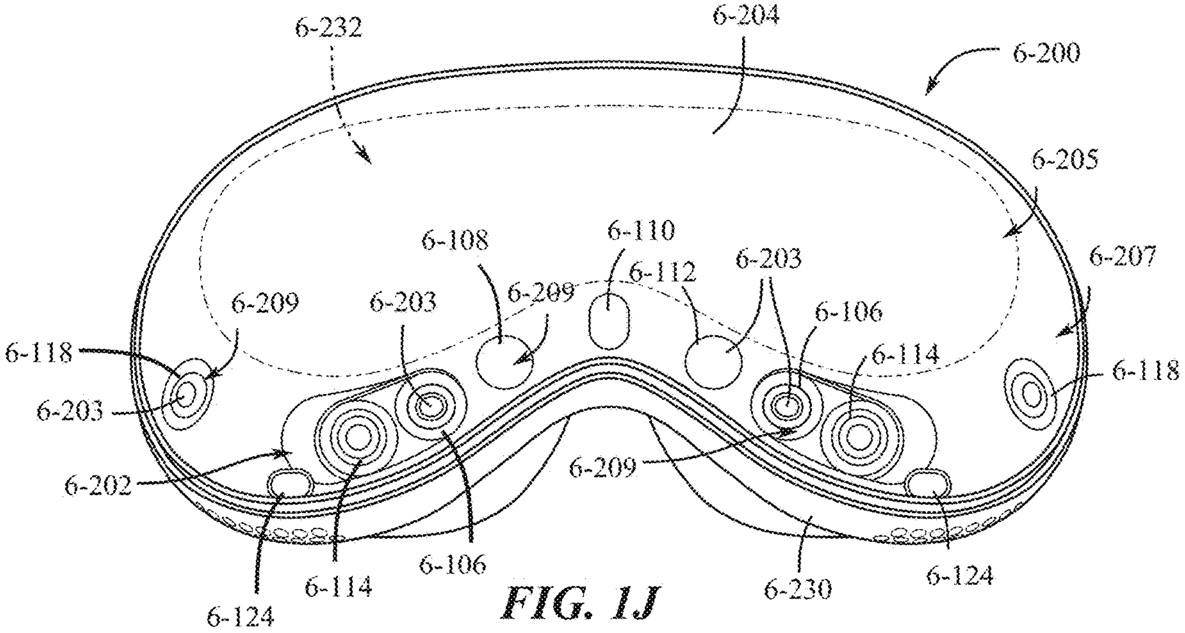
Figure 1K:
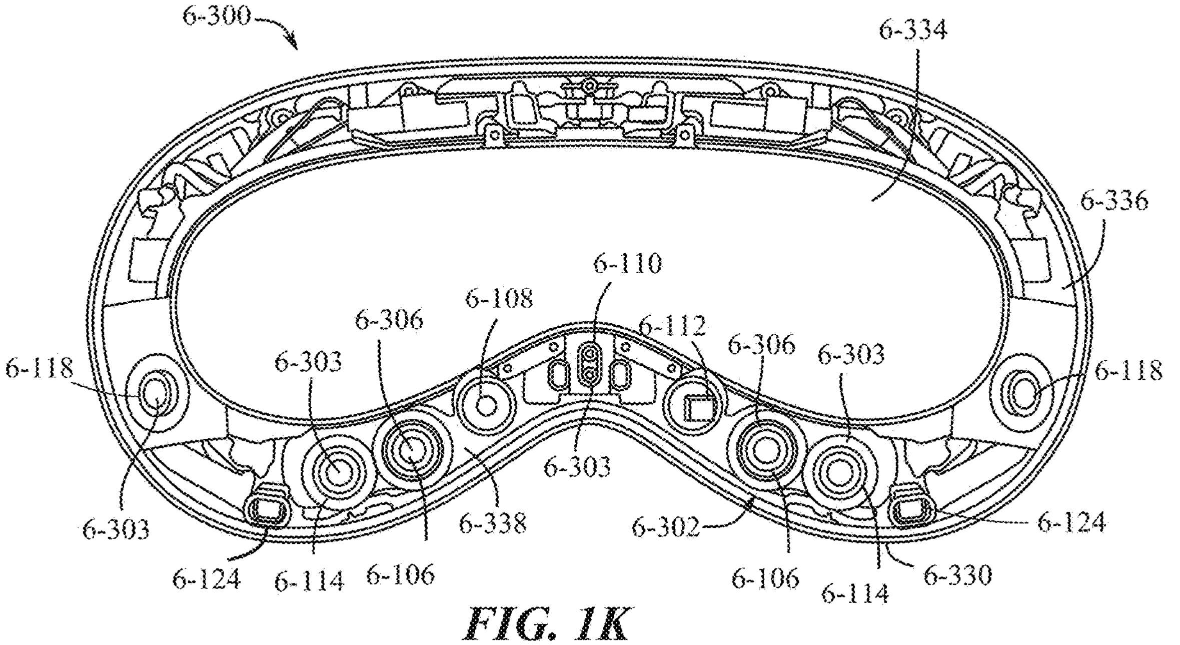
Figure 1L:
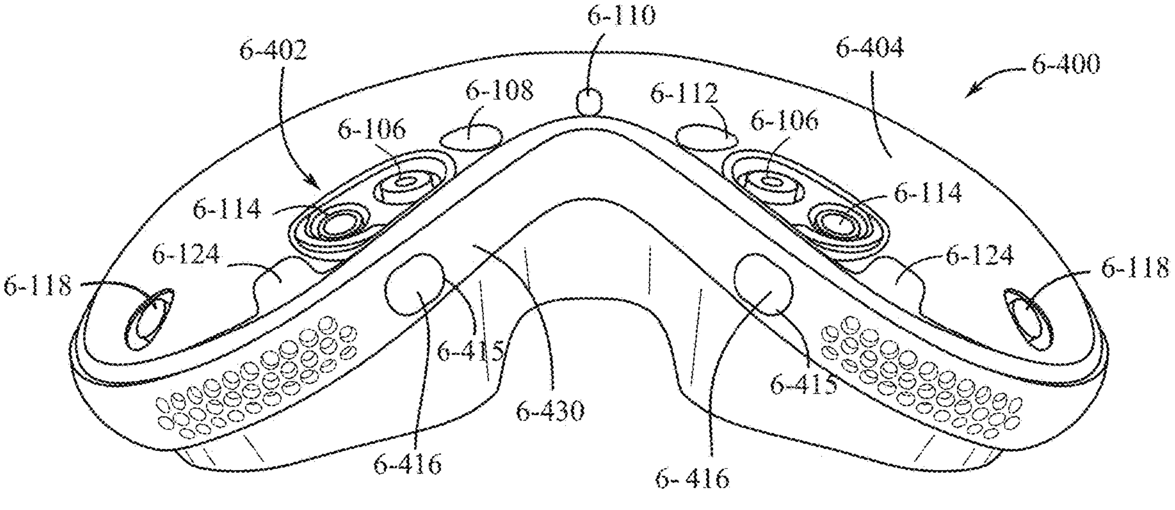
Figure 1M:
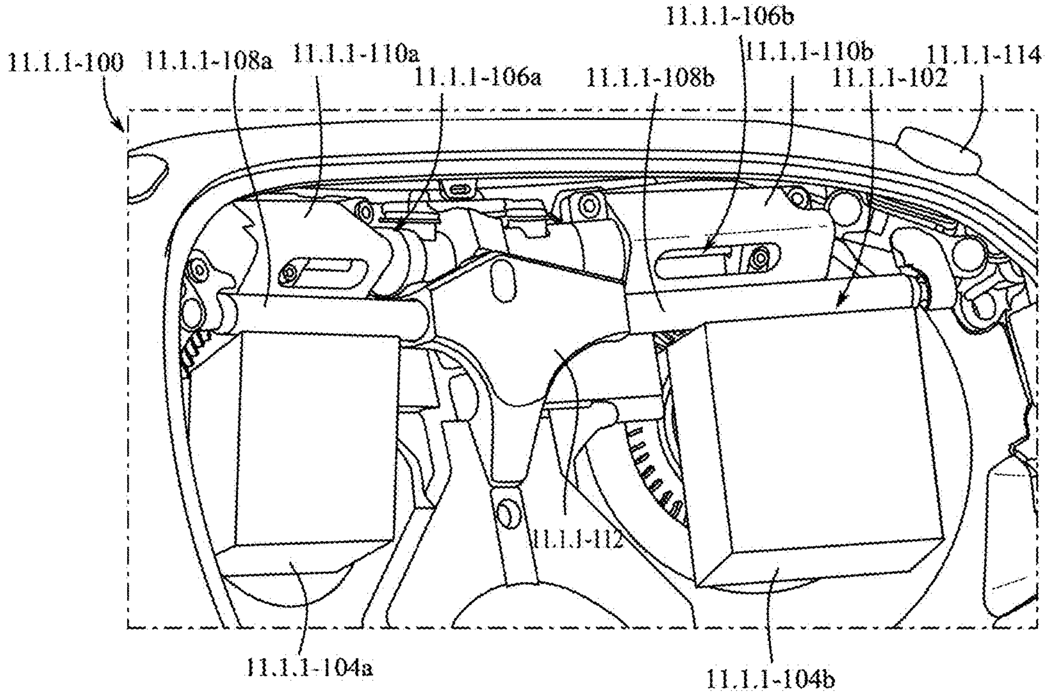
Figure 1N:
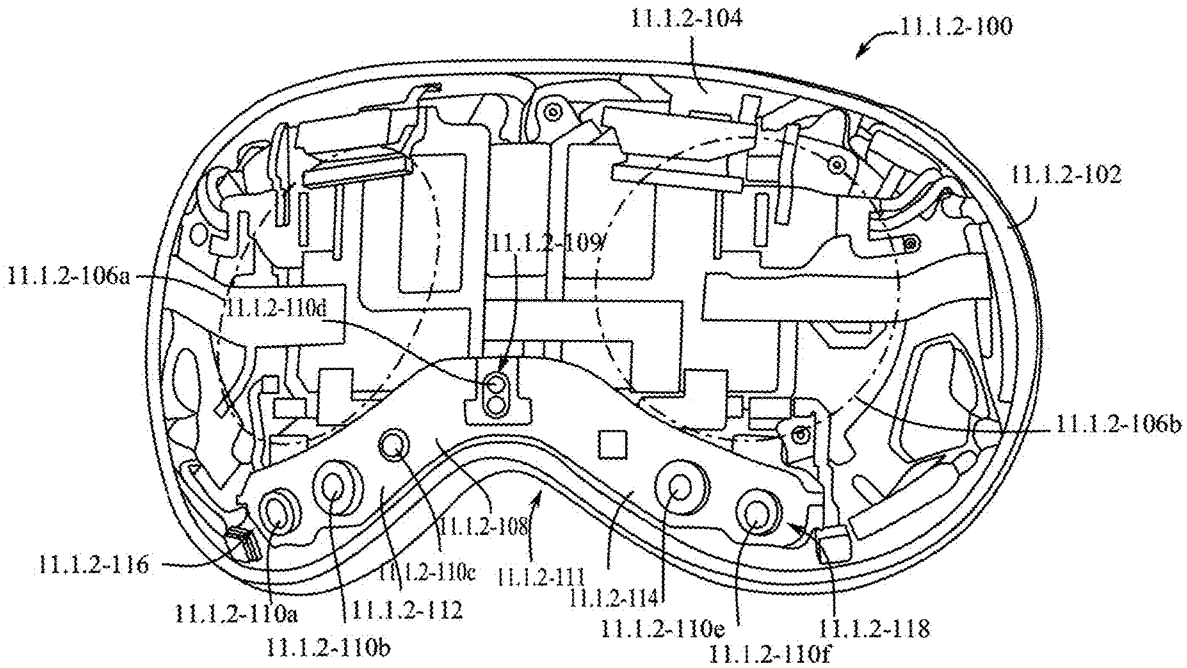
Figure 1O:
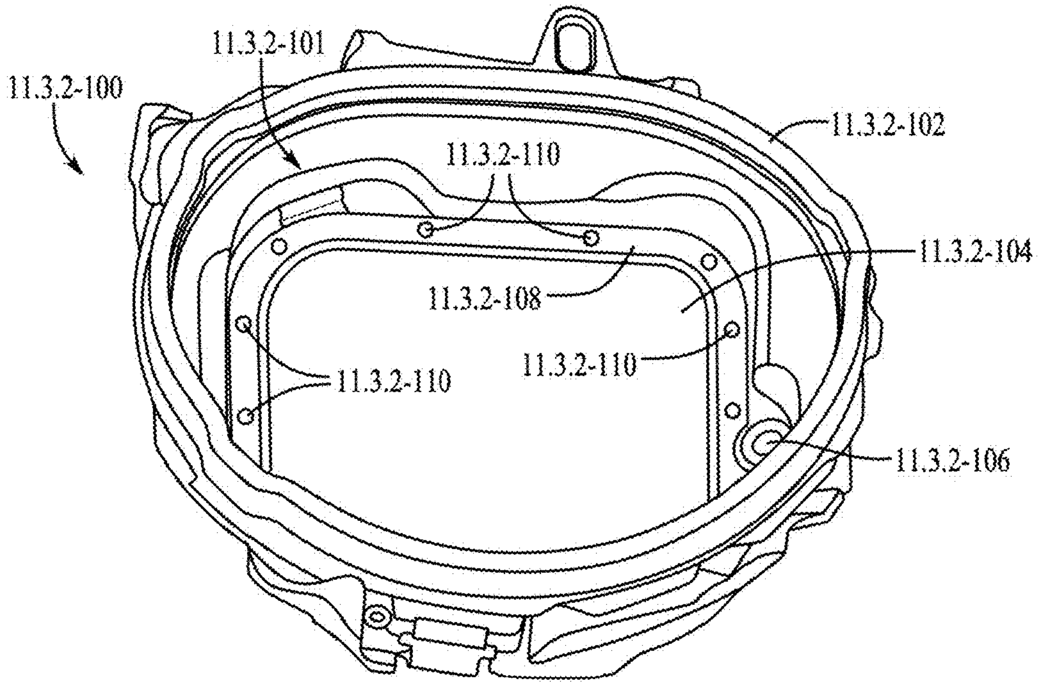
Figure 1P:
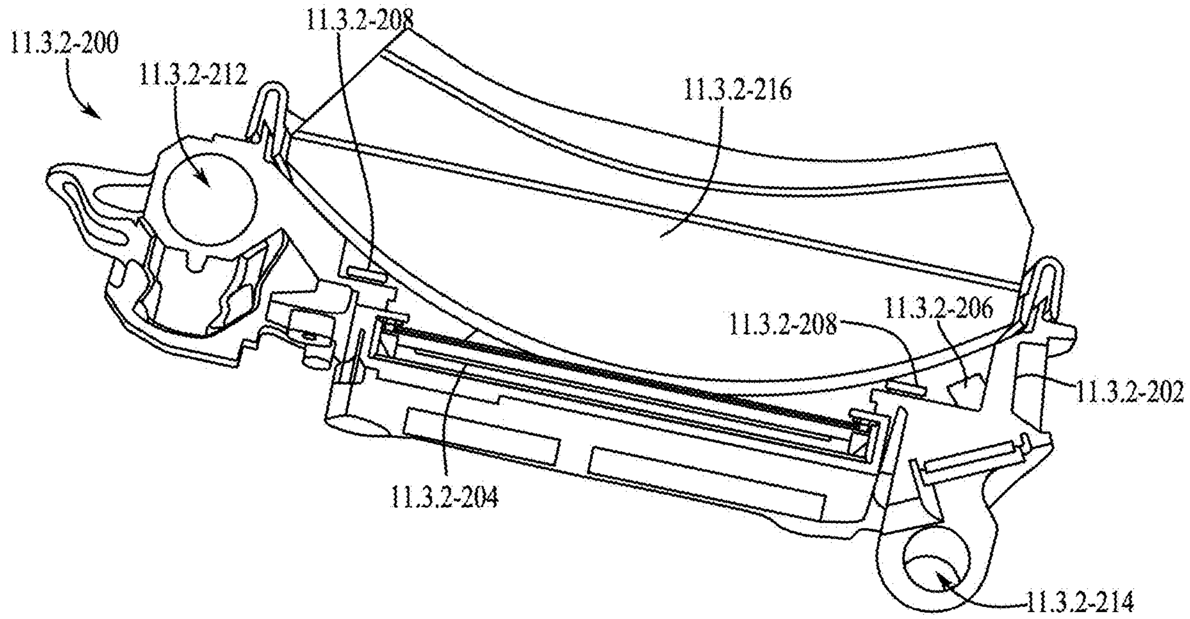

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 10) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit

1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100.

In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-

104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 10 illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 10 can be replicated in another (e.g., second) optical module disposed with the HMD to interact (e.g., project light and capture images) of another eye of the user.

Any of the features, components, and/or parts, including the arrangements and configurations thereof shown in FIG. 10 can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 10.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
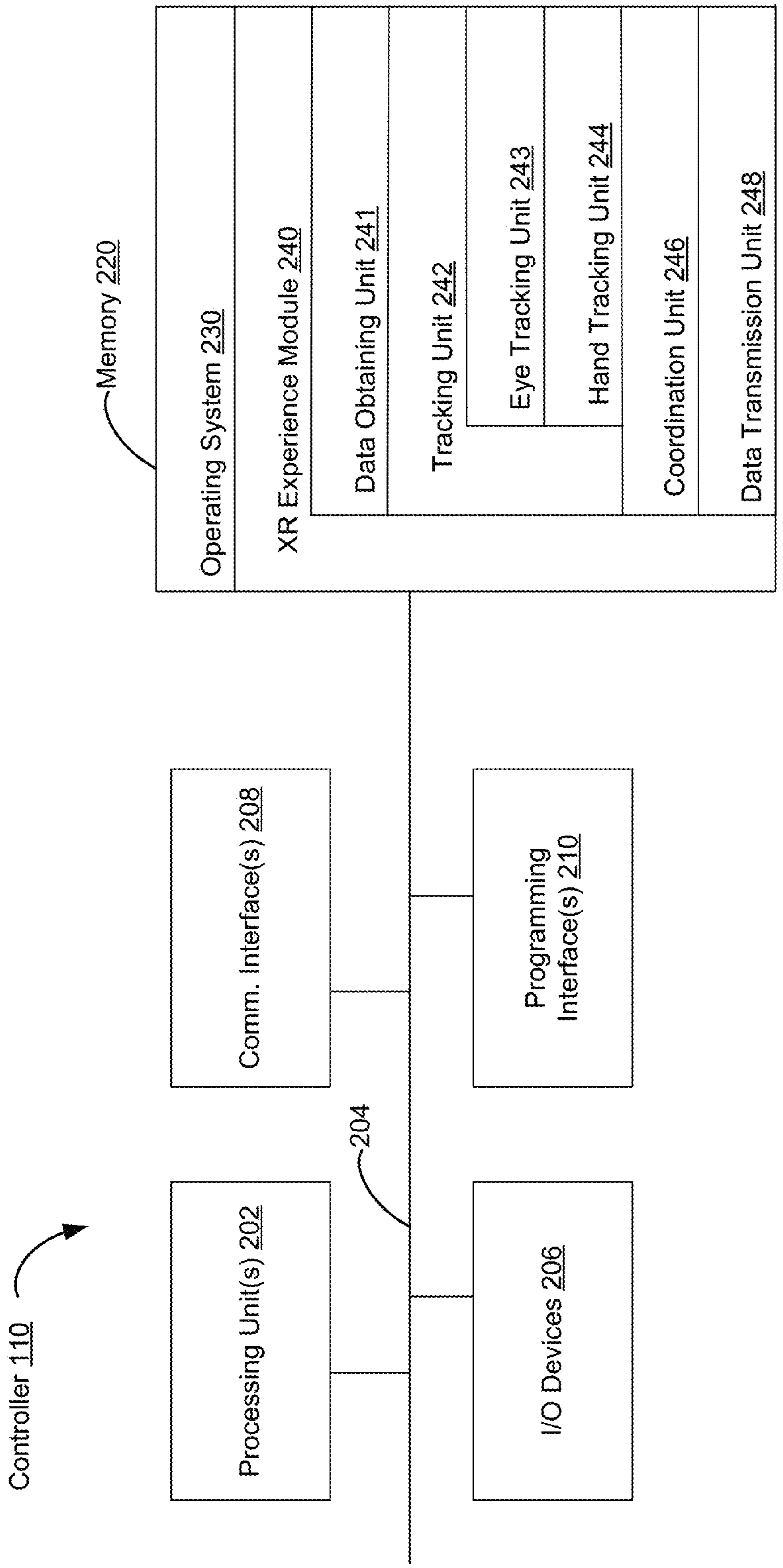
FIG. 2 is a block diagram illustrating a controller of a computer system that is configured to manage and coordinate a XR experience for the user in some embodiments.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
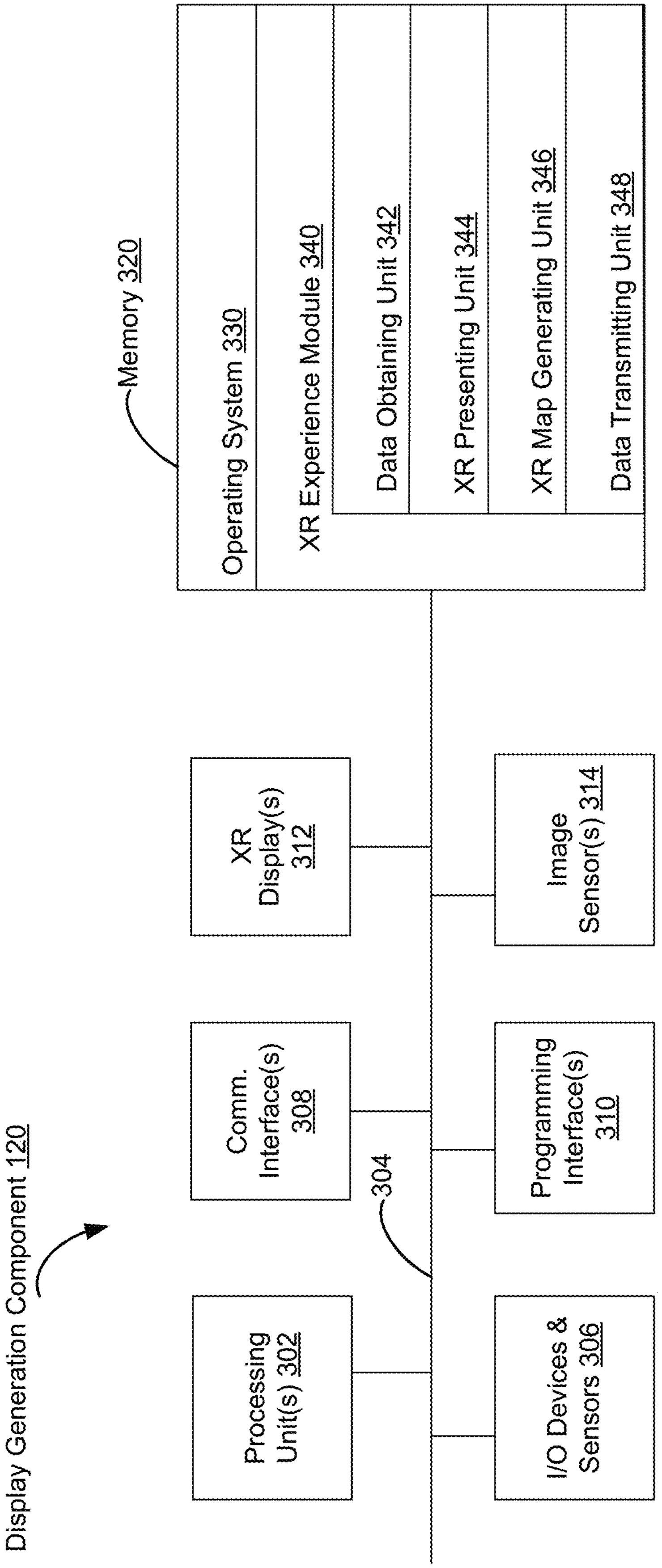
FIG. 3 is a block diagram illustrating a display generation component of a computer system that is configured to provide a visual component of the XR experience to the user in some embodiments.

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. n some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
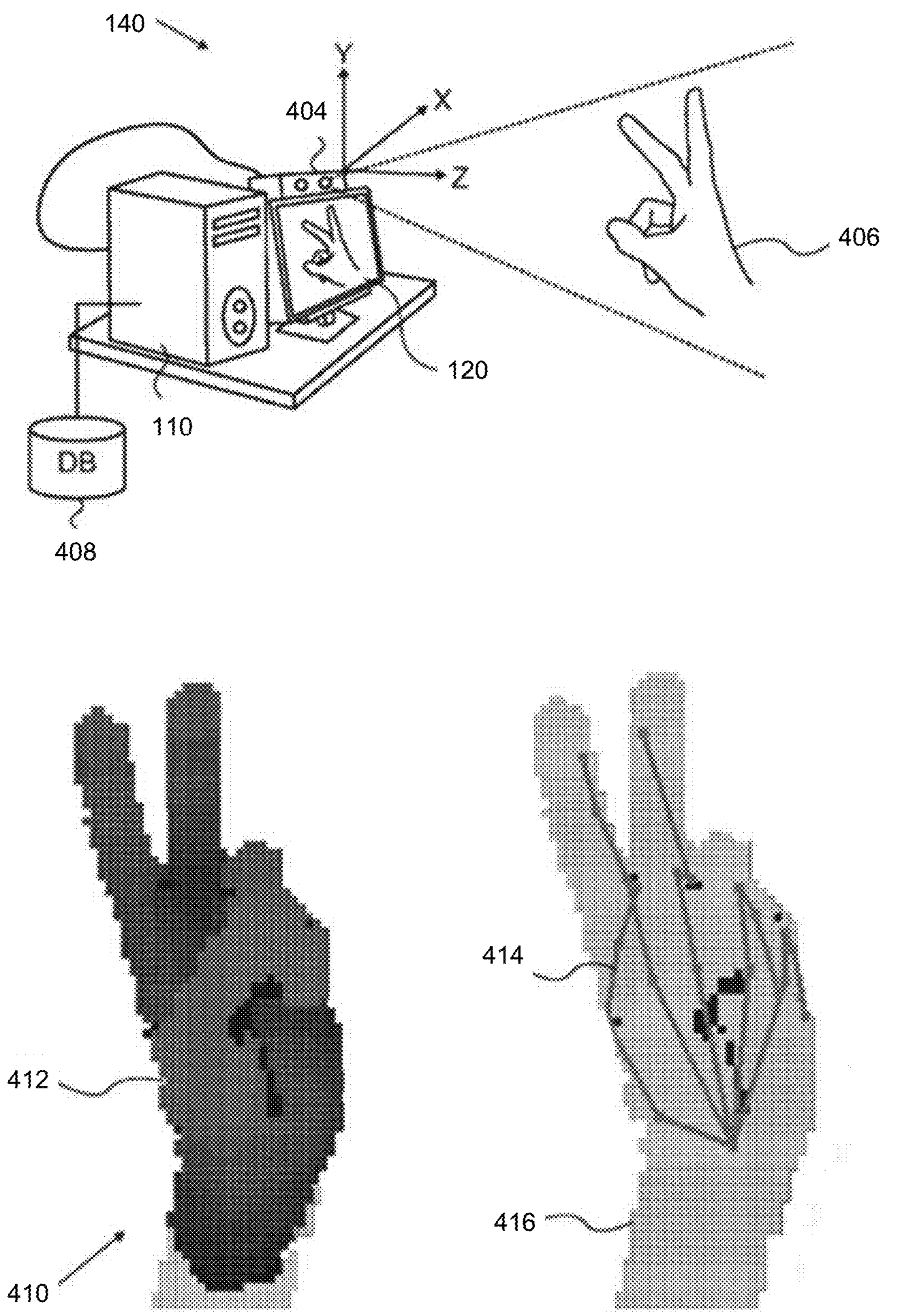
FIG. 4 is a block diagram illustrating a hand tracking unit of a computer system that is configured to capture gesture inputs of the user in some embodiments.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
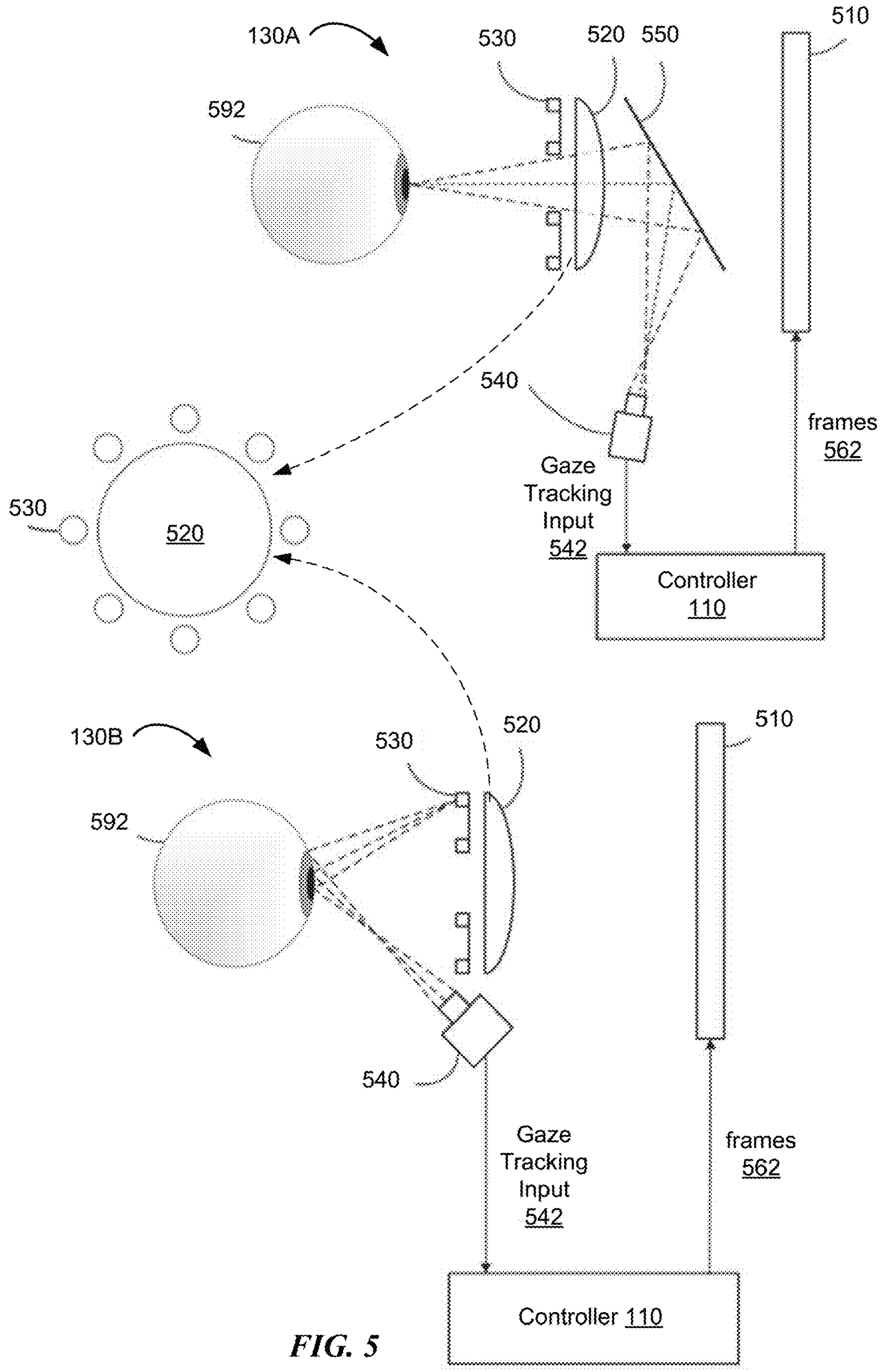
FIG. 5 is a block diagram illustrating an eye tracking unit of a computer system that is configured to capture gaze inputs of the user in some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
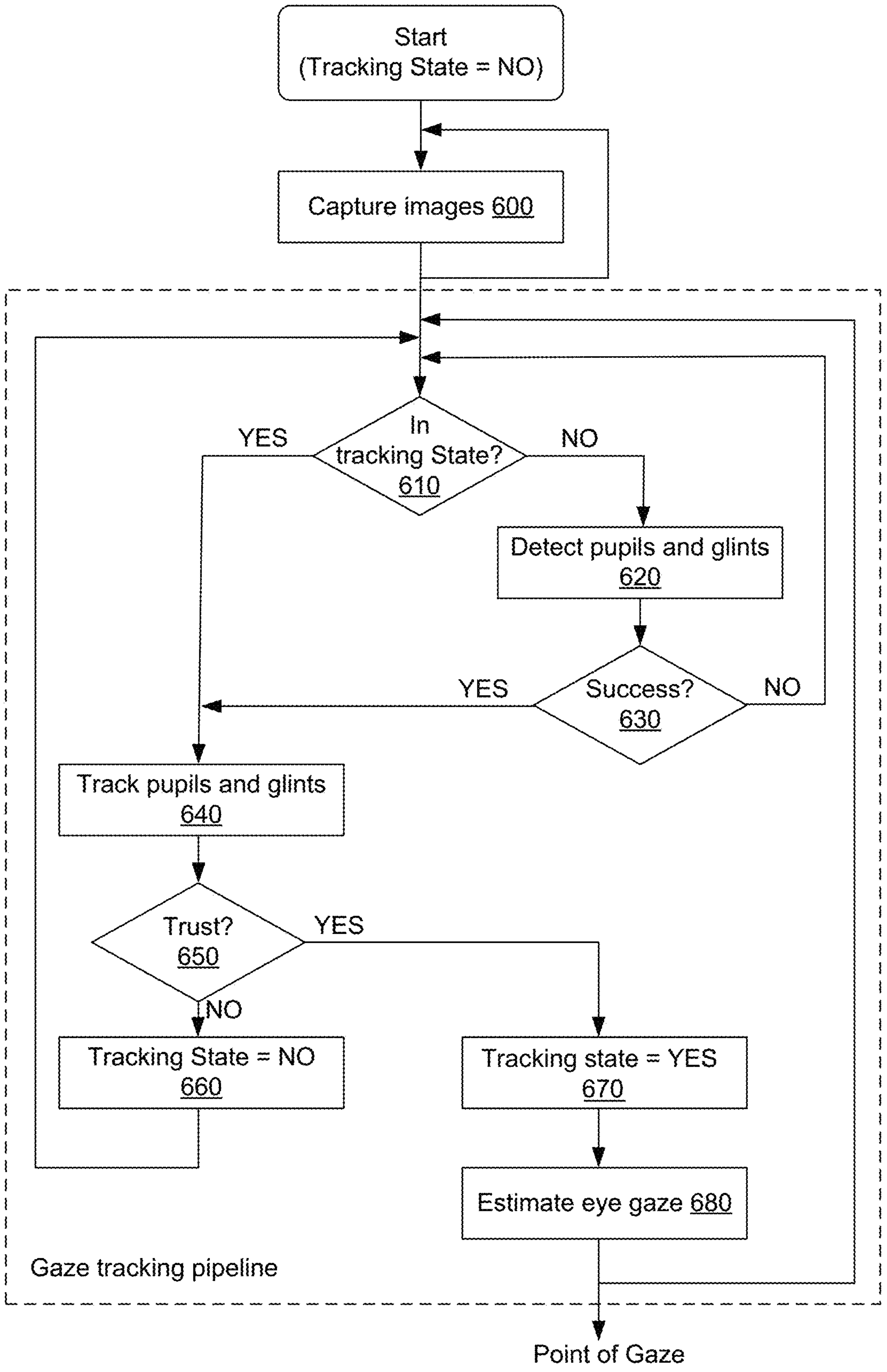
FIG. 6 is a flow diagram illustrating a glint-assisted gaze tracking pipeline in some embodiments.
Figure 7A:
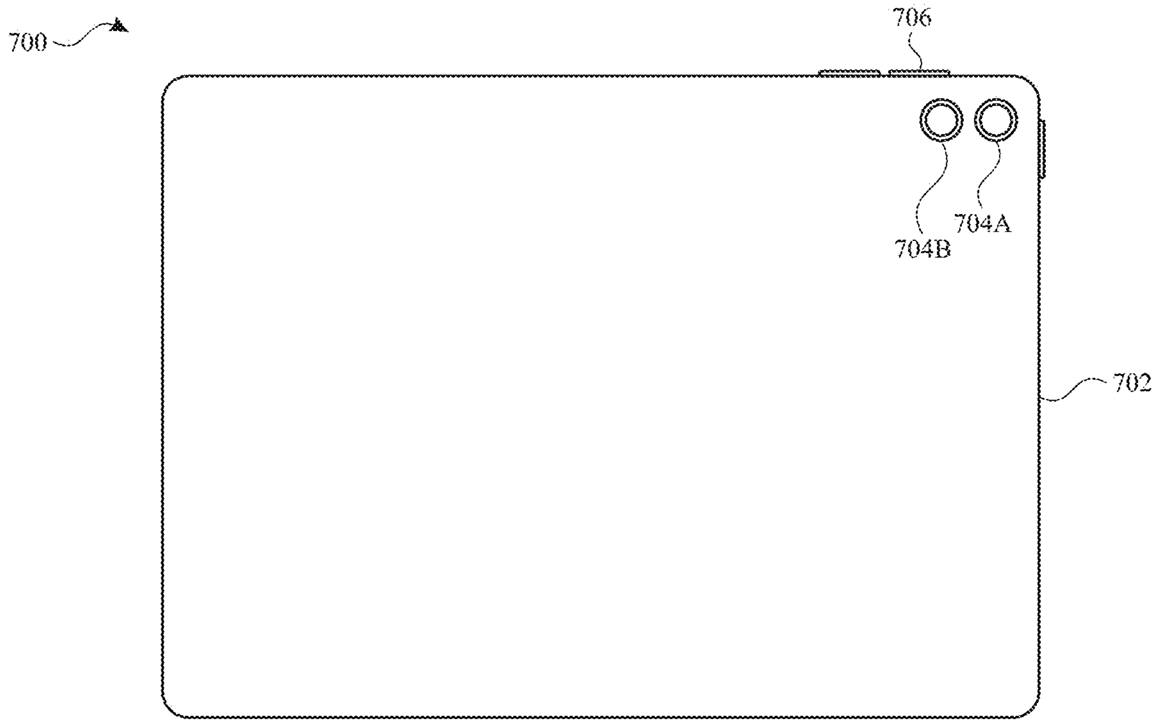
FIGS. 7A-7AB illustrate example techniques for displaying a user interface for gaze-activated media capture, in some embodiments.

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in some embodiments.

In some embodiments, the captured portions of real-world environment 602 are used to provide a XR experience to the user, for example, a mixed reality environment in which one or more virtual objects are superimposed over representations of real-world environment 602.

Thus, the description herein describes some embodiments of three-dimensional environments (e.g., XR environments) that include representations of real-world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real-world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real-world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real-world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and at least one camera.

FIGS. 7A-7AB illustrate exemplary methods of gaze-dependent media capture, in accordance with some embodiments. FIG. 8 is a flow diagram of an exemplary method 800 for gaze-dependent media capture, in accordance with various embodiments. The user interfaces in FIGS. 7A-7C are used to illustrate the processes described below, including the processes in FIG. 8.

Figure 7B:
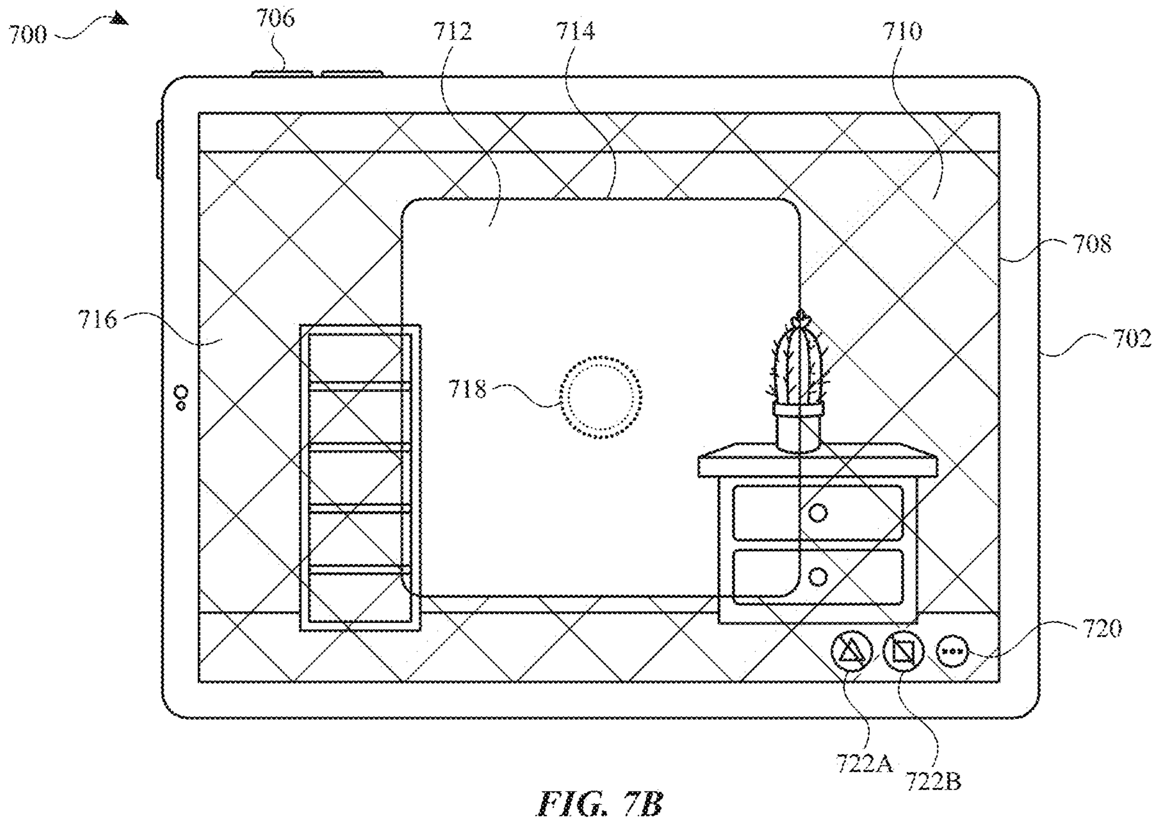
Figure 7C:
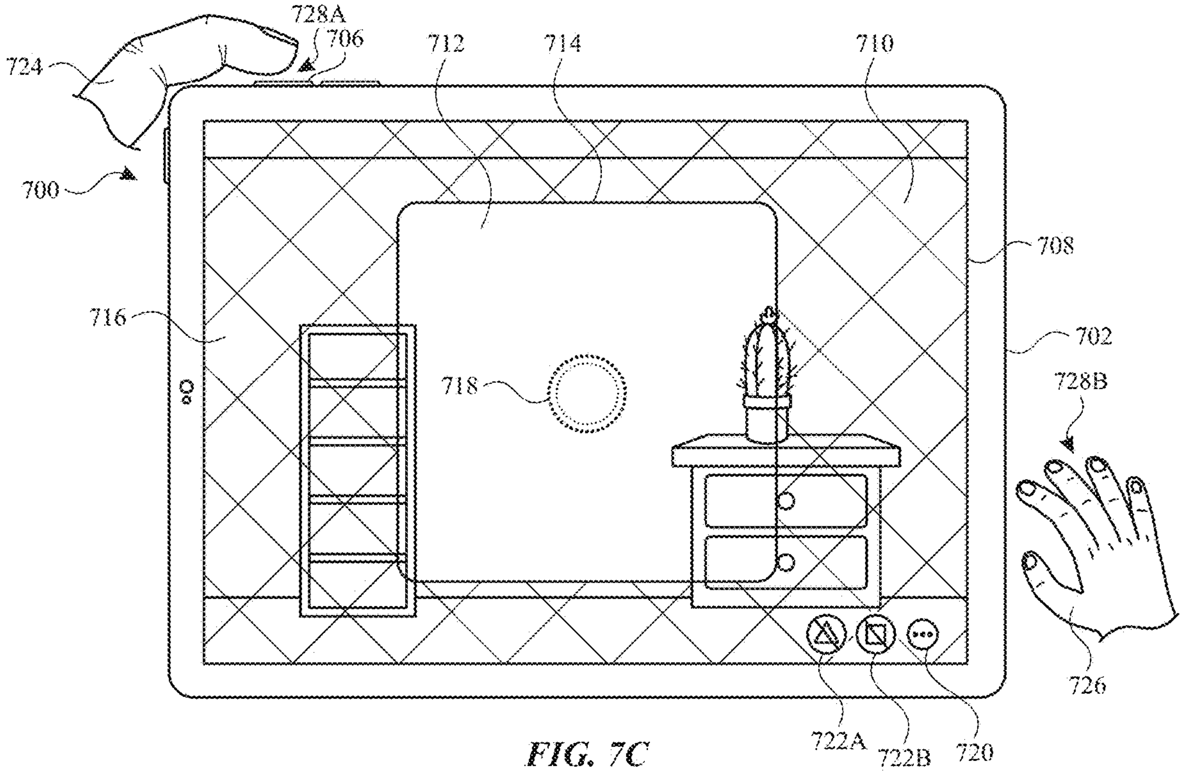
Figure 8:
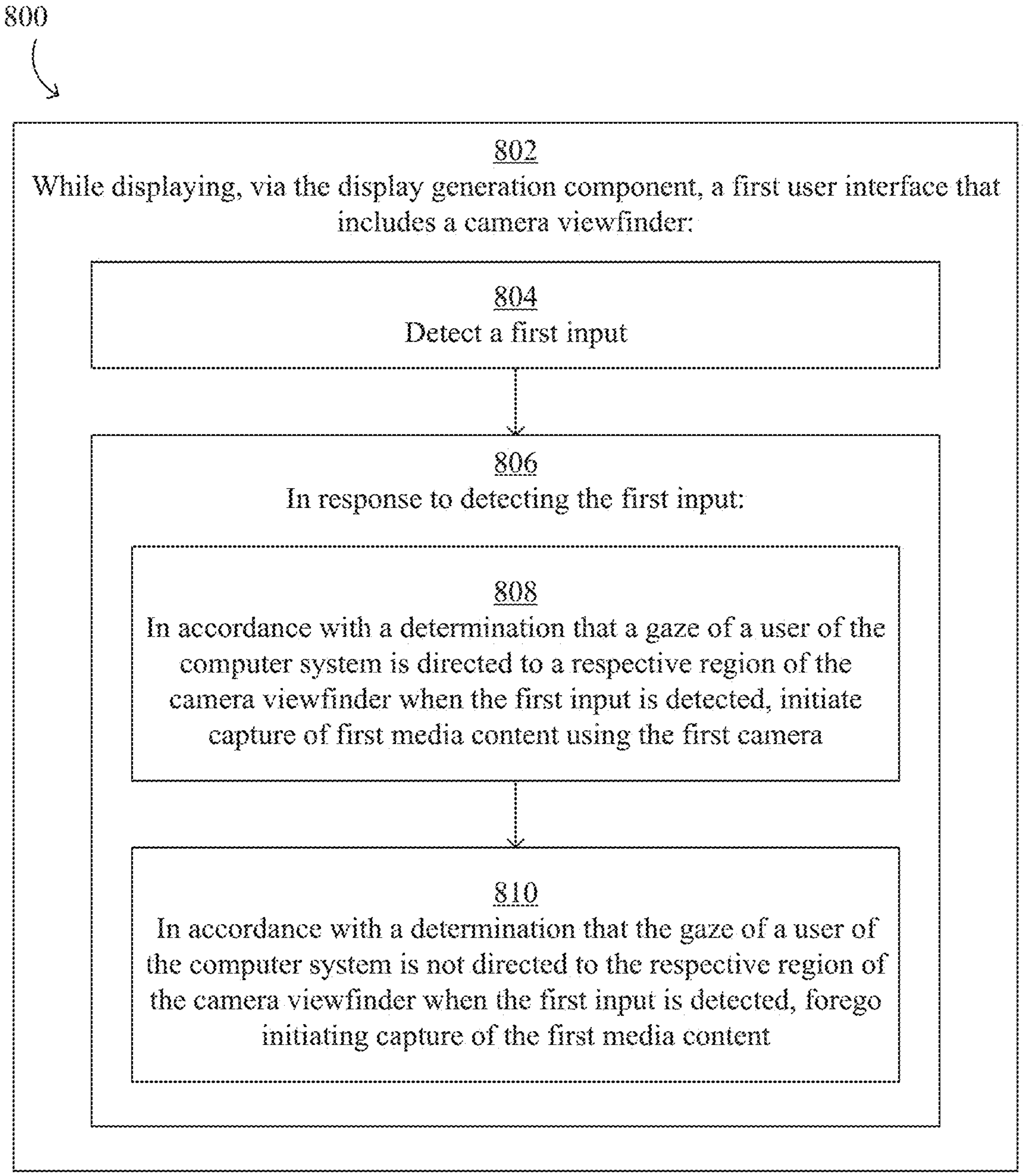
FIG. 8 is a flow diagram of methods of displaying a user interface for gaze-activated media capture, in some embodiments.

FIGS. 7A-7B illustrate computer system 700, which includes device 702 (e.g., a tablet computer), viewed from the back (e.g., FIG. 7A) and from the front (e.g., FIG. 7B). Device 702 includes display 708, visible on its front side, as seen in FIG. 7B, and first camera 704A and second camera 704B, visible on the backside of the device, as seen in FIG. 7A. In FIG. 7A, first camera 704A and second camera 704B are spaced apart from each other but face substantially the same direction (e.g., away from a user when the user is viewing display 708). Computer system 700 includes a plurality of input devices, including hardware button 706 and a touch-sensitive surface of display 708 of device 702. In some embodiments, computer system 700 includes one or more user devices such as mobile phones, tablet computers, and/or laptop computers. In some embodiments, computer system 700 includes one or more features of computer system 101 as described above, such as controller 110 and display generation component 120.

At FIG. 7B, computer system 700 is displaying, via display 708, media capture user interface 710 (e.g., a user interface for a camera application). In some embodiments, display 708 is a transparent or translucent display, such that a user of computer system 700 perceives media capture user interface 710 superimposed over a pass-through view of the physical environment. In some embodiments, display 708 is an opaque display, and media capture user interface 710 is superimposed pass-through video (e.g., image data captured using at least one of the plurality of cameras (e.g., first camera 704A and/or second camera 704B)). Although FIGS. 7A-7AB illustrate techniques using device 702, a tablet, the techniques are also applicable using a head-mounted device, for instance, as described with respect to computer system 101. In some embodiments where computer system 700 includes a head-mounted device, computer system 700 optionally includes two displays (e.g., one for each eye of the user of computer system 700), for example, each displaying a field-of-view of a respective camera of the plurality of cameras (e.g., first camera 704A and/or second camera 704B) and/or different portions or versions of media capture user interface 710 to create a depth (e.g., three-dimensional) effect. In some embodiments where computer system 700 is a head-mounted device, first camera 704A and second camera 704B are oriented in substantially the same direction as the user's eyes, when looking straight ahead. Additionally, first camera 704A and second camera 704B have different but overlapping fields-of-view that allow for capture of spatial media (e.g., virtual reality photos and/or videos that can presented with the appearance/illusion of depth).

As illustrated in FIG. 7B, media capture user interface 710 includes camera viewfinder 712, which transparently overlays a first portion of a representation of a field-of-view of first camera 704A. In some embodiments, the first portion the field-of-view of first camera 704A framed by camera viewfinder 712 represents or approximates the portion of the field-of-view of first camera 704A that would currently be included (e.g., captured) in a media capture.

Media capture user interface 710 further includes border 714, which visually indicates the edges of camera viewfinder 712, and darkened area 716, which overlays a second portion of the representation of the field-of-view of first camera 704A that falls outside of camera viewfinder 712. In some embodiments, border 714 visually indicates the edges of camera viewfinder 712 by modifying (e.g., blurring, darkening, obscuring, and/or otherwise visually indicating edges of the camera viewfinder) the appearance of a third portion of the representation of the field-of-view of first camera 704A. For example, the appearance of the third portion of the representation of the field-of-view of first camera 704A can be modified create soft gradient between camera viewfinder 712 and darkened area 716, vignetting the first portion of the representation of the field-of-view of first camera 704A.

Media capture user interface 710 further includes a shutter affordance 718 displayed in a central region of camera viewfinder 712. The two concentric rings included in shutter affordance 718 are at least partially transparent or translucent, such that the portion of the representation of the field-of-view of first camera 704A underlying the concentric rings remains at least partially visible to the user. Media capture user interface 710 further includes options affordance 720, first status indicator 722A, and second status indicator 722B (e.g., as described in further detail with respect to FIGS. 9A-9I). In some embodiments, computer system 700 changes the appearance of one or more elements of media capture user interface 710 (e.g., shutter affordance 718, options affordance 720, first status indicator 722A, second status indicator 722B) based on the portion(s) of the field-of-view of first camera 704A overlaid by the one or more elements. For example, computer system 700 may detect or sample the color of a portion of the field-of-view of first camera 704A overlaid by options affordance 720, and accordingly, change the color of options affordance 720 to match the sampled color or contrast with the sampled color.

As illustrated in FIG. 7C, while displaying media capture user interface 710, computer system 700 detects an initial input (e.g., input 728A and/or input 728B) by detecting the position of the user's hand (e.g., finger 724 and/or hand 726). For example, input 728A is detected when finger 724 is detected (e.g., using a capacitance sensor in hardware button 706 or another sensor of computer system 700) in a position near or on (but not pressing) hardware button 706, and/or input 728B is detected when hand 726 is detected (e.g., using the plurality of cameras and/or one or more sensors of computer system 700) in a raised position.

Figure 7D:
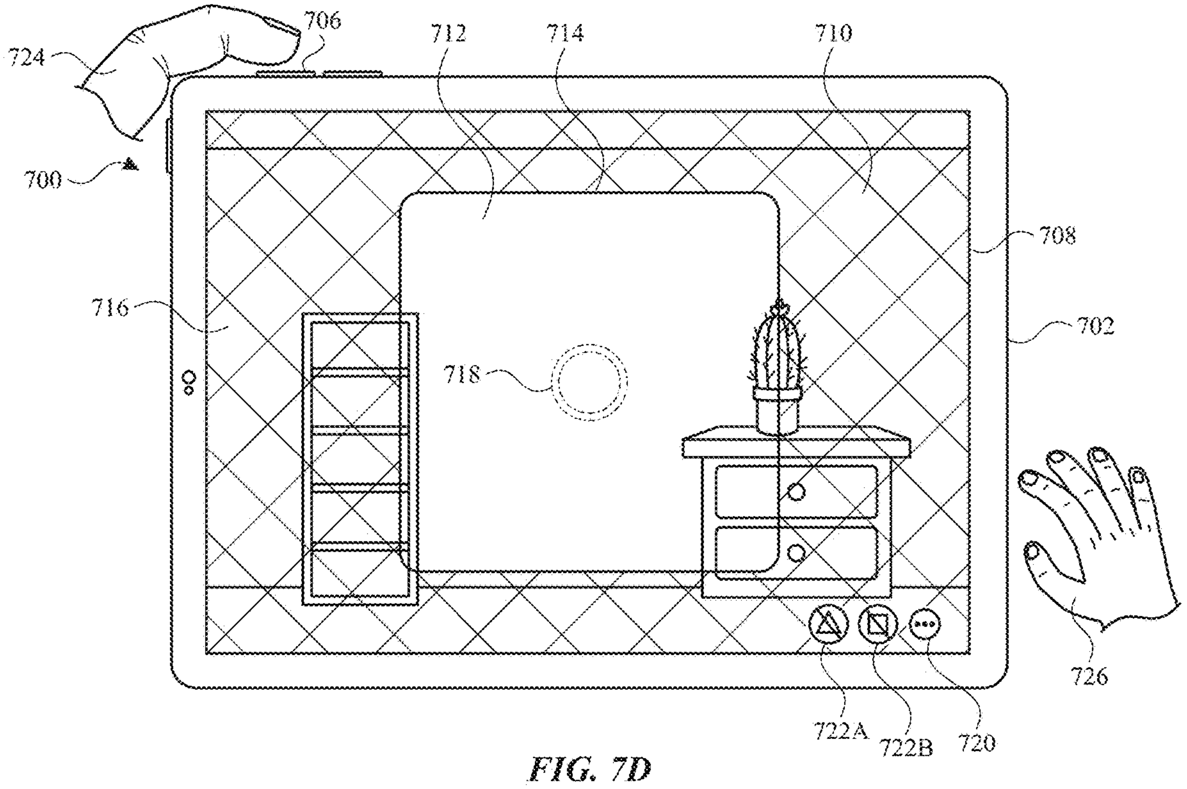

As illustrated in FIG. 7D, in response to detecting the initial input (e.g., input 728A and/or input 728B), computer system 700 changes the appearance of one or more elements of media capture user interface 710 to indicate that computer system 700 has entered a ready-to-capture state for media capture. Changing the appearance of media capture user interface 710 includes further darkening darkened area 716 (e.g., compared to the amount of darkening of darkened area 716 in FIG. 7C), increasing the contrast between darkened area 716 and camera viewfinder 712. Changing the appearance of media capture user interface 710 further includes decreasing the translucency (e.g., increasing the opacity) of the concentric rings of shutter affordance 718 (e.g., compared to the translucency of the concentric rings in FIG. 7C), increasing the visual prominence of shutter affordance 718. In some embodiments, the appearance of other elements of media capture user interface 710 (e.g., options affordance 720, first status indicator 722A, or second status indicator 722B) are also changed in response to detecting the initial input, for instance, to increase or decrease their prominence compared to how the elements were displayed in FIG. 7C.

Figure 7E:
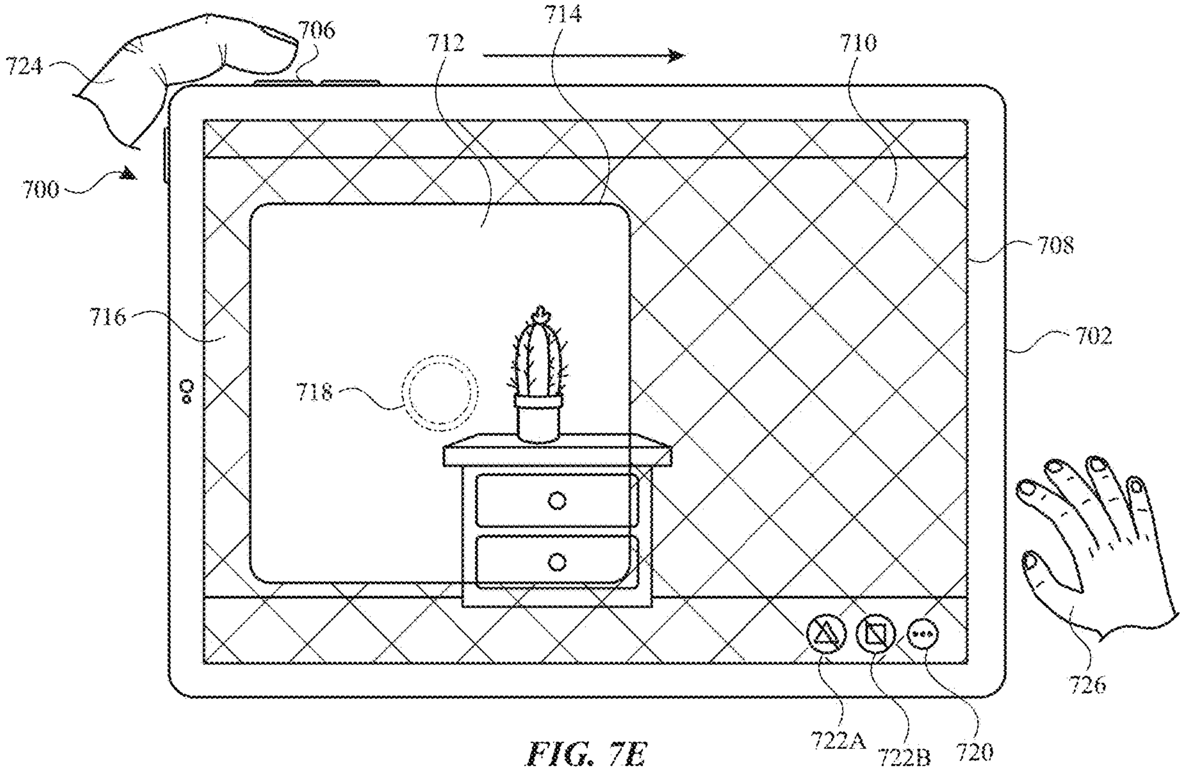
Figure 7F:
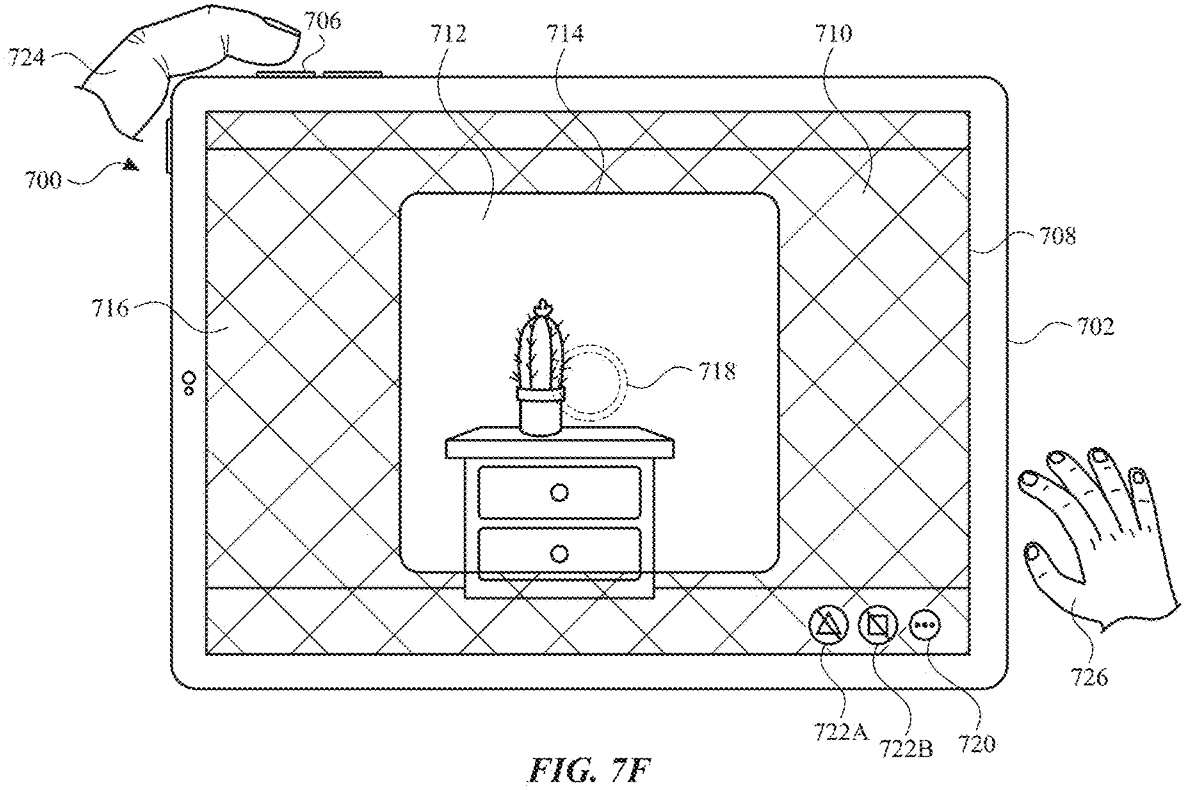

FIGS. 7E and 7F illustrate how computer system 700 changes various elements of media capture user interface 710 in response to movement of device 702. As illustrated in FIG. 7E, while displaying media capture user interface 710, computer system 700 detects movement of device 702 to the right. In response to detecting the movement of device 702, computer system 700 shifts camera viewfinder 712 to the left of display 708, creating the appearance of inertia of camera viewfinder 712 (e.g., displaying camera viewfinder 712 as if it were "connected" to display 708 by a spring as opposed to by a fixed member). Computer system 700 shifts border 714 and shutter affordance 718 to the left along with camera viewfinder 712, so that border 714 and shutter affordance 718 remain fixed within the frame of reference of camera viewfinder 712. Computer system 700 does not shift options affordance 720, first status indicator 722A, and second status indicator 722B on display 708, so that options affordance 720, first status indicator 722A, and second status indicator 722B remain fixed within the frame of reference of display 708. As illustrated in FIG. 7F, after the movement of device 702 stops, computer system 700 recenters camera viewfinder 712, border 714, and shutter affordance 718 within the frame of reference of display 708. Computer system 700 continues to display darkened area 716 overlaying the portion of the representation of the field-of-view of first camera 704A that falls outside of camera viewfinder 712, but changes the shape of darkened area 716 accordingly with the shifting and recentering of camera viewfinder 712.

Figure 7G:
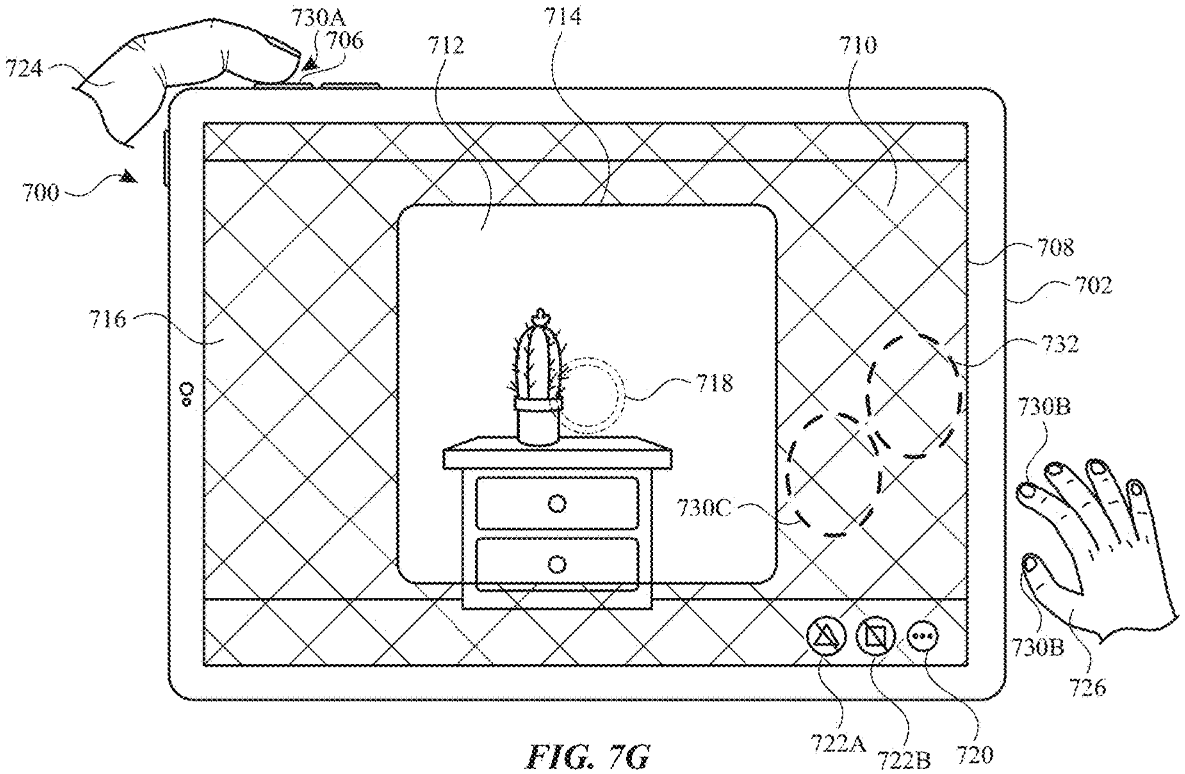

As illustrated in FIG. 7G, while displaying media capture user interface 710, computer system 700 detects a potential media capture input, such as button press input 730A, air gesture input 730B (e.g., an air gesture performed with the thumb and forefinger of hand 726, such as a pinch air gesture or an air tap gesture), and/or tap input 730C (e.g., on a touch sensitive surface of display 708). At the time the potential media capture input is detected, computer system 700 further detects the user's gaze 732, at a location to the right side of the media capture user interface that is not at or near the location of shutter affordance 718. As gaze 732 is not directed at or near shutter affordance 718 (e.g., because gaze 732 is not within a central region of camera viewfinder 712) when the potential media capture input is detected, computer system 700 does not initiate media capture in response to the potential media capture input. In some embodiments, in response to the potential media capture input and based on the user's gaze being directed to the location of gaze 732, computer system 700 performs a non-media capture operation (e.g., adjusting white balance or focus).

Figure 7H:
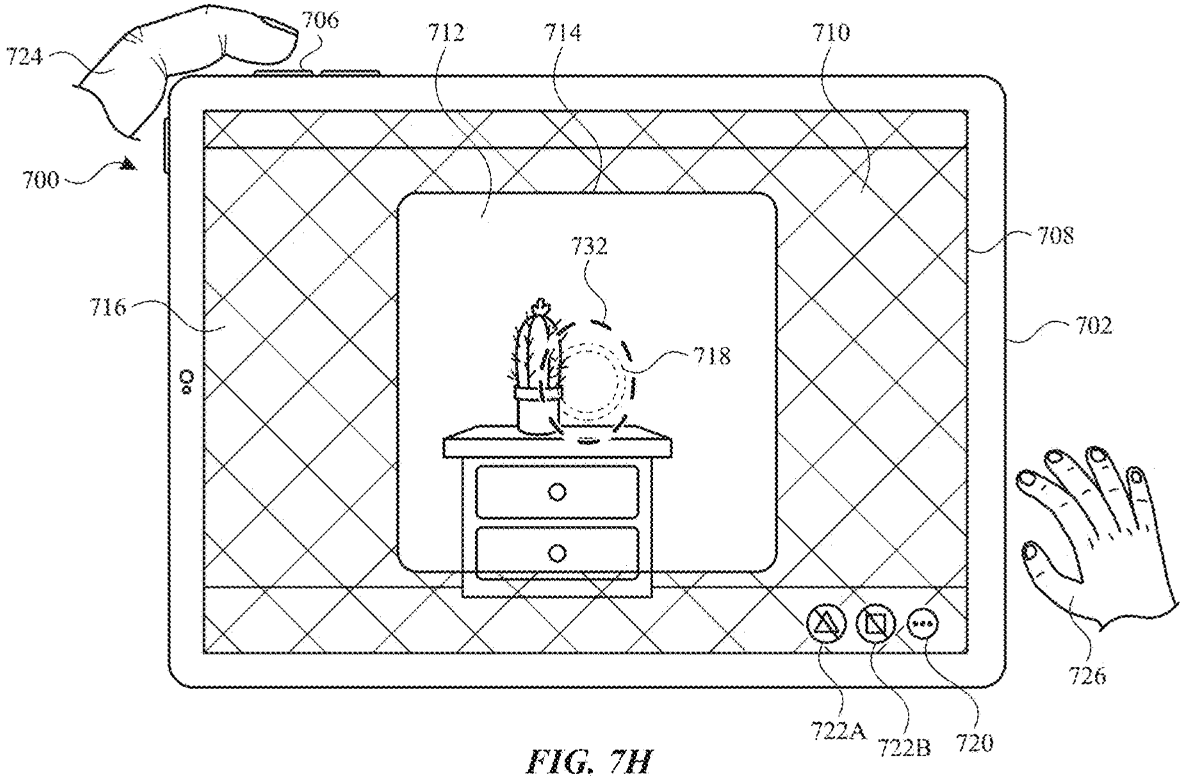

As illustrated in FIG. 7H, computer system 700 detects that gaze 732 is directed at shutter affordance 718 (e.g., that gaze 732 is now within the central region of camera viewfinder 712). In response to detecting that gaze 732 is directed at shutter affordance 718, computer system 700 changes the appearance of shutter affordance 718, increasing the visual prominence of shutter affordance 718 (e.g., as represented by the difference in the pattern with which shutter affordance 718 is depicted in FIG. 7H as compared to FIG. 7G) to indicate that the user can initiate media capture (e.g., by performing a potential media capture input). Changing the appearance of shutter affordance 718 includes further decreasing the translucency (e.g., increasing the opacity) of the concentric rings of shutter affordance 718 (e.g., compared to the translucency of the concentric rings in FIG. 7G) and slightly reducing the size of the concentric rings (e.g., squeezing the rings together). In some embodiments, changing the appearance of shutter affordance 718 includes increasing the brightness and/or contrast of the concentric rings with respect to the background.

As illustrated in FIG. 7I1, while displaying shutter affordance 718 with increased visual prominence, computer system 700 detects a second potential media capture input, such as button press input 736A of hardware button 706, air gesture input 736B (e.g., an air gesture performed with the thumb and forefinger of hand 726, such as a pinch air gesture), and/or tap input 736C (e.g., on a touch sensitive surface of display 708). At the time the second potential media capture input is detected, gaze 732 is directed at shutter affordance 718 (e.g., gaze 732 is within a central region of camera viewfinder 712). Accordingly, in response to the second potential media capture input, computer system 700 initiates media capture. In some embodiments, computer system 700 initiates the capture of both photo media and video media, and later determines (e.g., as described below) which mode of capture was requested by the user. In some embodiments, the media capture is a spatial media capture, performed using both first camera 704A and second camera 704B to capture virtual reality media (e.g., photos and/or videos) that can be presented with the appearance/illusion of depth. Computer system 700 further decreases the translucency and size of the concentric rings of shutter affordance 718 in response to the second potential media capture input, reflecting the state of the detected second potential media capture input (e.g., further increasing the prominence of the concentric rings and squeezing the concentric rings closer together as hardware button 706 is further depressed and/or air gesture input 736B is further pinched together).

In some embodiments, the techniques and user interface(s) described in FIG. 7I1 are provided by one or more of the devices described in FIGS. 1A-1P. FIG. 7I2 illustrates an embodiment in which media capture user interface X710 (e.g., as described in FIGS. 7A-7I1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

As illustrated in FIG. 7I2, while displaying shutter affordance X718 with increased visual prominence, HMD X700 detects a second potential media capture input, such as button press input X736A of hardware button X706, air gesture input X736B (e.g., an air gesture performed with the thumb and forefinger of X750A, such as a pinch air gesture, discussed in further detail below), and/or tap input X736C (e.g., on a touch sensitive surface of display 708). At the time the second potential media capture input is detected, gaze X732 is directed at shutter affordance X718 (e.g., gaze X732 is within a central region of camera viewfinder X712). Accordingly, in response to the second potential media capture input, HMD X700 initiates media capture. In some embodiments, HMD X700 initiates the capture of both photo media and video media, and later determines (e.g., as described below) which mode of capture was requested by the user. In some embodiments, the media capture is a spatial media capture (e.g., performed using cameras such as first camera 704A and second camera 704B) to capture virtual reality media (e.g., photos and/or videos) that can be presented with the appearance/illusion of depth. HMD X700 further decreases the translucency and size of the concentric rings of shutter affordance X718 in response to the second potential media capture input, reflecting the state of the detected second potential media capture input (e.g., further increasing the prominence of the concentric rings and squeezing the concentric rings closer together as hardware button X706 is further depressed and/or air gesture input X736B is further pinched together).

In some embodiments, HMD X700 detects the second potential media capture input based on air gesture input X736B performed by a user of HMD X700. In some embodiments, HMD X700 detects hand X750A (e.g., the left or right hand of a user or both hands of the user) of the user of HMD X700 and determines whether motion of hand X750A performs a predetermined air gesture corresponding to the second potential media capture input. In some embodiments, the predetermined air gesture includes a pinch gesture. In some embodiments, the pinch gesture includes detecting movement of finger X750C and thumb X750D toward one another.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor X704 that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 and/or hardware button X706 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 7J:
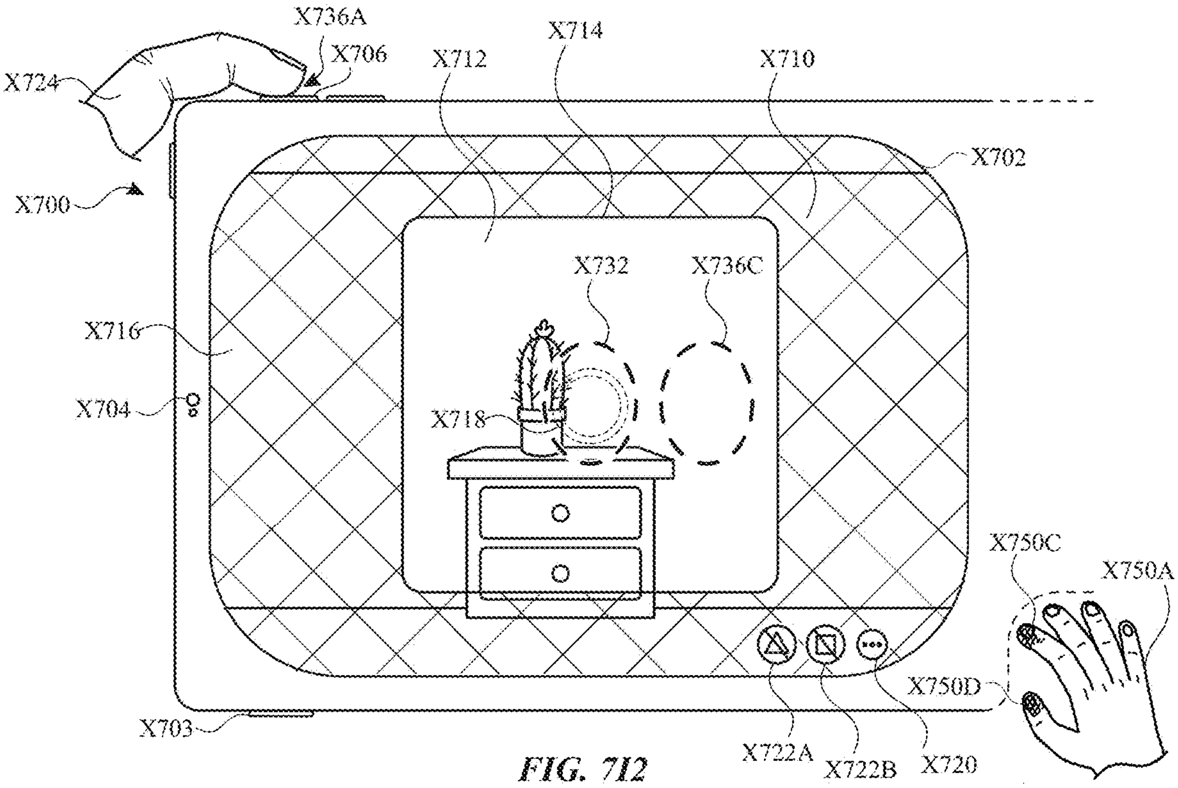
Figure 7J:
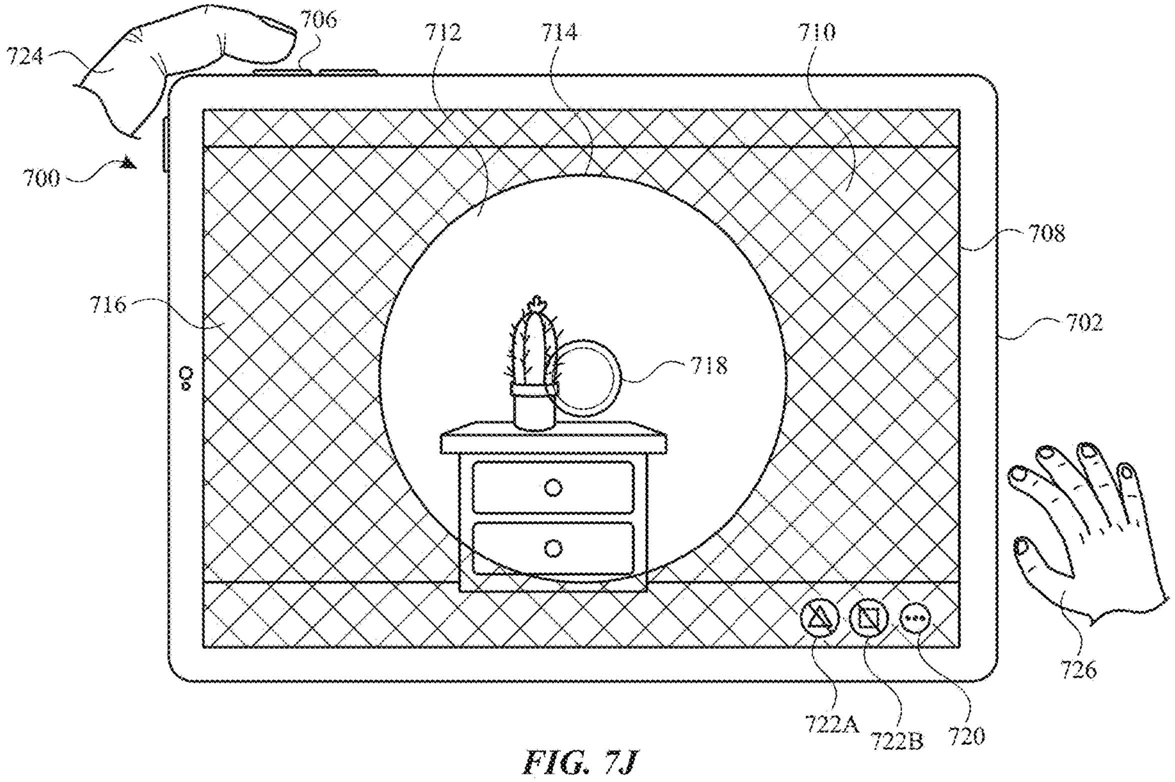
Figure 7K:
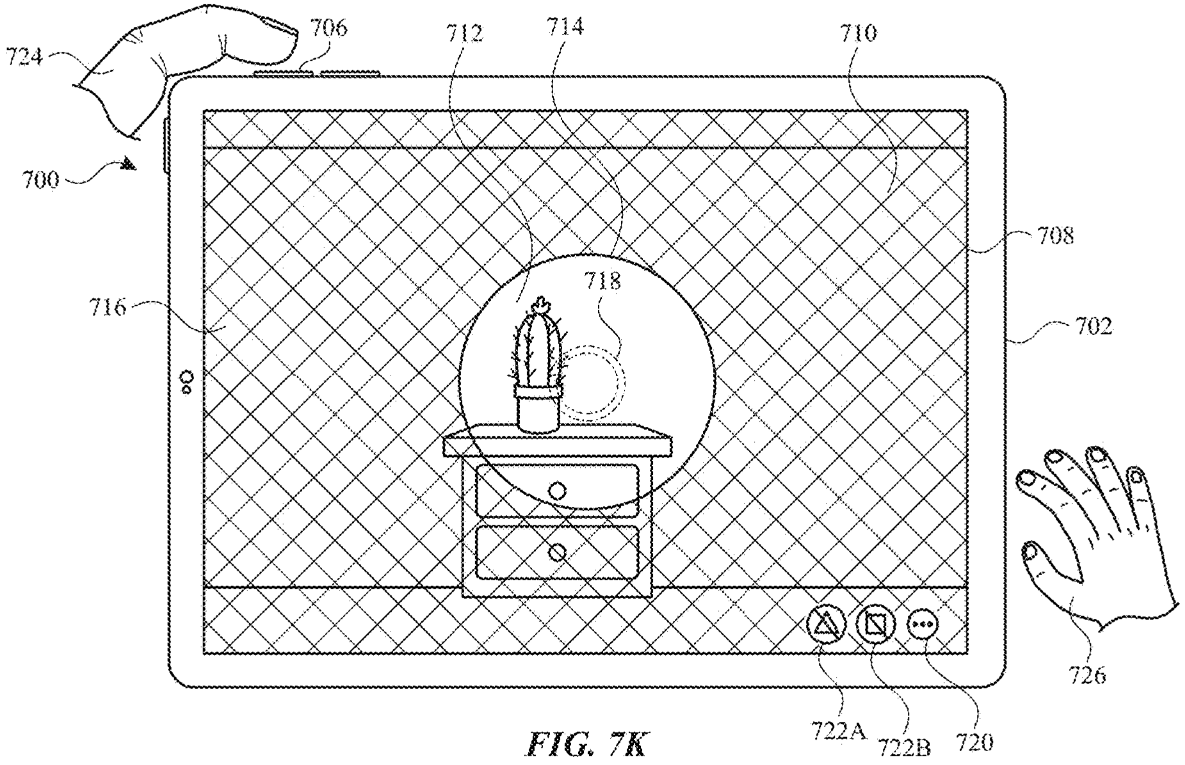

As illustrated in FIG. 7J, the second potential media capture input is released (e.g., finger 724 lifts off of hardware button 706, hand 726 opens the pinch air gesture, and/or tap input 736C lifts off of the touch sensitive surface of display 708) before a first threshold period of time elapses (e.g., immediately). Accordingly, computer system 700 captures photo media (e.g., a still photo and/or a media capture of limited duration that includes content from before and/or after the capture input is detected (e.g., before and/or after an air pinch gesture is released, an air tap gesture is detected, a button press is detected or released), such as a brief animated photo where several frames are captured when a photo is taken, creating a "live" effect). When photo media with a "live" effect is captured it optionally includes stereoscopic depth content so that when the photo media with the "live" effect is displayed or played back, the photo media with the "live" effect plays through a sequence of frames (e.g., one or more frames before a frame that was captured at a time when a capture input was detected and/or one or more frames after the frame that was captured at the time when the capture input was detected). In some embodiments, playing the photo media with the "live" effect includes playing through multiple frames for a first eye and multiple frames for a second eye where the frames for the first eye are synchronized in time with the frames for the second eye, so that the "live" effect also includes stereoscopic depth information (e.g., slight differences in a frame for the first eye that is displayed at the same time as a frame for the second eye in order to give the illusion of stereoscopic depth). In some embodiments a user has the option to enable or disable capture of frames before and/or after the capture input to generate photo media with a "live" effect. In some embodiments, a user has the option to suppress display of the "live" effect and/or discard the extra frames that are used to generate the "live" effect. In some embodiments, extra frames between the captured frames are interpolated to give the "live" effect a smoother appearance, to give the appearance of having been captured at a higher frame rate, and/or to generate a slow motion effect in the movement in the "live" effect. In some embodiments the sequence of frames before or after the frame that was captured at the time when the capture input was detected have a lower resolution and/or size than the frame that was captured at the time when the capture input was detected. In embodiments where computer system 700 initiates capture of both still and video media, computer system 700 discards any captured video media, determining that the user requested photo media based on the quick/immediate release of the second potential media capture input. Computer system 700 further decreases the translucency of the concentric rings of shutter affordance 718 (e.g., the concentric rings may turn temporarily opaque at this stage), indicating that the photo media capture has been initiated, and increases the size of the concentric rings (e.g., returning to the size the concentric rings were in FIG. 7F), indicating that the second potential media capture input has been released. As illustrated in FIG. 7K, after temporarily decreasing the translucency (e.g., as illustrated in FIG. 7J), computer system 700 increases the translucency of the concentric rings of shutter affordance 718, for instance, to the level of translucency of the concentric rings prior to detecting the media capture input and/or initiating capture (e.g., at FIG. 7G).

Figure 7L:
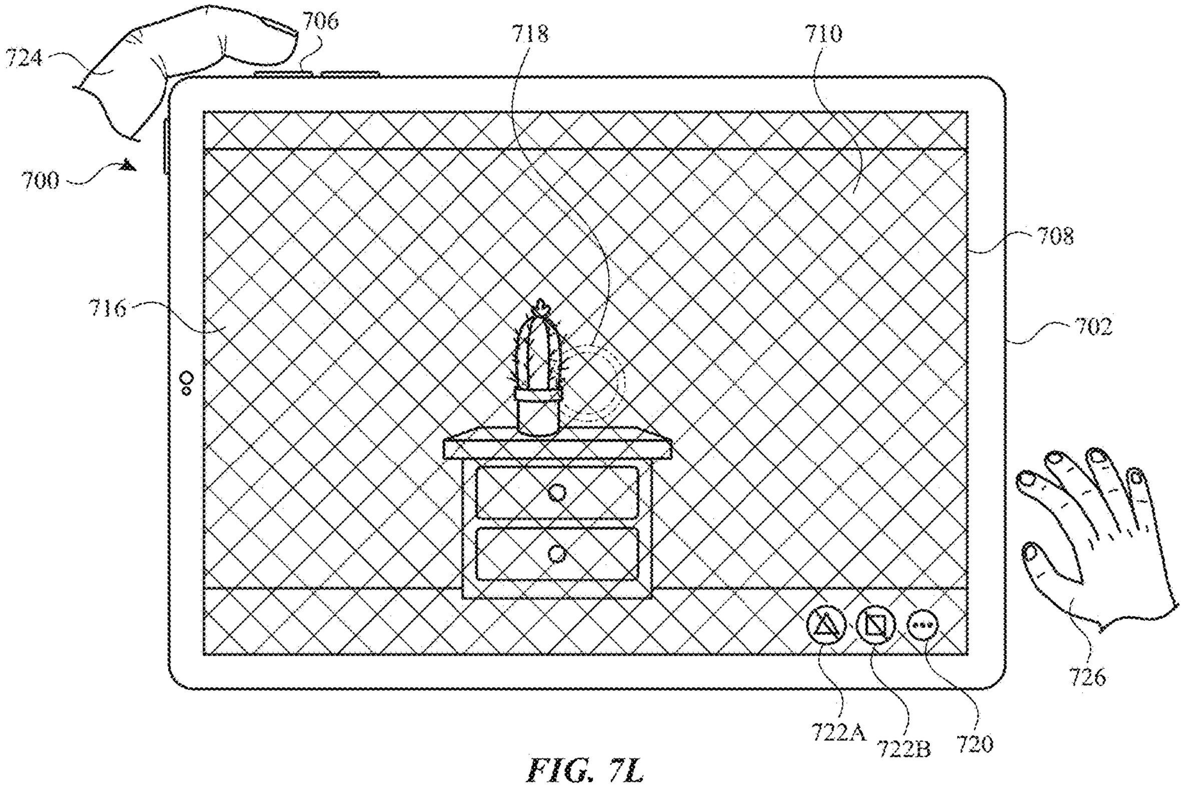

Computer system 700 additionally initiates a photo media capture animation, as illustrated in FIGS. 7J-7N, where darkened area 716 expands to close in around shutter affordance 718 and then retracts from shutter affordance 718 (e.g., emulating closing and opening of a physical camera shutter). In some embodiments, as darkened area 716 fully closes in on shutter affordance 718 (e.g., as illustrated in FIG. 7L), camera viewfinder 712 and border 714 may not be visible during parts of the media capture animation. The photo media capture animation includes increasing the darkening of darkened area 716 during the photo media capture animation (e.g., compared to the darkening of darkened area 716 in FIGS. 7I1-7I2).

Figure 7M:
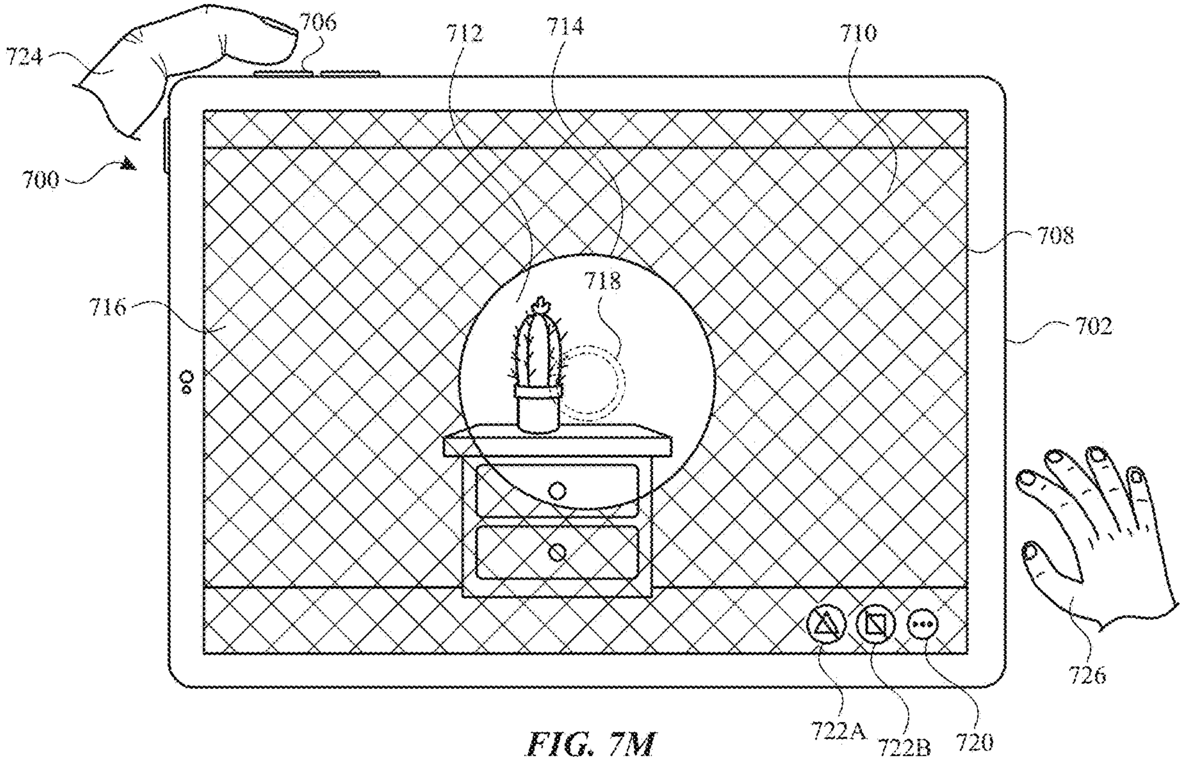
Figure 7N:
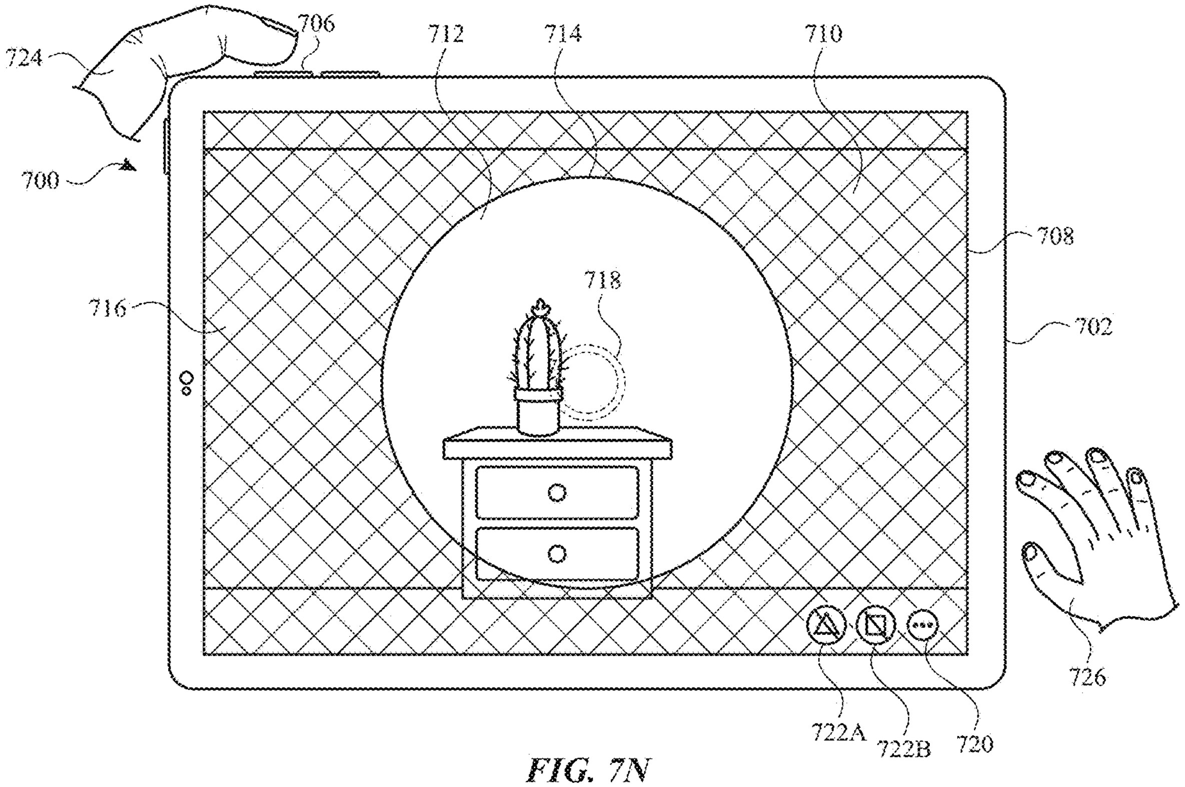
Figure 7O:
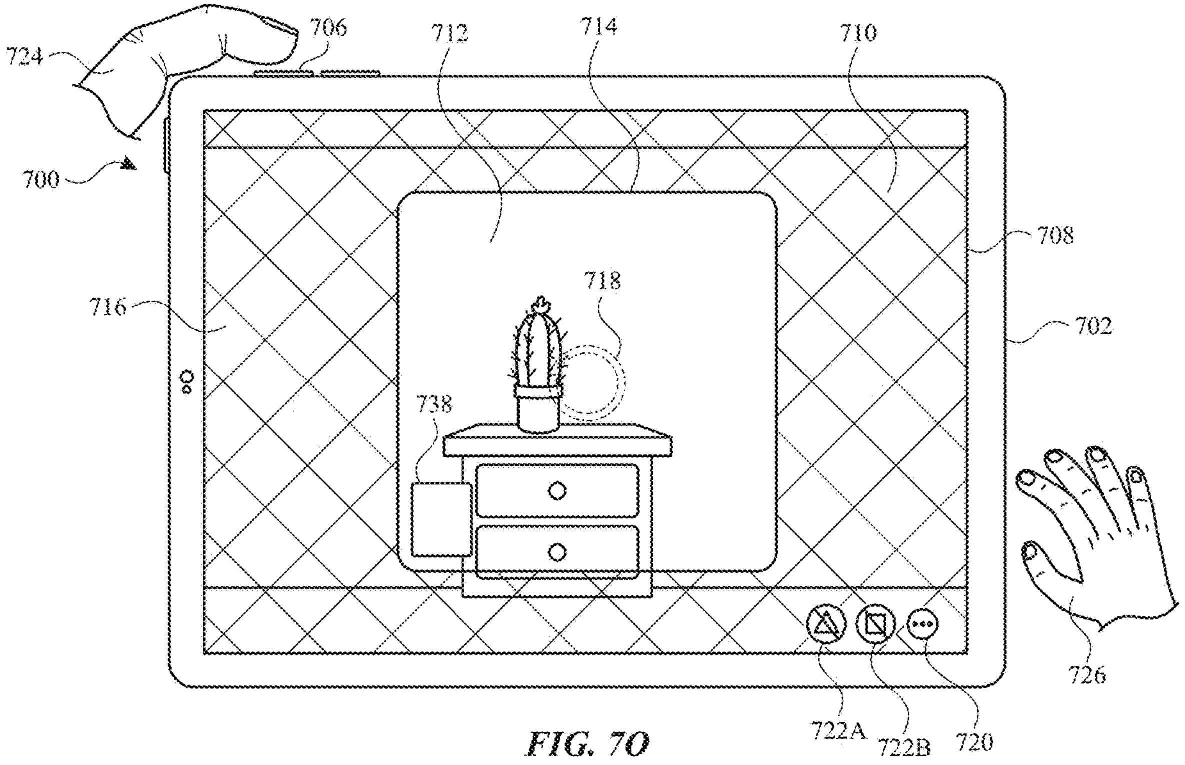
Figure 7P:
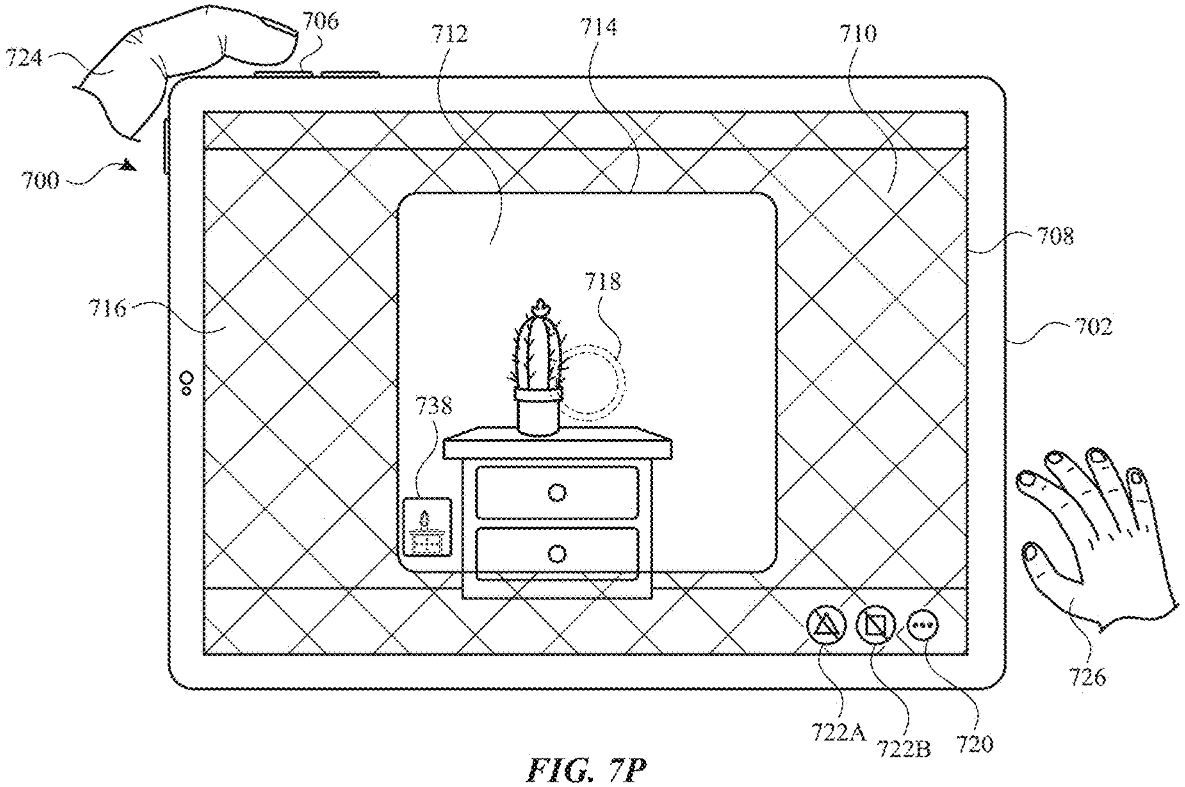
Figure 7Q:
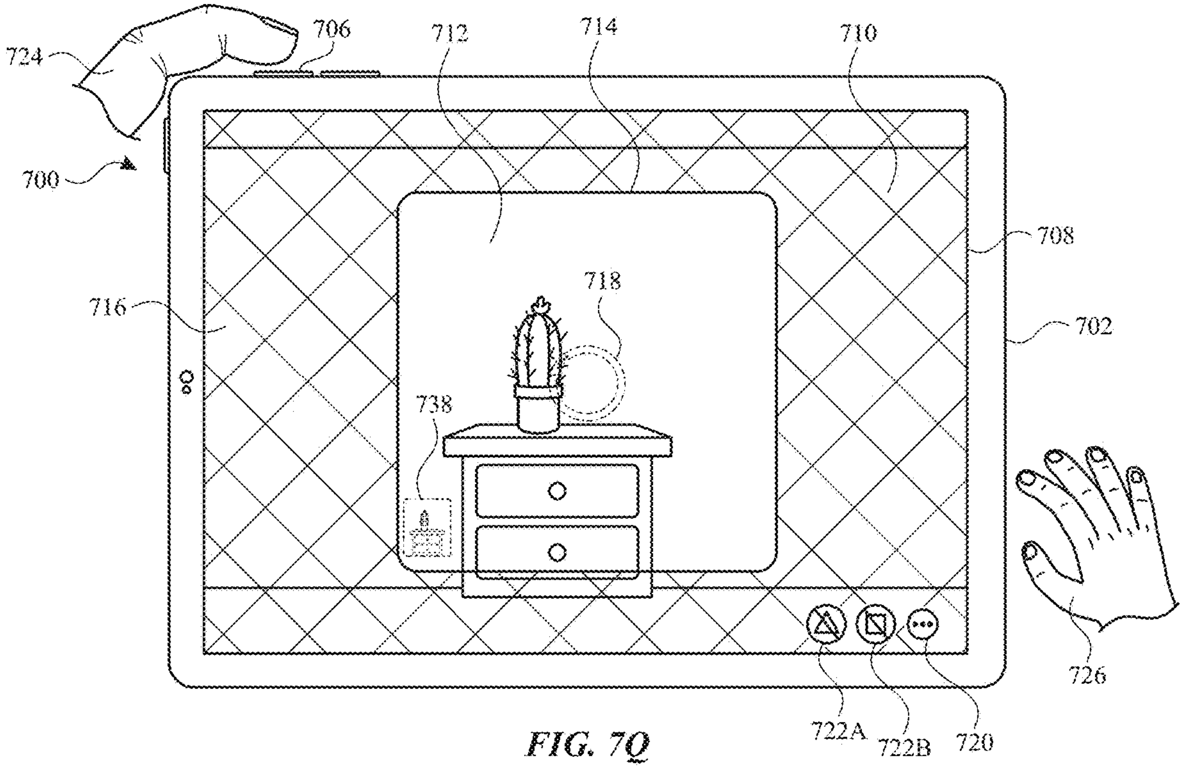
Figure 7R:
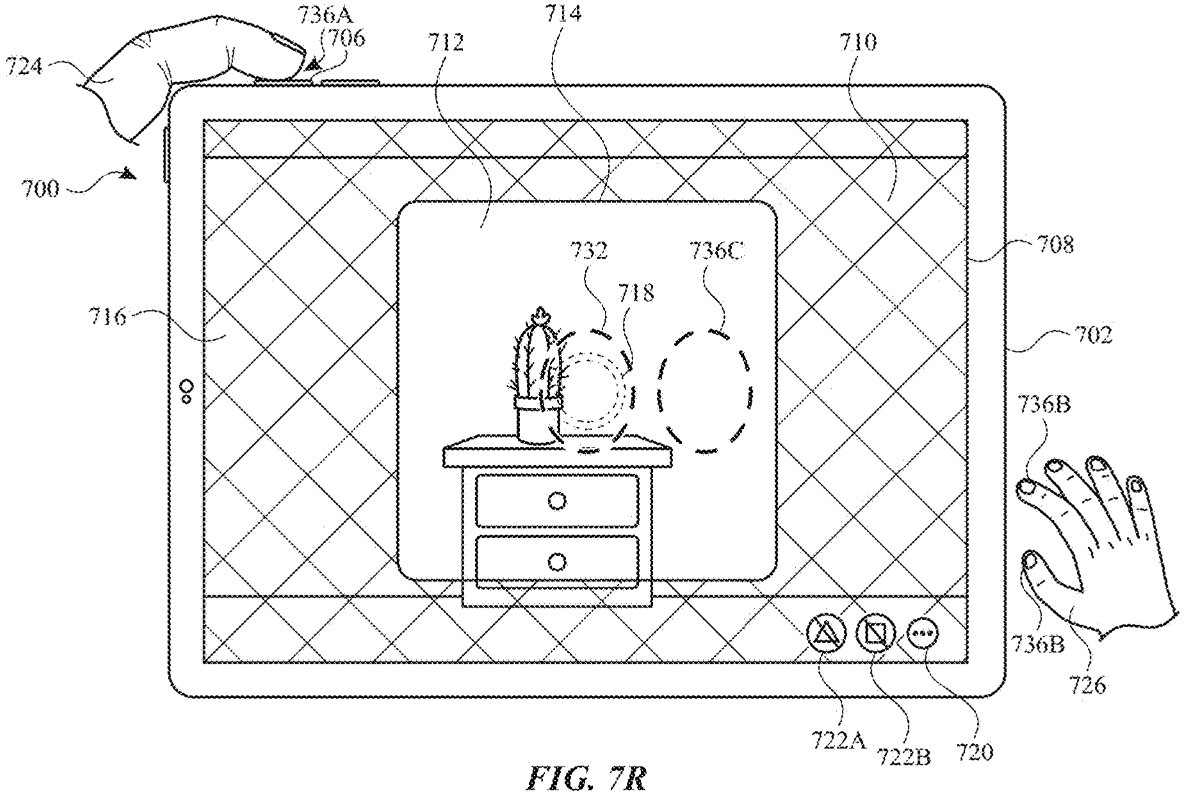

As illustrated in FIGS. 7O-7Q, after completing the photo media capture (e.g., taking the photo), computer system 700 displays captured media icon 738, which is a thumbnail of the photo media capture. As illustrated in FIG. 7O, captured media icon 738 is initially displayed at a first size and a first simulated exposure level (e.g., displayed with a first degree of brightness), such that captured media icon 738 initially appears as an opaque, white icon. As illustrated in FIG. 7P, after a short period of time, captured media icon 738 is displayed at a second, smaller size and a second, lower simulated exposure level, such that the thumbnail of the photo media capture becomes visible to the user (e.g., displayed with a brightness that is closer to the actual brightness of the photo media capture). As illustrated in FIG. 7Q, if computer system 700 does not detect the user gazing at or otherwise interacting with captured media icon 738 for a threshold amount of time (e.g., a few seconds), computer system 700 increases the translucency (e.g., reduces the opacity) of captured media icon 738, decreasing the visual prominence of captured media icon 738.

Figure 7S:
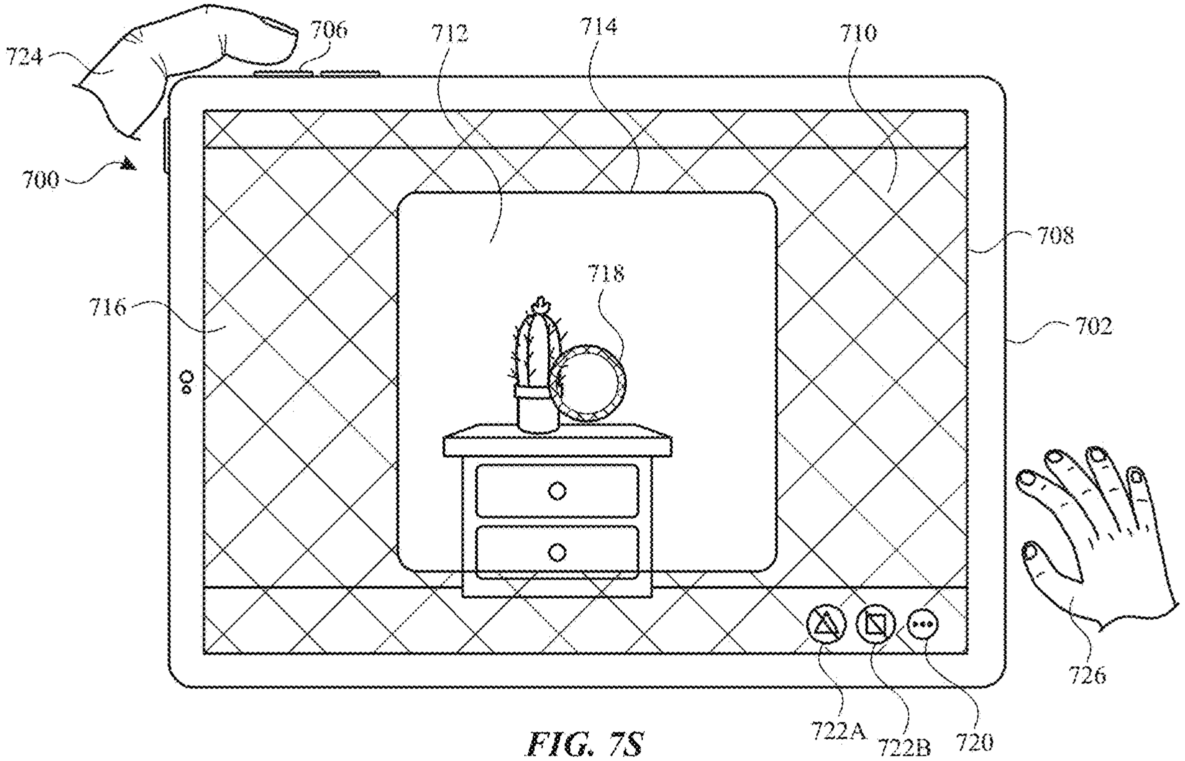
Figure 7T:
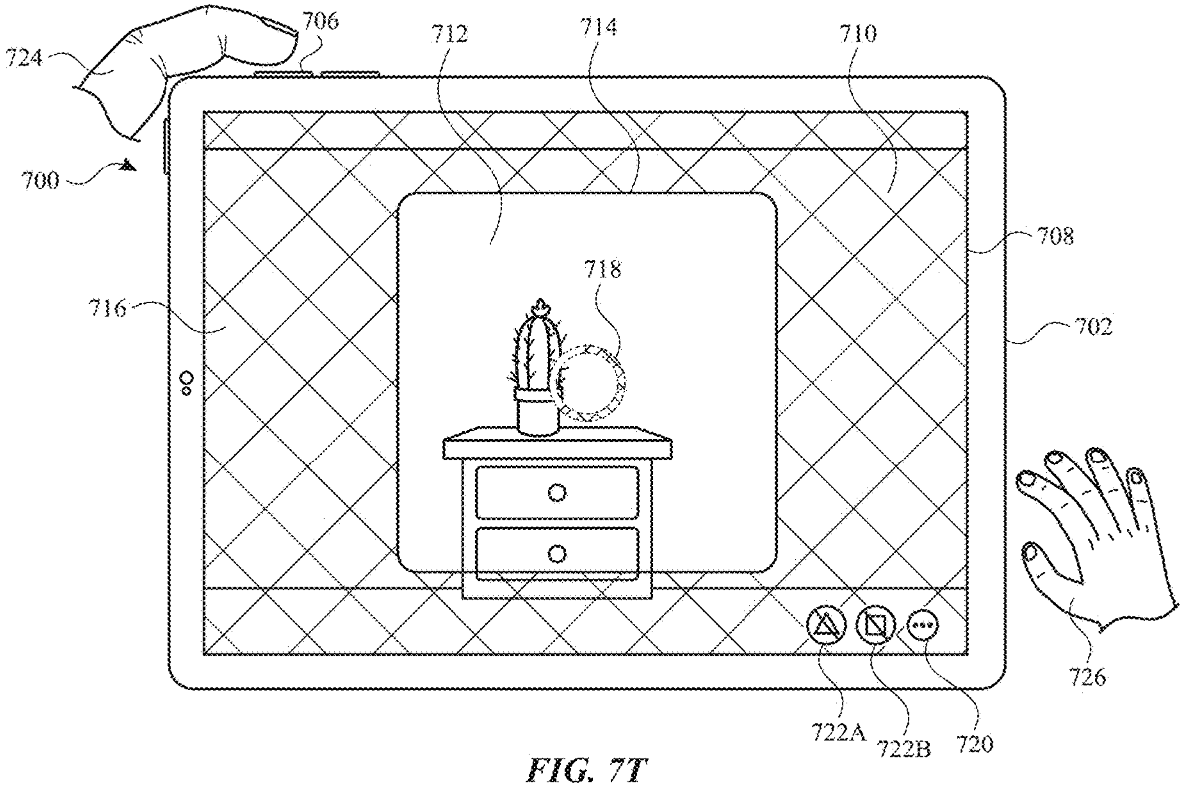
Figure 7U:
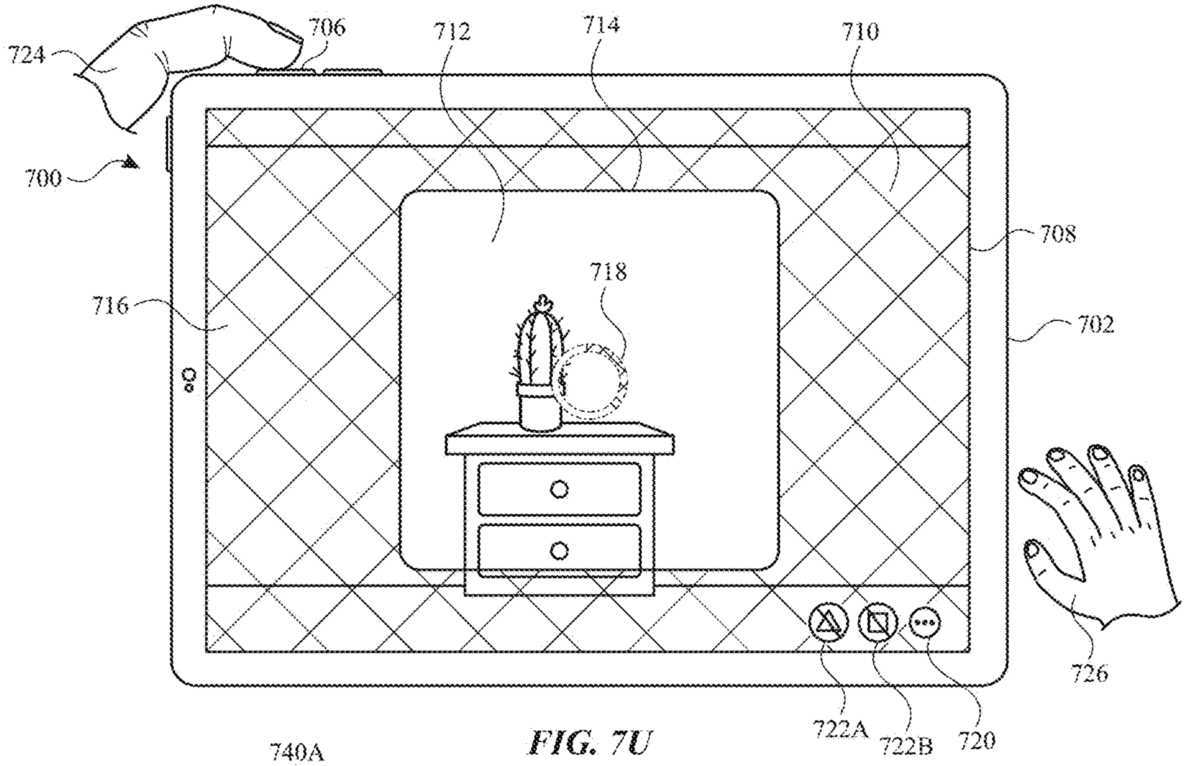

FIGS. 7R-7U illustrate computer system 700 initiating media capture in a timer delay mode (e.g., using a self-timer). At FIG. 7R, when initiating media capture in the timer delay mode, in response to detecting the second potential media capture input (e.g., button press input 736A of hardware button 706, air gesture input 736B, and/or tap input 736C), computer system 700 initiates a three-second media capture timer delay (e.g., instead of initiating media capture immediately following the detection the potential media capture input as illustrated in FIGS. 7I-7J). As illustrated in FIGS. 7S-7U, during the three-second duration of the media capture timer delay, computer system 700 animates shutter affordance 718 to indicate the elapsed time of the media capture timer delay: instead of transparently overlaying the background, at FIG. 7S, computer system 700 causes the space between the concentric rings of shutter affordance 718 to be displayed as a complete, filled-in ring. Then, as shown in FIG. 7T, during the first second of the three-second media capture, computer system reduces the filled-in portion of the space between the concentric rings of shutter affordance 718 by one third (e.g., two-thirds of the complete ring are displayed after the first second has elapsed). As shown in FIG. 7U, during the second of the three-second media capture timer delay, computer system 700 reduces the filled-in portion of the space between the concentric rings of shutter affordance 718 by another third (e.g., one-third of the complete ring is displayed after the second has elapsed). After the entire three-second media capture timer delay has elapsed, computer system 700 initiates media capture (e.g., as described above with respect to FIGS. 7J-7Q and/or below with respect to FIGS. 7W-7AA).

Figure 7V:
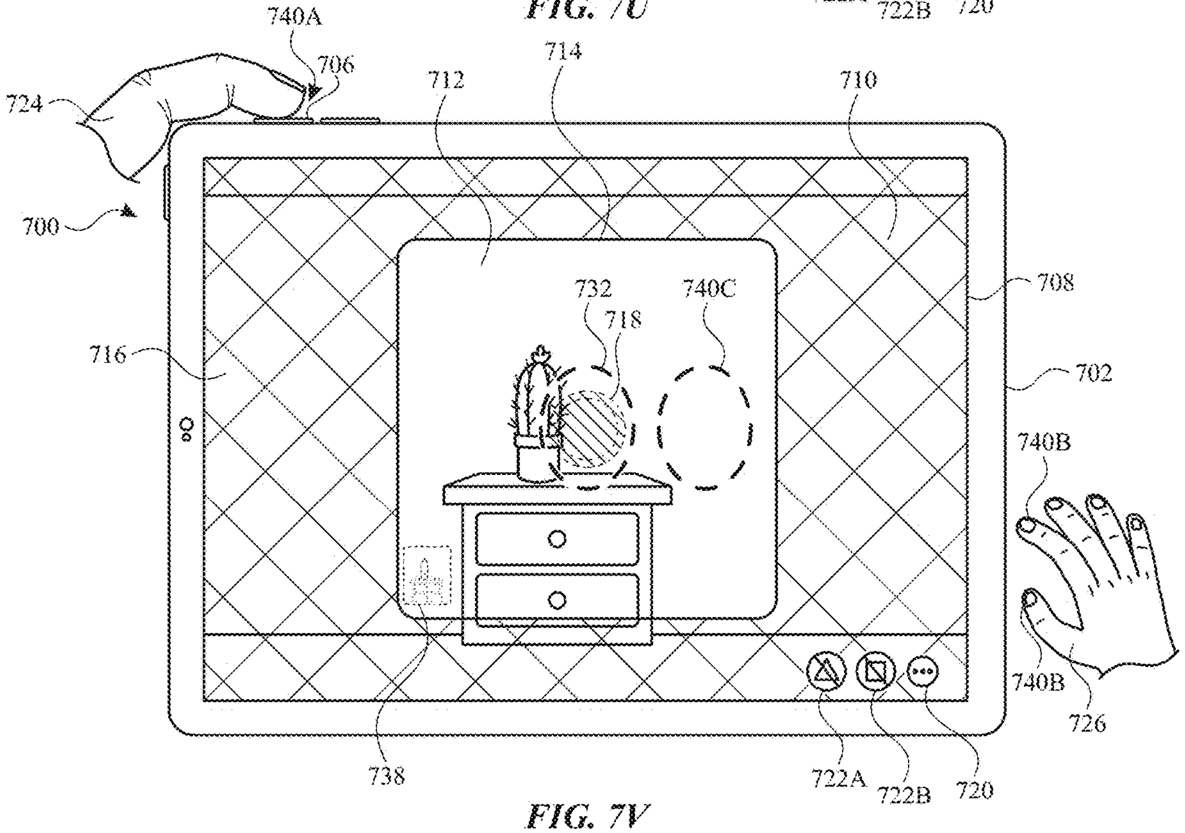

As illustrated in FIG. 7V, while displaying media capture user interface 710, computer system 700 detects a third potential media capture input, such as button press input 740A of hardware button 706, air gesture input 740B, and/or tap input 740C while gaze 732 is directed at shutter affordance 718 (e.g., as described with respect to FIGS. 7I1-7I2). However, instead of being released (e.g., immediately, as described with respect to FIG. 7J), the media capture input is held for a duration of time. When the third potential media capture input is held past the first threshold period of time following the initial detection of the third potential media capture input (e.g., when the third potential media capture input is not immediately released), the circular area of shutter affordance 718 gradually turns a different color (e.g., red, or another color), indicating that a mode of media capture is transitioning from a photo media capture mode to a video media capture mode. In some embodiments, if computer system 700 detects that the third potential media capture input is released while shutter affordance 718 is still turning red (e.g., at the point illustrated in FIG. 7V, before a second threshold period of time has elapsed), computer system 700 captures photo media as described above.

Figure 7W:
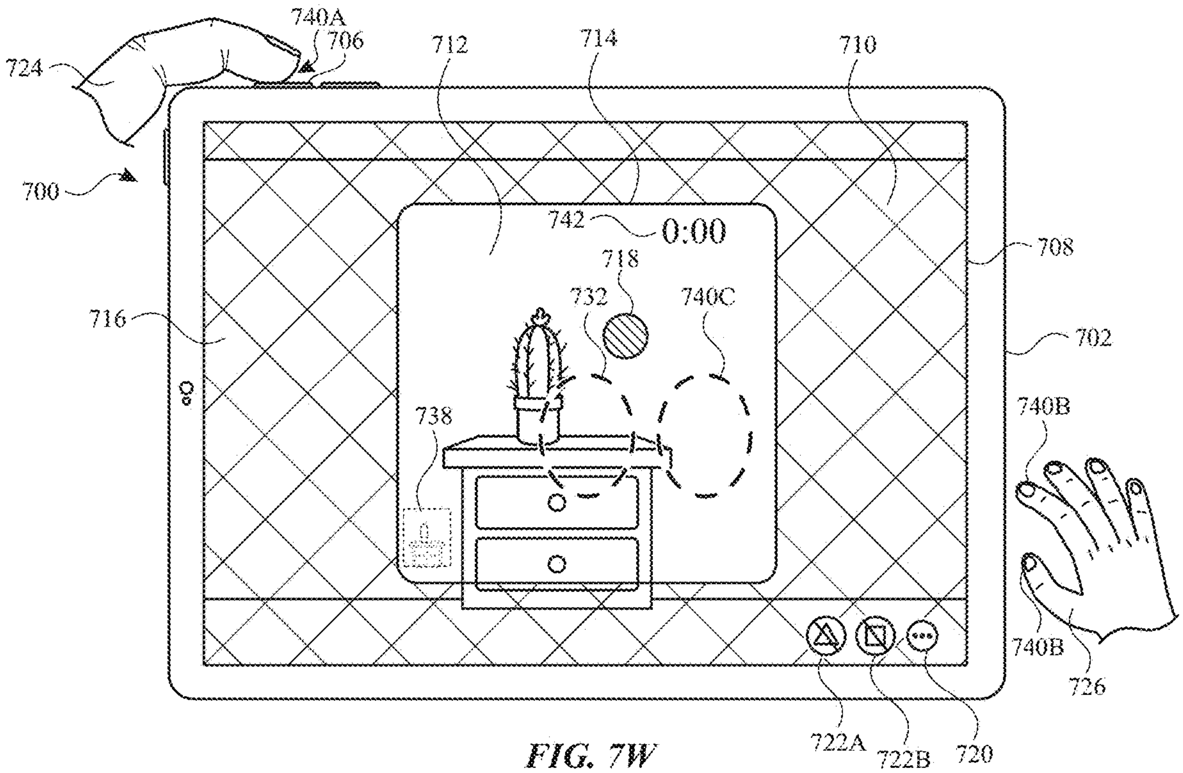

As illustrated in FIG. 7W, the third potential media capture input (e.g., button press input 740A of hardware button 706, air gesture input 740B, and/or tap input 740C) is held until after the second threshold period of time has elapsed, at which point shutter affordance 718 has turned entirely red and begins to shrink and move upwards towards a corner of camera viewfinder 712 (e.g., indicating to the user that the mode of media capture has now transitioned from photo media capture to video media capture). Accordingly, computer system 700 captures video media. In embodiments where computer system 700 initiates capture of both still and video media, computer system 700 discards any captured photo media, determining that the user requested video media based on the extended duration of the third potential media capture input. Upon initiating the video media capture, computer system 700 displays video capture timer 742 at the corner of camera viewfinder 712, indicating the currently elapsed time of the video media capture.

Figure 7X:
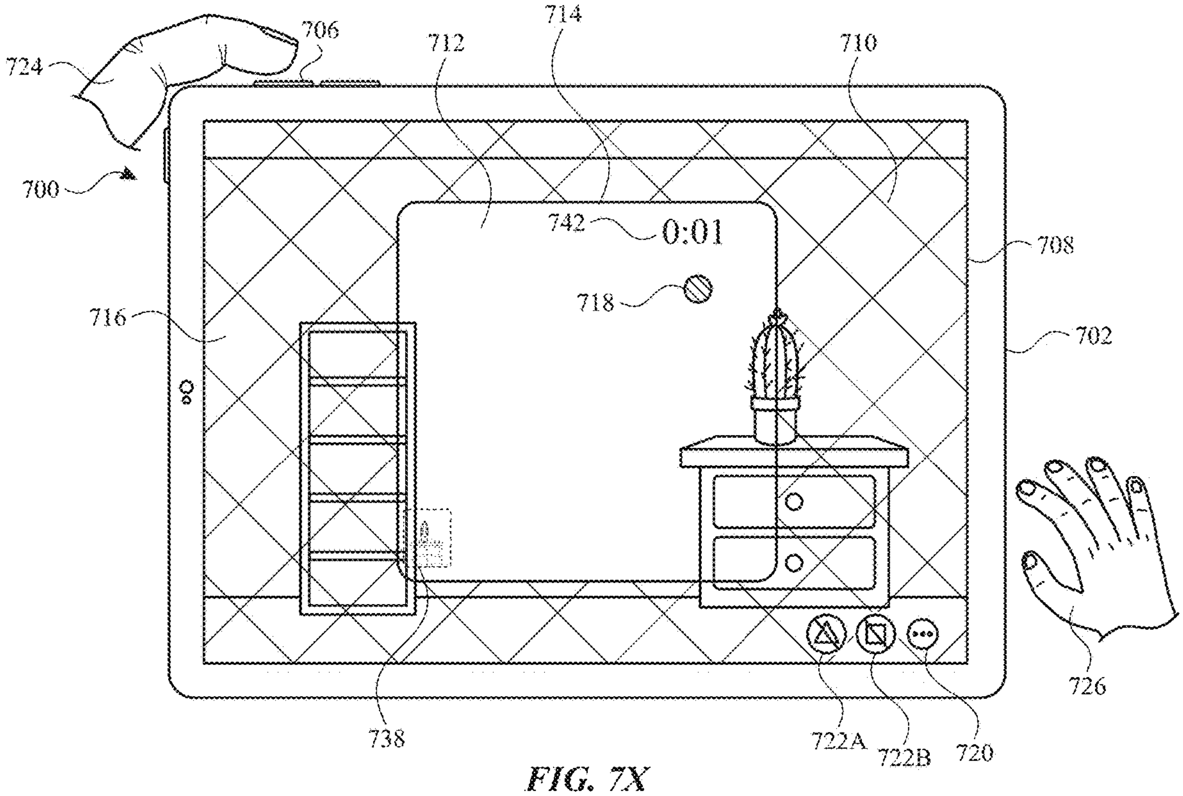

As illustrated in FIG. 7X, once computer system 700 has initiated the video media capture (e.g., indicated to the user by the color and/or movement of shutter affordance 718, and/or the appearance of video capture timer 742), the user releases the third potential media capture input, and the video media capture continues. Shutter affordance 718 continues to shrink and move upwards towards the corner of camera viewfinder 712 where video capture timer 742 is displayed with the currently elapsed time. Additionally, computer system 700 further increases the translucency of captured media icon 738 (e.g., compared to the translucency of captured media icon 738 at FIG. 7P), further decreasing the visual prominence of captured media icon 738 during video media capture.

Figure 7Y:
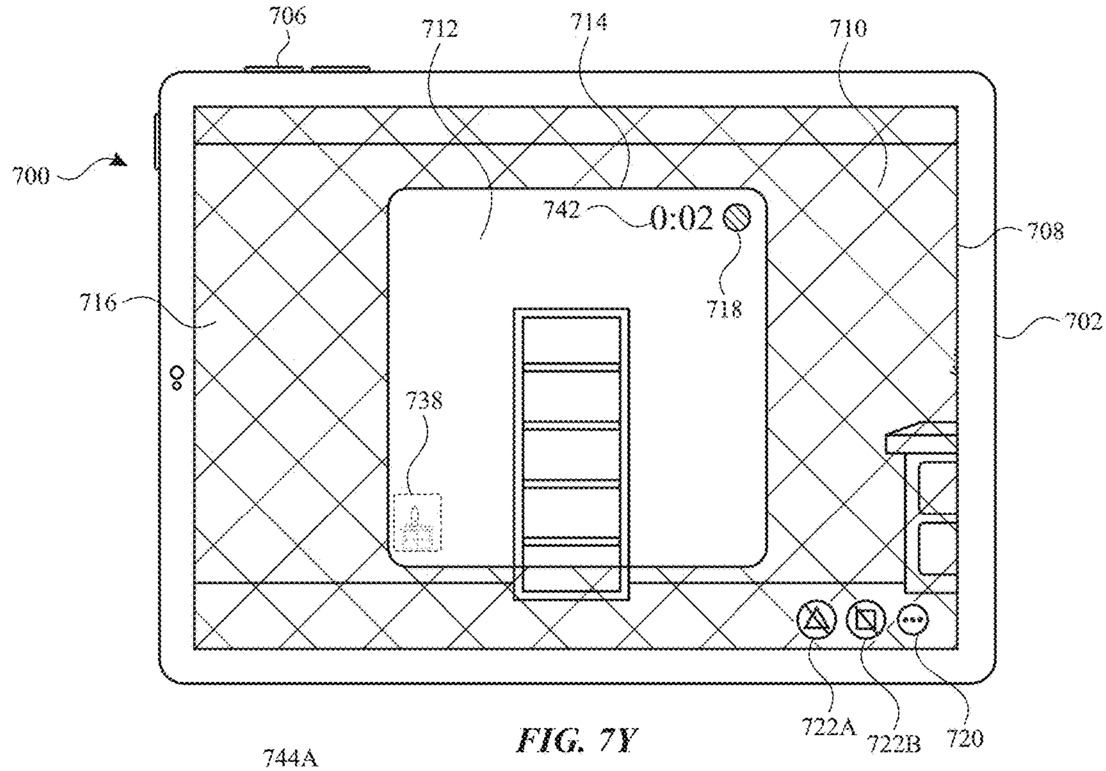

As illustrated in FIG. 7Y, computer system 700 displays shutter affordance 718 as a small red dot in the corner of camera viewfinder 712 next to video capture timer 742 while the video media capture continues. In some embodiments, shutter affordance blinks or pulses next to video capture timer 742, indicating that the video media capture is currently recording. Although computer system 700 no longer detects the position of the user's hand (e.g., finger 724 is no longer near hardware button 706, and/or hand 726 is no longer in the field-of-view of the plurality of cameras), computer system does not change the appearance of darkened area 716 and/or end the video media capture.

Figure 7Z:
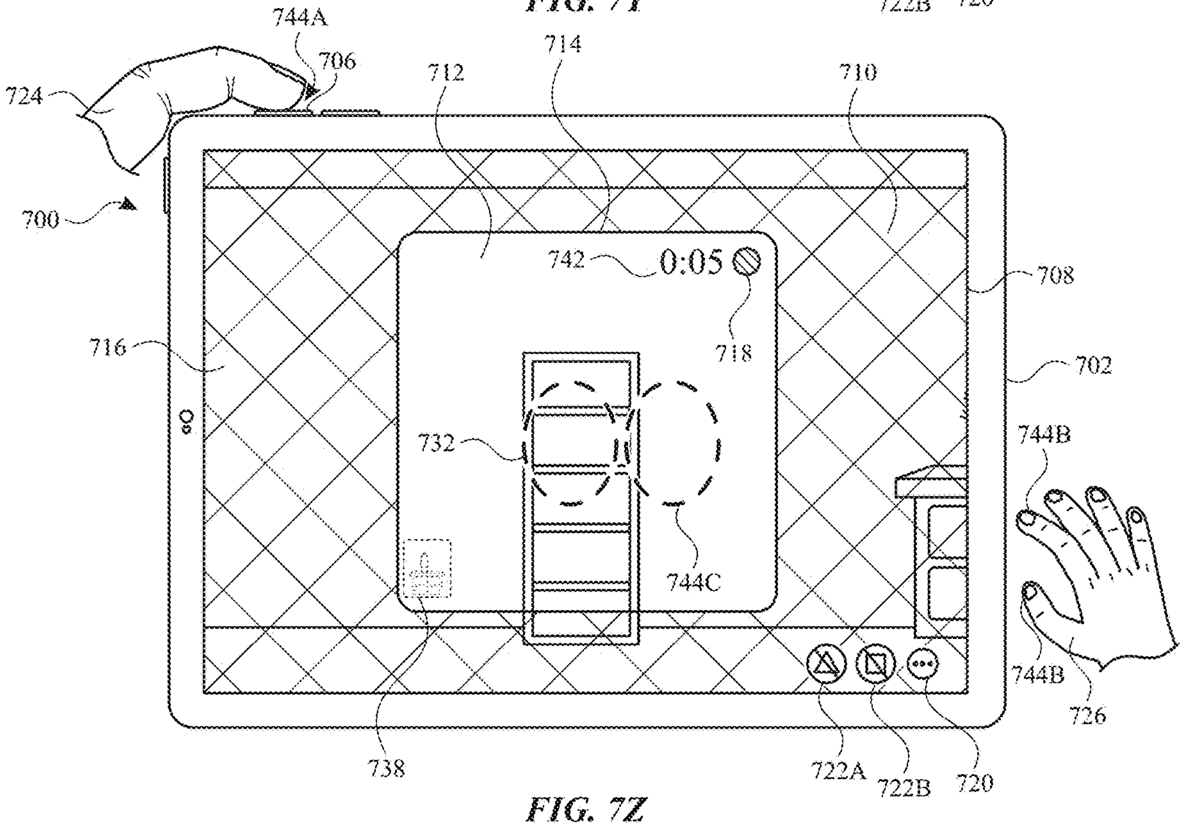
Figure 7A:
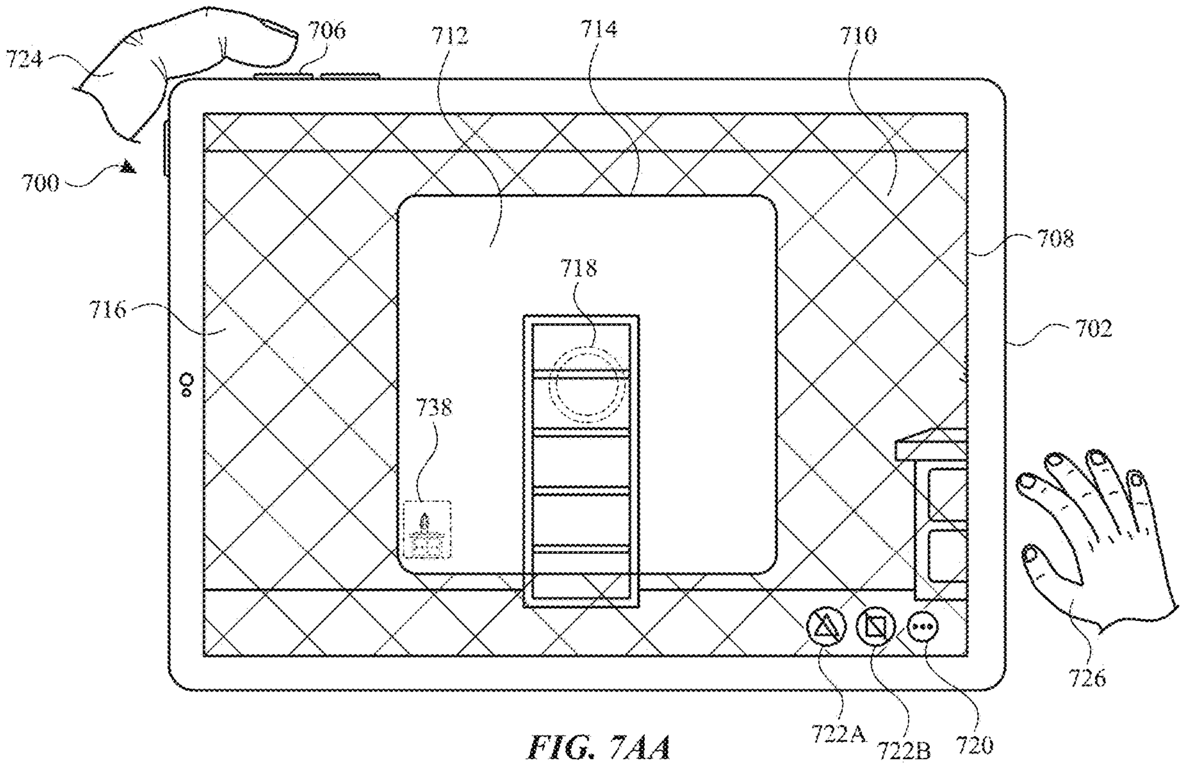
Figure 7A:
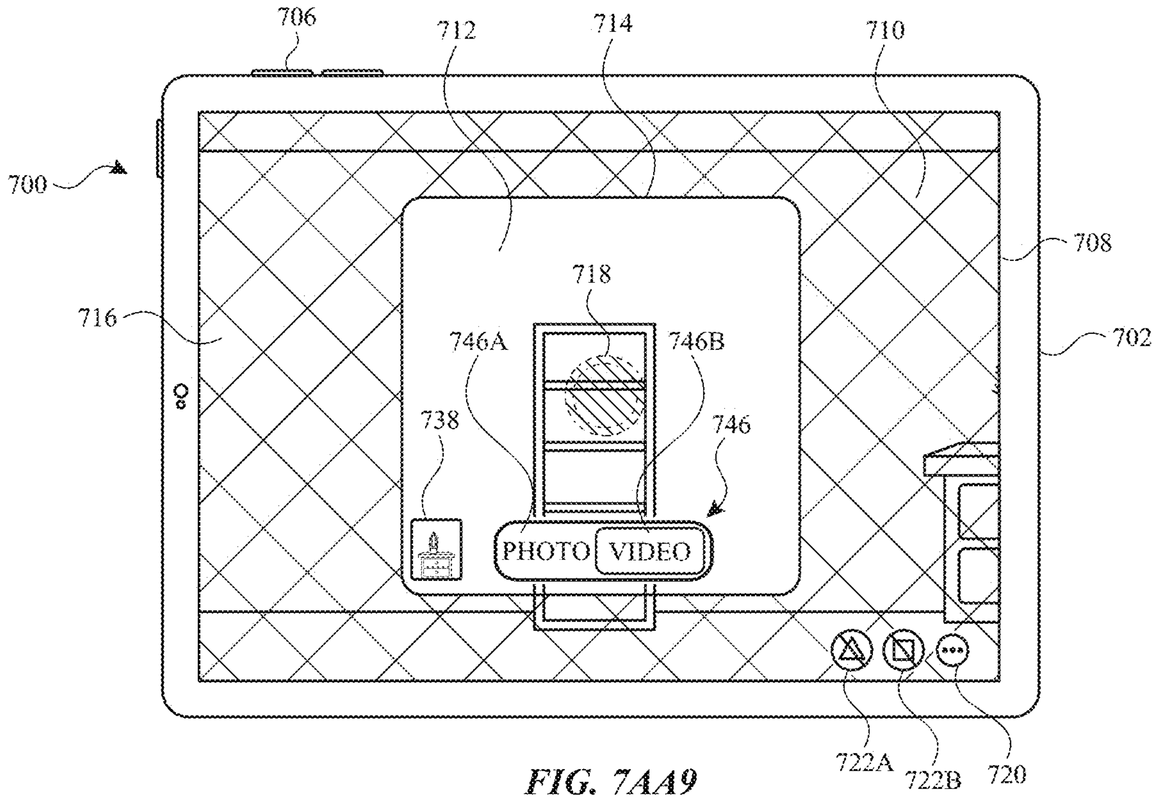
Figure 7A:
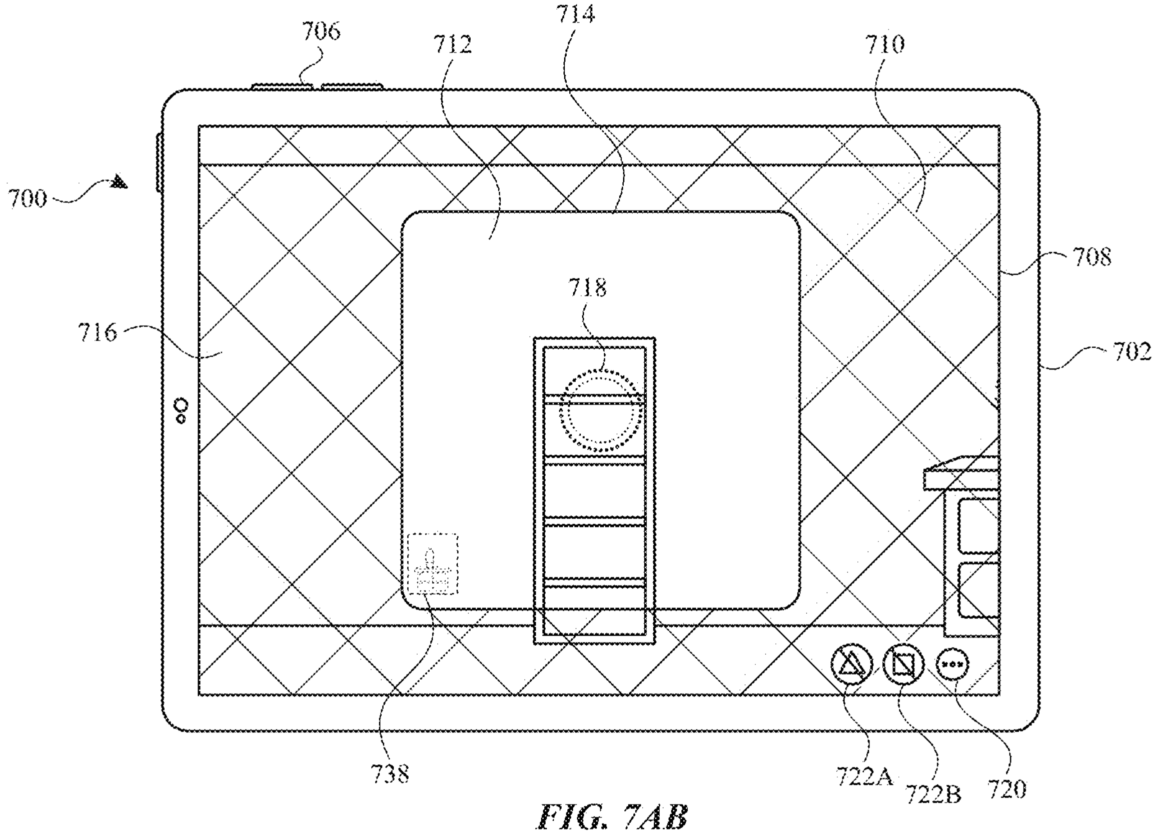

As illustrated in FIG. 7Z, while the video media capture continues, computer system 700 detects a fourth potential media capture input, such as button press input 744A, air gesture input 744B, and/or tap input 744C. In response to detecting the fourth potential media capture input, computer system 700 ends the video media capture. As illustrated in FIG. 7AA, upon ending the video media capture, computer system 700 once again displays shutter affordance 718 at the center of camera viewfinder 712 and ceases to display video capture timer 742 (e.g., computer system 700 changes the appearance of one or more elements of media capture user interface 710 to revert to how they appeared in FIG. 7D). Computer system 700 updates captured media icon 738 to a thumbnail of the completed video media capture. In some embodiments, the appearance of captured media icon 738 changes as described in FIGS. 7O-7Q (e.g., initially appearing larger and overexposed before resolving to a smaller size and lower exposure, and increasing translucency of captured media icon 738 after a threshold amount of time without user interaction).

FIGS. 7AA1-7AA9 illustrate a version of media capture user interface 710 including mode control affordance 746 and video status affordance 750, in accordance with some embodiments. As illustrated in FIG. 7AA1, media capture user interface 710 includes mode control affordance 746, displayed in a lower region of camera viewfinder 712. Mode control affordance 746 includes photo mode affordance 746A and video mode affordance 746B. Computer system 700 initially displays mode control affordance 746 opaquely. Computer system 700 highlights photo mode affordance 746A with a backing platter to indicate that a photo media capture mode is currently selected (e.g., that computer system 700 would currently initiate photo media capture in response to an appropriate media capture input). In some embodiments, computer system 700 displays the text of photo mode affordance 746A with a different color than the text of video mode affordance 746B to indicate the currently-selected media capture mode.

As illustrated in FIG. 7AA2, after a threshold amount of time (e.g., a few seconds) without detecting gaze 732 directed at mode control affordance 746, computer system 700 increases the translucency (e.g., reduces the opacity) of mode control affordance 746 (e.g., as described above with respect to decreasing the visual prominence of captured media icon 738). As illustrated in FIG. 7AA3, in response to detecting gaze 732 directed at mode control affordance 746, computer system 700 decreases the translucency (e.g., increases the opacity) of mode control affordance 746.

As illustrated in FIG. 7AA3, while displaying mode control affordance 746 with photo mode affordance 746A highlighted, computer system 700 detects a fifth potential media capture input, such as button press input 747A of hardware button 706, air gesture input 747B (e.g., an air gesture performed with the thumb and forefinger of hand 726, such as a pinch air gesture), and/or tap input 747C (e.g., on a touch sensitive surface of display 708). At the time the fifth potential media capture input is detected, gaze 732 is directed at mode control affordance 746. Accordingly, in response to the fifth potential media capture input, computer system 700 switches the currently-selected media capture mode from the photo media capture mode to a video media capture mode.

As illustrated in FIG. 7AA4, computer system 700 highlights video mode affordance 746B with a backing platter to indicate that the video media capture mode is currently selected. In some embodiments, computer system 700 changes the color of text of photo mode affordance 746A and of the text of video mode affordance 746B to indicate the currently-selected media capture mode. Additionally, computer system alters the appearance of shutter affordance 718 to indicate that the video media capture mode is currently selected, for example, displaying shutter affordance 718 with a translucent or opaque color fill (e.g., red, or another color).

As illustrated in FIG. 7AA5, while displaying mode control affordance 746 with video mode affordance 746B highlighted and shutter affordance 718 with the color fill, computer system 700 detects a sixth potential media capture input, such as button press input 748A of hardware button 706, air gesture input 748B, and/or tap input 748C while gaze 732 is directed at shutter affordance 718 and accordingly initiates media capture (e.g., as described with respect to FIGS. 7I and/or 7W). As the video media capture mode is currently selected, computer system 700 begins capturing video media.

As illustrated in FIG. 7AA6, while capturing video media, computer system 700 ceases display of mode control affordance 746 and instead displays video status affordance 750 in the lower region of camera viewfinder 712. Video status affordance 750 indicates that video media is currently being captured and includes the currently elapsed time of the video capture. Upon beginning the video capture, computer system 700 initially displays video status affordance 750 opaquely. As illustrated in FIG. 7AA7, after a threshold amount of time (e.g., a few seconds) without detecting gaze 732 directed at video status affordance 750, computer system 700 increases the translucency (e.g., reduces the opacity) of video status affordance 750 (e.g., as described above with respect to changing the visual prominence of captured media icon 738 and/or mode control affordance 746). As illustrated in FIG. 7AA8, in response to detecting gaze 732 directed at video status affordance 750, computer system 700 decreases the translucency (e.g., increases the opacity) of video status affordance 750.

As illustrated in FIG. 7AA8, while displaying video status affordance 750 with increased visual prominence, computer system 700 detects a seventh potential media capture input, such as button press input 752A of hardware button 706, air gesture input 752B, and/or tap input 752C. At the time the seventh potential media capture input is detected, gaze 732 is directed at video status affordance 750. Accordingly, in response to the seventh potential media capture input, computer system 700 ends the video media capture. As illustrated in FIG. 7AA9, upon ending the video media capture, computer system ceases display of video status affordance 750 and again displays mode control affordance 746 in the lower region of camera viewfinder 712.

As illustrated in FIG. 7AB, while computer system 700 is not capturing any media, computer system 700 no longer detects the position of the user's hand (e.g., finger 724 is no longer near hardware button 706, and/or hand 726 is no longer in the field-of-view of the plurality of cameras). In response, computer system 700 changes the appearance of one or more elements of media capture user interface 710, indicating that computer system 700 is no longer in the ready-to-capture state for media capture (e.g., to revert to how the one or more elements of media capture user interface 710 appeared in FIG. 7B).

In some embodiments where computer system 700 is a head-mounted device, the techniques illustrated in FIGS. 7A-7F are implemented as the user prepares to capture media by moving their hand into a position to potentially provide a capture input (e.g., an air gesture and/or interaction with a hardware button) and moves their head, and thus the field-of-view of first camera 704A and second camera 704B, to compose (e.g., frame) a shot. In these embodiments, the user may use gaze, air gestures, and/or hardware button presses to control functionality other than the initiation of media capture, such as selecting options affordance 720 to view and change media capture settings, interacting with virtual objects in an XR environment, or interacting with a virtual assistant. Accordingly, computer system 700 implements the techniques illustrated in FIGS. 7H-7AA when the user gazes at the central region of camera viewfinder 712 (e.g., at or near shutter affordance 718) and provides a potential capture input, as the gaze of the user indicates that the potential capture input is intended to initiate media capture and not to control other functionality.

Additional descriptions regarding FIGS. 7A-7AB are provided below in reference to method 800 described with respect to FIG. 8.

FIG. 8 is a flow diagram of an exemplary method 800 for displaying a user interface for gaze-activated media capture, in some embodiments. In some embodiments, method 800 is performed at a computer system (e.g., 101, 1-100, 1-200, 3-100, 6-100, 6-200, 6-300, 6-400, 11.1.2-100, 700, X700, and/or 702) that is in communication with a display generation component (e.g., 1-102, **1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200, 11.3.2-204, 708, and/or X702) (e.g., a display controller; a touch-sensitive display system; a display (e.g., integrated and/or connected), a 3D display, a transparent display, a projector, a heads-up display, and/or a head-mounted display) and a first camera (e.g., 6-106, 6-114, 6-116, 6-118, 6-120, 6-122, 6-306, 6-416, 11.1.1-104*a-b*, 11.1.2-110*a-f*, 11.3.2-100, 11.3.2-106, and/or 11.3.2-206, 704A, 704B, and/or X704) (in some embodiments, the computer system includes one or more cameras, such as a rear (user-facing) camera and a forward (environment-facing) camera; in some embodiments, the first camera is a virtual camera) (in some embodiments, the computer system includes one or more sensors (e.g., 1-356, 1-456, 6-102, 6-106, 6-108, 6-110, 6-112, 6-114, 6-116, 6-118, 6-120, 6-122, 6-124, 6-126, 6-128, 6-202, 6-203, 6-302, 6-303, 6-306, 6-402, 6-416, 11.1.1-104*a*, 11.1.1-104*b*, 11.1.2-110*a-f*, 11.3.2-100, 11.3.2-106, 11.3.2-206, and/or X704), such as capacitance/touch sensors, gaze sensors, and the like; in some embodiments, the computer system includes at least one hardware button (e.g., 1-128, 1-132, 11.1.1-114, 1-328, 706, X706, and/or X703), which may be dynamically mapped to different functions). In some embodiments, method 800 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 800** are, optionally, combined and/or the order of some operations is, optionally, changed.

The computer system (e.g., 101, 1-100, 1-200, 3-100, 6-100, 6-200, 6-300, 6-400, 11.1.2-100, 700, X700, and/or 702), while displaying (802), via the display generation component (e.g., 1-102, 1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200, 11.3.2-204, 708, and/or X702), a first user interface (e.g., 710 and/or X710) (e.g., a camera/capture UI including a representation of at least a portion of a field-of-view of the first camera) that includes a camera viewfinder (e.g., 712 and/or X712) (e.g., a viewfinder/camera preview object, such as an object framing/encompassing a region for media capture) (in some embodiments, overlaying at least a portion of an environment via a transparent display, pass-through camera data and/or virtual content (e.g., a physical environment, a virtual environment, and/or a mixed-reality environment)), detects (804) a first input (e.g., 730A, 730B, 730C, 736A, 736B, 736C, X736A, X736B, X736C, 740A, 740B, and/or 740C) (an activation or selection input that is used to trigger operations at the device when the input is detected while the user's attention is directed to a selectable user interface object; in some embodiments, a press of a hardware button; in some embodiments, a gesture input, an air gesture (e.g., an air pinch); in some embodiments, a speech input; in some embodiments, the activation input does not include location-based inputs, such as touch inputs on a touch-sensitive display or mouse clicks).

The computer system, in response to detecting the first input (806) and in accordance with a determination that a gaze of a user of the computer system (e.g., 732 and/or X732) (e.g., detected using a camera (e.g., a rear camera) and/or another gaze detection sensor; in some embodiments, gaze detection is always on (e.g., not just detected in response to the activation input)) is directed to (e.g., a determination that the user is looking at or near) a respective region of the camera viewfinder (e.g., a capture activation region of the UI (e.g., a predetermined and/or predefined region), such as the center region of the viewfinder or UI; in some embodiments, some or part of the respective region is indicated by a media capture affordance, such as a ring at the center of the viewfinder) when the first input is detected (e.g., if the user is both (e.g., simultaneously) requesting capture and looking at the appropriate portion of the UI), initiates (808) capture of first media content (in some embodiments, taking a photo; in some embodiments, initiating video capture) using the first camera (e.g., as illustrated in FIGS. 7I1, 7I2, 7R, and 7W).

The computer system, in response to detecting the first input and in accordance with a determination that the gaze of the user of the computer system input is not directed to the respective region of the camera viewfinder when the first input is detected, forgoes (810) initiating capture of the first media content (e.g., as illustrated in FIG. 7G). Initiating media capture in response to a respective user input when the user is looking at a respective region of the camera viewfinder and not initiating media capture when the respective input is received and the gaze of the user is not directed to the respective region provides the user with improved control of media capture. Doing so also improves security and/or privacy, by reducing the risk that unintended media that could include secure and/or private content is captured unintentionally. For example, by forgoing media capture when the user is not looking at the respective region of the viewfinder, media is not captured in response to user inputs that are not intended to trigger media capture (e.g., "false positive" captures are reduced) or when the user isn't paying attention to/focusing on the viewfinder region. Providing the user with improved control of media capture that is less prone to unintended capture (e.g., of secure and/or private content) enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the respective region is a center region within the camera viewfinder (e.g., 712 and/or X712) (e.g., a region that includes a center of the camera viewfinder) (in some embodiments, within or near the capture affordance at the center of the viewfinder; in some embodiments, the respective region is also centered in the first user interface). Only initiating media capture in response to a respective user input when the user is looking at a respective region of the camera viewfinder provides the user with improved control of media capture. For example, by forgoing media capture when the user is not looking at the central region of the viewfinder, media is not captured in response to user inputs that are not intended to trigger media capture (e.g., "false positive" captures are reduced) or when the user isn't paying attention to the central region.

In some embodiments, the first media content includes photo media content (e.g., a still photo and/or media capture of a limited duration) (e.g., as illustrated in FIGS. 7I1-7N)

In some embodiments, the first media content includes video content (e.g., as illustrated in FIGS. 7V-7AA).

In some embodiments, the first user interface (e.g., 710) includes a first media capture selectable interface object (e.g., 718 and/or X718) (e.g., an affordance (e.g., two concentric rings)), and the first media capture selectable interface object is displayed in the respective region (e.g., at the center of the camera viewfinder) (in some embodiments, the respective region is substantially the same region at which the media capture selectable interface object is displayed). Displaying a media capture affordance provides the user with improved visual feedback on a state of the computer system (e.g., whether the system is ready to capture media, whether the system will respond to the respective input) and visually indicates at least a portion the respective region to the user for the gaze activation.

In some embodiments, at least a first element of the first media capture selectable interface object (e.g., 718 and/or X718) (e.g., the concentric rings) is at least partially translucent (e.g., at least a portion of the representation of a field-of-view of the first camera (e.g., of one or more cameras) is partially visible through the media capture selectable interface object) (e.g., the media capture affordance is semi-transparent, such that the environment (in some embodiments, a physical environment; in some embodiments, a virtual environment; in some embodiments, a mixed-reality environment) is visible through, but at least partially obscured by, the media capture affordance). Translucently overlaying the media capture affordance over the field-of-view of the camera provides improved visual feedback on a state of the computer system without excessively obscuring the field-of-view. Doing so also assists the user with composing media capture events and reduces the risk that transient media capture opportunities are missed due to an element of the UI obscuring the environment, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the camera viewfinder, the computer system detects the gaze of the user of the computer system (e.g., 732 and/or X732) is directed to the respective region of the camera viewfinder; and in response to detecting the gaze of the user of the computer system is directed to the respective region of the camera viewfinder (e.g., if a respective input would initiate media capture), the computer system makes a first change to one or more visual features (e.g., altering and/or changing the appearance of the media capture affordance; e.g., the translucency/brightness of the rings, the size of the rings, and/or the color/fill of the rings) of the first media capture selectable interface object (e.g., as illustrated in FIG. 7H). Changing the appearance of the media capture affordance when the user is looking at the respective region provides improved visual feedback on a state of the computer system (e.g., with respect to readiness to capture on input) to the user, indicating that the user is able to capture media using a respective input. Doing so also assists the user with composing media capture events and reduces the risk that transient media capture opportunities are missed.

In some embodiments, making the first change to the one or more visual features of the first media capture selectable interface object (e.g., 718 and/or X718) includes increasing a brightness of at least a portion of the first media capture selectable interface object (e.g., increasing the brightness/opacity of the rings). Changing the appearance of the media capture affordance when the user is looking at the respective region provides improved visual feedback on a state of the computer system (e.g., with respect to readiness to capture on input) to the user, indicating that the user is able to capture media using a respective input. Doing so also assists the user with composing media capture events and reduces the risk that transient media capture opportunities are not missed.

In some embodiments, making the first change the one or more visual features of the first media capture selectable interface object (e.g., 718 and/or X718) includes decreasing a size of at least a portion of the first media capture selectable interface object (e.g., shrinking the rings and/or squeezing the rings closer together). Changing the appearance of the media capture affordance when the user is looking at the respective region provides improved visual feedback on a state of the computer system (e.g., with respect to readiness to capture on input) to the user, indicating that the user is able to capture media using a respective input. Doing so also assists the user with composing media capture events and reduces the risk that transient media capture opportunities are not missed.

In some embodiments, in response to detecting the first input (e.g., 730A, 730B, 730C, 736A, 736B, 736C, X736A, X736B, X736C, 740A, 740B, and/or 740C) (in some embodiments, in response to detecting the respective user input and in accordance with a determination the gaze of the user of the computer system is directed to the respective region of the camera viewfinder), the computer system makes a second change to the one or more visual features of the first media capture selectable interface object based on the first input (in some embodiments, the first input has a first input characteristic (e.g., input speed, input length, and/or input force) and changing one or more visual features of the media capture selectable interface object varies based on a value of the input characteristic) (e.g., as illustrated in FIGS. 7I1-7J). Changing the appearance of the media capture affordance based on the respective input provides improved visual feedback on a state of the computer system to the user (e.g., with respect to the user's input being detected by the system), indicating that the system is responding to the respective input. Providing feedback to the user about the state of the respective input makes the user-system interface more efficient (e.g., by helping the user to provide proper inputs and reducing unnecessary additional user inputs) which, additionally, reduces power usage and improves battery life of the system by enabling the user to use the system more quickly and efficiently.

In some embodiments, the first input includes a first stage (e.g., an initial stage, such as an at least partially closed pinch or an at least partially depressed hardware button) and a second stage (e.g., a later stage, such as the release of a pinch or a hardware button). In some embodiments, making the second change the one or more visual features of the first media capture selectable interface object based on the first input includes, in response to detecting the first stage of the first input (e.g., in response to detecting the initiation of the pinch or button press), making a third change to the one or more visual features of the first media capture selectable interface object (e.g., decreasing the size of the rings and squeezing them together while the pinch is closing or hardware button is being depressed) (e.g., as illustrated in FIG. 7I1-7I2), and in response to detecting the second stage of the first input (e.g., in response to detecting the release of the pinch or button press), making a fourth change to the one or more visual features of the first media capture selectable interface object (e.g., increasing the size of the rings to a default size and temporarily increasing the opacity/brightness of the rings when the pinch or hardware button is released) (e.g., as illustrated in FIG. 7J). Changing the appearance of the media capture affordance based on the respective input provides improved visual feedback on a state of the computer system to the user (e.g., with respect to detecting the cessation of the user input), indicating to the user that the respective input is no longer active. Providing feedback to the user about the state of the respective input makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, after making the third change to the one or more visual features of the first media capture selectable interface object, in accordance with a determination that a duration of the first stage of the first input exceeds a first duration threshold (e.g., in response to detecting that the pinch or button press is being held by the user (e.g., as opposed to being immediately/quickly released)), the computer system makes a fifth change to the one or more visual features of the first media capture selectable interface object (e.g., as illustrated in FIG. 7V). Changing the appearance of the media capture affordance based on the respective input provides improved visual feedback on a state of the computer system to the user (e.g., with respect to the duration of the respective input exceeding a threshold), indicating to the user when the input is transitioning into a "long" input (e.g., when the input has been held long enough to trigger, e.g., video capture). Providing improved visual feedback to the user about the state of the respective input makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to detecting the first input, in accordance with a determination that the gaze of the user of the computer system is directed to the respective region of the camera viewfinder when the first input is detected, the computer system displays an animation (e.g., as illustrated in FIGS. 7S-7U) in conjunction with (e.g., on or around) the first media capture selectable interface object, wherein the animation indicates a currently-elapsed time of a media capture delay timer (e.g., adding or removing portions of a ring as time elapses; opening or closing a ring as time elapses; and/or displaying a countdown on or around the media capture affordance). Displaying a timer elapse animation in conjunction with the media capture affordance provides improved visual feedback on a state of the system to the user (e.g., with respect to a state of media capture), for example, indicating to the user that the media capture will be initiated and indicating an elapsed or remaining time delay until the media capture actually begins, without the user needing to change their focus to a different part of the UI. Providing the user with improved visual feedback on the state of a delayed media capture makes the user-system interface more efficient (e.g., by helping the user to provide proper inputs and reducing unnecessary additional user inputs) which, additionally, reduces power usage and improves battery life of the system by enabling the user to use the system more quickly and efficiently.

In some embodiments, the first input includes an air gesture (e.g., 730B, 736B, X736B, and/or 740B) (e.g., an air pinch (e.g., performed with the thumb and forefinger), an air tap, and/or an air double tap) (in some embodiments, the air gesture is detected using at least the first camera (e.g., of one or more cameras)). Initiating media capture in response to an air gesture while the gaze of the user is directed to a respective region, provides the user with additional control options without cluttering the user interface and/or without having to interact with a specific hardware control element (e.g., a button or touch-sensitive surface of the computer system that may not be visible to the user (e.g., when operating an HMD)). Doing so also reduces the risk that transient media capture opportunities are missed due to a failure to locate and/or activate a necessary input element.

In some embodiments, the first input includes an activation of a hardware button in communication with the computer system (e.g., 730A, 736A, X736A, and/or 740A) (e.g., pressing a button on a device or headset; in some embodiments, the hardware button is a multifunction button; in some embodiments, the button includes capacitive sensors to detect the proximity and/or touch of a finger). Initiating media capture in response to a user activating a hardware button while the gaze of the user is directed to a respective region, provides the user with additional control options without cluttering the user interface. Doing so also makes the user-system interface more efficient (e.g., a single hardware button may be used for multiple different functions, where the media capture function is activated based on gaze) which, additionally, reduces power usage and improves battery life of the system by enabling the user to use the system more quickly and efficiently.

In some embodiments, while displaying the first user interface and prior to detecting the first input, the computer system detects a second input (e.g., an input indicating that the user may initiate media capture; in some embodiments, when the user raises their hand into view of the camera; in some embodiments, when the user's finger is near or on the hardware button) (in some embodiments, a user intent, such as an intent to prepare to capture media or an intent to place the system in a ready-to-capture state, is determined based on the second respective input). In some embodiments, in response to detecting the second input (in some embodiments, in response to determining the user intent), the computer system makes a first change to one or more visual features of the first user interface (e.g., transitioning the UI to a "ready-to-capture" state, e.g., by darkening the vignetting around the camera preview; increasing/decreasing the prominence (e.g., opacity/brightness/size) of the capture affordance; and/or increasing or decreasing the prominence of other UI elements) (e.g., as illustrated in FIG. 7C). Changing the appearance of the first user interface in response to detecting a user input indicating that the user may initiate media capture provides improved visual feedback on a state of the computer system (e.g., with respect to the system preparing for potential media capture) to the user, indicating that the user may be able to capture media using a respective input. Doing so also assists the user with composing media capture events and reduces the risk that transient media capture opportunities are missed.

In some embodiments, detecting the second input includes detecting a position of a user's hand (e.g., 724, 726, and/or 750A) (e.g., a position in the field-of-view of the camera; a position near or on the hardware button) (in some embodiments, detecting the second respective input includes determining that the position of the user's hand indicates an intent to capture media). Changing the appearance of the UI in response to detecting the position of user's hand provides intuitive and efficient control of media capture, for example, entering a ready-to-capture state in response to detecting that the user's hand has moved into a position to provide further inputs (e.g., the respective input) without requiring the user to provide additional inputs. Doing so also assists the user with composing media capture events and reduces the risk that transient media capture opportunities are missed.

In some embodiments, making the first change to the one or more visual features of the first user interface includes altering an appearance (e.g., increasing the size, increasing the opacity, and/or darkening) of an area of the first user interface outside the camera viewfinder (e.g., 716 and/or X716) (e.g., vignetting the camera viewfinder or otherwise modifying the visual appearance of an edge of the camera viewfinder; in some embodiments, the area of the user interface overlays a portion of a field-of-view of the first camera (e.g., of the one or more cameras) that would not currently be included in a media capture). Altering the appearance of the UI outside of the camera viewfinder provides improved visual feedback on a state of the computer system without excessively obscuring the field-of-view. Doing so also assists the user with composing media capture events (e.g., by framing an approximate capture region) and reduces the risk that transient media capture opportunities are missed due to an element of the UI obscuring the environment, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, making the first change to the one or more visual features of the first user interface includes altering an appearance of a second media capture user interface object (e.g., 718 and/or X718) (e.g., increasing or decreasing the opacity of the rings; darkening or brightening the rings; and/or changing the size of the rings to increase or decrease the prominence of the media capture affordance (e.g., relative to one or more other portions of the first user interface)) (in some embodiments, the second media capture user interface object is the same as the first media capture user interface object). Altering the appearance of a media capture affordance provides improved visual feedback on a state of the computer system without excessively obscuring the field-of-view. Doing so also assists the user with composing media capture events and reduces the risk that transient media capture opportunities are missed due to an element of the UI obscuring the environment, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, making the first change to the one or more visual features of the first user interface includes altering an appearance (e.g., increasing or decreasing the prominence of by altering the opacity, and/or brightness/contrast, size) of one or more user interface elements (e.g., 722A, 722B, X722A, X722B, 720, X720, and/or 738) other than a third media capture selectable interface object (e.g., 718 and/or X718) (e.g., photo well, settings affordances, text, and/or status indicators) (in some embodiments, the third media capture selectable interface object is the same as the second and first media capture selectable interface objects). Changing the appearance of the first user interface in response to determining a user intent provides improved visual feedback on a state of the computer system (e.g., with respect to preparing for potential media capture) to the user, indicating that the user may be able to capture media using a respective input. Doing so also assists the user with composing media capture events and reduces the risk that transient media capture opportunities are missed.

In some embodiments, while displaying the first user interface, the computer system detects a third input (in some embodiments, a cessation of the second respective input, such as when the user lowers their hand out of view of the camera or when the user's finger is not near or on the hardware button; in some embodiments, an input that conveys user intent, such as an intent to not capture media/to remove the system from a ready-to-capture state, is determined based on the third respective input; in some embodiments, lowering the hand and/or removing the finger from the hardware button is not detected and/or determined to correspond to an intent to return to the idle state if a video capture is ongoing, so, e.g., the vignetting does not change in appearance during the course of video capture). In some embodiments, in response to detecting the third input, the computer system makes a change to the one or more visual features of the first user interface based on the third input (e.g., as illustrated in FIG. 7AB) (e.g., brightening the vignetting around the camera preview; increasing/decreasing the prominence (e.g., opacity/brightness/size) of the capture affordance; and/or increasing or decreasing the prominence of other UI elements; in some embodiments, the second change to the UI reverts the changes made when entering the ready-to-capture state (e.g., the first change to the UI)). Changing the appearance of the first user interface in response to determining a user intent provides improved visual feedback on a state of the computer system to the user, indicating that the system may not be ready to capture media using a respective input. Doing so also assists the user with composing media capture events and reduces the risk that transient media capture opportunities are missed.

In some embodiments, the camera viewfinder (e.g., 712 and/or X712) overlays (e.g., includes or frames; in some embodiments, at least semi-transparently) a first portion of a representation of a field-of-view of the first camera (e.g., of one or more cameras) (e.g., approximately the portion of the field-of-view of the first camera that would currently be included in a media capture; in some embodiments, the field-of-view of the first camera is displayed using the display-generation component (e.g., displaying the camera data stream, such as pass-through video); in some embodiments, the UI is overlaid over the field-of-view of the first camera using a transparent display). In some embodiments, the first user interface includes a first visual indication (e.g., 714, X714, 716, and/or X716) (e.g., a transition or gradient to darkening and/or blurring) along a first edge of the camera viewfinder (e.g., the border/frame of the capture region), wherein the first visual indication modifies (e.g., vignettes (e.g., blurs or darkens)) a visual appearance of a second portion of the representation of the field-of-view of the first camera that corresponds to a location of the first visual indication. Altering the appearance of a media capture affordance provides improved visual feedback on a state of the computer system without excessively obscuring the field-of-view. Doing so also assists the user with composing media capture events and reduces the risk that transient media capture opportunities are missed due to an element of the UI obscuring the environment, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, initiating the capture of the first media content using the first camera (e.g., of one or more cameras) includes displaying, via the display generation component, a first media capture animation (e.g., as illustrated in FIGS. 7J-7N and FIGS. 7W-7Y) (in some embodiments, an animation indicating that media capture has been initiated, such as a shutter animation or the red dot disappearing and/or traveling to the corner). Displaying a media capture animation when media capture is initiated provides improved visual feedback on the state of the computer system to the user, for example, indicating that media capture has been successfully initiated and/or indicating the type of media capture (e.g., still or video) that will be initiated. Providing the user with improved visual feedback on the state and type of media capture makes the user-system interface more efficient (e.g., by helping the user to provide proper inputs and reducing unnecessary additional user inputs) which, additionally, reduces power usage and improves battery life of the system by enabling the user to use the system more quickly and efficiently.

In some embodiments, displaying the first media capture animation includes darkening (e.g., reducing the brightness of and/or overlaying with at least partially-translucent shading) a second area (e.g., 716 and/or X716) of the first user interface (e.g., an area outside of the camera viewfinder (e.g., an area at or near an outer edge of the first user interface)) and expanding the darkened first area towards a center of the camera viewfinder (e.g., as illustrated in FIGS. 7J-7L) (e.g., a shutter closing animation, where the darkness closes into the capture region). Displaying a "shutter closing" animation when media capture is initiated provides improved visual feedback on the state of the computer system to the user, for example, indicating that a photo media capture has been successfully initiated and is currently in process (e.g., the user may not be able to initiate another capture until the animation is finished). Providing the user with improved visual feedback on the state and type of media capture makes the user-system interface more efficient (e.g., by helping the user to provide proper inputs and reducing unnecessary additional user inputs) which, additionally, reduces power usage and improves battery life of the system by enabling the user to use the system more quickly and efficiently.

In some embodiments, displaying the first media capture animation includes darkening (e.g., reducing the brightness of and/or overlaying with at least partially-translucent shading) a third area (e.g., 716 and/or X716) of the first user interface and contracting the darkened third area away from a center of the camera viewfinder (e.g., as illustrated in FIGS. 7L-7N) (e.g., a shutter opening animation, where the darkness retracts from the capture region). Displaying a "shutter opening" animation when media capture is initiated provides improved visual feedback on the state of the computer system to the user, for example, indicating that a photo media capture has been successfully initiated and is currently in process (e.g., the user may not be able to initiate another capture until the animation is finished). Providing the user with improved visual feedback on the state and type of media capture makes the user-system interface more efficient (e.g., by helping the user to provide proper inputs and reducing unnecessary additional user inputs) which, additionally, reduces power usage and improves battery life of the system by enabling the user to use the system more quickly and efficiently.

In some embodiments, prior to displaying the first media capture animation, the first user interface includes a second visual indication (e.g., a transition or gradient to darkening and/or blurring; in some embodiments, the second visual indication is the same as the first visual indication (e.g., the vignetting)) along a second edge of the camera viewfinder (e.g., the border/frame of the capture region; in some embodiments, the second edge of the camera viewfinder is the same as the first edge) that darkens a first portion of the user interface (e.g., 716 and/or X716) to a first level of darkening (e.g., a low- or intermediate-level of vignetting is displayed when the camera is in an idle or ready-to-capture state). In some embodiments, displaying the first media capture animation includes darkening at least a second portion of the user interface (e.g., 716 and/or X716) to a second level of darkening, wherein the second level of darkening appears darker than the first level of darkening (e.g., the shutter animation vignetting is the highest level (e.g., darkest and/or most opaque) of vignetting). Displaying a capture animation that darkens the user interface further than the user interface is darkened in other states (e.g., idle or ready-to-capture) provides improved visual feedback on the state of the computer system to the user, for example, indicating that the capture has been successfully initiated and/or is in progress. Providing the user with improved visual feedback on the state of media capture makes the user-system interface more efficient (e.g., by helping the user to provide proper inputs and reducing unnecessary additional user inputs) which, additionally, reduces power usage and improves battery life of the system by enabling the user to use the system more quickly and efficiently.

In some embodiments, in response to initiating the capture of the first media content using the first camera (e.g., of one or more cameras) and in accordance with a determination that the first input corresponds to a request to capture a first type of media (e.g., 736A, 736B, 736C, X736A, X736B, and/or X736C) (e.g., an input for still capture; in some embodiments, a quick/immediate release, such as if the input is released before the red dot appears in the first place; in some embodiments, release before a threshold is reached, such as before the red dot has faded in more than a threshold amount), the computer system displays a media capture animation of a first type (e.g., as illustrated in FIGS. 7J-7N) (e.g., the still capture shutter animation). In some embodiments, in response to initiating the capture of the first media content using the first camera and in accordance with a determination that the first input corresponds to a request to capture a second type of media (e.g., 740A, 740B, and/or 740C) (e.g., an input for a video capture; in some embodiments, release following a long/held input, such as if the input is released after the red dot has faded in more than a threshold amount), displaying a media capture animation of a second type (e.g., as illustrated in FIGS. 7W-7Y) (e.g., having the red dot disappear and/or travel to become the recording indicator). Displaying different types of media capture animations provides improved visual feedback on the state of the computer system to the user, for example, indicating to the user whether the input met criteria for a first type of media capture (e.g., a short pinch or button press for photo media capture) or a second type of media capture (e.g., a long pinch or button press for video capture). Providing the user with improved visual feedback on the state of media capture makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to detecting an initial portion of the first input (in some embodiments, detecting that the user input has been held/maintained for longer than a certain duration, but not yet long enough to correspond to a video input), the computer system displays a first visual indicator for a respective period of time (e.g., as illustrated in FIG. 7V) (e.g., gradually turning the capture affordance red over the remaining time left before video capture is triggered). In some embodiments, the first input corresponds to a request to capture the first type of media when cessation of the first input is detected while the first visual indicator continues to be displayed (e.g., if the user releases the input before the capture affordance is no longer red), and the first input corresponds to a request to capture the second type of media when cessation of the first input is detected after the first visual indicator ceases to be displayed (e.g., as illustrated in FIGS. 7W-7X) (e.g., if the user releases the input after the fade to red has completed and then disappears (e.g., the capture affordance reverts to its default color)). Displaying a transition animation provides improved visual feedback on a state of the computer system, for example, indicating to the user that the media capture type will soon switch if the input continues to be held past the end of the transition animation. Providing the user with improved visual feedback on the state of media capture makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, after capturing the first media content, the computer system displays, via the display generation component, a representation (e.g., a thumbnail) of the first media content (e.g., 738) (in some embodiments, the photo well is located in the camera viewfinder region, e.g., in the lower left corner, lower right corner, or other corner; in some embodiments, the representation of the first media content is displayed until subsequent media content is captured; in some embodiments, the photo well is only displayed after the first media capture in a given media capture session (e.g., it is not displayed when a new media capture session is initiated)). Displaying a representation of the first media content provides improved visual feedback on a state of the computer system, for example, confirming to the user that media was captured and allowing the user to assess aspects of the captured media (e.g., exposure and/or framing). Displaying the representation of the first media content after capture (e.g., automatically) reduces the number of inputs needed to perform an operation (e.g., for the user to view the recently captured media).

In some embodiments, displaying the representation of the first media content (e.g., 738) includes (in some embodiments, initially includes, e.g., immediately after capture is completed) displaying an animation of a change of appearance (e.g., resolving from overexposed to a target exposure level, decreasing in size, and/or decreasing in opacity) of the representation of the first media content (e.g., as illustrated in FIGS. 7O-7Q). Displaying an animation of the representation of the first media content changing appearance provides improved visual feedback on a state of the computer system. For example, the representation of the media content may blend in with the background (e.g., if the user just took a photo of whatever is in the background), so temporarily increasing the prominence of the representation helps the user find and view the thumbnail.

In some embodiments, at least a portion of the representation of the first media content is at least partially transparent (e.g., as illustrated in FIG. 7Q). Displaying an at least partially-transparent photo well provides improved visual feedback on a state of the computer system without excessively obscuring the field-of-view. Doing so also assists the user with composing media capture events and reduces the risk that transient media capture opportunities are missed due to an element of the UI obscuring the environment, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the representation of the first media content (e.g., 738), the computer system detects a user interaction with the representation of the first media content (e.g., a user input, a gaze, and/or an action taken using the user interface). In some embodiments, in response to detecting the user interaction with the representation of the first media content, the computer system changes (e.g., increasing or decreasing) a degree of transparency of the representation of the first media content (in some embodiments, decreasing the degree of transparency (e.g., increasing opacity) in response to the user looking at the photo well) (in some embodiments, the degree of transparency is also changed (e.g., increased) in response to detecting a user interaction with something other than the representation, such as in response to the user starting a media capture). Changing the transparency of the photo well in response to interactions provides improved visual feedback on a state of the computer system without excessively obscuring the field-of-view. Doing so also assists the user with composing media capture events and reduces the risk that transient media capture opportunities are missed due to an element of the UI obscuring the environment, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, detecting the user interaction with the representation of the first media content (e.g., 738) includes determining that a gaze of the user of the computer system is directed to the representation of the first media content (e.g., the user interacts with the photo well by looking at it; in some embodiments, the degree of transparency of the representation of the first media content is decreased, making the photo well more opaque while the user is looking at it; in some embodiments, the photo well fades (increases transparency) after a threshold period of time without gaze). Decreasing the transparency of the photo well in response to the user looking at the photo well provides improved visual feedback on a state of the computer system without excessively obscuring the field-of-view. Doing so also assists the user with composing media capture events and reduces the risk that transient media capture opportunities are missed due to an element of the UI obscuring the environment, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, detecting the user interaction with the representation of the first media content (e.g., 738) includes detecting an initiation of a capture of second media content using the first camera (e.g., as illustrated in FIG. 7V) (e.g., of the one or more cameras) (e.g., the user has initiated a new media capture; in some embodiments, the degree of transparency is increased, fading the photo well while the user is capturing media; in some embodiments, the photo well reverts to a default transparency after the media capture is completed). Increasing the transparency of the photo well in response to interactions provides improved visual feedback on a state of the computer system without excessively obscuring the field-of-view. Doing so also assists the user with composing media capture events and reduces the risk that transient media capture opportunities are missed due to an element of the UI obscuring the environment, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first user interface includes a fourth media capture selectable interface object (e.g., 718 and/or X718) (in some embodiments, the fourth media capture selectable interface object is the same as the first, second, and/or third media capture selectable interface object) displayed at a first location (e.g., a center of the camera viewfinder) in the first user interface, the capture of the first media content using the first camera (e.g., of one or more cameras) includes a video capture, and initiating the capture of the first media content using the first camera includes displaying, via the display generation component, an animation of the fourth media capture selectable object (e.g., the concentric circles) moving towards a second location (e.g., as illustrated in FIGS. 7W-7Y) (e.g., the media capture affordance can move to become a recording indicator, e.g., in a corner of the camera viewfinder or UI; in some embodiments, the second location includes a video capture timer; in some embodiments, the media capture affordance has turned red, and the red dot shrinks and travels towards the video timer to become the pulsing red recording dot). Moving the capture affordance to a new location while capturing video content provides improved visual feedback on a state of the computer system without unnecessarily obscuring the media capture or adding unnecessary new elements to the user interface. Doing so also makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, at least a third portion of the first user interface (e.g., 710 and/or X710) overlays at least a portion of a field-of-view of the first camera (e.g., of one or more cameras), and wherein displaying the first user interface includes changing one or more visual features of the at least third portion of the user interface (e.g., the color, size, and/or weight of text, lines, and/or icons) based on (e.g., sampling background color to match UI and/or changing UI from light mode to dark mode) the at least portion of the field-of-view of the first camera. Changing the appearance of the UI based on the appearance of background content provides improved control of media capture, for example, by partially blending UI elements into the background content for a less obtrusive UI. Doing so also assists the user with composing media capture events and reduces the risk that transient media capture opportunities are missed due to an element of the UI obscuring the environment, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system detects a movement of a field-of-view of the first camera (e.g., of one or more cameras) in a first direction (e.g., a movement vector normalized to the plane of the media capture). In some embodiments, while detecting the movement of the field-of-view of the first camera in the first direction, the computer system moves a second portion of the first user interface (e.g., 712) away from an initial position of the second portion of the first user interface (e.g., the default/non-moving position of the UI portion when the camera movement begins) in a second direction opposite to the first direction (e.g., as illustrated in FIGS. 7D-7E) (e.g., as if the UI portion is attached to the camera with a spring, such that movement of the camera does not immediately result in movement of the UI portion). In some embodiments, after moving the second portion of the first user interface in the second direction (e.g., once the camera stops moving), the computer system moves the second portion of the first user interface back toward (e.g., to or near) the initial position of the second portion of the first user interface (e.g., as illustrated in FIG. 7F) (e.g., as if the UI portion is attached to the camera with a spring, the UI portion resolves to its default position with respect to the camera after a short delay; in some embodiments, moving the UI portion back to the initial position in the direction of camera movement; in some embodiments, moving the UI portion back to the initial position in an averaged direction (e.g., if the camera is moved in multiple directions)). Displaying at least portions of a user interface with a "spring" relationship to movements of the camera provides a more comfortable and intuitive user interface, for example, when the user interface is a HUD in an immersive system.

In some embodiments, the first user interface includes one or more mode control user interface objects (e.g., 746) (e.g., a mode control affordance, such as a button, switch, and/or slider). In some embodiments, while displaying the one or more mode control user interface objects, the computer system detects an input directed toward the one or more mode control user interface objects, and, in response to detecting the input directed toward the one or more mode control user interface objects, switches (e.g., toggles or otherwise navigates) from a current capture mode to a different capture mode (e.g., toggling between a first capture mode and a second capture mode or selecting a capture mode from three or more capture modes based on a direction and/or magnitude of the input directed toward the one or more mode control user interface objects) (e.g., if the camera was in photo capture mode, the mode control affordance will toggle to video capture mode, and if the camera was in video capture mode, the mode control affordance will toggle to photo capture mode). Displaying a mode control affordance allowing the user to toggle between different capture modes provides improved control of media capture, for example, allowing a user to efficiently and intuitively switch between a photo capture mode and a video capture mode. Providing improved control of media capture assists the user with composing media capture events and reduces the risk that transient media capture opportunities are missed or captured in an undesired format or mode.

In some embodiments, initiating capture of first media content using the first camera includes: in accordance with a determination that the computer system is configured to capture media using a first capture mode (in some embodiments, a photo capture mode is currently selected), capturing a type of media that corresponds to the first capture mode (in some embodiments, capturing the first media content includes capturing a photo); and in accordance with a determination that the computer system is configured to capture media using a second capture mode that is different from the first capture mode (in some embodiments, a video capture mode is currently selected), capturing a different type of media that corresponds to the second capture mode and is different from the type of media that corresponds to the first capture mode (e.g., as illustrated in FIGS. 7AA5-7AA6) (in some embodiments, capturing the first media content includes capturing a video). Capturing media in accordance with the current media capture mode provides improved control of media capture, for example, allowing a user to capture media of different types (e.g., photo or video)

based on the current media capture mode state set using the mode control affordance. Providing improved control of media capture assists the user with composing media capture events and reduces the risk that transient media capture opportunities are missed or captured in an undesired format or mode.

In some embodiments, the one or more mode control user interface objects (e.g., 746) include an element representing the first capture mode (e.g., 746A) (e.g., text, an icon, and/or a side of the mode control affordance representing the photo capture mode) and an element representing the second capture mode (e.g., 746B) (e.g., text, an icon, and/or a side of the mode control affordance representing the video capture mode). In some embodiments, displaying the mode control user interface object includes: in accordance with a determination that the computer system is configured to capture media using the first capture mode (in some embodiments, a photo capture mode is currently selected), visually emphasizing the element representing the first capture mode (e.g., 746A) in a respective manner (e.g., as illustrated in FIG. 7AA1) (e.g., displaying the element representing the first capture mode with a first appearance (e.g., with increased visual prominence; in some embodiments, the text is displayed with a particular color, such as yellow; in some embodiments, the element representing the first state is highlighted (e.g., underlaid by a backing platter, circled, and/or bordered); in some embodiments, the element representing the first state is displayed at a larger size than the element representing the second state) and displaying the element representing the second capture mode (e.g., 746B) with a second appearance (e.g., with decreased visual prominence; in some embodiments, the text is displayed with a different color, such as white; in some embodiments, the element representing the second state is not highlighted)). In some embodiments, displaying the mode control user interface object includes: in accordance with a determination that the computer system is configured to capture media using the second capture mode (in some embodiments, a video capture mode is currently selected), visually emphasizing the element representing the second capture mode in the respective manner (e.g., as illustrated in FIG. 7AA4) (e.g., displaying the element representing the first capture mode with the second appearance (e.g., with decreased visual prominence) and displaying the element representing the second capture mode with the first appearance (e.g., with increased visual prominence)). Changing the appearance of a mode control affordance to indicate the current state provides improved visual feedback on a state of the computer system without excessively obscuring the field-of-view, for example, by increasing the visual prominence of an element representing the currently-selected mode while decreasing the visual prominence of an element representing an unselected mode. Providing the user with improved visual feedback on the state of media capture assists the user with composing media capture events and reduces the risk that transient media capture opportunities are missed (e.g., due to initiating capture in an unintended state and/or an element of the UI obscuring the environment), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with a determination that a first set of criteria are met, the computer system decreases a visual emphasis of (e.g., fading, blurring, desaturating, increasing a degree of transparency, and/or otherwise visually deemphasizing) a first set of one or more elements of the first user interface (e.g., 738, 746, and/or 750) (e.g., a dynamic fading UI; in some embodiments, the first set of one or more elements includes a mode control affordance, a photo well, and/or a video status indicator), wherein the first set of criteria includes a criterion that is met when the gaze (e.g., 732 and/or X732) of the user of the computer system is not directed to (e.g., the user is not looking at) the first set of one or more elements of the first user interface for over a threshold period of time (e.g., as illustrated in FIG. 7AA2) (e.g., 0.5 seconds, 1 second, and/or three seconds) (in some embodiments, the computer system does not increase the transparency (e.g., fade) the video status indicator when video is currently being captured). Increasing the transparency of portions of the media capture user interface after a threshold period of time without user attention provides improved visual feedback on a state of the computer system without excessively obscuring the field-of-view. Doing so also assists the user with composing media capture events and reduces the risk that transient media capture opportunities are missed due to an element of the UI obscuring the environment, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with a determination that a second set of criteria are met, the computer system increases a visual emphasis (e.g., unfading, unblurring, saturating, decreasing a degree of transparency, and/or otherwise visually emphasizing) of a second set of one or more elements of the first user interface (e.g., 738, 746, and/or 750) (e.g., a dynamic fading UI; in some embodiments, the second set of one or more elements includes a mode control affordance, a photo well, and/or a video status indicator; in some embodiments, the second set of one or more elements is the same as the first set of one or more elements), wherein the second set of criteria includes a criterion that is met when the gaze of the user of the computer system is directed to (e.g., the user looks at, points toward, or mores a selection indicator such as a cursor or a finger over) the second set of one or more elements of the first user interface (e.g., as illustrated in FIG. 7AA3). Decreasing the transparency of portions of the media capture user interface when the user looks at them provides improved control of media capture, e.g., using the user interface. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to detecting an event occurrence, the computer system displays a third set of one or more elements of the first user interface (e.g., 738, 746, and/or 750) (e.g., a mode control affordance, a photo well, and/or a video status indicator; in some embodiments, the third set of one or more elements is the same as the first set of one or more elements and/or the second set of one or more elements) with an increased degree of visual prominence (e.g., as illustrated in FIGS. 7AA1, 7AA4, 7AA6, and/or 7AA9) (e.g., unfading, unblurring, saturating, decreasing a degree of transparency, and/or otherwise visually emphasizing the third set of one or more elements of the first user interface). Displaying portions of the media capture user interface with a low degree of transparency (e.g., with relatively high visual prominence) in response to predetermined events provides improved control of media capture, e.g., using the user interface. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, when a media capture application (e.g., the media capture application including the first user interface) is launched (e.g., opened or initially displayed after being hidden or closed), the third set of one or more elements of the first user interface are displayed with the increased degree of visual prominence before a degree of visual prominence of the third set of one or more elements of the first user interface decreases automatically to a lower degree of visual prominence (e.g., fading, blurring, desaturating, increasing a degree of transparency, and/or otherwise visually deemphasizing the third set of one or more elements of the first user interface) (in some embodiments, the third set of one or more elements includes the mode control affordance and photo well). Displaying portions of the media capture user interface with a low degree of transparency when a media capture application is initially launched provides improved control of media capture, e.g., using the user interface of the media capture application. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the event occurrence includes a switch of (e.g., the user toggles) a current capture mode (e.g., a switch from photo to video mode or vis versa) between a third capture mode (in some embodiments, a photo capture mode; in some embodiments, the third capture mode is the same as the first capture mode) and a fourth capture mode that is different from the third capture mode (e.g., as illustrated in FIG. 7AA4) (in some embodiments, a video capture mode; in some embodiments, the fourth capture mode is the same as the second capture mode) (in some embodiments, the third set of one or more elements includes the mode control affordance). Displaying portions of the media capture user interface with a low degree of transparency when the user switches capture mode provides improved visual feedback on a state of the computer system when relevant without excessively obscuring the field-of-view. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the event occurrence includes a media capture event (e.g., as illustrated in FIGS. 7AA6 and/or 7AA9) (e.g., the user starts, continues, and/or completes capturing a video and/or photo) (in some embodiments, the third set of one or more elements includes the video status indicator; in some embodiments, the video status indicator includes the current duration and/or elapsed time of video capture; in some embodiments, the video status indicator remains displayed with a high degree of visual prominence (e.g., opaque) for the duration of video capture). Displaying portions of the media capture user interface with a low degree of transparency when the user starts, continues, or completes video capture provides improved control of media capture, e.g., using the user interface of the media capture application. Doing so also assists the user with composing media capture events and reduces the risk that transient media capture opportunities are missed or captured with unintended settings, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system displays a user interface object (e.g., 746) (e.g., a mode control affordance, such as a button, switch, and/or slider) that indicates a current media capture mode (e.g., the photo and/or video mode) (e.g., as illustrated in FIGS. 7AA1-7AA5 and/or 7AA9). In some embodiments, while capturing the first media content (e.g., while capturing video), the computer system displays status information about a media capture operation (e.g., 750) (e.g., a video status indicator, such as a button, icon, and/or text) (in some embodiments, the video status indicator includes the current duration and/or elapsed time of video capture) at a location in the first user interface that was previously occupied by the user interface object that indicated the current media capture mode (e.g., as illustrated in FIGS. 7AA6-7AA8) (e.g., ceasing display of the user interface object and/or replacing the mode control affordance with the video status indicator while actively recording video) (in some embodiments, the location is not a central location of the camera preview, e.g., the location is in a lower and/or upper region of the camera preview). Replacing a mode control affordance with a video status indicator while capturing video provides improved control of media capture using the user interface and provides improved visual feedback on a state of the computer system without excessively obscuring the field-of-view. Doing so also assists the user with composing media capture events and reduces the risk that transient media capture opportunities are missed due to an element of the UI obscuring the environment, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while capturing the first media content (e.g., while capturing video), the computer system displays an indication of (e.g., 750) (e.g., a video status indicator, such as a button, icon, and/or text) a status of capturing the first media content (in some embodiments, the video status indicator includes the current duration and/or elapsed time of video capture) (in some embodiments, the second region is different from the respective region and/or is not a central region of the camera preview, e.g., a lower and/or upper region of the camera preview; in some embodiments, the second region is the same as the first region). In some embodiments, while displaying the indication of the status of capturing the first media content, the computer system detects an input directed toward the indication of the status of capturing the first media content (e.g., as illustrated in FIG. 7AA8) (in some embodiments, input directed toward the indication of the status of capturing the first media content includes a respective user input (e.g., an activation or selection input that is used to trigger operations at the device when the input is detected) detected while the user's attention is directed to the indication of the status of capturing the first media content; in some embodiments, the respective input includes a press of a hardware button; in some embodiments, the respective input includes a gesture input, such as an air gesture (e.g., an air pinch); in some embodiments, the respective input includes a touch and/or tap input; in some embodiments, the respective input includes a speech input; in some embodiments, the respective input does not include location-based inputs, such as touch inputs on a touch-sensitive display or mouse clicks), and, in response to detecting the input directed toward the indication of the status of capturing the first media content, the computer system ceases capturing the first media content (e.g., as illustrated in FIG. 7AA9) (in some embodiments, the video recording stops and the capture of the first media content is completed; in some embodiments, the video recording pauses, and the user can re-start capture of the first media content, e.g., by selecting the video status indicator a second time). Displaying a video status indicator that functions as a pause/stop button provides improved control of video media capture and provides improved visual feedback on a state of the computer system without excessively obscuring the field-of-view. Doing so also assists the user with composing media capture events and reduces the risk that transient media capture opportunities are missed due to an element of the UI obscuring the environment and/or captured unintentionally, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, aspects/operations of methods 800, 1000, and 1200 may be interchanged, substituted, and/or added between these methods. For example, the user interface displayed in method 800 can be the same as the user interface displayed in method 1000, and media capture can be initiated according to method 800 before, during, or after displaying the indicator representing the orientation of the field-of-view of the camera according to method 1000. For example, the camera viewfinder displayed in method 800 can be the same as the capture preview for spatial media displayed in method 1200, and media capture can be initiated according to method 800 before, during, or after displaying the prompt to change a distance between the subject and the cameras according to method 1200. For brevity, these details are not repeated here.

FIGS. 9A-9I illustrate exemplary methods for displaying a camera preview with a level indicator. FIG. 10 is a flow diagram of an exemplary method 1000 for displaying a camera preview with a level indicator. The user interfaces in FIGS. 9A-9I are used to illustrate the processes described below, including the processes in FIG. 10.

Figure 9A:
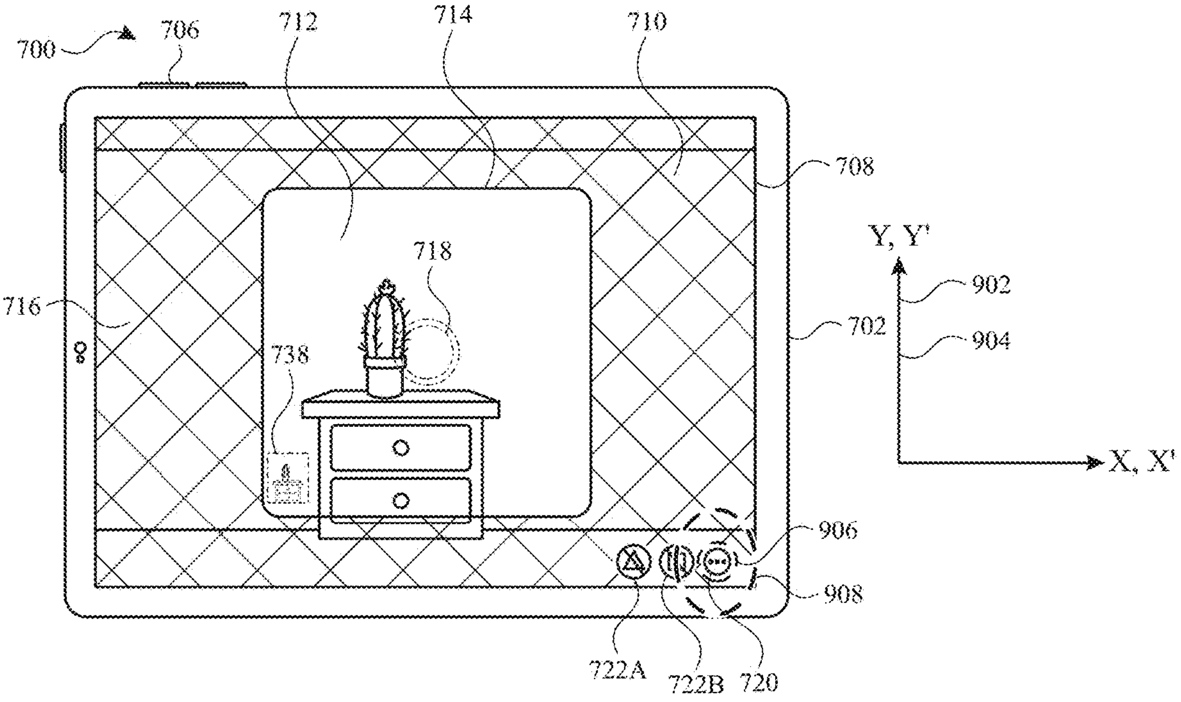

As illustrated in FIG. 9A, computer system 700 is displaying, via display 708 of device 702, media capture user interface 710 (e.g., as described above with respect to FIGS. 7A-7AB). At FIG. 9A, device 702 is positioned such that orientation 902 of device 702 (represented by the solid x-y axis labeled X'-Y') aligns with orientation 804 of the environment (represented by a dotted x-y axis (e.g., as seen in FIG. 9D1) labeled X-Y). When device 702 is oriented as shown in FIG. 9A, the field-of-view of first camera 704A is level to the horizon of the environment, so features of the environment that are generally straight and/or level in the environment (e.g., with respect to the plane defined by the x-y axis labeled X-Y), such as the floor, the ceiling, and the wardrobe, appear straight/level to the user on display 708. In some embodiments, when positioned as illustrated in FIG. 9A, a line between first camera 704A and second camera 704B is level to the horizon of the environment. Although FIGS. 9A-9I illustrate techniques using computer system 700 that is a tablet, the techniques are also applicable using a head-mounted device. In some embodiments where computer system 700 is implemented using a head-mounted device, first camera 704A and second camera 704B are generally aligned with the user's viewpoint, so the orientation (e.g., 902) of the head-mounted device is aligned with the orientation (e.g., 904) of the environment when the user's head is held level to the horizon.

At FIG. 9A, first status indicator 722A indicates that a dynamic photo media capture mode (e.g., a mode for a media capture of limited duration that includes content from before and/or after the input is released, such as a brief animated photo where several frames are captured when a photo is taken, creating a "live" effect) is currently off, and second status indicator 722B indicates that an orientation guide mode (also referred to as a level indicator mode) is currently off. Computer system 700 detects a selection input of options affordance 720, such as gaze input 906 directed at options affordance 720 and/or tap input 908 on the location of options affordance 720 on the touch-sensitive surface of display 708.

Figure 9B:
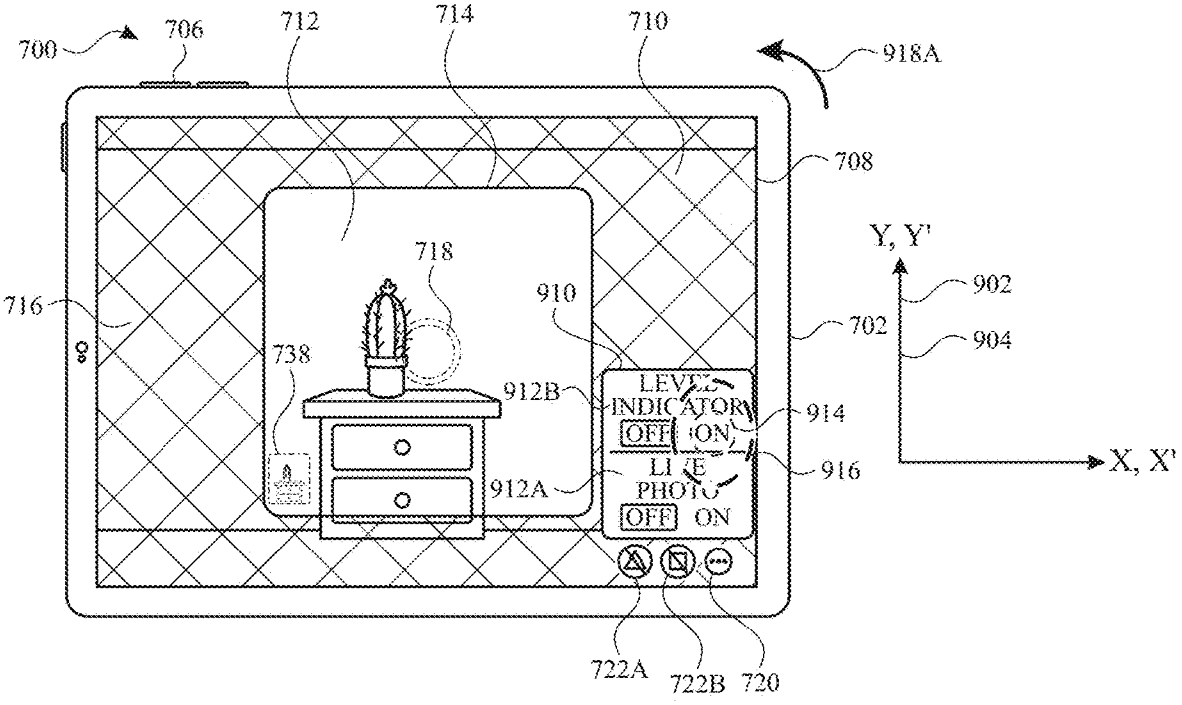

In response to detecting the selection input (e.g., gaze input 906 and/or tap input 908), at FIG. 9B, computer system 700 displays options menu 910 including first option affordance 912A for toggling the dynamic photo media capture mode and second option affordance 912B for toggling the orientation guide mode. First option affordance 912A and second option affordance 912B also indicate the current states of the dynamic photo media capture mode and the orientation guide mode, respectively. Computer system 700 detects a selection input of second option affordance 912B, such as gaze input 914 directed at second option affordance 912B and/or tap input 916 on the location of second option affordance 912B on the touch-sensitive surface of display 708. In response to detecting the selection input of second option affordance 912B, computer system changes (e.g., toggles) the state of the orientation guide mode to be on. As illustrated in FIG. 9C, computer system 700 additionally changes the appearance of second status indicator 722B to indicate that the orientation guide mode has been turned on, and ceases to display options menu 910.

At FIG. 9B, computer system 700 detects rotation 918A of device 702. Rotation 918A is a counterclockwise rotation around an axis extending outward from first camera 704A and/or second camera 704B, which is perpendicular the plane of the environment defined by the x-y axis labeled X-Y. In some embodiments where computer system 700 is implemented using a head-mounted device, rotation 918A is caused by the user tilting their head to the left.

FIGS. 9C-9G illustrate how computer system 700 updates user interface 710 in response to detecting rotation of device 702 (e.g., rotation 918A, 918B, 918C, 918D, 918E). At FIG. 9C, following rotation 918A, orientation 902 of device 702 (represented by the solid x-y axis labeled X'-Y') no longer aligns with orientation 904 of the environment (represented by the dotted x-y axis labeled X-Y). When device 702 is oriented as shown in FIG. 9C, the field-of-view of first camera 704A is no longer level to the horizon of the environment, so the features of the environment such as the floor, the ceiling, the wardrobe, and so forth no longer appear straight/level with respect to display 708, despite the features being generally straight and/or level in the environment. At FIG. 9C, the difference between orientation 902 and orientation 904 does not exceed a first threshold (e.g., a threshold of 2° or 3° tilt of device 702 with respect to the horizon of the environment). Accordingly, although the orientation guide mode is toggled on (e.g., as indicated by second status indicator 722B), computer system 700 does not provide an indication of orientation 902 to the user (e.g., level indicator 920, as described below).

In response to detecting rotation 918A, computer system 700 moves and/or rotates a first set of elements of media capture user interface 710, including options affordance 720, first status indicator 722A, second status indicator 722B, and captured media icon 738, to align the first set of elements with orientation 904 (e.g., computer system 700 displays options affordance 720, first status indicator 722A, second status indicator 722B, and captured media icon 738 as environment-locked virtual objects). However, computer system 700 does not move and/or rotate a second set of elements of media capture user interface 710, including camera viewfinder 712, border 714, darkened area 716, and shutter affordance 718, to align with orientation 904, and accordingly, the second set of elements remain aligned with orientation 902 (e.g., computer system 700 displays camera viewfinder 712, border 714, darkened area 716, and shutter affordance 718 as viewpoint-locked virtual objects with respect to the viewpoint of first camera 704A). As device 702 rotates as illustrated in FIGS. 9C-9G, computer system 700 continues to move and/or rotate the first set of elements of media capture user interface 710 as described here, so the first set of elements remain environment-locked as the second set of elements remain viewpoint-locked.

At FIG. 9C, computer system 700 detects rotation 918B of device 702, which is a further counterclockwise rotation (e.g., further increasing the tilt of device 702 with respect to the horizon of the environment). At FIG. 9D1, following rotation 918B, the difference between orientation 902 and orientation 904 exceeds the first threshold (e.g., the tilt of device 702 exceeds 2°, 3°, 4°, 5°, or 10°). In response to the difference between orientation 902 and orientation 904 exceeding the first threshold, computer system displays level indicator 920, indicating that device 702 is not currently level with respect to the horizon of the environment and that media captured at the current orientation 902 will appear tilted. Level indicator 920 is a broken line intersecting with shutter affordance 718, such that inner portion 920A falls inside the concentric rings of shutter affordance 718 and outer portion falls outside the concentric rings of shutter affordance 718 on either side. Computer system 700 displays inner portion 920A as a viewpoint-locked virtual object, which includes aligning inner portion 820A parallel to the x-axis of orientation 902. Computer system 700 displays outer portion 920B oriented based on the horizon of the environment, aligning outer portion 920B parallel to the x-axis of orientation 904.

In some embodiments, the techniques and user interface(s) described in FIG. 9D1 are provided by one or more of the devices described in FIGS. 1A-1P. FIG. 9D2 illustrates an embodiment in which media capture user interface X710 (e.g., as described in FIGS. 7A-7AB and/or 9A-9D1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 9D2 (e.g., as in FIG. 9D1 following rotation 918B), the difference between orientation X902 of HMD X700 (represented by the solid x-y axis labeled X'-Y') and orientation X904 of the environment (represented by the dotted x-y axis labeled X-Y) exceeds the first threshold (e.g., the tilt of HMD X700 exceeds 2°, 3°, 4°, 5°, or 10°). When HMD X700 is worn by a user in a head-mounted position, orientation X902 represents the orientation of the user's head and/or field-of-view. In response to the difference between orientation X902 and orientation X904 exceeding the first threshold, HMD X700 displays level indicator X920, indicating that HMD X700 is not currently level with respect to the horizon of the environment and that media captured at the current orientation X902 will appear tilted. Level indicator X920 is a broken line intersecting with shutter affordance X718, such that inner portion X920A falls inside the concentric rings of shutter affordance X718 and outer portion falls outside the concentric rings of shutter affordance X718 on either side. HMD X700 displays inner portion X920A as a viewpoint-locked virtual object, which includes aligning inner portion X920A parallel to the x-axis of orientation X902. HMD X700 displays outer portion X920B oriented based on the horizon of the environment, aligning outer portion X920B parallel to the x-axis of orientation X904 (e.g., outer portion X920B appears "level" with respect to the user's field-of-view).

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a*-*b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor X704 that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 and/or hardware button X706 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Referring back to FIG. 9D1, computer system 700 detects rotation 918C of device 702, which is a further counter-clockwise rotation. At FIG. 9E, following rotation 918C, the difference between orientation 902 and orientation 904 further exceeds the first threshold. Computer system 700 continues to display level indicator 920, updating the alignment of level indicator 920 based on the current orientation 902 and orientation 904 so inner portion 920A remains viewpoint-locked and outer portion 920B remains environment-locked.

Figure 9E:
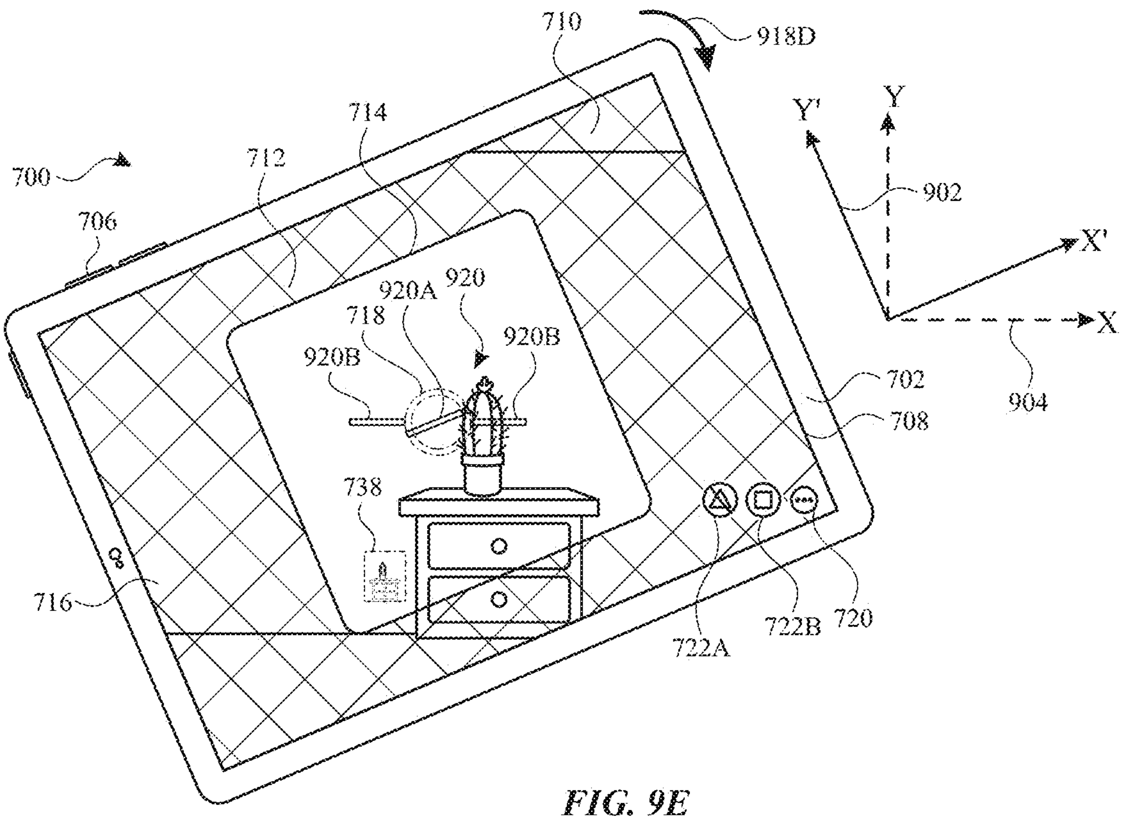

At FIG. 9E, computer system 700 detects rotation 918D of device 702, which is a clockwise rotation. At FIG. 9F, following rotation 918D, the difference between orientation 902 and orientation 904 falls below the first threshold (e.g., the 2°, 3°, 4°, 5°, or 10°). tilt that triggered the initial display of level indicator 920), but remains higher than a second, smaller threshold (e.g., a threshold 0.10, 0.25°, 0.5°, or 10 tilt of device 702 with respect to the horizon of the environment). While the tilt of device 702 exceeds the second threshold, computer system 700 continues to display and update the alignment of level indicator 920, indicating the current difference between orientation 902 and orientation 904 to the user.

Figure 9F:
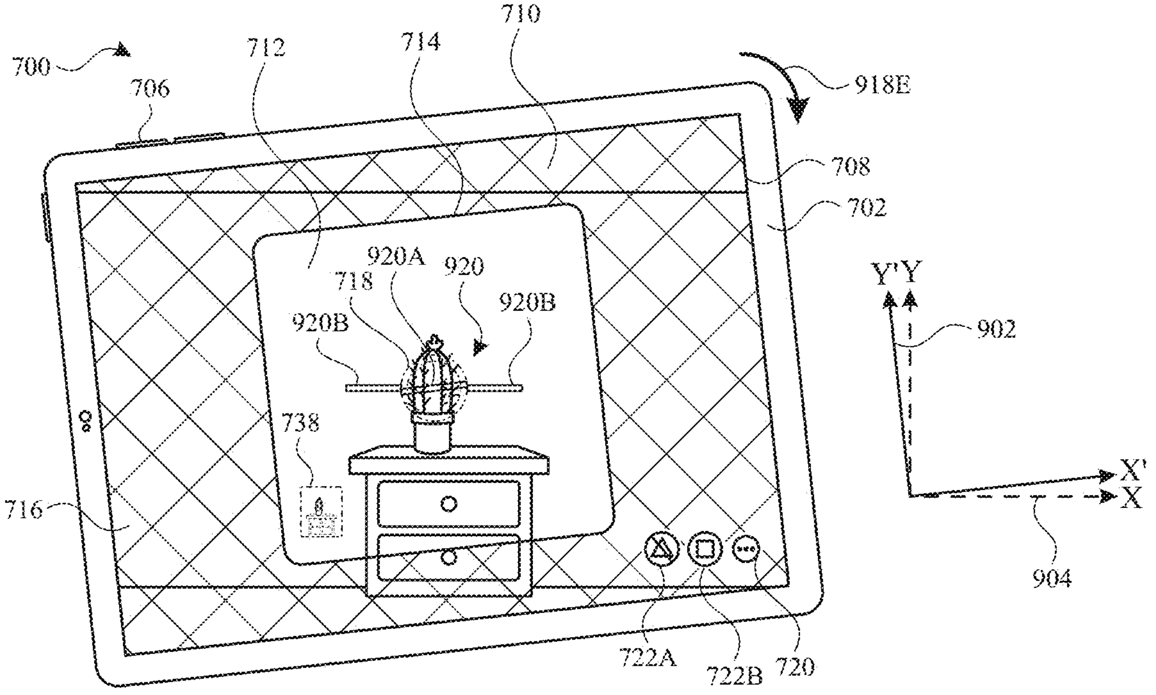

At FIG. 9F, computer system 700 detects rotation 918E of device 702, which is a further clockwise rotation. At FIG. 9G, computer system 700 updates the alignment of outer portion 920B to remain parallel to the x-axis of orientation 904. As the difference between orientation 902 and orientation 904 is minimal following rotation 918E, the difference in alignment between inner portion 920A and outer portion 920B is likewise minimal, and level indicator 920 appears as an unbroken (or imperceptibly broken) line. In response to detecting that the difference between orientation 902 and orientation 904 has fallen below the second threshold (e.g., 0.1°, 0.25°, 0.5°, or 1° tilt), computer system 700 changes the appearance of level indicator 920, temporarily changing the color of level indicator 920 to indicate that device 702 is level or close to level with respect to the horizon of the environment and that media captured at the current orientation 902 will not appear noticeably tilted.

FIG. 9G1 illustrates an expanded view of level indicator 920 as orientation 902 of device 702 approaches orientation 904 of the environment (e.g., as orientation 902 approaches a level orientation), in accordance with some embodiments. As shown in the top drawing of FIG. 9G1, before the difference between orientation 902 and orientation 904 falls below the second threshold (e.g., 0.1°, 0.25°, 0.5°, or 1° tilt), computer system 700 displays inner portion 920A with one color (e.g., white, or another color) and the outer portion 920B with a different color (e.g., yellow, or another color). Additionally, inner portion 920A is displayed with a width less than the outer diameter of shutter affordance 718, such that, when the portions initially align (e.g., as shown in the middle drawing of FIG. 9G1), gaps are initially visible at the break points of the broken line.

As shown in the middle and bottom drawings of FIG. 9G1, in response to detecting that the difference between orientation 902 and orientation 904 has fallen below the second threshold (e.g., 0.1°, 0.25°, 0.5°, or 1° tilt), computer system 700 changes the appearance of level indicator 920 to cause the gaps between inner portion 920A and outer portion 920B to close, such that level indicator 920 appears as an unbroken line. Specifically, computer system 700 animates the two sides of outer portion 920B shifting inwards, towards the center of shutter affordance 718, without changing size (e.g., without stretching or expanding), and animates inner portion 920A expanding (e.g., stretches) outwards, away from the center of shutter affordance 718, until the edges of inner portion 920A and outer portion 920B meet (e.g., as shown in the bottom drawing of FIG. 9G1). Additionally, computer system 700 changes the color of inner portion 920A to match the color of outer portion 920B that level indicator 920 appears as single color.

After temporarily changing the color of level indicator 920, at FIG. 9H, in response to detecting that the difference between orientation 902 and orientation 904 has fallen below the second threshold (e.g., 0.1°, 0.25°, 0.5°, or 1° tilt), computer system 700 ceases display of level indicator 920. In some embodiments where computer system 700 is a head-mounted device, orientation 902 can change frequently due to small, natural movements of the user's head (e.g., breathing, talking, or moving other parts of the body). By ceasing display of level indicator 920 when the tilt falls below the second (e.g., smaller) threshold rather than the first (e.g., higher) threshold, in these embodiments, computer system 700 avoids flickering the display of level indicator 920 off and on in response to those small movements as the user's head approaches (or departs from) a level orientation.

Figure 9H:
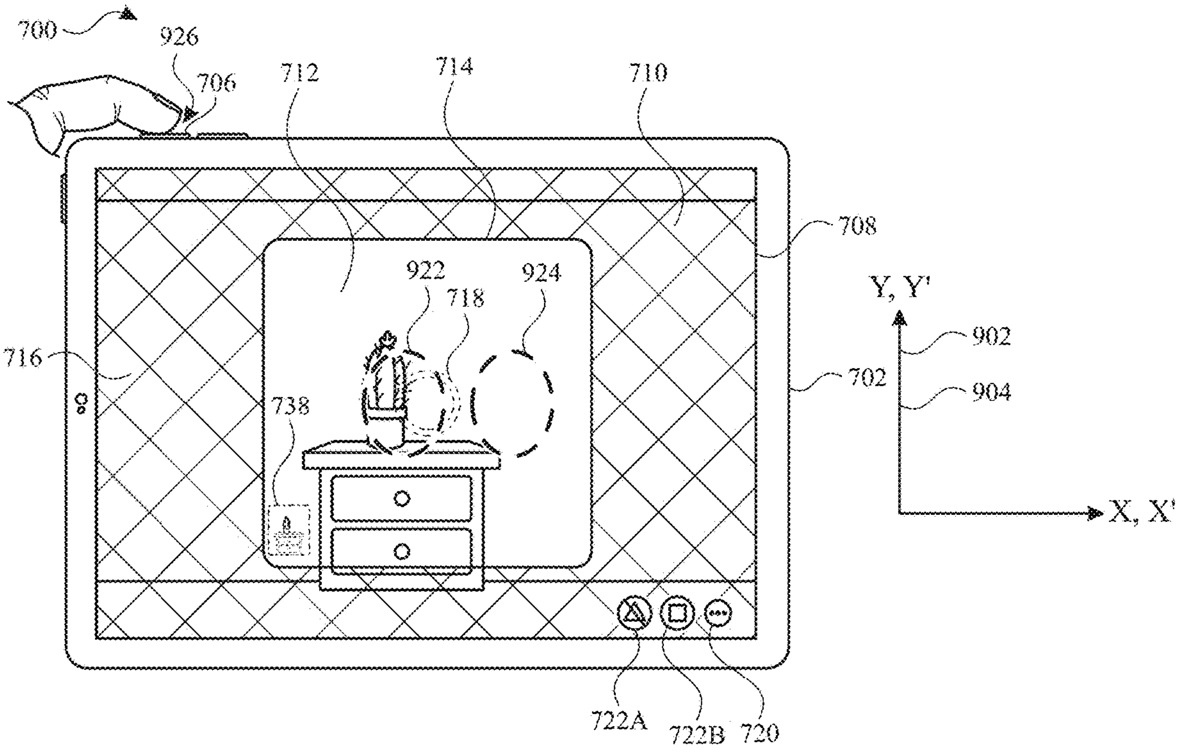
Figure 9I:
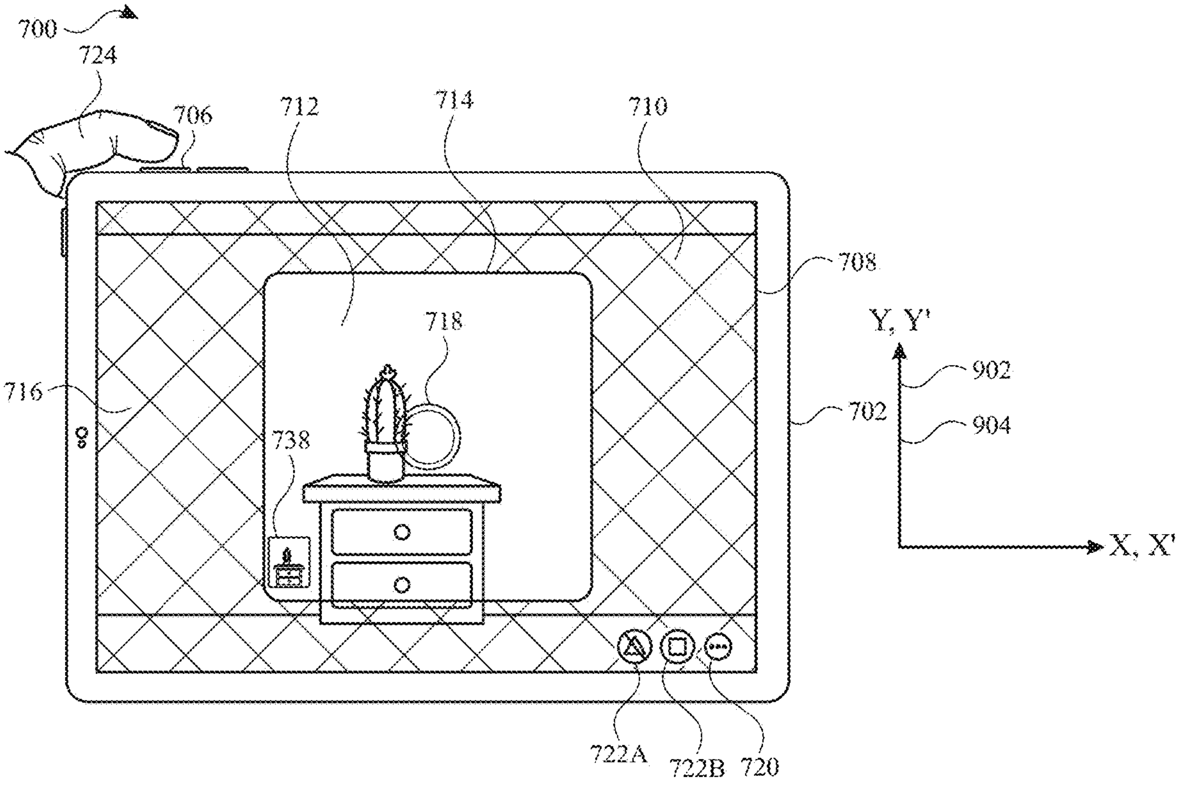

As described above with respect to FIG. 7H and method 900, at FIG. 9H, computer system 700 detects that gaze 922 is directed at shutter affordance 718 (e.g., that gaze 922 is within the central region of camera viewfinder 712) and changes the appearance of shutter affordance 718, decreasing the translucency and slightly reducing the size of the concentric rings of shutter affordance 718. While displaying shutter affordance 718 with increased visual prominence, computer system 700 detects a potential media capture input, such as button press input 824A of hardware button 706 and/or tap input 924B. In response to determining that gaze 922 is directed at shutter affordance 718 when the potential media capture input is detected, computer system 700 initiates media capture (e.g., photo media (e.g., a still photo and/or a media capture of limited duration that includes content from before and/or after the capture input is detected (e.g., before and/or after an air pinch gesture is released, an air tap gesture is detected, a button press is detected or released), such as a brief animated photo where several frames are captured when a photo is taken, creating a "live" effect) and/or video media). At FIG. 9I, following the media capture, computer system 700 displays captured media icon 738 with a thumbnail of the captured media. In some embodiments, computer system 700 will initiate media capture in response to detecting the gaze and the potential media capture input even if device 702 is tilted with respect to the horizon of the environment and level indicator 920 is still being displayed (e.g., as illustrated in FIGS. 9D-9F).

Additional descriptions regarding FIGS. 9A-9I are provided below in reference to method 1000 described with respect to FIG. 10.

FIG. 10 is a flow diagram of an exemplary method 1000 for displaying a camera preview with a level indicator, in some embodiments. In some embodiments, method 1000 is performed at a computer system (e.g., 101, 1-100, 1-200, 3-100, 6-100, 6-200, 6-300, 6-400, 11.1.2-100, 700, X700, and/or 702) that is in communication with a display generation component (e.g., 1-102, 1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200, 11.3.2-204, X702, and/or 708) (e.g., a display controller; a touch-sensitive display system; a display (e.g., integrated and/or connected), a 3D display, a transparent display, a projector, a heads-up display, and/or a head-mounted display) and a first camera (e.g., 6-106, 6-114, 6-116, 6-118, 6-120, 6-122, 6-306, 6-416, 11.1.1-104*a-b*, 11.1.2-110*a-f*, 11.3.2-100, 11.3.2-106, and/or 11.3.2-206, 704A, 704B, and/or X704) (in some embodiments, the computer system includes one or more cameras, such as a rear (user-facing) camera and a forward (environment-facing) camera; in some embodiments, the first camera is a virtual camera) (in some embodiments, the computer system includes one or more sensors (e.g., 1-356, 1-456, 6-102, 6-106, 6-108, 6-110, 6-112, 6-114, 6-116, 6-118, 6-120, 6-122, 6-124, 6-126, 6-128, 6-202, 6-203, 6-302, 6-303, 6-306, 6-402, 6-416, 11.1.1-104*a*, 11.1.1-104*b*, 11.1.2-110*a-f*, 11.3.2-100, 11.3.2-106, 11.3.2-206, and/or X704), such as location sensors, orientation sensors, and the like). In some embodiments, method 1000 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 1000 are, optionally, combined and/or the order of some operations is, optionally, changed.

The computer system displays (1002), via the display generation component (e.g., 708), a first user interface (e.g., 710 and/or X710) (e.g., a camera/capture UI) that includes a camera preview (e.g., 712 and/or X712) (e.g., a viewfinder/camera preview object, such as an object framing/encompassing a region for media capture; in some embodiments, overlaying at least a portion of an environment via a transparent display, pass-through camera data and/or virtual content (in some embodiments, a physical environment; in some embodiments, a virtual environment; in some embodiments, a mixed-reality environment)) of at least a portion of a field-of-view of the first camera.

The computer system detects (1004) (in some embodiments, while the field-of-view of the camera is oriented in a predetermined (e.g., level) orientation) a change (e.g., 918A, 918B, 918C, 918D, and/or 918E) in an orientation (e.g., 902 and/or X902) (e.g., a change in the tilt level of the camera with respect to the horizon (e.g., an absolute difference in angle measured between the x-axis of the xy-plane of the field-of-view of the camera and a horizon line (e.g., target level)); in some embodiments, the tilt level can be measured using a relative angle between stereo lenses/multiple cameras) of the field-of-view of the first camera (in some embodiments, the field-of-view of the camera is viewpoint-locked (e.g., head-locked, display-locked, and/or device-locked)) with respect to a respective orientation (e.g., 904 and/or X704) (e.g., a level orientation representing the orientation of the environment, such as where the camera is not tilted with respect to the horizon line (e.g., the x-axis of the xy-plane of the field-of-view of the camera is aligned with the horizon line/target level) or with respect to the direction of gravity's pull) (in some embodiments, a predetermined orientation).

The computer system, in response to detecting the change in the orientation (1006) and in accordance with a determination that a first set of criteria are met, displays (1008) (e.g., initially displaying) a first indicator (e.g., 920 and/or X920) representing the orientation (e.g., 902 and/or X902) (e.g., a level indicator, such as a broken line with an inner portion and outer portion(s); in some embodiments, the level indicator indicates both the orientation of the UI and the horizon/level line that the orientation is measured with respect to) of the field-of-view of the first camera, wherein the first set of criteria includes a first criterion that is met when a difference between a current orientation of the field-of-view of the first camera and the respective orientation exceeds a first threshold amount (e.g., when the absolute difference between the x-axis of the plane of the field-of-view of the camera and the horizon line is greater than, e.g., 2°, 30, and/or 4°, begin displaying the level indicator; in some embodiments, if the level indicator is already being displayed, display continues until the relative angle falls below a different threshold (e.g., 0.5°, 10, 2°)) (in some embodiments, in accordance with a determination that the first set of criteria are not met (e.g., the camera remains level or close to level after detecting the change in orientation), foregoing displaying the first indicator representing the orientation). Displaying a level indicator when the orientation of a field-of-view of a camera exceeds a first threshold difference from a level orientation (e.g., the level of a horizon line in an environment) provides a user with real-time visual feedback about a state of the computer system. Doing so also assists the user with composing media capture events and reduces the risk that transient media capture opportunities are missed or mis-captured (e.g., due to misalignment of the system), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the initial display of the level indicator indicates to a user that media captured at the instant camera orientation will be visibly tilted with respect to the horizon, allowing the user to adjust the orientation if a level media capture is desired.

In some embodiments, while displaying the first indicator (e.g., 920 and/or X920) representing the orientation of the field-of-view of the first camera (e.g., once the level indicator has been displayed, indicating that the current orientation is not level), the computer system detects a second change (e.g., 918A, 918B, 918C, 918D, and/or 918E) in the orientation (e.g., 902) of the field-of-view of the first camera with respect to the respective orientation (e.g., 904 and/or X904) (e.g., as the user adjusts the orientation of the camera to increase or decrease the tilt). In some embodiments, in response to detecting the second change in the orientation and in accordance with a determination that a second set of criteria are met, the computer system ceases to display the first indicator, wherein the second set of criteria includes a second criterion that is met when the difference between the current orientation of the field-of-view of the first camera and the respective orientation is less than a second threshold amount (e.g., when the absolute difference between the x-axis of the plane of the field-of-view of the camera and the horizon line is less than, e.g., 0.5°, 10, and/or 2° (e.g., when the camera is level or close to level), stop displaying the indicator) (in some embodiments, the second threshold amount is the first threshold amount; in some embodiments, the second set of criteria are met when the first set of criteria are not met). Ceasing to display the level indicator when the orientation of a field-of-view of a camera is level or close to level provides the user with improved visual feedback about the orientation of the field-of-view of the camera. For example, ceasing to display the level indicator indicates to the user that the user has corrected the tilt of the camera, and that media captured at the instant camera orientation will not be significantly visibly tilted with respect to the horizon. Doing so also assists the user with composing media capture events and reduces the risk that transient media capture opportunities are missed and/or captured in a manner (e.g., due to misalignment of the system during capture) that can negatively affect later viewing of the media (e.g., by impacting spatial media playback and/or causing user discomfort when viewed via an HMD), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the second threshold amount is different from the first threshold amount (e.g., as illustrated in FIGS. 9D1, 9D2, and 9F) (e.g., displaying the level indicator at 5° and ceasing to display it at 1°, displaying the level indicator at 5° and ceasing to display it at 2°, displaying the level indicator at 4° and ceasing to display it at 2°, and/or displaying the level indicator at 1° and ceasing to display it at 0.5°; in some embodiments, the second threshold amount is less than the first threshold amount). Ceasing to display the level indicator at a different threshold orientation than the threshold orientation at which the level indicator is initially displayed provides improved visual feedback by preventing the level indicator from flickering (e.g., bouncing) on and off as very small changes in the orientation of the camera are detected, e.g., due to slight movement of the user's body. Doing so also assists the user with composing media capture events and reduces the risk that transient media capture opportunities are missed or and/or captured in a manner (e.g., due to misalignment of the system during capture) that can negatively affect later viewing of the media (e.g., by impacting spatial media playback and/or causing user discomfort when viewed via an HMD), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first user interface (e.g., 710 and/or X710) includes a first visual indication (e.g., 712, X712, 716, and/or X716) (e.g., a transition or gradient to darkening and/or blurring) along a first edge of the camera preview (e.g., the border/frame of the capture region; in some embodiments, along all edges of the capture preview). In some embodiments, the first visual indication modifies (e.g., vignettes (e.g., blurs and/or darkens)) a visual appearance of a second portion of a representation of the field-of-view of the first camera that underlays the first visual indication. In some embodiments, the first visual indication is viewpoint-locked (in some embodiments, the camera preview (e.g., viewfinder region) is viewpoint-locked, and the first visual indication frames the camera preview). Displaying a viewpoint-locked visual indication along the edge of the camera preview provides a user with improved visual feedback about a state of the computer system (e.g., with respect to the current framing of media capture). Doing so also assists the user with composing media capture events and reduces the risk that transient media capture opportunities are missed or and/or captured in a manner (e.g., due to misalignment of the system during capture) that can negatively affect later viewing of the media (e.g., by impacting spatial media playback and/or causing user discomfort when viewed via an HMD), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, a first portion (e.g., 920A and/or X920A) (e.g., the inner portion of a broken line) of the first indicator (e.g., 920 and/or X920) representing the orientation of the field-of-view of the first camera is displayed inside a first region of the first user interface (e.g., 718 and/or X718) (e.g., the area falling within the capture affordance rings), and a second portion (e.g., 920B and/or X920B) of the first indicator (e.g., the outer portion(s) of the broken line) representing the orientation of the field-of-view of the first camera is displayed outside the first region of the first user interface (e.g., the first indicator intersects the capture affordance rings). Displaying the level indicator intersecting with a particular region of the user interface, such as a capture affordance, provides improved visual feedback on a state of the computer system (e.g., with respect to the orientation/alignment of media capture) without excessively obscuring the field-of-view. Doing so also assists the user with composing media capture events and reduces the risk that transient media capture opportunities are missed due to an element of the UI obscuring the environment or due to the user not seeing the visual feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first portion (e.g., 920A and/or X920A) (e.g., the inner portion of the broken line) of the first indicator is displayed with an orientation that is maintained at a fixed orientation relative to a viewpoint of the user (e.g., 902 and/or X902) (e.g., displayed at an orientation aligned with (e.g., parallel or perpendicular to) an orthogonal axis (e.g., an x-axis, or a y-axis) of the field-of-view of the first camera; in some embodiments, for a wearable device, the first portion of the first indicator is level to the user's head). Displaying a portion of the level indicator in alignment with the camera field-of-view (e.g., level with the camera/device/head) provides a user with improved visual feedback about a state of the computer system (e.g., with respect to the current/real-time orientation/alignment of media capture). Doing so also assists the user with composing media capture events and reduces the risk that transient media capture opportunities are missed or and/or captured in a manner (e.g., due to misalignment of the system during capture) that can negatively affect later viewing of the media (e.g., by impacting spatial media playback and/or causing user discomfort when viewed via an HMD), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the second portion (e.g., 920B and/or X920B) of the first indicator (e.g., the outer portion(s) of the broken line) is displayed with an orientation that is maintained at a fixed orientation relative to one or more portions of a three-dimensional environment (e.g., 904 and/or X904) (e.g., displayed at an orientation aligned with (e.g., parallel or perpendicular to) an orthogonal axis (e.g., an x-axis (such as a horizon line) or a y-axis such as the direction of gravity's pull) of the respective (e.g., target) orientation (e.g., the orientation representing the orientation of the environment (in some embodiments, a physical environment; in some embodiments, a virtual environment; in some embodiments, a mixed-reality environment); in some embodiments, the second orthogonal axis of the predetermined orientation corresponds to the first orthogonal axis of the field-of-view of the first camera, so the level indicator compares, e.g., the x-axes of both the camera and the environment)). Displaying a portion of the level indicator in alignment with the environment (e.g., level with the true horizon, perpendicular to the direction of gravity) provides a user with improved visual feedback about a state of the computer system (e.g., with respect to the current/real-time orientation/alignment of media capture). Doing so also assists the user with composing media capture events and reduces the risk that transient media capture opportunities are missed or and/or captured in a manner (e.g., due to misalignment of the system during capture) that can negatively affect later viewing of the media (e.g., by impacting spatial media playback and/or causing user discomfort when viewed via an HMD), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, after displaying the first indicator representing the orientation of the field-of-view of the first camera (e.g., once the level indicator has been displayed, indicating that the current orientation is not level), the computer system detects a third change (e.g., 918A, 918B, 918C, 918D, and/or 918E) in the orientation of the field-of-view of the first camera with respect to the respective orientation (e.g., as the user adjusts the orientation of the camera to increase or decrease the tilt). In some embodiments, in response to detecting the third change in the orientation and in accordance with a determination that the difference between the current orientation of the field-of-view of the first camera and the respective orientation has increased (e.g., the camera has been tilted further away from level), the computer system increases (e.g., rotating the outer portion relative to the inner portion so the outer portion remains aligned with the respective orientation (e.g., level to the horizon)) an angle between the first portion and the second portion of the first indicator (e.g., as illustrated in FIGS. 9D1-9E). Increasing an angle between the two portions of the indicator as the camera orientation departs further from the target orientation provides the user provides a user with improved visual feedback about a state of the computer system (e.g., with respect to the current/real-time orientation/alignment of media capture). Doing so also assists the user with composing media capture events and reduces the risk that transient media capture opportunities are missed or and/or captured in a manner (e.g., due to misalignment of the system during capture) that can negatively affect later viewing of the media (e.g., by impacting spatial media playback and/or causing user discomfort when viewed via an HMD), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the first indicator and in accordance with a determination that the first set of criteria are met (e.g., when the absolute difference between the x-axis of the plane of the field-of-view of the camera and the horizon line is greater than, e.g., 2°, 3°, and/or 4°), the computer system displays the first portion (e.g., the inner portion of the broken line) of the first indicator with a first color (e.g., white, or another color), and displays the second portion (e.g., the outer portion of the broken line) of the first indicator with a second color (e.g., yellow, or another color) different from the first color (e.g., as illustrated at the top and middle of FIG. 9G1). In some embodiments, in accordance with a determination that a third set of criteria are met, the computer system displays both the first portion and the second portion with a third color (e.g., as illustrated at the bottom of FIG. 9G1) (e.g., display all of the broken line portions with the same color; in some embodiments, the third color is the same as the first color (e.g., the completed line turns white); in some embodiments, the third color is the same as the second color (e.g., the completed line turns yellow); in some embodiments, the third color is a different color from both the first color and the second color (e.g., the completed line turns red)), wherein the third set of criteria includes a third criterion that is met when the difference between the current orientation of the field-of-view of the first camera and the respective orientation is less than a third threshold amount (e.g., when the absolute difference between the x-axis of the plane of the field-of-view of the camera and the horizon line is less than, e.g., 0.05°, 0.25°, and/or 1° (e.g., when the camera is level or close to level)) (in some embodiments, the third set of criteria is different from the second set of criteria, the third criterion is different from the second criterion, and/or the third threshold amount is different from the second threshold amount; in some embodiments, the third threshold amount is less than the second threshold amount; in some embodiments, the third set of criteria is the same as the second set of criteria, the third criterion is the same as the second criterion, and/or the third threshold amount is the same as the second threshold amount) (in some embodiments, displaying the broken line portions with the same color is performed prior to ceasing to display the level indicator). Displaying the portions of the indicator with different colors when the orientation of a field-of-view of a camera exceeds a first threshold difference from a level orientation (e.g., the level of a horizon line in an environment) and displaying the portions of the indicator with the same color when the orientation has been leveled out provides a user with real-time visual feedback about a state of the computer system. Doing so also assists the user with composing media capture events and reduces the risk that transient media capture opportunities are missed and/or captured in a manner (e.g., due to misalignment of the system) that can negatively affect later viewing of the media (e.g., by impacting spatial media playback and/or causing user discomfort when viewed via an HMD), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first region of the first user interface is a circular region with a first diameter. In some embodiments, while displaying the first indicator and in accordance with a determination that the first set of criteria are met (e.g., when the absolute difference between the x-axis of the plane of the field-of-view of the camera and the horizon line is greater than, e.g., 2°, 3°, and/or 4°), the computer system displays the first portion (e.g., the inner portion of the broken line) of the first indicator with a width smaller than the first diameter (e.g., the inner portion of the broken line does not extend all the way to the edges of the capture affordance region, leaving a gap between the edges of the portion and the outer edges of the capture affordance), and displays the second portion (e.g., the outer portion of the broken line) of the first indicator as two or more separate elements displayed on different sides of the first portion (e.g., a third portion (e.g., the left-hand portion of the broken line), displayed on a first side of the first region, and a fourth portion (e.g., the right-hand portion of the broken line), displayed on a second side of the first region opposite the first side), wherein an inner edge of a first element of the two or more elements and an inner edge of a second element of the two or more elements are spaced apart from the first portion of the first indicator (e.g., the third portion and the fourth portion touch an outer boundary of the first region) (e.g., as illustrated at the top and middle of FIG. 9G1). In some embodiments, in accordance with a determination that a fourth set of criteria are met, the computer system displays the inner edge of the first element and the inner edge of the second element shifting toward the first portion (e.g., moving to touch the first portion, such as by shifting into the first region to touch the first portion) (e.g., as illustrated at the bottom of FIG. 9G1) (e.g., the broken line portions animate to snap (e.g., by moving and/or expanding) together to create a completed line; in some embodiments, the inner portion expands in width (e.g., changes in size to stretch outwards towards the edges of the capture affordance); in some embodiments, the outer portions of the broken line shift inward without expanding/changing size; in some embodiments, the outer portions of the broken line expand in width (e.g., change in size to stretch inwards towards the edges of the inner portion)), wherein the fourth set of criteria includes a fourth criterion that is met when the difference between the current orientation of the field-of-view of the first camera and the respective orientation is less than a fourth threshold amount (e.g., when the absolute difference between the x-axis of the plane of the field-of-view of the camera and the horizon line is less than, e.g., 0.05°, 0.25°, and/or 1° (e.g., when the camera is level or close to level)) (in some embodiments, the fourth set of criteria is the same as the third set of criteria, the fourth criterion is the same as the third criterion, and/or the fourth threshold amount is the same as the third threshold amount) (in some embodiments, displaying the broken line portions with the same color is performed prior to ceasing to display the level indicator). Displaying the indicator with a gap between the inner and outer portions (e.g., as a broken line with gaps at the "break" points) when the orientation of a field-of-view of a camera exceeds a first threshold difference from a level orientation (e.g., the level of a horizon line in an environment) and displaying the portions of the indicator "snapping" together (e.g., to create a completed line) when the orientation has been leveled out provides a user with real-time visual feedback about a state of the computer system. Doing so also assists the user with composing media capture events and reduces the risk that transient media capture opportunities are missed and/or captured in a manner (e.g., due to misalignment of the system) that can negatively affect later viewing of the media (e.g., by impacting spatial media playback and/or causing user discomfort when viewed via an HMD), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, displaying the first user interface includes displaying a media capture selectable interface object (e.g., 718 and/or X718) (e.g., concentric rings displayed at the center of the capture preview region), and displaying the first indicator representing the orientation of the field-of-view of the first camera is performed while displaying the media capture selectable interface object (e.g., the level indicator is displayed concurrently with the media capture affordance). Displaying the level indicator concurrently with a capture affordance provides the user with improved visual feedback on a state of the computer system, for example, both the orientation and the capture state of a camera system. Doing so also assists the user with composing media capture events and reduces the risk that transient media capture opportunities are missed or and/or captured in a manner (e.g., due to misalignment of the system during capture) that can negatively affect later viewing of the media (e.g., by impacting spatial media playback and/or causing user discomfort when viewed via an HMD), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first indicator (e.g., 920 and/or X920) representing the orientation of the field-of-view of the first camera is visually incorporated into (e.g., displayed as a part of; in some embodiments, the level indicator intersects or overlaps the capture affordance) the media capture selectable interface object (e.g., 718 and/or X718). Incorporating the level indicator into the media capture affordance provides improved visual feedback on a state of the computer system (e.g., with respect to the orientation/alignment of media capture) without excessively obscuring the field-of-view. Doing so also assists the user with composing media capture events and reduces the risk that transient media capture opportunities are missed due to an element of the UI obscuring the environment or due to the user not seeing the visual feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, at least a portion (e.g., 920A and/or X920A) of the first indicator (e.g., 920 and/or X920) overlaps (e.g., intersects with, runs through) at least a portion of the media capture selectable interface object (e.g., 718 and/or X718) (e.g., the level indicator is a broken line, where the inner portion intersecting the media capture affordance moves independently of the two outer portions that don't intersect the media capture affordance). Incorporating the level indicator into the media capture affordance provides improved visual feedback on a state of the computer system (e.g., with respect to the orientation/alignment of media capture) without excessively obscuring the field-of-view. Doing so also assists the user with composing media capture events and reduces the risk that transient media capture opportunities are missed due to an element of the UI obscuring the environment or due to the user not seeing the visual feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system detects a respective input (e.g., 926) (in some embodiments, a user input for media capture, such as a hardware button press or an air pinch gesture; in some embodiments, a gaze input, such as user attention focused on the center of the capture preview) (in some embodiments, the respective input is the same respective input as described with respect to method 800). In some embodiments, the computer system changes one or more visual features of the media capture selectable interface object (e.g., 718 and/or X718) (e.g., changing the opacity of the concentric rings and/or changing the size of the concentric rings (e.g., squeezing together)) based on the respective input (e.g., as illustrated in FIG. 9H) (in some embodiments, representing the state of the user input, such as squeezing the rings closer together as the hardware button is further depressed or as an air pinch closes together; in some embodiments, representing a ready-to-capture state triggered by the user gaze focusing on the center of the capture preview). Changing the appearance of the media capture affordance based on the respective input provides improved visual feedback on a state of the computer system to the user (e.g., with respect to the user's input being detected by the system), indicating that the system is responding to the respective input. Providing visual feedback to the user about the state of the respective input makes the user-system interface more efficient (e.g., by helping the user to provide proper inputs and reducing unnecessary additional user inputs) which, additionally, reduces power usage and improves battery life of the system by enabling the user to use the system more quickly and efficiently.

In some embodiments, the computer system displays, via the display generation component, a representation (e.g., 738) of first media content captured by the first camera, and the representation is displayed at an orientation aligned with (e.g., parallel or perpendicular to) a first orthogonal axis (e.g., an x-axis (such as a horizon line), a y-axis such as the direction of gravity's pull) of the respective (e.g., target) orientation (e.g., 904 and/or X904) (e.g., the orientation representing the orientation of the environment (in some embodiments, a physical environment; in some embodiments, a virtual environment; in some embodiments, a mixed-reality environment)). Displaying the photo well icon aligned with the environment provides improved visual feedback on a state of the computer system to the user (e.g., with respect to the current orientation/alignment of media capture with respect to the environment). Doing so also assists the user with composing media capture events and reduces the risk that transient media capture opportunities are missed or and/or captured in a manner (e.g., due to misalignment of the system during capture) that can negatively affect later viewing of the media (e.g., by impacting spatial media playback and/or causing user discomfort when viewed via an HMD), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the change in the orientation (e.g., 902 and/or X902) of the field-of-view of the first camera with respect to the respective orientation (e.g., 904 and/or X904) is caused by (in some embodiments, the camera orientation is head- or body-locked, e.g., for a wearable device; in some embodiments, the camera is physically controlled by the user, e.g., a device being held by a user) a change in an orientation of at least a portion of a body of a user of the computer system (e.g., the user's head, arms, hands, and/or entire body).

In some embodiments, the computer system is further in communication with a second camera (e.g., 704B) that is spaced apart from the first camera (e.g., 704A) (in some embodiments, the computer system is in communication with two spaced-apart cameras substantially facing the same direction; in some embodiments, a camera array for spatial media capture). In some embodiments, the first set of criteria is met when an orientation of a line formed between the first camera and the second camera is substantially parallel to (e.g., within 0.5°, 1°, or 2° of) a second orthogonal axis (e.g., an x-axis (such as a horizon line); in some embodiments, the second orthogonal axis is the same as the first orthogonal axis) of the respective (e.g., target) orientation (e.g., 904 and/or X904) (e.g., the orientation representing the orientation of the environment (in some embodiments, a physical environment; in some embodiments, a virtual environment; in some embodiments, a mixed-reality environment)).

In some embodiments, the first user interface includes an options affordance (e.g., 720 and/or X720) (e.g., a button with " . . . " at the bottom of the camera UI), which, when selected, causes display of one or more media capture option selectable interface objects (e.g., 912A and/or 912B) (e.g., level indicator, animated photo mode, timer delay, and/or flash). Providing an options affordance for accessing additional camera options provides improved control of media capture and improved visual feedback on the current state of media capture options. Doing so also assists the user with composing media capture events and reduces the risk that transient media capture opportunities are missed or miscaptured (e.g., due to inappropriate or unwanted camera settings), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first set of criteria includes a second criterion that is met when a first media capture setting (e.g., the level indicator setting), controllable by a first media capture option selectable interface object (e.g., 912B) of the one or more media capture option selectable interface objects, is in a first state (e.g., if the level indicator is turned on). Providing a media capture option affordance for toggling the level indicator provides improved control of media capture. Doing so also assists the user with composing media capture events and reduces the risk that transient media capture opportunities are missed or and/or captured in a manner (e.g., due to misalignment of the system during capture) that can negatively affect later viewing of the media (e.g., by impacting spatial media playback and/or causing user discomfort when viewed via an HMD), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the one or more media capture option selectable interface objects includes a photo mode selectable interface object (e.g., 912A) for toggling (e.g., enabling or disabling) a multi-frame photo capture mode (e.g., a dynamic photo mode; in some embodiments, when the multi-frame photo capture mode is enabled, capture of photo media includes capturing multiple frames, and when the multi-frame photo capture mode is disabled, capture of photo media includes capturing only a single frame). Providing a media capture option affordance for toggling the multi-frame photo capture mode provides improved control of media capture. Doing so also assists the user with composing media capture events and reduces the risk that transient media capture opportunities are missed or mis-captured (e.g., due to inappropriate or unwanted camera settings), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first user interface includes a first status indicator (e.g., 722A, X722A, 722B and/or X722B) that indicates a current state (e.g., the current state of the options (e.g., enabled/disabled)) of a second media capture setting (e.g., a media capture setting and/or parameter; in some embodiments, the second media capture setting is the same as the first media capture setting and/or the multi-frame photo capture mode) that corresponds to (e.g., that can be configured by) a second media capture option selectable interface object of the one or more media capture option selectable interface objects (in some embodiments, the second media capture option selectable interface object is the same as the first media capture option selectable interface object and/or the photo mode selectable interface object). Providing a status indicator provides improved feedback on a state of the computer system (e.g., with respect to the current state of capture settings), for example, indicating to the user whether the level indicator isn't being displayed because the camera is level or because the level indicator is disabled. Doing so also assists the user with composing media capture events and reduces the risk that transient media capture opportunities are missed or mis-captured (e.g., due to inappropriate or unwanted camera settings), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, aspects/operations of methods 800, 1000, and 1200 may be interchanged, substituted, and/or added between these methods. For example, the user interface displayed in method 1000 can be the same as the user interface displayed in method 800, and the indicator representing the orientation of the field-of-view of the camera can be displayed according to method 1000 before, during, or after initiating media capture according to method 800. For example, the camera preview displayed in method 1000 can be the same as the capture preview for spatial media displayed in method 1200, and the indicator representing the orientation of the field-of-view of the camera(s) can be displayed according to method 1000 before, concurrently with, or after displaying the prompt to change a distance between the subject and the cameras according to method 1200. For brevity, these details are not repeated here.

FIGS. 11A1-11H illustrate exemplary methods for displaying a camera preview for spatial media capture with prompts to improve capture quality. FIG. 12 is a flow diagram of an exemplary method 1200 for displaying a camera preview for spatial media capture with prompts to improve capture quality. The user interfaces in FIGS. 11A1-11H are used to illustrate the processes described below, including the process in FIG. 12.

As illustrated in FIG. 11A1, computer system 700 is displaying, via display 708 of device 702, media capture user interface 710 (e.g., as described above with respect to FIGS. 7A-7AB) for taking a spatial media capture of environment 1100 (e.g., a physical or XR environment), represented in FIG. 11A1 by a top-down schematic. As discussed above with respect to FIG. 7A, a spatial media capture is a media capture performed using the different but overlapping fields-of-view of first camera 704A and second camera 704B to capture virtual reality media (e.g., photos and/or videos) with the appearance/illusion of depth. Captured spatial media thus includes at least one image for the viewer's right eye (e.g., captured using second camera 704B) and at least one image for the viewer's left eye (e.g., captured using first camera 704A) to create the appearance/illusion of depth. Although FIGS. 11A 1-11H illustrate techniques using computer system 700 that is a tablet, the techniques are also applicable using a head-mounted device. In some embodiments where computer system 700 is implemented using a head-mounted device, the two cameras used for spatial media capture are generally aligned with the viewpoints of the user's left eye and right eye, respectively, and may be physical cameras or virtual cameras.

When user 1104 holds device 702 as illustrated in FIG. 11A1, the respective fields-of-view of first camera 704A and second camera 704B each include at least part of subject 1106 (a table with a plant on top), and do not include subject 1108 (a lamp). Accordingly, media capture user interface 710 includes representation 1106A of subject 1106 (e.g., within the representation of the field-of-view of first camera 704A and/or the field-of-view of second camera 704B overlaid by media capture user interface 710).

At FIG. 11A1, computer system 700 determines that the current positioning of subject 1106 within the fields-of-view of first camera 704A and second camera 704B would result in a spatial media capture with below-threshold quality, as subject 1106 is too close to first camera 704A and second camera 704B. At the current distance from device 702, the capture of subject 1106 in the fields-of-view of first camera 704A and second camera 704B would not overlap sufficiently to produce a threshold level of quality appearance/illusion of depth in the spatial media capture. In some embodiments where computer system 700 is implemented using a head-mounted device, the distance between device 702 and subject 1106 is approximately the same as the distance between the user's eyes and subject 1106, but while the viewpoint of subject 1106 may appear fine to the user (e.g., the user is able to focus on subject 1106), the viewpoint of the first camera 704A and second camera 704B may result in a lower-quality spatial media capture, as the field-of-view and relative positioning of the cameras may not exactly match that of the user's eyes.

In response to determining that the current positioning of subject 1106 within the fields-of-view of first camera 704A and second camera 704B would result in a spatial media capture with below-threshold quality, computer system 700 prompts user 1104 to change positioning to address the quality issue with the spatial media capture. In particular, computer system 700 displays text prompt 1110, which includes the text "move farther away." Additionally, computer system 700 changes the appearance of shutter affordance 718 to obscure (e.g., blur and/or darken) the portion of the representation of the field-of-view of first camera 704A and/or the field-of-view of second camera 704B currently overlaid (e.g., at least semi-translucently) by shutter affordance 718. At FIG. 11A1, computer system 700 obscures the overlaid portion to a first extent.

In some embodiments, the techniques and user interface(s) described in FIG. 11A1 are provided by one or more of the devices described in FIGS. 1A-1P. FIG. 11A2 illustrates an embodiment in which media capture user interface X710 (e.g., as described in FIG. 11A1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

As illustrated in FIG. 11A2, HMD X700 is displaying, via display module X702, media capture user interface X710 (e.g., as described above with respect to FIGS. 7A-7AB) for taking a spatial media capture of environment X1100 (e.g., a physical or XR environment), represented in FIG. 11A2 by a top-down schematic. As discussed above with respect to FIG. 7A, a spatial media capture is a media capture performed using the different but overlapping fields-of-view of at least two cameras (e.g., first camera 704A and second camera 704B) to capture virtual reality media (e.g., photos and/or videos) with the appearance/illusion of depth. Captured spatial media thus includes at least one image for the viewer's right eye (e.g., captured using second camera 704B) and at least one image for the viewer's left eye (e.g., captured using first camera 704A) to create the appearance/illusion of depth.

When user X1104 wears HMD X700 as illustrated in FIG. 11A2 (e.g., in a head-mounted position), the respective fields-of-view of the at least two cameras each include at least part of subject X1106 (a table with a plant on top), and do not include subject X1108 (a lamp). Accordingly, media capture user interface X710 includes representation X1106A of subject X1106 (e.g., within the representation of the at least two cameras overlaid by media capture user interface X710).

At FIG. 11A2, HMD X700 determines that the current positioning of subject X1106 within the fields-of-view of the at least two cameras would result in a spatial media capture with below-threshold quality, as subject X1106 is too close to the at least two cameras. At the current distance from HMD X700, the capture of subject X1106 in the at least two cameras would not overlap sufficiently to produce a threshold level of quality appearance/illusion of depth in the spatial media capture. In some embodiments, the distance between HMD X700 and subject X1106 is approximately the same as the distance between the user's eyes and subject X1106, but while the viewpoint of subject X1106 may appear fine to the user (e.g., the user is able to focus on subject X1106), the viewpoint of the at least two cameras may result in a lower-quality spatial media capture, as the field-of-view and relative positioning of the cameras may not exactly match that of the user's eyes.

In response to determining that the current positioning of subject X1106 within the fields-of-view of the at least two cameras would result in a spatial media capture with below-threshold quality, HMD X700 prompts user X1104 to change positioning to address the quality issue with the spatial media capture. In particular, HMD X700 displays text prompt X1110, which includes the text "move farther away." Additionally, HMD X700 changes the appearance of shutter affordance X718 to obscure (e.g., blur and/or darken) the portion of the representation of the field-of-view of the at least two cameras currently overlaid (e.g., at least semi-translucently) by shutter affordance X718. At FIG. 11A2, HMD X700 obscures the overlaid portion to a first extent.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor X704 that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 and/or hardware button X706 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

FIGS. 11B-11F illustrate how computer system 700 updates media capture user interface 710 in response to changes in the fields-of-view of first camera 704A and second camera 704B caused by movement of device 702. Computer system detects movement 1112A of device 702, as user 1104 moves backwards, away from subject 1106 in environment 1100. At FIG. 11B, computer system 700 determines that, despite moving farther away from subject 1106, the positioning of subject 1106 within the fields-of-view of first camera 704A and second camera 704B following movement 1112A would still result in a spatial media capture with below-threshold quality, as subject 1106 is still too close to first camera 704A and second camera 704B. In some embodiments where computer system 700 is implemented using a head-mounted device, movement 1112A is the movement of the user's head as the user walks backwards while facing subject 1106.

In response to determining that the positioning of subject 1106 within the fields-of-view of first camera 704A and second camera 704B following movement 1112A would still result in a spatial media capture with below-threshold quality, computer system continues to display text prompt 1110 including the text "move farther away." Additionally, computer system 700 continues to obscure the portion of the representation of the field-of-view of first camera 704A and/or the field-of-view of second camera 704B currently overlaid by shutter affordance 718. However, as movement 1112A increased the distance to subject 1106 at FIG. 11B relative to FIG. 11A1, computer system 700 obscures the overlaid portion to a second extent lesser than the first extent, indicating that user 1104 has improved the current spatial media capture quality even though the quality would still be below-threshold. That is, the extent to which computer system 700 obscures the overlaid portion is based on the extent to which the current positioning adversely impacts spatial media capture quality.

Computer system detects movement 1112B of device 702, as user 1104 moves further backwards, away from subject 1106 in environment 1100. At FIG. 11C, computer system 700 determines that the positioning of subject 1106 within the fields-of-view of first camera 704A and second camera 704B following movement 1112B would result in a spatial media capture that meets a threshold quality. At the current distance from device 702, the capture of subject 1106 in the fields-of-view of first camera 704A and second camera 704B would overlap sufficiently and still differ enough to produce a quality appearance/illusion of depth in the spatial media capture.

Figure 11C:
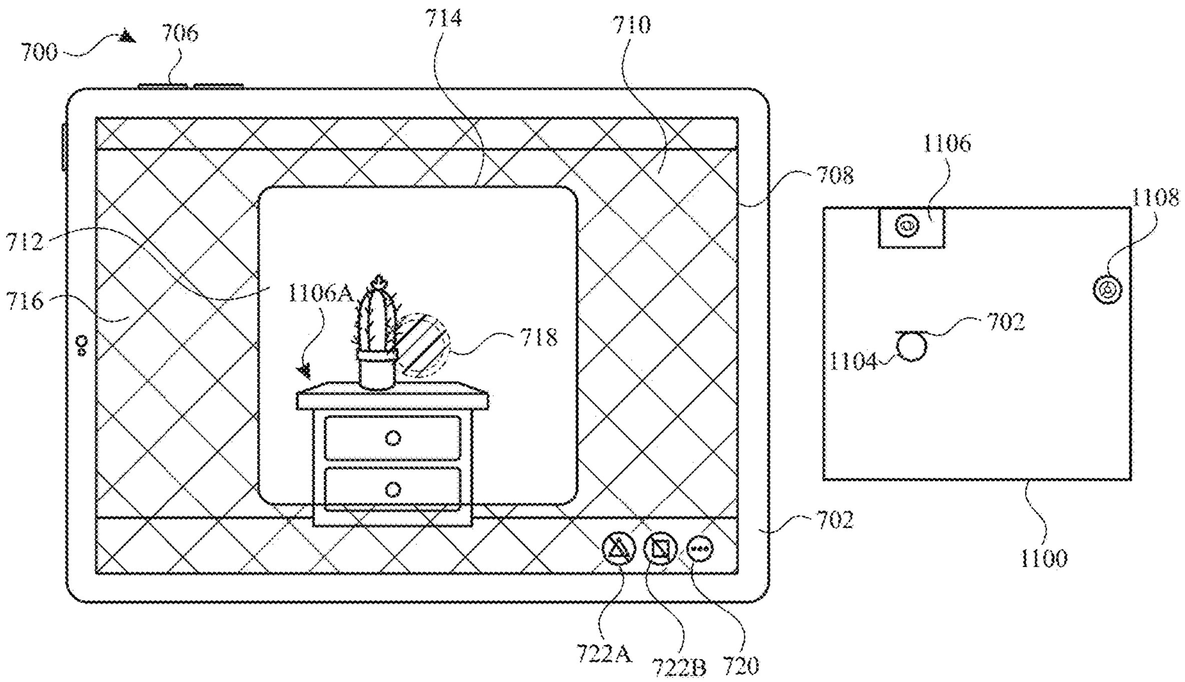
Figure 11D:
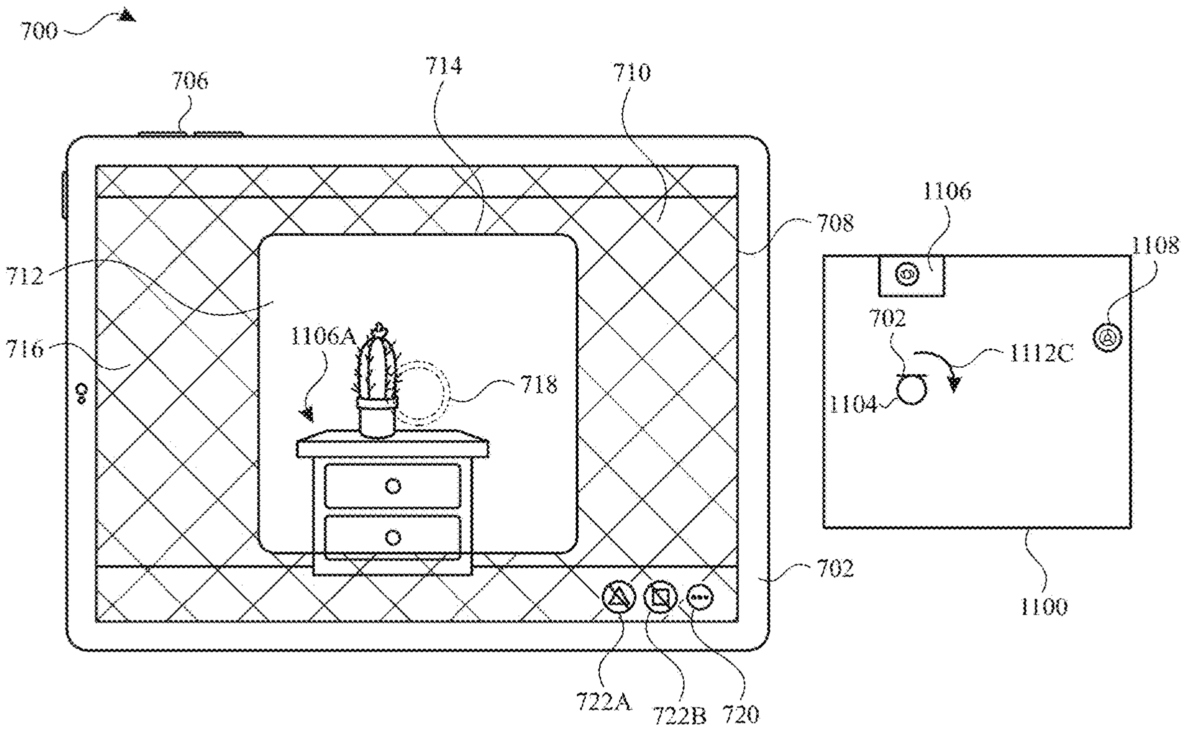

In response to determining that the current positioning of subject 1106 within the fields-of-view of first camera 704A and second camera 704B would result in a spatial media capture that meets the threshold quality, at FIG. 11C, computer system 700 ceases to display text prompt 1110 and changes the appearance of shutter affordance 718. In particular, computer system 700 stops obscuring (e.g., blurring and/or darkening) the portion of the representation of the field-of-view of first camera 704A and/or the field-of-view of second camera 704B currently overlaid by shutter affordance 718, and temporarily causes the color of shutter affordance 718 and the overlaid portion to turn (e.g., flash) yellow, indicating to user 1104 that the quality issue has been addressed. At FIG. 11D, computer system 700 displays shutter affordance 718 without any obscuring or color modification (e.g., returning shutter affordance 718 to a "default" appearance, such as in FIG. 7F).

Computer system 700 detects movement 1112C of device 702, as user 1104 rotates device 704 to point away from subject 1106 and towards subject 1108. At FIG. 11E, following movement 1112C, the respective fields-of-view of first camera 704A and second camera 704B each include at least part of subject 1108, and accordingly, media capture user interface 710 includes representation 1108A of subject 1108. At FIG. 11E, computer system 700 determines that the current positioning of subject 1108 within the fields-of-view of first camera 704A and second camera 704B would result in a spatial media capture with below-threshold quality, as subject 1108 is too far away from first camera 704A and second camera 704B. At the current distance from device 702, the capture of subject 1108 in the fields-of-view of first camera 704A and second camera 704B would not differ sufficiently to produce a threshold level of quality appearance/illusion of depth in the spatial media capture.

In response to determining that the current positioning of subject 1108 within the fields-of-view of first camera 704A and second camera 704B would result in a spatial media capture with below-threshold quality, computer system 700 again prompts user 1104 to change positioning to address the quality issue with the spatial media capture, similarly to the prompting described with respect to FIGS. 11A1-11A2. In FIG. 11E, computer system 700 displays text prompt 1114, which includes the text "move closer," and changes the appearance of shutter affordance 718 to obscure (e.g., blur and/or darken) the portion of the representation of the field-of-view of first camera 704A and/or the field-of-view of second camera 704B currently overlaid by shutter affordance 718. At FIG. 11E, computer system 700 obscures the overlaid portion to a third extent, based on the extent to which the current positioning adversely impacts spatial media capture quality (e.g., as described with respect to FIG. 11B).

Computer system detects movement 1112D of device 702, as user 1104 moves forward, towards subject 1108 in environment 1100. At FIG. 11F, computer system 700 determines that the positioning of subject 1108 within the fields-of-view of first camera 704A and second camera 704B following movement 1112B would result in a spatial media capture that meets a threshold quality, and accordingly, changes the appearance of shutter affordance 718 as described with respect to FIG. 11D (e.g., ceasing to obscure the overlaid portion and temporarily flashing yellow).

Figure 11E:
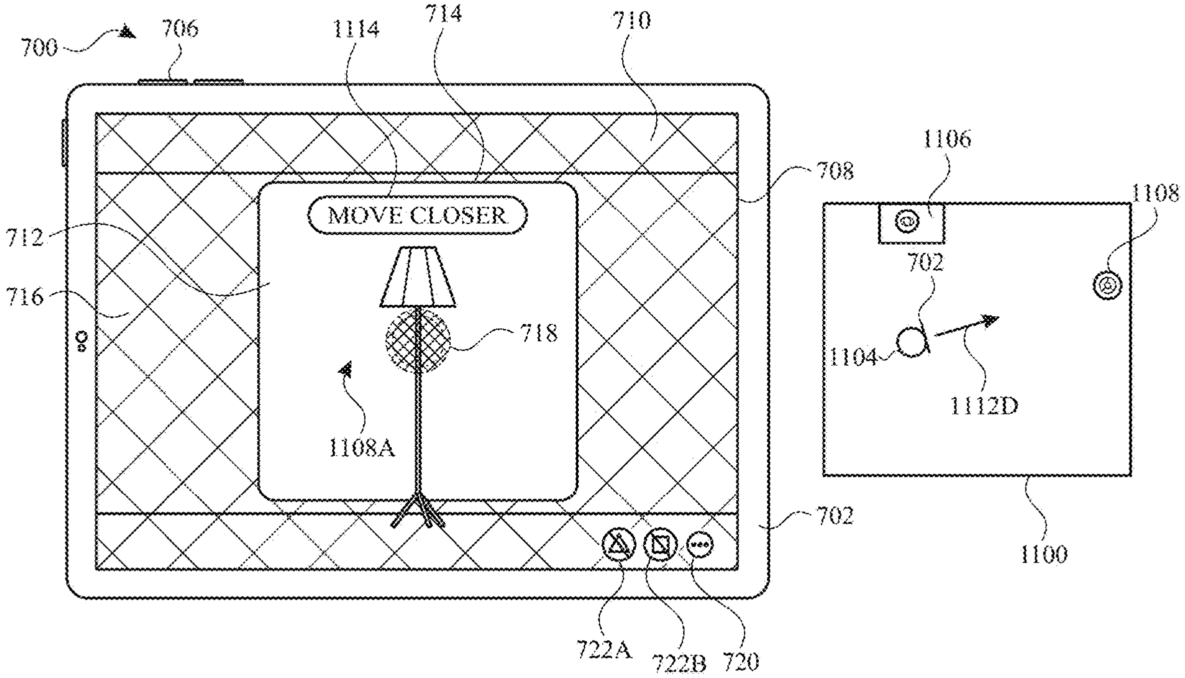
Figure 11F:
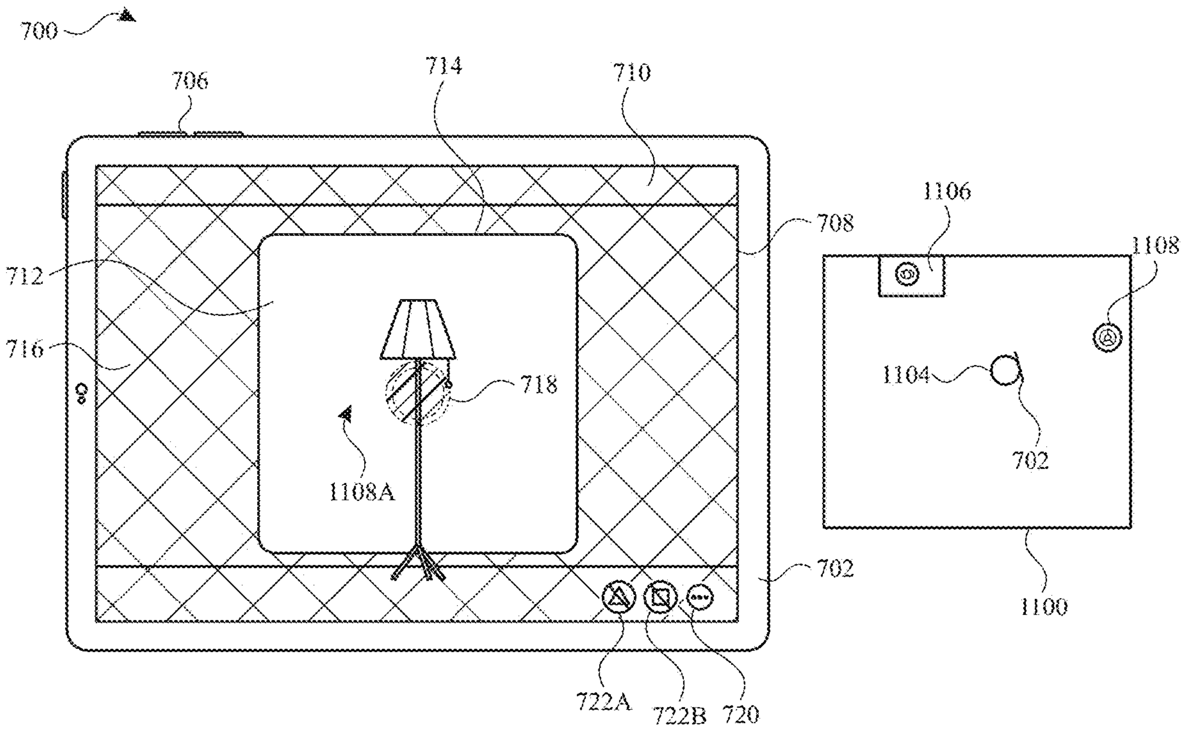
Figure 11G:
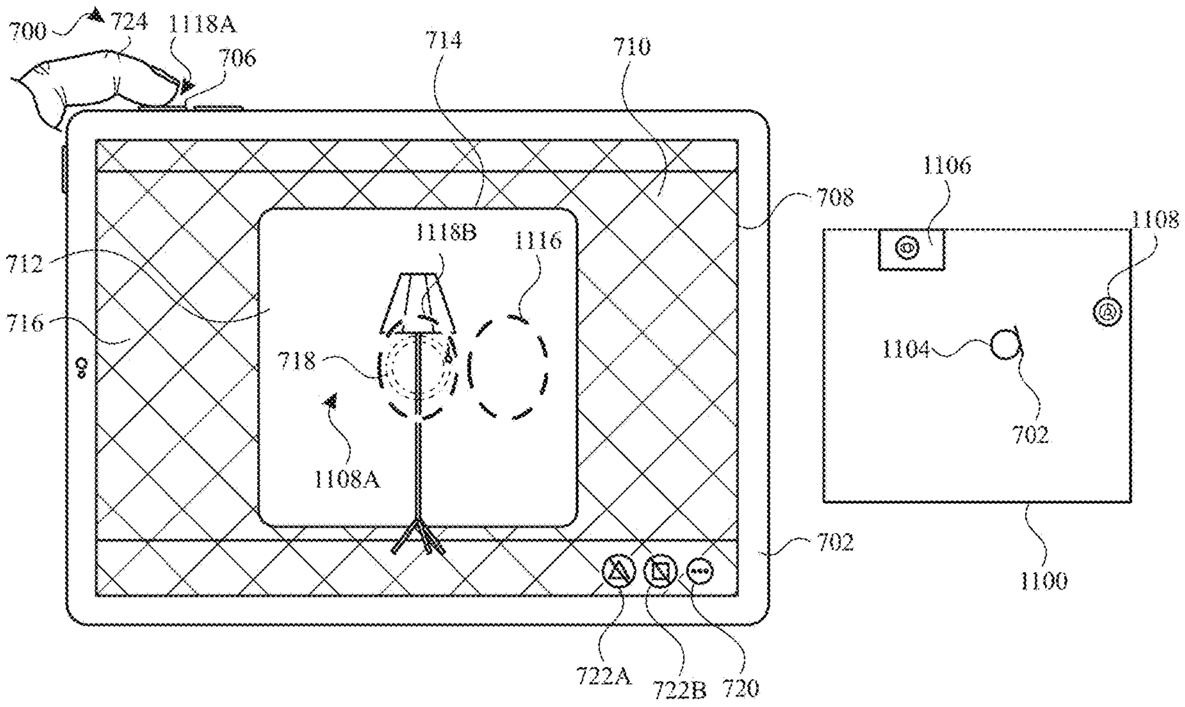
Figure 11H:
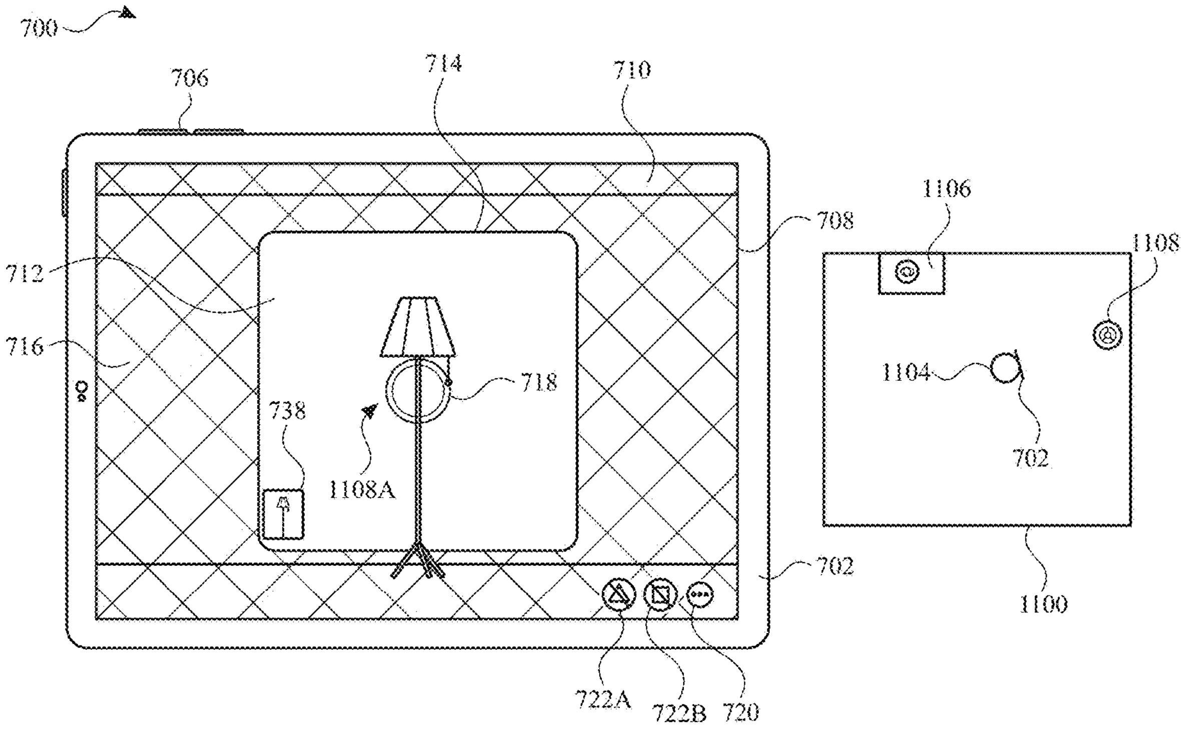

As described above with respect to FIG. 7H and method 800, at FIG. 11G, computer system 700 detects that gaze 1116 is directed at shutter affordance 718 (e.g., that gaze 1116 is within the central region of camera viewfinder 712) and changes the appearance of shutter affordance 718, decreasing the translucency and/or slightly reducing the size of the concentric rings of shutter affordance 718. While displaying shutter affordance 718 with increased visual prominence, computer system 700 detects a potential media capture input, such as button press input 1118A of hardware button 706 and/or tap input 1118B. In response to determining that gaze 1116 is directed at shutter affordance 718 when the potential media capture input is detected, computer system 700 initiates spatial media capture (e.g., capturing photo media (e.g., a still photo and/or a media capture of limited duration that includes content from before and/or after the capture input is detected (e.g., before and/or after an air pinch gesture is released, an air tap gesture is detected, a button press is detected or released), such as a brief animated photo where several frames are captured when a photo is taken, creating a "live" effect) and/or video media). At FIG. 11H, following the media capture, computer system 700 displays captured media icon 738 with a thumbnail of the captured media.

Additional descriptions regarding FIGS. 11A1-11H are provided below in reference to method 1200 described with respect to FIG. 12.

FIG. 12 is a flow diagram of an exemplary method 1200 for displaying a camera preview for spatial media capture with prompts to improve capture quality, in some embodiments. In some embodiments, method 1200 is performed at a computer system (e.g., 101, 1-100, 1-200, 3-100, 6-100, 6-200, 6-300, 6-400, 11.1.2-100, 700, X700, and/or 702) that is in communication with a display generation component (e.g., 1-102, 1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200, 11.3.2-204, 708, and/or X702) (e.g., a display controller; a touch-sensitive display system; a display (e.g., integrated and/or connected), a 3D display, a transparent display, a projector, a heads-up display, and/or a head-mounted display) and a plurality of cameras including a first camera (e.g., 704A) and a second camera (e.g., 704B) (e.g., a camera array/stereo camera for spatial media capture (e.g., 6-106, 6-118, and/or 6-306), where the first camera and the second camera are located a distance apart, such that the perspective of the first camera is different from the perspective of the second camera and thus at least a portion of a field of view of the first camera is outside of a field of view of the second camera; in some embodiments, the computer system further includes one or more rear (user-facing) cameras and/or one or more forward (environment-facing) cameras) (in some embodiments, the computer system includes one or more sensors (e.g., 1-356, 1-456, 6-102, 6-106, 6-108, 6-110, 6-112, 6-114, 6-116, 6-118, 6-120, 6-122, 6-124, 6-126, 6-128, 6-202, 6-203, 6-302, 6-303, 6-306, 6-402, 6-416, 11.1.1-104*a*, 11.1.1-104*b*, 11.1.2-110*a-f*, 11.3.2-100, 11.3.2-106, 11.3.2-206, and/or X704), such as location sensors, orientation sensors, and the like). In some embodiments, method 1200 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 1200 are, optionally, combined and/or the order of some operations is, optionally, changed.

The computer system displays (1202), via the display generation component (e.g., 708 and/or X702), a capture preview (e.g., 712 and/or X712) (e.g., a camera/capture preview UI; in some embodiments, overlaying a field of view of an environment, such as a transparent display, pass-through camera data and/or virtual content; in some embodiments, a physical environment; in some embodiments, a virtual environment; in some embodiments, a mixed-reality environment) for spatial media capture (e.g., a single media capture made using the combined data captured by the first camera (e.g., from the first perspective/capturing the first field of view) and the second camera (e.g., from the second perspective/capturing the second field of view)), wherein a capture input detected while the capture preview is displayed will cause the computer system to capture media from the first camera (e.g., 704A) and the second camera (e.g., 704B) to generate a spatial media item that includes one or more images for a right eye and one or more images for a left eye that when viewed concurrently create an illusion of a spatial representation of a field-of-view of the plurality of cameras.

While displaying the capture preview for spatial media capture, the computer system detects (1204) a location of a subject (e.g., 1106, X1106, 1108 and/or X1108) (e.g., an element of the environment; in some embodiments, the closest visible element of the environment to the plane of the capture) in the field-of-view of the plurality of cameras.

In response to detecting the location of the subject in the field-of-view of the plurality of cameras (1206), in accordance with a determination that the subject location relative to the field-of-view of the plurality of cameras does not meet criteria for capturing spatial media with a threshold level of quality (e.g., if the distance between the cameras and an element of the environment would adversely affect the quality of a current spatial media capture; e.g., if the cameras are too close to an element of the environment, the capture of the element by each camera will differ too greatly to provide a realistic illusion/appearance of depth, and if the cameras are too far from the element, the capture of the element by each camera will differ too little to provide a realistic illusion/appearance of depth), the computer system displays (1208), via the display generation component, a prompt (e.g., 1110, X1110, and/or 1114) (e.g., text, graphics, or another displayed output including instructions to the user) to change a distance between the subject and the plurality of cameras (e.g., “move farther away,” or “move closer,”; in some embodiments, the prompt includes an indication of the quality improvement criteria (e.g., “move farther away to improve spatial media capture quality”)). In some embodiments, if an orientation of the plurality of cameras relative to the subject would adversely affect the quality of a current spatial media capture (e.g., as an off-axis spatial media capture would require the user to tilt their head to the angle of the capture axis to avoid visual discomfort), the computer system displays a prompt to change an orientation of the plurality of cameras relative to the subject (e.g., such that media is captured with a level horizon so that the spatial media can be viewed comfortably with a level horizon). Displaying a prompt to change a distance between a subject and the camera provides a user with real-time, improved visual feedback about a state of the computer system. Doing so also assists the user with composing media capture events and reduces the risk that transient media capture opportunities are missed or mis-captured (e.g., due to the subject being too close to or too far from the camera for effective spatial media capture), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the display of the prompt indicates to the user that the current (e.g., real-time) positioning of the subject with respect to the camera may adversely affect spatial media capture quality, and may assist the user in changing the positioning for improved spatial media capture quality.

In some embodiments, the prompt (e.g., 1110, X1110, and/or 1114) to change the distance between the subject and the plurality of cameras includes text (in some embodiments, including a written instruction, such as “move farther away” or “move closer”; in some embodiments, including other text, such as an explanation for the prompt (e.g., “move farther away to improve spatial media capture quality”)). Displaying a text prompt provides the user with improved visual feedback on a state of the computer system, for example, indicating that the current positioning of the camera will adversely affect media capture quality. Doing so also assists the user with composing media capture events and reduces the risk that transient media capture opportunities are missed or mis-captured, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to detecting the location of the subject (e.g., 1106, X1106, 1108, and/or X1108) in the field-of-view of the plurality of cameras, in accordance with a determination that the subject location relative to the field-of-view of the plurality of cameras meets the criteria for capturing spatial media with the threshold level of quality, the computer system foregoes displaying the prompt to change the distance between the subject and the plurality of cameras (e.g., as illustrated in FIGS. 11C-11D and FIGS. 11F-11H). Forgoing displaying the prompt provides the user with improved visual feedback on a state of the computer system, for example, indicating that the current positioning of the camera will not adversely affect media capture quality. Doing so also assists the user with composing media capture events and reduces the risk that transient media capture opportunities are missed or mis-captured, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the capture preview for spatial media capture includes a media capture selectable interface object (e.g., 718 and/or X718) (e.g., concentric rings at the center of the capture preview), and displaying the prompt to change the distance between the subject and the plurality of cameras includes making a first change to one or more visual features of the media capture selectable interface object (e.g., as illustrated in FIGS. 11A1-11C and 11E-11F) (e.g., color, opacity, and/or size). Prompting the change in distance by altering the appearance of the capture affordance provides the user with intuitive, improved visual feedback on a state of the computer system (e.g., with respect to current spatial media capture quality implications) without excessively obscuring the field-of-view. Doing so also assists the user with composing media capture events and reduces the risk that transient media capture opportunities are missed due to an element of the UI obscuring the environment or due to the user not seeing the visual feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the media capture selectable interface object (e.g., 718 and/or X718) is displayed in a central region (e.g., a region that includes a center) of the capture preview for spatial media capture. Displaying the capture affordance at the center of the capture preview provides the user with intuitive, improved visual feedback on a state of the computer system (e.g., with respect to current spatial media capture quality implications) without excessively obscuring the field-of-view. Doing so also assists the user with composing media capture events and reduces the risk that transient media capture opportunities are missed due to an element of the UI obscuring the environment or due to the user not seeing the visual feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, making the first change to the one or more visual features of the media capture selectable interface object (e.g., 718 and/or X718) includes changing a first portion (e.g., the concentric rings) of the media capture selectable interface object from a first color to a second color (e.g., as illustrated in FIGS. 11C and 11F) (e.g., changing the rings from white to yellow or from black to green). Prompting the change in distance by changing the color of the capture affordance provides the user with intuitive, improved visual feedback on a state of the computer system (e.g., with respect to current spatial media capture quality implications) without excessively obscuring the field-of-view. Doing so also assists the user with composing media capture events and reduces the risk that transient media capture opportunities are missed due to an element of the UI obscuring the environment or due to the user not seeing the feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while the media capture selectable interface object (e.g., 718) is displayed with the second color, the computer system changes the first portion of the media capture selectable interface object from the second color to the first color over a period of time (e.g., gradually fading back to the original color after providing the feedback; in some embodiments, changing back to the default color when the camera is an appropriate distance from the subject). Reverting a change of the color of the capture affordance provides the user with intuitive, improved visual feedback on a state of the computer system (e.g., indicating that the prompt to change distance has been successfully completed) without excessively obscuring the field-of-view. Doing so also assists the user with composing media capture events and reduces the risk that transient media capture opportunities are missed due to an element of the UI obscuring the environment or due to the user not seeing the visual feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, prior to displaying the prompt to change the distance between the subject and the plurality of cameras, a first portion of the media capture selectable object (e.g., 718 and/or X718) is partially transparent such that a first portion of the camera preview for the spatial media capture is visible through the first portion of the media capture selectable interface object (e.g., as illustrated in FIG. 11D) (e.g., at least the internal portion of the capture affordance is at least partially transparent). In some embodiments, making the first change to the one or more visual features of the media capture selectable interface object includes causing the first portion of the camera preview to be at least partially obscured (e.g., as illustrated in FIGS. 11A1-11B and 11E) (e.g., blurred, darkened, or otherwise reduced in quality; in some embodiments, by reducing a level of transparency of the first portion of the media capture selectable object; in some embodiments, the obscuring is applied gradually). Prompting the change in distance by obscuring the portion of the camera preview inside the capture affordance provides intuitive, improved visual feedback on a state of the computer system (e.g., with respect to current spatial media capture quality implications) without excessively obscuring the field-of-view. Doing so also assists the user with composing media capture events and reduces the risk that transient media capture opportunities are missed due to an element of the UI obscuring the environment or due to the user not seeing the feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, causing the first portion of the camera preview to be at least partially obscured includes blurring the first portion of the camera preview (in some embodiments, the blurring is applied gradually). Prompting the change in distance by blurring the portion of the camera preview inside the capture affordance provides intuitive, improved visual feedback on a state of the computer system (e.g., with respect to current spatial media capture quality implications) without excessively obscuring the field-of-view. Doing so also assists the user with composing media capture events and reduces the risk that transient media capture opportunities are missed due to an element of the UI obscuring the environment or due to the user not seeing the feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, causing the first portion of the camera preview to be at least partially obscured includes darkening the first portion of the camera preview (in some embodiments, the darkening is applied gradually). Prompting the change in distance by blurring the portion of the camera preview inside the capture affordance provides intuitive, improved visual feedback on a state of the computer system (e.g., with respect to current spatial media capture quality implications) without excessively obscuring the field-of-view. Doing so also assists the user with composing media capture events and reduces the risk that transient media capture opportunities are missed due to an element of the UI obscuring the environment or due to the user not seeing the feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, after causing the first portion of the camera preview to be at least partially obscured (e.g., as illustrated in FIG. 11A1-11A2), the computer system detects a change (e.g., 1112A) to the location of the subject in the field-of-view of the plurality of cameras (e.g., detecting movement of the camera with respect to the elements of the environment). In some embodiments, in response to detecting the change to the location of the subject in the field-of-view of the plurality of cameras, the computer system makes a second change to the one or more visual features of the media capture selectable interface object (e.g., as illustrated in FIG. 11B) (in some embodiments, changing the degree to which the appearance is changed (e.g., obscuring the preview more or less); in some embodiments, reverting changes to the appearance (e.g., no longer obscuring the camera preview of the change) when quality criteria are met) (in some embodiments, a property of the second change (e.g., magnitude and/or speed) is based on, scales with, and/or is proportional to a property (e.g., magnitude, speed, and/or direction) of the change in location. For example, when the change to the one or more visual effects is a change in the degree of blurring, the blurring increases or decreases by an amount proportional to the distance between the computer system and a target distance range from the subject). Changing the appearance of the capture affordance as the location of the subject changes provides intuitive, improved visual feedback on a state of the computer system (e.g., with respect to current spatial media capture quality implications) without excessively obscuring the field-of-view. Doing so also assists the user with composing media capture events and reduces the risk that transient media capture opportunities are missed due to an element of the UI obscuring the environment or due to the user not seeing the feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, making the second change to the one or more visual features of the media capture selectable interface object (e.g., 718 and/or X718) is based on a direction of the change to the location of the subject (e.g., if the change to the location moved the camera closer to a target distance range, obscuring the camera preview less and if the change to the location moved the camera farther from the target distance range, obscuring the camera preview more). Changing the appearance of the capture affordance based on the direction of the change of subject location provides intuitive, improved visual feedback on a state of the computer system (e.g., with respect to current spatial media capture quality implications) without excessively obscuring the field-of-view. Doing so also assists the user with composing media capture events and reduces the risk that transient media capture opportunities are missed due to an element of the UI obscuring the environment or due to the user not seeing the feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, making the second change to the one or more visual features of the media capture selectable interface object (e.g., 718 and/or X718) is based on a magnitude of the change to the location of the subject (e.g., if the change to the location moved the camera only slightly away from or towards a target distance range (e.g., a relatively small magnitude of change), the change (e.g., increase or decrease, respectively) to the obscuring is also slight; and if the change to the location moved the camera more significantly away from or towards the target distance range, the change to the obscuring is more significant). Changing the appearance of the capture affordance based on the magnitude of the change of subject location provides intuitive, improved visual feedback on a state of the computer system (e.g., with respect to current spatial media capture quality implications) without excessively obscuring the field-of-view. Doing so also assists the user with composing media capture events and reduces the risk that transient media capture opportunities are missed due to an element of the UI obscuring the environment or due to the user not seeing the feedback, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the prompt to change the distance between the subject and the plurality of cameras includes a prompt to reduce the distance between the subject and the plurality of cameras (e.g., 1114) (e.g., "move closer," or "move forward"). Displaying a prompt to reduce the subject distance provides the user with improved visual feedback on a state of the computer system, for example, indicating how to change the current positioning of the camera to improve media capture quality. Doing so also assists the user with composing media capture events and reduces the risk that transient media capture opportunities are missed or mis-captured, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the prompt to change the distance between the subject and the plurality of cameras includes a prompt (e.g., 1110 and/or X1110) to increase the distance between the subject and the plurality of cameras (e.g., "move farther away," or "back up"). Displaying a prompt to increase the subject distance provides the user with improved visual feedback on a state of the computer system, for example, indicating how to change the current positioning of the camera to improve media capture quality. Doing so also assists the user with composing media capture events and reduces the risk that transient media capture opportunities are missed or mis-captured, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system detecting a movement (e.g., 1112A, 1112B, 1112C, and/or 1112D) of a user (e.g., 1104 and/or 1104) of the computer system in a physical environment (e.g., 1110 and/or X1110). In some embodiments, detecting the location of the subject (e.g., 1106, X1106, 1108, and/or X1108) in the field-of-view of the plurality of cameras is performed in response to detecting the movement of the user (e.g., when the user moves in or around a physical environment, checking the location of the subject (e.g., the current closest subject) and, if appropriate, displaying the prompt). Displaying a prompt based on the physical movement of the user provides the user with improved visual feedback on a state of the computer system, for example, indicating if and/or how the movement of the user affected the capture quality. Doing so also assists the user with composing media capture events and reduces the risk that transient media capture opportunities are missed or mis-captured, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system detects a change to the field-of-view of the plurality of cameras. In some embodiments, detecting the location of the subject (e.g., 1106, X1106, 1108, and/or X1108) in the field-of-view of the plurality of cameras is performed in response to detecting the change to the field-of-view of the plurality of cameras (e.g., when the camera viewpoint changes, checking the location of the subject (e.g., the current closest subject) and, if appropriate, displaying the prompt). Displaying a prompt based on the movement of the camera viewpoint provides the user with improved visual feedback on a state of the computer system, for example, indicating how the new capture framing affects the capture quality. Doing so also assists the user with composing media capture events and reduces the risk that transient media capture opportunities are missed or mis-captured, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first camera (e.g., 704A) and second camera (e.g., 704B) generate the spatial media item by capturing at least content within a first set of one or more planes of capture (e.g., planes that are substantially perpendicular to the principal axes of the cameras and/or parallel to outward facing lenses of the cameras) that are at least partially within a field-of-view of the first camera and a field-of-view of the second camera. In some embodiments, the first set of one more planes of capture are planes at which spatial media content can be generated with the threshold level of quality upon capture (e.g., planes of capture at a distance from the first and second cameras that allows for capture with the threshold level of quality) (e.g., such that content within the first set of one or more planes of capture when the media is captured can be presented with the illusion of a spatial representation of a threshold level of quality). In some embodiments, content that is within the field-of-view of the first camera and/or the field-of-view of the second camera but not within the first set of one or more planes of capture will not be captured with the threshold level of quality. In some embodiments, when detecting the location of the subject, a plurality of objects (e.g., persons and/or inanimate objects) are within the field-of-view of the first camera and/or the second camera, and the plurality of objects includes a first object that is an object of the plurality of objects that is closest in distance to the first set of one or more planes of capture. In some embodiments, the subject (e.g., 1106, X1106, 1108, and/or X1108) is the first object (e.g., the subject is selected based on the object that is closest to the first set of one or more planes of capture). Detecting the location of the subject is the closest object in the current field-of-view to a plane of a combined field-of-view of the cameras provides improved control of spatial media capture, for example, by ensuring that the closest object is a sufficient distance from the cameras. Doing so also assists the user with composing media capture events and reduces the risk that transient media capture opportunities are missed or mis-captured, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, aspects/operations of methods 800, 1000, and 1200 may be interchanged, substituted, and/or added between these methods. For example, the user interface displayed in method 1200 can be the same as the user interface displayed in method 800, and the prompt to change the distance between the subject and the plurality of cameras can be displayed according to method 1200 before, during, or after initiating media capture according to method 800. For example, the camera preview displayed in method 1000 can be the same as the capture preview for spatial media displayed in method 1200, and the indicator representing the orientation of the field-of-view of the camera(s) can be displayed according to method 1000 before, concurrently with, or after displaying the prompt to change a distance between the subject and the cameras according to method 1200. For brevity, these details are not repeated here.

FIGS. 13A-13P illustrate exemplary methods for displaying a camera preview for media capture with a camera movement indicator. FIG. 14 is a flow diagram of an exemplary method 1400 for displaying a camera preview for media capture with a camera movement indicator. The user interfaces in FIGS. 13A-13P are used to illustrate the processes described below, including the process in FIG. 14.

FIG. 13A schematically illustrates different types of camera movement that can be detected by computer system 700. As discussed with respect to FIGS. 7A-7B, computer system 700 includes first camera 704A and second camera 704B, which are spaced apart from each other on the back side of device 702 but face substantially the same direction and can be used to perform spatial media capture (e.g., as described above with respect to FIGS. 7A, 11A-11H, and 12). Accordingly, moving device 702 as illustrated in FIGS. 13A-13P likewise moves the fields-of-view of first camera 704A and second camera 704B. In some embodiments, computer system 700 detects camera movements using one or more sensors, such as depth sensors (e.g., structural light sensors and/or time-of-flight sensors (e.g., LIDAR and/or ultrasonic sensors)), accelerometers, gyroscopes, and/or magnetometers, and/or using first camera 704A and second camera 704B (e.g., as stereoscopic camera sensors). Although FIGS. 13A-13P illustrate techniques using computer system 700 that is a tablet, the techniques are also applicable using a head-mounted device. In some embodiments where computer system 700 is implemented using a head-mounted device, movements of first camera 704A and second camera 704B arise from movements of a user's head, neck, and/or body. In embodiments in which computer system 700 is an HMD, it can be particularly important to provide a user with feedback about movement of the system during capture, as a user tends find it more difficult to keep his or her head still, as compared to an object held in his or her hands.

In FIG. 13A, schematic (I) illustrates a cartesian coordinate system defined relative to the fields-of-view of first camera 704A and second camera 704B when device 702 is being held in a landscape orientation (e.g., such that first camera 704A and second camera 704B are next to, instead of on top of, each other). In this coordinate system, the x-axis runs parallel to the line between first camera 704A and second camera 704B and parallel to the plane of capture, the y-axis runs perpendicular to the line between first camera 704A and second camera 704B but parallel to the plane of capture, and the z-axis runs perpendicular to the line between first camera 704A and second camera 704B and perpendicular to the plane of capture (e.g., along the focal axis of the cameras). As illustrated in schematic (I), rotation around the x-axis is referred to as pitch rotation, rotation around the y-axis is defined as yaw rotation, and rotation around the z-axis is referred to as tilt rotation (e.g., the form of rotation discussed with respect to the tilt indicator in FIGS. 9A-10 above).

Schematics (II)-(IV) illustrate translation and rotation movements of first camera 704A and second camera 704B as user 1104 holds device 702 facing, and generally centered on, subject 1106 (e.g., a table with a plant on top, as discussed with respect to FIGS. 11A1-11H). As illustrated in schematic (II) (e.g., a side view of user 1104 holding device 702 facing subject 1106), movements of device 702 along the optical axis of first camera 704A and second camera 704B (e.g., forward and backward with respect to subject 1106) are translation movements along the z-axis (e.g., longitudinal translations), movements of device 702 up and down with respect to subject 1106 are translation movements along the y-axis (e.g., vertical translations), and rotations of device 702 around the x-axis (e.g., to pan up and down with respect to subject 1106) are pitch rotations. As illustrated in schematic (III) (e.g., a top-down view of user 1104 holding device 702 facing subject 1106), movements of device 702 forward and backward with respect to subject 1106 are translation movements along the z-axis, movements of device 702 left and right with respect to subject 1106 are translation movements along the x-axis (e.g., transverse or horizontal translations), and rotations of device 702 around the y-axis (e.g., to pan left and right with respect to subject 1106) are yaw rotations. As illustrated in schematic (IV) (e.g., a view from behind user 1104 holding device 702 facing subject 1106 (not pictured)), movements of device 702 left and right with respect to subject 1106 are translation movements along the x-axis, movements of device 702 up and down with respect to subject 1106 are translation movements along the y-axis, and rotations of device 702 around the z-axis (e.g., while remaining facing subject 1106) are tilt rotations.

Figure 13B:
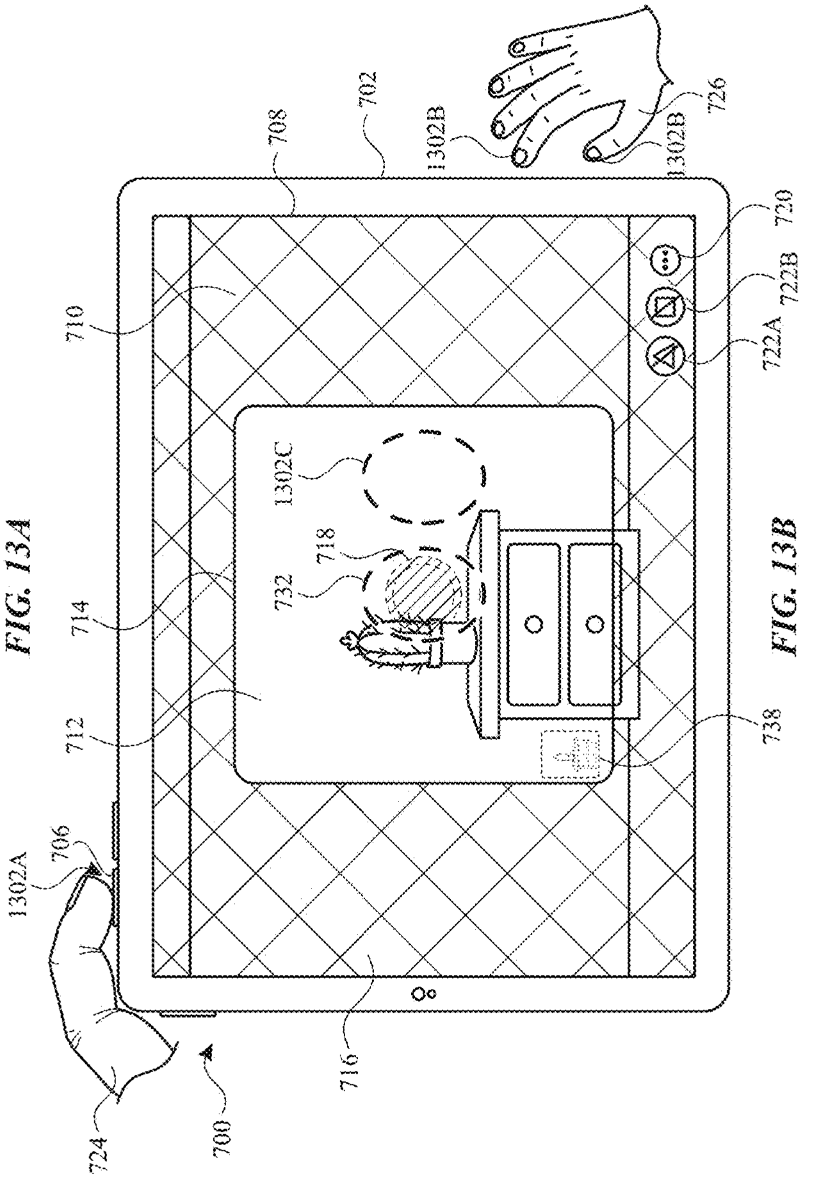
Figure 13C:
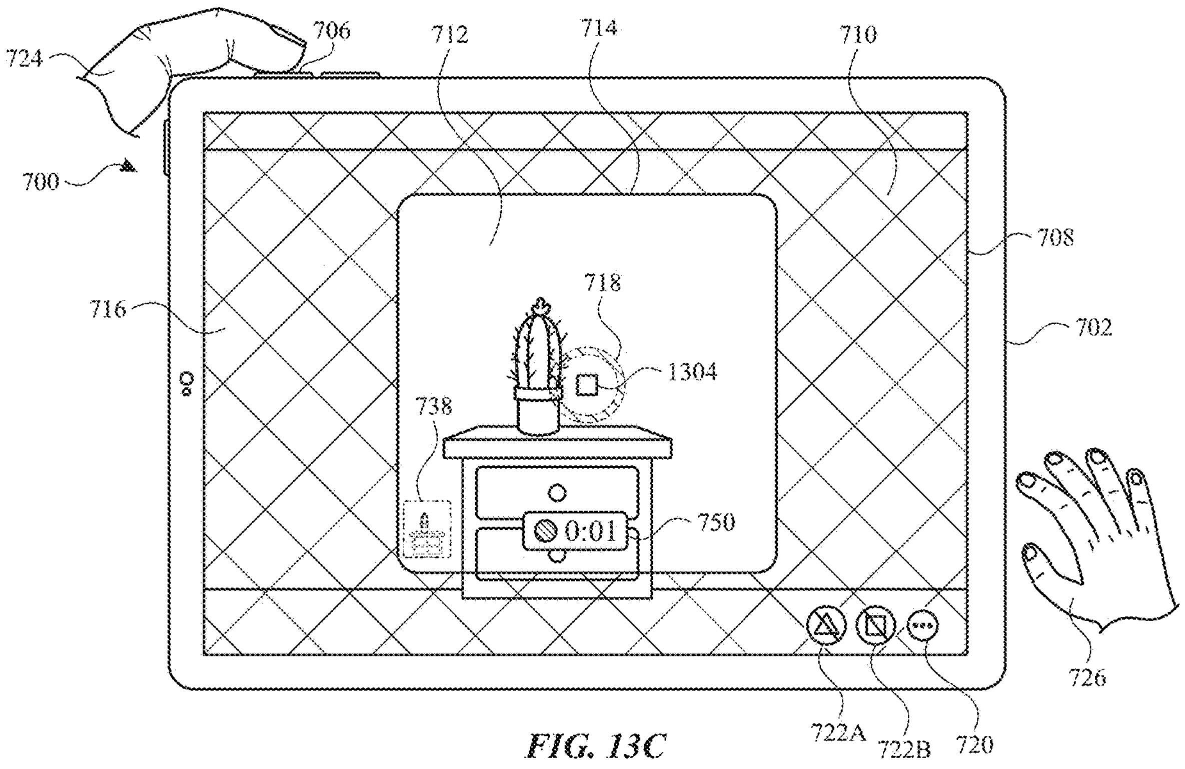

As illustrated in FIG. 13B, while displaying media capture user interface 710 and shutter affordance 718 in a ready-to-capture state (e.g., as described with respect to FIG. 7R), computer system 700 detects a potential media capture input, such as button press input 1302A of hardware button 706, air gesture input 1302B, and/or tap input 1302C, that is held for a duration of time while gaze 732 is directed at shutter affordance 718 (e.g., as described with respect to FIG. 7V). In response, in FIG. 13C, computer system 700 initiates capture of video media (e.g., as described with respect to FIGS. 7V-7W). In some embodiments, computer system 700 initiates a media capture of limited duration that includes content from before and/or after the capture input is detected (e.g., before and/or after an air pinch gesture is released, an air tap gesture is detected, a button press is detected or released), such as a brief animated photo where several frames are captured when a photo is taken, creating a "live" effect. As illustrated in FIG. 13C, while capturing video media, computer system 700 displays video status affordance 750 (e.g., indicating the currently elapsed time of the video capture) and continues to display shutter affordance 718. Additionally, computer system 700 updates the appearance of shutter affordance 718 to include video indicator 1304, a square "stop" icon displayed at the center of the concentric rings of shutter affordance 718.

Figure 13D:
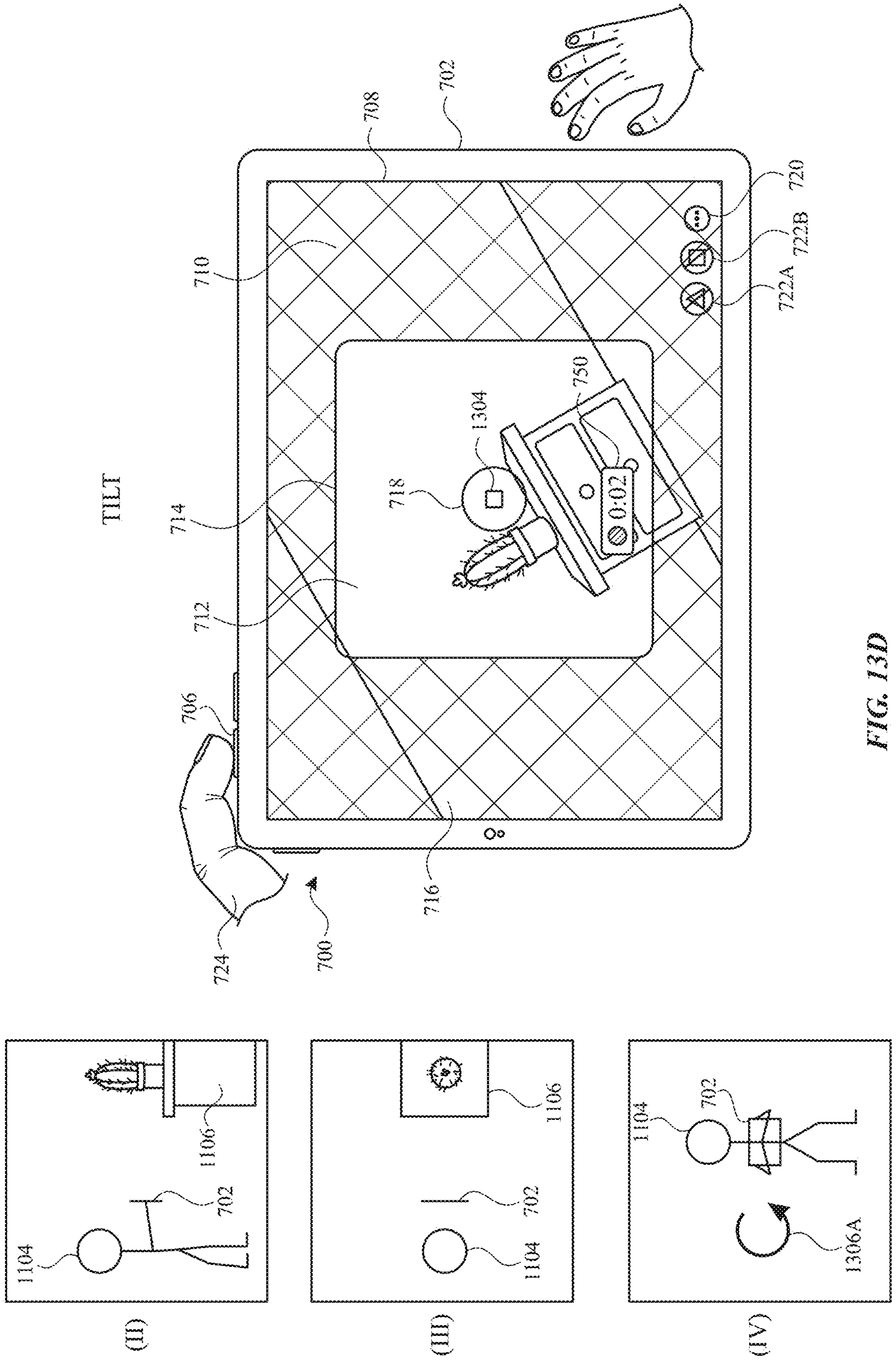
Figure 13F:
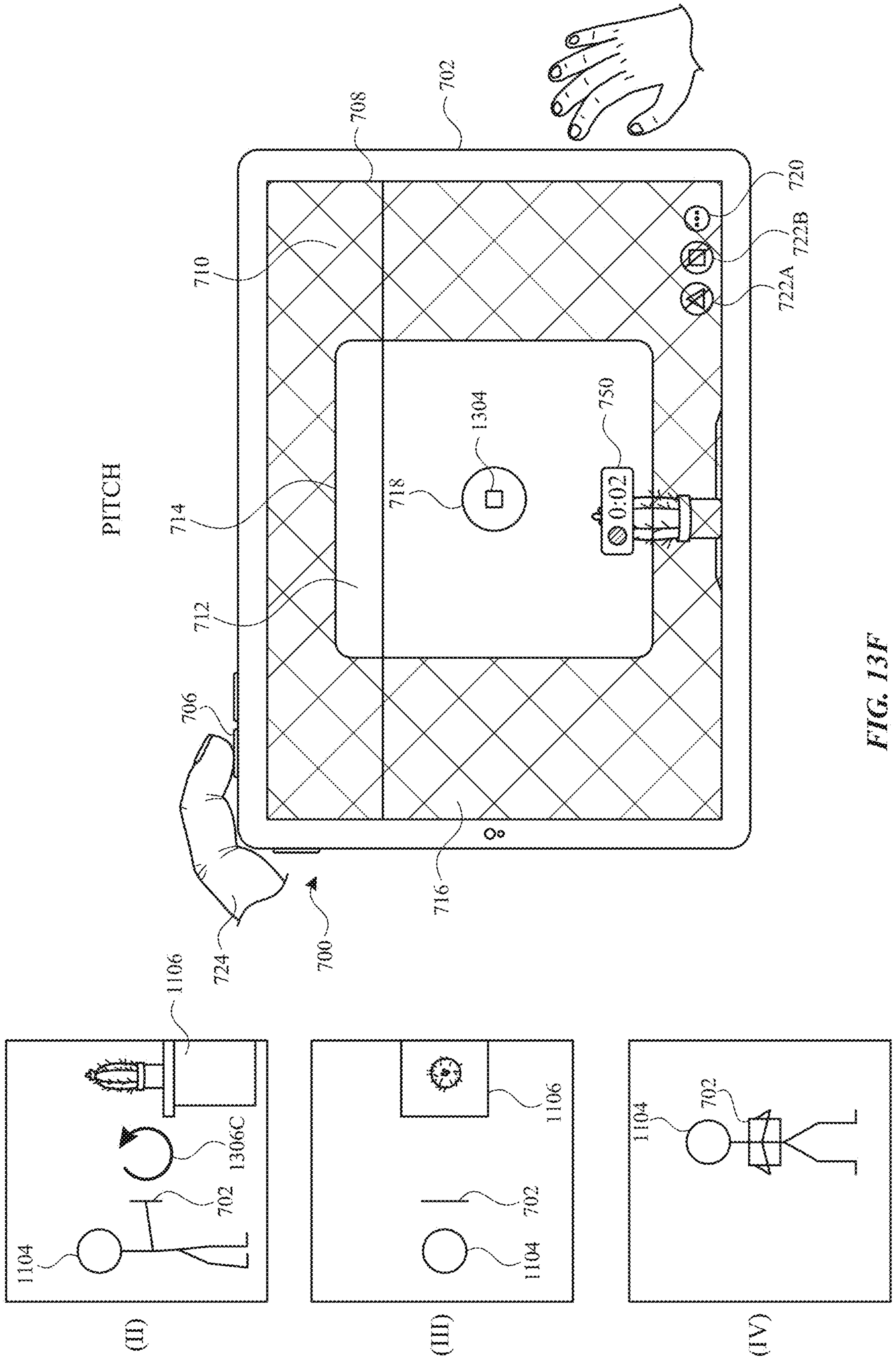

FIGS. 13D-13F illustrate how the fields-of-view of first camera 704A and second camera 704B, and thus, of camera viewfinder 712, change with respect to the view illustrated in FIG. 13B in response to the different types of rotation illustrated in FIG. 13A. As illustrated in FIG. 13D, in response to rotation 1306A represented by schematic (IV) (a clockwise tilt rotation), camera viewfinder 712 remains generally centered on the table with the plant, while the horizon line of the environment appears rotated counterclockwise with respect to the frame of reference of camera viewfinder 712. In some embodiments where computer system 700 is implemented using a head-mounted device, rotation 1306A is caused by the user tilting their head and/or body to the right. As illustrated in FIG. 13E1-13E2, in response to rotation 1306B/X1306B represented by schematic (III) (a counterclockwise yaw rotation), camera viewfinder 712/X712 centers to the left of the table with the plant, while the horizon line of the environment remains as seen in FIG. 13B. In some embodiments where computer system 700 is implemented using a head-mounted device, rotation 1306B is caused by the user turning their head and/or body to the left. As illustrated in FIG. 13F, in response to rotation 1306C represented by schematic (IV) (a counterclockwise pitch rotation), camera viewfinder 712 centers above the table with the plant, and the horizon line of the environment moves lower down with respect to the frame of reference of camera viewfinder 712. In some embodiments where computer system 700 is implemented using a head-mounted device, rotation 1306C is caused by the user tilting their head and/or body to face up.

In some embodiments, the techniques and user interface(s) described in FIGS. 13D-13F are provided by one or more of the devices described in FIGS. 1A-1P. In particular, FIG. 13E2 illustrates an embodiment in which media capture user interface X710 is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

FIG. 13E2 illustrate how the fields-of-view of one or more cameras of HMD X700 (e.g., such as first camera 704A and second camera 704B), and thus, of camera viewfinder X712, change with respect to the view illustrated in FIG. 13B in response to the different types of rotation illustrated in FIG. 13A. As illustrated in FIG. 13E2, in response to rotation X1306B represented by schematic (III) (a counterclockwise yaw rotation), camera viewfinder X712 centers to the left of the table with the plant, while the horizon line of the environment remains as seen in FIG. 13B. When HMD X700 is being worn in a head-mounted position, rotations (such as X1306B) and translations are caused by the user moving their head and/or body, for example, by walking, looking around, nodding their head, shaking their head, standing up, sitting down, leaning, and/or moving involuntarily or unconsciously (e.g., slight movements produced while breathing, talking, and/or holding "still").

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor X704 that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 and/or hardware button X706 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

FIGS. 13G-13N illustrate changes to the display of media capture user interface 710 in the region of shutter affordance 718 in response to movements detected by computer system 700. Although FIGS. 13G-13N illustrate the region of shutter affordance 718 in isolation from the rest of media capture user interface 710, it is to be understood that the region of shutter affordance 718 is displayed at the center of camera viewfinder 712, as generally illustrated in FIGS. 7B-7AB, 9A-9I, 11A1-11H, and 13B-13F. In some embodiments, the region of shutter affordance 718 is displayed at a fixed location with respect to the frame of reference of display 708 (e.g., camera viewfinder 712 is displayed at the center of display 708). In some embodiments, such as the embodiment illustrated in FIGS. 7E-7F, the region of shutter affordance 718 is not displayed at a fixed location with respect to the frame of reference of display 708, but is displayed at a fixed location with respect to the frame of reference of camera viewfinder 712.

Figure 13G:
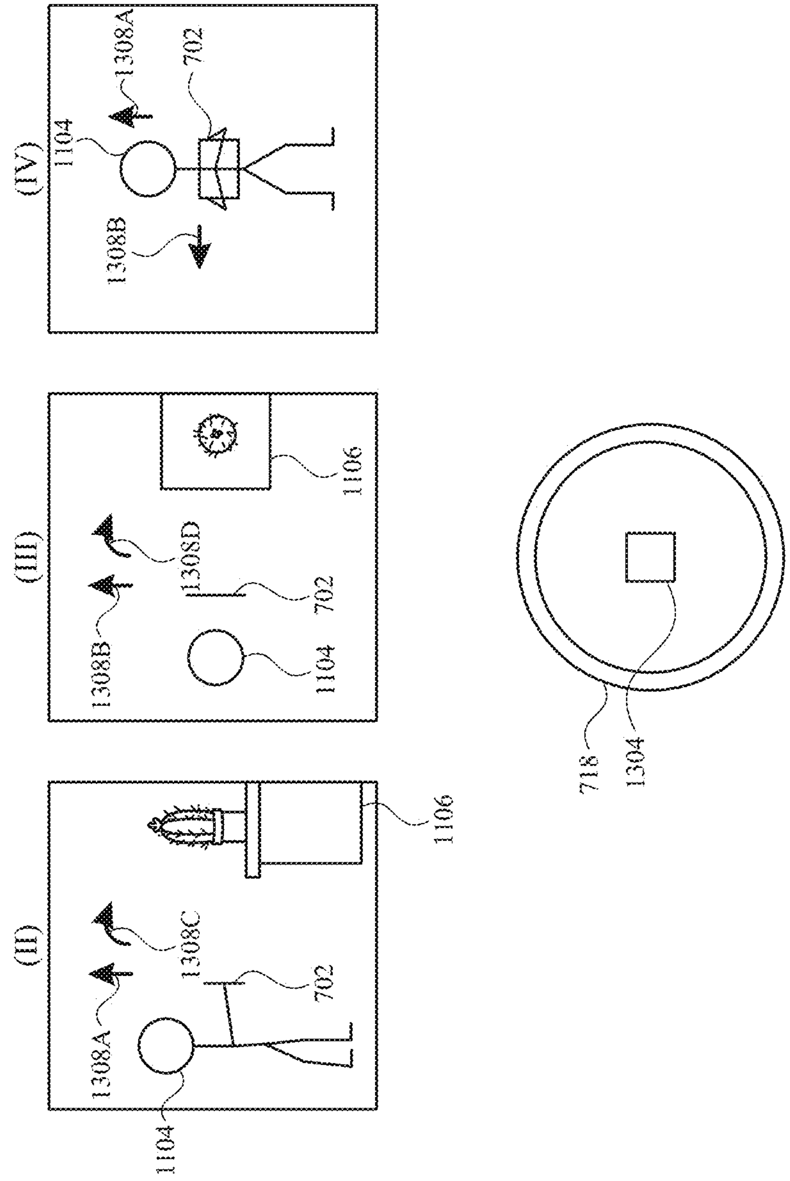

As illustrated in schematics (II)-(IV) of FIG. 13G, computer system 700 detects a movement including vertical translation component 1308A, horizontal translation component 1308B, pitch rotation component 1308C, and/or yaw rotation component 1308D. At FIG. 13G, an overall magnitude of the detected movement (e.g., including 1308A, 1308B, 1308C, and/or 1308D) does not meet at least one minimum movement criteria. As illustrated at FIG. 13G, because the overall magnitude of the detected movement (e.g., including 1308A, 1308B, 1308C, and/or 1308D) does not meet at least one minimum movement criteria, computer system 700 displays shutter affordance 718 and video indicator 1304 as previously shown in FIG. 13C (e.g., without changing the appearance of the region of shutter affordance 718).

For example, the overall magnitude of the detected movement is based on the combined (e.g., normalized) magnitude of acceleration of any vertical translation component, any horizontal translation component, any pitch rotation component, and/or any yaw rotation component included in the detected movement and/or the combined (e.g., normalized) magnitude of velocity of any vertical translation component, any horizontal translation component, any pitch rotation component, and/or any yaw rotation component included in the detected movement. For example, the acceleration and/or velocity of the various components may include average values (e.g., for a particular sampling period), maximum values (e.g., for a particular sampling period), and/or instantaneous values. For example, the magnitudes of acceleration and/or velocity of the various components may be normalized to a consistent frame of reference, such as the plane of display 708. For example, the movement criteria may include a combined minimum linear acceleration of 1.5 $m/s^2$, a combined minimum linear velocity of 1 m/s, a combined minimum angular acceleration of $45°/s^2$, or a combined minimum angular velocity of 25°/s).

Figure 13H:
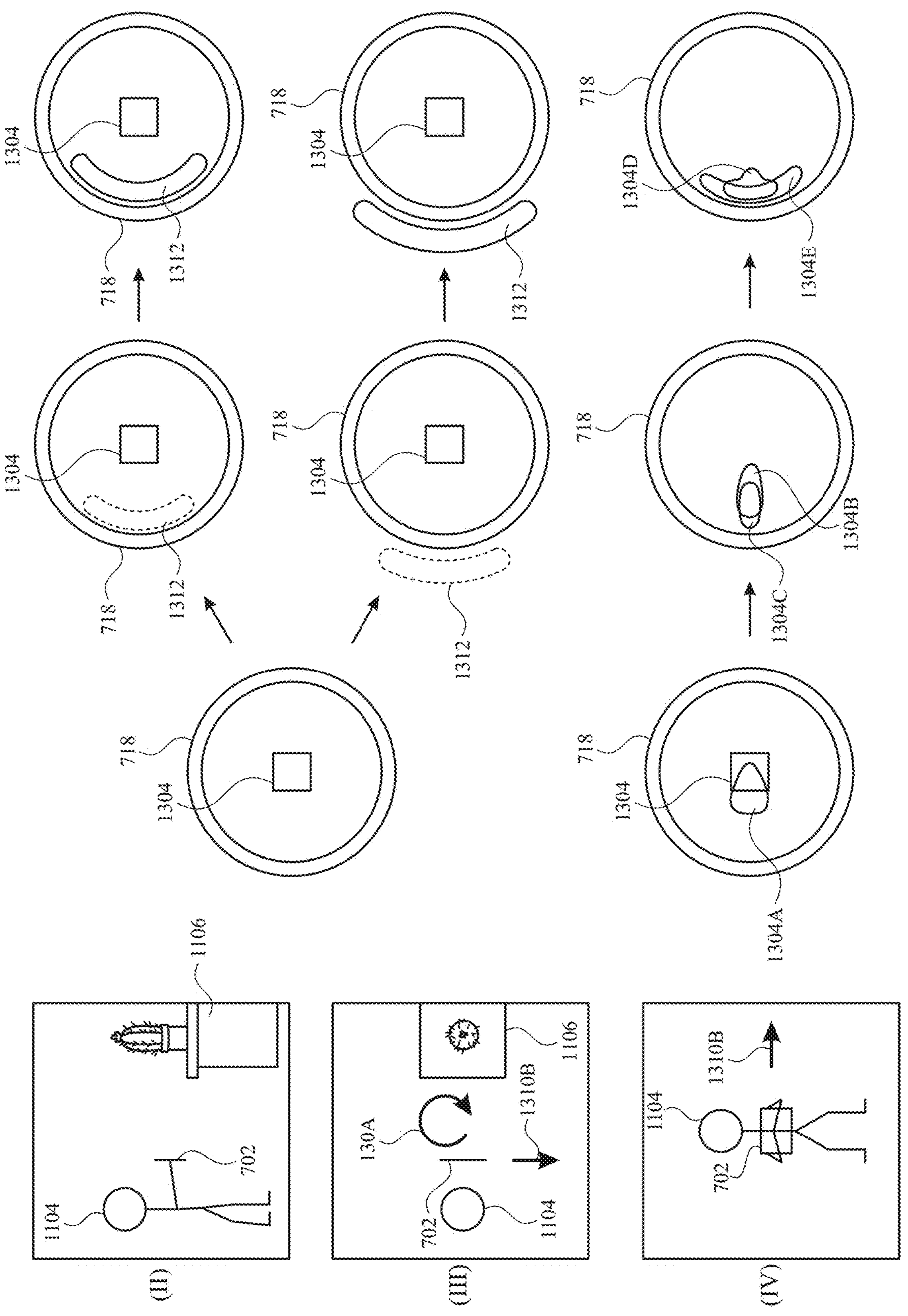

As illustrated in schematics (ii)-(iv) of FIG. 13H, computer system 700 detects movement including yaw rotation component 1310A (e.g., rotating to the right) and/or horizontal translation component 1310B (e.g., translating to the right). At FIG. 13H, the overall magnitude of the detected movement (e.g., contributed by yaw rotation component 1310A and/or by horizontal translation component 1310B) meets one or more minimum movement criteria. For example, the combined magnitude of acceleration of yaw rotation component 1310A and/or horizontal translation component 1310B is at least 1.5 $m/s^2$, and/or the combined magnitude of velocity of yaw rotation component 1310A and/or horizontal translation component 1310B is at least 1 m/s. Accordingly, in response to the detected movement at FIG. 13H, computer system 700 updates the appearance of the region of shutter affordance 718 to indicate the overall direction (e.g., the combined direction of any vertical translation component, any horizontal translation component, any pitch rotation component, and/or any yaw rotation component included in the detected movement normalized to the plane of display 708) and/or overall magnitude of the detected movement. For example, the combined direction of yaw rotation component 1310A (e.g., normalized with respect to the plane of display 708) and/or horizontal translation component 1310B is to the right.

In some embodiments, computer system 700 updates the appearance of the region of shutter affordance 718 by displaying arc indicator 1312. In some embodiments, as illustrated at the top of FIG. 13H, computer system 700 displays arc indicator 1312 as an arc that partially circumscribes the concentric rings of shutter affordance 718. In some embodiments, as illustrated by the middle of FIG. 13H, computer system 700 displays arc indicator 1312 as an arc that is circumscribed by the concentric rings of shutter affordance 718. As the overall direction of the detected movement is to the right, computer system 700 displays arc indicator 1312 to the left side of shutter affordance 718. For example, by displaying arc indicator 1312 in a direction opposite the overall direction of movement (e.g., the net direction of the components of the detected movement that exceed the respective thresholds), arc indicator 1312 appears to have inertia with respect to the moving frame of reference of shutter affordance 718 and/or display 708, and thus intuitively indicates the overall direction of the detected movement to the user. Computer system 700 also displays arc indicator 1312 with an appearance based on the overall magnitude of the detected movement (e.g., the net magnitude of the components of the detected movement that exceed the respective thresholds), for example, increasing the opacity and/or the arc length of arc indicator 1312 as shown in the progression from left to right as the overall magnitude of the detected movement increases.

In some embodiments, computer system 700 updates the appearance of the region of shutter affordance 718 by animating video indicator 1304. Computer system 700 animates video indicator 1304 distorting, moving towards, and "splashing" the left side of shutter affordance 718 as shown by the progression of video indicators 1304A-1304E at the bottom of FIG. 13H, simulating the physics of video indicator 1304 as a droplet (e.g., fluid dynamics) or other distortable object within the frame of reference of shutter affordance 718 and/or display 708, and thus intuitively indicates the overall direction and the overall magnitude of the detected movement to the user.

Figure 13I:
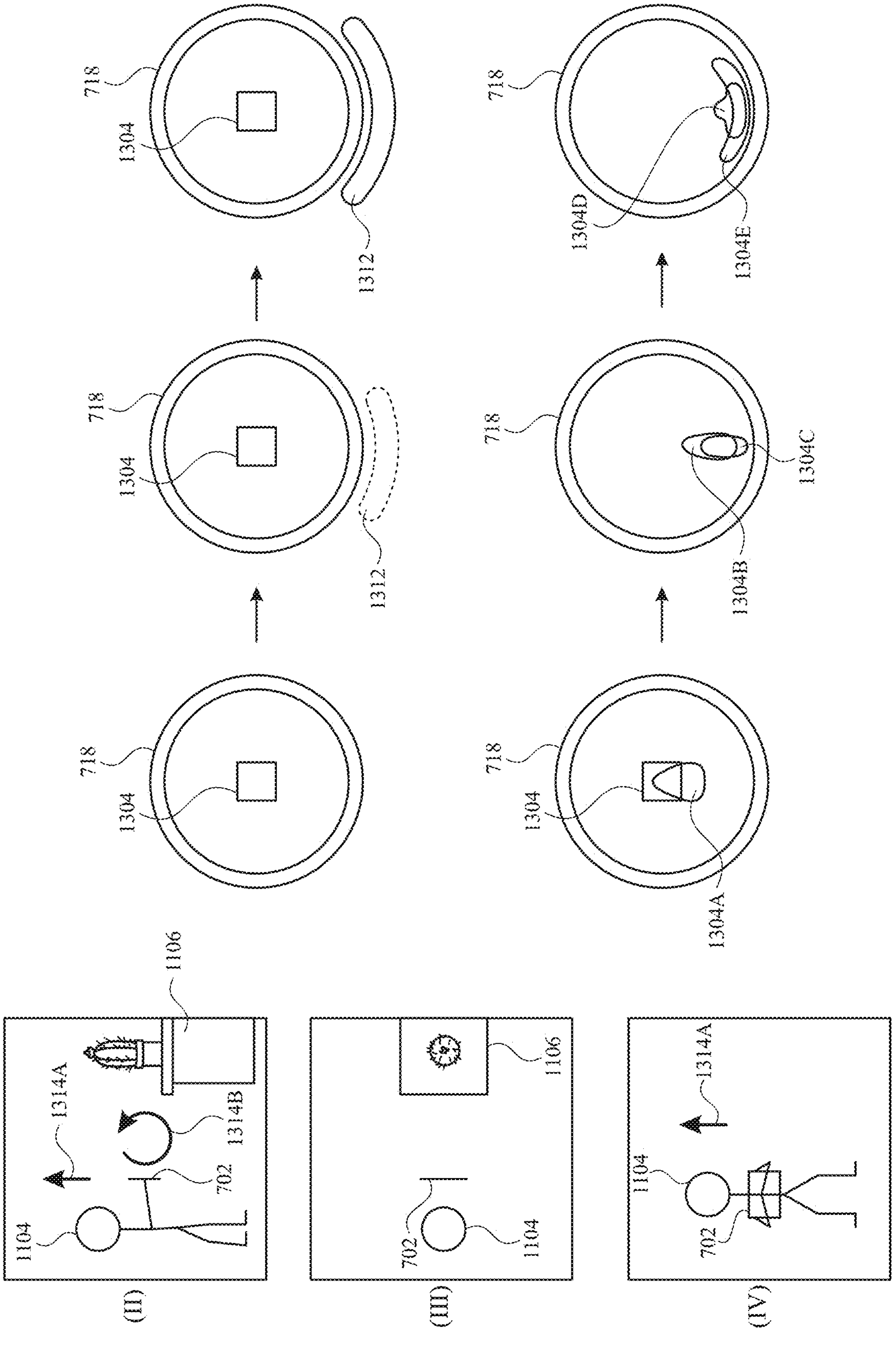

As illustrated in schematics (II)-(IV) of FIG. 13I, computer system 700 detects movement including vertical translation component 1314A (e.g., translating upwards) and/or pitch rotation component 1314B (e.g., rotating upwards). At FIG. 13I, the overall magnitude of detected movement (e.g., contributed by vertical translation component 1314A and/or pitch rotation component 1314B) meets one or more minimum movement criteria. Accordingly, in response to the detected movement at FIG. 13I, computer system 700 updates the appearance of the region of shutter affordance 718 to indicate the overall direction and/or overall magnitude of the detected movement, e.g., as described with respect to FIG. 13H; however, as the overall direction of the detected movement is upwards instead of to the right, computer system 700 displays arc indicator 1312 and/or the "splash" animation of video indicator 1304 (e.g., 1304A-1304E) at the bottom of shutter affordance 718.

Figure 13J:
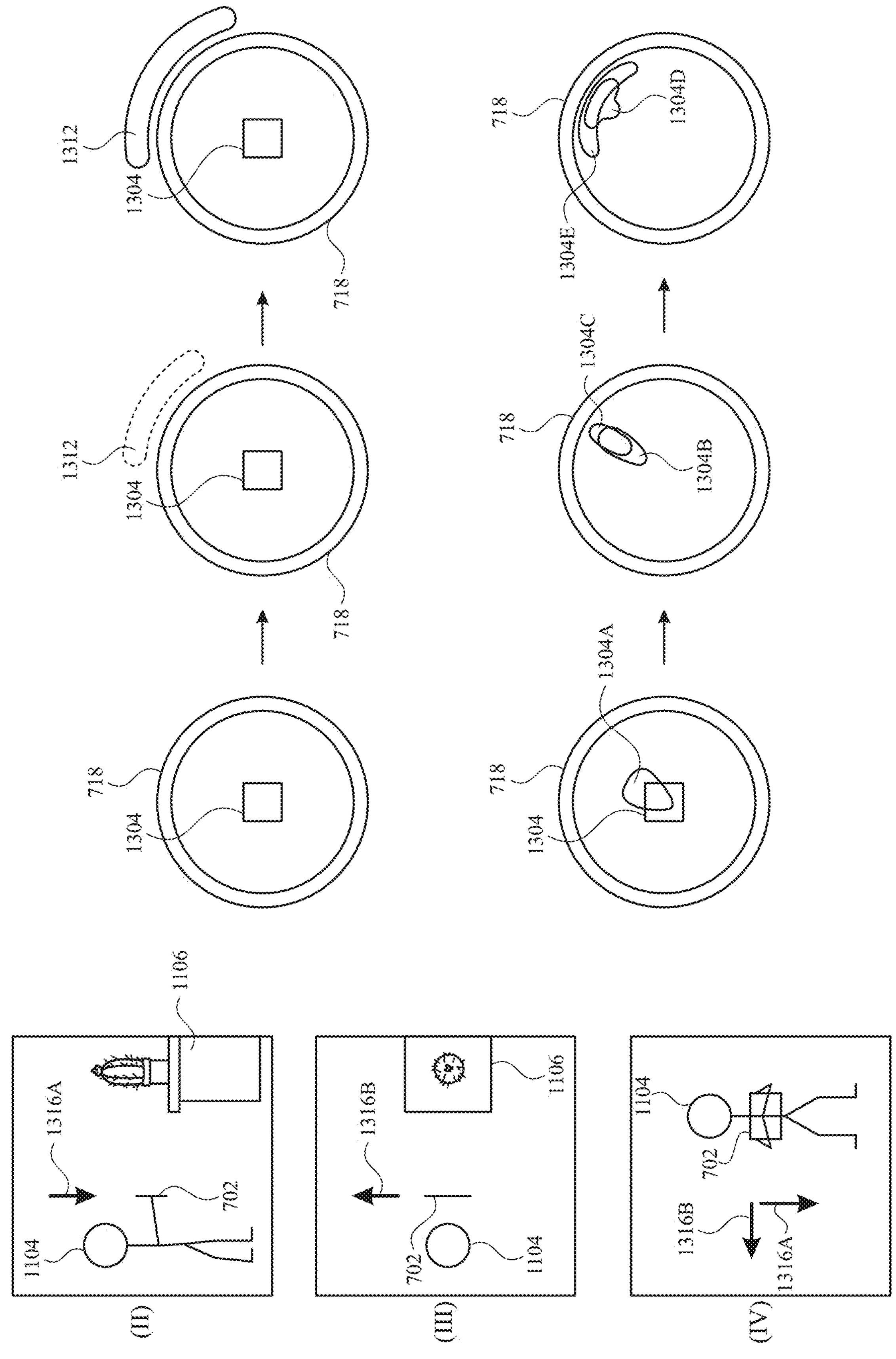

As illustrated in schematics (II)-(IV) of FIG. 13J, computer system 700 detects movement including both vertical translation component 1316A (e.g., translating downwards) and horizontal translation component 1316B (e.g., translating to the left). At FIG. 13J, the overall magnitude of detected movement (e.g., contributed by both vertical translation component 1316A and horizontal translation component 1316B) meets one or more minimum movement criteria. Accordingly, in response to the detected movement at FIG. 13J, computer system 700 updates the appearance of the region of shutter affordance 718 to indicate the overall direction and/or overall magnitude of the detected movement, e.g., as described with respect to FIG. 13H-13I. As the overall direction of the detected movement is down and to the left, computer system 700 displays arc indicator 1312 and/or the "splash" animation of video indicator 1304 (e.g., 1304A-1304E) at the upper right of shutter affordance 718.

Figure 13K:
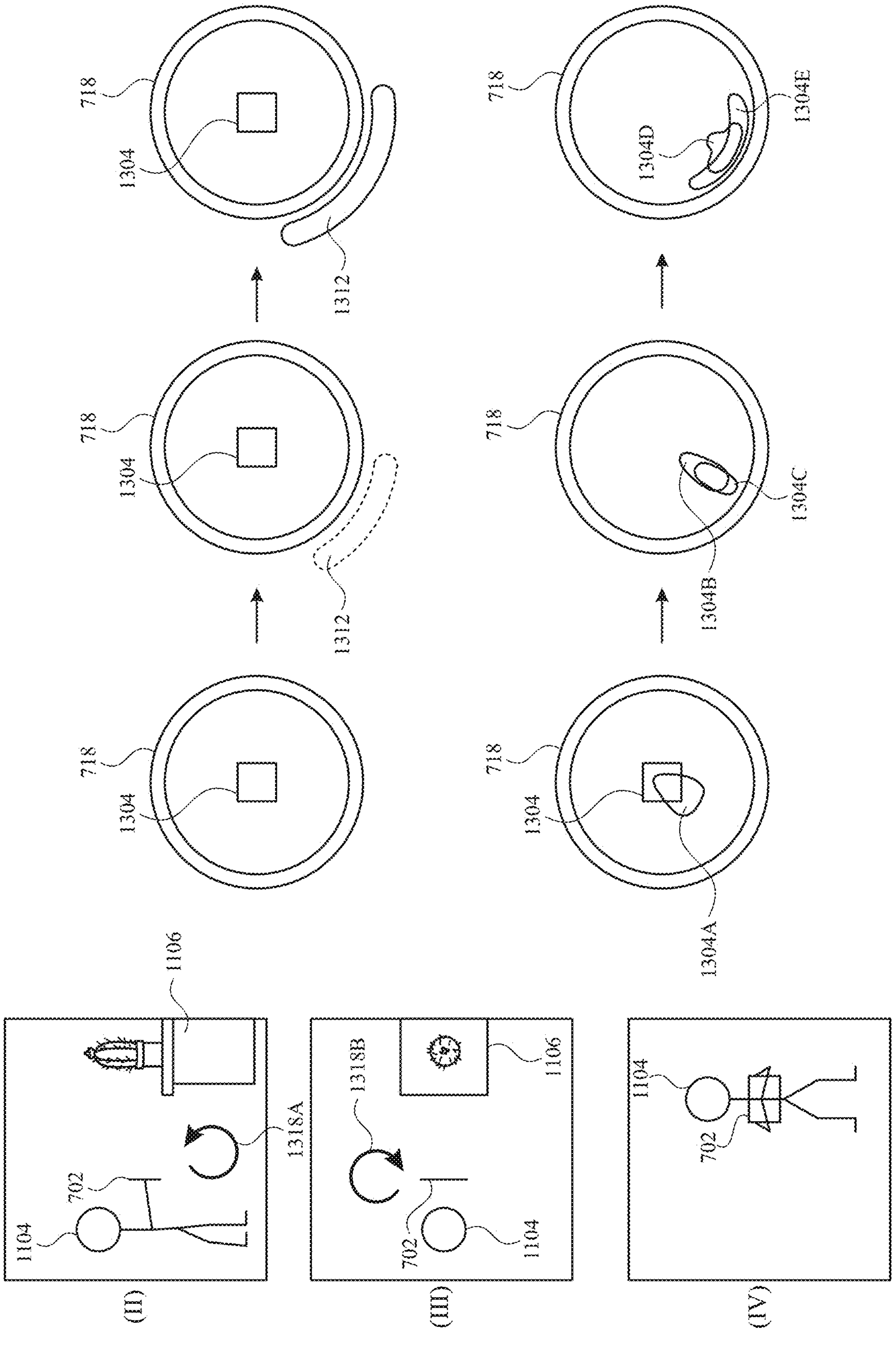

As illustrated in schematics (II)-(IV) of FIG. 13K, computer system 700 detects movement including both pitch rotation component 1318A (e.g., rotating up) and yaw rotation component 1316B (e.g., rotating to the right). At FIG. 13K, the overall magnitude of detected movement (e.g., contributed by both pitch rotation component 1318A and yaw rotation component 1316B) meets one or more minimum movement criteria. Accordingly, in response to the detected movement at FIG. 13K, computer system 700 updates the appearance of the region of shutter affordance 718 to indicate the overall direction and/or overall magnitude of the detected movement, e.g., as described with respect to FIG. 13H-13I. As the overall direction of the detected movement is up and to the right, computer system 700 displays arc indicator 1312 and/or the "splash" animation of video indicator 1304 (e.g., 1304A-1304E) at the lower left of shutter affordance 718.

Figure 13L:
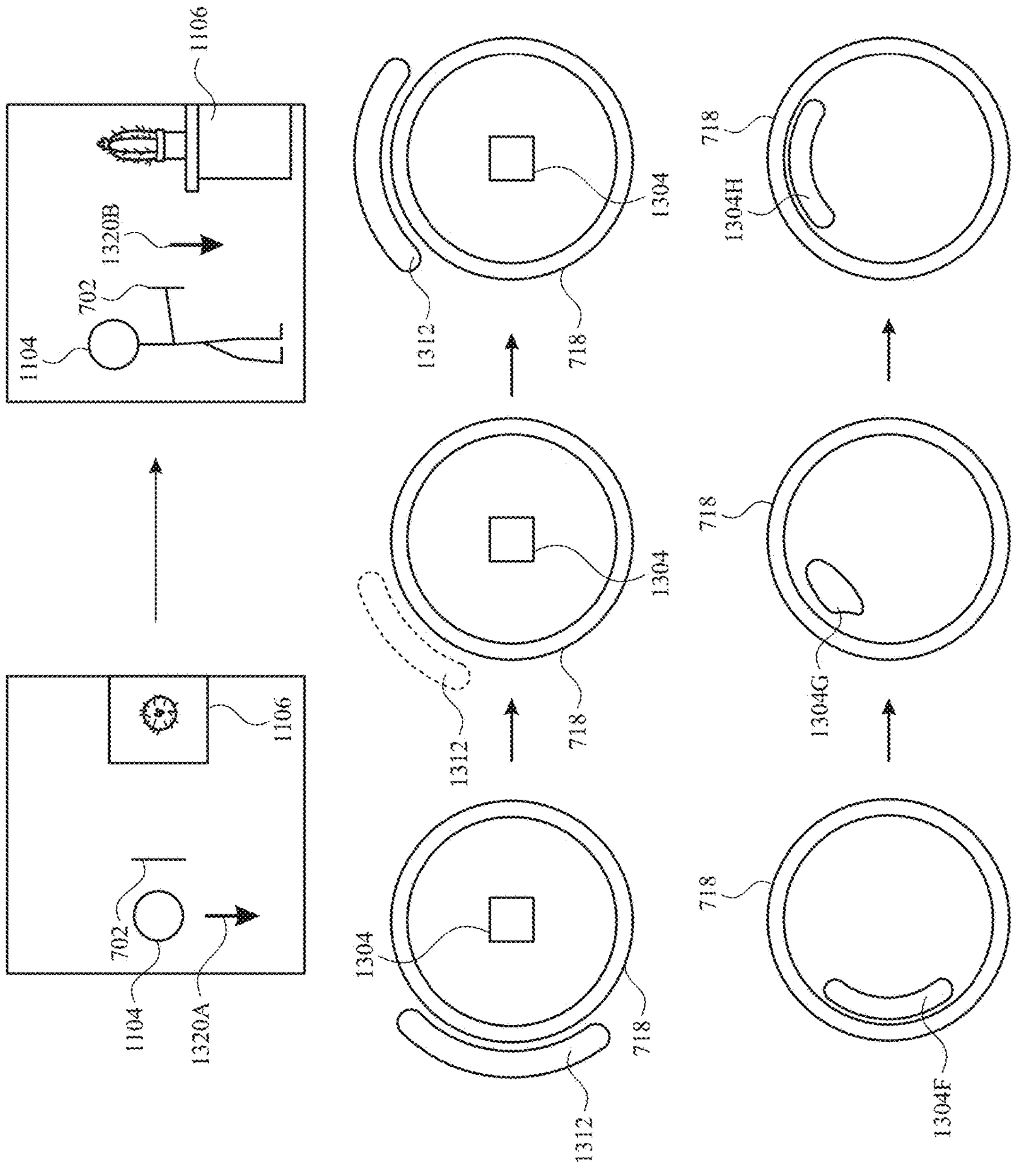

In FIG. 13L, computer system 700 detects a clockwise translation movement, which is a movement including rightwards horizontal translation component 1320A that decreases in magnitude over time and downwards vertical translation component 1320B that increases in magnitude over time. As the magnitude of horizontal translation component 1320A decreases and the magnitude of vertical translation component 1320B increases, the overall direction of the detected clockwise translation movement transitions from rightwards to downwards (e.g., the overall direction also rotates clockwise), and the overall magnitude of the detected clockwise translation movement remains within a narrow range that meets at least minimum movement criteria (e.g., the magnitude of horizontal translation component 1320A decreases at roughly the same rate that the magnitude of vertical translation component 1320B increases). Accordingly, as illustrated in FIG. 13L, computer system 700 updates the appearance of the region of shutter affordance 718 to reflect the current overall direction and/or overall magnitude of the detected clockwise translation movement. For example, computer system 700 updates the appearance of the region of shutter affordance 718 by rotating the location of arc indicator 1312 clockwise around the center of shutter affordance 718 (e.g., from the left side to the top) to remain opposite the current overall direction. As another example, computer system 700 animates video indicator 1304 as shown by the progression of video indicators 1304F-1304H, simulating the physics of video indicator 1304 as a droplet or other distortable object going from being "splashed" on the left side to being "splashed" at the top.

Figure 13M:
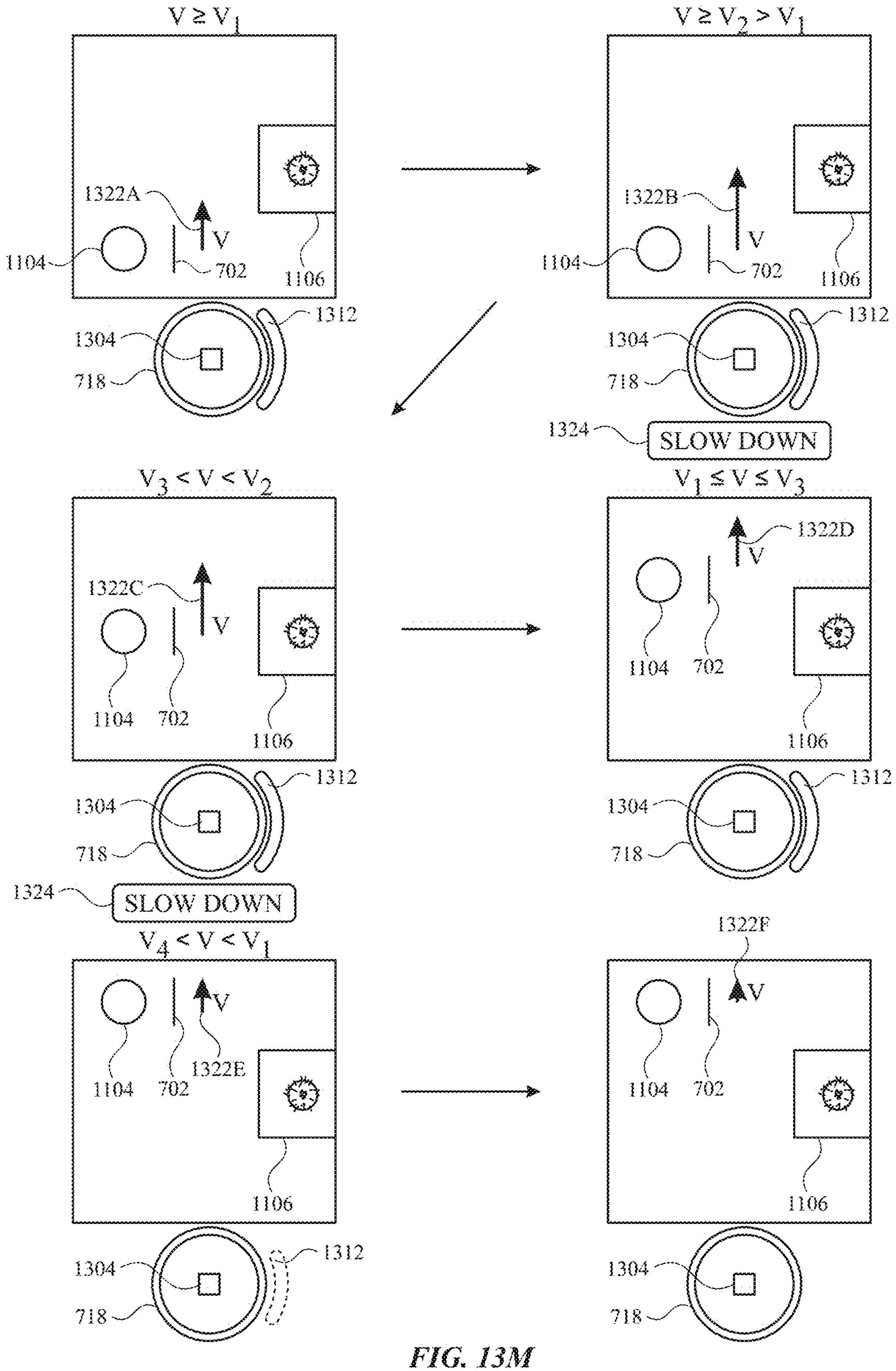

In FIG. 13M, computer system 700 detects a horizontal translation to the left with velocity v, which changes over time as computer system detects movements 1322A-1322F. Movement 1322A meets at least one minimum movement criterion, for example, because velocity v exceeds an initial linear velocity threshold $v_1$(e.g., a minimum velocity of 1 m/s). In response, computer system 700 updates the appearance of the region of shutter affordance 718 as described above, for example, displaying arc indicator 1312 to the right of shutter affordance 718. As the horizontal translation speeds up at movement 1322B, velocity v exceeds a second, higher linear velocity threshold $v_2$. Accordingly, in response to detecting movement 1322B, computer system 700 displays text notice 1324 below shutter affordance 718, reading "Slow Down." In response to detecting movement 1322C, where velocity v falls below the second linear velocity threshold $v_2$ (e.g., the threshold at which text notice 1324 was initially displayed) but still exceeds a third, lower velocity threshold $v_3$ (e.g., $v_3<v<v_2$), computer system 700 continues to display text notice 1324.

In response to detecting movement 1322D, where velocity v falls below the third linear velocity threshold $v_3$ but still exceeds the initial linear velocity threshold $v_1$(e.g., the threshold at which arc indicator 1312 was initially displayed) (e.g., $v_1<v<v_3$), computer system 700 ceases displaying text notice 1324, but continues displaying arc indicator 1312 on the right side of shutter affordance 718. In response to detecting movement 1322E, where velocity v falls below the initial linear velocity threshold $v_1$(e.g., the threshold at which the detected movements first met the minimum movement criteria and computer system 700 initially began to update the appearance of the region of shutter affordance 718 as described above) but still exceeds a fourth, lower velocity threshold $v_4$ (e.g., $v_4<v<v_1$), computer system 700 updates the appearance of the region of shutter affordance 718 as described above, for example, continuing to display arc indicator 1312 on the right side of shutter affordance 718 and decreasing the opacity and/or the arc length of arc indicator 1312. Finally, in response to detecting movement 1322F, where velocity v falls below the fourth, lower velocity threshold $v_4$, computer system 700 ceases displaying arc indicator 1312 and updating the appearance the region of shutter affordance 718, such that the region of shutter affordance 718 again appears as illustrated in FIG. 13G (e.g., in an initial/non-moving state).

Figure 13N:
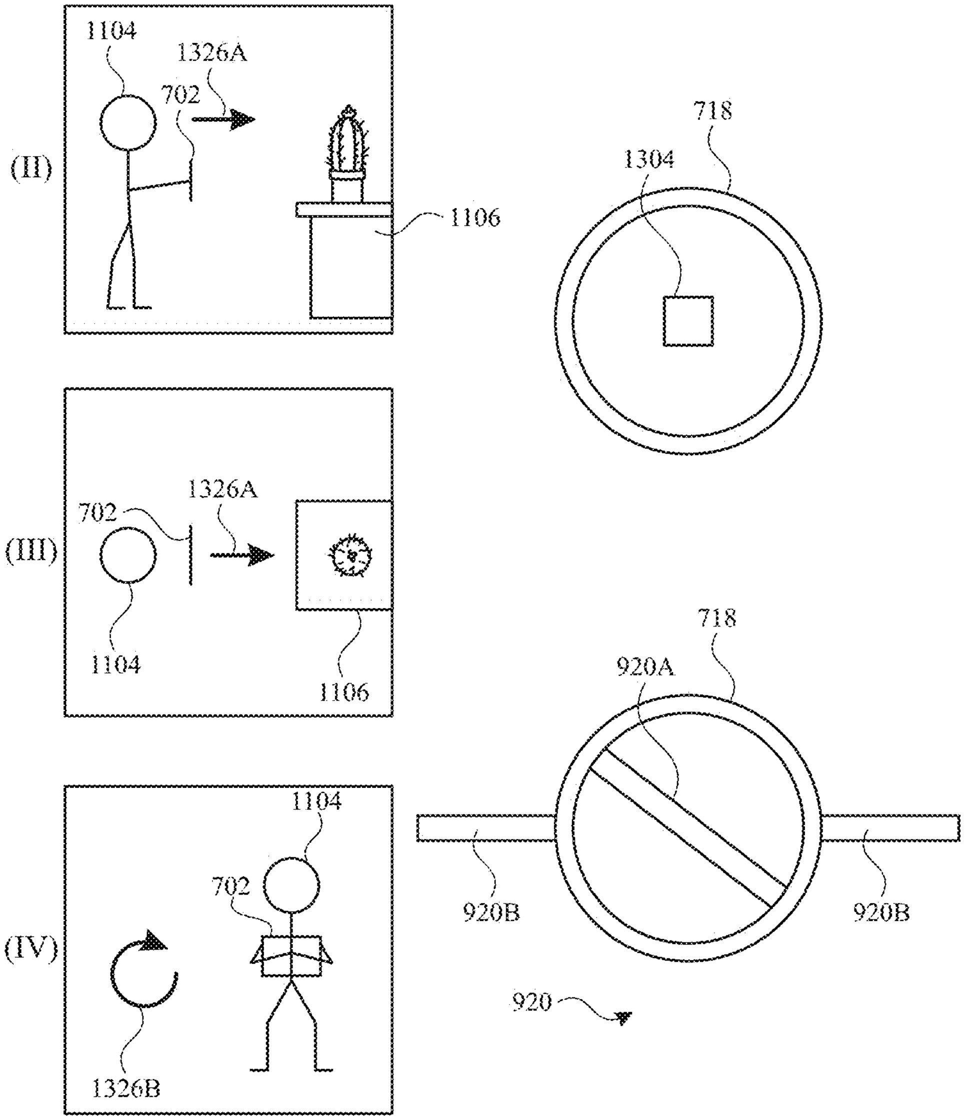

As illustrated in FIG. 13N, computer system 700 detects movement including longitudinal translation component 1326A and tilt rotation component 1326B. As longitudinal translation and tilt rotation are not included in the overall magnitude of the detected movement, the detected movement does not satisfy the minimum movement criteria, and computer system 700 does not update the appearance of the region of shutter affordance 718 as described above (e.g., by displaying arc indicator 1312 and/or animating video indicator 1304). In some embodiments, as illustrated in the top portion of FIG. 13N, in response to detecting the movement, computer system 700 does not update the appearance of the region of shutter affordance 718 (e.g., computer system 700 displays shutter affordance 718 in an initial/non-moving state). In some embodiments, as illustrated in the lower portion of FIG. 13N, in response to detecting the movement, computer system updates the appearance of the region of shutter affordance 718 as described with respect to FIGS. 9A-9I and FIG. 10, for example, displaying level indicator 920 if the tilt of device 702 resulting from tilt rotation component 1326B exceeds a threshold difference from a target orientation.

Figure 13O:
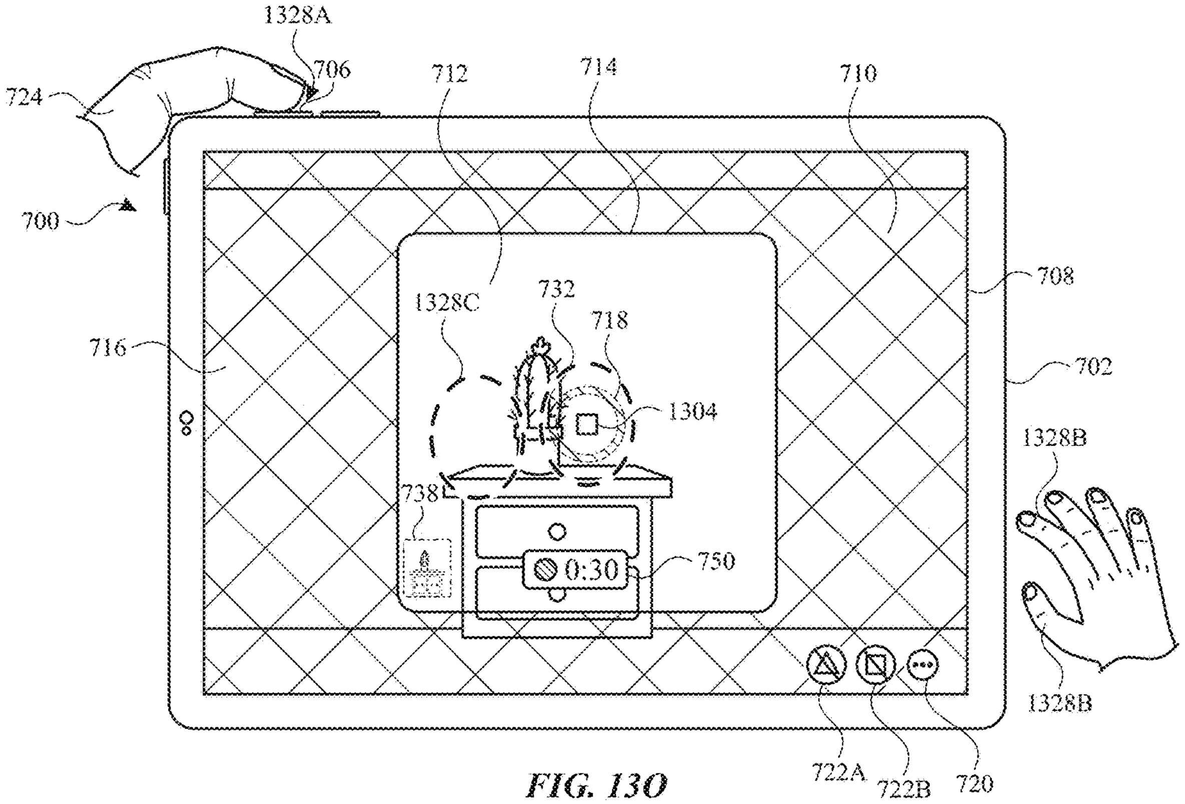

As illustrated in FIG. 13O, while capturing video media (e.g., as indicated by video status affordance 750), computer system 700 detects a potential media capture input, such as button press input 1328A of hardware button 706, air gesture input 1328B, and/or tap input 1328C, while gaze 732 is directed at shutter affordance 718 (e.g., as described with respect to FIG. 7Z). Accordingly, in FIG. 13P, computer system 700 ends the capture of video media (e.g., as described with respect to FIG. 7AA). As illustrated in FIG. 13P, upon ending the capture of video media, computer system 700 ceases displaying video status affordance 750 and video indicator 1304, once again displaying media capture user interface 710 and shutter affordance 718 in the ready-to-capture state.

Additional descriptions regarding FIGS. 13A-13P are provided below in reference to method 1400 described with respect to FIG. 14.

FIG. 14 is a flow diagram of an exemplary method 1400 for displaying a camera preview for media capture with a camera movement indicator, in some embodiments. In some embodiments, method 1400 is performed at a computer system (e.g., 101, 1-100, 1-200, 3-100, 6-100, 6-200, 6-300, 6-400, 11.1.2-100, 700, X700, and/or 702) that is in communication with a display generation component (e.g., 1-102, 1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200, 11.3.2-204, 708, and/or X702) (e.g., a display controller; a touch-sensitive display system; a display (e.g., integrated and/or connected), a 3D display, a transparent display, a projector, a heads-up display, and/or a head-mounted display) and, one or more sensors (e.g., 1-356, 1-456, 6-102, 6-106, 6-108, 6-110, 6-112, 6-114, 6-116, 6-118, 6-120, 6-122, 6-124, 6-126, 6-128, 6-202, 6-203, 6-302, 6-303, 6-306, 6-402, 6-416, 11.1.1-104*a*, 11.1.1-104*b*, 11.1.2-110*a-f*, 11.3.2-100, 11.3.2-106, 11.3.2-206, and/or X704) (e.g., as location sensors, motion sensors, orientation sensors, and/or depth sensors), the one or more sensors including one or more cameras (e.g., 6-106, 6-114, 6-116, 6-118, 6-120, 6-122, 6-306, 6-416, 11.1.1-104*a-b*, 11.1.2-110*a-f*, 11.3.2-100, 11.3.2-106, and/or 11.3.2-206, 704A, 704B, and/or X704) (in some embodiments, a camera array/stereo camera for spatial capture, where the first camera and the second camera are located a fixed distance apart, such that the perspective of the first camera is different from the perspective of the second camera and thus at least a portion of a field of view of the first camera is outside of a field of view of the second camera; in some embodiments, the computer system further includes one or more rear (user-facing) cameras and/or one or more forward (environment-facing) cameras). In some embodiments, method 1400 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 1400 are, optionally, combined and/or the order of some operations is, optionally, changed.

The computer system (e.g., 101, 1-100, 1-200, 3-100, 6-100, 6-200, 6-300, 6-400, 11.1.2-100, 700, X700, and/or 702) captures (1402) video media using the one or more cameras (e.g., 704A and/or 704B) (in some embodiments, while displaying a camera user interface with a camera preview, as described with respect to FIGS. 7A-8). The computer system, while capturing (1404) the video media, detects (1406), via the one or more sensors (e.g., via the one or more cameras and/or one or more sensors that are different from the one or more cameras), a movement (e.g., 1310A, 1310B, 1314A, 1314B, 1316A, 1316B, 1318A, 1318B, 1320A, 1320B, and/or 1322A-1322F) of the one or more cameras (e.g., a translation (e.g., a movement of the plurality of cameras through 3D space (e.g., x, y, and/or z cartesian movement)) and/or a rotation (e.g., a movement of the plurality of cameras around an axis (e.g., yaw, pitch, and/or roll); in some embodiments, the movement of the one or more cameras includes (e.g., is based on) the velocity and/or acceleration of camera movement (e.g., instantaneous, average, and/or maximum velocity and/or acceleration for one or more sampling periods); in some embodiments, the movement of the one or more cameras includes (e.g., is represented by) one or more magnitudes (e.g., a magnitude of velocity and/or a magnitude of acceleration) and/or one or more directions (e.g., a magnitude of velocity and/or a magnitude of acceleration) (in some embodiments, the movement of the one or more cameras is represented as a vector); in some embodiments, the movement of the one or more cameras includes (e.g., is based on) one or more movement components (e.g., linear and/or angular velocity and/or acceleration can be normalized and combined to determine combined/net magnitude(s) and/or direction(s)).

The computer system, in response to detecting (1408) the movement of the one or more of cameras and in accordance with a determination that the movement of the one or more cameras meets a set of one or more movement criteria (in some embodiments, exceeding initial velocity and/or acceleration threshold(s) and/or falling below a maximum velocity and/or acceleration threshold(s)), displays (1410), via the display generation component, a movement of (e.g., animating) a visual indicator (e.g., 1304, X1304, and/or 1312) (e.g., as illustrated in FIGS. 13H-13M) (in some embodiments, a center element of a shutter affordance/stop button (e.g., a square "stop" icon); in some embodiments, an arc (e.g., circumscribed by or partially circumscribing the shutter affordance/stop button); in some embodiments, the visual indicator is displayed in response to detecting the movement of the one or more of cameras and in accordance with a determination that the movement of the plurality of cameras satisfies the one or more movement criteria (e.g., the arc only appears when camera movement has surpassed a threshold); in some embodiments, the visual indicator is displayed while capturing video (e.g., even when the movement of the plurality of cameras does not satisfy one or more movement criteria) (e.g., the square stop icon is always displayed while capturing video, and appears centered and regular in shape when movement is below a threshold)) relative to a displayed reference object (e.g., 718 and/or X718) (e.g., a shutter affordance and/or stop button, such as described with respect to FIGS. 7A-7AB; in some embodiments, in a center region of a camera preview; in some embodiments, at a location where, when media is not being captured, a shutter affordance/capture button is located; in some embodiments, the reference object is viewpoint-locked (e.g., displayed at a fixed location of a display); in some embodiments, the location of the reference object is not fixed (e.g., for"lazy follow," the camera preview and shutter affordance lag slightly behind camera movement)) (e.g., the visual indicator moves within and/or around the reference object) (In some embodiments the reference object is displayed in response to detecting the movement of the one or more cameras. In some embodiments, the reference object is displayed prior to detecting the movement of the one or more cameras) (in some embodiments, in response to detecting the movement of the one or more of cameras, displaying the movement of the visual indicator (e.g., without regard to whether or not the set of one or more movement criteria).

Displaying (1410) the movement of the visual indicator includes, in accordance with a determination that the movement of the one or more cameras is a movement in a first direction of camera movement (in some embodiments, movement of the one or more cameras includes movement (e.g., velocity and/or acceleration) in a respective direction and/or with a respective magnitude; in some embodiments, the first direction is a combined—(e.g., combining the directions of multiple detected movement components, such as linear/cartesian and/or angular/rotational velocities and/or accelerations) and/or normalized (e.g., with respect to a particular frame of reference, such as the plane of the display) overall direction), displaying (1412) the visual indicator (e.g., 1304, X1304, and/or 1312) moving, relative to the displayed reference object (e.g., 718 and/or X718), in a first direction of indicator movement (e.g., animating movement of the visual indicator in the first direction of indicator movement (in some embodiments, as the direction of movement changes, displaying the visual indicator (e.g., the arc) appearing in a first position with respect to the reference object and/or rotating around and/or within the reference object opposite to the direction of movement; in some embodiments, as the direction and/or magnitude of movement changes, displaying the visual indicator (e.g., the square stop icon) moving with simulated (e.g., based on the movement of the one or more cameras) physics (e.g., fluid mechanics) within the non-inertial frame of reference of the reference object (e.g., distorting and "splashing" against the side of the shutter affordance)) and/or ceasing display of the indicator at a first location and displaying the indicator at a second location, wherein the second location is separated from the first location in the first direction of indicator movement), and, in accordance with a determination that the movement of the one or more cameras is a movement in a second direction of camera movement that is different from the first direction of camera movement (in some embodiments, movement of the one or more cameras includes movement (e.g., velocity and/or acceleration) in a respective direction and/or with a respective magnitude; in some embodiments, the second direction is a combined—(e.g., combining the directions of multiple detected movement components, such as linear/cartesian and/or angular/rotational velocities and/or accelerations) and/or normalized (e.g., with respect to a particular frame of reference, such as the plane of the display) overall direction), displaying (1414) the visual indicator moving, relative to the displayed reference object, in a second direction of indicator movement that is different from the first direction of indicator movement (in some embodiments, the first direction of indicator movement is the same as the first direction of camera movement; in some embodiments, the first direction of indicator movement is different from (e.g., opposite to) the first direction of camera movement. in some embodiments, the second direction of indicator movement is the same as the second direction of camera movement; in some embodiments, the second direction of indicator movement is different from (e.g., opposite to) the second direction of camera movement; in some embodiments, the first direction of indicator movement is based on the first direction of camera movement (in some embodiments, the indicator moves in a direction such that it is positioned opposite to and/or in the direction of camera movement (e.g., the visual indicator rotates orthogonally to the direction of camera movement); in some embodiments, the indicator moves according to simulated physics based on the direction of camera movement and/or the displayed reference object (e.g., the visual indicator reacts to the camera movement by moving, splashing, and/or bouncing with simulated physics))). (In some embodiments, as the direction of movement changes differently, displaying the arc appearing in a different position with respect to the reference object and/or rotating differently around and/or within the reference object opposite to the direction of movement; in some embodiments, as the direction and/or magnitude of movement changes differently, displaying the square stop icon moving with simulated (e.g., based on the different movement of the one or more cameras) physics (e.g., fluid mechanics) within the non-inertial frame of reference of the reference object (e.g., distorting and "splashing" against the side of the shutter affordance) (e.g., the movement of the visual indicator is based on the movement of the one or more cameras (in some embodiments, the movement of the visual indicator is based on a change in the movement of the one or more cameras (e.g., acceleration, deceleration, and/or change in direction); in some embodiments, the movement of the visual indicator indicates direction and/or magnitude of the movement of the one or more cameras; in some embodiments, displaying the visual indicator with respective visual characteristics (e.g., size, shape, color, and/or opacity), wherein the respective visual characteristics are based on the movement of the one or more cameras (in some embodiments, distorting the square "stop" icon for a fluid ("splash") animation; in some embodiments, increasing/decreasing the size and/or opacity of the arc as movement of the cameras increases/decreases))) (in some embodiments, in accordance with a determination that the movement of the one or more cameras does not meet the set of one or more movement criteria, foregoing displaying the movement of the visual indicator relative to the displayed reference object).

Displaying a visual indication moving in a particular direction based on the movement of one or more cameras used for capturing video media provides improved visual feedback about a state of the computer system, which assists the user with composing media capture events and reduces the risk that transient media capture opportunities are mis-captured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the visual indication intuitively indicates the direction of movement of the one or more cameras to the user, allowing the user to adjust the video capture to avoid visually uncomfortable and/or unwanted movement of the viewpoint.

In some embodiments, displaying the movement of the visual indicator relative to the displayed reference object includes: in accordance with a determination that the movement of the one or more cameras is a movement of a first magnitude (in some embodiments, the movement of the first magnitude includes velocity and/or acceleration of respective magnitudes; in some embodiments, the first magnitude is a combined (e.g., combining the magnitudes of multiple detected movement components, such as linear/cartesian and/or angular/rotational velocities and/or accelerations) and/or normalized (e.g., with respect to a particular frame of reference, such as the plane of the display) overall magnitude), displaying the visual indicator moving a first distance (in some embodiments, a linear distance, such as the distance traveled by the visual indicator (e.g., the square stop icon) as it moves from the center of the reference object towards the edge; in some embodiments, an angular distance, such as the distance traveled by the visual indicator (e.g., the arc) around the displayed reference object) relative to the displayed reference object; and in accordance with a determination that the movement of the one or more cameras is a movement of a second magnitude that is different from the first magnitude (in some embodiments, movement of the second magnitude includes velocity and/or acceleration of respective magnitudes; in some embodiments, the first magnitude is a combined (e.g., combining the magnitudes of multiple detected movement components, such as linear/cartesian and/or angular/rotational velocity and/or acceleration) and/or normalized (e.g., with respect to a particular frame of reference, such as the plane of the display) overall magnitude), displaying the visual indicator moving a second distance that is different from the first distance (in some embodiments, a linear distance, such as the distance traveled by the visual indicator (e.g., the square stop icon) as it moves from the center of the reference object towards the edge; in some embodiments, an angular distance, such as the distance traveled by the visual indicator (e.g., the arc) around the displayed reference object) relative to the displayed reference object (e.g., a magnitude of the movement of the visual indicator relative to the displayed reference object is based on a magnitude of the movement of the one or more cameras; in some embodiments, the first magnitude is larger than the second magnitude, and the first distance is greater than the second distance; in some embodiments, the first magnitude is smaller than the second magnitude, and the first distance is lesser than the second distance (e.g., the visual indicator moves more when the cameras move more)). Displaying a visual indication moving a particular distance based on the movement of one or more cameras used for capturing video media provides improved visual feedback about a state of the computer system, which assists the user with composing media capture events and reduces the risk that transient media capture opportunities are mis-captured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the visual indication intuitively indicates the magnitude of movement of the one or more cameras to the user, allowing the user to adjust the video capture to avoid visually uncomfortable and/or unwanted movement of the viewpoint.

In some embodiments, the set of one or more movement criteria includes a first criterion that is met when a magnitude (in some embodiments, one or more magnitudes, such as a magnitude of acceleration and/or a magnitude of velocity; in some embodiments, the magnitude is a combined (e.g., combining the magnitudes of multiple detected movement components, such as linear/cartesian and/or angular/rotational movement) and/or normalized (e.g., with respect to a particular frame of reference, such as the plane of the display) overall magnitude) of the movement of the one or more of cameras exceeds a first threshold magnitude (in some embodiments, one or more first threshold magnitudes (e.g., a velocity threshold, an acceleration threshold, a linear threshold and/or a rotational threshold)) (in some embodiments, in response to detecting the movement of the one or more cameras and in accordance with a determination that the magnitude of the movement of the one or more cameras does not exceed the first threshold magnitude, foregoing displaying the movement of the visual indicator). Displaying a visual indication moving when the movement of one or more cameras used for capturing video media exceeds a threshold magnitude provides improved visual feedback about a state of the computer system, assisting the user with composing media capture events, and reducing the risk that transient media capture opportunities are mis-captured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the displayed movement of the visual indication intuitively alerts the user to when the camera movements may be visually uncomfortable and/or excessive, allowing the user to adjust to slow down the camera movements.

In some embodiments, the set of one or more movement criteria includes a second criterion that is met when an amount of change (in some embodiments, one or more amounts of change, such as a change in velocity (e.g., an acceleration) and/or a change in acceleration (e.g., from a previously-detected movement of the one or more cameras); in some embodiments, an amount of change of combined and/or normalized velocity and/or acceleration components) of the movement of the one or more of cameras exceeds a first threshold amount of change (in some embodiments, one or more first threshold amounts (e.g., a threshold change in velocity, a threshold change in acceleration, a threshold change of linear movement and/or a threshold change of rotational movement)) (in some embodiments, in response to detecting the movement of the one or more cameras and in accordance with a determination that the amount of change of the movement of the one or more cameras does not exceed the first threshold amount, foregoing displaying the movement of the visual indicator). Displaying a visual indication moving when the rate of change of the movement of one or more cameras used for capturing video media exceeds a threshold amount of change provides improved visual feedback about a state of the computer system, assisting the user with composing media capture events, and reducing the risk that transient media capture opportunities are mis-captured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the displayed movement of the visual indication intuitively alerts the user to when the camera movements may be visually uncomfortable and/or excessive, allowing the user to adjust to change the movement of the camera more gradually.

In some embodiments, the computer system displays (in some embodiments, while capturing the video media (e.g., the visual indicator (e.g., the square stop icon) is displayed even when movement of the one or more cameras is not detected; in some embodiments, in response to detecting the movement of the one or more cameras (e.g., the visual indicator (e.g., the arc) appears when indicating movement)) the visual indicator within the displayed reference object (e.g., as illustrated in the top and bottom portion of FIG. 13H) (e.g., within a region defined and/or bordered by the displayed reference object, such as the interior of a circular shutter affordance; in some embodiments, the displayed reference object indicates a gaze target region for starting or stopping media capture (e.g., as described with respect to FIGS. 7A-8)) (in some embodiments, the full range of potential movement of the visual indicator is all within the displayed reference object). Displaying the visual indicator within the displayed reference object provides improved visual feedback about a state of the computer system, assisting the user with composing media capture events, and reducing the risk that transient media capture opportunities are mis-captured (e.g., due to visually uncomfortable and/or unwanted camera movement). For example, the displayed reference object visually indicates a frame of reference for the movement of the visual indicator, allowing the user to intuitively determine the direction and/or magnitude of the movement of the visual indicator and to adjust the movement of the cameras accordingly to avoid visually uncomfortable and/or unwanted camera movement in the captured video.

In some embodiments, the visual indicator is included in a selectable user interface object (e.g., 718 and/or X718) (in some embodiments, the selectable user interface object is also the reference object) displayed via the display generation component (e.g., a stop button/affordance; in some embodiments, the selectable user interface object is displayed while capturing the video media) that, when selected (e.g., as described with respect to FIGS. 7A-7AB) (e.g., via a user input (e.g., a tap, touch, gesture, and/or click) directed to the selectable user interface object or another user input (e.g., an air gesture, a speech input, hardware button input, or other user input corresponding to a request to stop recording)), causes capturing the video media to cease (e.g., as illustrated in FIGS. 13O-13P). Displaying the visual indicator included in a stop button for the media capture provides improved control of media capture without cluttering the user interface, assisting the user with composing media capture events (e.g., by providing improved visual feedback about a state of the computer system without the user needing to look away from the capture control) and reducing the risk that transient media capture opportunities are missed or mis-captured (e.g., due to unnecessary user interface elements obscuring the field-of-view).

In some embodiments, the computer system, while capturing the video media, detects an air gesture input (e.g., 1328B) (in some embodiments, a pinch air gesture; in some embodiments, another air gesture), and in response to detecting the air gesture input and in accordance with a determination that a gaze of a user of the computer system (e.g., 732) is directed to the selectable user interface object when the air gesture input is detected (e.g., in response to detecting an air gesture selecting the selectable user interface object), ceases capture of the video media (e.g., as illustrated in FIGS. 13O-13P) (e.g., as described with respect to FIGS. 7A-8; in some embodiments, in response to detecting the air gesture input and in accordance with a determination that the gaze of the user of the computer system is not directed to the selectable user interface object, foregoing ceasing capturing the video media and/or performing a function different than ceasing capturing the video media (e.g., a function associated with a different object at which the gaze is directed)). Ending media capture in response to an air gesture detected while a user is gazing at the stop button provides improved control of media capture, reducing the risk that transient media capture opportunities are missed or mis-captured (e.g., due to prematurely ending the video capture in response to an unintended user input).

In some embodiments, the computer system, while capturing the video media, dets a user input (e.g., 1328A, 1328B, and/or 1328C) selecting (e.g., a user input (e.g., a tap, touch, gesture, and/or click) directed to the selectable user interface object or another user input (e.g., an air gesture, a speech input, hardware button input, or other user input corresponding to a request to stop recording)) the selectable user interface object (e.g., as illustrated in FIG. 13O), and in response to detecting the user input selecting the selectable user interface object, ceases display of the selectable user interface object (e.g., 718, X718, 1304, and/or X1304) (in some embodiments, and ceasing displaying the visual indicator) and displays a second selectable user interface (e.g., 718- and/or X718) object different from the selectable user interface object (e.g., as illustrated in FIG. 13P) that (e.g., a "play" or capture button/affordance; in some embodiments, the second selectable user interface object is a modified version of the selectable user interface object, such as the concentric rings displayed without the square stop icon), when selected (e.g., via a user input (e.g., a tap, touch, gesture, and/or click) directed to the second selectable user interface object or another user input (e.g., an air gesture, a speech input, hardware button input, or other user input corresponding to a request to begin recording)), initiates capturing media (in some embodiments, video media; in some embodiments, photo media). Displaying stop button and/or visual indicator changing into a capture (e.g., start/play) button when media capture is ended for the media capture provides improved control of media capture without cluttering the user interface, assisting the user with composing media capture events and reducing the risk that transient media capture opportunities are missed or mis-captured (e.g., due to unnecessary user interface elements obscuring the field-of-view and/or the user needing to search for the capture button).

In some embodiments, displaying the movement of the visual indicator (e.g., 1304, X1304, and/or 1312) includes displaying the visual indicator moving according to simulated (in some embodiments, simulated based on the movement of the one or more cameras and/or the displayed reference object) physics (e.g., as illustrated in FIGS. 13H-13L) (e.g., simulating the visual indicator as one or more physical objects reacting to the movement of the one or more cameras within the frame of reference of the displayed reference object; in some embodiments, simulated fluid mechanics (e.g., modeling the visual indicator as a liquid droplet or other fluid that moves, distorts, and "splashes" within the displayed reference object)). Displaying the visual indicator moving with simulated physics provides improved visual feedback about a state of the computer system, assisting the user with composing media capture events, and reducing the risk that transient media capture opportunities are mis-captured (e.g., due to visually uncomfortable and/or unwanted camera movement). For example, the simulated movement of the visual indicator reacts to the movement of the one or more cameras in an intuitive way, allowing the user to quickly determine the direction and/or magnitude of the movement of the visual indicator and to adjust the movement of the cameras accordingly to avoid visually uncomfortable and/or unwanted camera movement in the captured video.

In some embodiments, displaying the movement of the visual indicator includes in accordance with a determination the movement of the one or more cameras is a movement of a first magnitude (in some embodiments, movement of the first type includes movement (e.g., velocity and/or acceleration) with a respective magnitude; in some embodiments, the first magnitude is a combined (e.g., combining the magnitudes of multiple detected movement components, such as linear/cartesian and/or angular/rotational movement) and/or normalized (e.g., with respect to a particular frame of reference, such as the plane of the display) overall magnitude), distorting a spatial property (e.g., size, location, and/or shape) of the visual indicator (e.g., 1304, X1304, and/or 1312) a first amount, and in accordance with a determination the movement of the one or more cameras is a movement of a second magnitude that is different from the first magnitude (in some embodiments, movement of the first type includes movement (e.g., velocity and/or acceleration) with a respective magnitude; in some embodiments, the first magnitude is a combined (e.g., combining the magnitudes of multiple detected movement components, such as linear/cartesian and/or angular/rotational movement) and/or normalized (e.g., with respect to a particular frame of reference, such as the plane of the display) overall magnitude), distorting a spatial property (e.g., size, location, and/or shape) of the visual indicator a second amount that is different from the first amount of distortion of the spatial property of the visual indicator (e.g., the visual indicator is distorted based on a magnitude of the movement of the one or more cameras (in some embodiments, the distortion is according to simulated physics, such as fluid mechanics where the visual indicator is modeled as a liquid droplet or other distortable object); in some embodiments, the first magnitude is larger than the second magnitude, and the first amount is greater than the second amount; in some embodiments, the first magnitude is smaller than the second magnitude, and the first amount is lesser than the second amount (e.g., the more the cameras move, the more the visual indicator distorts)). Distorting the visual indicator based on the magnitude of camera movement provides improved visual feedback about a state of the computer system, assisting the user with composing media capture events, and reducing the risk that transient media capture opportunities are mis-captured (e.g., due to visually uncomfortable and/or unwanted camera movement). For example, the distortion of the visual indicator allows the user to intuitively determine the magnitude of the movement of the visual indicator and to adjust the movement of the cameras accordingly to avoid visually uncomfortable and/or unwanted camera movement in the captured video.

In some embodiments, the first direction of indicator movement indicates the first direction of camera movement (in some embodiments, the first direction of indicator movement is the same as the first direction of camera movement; in some embodiments, the first direction of indicator movement is opposite the first direction of camera movement; in some embodiments, the first direction of indicator movement is based on the first direction of camera movement), wherein the first direction of camera movement includes (e.g., combines and/or normalizes) a first set of one or more directions corresponding to a plurality of components of the movement of the one or more cameras (in some embodiments, the first direction includes (e.g., combines) the directions of velocity and/or acceleration components; in some embodiments, the first direction includes (e.g., combines) the directions of pitch rotation, yaw rotation, horizontal translation, and/or vertical translation components; in some embodiments, the first direction does not include the directions of tilt rotation and/or longitudinal translation components), and the second direction of indicator movement indicates the second direction of camera movement (in some embodiments, the second direction of indicator movement is the same as the second direction of camera movement; in some embodiments, the second direction of indicator movement is opposite the second direction of camera movement; in some embodiments, the second direction of indicator movement is based on the second direction of camera movement), wherein the second direction of camera movement includes (e.g., combines and/or normalizes) a second set of one or more directions corresponding to the plurality of components of the movement of the one or more cameras (in some embodiments, the second direction includes (e.g., combines) the directions of velocity and/or acceleration components; in some embodiments, the second direction includes (e.g., combines) the directions of pitch rotation, yaw rotation, horizontal translation, and/or vertical translation components; in some embodiments, the second direction does not include the directions of tilt rotation and/or longitudinal translation components). Displaying a visual indication moving in one direction based on the directions of multiple components of the movement of the one or more cameras provides improved visual feedback about a state of the computer system without cluttering the user interface, which assists the user with composing media capture events and reduces the risk that transient media capture opportunities are mis-captured (e.g., due to visually uncomfortable and/or unwanted camera movement). For example, the user can simultaneously monitor movement in multiple dimensions and/or around multiple axes and adjust accordingly.

In some embodiments, the plurality of components of the movement of the one or more cameras (e.g., the components represented in the first and/or second direction of camera movement) includes one or more translation (e.g., cartesian velocity and/or acceleration) components (e.g., 1310B, 1314A, 1316A, 1316B, 1320A, 1320B, and/or 1322A-1322F) (in some embodiments, arising from horizontal and/or vertical translation movements of the one or more cameras). In some embodiments, the plurality of components of the movement of the one or more cameras (e.g., the components represented in the first and/or second direction of camera movement) includes one or more rotation (e.g., angular velocity and/or acceleration) components (e.g., 1310A, 1314B, 1318A, and/or 1318B) (in some embodiments, arising from pitch and/or yaw rotation movements of the one or more cameras). In some embodiments, one or more components of the movement of the one or more cameras (e.g., 1326A and/or 1326B) are not included in the plurality of components of the movement of the one or more cameras (e.g., as illustrated in FIG. 13N) (in some embodiments, longitudinal translation and/or tilt rotation movements are not represented in the first and/or second direction of camera movement). Displaying a visual indication moving in one direction based on the directions of some components of the movement of the one or more cameras and not based on the directions of other components of the movement of the one or more cameras provides improved visual feedback about a state of the computer system without cluttering the user interface. For example, in some embodiments, such as spatial media captures, horizontal translations, vertical translations, pitch rotations, and yaw rotations may cause more visual discomfort than longitudinal translations and/or tilt rotations, so basing the movement of the visual indicator on the former and not the latter provides more relevant visual feedback.

In some embodiments, capturing the video media using the one or more cameras includes generating a first video component corresponding to a viewpoint of a right eye (e.g., using a first camera) and generating a second video component that is different from the first video component corresponding to a viewpoint of a left eye (e.g., using a second camera different from the first camera), wherein concurrently viewing the first video component and the second video component creates an illusion of a three-dimensional representation of the video media (e.g., viewing different images with the left and right eye creates the illusion of depth by simulating the parallax effect of binocular vision) (e.g., capturing the video media includes capturing spatial video media). Displaying a visual indication moving in a particular direction based on the movement of one or more cameras used for capturing spatial video media provides improved visual feedback about a state of the computer system, which assists the user with composing media capture events and reduces the risk that transient media capture opportunities are mis-captured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the movement of the visual indication alerts the user to movements that may adversely impact the quality of spatial media capture, which may be relatively small compared to movements that impact the quality of non-spatial media.

In some embodiments, the computer system, prior to capturing the video media, displays a level indicator (e.g., 920 and/or X920), wherein the level indicator indicates an orientation (e.g., a tilt orientation) of the one or more cameras relative to a respective (e.g., target) orientation (e.g., as illustrated in FIGS. 9A-10 and 13N) (in some embodiments, a horizon of the physical environment; in some embodiments, the direction of gravitational pull) (in some embodiments, displaying the level indicator as described with respect to FIGS. 9A-10; in some embodiments, while capturing the video media, ceasing displaying the level indicator). Displaying a level indicator indicating a tilt orientation of the one or more cameras provides a user with real-time visual feedback about a state of the computer system. Doing so also assists the user with composing media capture events and reduces the risk that transient media capture opportunities are missed or mis-captured (e.g., due to misalignment of the system at the start of capture), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system, while displaying the visual indicator (e.g., 1304, X1304, and/or 1312) and in response to detecting the movement of the one or more cameras and in accordance with a determination that a magnitude of the movement of the one or more cameras (in some embodiments, a combined (e.g., combining the magnitudes of multiple detected movement components, such as linear/cartesian and/or angular/rotational velocities and/or accelerations) and/or normalized (e.g., with respect to a particular frame of reference, such as the plane of the display) overall magnitude) exceeds a notification threshold (in some embodiments, a set of one or more magnitude thresholds (e.g., for velocity and/or acceleration, and/or for linear and/or rotational movement), in some embodiments, the notification threshold is a higher magnitude than the magnitude threshold at which movement of the visual indicator is initially displayed), displays a text notice (e.g., 1324) (e.g., as illustrated in FIG. 13M) (in some embodiments, the text notice is displayed in the same region as the visual indicator (e.g., above or below the displayed reference object; in some embodiments, the text notice does not move with respect to the displayed reference object); in some embodiments, the text notice includes an instruction to reduce the magnitude of the movement of the one or more cameras (e.g., "slow down" and/or "reduce speed")) (in some embodiments, in accordance with a determination that the magnitude of the movement of the one or more cameras does not exceed the notification threshold, forego displaying the text notice). Conditionally displaying a text notice in addition to the visual indicator based on the magnitude of camera movement provides improved visual feedback about a state of the computer system, which assists the user with composing media capture events and reduces the risk that transient media capture opportunities are mis-captured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the text notice draws additional attention to the visual indicator and provides additional information on the state of the computer system (e.g., reinforcing and/or clarifying the feedback provided by the visual indicator).

In some embodiments, the computer system, while displaying the text notice (e.g., 1324), detects, via the one or more sensors, a second movement of the one or more cameras (e.g., 1322C-1322F), and in response to detecting the second movement of the one or more cameras and in accordance with a determination that a magnitude of the second movement of the one or more cameras does not exceed a notice-maintenance threshold (in some embodiments, a set of one or more magnitude thresholds (e.g., for velocity and/or acceleration, and/or for linear and/or rotational movement); in some embodiments, the notice-maintenance threshold is the same as the notification threshold; in some embodiments, the notice-maintenance threshold is different than the notification threshold), ceases displaying the text notice (e.g., as illustrated in FIG. 13M). Conditionally displaying a text notice in addition to the visual indicator based on the magnitude of camera movement provides improved visual feedback about a state of the computer system, which assists the user with composing media capture events and reduces the risk that transient media capture opportunities are mis-captured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the dismissal of the text notice intuitively indicates to the user when a change made to the movement of the cameras improves the quality of the capture (e.g., by reducing visually uncomfortable and/or unwanted movement).

In some embodiments, the notice-maintenance threshold is a lower magnitude threshold than the notification threshold (e.g., as illustrated in FIG. 13M) (e.g., the movement of the one or more cameras must slow down to a lower speed (e.g., velocity) than the speed at which the notice was first displayed for the notice to be dismissed). Displaying the text notice at a higher threshold magnitude and dismissing the text notice at a lower threshold magnitude reduces flicker of the text notice (e.g., as the magnitude of the movement fluctuates around the threshold levels), which enhances the operability of the system and makes the user-system interface more efficient (e.g., by reducing distracting and/or confusing visual outputs). Doing so also reduces power usage and improves battery life of the system by preventing unnecessary changes to the displayed content.

In some embodiments, aspects/operations of methods 800, 1000, 1200, 1400, and 1600 may be interchanged, substituted, and/or added between these methods. For example, the user interfaces displayed in methods 800, 1000, and/or 1200 can be used to control media capture and/or to provide feedback on capture orientation and capture distance before, during, and/or after the video media capture performed in method 1400. For example, the video captured according to method 1400 can be played back according to method 1600. For brevity, these details are not repeated here.

FIGS. 15A-15N illustrate exemplary methods for modifying video playback to improve viewing comfort. FIG. 16 is a flow diagram of an exemplary method 1600 for modifying video playback to improve viewing comfort. The user interfaces in FIGS. 15A-15N are used to illustrate the processes described below, including the process in FIG. 16.

FIG. 15A illustrates movement profile 1500 for playback of video media item 1502. Movement profile 1500 represents the apparent movement of the viewpoint of video media item 1502, a first-person video of a person (e.g., the camera person) throwing a ball for a dog. For example, apparent movement of the viewpoint of video media item 1502 may result from physical movements of a physical camera used to capture video media item 1502, virtual movements of a virtual camera used to capture video media item 1502 (e.g., perceived "camera" movement present in animated and/or computer-generated content), and/or movement of the framing of video media item 1502 (e.g., during capture (e.g., zooming in and out and/or content-aware digital framing), after capture (e.g., cropping and reframing during editing), and/or during playback (e.g., in some embodiments where computer system 700 is implemented using a head-mounted device and/or where video media item 1502 is immersive video media, the user can change the viewpoint of video media item 1502)). In some embodiments where computer system 700 is implemented using a head-mounted device and/or where video media item 1502 is immersive video media (e.g., spatial media (e.g., as described above with respect to FIGS. 11A 1-12) and/or three-dimensional XR media), apparent movement of the viewpoint of video media item 1502 can significantly impact viewing comfort.

In some embodiments, video media item 1502 may be a photo media capture of limited duration that includes content from before and/or after the capture input is detected (e.g., before and/or after an air pinch gesture is released, an air tap gesture is detected, a button press is detected or released), such as a brief animated photo where several frames are captured when a photo is taken, creating a "live" effect). In some embodiments, each of the several frames captured when the brief animated photo is taken (e.g., before and/or after the input requesting capture of the photo was detected) includes stereoscopic depth information, for example, a first frame component for the viewer's right eye and a second frame component for the viewer's left eye. Like other video media, a brief animated photo can be played back (e.g., as a brief animation, a loop, and/or a "bouncing" or "reversing" loop) or viewed as a still preview (e.g., including the first frame component and the second frame component for a single key frame).

As illustrated in FIG. 15A, movement profile 1500 includes velocity profile 1500A and acceleration profile 1500B. For example, velocity profile 1500A and acceleration profile 1500*b* may represent the combined and/or normalized magnitudes of velocity and acceleration of apparent translation and/or rotation movements of the viewpoint of video media item 1502. In some embodiments, velocity profile 1500A and acceleration profile 1500B include information derived from actual sensor data (e.g., detected using computer system 700 and/or included as metadata for video media item 1502), such as sensor data representing the physical movements of a physical camera used to capture video media item 1502 and/or sensor data representing physical movements of the user during playback of video media item 1502 (e.g., HMD and/or gaze movements changing the viewpoint). In some embodiments, velocity profile 1500A and acceleration profile 1500B include information derived (e.g., by computer system 700 and/or included as metadata for video media item 1502) from the contents of video media item 1502, for example, using image processing techniques to derive apparent movement information from motion blur, recognized objects, and other visual characteristics.

Movement profile 1500 further includes category profile 1500C. As illustrated in FIG. 15A, the runtime of video media item 1502 is broken down into windows $t_1$ through $t_8$, represented on the right of FIG. 15A by video segments 1502A1502H. For example, computer system 700 may subdivide video media item 1502 into windows of up to a predetermined duration (e.g., a maximum of 4 seconds, 10 seconds, and/or 30 seconds), windows of variable durations, and/or a predetermined number of windows. Category profile 1500C represents respective movement categories or levels determined by computer system 700 for each of the respective windows/video segments. In some embodiments, the movement level of a particular video segment is determined based on the velocity and/or acceleration within the corresponding window. For example, video segment 1502A is a static camera shot where both velocity and acceleration remain near zero during window $t_1$, so video segment 1502A is categorized as level 1, indicating that video segment 1502A has the least amount of movement in media item 1502 (e.g., relative to the other segments). As another example, video segments 1502C, 1502D, 1502E, and 1502G involve more camera movement (e.g., as the camera person stands up, throws the ball, pans to follow the dog, gets knocked over, and stands up again) reflected by the greater magnitudes of and changes to acceleration and/or velocity seen in windows $t_3$, $t_4$, $t_5$, and $t_7$, respectively, so video segments 1502C, 1502D, 1502E, and 1502G are categorized as level 3 or level 4, as shown in category profile 1500C. In some embodiments, the movement level of a particular video segment is determined based on the velocity and/or acceleration within previous and/or future windows. In some embodiments, the categorization is smoothed, such that the categorization increments or decrements by at most one movement level between adjacent video segments. For example, although video segment 1502B and video segment 1502H are static camera shots, where both velocity and acceleration remain near zero during window $t_2$ and window $t_8$, video segment 1502B is categorized as level 2 in anticipation of the upcoming camera movement in video segment 1502C and window $t_3$, and video segment 1502H is categorized as level 3 based on camera movement in the preceding video segment 1502G and window $t_7$.

FIGS. 15B-15N illustrate playback of video media item 1502 using computer system 700. As illustrated in FIG. 15B, while playback of video media item 1502 is not ongoing, XR environment 1506 is visible via display 708 of device 702. For example, XR environment 1506 may include a physical environment and/or an environment-locked virtual environment. In some embodiments where computer system 700 is implemented using a head-mounted device, XR environment 1506 may be displayed (e.g., as pass-through video of a physical environment and/or rendered output of a virtual environment) via display 708, or may be made visible via transparent or semi-transparent portions of display 708.

Figure 15C:
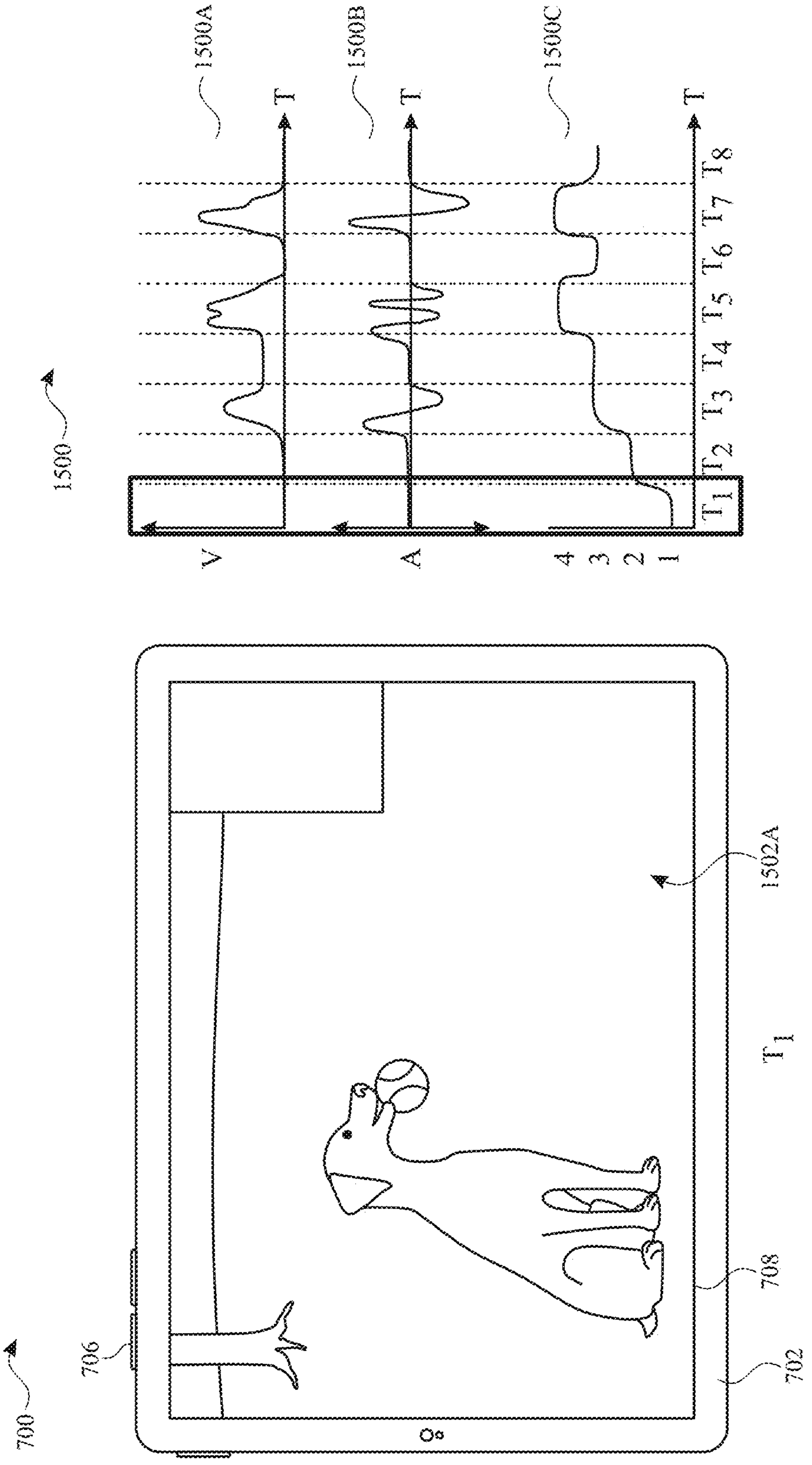

As illustrated in FIG. 15C, computer system 700 initiates, via display 708 and one or more other output devices such as speakers or headphones, playback of video media item 1502, starting with video segment 1502A. In some embodiments, computer system 700 provides playback of video media item 1502 as a spatial media output, for example, outputting at least one image for the viewer's right eye and at least one image for the viewer's left eye to create the appearance/illusion of depth while viewing video media item 1502. As discussed with respect to FIG. 15A, computer system 700 categorizes video segment 1502A as level 1 (e.g., due to the near-zero velocity and acceleration of apparent camera movement in window $t_1$). Accordingly, computer system 700 displays video segment 1502A with border and framing settings selected for level 1 (e.g., for playback of video with little to no movement). In particular, computer system 700 displays video segment 1502A with a first border width (e.g., a zero-width border) and cropped to a first size (e.g., a "full-size" crop). As illustrated in FIG. 15C, displaying video segment 1502A with the first border width and cropped to the first (e.g., "full") size takes up the entirety of display 708, such that XR environment 1506 is no longer visible via display 708. In some embodiments where computer system 700 is implemented using a head-mounted device, displaying video segment 1502A with the first border width and cropped to the first (e.g., "full") size provides a high degree of visual immersion, extending into and/or beyond the peripheral regions of the viewer's field-of-view and obscuring most or all of XR environment 1506.

Figure 15D:
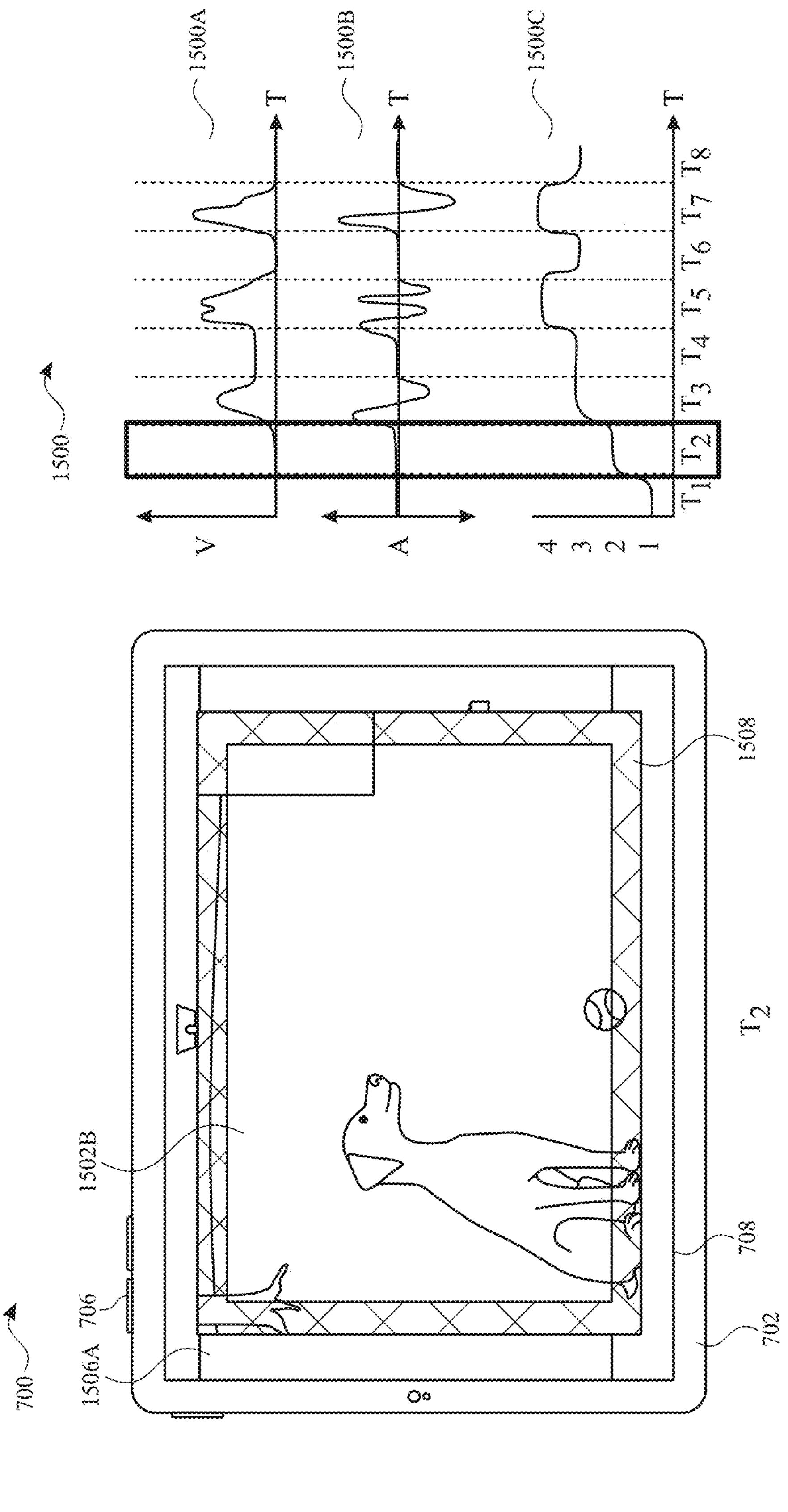

At FIG. 15D, computer system 700 continues playback of video media item 1502 with video segment 1502B. As discussed with respect to FIG. 15A, although video segment 1502*b* includes near-zero velocity and acceleration of apparent camera movement in window $t_2$, computer system 700 categorizes video segment 1502B as level 2 (e.g., incrementing up from video segment 1502A) in anticipation of upcoming movement in window $t_3$. Accordingly, computer system displays video segment 1502B with border and framing settings selected for level 2. In particular, computer system 700 crops video segment 1502B to a second size, which is smaller than the first size, without resizing (e.g., scaling) the video content itself. As illustrated in FIG. 15D, when displaying video segment 1502B cropped to the second size, a portion 1506A of XR environment 1506 is visible concurrently with video segment 1502B, and thus playback of video segment 1502B is visually attenuated in comparison to playback of video segment 1502A. Additionally, computer system 700 displays video segment 1502B with border 1508, a blurring and/or feathering effect (represented in FIG. 15D by crosshatching), with a second border width wider than the first border width. For example, computer system 700 can blur video segment 1502B and/or portion 1506A of XR environment 1506 (e.g., together, separately, or individually) to create a border of the second border width. In some embodiments, computer system 700 applies the blurring and/or feathering effect using a particular blur radius for movement level 2, for instance, a small blur radius that minimally blurs/feathers the displayed content within border 1508. In some embodiments where computer system 700 is implemented using a head-mounted device, displaying video segment 1502B with the second border width and cropped to the second size provides a reduced degree of visual immersion while increasing the visibility of XR environment 1506 to visually orient (e.g., "grounds") the viewer in the frame of reference of the physical environment.

In some embodiments, computer system 700 changes the border and framing settings gradually. For example, when transitioning from playback of video segment 1502*a* to video segment 1502B (e.g., during a 0.1, 0.5, and/or 1 second transition period overlapping with the end of window $t_1$ and/or the beginning of window $t_2$), computer system 700 may crop video media item 1502 progressively smaller until reaching the second size and/or display border effect 1508 gradually expanding up to the second width (in some embodiments, with a progressively larger blur radius up to the blur radius for movement level 2).

Figure 15E:
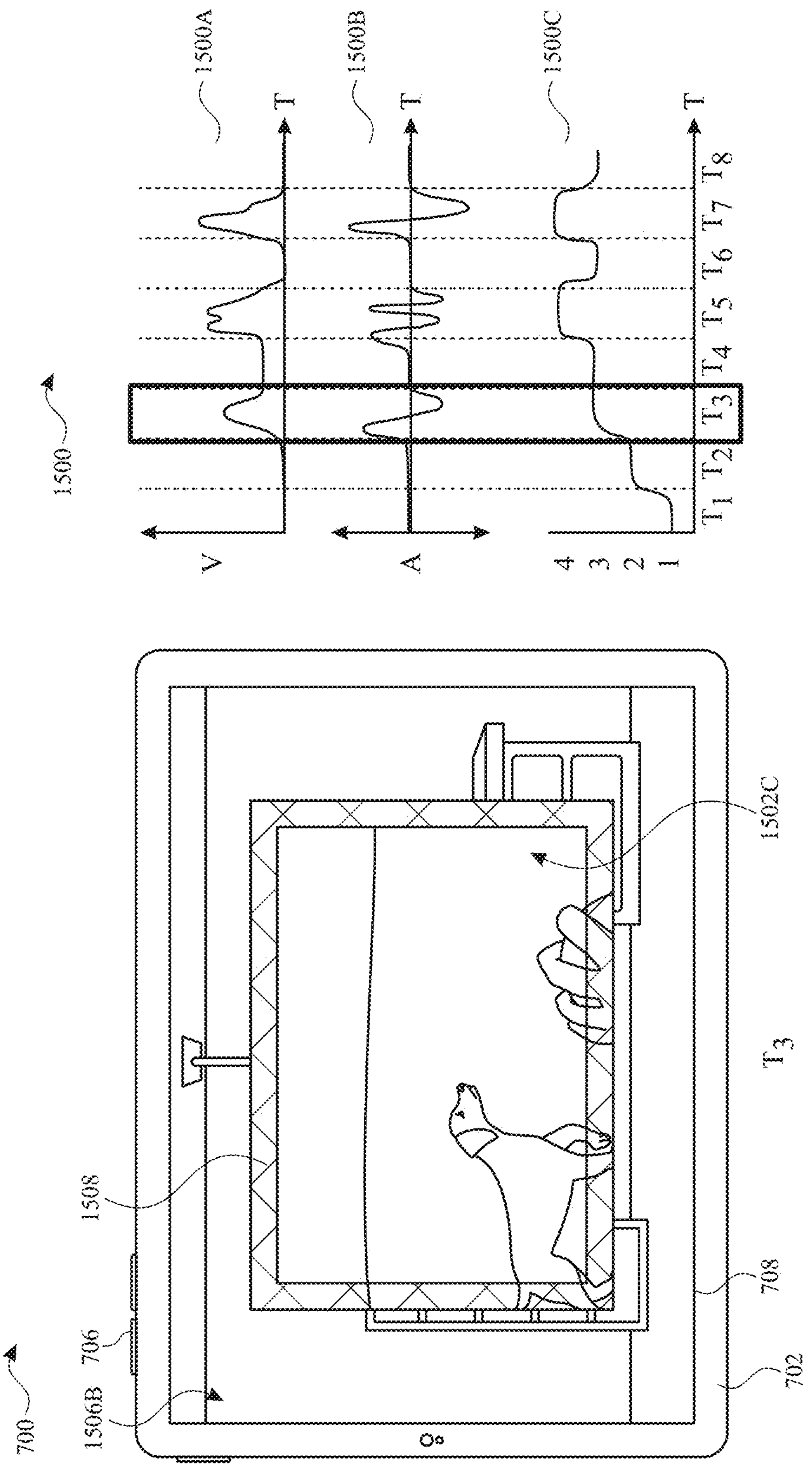

At FIG. 15E, computer system 700 continues playback of video media item 1502 with video segment 1502C. As discussed with respect to FIG. 15A, computer system 700 categorizes video segment 1502C as level 3 (e.g., due to the moderately high magnitudes of velocity and acceleration of apparent camera movement in window $t_3$ as the camera person stands up and throws the ball). Accordingly, computer system displays video segment 1502C with border and framing settings selected for level 3, cropping video segment 1502C to a third size, which is smaller than the second size, and displaying the blurring effect of border 1508 with a third border width, which is wider than the second border width. As illustrated in FIG. 15E, when displaying video segment 1502C cropped to the third size, portion 1506B of XR environment 1506 (e.g., the portion visible concurrently with video segment 1502C) is a larger portion of the XR environment than portion 1506A, and thus playback of video segment 1502C is further visually attenuated in comparison to playback of video segment 1502B. In some embodiments, computer system 700 applies the blurring effect using a particular blur radius for movement level 3, for instance, a medium blur radius that moderately blurs the displayed content within border 1508.

At FIG. 15F1, computer system 700 continues playback of video media item 1502 with video segment 1502D. As discussed with respect to FIG. 15A, computer system 700 categorizes video segment 1502D as level 3, for instance, due to the velocity in window $t_4$ as the camera person pans to follow the dog and/or the movement in preceding window $t_3$ and following window $t_5$. Accordingly, computer system displays video segment 1502D with border and framing settings selected for level 3, cropping video segment 1502D and displaying border 1508 as described with respect to the playback of video segment 1502C.

In some embodiments, the techniques and user interface(s) described in FIG. 15F1 are provided by one or more of the devices described in FIGS. 1A-1P. FIG. 15F2 illustrates an embodiment in which video media item X1502 (e.g., as described in FIGS. 15A-15F1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 15F2, HMD X700 provides playback of video media item X1502 at with video segment X1502D. As discussed with respect to FIG. 15A, HMD X700 categorizes video segment X1502D as level 3, for instance, due to the velocity in window $t_4$ as the camera person pans to follow the dog and/or the movement in preceding window $t_3$ and following window $t_5$. In some embodiments, apparent camera movements such as the long panning shot to follow the dog, as well as the more intense apparent camera movements seen in the preceding and following segments, can cause particular viewing discomfort (e.g., dizziness, queasiness, and/or eye strain) when viewing video media item X1502 via HMD X700 worn in a head-mounted position. Accordingly, computer system displays video segment X1502D with border and framing settings selected for level 3, cropping video segment X1502D and displaying border X1508 as described with respect to the playback of video segment 1502C. In some embodiments, displaying video segment X1502D with border and framing settings selected for level 3 reduces viewing discomfort by attenuating the display of video segment X1502D and allowing the viewer to see more of the surrounding environment via portion X1506B, helping to ground the viewer in the three-dimensional environment.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor X704 that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 and/or hardware button X706 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 15G:
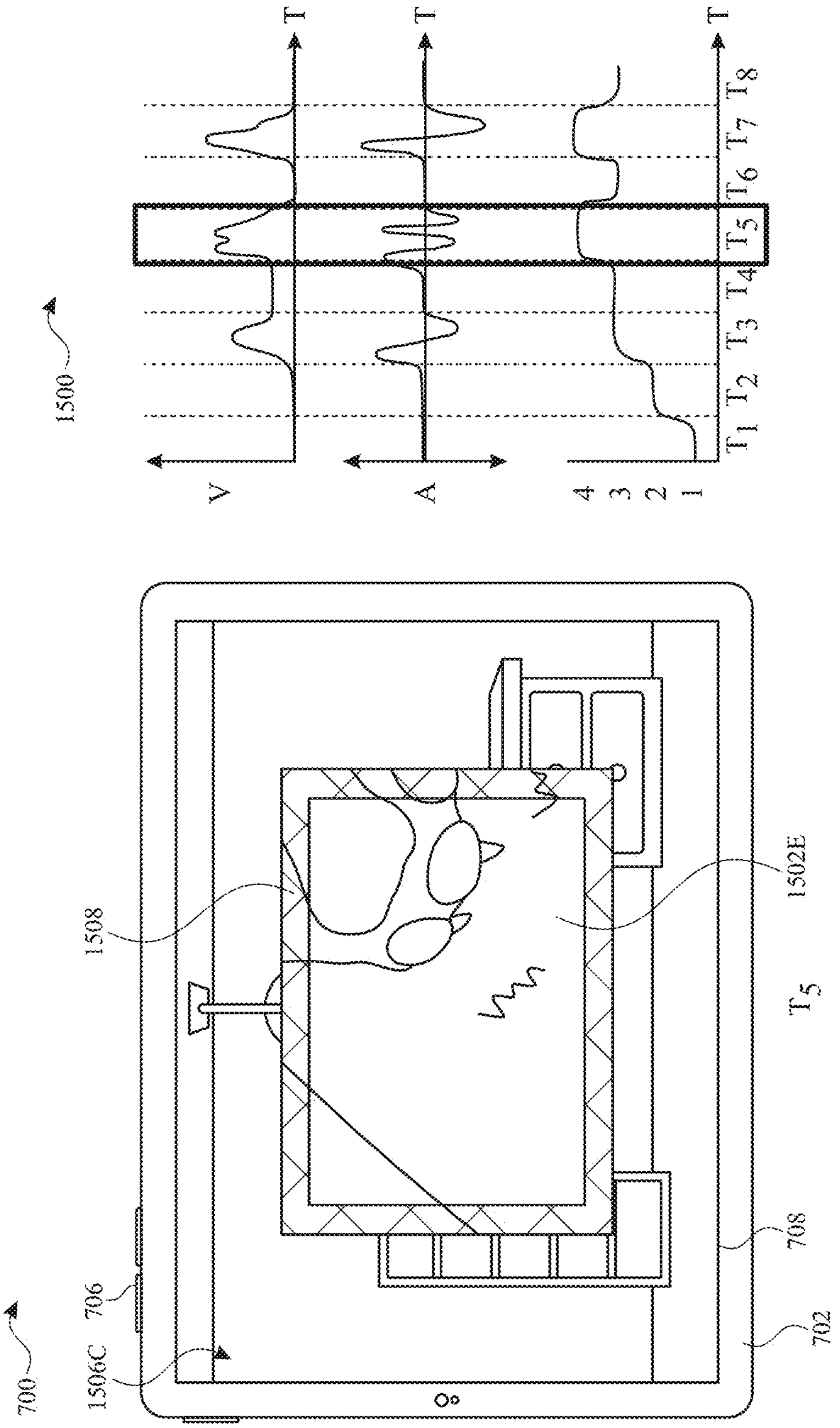

At FIG. 15G, computer system 700 continues playback of video media item 1502 with video segment 1502E. As discussed with respect to FIG. 15A, computer system 700 categorizes video segment 1502E as level 4 (e.g., due to the high magnitudes of velocity and acceleration of apparent camera movement in window $t_5$ as the camera person gets knocked over). Accordingly, computer system displays video segment 1502E with border and framing settings selected for level 4, cropping video segment 1502E to a fourth size, which is smaller than the third size, and displaying the blurring effect of border 1508 with a fourth border width, which is wider than the third border width. As illustrated in FIG. 15G, when displaying video segment 1502E cropped to the fourth size, portion 1506C of XR environment 1506 (e.g., the portion visible concurrently with video segment 1502E) is a larger portion of the XR environment than portion 1506B, and thus playback of video segment 1502E is further visually attenuated in comparison to playback of video segment 1502C and video segment 1502D. In some embodiments, computer system 700 applies the blurring and/or feathering effect using a particular blur radius for movement level 4, for instance, a large blur radius that extensively blurs/feathers the displayed content within border 1508. In some embodiments where computer system 700 is implemented using a head-mounted device, displaying video segment 1502E with the fourth border width and cropped to the fourth size provides a minimal degree of visual immersion while maximizing the visibility of XR environment 1506 to visually orient (e.g., "grounds") the viewer in the frame of reference of the physical environment.

Figure 15H:
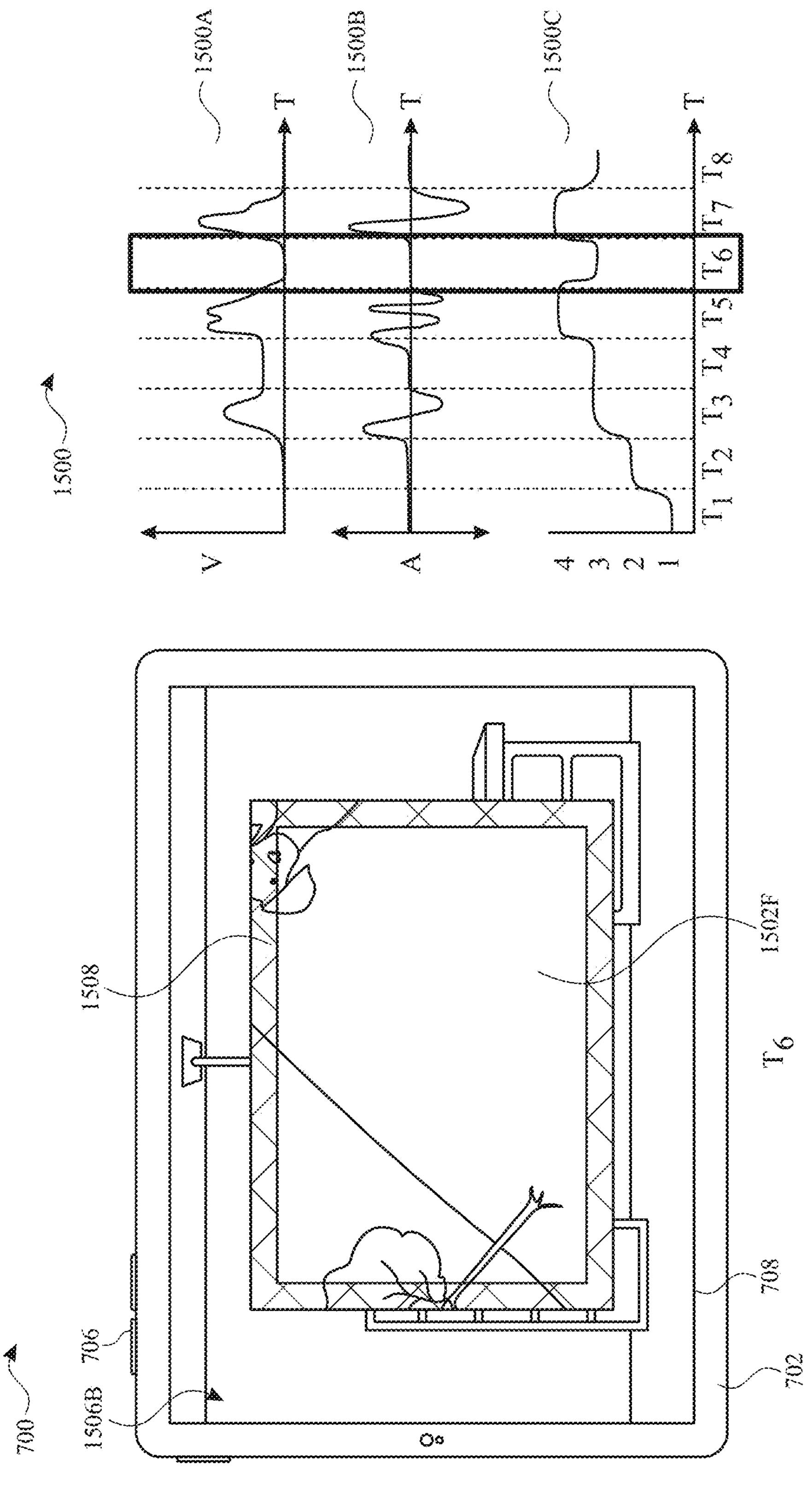

At FIG. 15H, computer system 700 continues playback of video media item 1502 with video segment 1502F. As discussed with respect to FIG. 15A, computer system 700 categorizes video segment 1502F as level 3, for instance, due to the movement in preceding window $t_5$ and/or following window $t_7$ (e.g., despite window $t_6$ including near-zero velocity and acceleration while depicting a still camera shot). Accordingly, computer system displays video segment 1502F with border and framing settings selected for level 3, cropping video segment 1502F and displaying border 1508 such that portion 1506B of XR environment 1506 is concurrently visible, as described with respect to the playback of video segment 1502C and video segment 1502D.

Figure 15I:
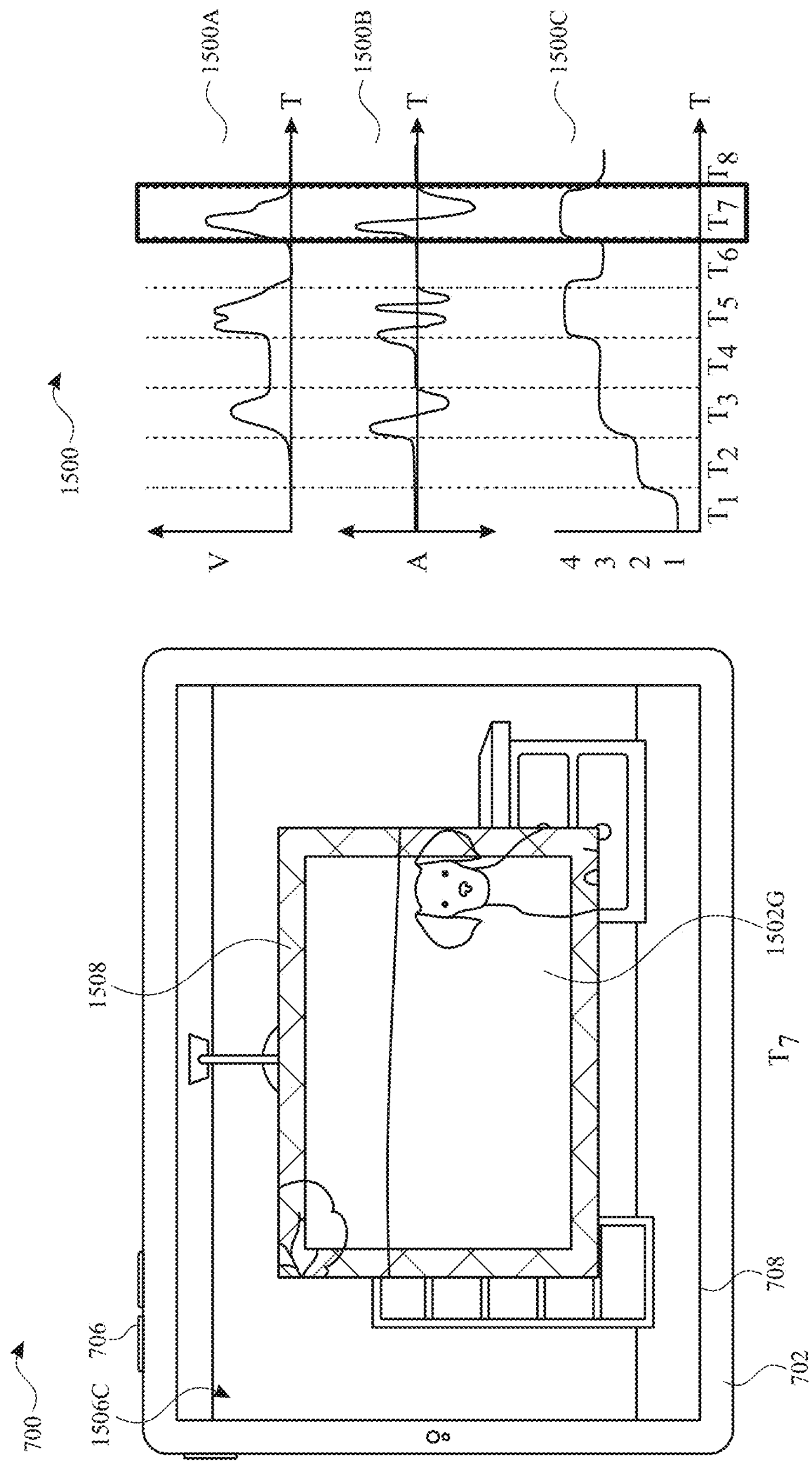

At FIG. 15I, computer system 700 continues playback of video media item 1502 with video segment 1502G. As discussed with respect to FIG. 15A, computer system 700 categorizes video segment 1502G as level 4 (e.g., due to the high magnitudes of velocity and acceleration of apparent camera movement in window $t_7$ as the camera person stands back up). Accordingly, computer system displays video segment 1502G with border and framing settings selected for level 4, cropping video segment 1502G and displaying border 1508 such that portion 1506C of XR environment 1506 is concurrently visible, as described with respect to the playback of video segment 1502E.

Figure 15J:
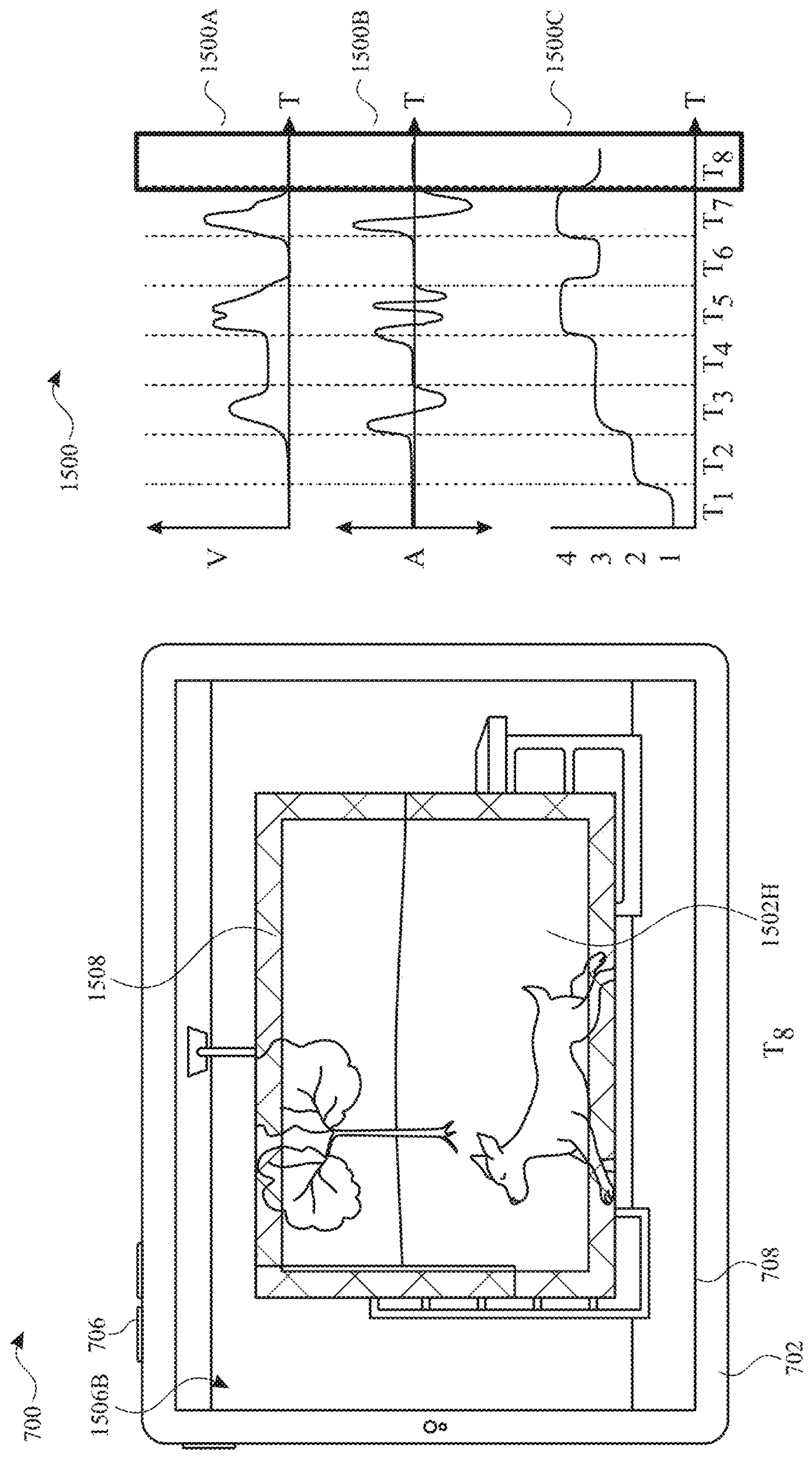

At FIG. 15J, computer system 700 completes playback of video media item 1502 with video segment 1502H. As discussed with respect to FIG. 15A, computer system 700 categorizes video segment 1502H as level 3, for instance, due to the movement in preceding window $t_7$. Accordingly, computer system 700 displays video segment 1502H with border and framing settings selected for level 3, cropping video segment 1502H and displaying border 1508 such that portion 1506B of XR environment 1506 is concurrently visible.

Figure 15K:
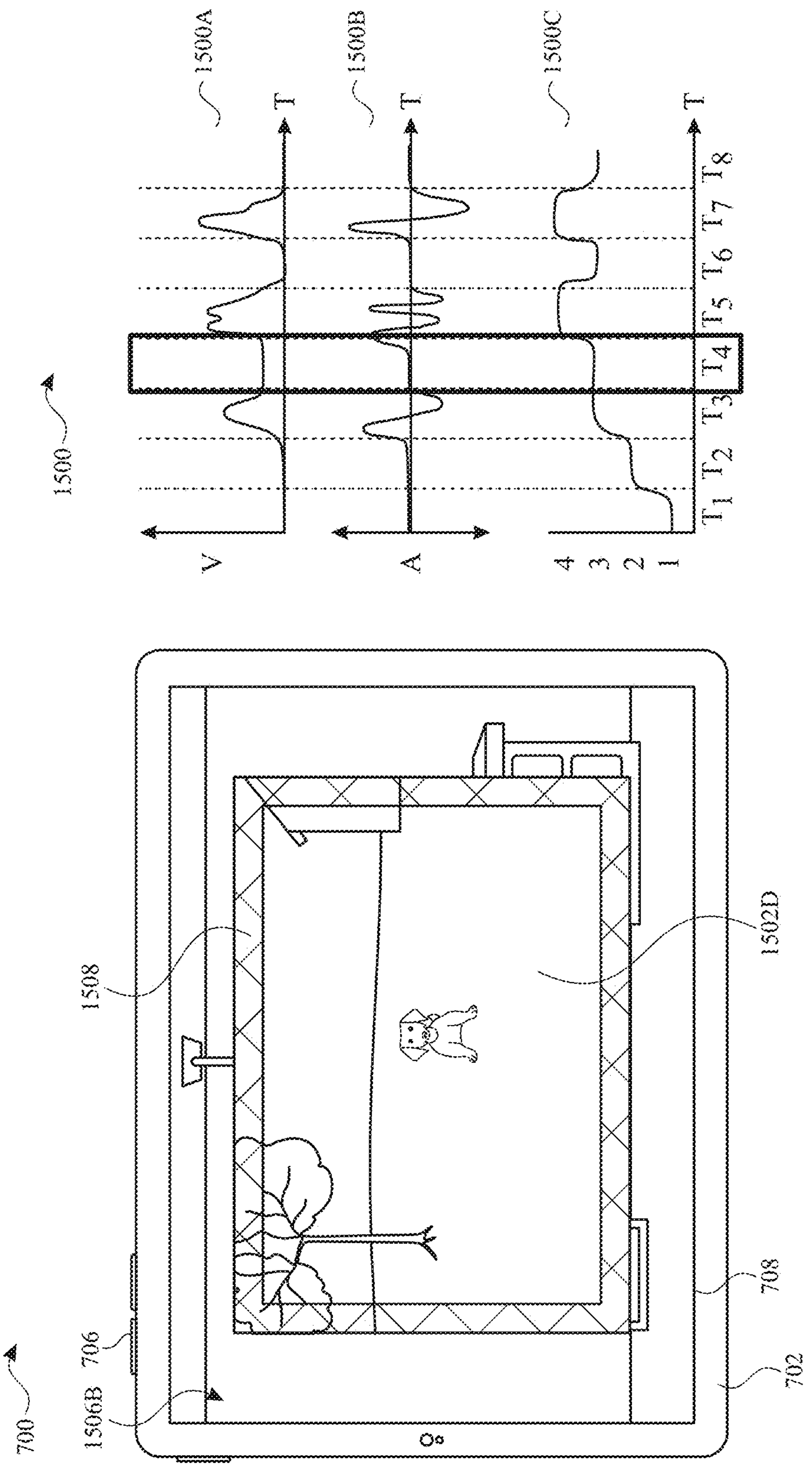
Figure 15L:
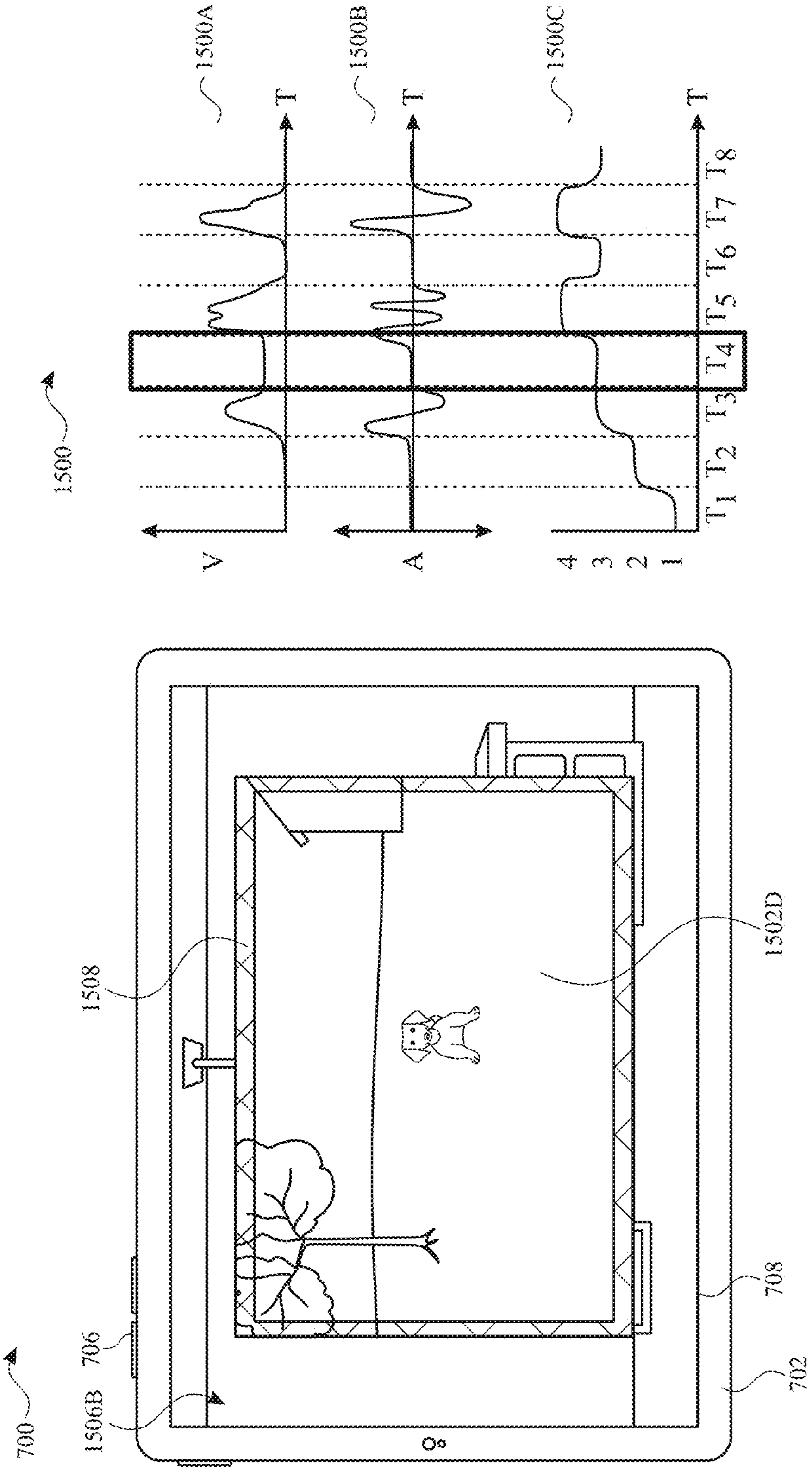

In some embodiments, as illustrated in FIGS. 15K-15L, computer system 700 modifies the display of border 1508 within a particular window of video media item 1502 (e.g., not only while transitioning between windows/video segments). As discussed with respect to FIG. 15F1, computer system 700 initially displays video segment 1502D with border and framing settings selected for level 3, cropping video segment 1502D to the third size and displaying border 1508 with the third border width and/or the blur radius for level 3 applied. In some embodiments, computer system 700 gradually reduces the width of border 1508 during window $t_4$ (e.g., during the playback of video segment 1502D), for example, displaying border 1508 with a fifth width narrower than the third width at FIG. 15K and, subsequently, with a sixth width narrower than the fifth width at FIG. 15K. In some embodiments, computer system 700 gradually increases the width of border 1508 during window $t_4$. In some embodiments, additionally or alternatively to changing the border and framing settings (e.g., the crop size of video media item 1502) based on the apparent camera movement of video media item 1502 represented by movement profile 1500 (e.g., as described above with respect to FIGS. 15C-15J), computer system 700 changes the width of border 1508 and/or the width of the visible portion of XR environment 1506 based on the apparent camera movement. For example, as the apparent camera movement increases, computer system 700 may increase the width of border 1508 and/or the width of the visible portion of XR environment 1506, and as the apparent camera movement decreases, computer system 700 may decrease the width of border 1508 and/or the width of the visible portion of XR environment 1506.

Figure 15M:
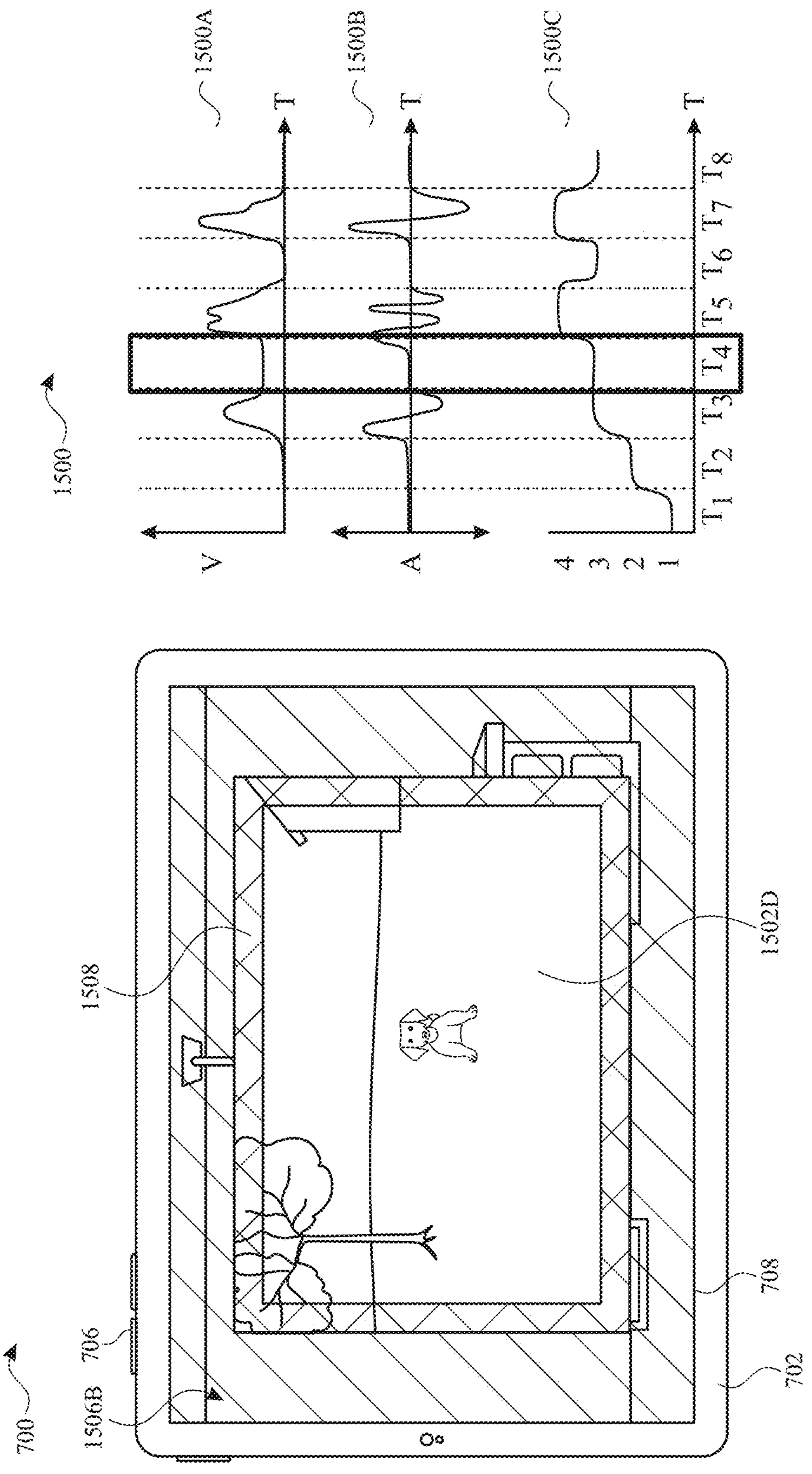

In some embodiments, as illustrated in FIG. 15M, when portions of XR environment 1506 are visible concurrently with the playback of media item 1502 (e.g., as computer system 700 crops video media item 1502), computer system 700 applies a visual effect the visible portions of XR environment 1506. For example, computer system 700 applies a darkening effect to portion 1506B (e.g., represented by diagonal hatching in FIG. 15M). In some embodiments, as illustrated in FIG. 15N, when computer system 700 crops playback of media item 1502 to less than the full size of display 708, computer system obscures XR environment 1506. For example, instead of displaying pass-through video of portion 1506B concurrently with playback of video segment 1502D, computer system 700 displays the cropped video segment surrounded by a single-color field. In some embodiments, additionally or alternatively to changing the border and framing settings (e.g., the crop size of video media item 1502) based on the apparent camera movement of video media item 1502 represented by movement profile 1500 (e.g., as described above with respect to FIGS. 15C-15J), computer system 700 changes the visibility of the visible portions of XR environment 1506 based on the apparent camera movement. For example, as the apparent camera movement increases, computer system 700 may increase the visibility of XR environment 1506 by darkening the visible portion less and/or decreasing the visual prominence of the visual effect applied to the XR environment (e.g., decreasing the opacity of the single-color field), and as the apparent camera movement decreases, computer system 700 may decrease the visibility of XR environment 1506 by darkening the visible portion more and/or increasing the visual prominence of the visual effect applied to the XR environment (e.g., decreasing the opacity of the single-color field). In some embodiments, a combination of a change of in size of the media item, change in size of the border region and/or change in appearance of the XR environment are used to adjust an appearance of the content visible to the user as the apparent camera movement of the video media item changes (as described in greater detail herein).

Additional descriptions regarding FIGS. 15A-15N are provided below in reference to method 1600 described with respect to FIG. 16.

FIG. 16 is a flow diagram of an exemplary method 1600 for modifying video playback to improve viewing comfort, in some embodiments. In some embodiments, method 1600 is performed at a computer system (e.g., 101, 1-100, 1-200, 3-100, 6-100, 6-200, 6-300, 6-400, 11.1.2-100, 700, X700, and/or 702) that is in communication with a display generation component (e.g., 1-102, 1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200, 11.3.2-204, 708, and/or X702) (e.g., a display controller; a touch-sensitive display system; a display (e.g., integrated and/or connected), a 3D display, a transparent display, a projector, a heads-up display, and/or a head-mounted display) (in some embodiments, the computer system includes a plurality of cameras including a first camera and a second camera (e.g., 6-106, 6-114, 6-116, 6-118, 6-120, 6-122, 6-306, 6-416, 11.1.1-104*a-b*, 11.1.2-110*a-f*, 11.3.2-100, 11.3.2-106, and/or 11.3.2-206, 704A, 704B, and/or X704) (e.g., a camera array/stereo camera for spatial capture, where the first camera and the second camera are located a fixed distance apart, such that the perspective of the first camera is different from the perspective of the second camera and thus at least a portion of a field of view of the first camera is outside of a field of view of the second camera; in some embodiments, the computer system further includes one or more rear (user-facing) cameras and/or one or more forward (environment-facing) cameras)) (in some embodiments, the computer system include one or more sensors (e.g., 1-356, 1-456, 6-102, 6-106, 6-108, 6-110, 6-112, 6-114, 6-116, 6-118, 6-120, 6-122, 6-124, 6-126, 6-128, 6-202, 6-203, 6-302, 6-303, 6-306, 6-402, 6-416, 11.1.1-104*a*, 11.1.1-104*b*, 11.1.2-110*a-f*, 11.3.2-100, 11.3.2-106, 11.3.2-206, and/or X704) (e.g., as location sensors, motion sensors, orientation sensors, and/or depth sensors)). In some embodiments, method 1600 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 1600 are, optionally, combined and/or the order of some operations is, optionally, changed.

The computer system, while playback of a video media item (e.g., 1502 and/or X1502) (in some embodiments, a spatial media video including a first video component corresponding to a viewpoint of a right eye and a second video component, different from the first video component, corresponding to a viewpoint of a left eye such that concurrently viewing the first video component and the second video component creates an illusion of a three-dimensional representation of the video media (e.g., viewing different images with the left and right eye creates the illusion of depth by simulating parallax of the image contents)) is ongoing (1602), wherein playback of the video media item includes displaying the video media item concurrently with a border region (e.g., 1506A-1506C, X1506B, 1508, and/or X1508) that is outside of the video media item, changes (1604) a visual prominence (in some embodiments, a size of the crop of the video media item; in some embodiments, a width of the border region; in some embodiments, a blur radius of the border region; in some embodiments, an opacity of the border region; in some embodiments, making the change at the start of playback, e.g., before the video media item itself is output (in some embodiments, but after playback has been requested by a user), such that the video media item is initially displayed with the changed visual prominence; in some embodiments, while the video media item itself is being output (e.g., making "live" changes to the visual prominence during playback)) of the video media item relative to the border region based on a representation (e.g., 1500) (in some embodiments, the representation of the movement includes a category or level corresponding to the amount of movement (e.g., the category or level corresponding to a relative or absolute range of movement); in some embodiments, the representation of the movement includes and/or is based on one or more magnitudes (e.g., a magnitude of velocity and/or a magnitude of acceleration) and/or one or more directions (e.g., a magnitude of velocity and/or a magnitude of acceleration) (in some embodiments, the movement is represented as a vector); in some embodiments, the representation of the movement includes and/or is based on one or more movement components (e.g., linear and/or angular velocity and/or acceleration can be normalized and combined to determine combined/net magnitude(s) and/or direction(s)) of movement (e.g., a translation (e.g., x, y, and/or z cartesian movement) and/or a rotation (e.g., a movement around an axis (e.g., yaw, pitch, and/or roll)); in some embodiments, the movement includes (e.g., is based on) velocity and/or acceleration (e.g., instantaneous, average, and/or maximum velocity and/or acceleration for one or more sampling periods)) of a viewpoint (e.g., a detected viewpoint from which the video media was captured or an estimated viewpoint from which the video media was captured) corresponding to the video media item that occurred while the video media item was being captured (e.g., detected or estimated movement of the detected or estimated viewpoint) (e.g., a detected (e.g., by one or more motion sensors while capturing the video media item) and/or perceived (e.g., apparent) camera movement (in some embodiments, the perceived camera movement is a movement of a virtual camera (e.g., a "camera" capturing in and "moving" around a virtual environment); in some embodiments, the perceived camera movement is determined based on the visual content of the video media item (e.g., using image processing techniques (e.g., estimating the camera movement based on, e.g., motion blur, visual distortion, estimated dimensions of visual content, and/or camera metadata)); in some embodiments, the perceived camera movement is based on one or more characteristics of playback)).

Changing the visual prominence of the video media item relative to the border region based on the representation of the movement of the viewpoint corresponding to the video media item includes: in accordance with a determination that the movement of the viewpoint corresponding to the video media item corresponds to a first amount of movement (e.g., a magnitude of movement, a rate of change of the movement, a direction of the movement, and/or a change in direction of the movement; in some embodiments, the movement of the viewpoint corresponding to the video media item is obtained and/or determined from the representation of the movement of the viewpoint corresponding to the video media; in some embodiments, the movement corresponds to a first amount of movement if a magnitude of the movement falls within a first range (in some embodiments, the first range is one of a plurality of ranges representing different "levels" of movement; in some embodiments, the plurality of ranges are predetermined ranges; in some embodiments, the plurality of ranges are determined at least in part based on the overall movement range of the video media item); in some embodiments, the movement corresponds to a first amount of movement if it is preceded by and/or followed by a different movement of the viewpoint of the video media item, wherein the magnitude of the different movement falls within a respective range (e.g., the movement can be characterized with respect to other movements of the viewpoint of the video media item)), changing the visual prominence of the video media item relative to the border region to a first level of relative visual prominence (e.g., a first crop size, border width, border blur radius, and/or border opacity; in some embodiments, a first state of a plurality of states (e.g., corresponding to the plurality of movement ranges)), and in accordance with a determination that the movement of the viewpoint corresponding to the video media item corresponds to a second amount of movement different from the first amount of movement (in some embodiments, the movement corresponds to a second amount of movement if a magnitude of the movement falls within a second, different range; in some embodiments, the movement corresponds to a second amount of movement if it is preceded by and/or followed by a different movement of the viewpoint of the video media item, wherein the magnitude of the different movement falls within a respective range (e.g., the movement can be characterized with respect to other movements of the viewpoint of the video media item)), changing the visual prominence of the video media item relative to the border region to a second level of relative visual prominence that is different from the first level of relative visual prominence (e.g., a second crop size, border width, border blur radius, and/or border opacity; in some embodiments, a second state of a plurality of states (e.g., corresponding to the plurality of movement ranges)) (e.g., as illustrated in FIGS. 15C-15J). Changing the visual prominence of the video media relative to the border region based on apparent movement of the viewpoint of the video media provides improved control of media playback and improved ergonomics of media playback devices without cluttering the user interface with additional displayed controls or requiring additional user inputs for adjusting visual prominence which, additionally, reduces power usage and improves battery life of the system by enabling the user to use the system more quickly and efficiently. For example, automatically adjusting the visual prominence of the video media provides a more physically comfortable viewing experience without needing to display controls for playback settings or requiring the user to manually input adjustments before and during playback.

In some embodiments, the first amount of movement is a larger amount of movement than the second amount of movement (e.g., the first amount of movement represents a greater overall magnitude of and/or a greater overall rate of change in the apparent (e.g., detected and/or estimated) movement (e.g., velocity and/or acceleration of one or more movement components) of the viewpoint of the video media than the second amount of movement), and the video media is displayed less prominently (in some embodiments, cropped to a smaller size; in some embodiments, with a wider border; in some embodiments, with a higher blur radius applied to the border region) relative to the border region at the first level of visual prominence than at the second level of visual prominence. Automatically decreasing the visual prominence of the video media relative to the border region in response to larger apparent movements of the viewpoint of the video media and increasing the visual prominence of the video media relative to the border region in response to smaller apparent movements of the viewpoint of the video media provides improved control of media playback and improved ergonomics of media playback devices without cluttering the user interface with additional displayed controls or requiring additional user inputs for adjusting visual prominence which, additionally, reduces power usage and improves battery life of the system by enabling the user to use the system more quickly and efficiently. For example, displaying the video media with relatively less visual prominence in response to more intense apparent camera movement reduces viewing discomfort due to the more intense camera movement, while displaying the video media with relatively more visual prominence in response to less intense apparent camera movement enhances the playback of the video media when the apparent camera movement is less likely to cause viewing discomfort.

In some embodiments, the border region includes a passthrough region (e.g., 1506A, 1506B, 1506C, and/or X1506B) that includes a representation of a physical environment of a user (in some embodiments, passthrough video of the physical environment; in some embodiments, optical passthrough (e.g., via transparent or semi-transparent regions of a display); in some embodiments, the passthrough representation is visible at some levels of visual prominence and not visible at others (e.g., the video can be full-screen). Displaying the video media with a border region that includes environmental passthrough content (e.g., at some levels of reduced visual prominence of the video media)

provides improved ergonomics of media playback. For example, the representation of the physical environment orients the user within the physical environment while viewing the video media.

In some embodiments, the computer system detects a user input (e.g., a tap, touch, click, gesture, air gesture, speech input, and/or hardware button input) requesting playback of the video media item and in response to detecting the user input, initiates playback of the video media item.

In some embodiments, the video media item is stored in association with (e.g., includes and/or points to metadata augmenting the image and audio data of the video media item) the representation (e.g., 1500 and/or X1500) of the movement of the viewpoint corresponding to the video media (e.g., changing the visual prominence of the video media item relative to the border region based on metadata including and/or based on the velocity and/or acceleration of perceived camera movements in the video media; in some embodiments, the information is determined by the computer system (in some embodiments, the computer system analyzes the video media item (in some embodiments, metadata of the video media item; in some embodiments, the video (e.g., image and audio) data itself) to determine the movement of the viewpoint; in some embodiments, the computer system was used to capture the video); in some embodiments, the information is received by the computer system along with the video media item). Storing the video media item along with movement information provides improved control of media playback and improved ergonomics of media playback devices. For example, the movement information stored in association with the video media item allows the system to quickly and efficiently adjust the visual prominence of media playback.

In some embodiments, the representation (e.g., 1500 and/or X1500) of the movement of the viewpoint corresponding to the video media includes movement information (e.g., changing the visual prominence of the video media item relative to the border region based on velocity and/or acceleration data corresponding to movement of the viewpoint corresponding to the video media) captured (in some embodiments, detected using one or more motion sensors of the camera system; in some embodiments, recorded information on camera movement (e.g., for a virtual camera or electronically-controlled camera movements)) when the video media item was captured (e.g., concurrently with and/or in association with recording (e.g., filming, rendering, editing, and/or compiling) the video media item). Using movement information captured concurrently with the video media item provides improved control of media playback and improved ergonomics of media playback devices. For example, movement information captured with the video media item allows the system to quickly and efficiently adjust the visual prominence of media playback based on actual camera movements.

In some embodiments, the representation (e.g., 1500 and/or X1500) of the movement of the viewpoint corresponding to the video media includes (e.g., changing the visual prominence of the video media item relative to the border region based on) movement information determined (e.g., using video processing techniques (e.g., estimating the camera movement based on, e.g., motion blur (e.g., determining a greater amount of movement when more motion blur is present than when less motion blur is present), visual distortion (e.g., determining a greater amount of movement when subject matter detected in the video grows, translates, or distorts at a faster rate), estimated dimensions of visual content (e.g., estimating position, velocity, and/or acceleration based on, e.g., an estimation of how long it would take to pan over, zoom into, and/or rotate around visual content of particular dimensions), and/or other video metadata)) after the video media item was captured (e.g., based on the video media item (e.g., based on the image and/or audio data)). Using movement information determined after the video media item provides improved control of media playback and improved ergonomics of media playback devices. For example, movement information calculated or derived from the video media item allows the system to quickly and efficiently adjust the visual prominence of media playback based on the actual contents of the video media item.

In some embodiments, changing the visual prominence of the video media item (e.g., 1502 and/or X1502) relative to the border region (e.g., 1506A-1506C, X1506B, 1508, and/or X1508) based on the representation of the movement of the viewpoint corresponding to the video media item includes: in accordance with a determination that the movement of the viewpoint corresponding to the video item corresponds to the first amount of movement, changing the visual prominence of the video media item relative to the border region by a first amount of change (e.g., increasing or decreasing the crop size, border width, border blur radius, and/or border opacity by a first amount), and in accordance with a determination that the movement of the viewpoint corresponding to the video item corresponds to the second amount of movement, changing the visual prominence of the video media item relative to the border region by a second amount of change that is different from the first amount of change (e.g., increasing or decreasing the crop size, border width, border blur radius, and/or border opacity by a second amount). Changing the visual prominence of the video media relative to the border region based on apparent movement of the viewpoint of the video media provides improved control of media playback and improved ergonomics of media playback devices without cluttering the user interface with additional displayed controls or requiring additional user inputs for adjusting visual prominence which, additionally, reduces power usage and improves battery life of the system by enabling the user to use the system more quickly and efficiently. For example, automatically adjusting the visual prominence of the video media provides a more physically comfortable viewing experience without needing to display controls for playback settings or requiring the user to manually input adjustments before and during playback.

In some embodiments, the first amount of movement is a larger amount of movement than the second amount of movement (e.g., the first amount of movement represents a greater overall magnitude of the apparent (e.g., detected and/or estimated) movement (e.g., velocity and/or acceleration of one or more movement components) of the viewpoint of the video media than the second amount of movement), changing the visual prominence of the video media (e.g., 1502 and/or X1502) item relative to the border region (e.g., 1506A-1506C, X1506B, 1508, and/or X1508) to the first level of visual prominence includes displaying the border region occupying a first area (e.g., a particular border width, border area, and/or border dimensions; in some embodiments, cropping the video media such that the border region outside of the video media is a first size), and changing the visual prominence of the video media item relative to the border region to the second level of visual prominence includes displaying the border region occupying a second area that is smaller than the first area (in some embodiments, cropping the video media such that the border region outside of the video media is a second size smaller than the first size) (e.g., the visual prominence of the video media item relative to the border region is higher when the border region is smaller and lower when the border region is larger, so visual prominence of the media item relative to the border region is decreased for larger amounts of movement). Automatically increasing the size of the border region in response to larger apparent movements of the viewpoint of the video media and decreasing the size of the border region in response to smaller apparent movements of the viewpoint of the video media provides improved control of media playback and improved ergonomics of media playback devices without cluttering the user interface with additional displayed controls or requiring additional user inputs for adjusting visual prominence which, additionally, reduces power usage and improves battery life of the system by enabling the user to use the system more quickly and efficiently. For example, increasing the size of the border in response to more intense apparent camera movement reduces viewing discomfort due to the more intense camera movement, while decreasing the size of the border in response to less intense apparent camera movement improves visibility of and increases immersion in the video media.

In some embodiments, the first amount of movement is a smaller amount of movement than the second amount of movement (e.g., the first amount of movement represents a smaller overall magnitude of the apparent (e.g., detected and/or estimated) movement (e.g., velocity and/or acceleration of one or more movement components) of the viewpoint of the video media than the second amount of movement), changing the visual prominence of the video media item (e.g., 1502 and/or X1502) relative to the border region (e.g., 1506A-1506C, X1506B, 1508, and/or X1508) to the first level of visual prominence includes displaying the border region occupying a third area (e.g., a particular border width, border area, and/or border dimensions; in some embodiments, cropping the video media such that the border region outside of the video media is a third size); and changing the visual prominence of the video media item relative to the border region to the second level of visual prominence includes displaying the border region occupying a fourth area that is larger than the third area (in some embodiments, cropping the video media such that the border region outside of the video media is a fourth size larger than the third size) (e.g., the visual prominence of the video media item relative to the border region is higher when the border region is smaller and lower when the border region is larger, so visual prominence of the media item relative to the border region is increased for smaller amounts of movement). Automatically decreasing the size of the border region in response to smaller apparent movements of the viewpoint of the video media provides improved control of media playback and improved ergonomics of media playback devices without cluttering the user interface with additional displayed controls or requiring additional user inputs for adjusting visual prominence which, additionally, reduces power usage and improves battery life of the system by enabling the user to use the system more quickly and efficiently. For example, increasing the size of the border in response to more intense apparent camera movement reduces viewing discomfort due to the more intense camera movement, while decreasing the size of the border in response to less intense apparent camera movement improves visibility of and increases immersion in the video media.

In some embodiments, the computer system, while playback of the video media item is ongoing, changing a visual characteristic (e.g., a blur width, a blur radius, and/or an opacity) of the border region over a period of time as the video plays (e.g., as illustrated in FIGS. 15K-15L) (e.g., gradually; in some embodiments, gradually changing the visual characteristic of the border region while displaying the video media item with a particular level of visual prominence relative to the border region; in some embodiments, gradually changing the visual characteristic of the border region while changing the level of visual prominence of the video media item relative to the border region). Gradually changing the appearance of the border region over time provides improved ergonomics of media playback devices, for example, by avoiding sudden changes to the border region during media playback.

In some embodiments, changing the visual prominence of the video media item relative to the border region to the first level of relative visual prominence includes displaying the video media item at a first visual scale (e.g., a standard, default, and/or full-screen scale) and occupying a first area (e.g., cropping the video media item to a first size without changing the scaling of the video image contents), and changing the visual prominence of the video media item relative to the border region to the first level of relative visual prominence includes displaying the video media item at the first visual scale and occupying a second area that is a different size than the first area (e.g., as illustrated in FIGS. 15C-15J) (e.g., cropping the video media item to a second size larger or smaller than the first size without changing the scaling of the video image contents (e.g., more or less video content is displayed while scale remains unchanged). Changing the visual prominence of the video media item relative to the border region without changing the scaling of the video media item (e.g., cropping the video media item) provides improved control of media playback and improved ergonomics of media playback devices. For example, cropping the video media item can improve viewing comfort without adversely impacting the quality or the visibility of the uncropped (e.g., visible) portion.

In some embodiments, changing the visual prominence of the video media item relative to the border region based on the representation of the movement of the viewpoint corresponding to the video media item includes, in accordance with a determination that a movement of a viewpoint corresponding to an upcoming segment of the video media item (e.g., upcoming/future apparent camera movement in a segment of the video media item that is yet to be played back/is later than the current playback position) corresponds to a third amount of movement (in some embodiments, if a magnitude of the upcoming movement falls within a particular range; in some embodiments, if the magnitude of the upcoming movement represents an increase of at least a particular amount from the magnitude of current and/or past movement), changing the visual prominence of the video media item relative to the border region to a third level of relative visual prominence during playback of a portion of the video media item that is before the upcoming segment of the video media item (e.g., as illustrated in FIGS. 15D-15E2 and/or 15H-15I) (e.g., and then maintaining the changed visual prominence of the video media item relative to the border region during the movement of the viewpoint corresponding to the upcoming segment of the video media item) (e.g., changing the relative visual prominence of the video media item in anticipation of upcoming movement; in some embodiments, the visual prominence of the video media item relative to the border region is preemptively decreased in anticipation of increased movement in a future segment; in some embodiments the visual prominence of the video media item relative to the border region is not preemptively increased in anticipation of decreased movement in a future segment (e.g., visual prominence is not increased in a high-movement segment even if a segment of lower movement is upcoming); in some embodiments, the third level of relative visual prominence is also applied during playback of the upcoming video segment; in some embodiments, a level of visual prominence different from the third level of visual prominence is applied during playback of the upcoming video segment). Changing the visual prominence of the video media item relative to the border region in anticipation of upcoming movement provides improved control of media playback, improved ergonomics of media playback devices, and improved visual feedback about a state of the computer system. For example, preemptively changing the visual prominence visually indicates to the user that apparent camera movement is upcoming, and can prevent sudden, distracting changes to the appearance of the border region.

In some embodiments, the determination that the movement of the viewpoint corresponding to the video media item corresponds to the first amount of movement includes a determination that a magnitude (e.g., a magnitude of velocity and/or a magnitude of acceleration of one or more movement components (e.g., a translation (e.g., x, y, and/or z cartesian movement) and/or a rotation (e.g., a movement around an axis (e.g., yaw, pitch, and/or roll)); in some embodiments, the magnitudes of the one or more movement components are normalized and/or combined; in some embodiments, the magnitudes of velocity and acceleration are normalized and/or combined; in some embodiments, instantaneous, average, and/or maximum magnitude for one or more sampling periods) of the movement of the viewpoint corresponding to the video media item corresponds to a first magnitude of movement (in some embodiments, a first range of magnitudes, such as apparent velocity of greater than 10 m/s and/or 25°/s and/or apparent acceleration of greater than 25 $m/s^2$ and/or $35°/s^2$), and the determination that the movement of the viewpoint corresponding to the video media item corresponds to the second amount of movement includes a determination that the magnitude of the movement of the viewpoint corresponding to the video media item corresponds to a second magnitude of movement different than the first magnitude of movement (in some embodiments, a second range of magnitudes, such as apparent velocity of less than 10 m/s and/or 25°/s and/or apparent acceleration of less than 25 $m/s^2$ and/or $35°/s^2$) (e.g., the visual prominence of the video media item is changed (e.g., to the first level or the second level) based on the amount of movement). Changing the visual prominence of the video media relative to the border region based on the magnitude of apparent movement of the viewpoint of the video media provides improved control of media playback and improved ergonomics of media playback devices without cluttering the user interface with additional displayed controls or requiring additional user inputs for adjusting visual prominence which, additionally, reduces power usage and improves battery life of the system by enabling the user to use the system more quickly and efficiently. For example, displaying the video media with relatively less visual prominence in response to more intense apparent camera movement reduces viewing discomfort due to the more intense camera movement, while displaying the video media with relatively more visual prominence in response to less intense apparent camera movement enhances the playback of the video media when the apparent camera movement is less likely to cause viewing discomfort.

In some embodiments, the determination that the movement of the viewpoint corresponding to the video media item corresponds to the first amount of movement includes a determination that a rate of change in a magnitude (e.g., a rate of change of velocity (e.g., acceleration) and/or a rate of change of acceleration of one or more movement components (e.g., a translation (e.g., x, y, and/or z cartesian movement) and/or a rotation (e.g., a movement around an axis (e.g., yaw, pitch, and/or roll)); in some embodiments, instantaneous, average, and/or maximum rates of change for one or more sampling periods) of the movement of the viewpoint corresponding to the video media item corresponds to a first rate of change (in some embodiments, a first range of rates of change, such as apparent acceleration of greater than 25 $m/s^2$ and/or $35°/s^2$ and/or a change in acceleration of greater than 100 $m/s^2$ and/or $90°/s^2$ during a 1-second video segment), and the determination that the movement of the viewpoint corresponding to the video media item corresponds to the second amount of movement includes a determination that the rate of change in a magnitude of the movement of the viewpoint corresponding to the video media item corresponds to a second rate of change different than the first rate of change (e.g., the visual prominence of the video media item is changed (e.g., to the first level or the second level) based on the amount of movement) (in some embodiments, a second range of rates of change, such as apparent acceleration of less than 25 $m/s^2$ and/or $35°/s^2$ and/or a change in acceleration of less than 100 m/s2 and/or $90°/s^2$ during a 1-second video segment). Changing the visual prominence of the video media relative to the border region based on the magnitude of apparent movement of the viewpoint of the video media provides improved control of media playback and improved ergonomics of media playback devices without cluttering the user interface with additional displayed controls or requiring additional user inputs for adjusting visual prominence which, additionally, reduces power usage and improves battery life of the system by enabling the user to use the system more quickly and efficiently. For example, displaying the video media with relatively less visual prominence in response to rapidly changing apparent camera movement reduces viewing discomfort due to the more intense camera movement, while displaying the video media with relatively more visual prominence in response to relatively stable/unchanging apparent camera movement enhances the playback of the video media when the apparent camera movement is less likely to cause viewing discomfort.

In some embodiments, changing the visual prominence of the video media item relative to the border region based on the representation of the movement of the viewpoint corresponding to the video media item includes changing a size of a respective area occupied by the video media item (e.g., cropping the video media item to a particular size based on the representation of the movement of the viewpoint corresponding to the video media item; in some embodiments, without changing the scaling of the video image contents; in some embodiments, cropping the video media item to a smaller size (e.g., thereby reducing the relative visual prominence) in response to more movement and cropping the video media item to a larger size (e.g., thereby increasing the relative visual prominence) in response to less movement). Changing the visual prominence of the video media item relative to the border region by changing the size of the video media item provides improved ergonomics of media playback devices. For example, cropping the video media item can improve viewing comfort by reducing the proportion of the viewer's field-of-view occupied by the video media item and/or increasing the visibility of an environment to ground or orient the viewer.

In some embodiments, displaying the video media item concurrently with a border region that is outside of the video media item includes applying a blurring effect to a respective display region (e.g., 1508) (e.g., blurring at least a portion of the video media item and/or the border region; in some embodiments, the portion is a border area (e.g., an area where the video media item meets the border region; e.g., the blurring effect creates a soft/feathered edge to the video media item)), and changing the visual prominence of the video media item relative to the border region based on the representation of the movement of the viewpoint corresponding to the video media item includes changing a blur radius of the blurring effect (e.g., changing an intensity/extent of blurring based on the representation of the movement of the viewpoint corresponding to the video media item; in some embodiments, blurring the edges more (e.g., thereby reducing the relative visual prominence) in response to more movement and blurring the edges less (e.g., thereby increasing the relative visual prominence) in response to less movement; in some embodiments, blurring the edges less in response to more movement (e.g., to improve visibility of video media cropped to a smaller size)). Changing a blur radius of a blurring effect while changing the visual prominence of the video media item relative to the border region provides improved ergonomics of media playback devices. For example, the blurring effect can affect the visual prominence of the video media item and/or the display region and/or improve the appearance of the video media item and/or the display region as changes are made to other visual characteristics (e.g., the relative sizing).

In some embodiments, displaying the video media item concurrently with a border region that is outside of the video media item includes applying a feathering effect to a respective display region (e.g., 1508 and/or X1508) (e.g., blurring at least a portion of the video media item and/or the border region; in some embodiments, the portion is a border area (e.g., an area where the video media item meets the border region; e.g., the blurring effect creates a soft/feathered edge to the video media item)), and changing the visual prominence of the video media item relative to the border region based on the representation of the movement of the viewpoint corresponding to the video media item includes changing a feather radius of the feathering effect (e.g., changing an intensity/extent of feathering based on the representation of the movement of the viewpoint corresponding to the video media item; in some embodiments, feathering the edges more (e.g., thereby reducing the relative visual prominence) in response to more movement and feathering the edges less (e.g., thereby increasing the relative visual prominence) in response to less movement; in some embodiments, feathering the edges less in response to more movement (e.g., to improve visibility of video media cropped to a smaller size)). Changing a feathering radius of a feathering effect while changing the visual prominence of the video media item relative to the border region provides improved ergonomics of media playback devices. For example, the feathering effect can affect the visual prominence of the video media item and/or the display region and/or improve the appearance of the video media item and/or the display region as changes are made to other visual characteristics (e.g., the relative sizing).

In some embodiments, changing the visual prominence of the video media item relative to the border region based on the representation of the movement of the viewpoint corresponding to the video media item includes changing a visibility of a representation (e.g., 1506A, 1506B, 1506C, and/or X1506B) (e.g., displayed image and/or video content, passthrough video, and/or optical passthrough (e.g., via transparent or semi-transparent regions of a display)) of an XR environment (e.g., 1506) (in some embodiments, the XR environment includes a physical environment; in some embodiments, the XR environment includes an environment-locked virtual environment; in some embodiments, the XR environment includes other virtual content (e.g., non-video media UI elements, application content, or other displayed content)) included in the border region (in some embodiments, changing the visibility of the representation of the XR environment includes increasing or decreasing the size of the border region to respectively reveal more or less of the XR environment; in some embodiments, changing the visibility of the representation of the XR environment includes changing a blurring effect applied to at least a portion of the representation; in some embodiments, changing the visibility of the representation of the XR environment includes changing another visual characteristic of the representation). Changing the visual prominence of the video media item relative to the border region by changing the visibility of surrounding (e.g., non-video) content provides improved ergonomics of media playback devices. For example, increasing the visibility of surrounding content can improve viewing comfort by reducing the proportion of the viewer's field-of-view occupied by grounding and/or orienting the viewer outside of the frame of reference of the video media item, while decreasing the visibility of surrounding content can enhance playback of video media by increasing the immersive effect of the video media.

In some embodiments, the representation of the XR environment includes a representation (e.g., passthrough video and/or optical passthrough (e.g., via transparent or semi-transparent regions of a display) of a physical environment (e.g., the user's physical surroundings). Changing the visual prominence of the video media item relative to the border region by changing the visibility of surrounding (e.g., non-video) content provides improved ergonomics of media playback devices. For example, increasing the visibility of surrounding content can improve viewing comfort by reducing the proportion of the viewer's field-of-view occupied by grounding and/or orienting the viewer in physical space. In some embodiments, the representation of the XR environment includes a representation (e.g., displayed image and/or video content) of a virtual environment (in some embodiments, an environment-locked virtual environment). Changing the visual prominence of the video media item relative to the border region by changing the visibility of surrounding (e.g., non-video) content provides improved ergonomics of media playback devices. For example, increasing the visibility of surrounding content can improve viewing comfort by reducing the proportion of the viewer's field-of-view occupied by grounding and/or orienting the viewer outside the frame of reference of the video media item.

In some embodiments, changing a visibility of the representation of the XR environment includes changing a darkness level of the border region (e.g., as illustrated in FIG. 15M) (in some embodiments, artificially obscuring and/or reducing the brightness of pass-through video; in some embodiments, obscuring optical passthrough by, e.g., reducing the transparency of the display regions through which the environment is seen). Changing the visual prominence of the video media item relative to the border region by changing the darkness of surrounding (e.g., non-video) content provides improved ergonomics of media playback devices. For example, increasing the brightness of surrounding content can improve viewing comfort by orienting the viewer outside of the frame of reference of the video media item, while increasing the darkness of surrounding content can enhance playback of video media by increasing the immersive effect of the video media.

In some embodiments, the video media item includes a first video component corresponding to a viewpoint of a right eye and a second video component that is different from the first video component corresponding to a viewpoint of a left eye, wherein concurrently viewing the first video component and the second video component creates component creates an illusion of a three-dimensional representation of the video media item (e.g., viewing different images with the left and right eye creates the illusion of depth by simulating the parallax effect of binocular vision) (e.g., the video media includes spatial video media). Changing the visual prominence of spatial video media relative to the border region based on apparent movement of the viewpoint of the spatial video media provides improved control of spatial media playback and improved ergonomics of spatial media playback devices without cluttering the user interface with additional displayed controls or requiring additional user inputs for adjusting visual prominence which, additionally, reduces power usage and improves battery life of the system by enabling the user to use the system more quickly and efficiently. For example, as movements in the viewpoint of spatial video media can greatly impact viewing comfort, automatically adjusting the visual prominence of the spatial video media provides a more physically comfortable viewing experience without needing to display controls for playback settings or requiring the user to manually input adjustments before and during playback.

In some embodiments, the computer system, while playback of a second video media item is ongoing, wherein the second video media item does not include two or more video components that, when viewed concurrently, create an illusion of a three-dimensional representation of the second video media item (e.g., while playing non-spatial video media), foregoes changing the visual prominence of the second video media item relative to the border region (e.g., non-spatial video media content is played at a consistent level of visual prominence relative to the border region (e.g., even when the non-spatial video media content includes a significant amount of apparent camera movement; in some embodiments, non-spatial video media content does not include a representation of the movement of the viewpoint corresponding to the video media item, and thus, changes are not made to the visual prominence of the non-spatial video media content based on a representation of movement). Conditionally changing visual prominence of spatial video media relative to the border region based on apparent movement of the viewpoint of the spatial video media provides improved control of spatial media playback without cluttering the user interface with additional displayed controls, which, additionally, reduces power usage and improves battery life of the system by enabling the user to use the system more quickly and efficiently. For example, dynamic changes to the visual prominence of media playback are automatically enabled or disabled based on the type of the video, without the user needing to remember to change the setting or to provide additional inputs.

In some embodiments, playback of the video media item includes displaying the video media item as a virtual object (in some embodiments, a viewpoint-locked virtual object; in some embodiments, an environment-locked virtual object) in an XR environment (e.g., as illustrated in FIGS. 15C-15J) (in some embodiments, the video media item is displayed while providing (e.g., displaying and/or otherwise outputting) other XR content; in some embodiments, the XR environment includes physical content (e.g., output as passthrough video and/or optical passthrough), viewpoint-locked virtual content, environment-locked virtual content, and/or other virtual content). Changing the visual prominence of video media relative to the border region based on apparent movement of the viewpoint of the video media provides improved control of media playback in an XR environment and improved ergonomics of XR output devices without cluttering the user interface with additional displayed controls or requiring additional user inputs for adjusting visual prominence which, additionally, reduces power usage and improves battery life of the system by enabling the user to use the system more quickly and efficiently. For example, as movements in the viewpoint of video media displayed as part of an XR environment can greatly impact viewing comfort, automatically adjusting the visual prominence of the video media provides a more physically comfortable viewing experience without needing to display controls for playback settings or requiring the user to manually input adjustments before and during playback.

In some embodiments, changing the visual prominence of the video media item (e.g., 1502 and/or X1502) relative to the border region (e.g., 1506A-1506C, X1506B, 1508, and/or X1508) based on the representation (e.g., 1500 and/or X1500) of the movement of the viewpoint corresponding to the video media item (e.g., as illustrated in FIGS. 15C-15J) includes changing (in some embodiments, in accordance with a determination that the movement of the viewpoint corresponding to the video media item corresponds to a respective amount of movement (in some embodiments, the first amount of movement; in some embodiments, the second amount of movement; in some embodiments, another amount of movement)) the visual prominence of the video media item relative to the border region to a respective level of relative visual prominence (in some embodiments, the first level of relative visual prominence; in some embodiments, the second level of visual prominence; in some embodiments, a level of visual prominence other than the first level or second level) based on the representation of the movement of the viewpoint corresponding to the video media item (in some embodiments, based on the movement of the viewpoint during one or more windows or segments of the video media item (e.g., past, current, and/or upcoming segments)). In some embodiments, the computer system, after changing the visual prominence of the video media item relative to the border region to the respective level of relative visual prominence based on the representation of the movement of the viewpoint corresponding to the video media item and in accordance with a determination that at least a threshold time (e.g., the duration of at least one of windows $t_1$-$t_8$ and/or at least one of video segments 1502A-1502H) has passed since changing the visual prominence of the video media item relative to the border region to the respective level of relative visual prominence (in some embodiments, and in accordance with a determination that the movement of the viewpoint corresponding to the video media item corresponds to a different amount of movement than the respective amount of movement (e.g., the amount of movement on which the change to the respective level was based; in some embodiments, the first amount of movement; in some embodiments, the second amount of movement; in some embodiments, another amount of movement)), changes the visual prominence of the video media item relative to the border region to a level of relative visual prominence that is different from the respective level of relative visual prominence (e.g., changing the visual prominence between video segments (e.g., 1502A-1502H) and/or between windows (e.g., $t_1$-$t_8$)) (e.g., increasing or decreasing the relative visual prominence; in some embodiments, to the first level of relative visual prominence; in some embodiments, to the second level of visual prominence; in some embodiments, to a level of visual prominence other than the first level or second level) based on the representation of the movement of the viewpoint corresponding to the video media item (in some embodiments, based on the movement of the viewpoint during one or more windows or segments of the video media item (e.g., past, current, and/or upcoming segments) different from the one or more segments on which the change to the respective level was based). For example, as illustrated in FIG. 15E, as the duration of window $t_2$ has passed since changing the border and framing settings to level 2, computer system 700 changes the border and framing settings to level 3 in response to the apparent camera movement in window $t_3$. In some embodiments, the computer system, after changing the visual prominence of the video media item relative to the border region to the respective level of relative visual prominence based on the representation of the movement of the viewpoint corresponding to the video media item and in accordance with a determination that less than a threshold time has passed since changing the visual prominence of the video media item relative to the border region to the respective level of relative visual prominence, foregoes changing the visual prominence of the video media item relative to the border region (e.g., refraining from changing the visual prominence a second time during playback of a single video segment (e.g., 1502A-1502H) and/or a single window (e.g., $t_1$-$t_8$) (e.g., the visual prominence is changed at less than a threshold frequency; in some embodiments, the video media is subdivided into segments of the threshold time (and/or a remainder duration), and the visual prominence is only changed once per segment of playback (e.g., based on the overall movement during a current segment and/or past and/or future segments). For example, as illustrated in FIG. 15I, although the apparent camera movement decreases towards the end of window $t_7$, computer system 700 does not change the border and framing settings to level 3 until window $t_5$. Changing the visual prominence of the video media relative to the border region based on apparent movement of the viewpoint of the video media with less than a particular frequency provides improved ergonomics of media playback, reduces power usage, and improves battery life, for example, by avoiding distracting, excessive, and/or unnecessary changes to the displayed content.

In some embodiments, changing the visual prominence of the video media item (e.g., 1502 and/or X1502) relative to the border region (e.g., 1506A-1506C, X1506B, 1508, and/or X1508) based on the representation (e.g., 1500 and/or X1500) of the movement of the viewpoint corresponding to the video media item (e.g., as illustrated in FIGS. 15C-15J) includes changing (e.g., displaying and/or setting; in some embodiments, initially (e.g., at or before the start of playback)) the visual prominence of the video media item relative to the border region to a respective level of relative visual prominence (in some embodiments, the first level of relative visual prominence; in some embodiments, the second level of visual prominence; in some embodiments, a level of visual prominence other than the first level or second level). In some embodiments, the computer system, after changing the visual prominence of the video media item relative to the border region to the respective level of relative visual prominence, detects that the movement of the viewpoint corresponding to the video media item in a respective portion of the video media item will change (e.g., the amount (e.g., magnitude and/or rate of change) of the apparent camera movement will fall within a particular range (e.g., the amount of movement will not exceed a maximum amount and will not fall below a minimum amount) and/or exceed a particular deviation (e.g., the amount of movement will be similar/consistent, with minimal deviations (e.g., spikes or troughs))) for a respective amount of time. In some embodiments, the computer system, in response to detecting that the movement of the viewpoint corresponding to the video media item in the respective portion of the video media item will change for the respective amount of time and in accordance with a determination that the respective amount of time is above a threshold amount of time (e.g., 0.05s, 0.1s, 0.25s, 0.5s, and/or is; e.g., 1%, 5%, 10%, and/or 25% of the duration of one of windows $t_1$-$t_8$) (in some embodiments, the threshold amount of time depends on the direction of the change in movement, e.g., if the visual prominence was changed (e.g., initially) to the respective level based on a high amount movement and the change in movement for the respective time is a decrease to a lower amount of movement, the threshold amount of time is higher (e.g., the movement needs to be at a lower level of movement for a longer period of time before the change leads to a further change in visual prominence), and if the visual prominence was changed (e.g., initially) to the respective level based on a low amount movement and the change in movement for the respective time is an increase to a higher amount of movement, the threshold amount of time is lower (e.g., the movement only needs to be at a higher level of movement for a shorter period of time before the change leads to a further change in visual prominence)), changes the visual prominence of the video media item relative to the border region based on the movement of the viewpoint corresponding to the video media item. For example, as the "spike" in velocity in window $t_8$ of movement profile 1500 lasts at least a threshold amount of time (e.g., over 25% of the duration of window $t_8$), computer system 700 changes the visual prominence of video media item 1502 to display video segment 1502G with border and framing settings selected for level 4 (e.g., as illustrated in FIG. 15I). In some embodiments, the computer system, in response to detecting that the movement of the viewpoint corresponding to the video media item in the respective portion of the video media item will change for the respective amount of time and in accordance with a determination that the respective amount of time is below the threshold amount of time, forgoing changing the visual prominence of the video media item relative to the border region based on the movement of the viewpoint corresponding to the video media item (e.g., because the duration for which the change in the motion in the respective portion of the video item is too short). (e.g., even if there is a change in the movement of the representation of the viewpoint) (e.g., maintaining the respective level of relative visual prominence for the respective duration of playback) (e.g., the visual prominence of the video media item does not change during a scene of comparable motion; in some embodiments, if the respective duration of playback is less than the entire duration of the video playback, the visual prominence of the video media item may be changed for later scenes or segments based on the movement of the later segments). For example, if the "spike" in velocity in window $t_8$ of movement profile 1500 lasted less than the threshold amount of time (e.g., under 25% of the duration of window $t_5$), computer system 700 displays video segment 1502G without changing the border and framing settings (e.g., maintaining the settings selected for window $t_7$). Changing the visual prominence of the video media relative to the border region based on apparent movement of the viewpoint of an entire scene and/or segment of the video media or based on apparent movement of the viewpoint of the video media as a whole provides improved ergonomics of media playback, reduces power usage, and improves battery life, for example, by avoiding distracting, excessive, and/or unnecessary changes to the displayed content.

In some embodiments, aspects/operations of methods 800, 1000, 1200, 1400, and 1600 may be interchanged, substituted, and/or added between these methods. For example, the video media being played back in method 1600 may be video media captured using the user interfaces and indicators described with respect to methods 800, 1000, 1200, and/or 1400. For brevity, these details are not repeated here.

FIGS. 17A-17R illustrate exemplary methods for displaying a camera preview for media capture with viewpoint stability guidance. FIG. 18 is a flow diagram of an exemplary method 1800 for displaying a camera preview for media capture with viewpoint stability guidance. The user interfaces in FIGS. 17A-17R are used to illustrate the processes described below, including the process in FIG. 18.

FIGS. 17A-17R illustrate the capture of spatial video media, which is video media including at least one component for a viewer's right eye (e.g., captured using second camera 704B) and at least one component for a viewer's left eye (e.g., captured using first camera 704A) to create the appearance/illusion of depth. In some embodiments, viewing video media (in particular, spatial video media and/or video media viewed using an HMD such as X700) with an "unstable" viewpoint (e.g., with a high level of actual or apparent camera motion, especially yaw rotation, pitch rotation, vertical translation, and horizontal translation as described with respect to FIGS. 13A-13P)—even if the movement of the viewpoint is brief, slow, or gradual—can have an increased likelihood of causing physical discomfort such as motion sickness, eye strain, disorientation, and/or migraine compared to viewing video media with a "stable" viewpoint. In some embodiments, a user may also wish to capture spatial video media with a "stable" viewpoint for aesthetic and/or artistic purposes (e.g., visual clarity/legibility and/or a desire to minimize the apparent "presence" of the camera in the captured media). In some embodiments where the spatial media capture is performed using a head-mounted device such as HMD X700, viewpoint movement arises from movements of a user's head, neck, and/or body, which can be more difficult to keep still compared to, e.g., a hand-held or rigged camera. Accordingly, as illustrated in FIGS. 17A-17R, HMD X700 provides guidance for "stable" or "low-motion" spatial video capture, e.g., video capture with only minimal yaw rotation, pitch rotation, vertical translation, and horizontal translation movement of the viewpoint (e.g., actual and/or apparent camera motion). In some embodiments, device X700 is HMD 1-100 or includes one or more features and/or elements of HMDs 1-100, 1-200, 3-100, 6-100, 6-200, 6-300, 6-400, and/or 11.1.2-100.

As illustrated in FIG. 17A, while displaying media capture interface X710 and shutter affordance X718 in a ready-to-capture state (e.g., as described with respect to FIG. 7R), HMD X700 detects a potential media capture input, such as button press input 1702A of hardware button X706, air gesture input 1702B (e.g., a pinch air gesture), and/or tap input 1702C, that is held for a duration of time while gaze X732 is directed at shutter affordance X718 (e.g., as described with respect to FIG. 7V). In response (e.g., as described with respect to FIGS. 7V-7W), in FIG. 17B, HMD X700 initiates capture of spatial video media, which includes at least one component for a viewer's right eye (e.g., captured using second camera 704B) and at least one component for a viewer's left eye (e.g., captured using first camera 704A) to create the appearance/illusion of depth. In some embodiments, computer system 700 initiates a media capture of limited duration that includes content from before and/or after the capture input is detected (e.g., before and/or after an air pinch gesture is released, an air tap gesture is detected, a button press is detected or released), such as a brief animated photo where several frames are captured when a photo is taken, creating a "live" effect. As illustrated in FIG. 17B, while capturing the spatial video media, HMD X700 displays video status affordance X750 (e.g., indicating the currently elapsed time of the video capture).

Upon initiating the capture of the spatial video media at FIG. 17B, HMD X700 displays stability indicator 1704 (e.g., included in media capture interface X710), a crosshair virtual object superimposed over an environment (e.g., a physical and/or XR environment) being captured in the spatial video media (e.g., via a transparent or translucent display and/or over a pass-through view of the environment). In some embodiments, stability indicator 1704 is displayed in a particular color, for instance, a yellow crosshair (e.g., depicted in FIG. 17B by the pattern fill of stability indicator 1704). In some embodiments, stability indicator 1704 is displayed as an opaque virtual object (e.g., depicted in FIG. 17B by the solid outline of stability indicator 1704).

HMD X700 initially displays stability indicator 1704 at a location (e.g., of display module X702) representing anchor location 1706 in the environment. For example, HMD X700 displays stability indicator 1704 overlaying (e.g., via pass-through video and/or optical passthrough) anchor location 1706 in the environment, and/or renders stability indicator 1704 as a virtual object at a virtual location (e.g., of a three-dimensional XR environment) that corresponds to anchor location 1706. In some embodiments, HMD700 displays stability indicator 1704 to appear at a particular depth in front of a user (e.g., by displaying stability indicator 1704 differently for the user's left and right eyes). For example, for comfortable viewing of stability indicator 1704, HMD700 may display stability indicator 1704 and/or other elements of media capture interface X710 in a plane a predetermined depth (e.g., 1 meter) from the user's eyes or in a plane at a depth that dynamically updates based on the convergence point of the user's eyes (e.g., detected using one or more sensors, such as X704). Although stability indicator 1704 is displayed along with the environment being captured in the ongoing spatial video capture, stability indicator 1704 (e.g., like other elements of media capture interface X710) does not appear in the captured media itself.

Anchor location 1706 serves as a reference or target point for HMD X700 to define "stable" or "low-motion" spatial video capture, e.g., video capture with only minimal yaw rotation, pitch rotation, vertical translation, and horizontal translation movement of the viewpoint (e.g., actual and/or apparent camera motion). In some embodiments, HMD X700 can determine how the viewpoint of the spatial video capture changes with respect to the initial viewpoint of the environment seen in FIG. 17B (e.g., at the onset of the spatial video capture) by detecting the displacement of anchor location 1706 with respect to the viewport through which the environment is visible (e.g., with respect to the user's current field-of-view of the environment via HMD X700), for instance, using first camera 704A and second camera 704B as stereoscopic camera sensors. In some embodiments, HMD X700 can determine how the viewpoint of the spatial video capture changes with respect to the initial viewpoint of the environment seen in FIG. 17B using one or more other sensors (e.g., sensor X704), such as depth sensors (e.g., structural light sensors and/or time-of-flight sensors (e.g., LIDAR and/or ultrasonic sensors)), accelerometers, gyroscopes, and/or magnetometers. As illustrated in FIG. 17B, at the onset of capturing the spatial video media, anchor location 1706 is aligned with viewpoint location 1708, which is viewpoint locked to the viewpoint of the spatial video capture (e.g., the viewport through which the environment is visible). In some embodiments, viewpoint location 1708 is the center point of the viewport through which the environment is visible, which may be offset from the center of the display module X702 in order to appear centered in a user's binocular field-of-view. Accordingly, before the current viewpoint of the spatial video capture has moved, there is no displacement between anchor location 1706 and viewpoint location 1708. For illustrative purposes, anchor location 1706 is depicted as a dashed star and viewpoint location 1708 is depicted as a dashed circle; however, in the embodiment illustrated in FIGS. 17A-17R, the dashed star and the dashed circle are not displayed by HMD X700.

At FIG. 17B, HMD X700 detects movement 1710, for example, a horizontal panning movement (e.g., translation) to the left and/or a clockwise yaw rotation, changing the current viewpoint of the ongoing spatial video capture. As a result of movement 1710, at FIG. 17C, anchor location 1706 is displaced from viewpoint location 1708 by a first distance, for example, an angular distance of 1° (e.g., approximately 1.7 cm if anchor location 1706 and viewpoint location 1708 are defined as being at a radius of 1 m from the cameras, the user's eyes, and/or the viewport through which the environment is visible). Note that, for illustrative purposes, the movements and distances described herein may not be portrayed to scale in FIGS. 17C-17R. Additionally, the numerical distances, proportions, thresholds, and ranges described with respect to FIGS. 17A-17R and 18 are intended only as example values, and values departing significantly from these examples are understood as falling within the scope of this disclosure. For example, an angular distance of 100 is used below as an example "high motion" threshold for viewpoint (e.g., the magnitude of displacement between the current viewpoint and the initial or target viewpoint beyond which movement of the viewpoint is classified as "high motion," as described in further detail below), but the techniques described herein could also be applied using a much higher "high motion" threshold (e.g., 25°, 45°, 90°, or higher, for instance, in embodiments where higher-motion video capture is desirable) or a much lower "high motion" threshold (e.g., 10, 0.1°, 0.05°, and/or lower, for instance, in embodiments where stability of video capture is of paramount importance).

In response to detecting movement 1710, HMD X700 changes the appearance of stability indicator 1704 to indicate anchor location 1706 and the initial viewpoint of the spatial media capture (e.g., the viewpoint illustrated in FIG. 17B), which now represents a "target" or "stable" viewpoint for steady/low-motion video capture (e.g., capture with minimal viewpoint deviation from the initial viewpoint). As illustrated in FIG. 17C, HMD X700 changes the appearance of stability indicator 1704 by moving stability indicator 1704 to the right of viewpoint location 1708 from its initial display position (e.g., aligned with viewpoint location 1708) to visually indicate anchor location 1706 to the user. In some embodiments, HMD X700 moves stability indicator 1704 to align with anchor location 1706 in the environment, for example, rendering stability indicator 1704 as a fully environment-locked virtual object. In some embodiments, as illustrated in FIG. 17C, HMD X700 moves stability indicator 1704 to remain in the vicinity of anchor location 1706 (e.g., remaining within a particular region environment-locked at anchor location 1706), but does not fully align stability indicator 1704 with anchor location 1706 in the viewpoint of the environment. Accordingly, while HMD X700 moves stability indicator 1704 to indicate anchor location 1706, stability indicator 1704 appears to slightly respond to or follow movement 1710, moving away from anchor location 1706 in the same direction as movement 1710 but with an attenuated magnitude (e.g., 10%, 20%, and/or 25%). For example, at FIG. 17C, HMD X700 moves stability indicator 1704 to appear at approximately 20% of the displacement between anchor location 1706 and viewpoint location 1708, e.g., at approximately 0.2° angular distance from anchor location 1706.

In some embodiments, the location where stability indicator 1704 is displayed is determined based on one or more simulated physical properties of stability indicator 1704, anchor location 1706, viewpoint location 1708, and/or the XR environment. In some embodiments, simulating the one or more simulated physical properties includes simulating stability indicator 1704 pulling away from anchor location 1706 with some inertia, momentum, resistance, and/or friction. In some embodiments, simulating the one or more simulated physical properties includes modeling stability indicator 1704 as a virtual object with one or more simulated forces pulling stability indicator 1704 towards anchor location 1706 and/or one or more simulated forces pulling alignment indicator 1714 towards viewpoint location 1708, such as gravitational forces, magnetic forces, electrostatic forces, and/or spring forces. In some embodiments, in response to further changes in the current viewpoint that reverse the previous changes (e.g., viewpoint movements that move the spatial video capture closer to alignment with the initial viewpoint), HMD X700 also reverses some of all of the previous changes to stability indicator 1704 (e.g., moving stability indicator 1704 back into alignment with anchor location 1706).

At FIG. 17C, HMD X700 detects movement 1712 changing the current viewpoint of the ongoing spatial video capture, for example, a further horizontal panning movement (e.g., translation) to the left and/or a clockwise yaw rotation. As a result of movement 1712, at FIG. 17D, anchor location 1706 is displaced from viewpoint location 1708 by a second distance, for example, an angular distance of 2.5°. In response to detecting movement 1712, HMD X700 changes the appearance of stability indicator 1704 to continue to indicate anchor location 1706. As described with respect to FIG. 13C, at FIG. 17D, HMD X700 moves stability indicator 1704 to approximately 20% of the displacement between anchor location 1706 and viewpoint location 1708 (e.g., approximately 0.5° from anchor location 1706) such that stability indicator 1704 remains in the vicinity of anchor location 1706 while also appearing to slightly respond to or follow movement 1712. As the angular distance of 2.5° between anchor location 1706 and viewpoint location 1708 exceeds a first alignment threshold (e.g., 1.5°, 2°, and/or 2.3°), HMD X700 additionally changes the appearance of stability indicator 1704 by decreasing the opacity of stability indicator 1704 such that stability indicator 1704 is displayed as a semi-transparent virtual object (e.g., depicted in FIG. 17D by the dashed outline of stability indicator 1704).

Figure 17D:
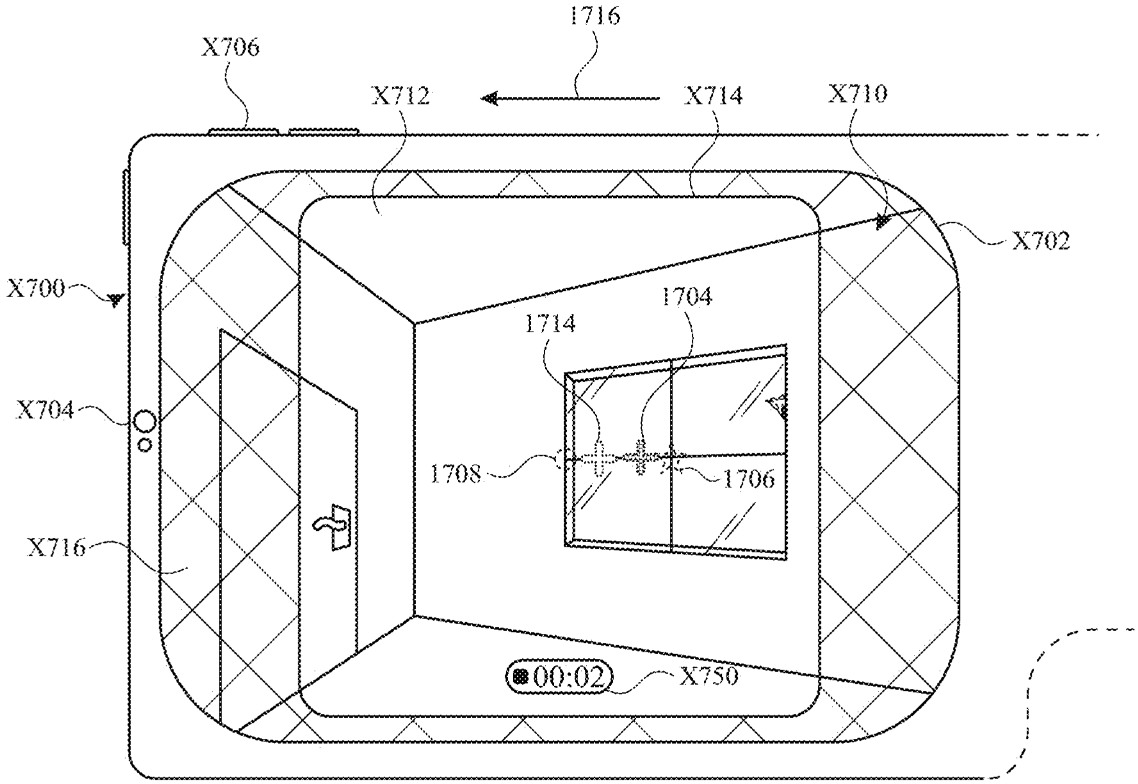

As illustrated in FIG. 17D, in response to the angular distance between anchor location 1706 and viewpoint location 1708 exceeding the first alignment threshold (e.g., 1.5°, 2°, and/or 2.3°) as a result of movement 1712, HMD X700 displays alignment indicator 1714, another crosshair virtual object superimposed over the environment being captured in the spatial video media (e.g., as described with respect to stability indicator 1704). In some embodiments, alignment indicator 1714 is displayed in a different color than stability indicator 1704, for instance, a white crosshair (e.g., depicted in FIG. 17D by the solid fill of alignment indicator 1714). In some embodiments, alignment indicator 1714 is initially displayed as a semi-transparent virtual object (e.g., depicted in FIG. 17D by the dashed outline of alignment indicator 1714). In some embodiments, as described with respect to stability indicator 1704, HMD X700 displays alignment indicator 1714 to appear at a particular depth in front of a user, for example, in a plane one meter from the user's eyes or in a plane at a depth that dynamically updates based on the convergence point of the user's eyes. Like stability indicator 1704, although alignment indicator 1714 is displayed along with the environment being captured in the ongoing spatial video capture, alignment indicator 1714 does not appear in the captured media itself.

At FIG. 17D, HMD X700 displays alignment indicator 1714 at a location between viewpoint location 1708 and anchor location 1706 that is closer to viewpoint location 1708 than stability indicator 1704 is, such that the displacement between stability indicator 1704 and alignment indicator 1714 visually indicates the direction (but not necessarily the magnitude) of misalignment between the initial viewpoint and the current viewpoint. In some embodiments, when the viewpoint movement first exceeds the first alignment threshold (e.g., as the displacement surpasses 1.5°, 2°, and/or 2.3°), HMD X700 initializes alignment indicator 1714 at the same location as stability indicator 1704 (e.g., approximately 0.4° from anchor location 1706 for a first threshold viewpoint displacement of 2°). For example, when the viewpoint displacement exceeds the first alignment threshold, HMD X700 displays alignment indicator 1714 "popping out" towards viewpoint location 1708 from stability indicator 1704 (e.g., the initial position). As illustrated in FIG. 17D, when anchor location 1706 is displaced from viewpoint location 1708 by the second distance (e.g., an angular distance of 2.5°), HMD X700 displays alignment indicator 1714 approximately 1.5° from anchor location 1706 (e.g., while displaying stability indicator 1704 approximately 0.5° from anchor location 1706).

In some embodiments, the location where alignment indicator 1714 is displayed is determined based on one or more simulated physical properties of alignment indicator 1714, anchor location 1706, viewpoint location 1708, and/or the XR environment. In some embodiments, simulating the one or more simulated physical properties includes simulating alignment indicator 1714 following the movement of viewpoint location 1708 with some inertia, momentum, resistance and/or friction. In some embodiments, simulating the one or more simulated physical properties includes modeling alignment indicator 1714 as a virtual object with one or more simulated forces pulling alignment indicator 1714 towards viewpoint location 1708 and one or more simulated forces pulling alignment indicator 1714 towards anchor location 1706 and displaying alignment indicator 1714 at the equilibrium point. In some embodiments, the simulated forces may include displacement-dependent forces, such as gravitational forces, magnetic forces, electrostatic forces, and/or spring forces. For example, simulating the one or more simulated physical properties may include modeling a spring force between viewpoint location 1708 and alignment indicator 1714 and a gravitational force between anchor location 1706 and alignment indicator 1714. Thus, as viewpoint location 1708 moves further away from anchor location 1706, the spring force on alignment indicator 1714 (e.g., at its initial/previous location) increases, pulling alignment indicator 1714 closer to viewpoint location 1708 until the decreasing spring force equalizes with the decreasing gravitational force pulling alignment indicator 1714 in the direction of anchor location 1706. In some embodiments, HMD X700 may simulate the forces acting on alignment indicator 1714 in other ways, for instance, modeling simulated mass or simulated spring constants as functions of displacement (e.g., increasing the "mass" of viewpoint location 1708 and decreasing the "mass" of anchor location 1706 as displacement between the two increases).

At FIG. 17D, HMD X700 detects movement 1716 changing the current viewpoint of the ongoing spatial video capture, for example, a further horizontal panning movement (e.g., translation) to the left and/or a clockwise yaw rotation. As a result of movement 1716, at FIG. 17E, anchor location 1706 is displaced from viewpoint location 1708 by a third distance, for example, an angular distance of 8°. In response to detecting movement 1716, HMD X700 moves stability indicator 1704 and alignment indicator 1714 as described above, displaying stability indicator 1704 at a location closer to anchor location 1706 than alignment indicator 1714 is to anchor location 1706. For example, HMD X700 moves stability indicator 1704 to about 1.6° away from anchor location 1706 (e.g., approximately 20% of the displacement between anchor location 1706 and viewpoint location 1708) and moves alignment indicator 1714 to about 7.5° away from anchor location 1706 (e.g., based on the one or more simulated physical properties). In some embodiments, as the displacement between anchor location 1706 and viewpoint location 1708 increases, the displayed distance between stability indicator 1704 and alignment indicator 1714 increases (optionally, overall and/or in proportion to the third distance), for example, appearing as though the alignment indicator 1714 follows viewpoint location 1708 with decreasing resistance, decreasing simulated force pulling alignment indicator 1714 towards anchor location 1706, and/or increasing simulated force pulling alignment indicator 1714 towards viewpoint location 1708. In some embodiments, as the displacement between anchor location 1706 and viewpoint location 1708 increases, HMD X700 gradually increases the opacity of alignment indicator 1714 (e.g., indicated in FIG. 17E by the broader dashed outline of alignment indicator 1714) and/or decreases the opacity of stability indicator 1704. In some embodiments, in response to further changes in the current viewpoint that reverse the previous changes (e.g., viewpoint movements that move the spatial video capture closer to alignment with the initial viewpoint), HMD X700 also reverses some of all of the previous changes to alignment indicator 1714.

Figure 17E:
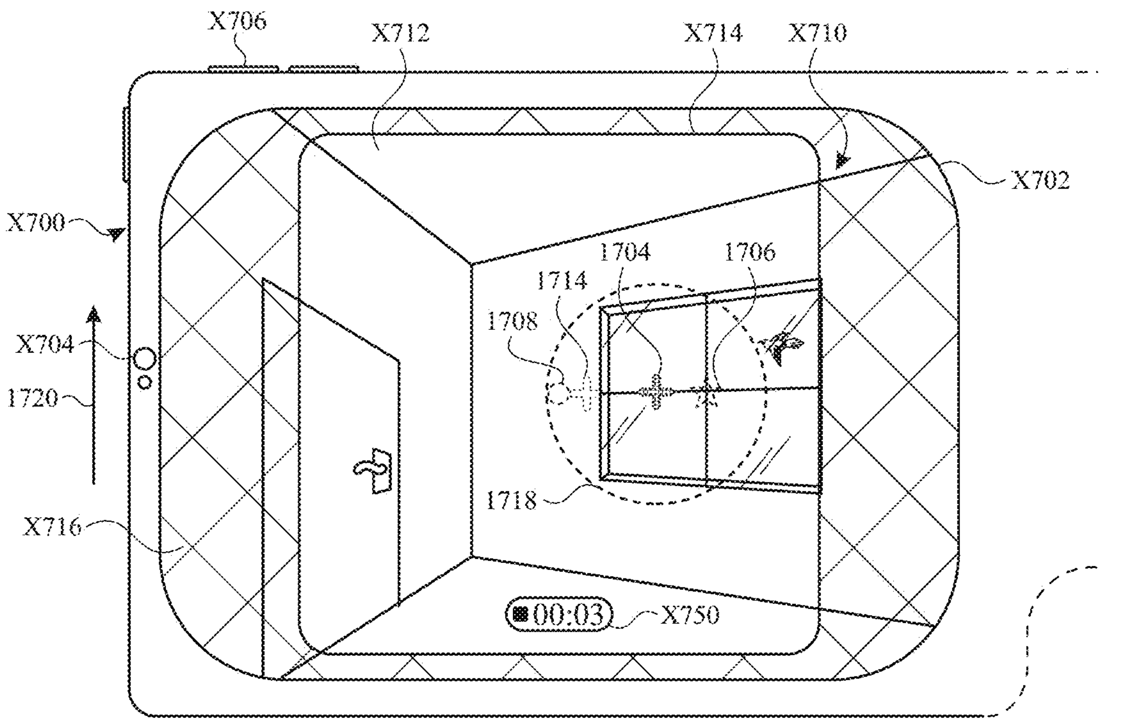

As illustrated in FIG. 17E, in response to the angular distance between anchor location 1706 and viewpoint location 1708 exceeding a second alignment threshold (e.g., 5°, 6.5°, and/or 7°) as a result of movement 1716, HMD X700 displays boundary indicator 1718, a circle virtual object superimposed over the environment being captured in the spatial video media (e.g., as described with respect to stability indicator 1704). In some embodiments, boundary indicator 1718 is initially displayed as a semi-transparent virtual object (e.g., depicted in FIG. 17E by the dashed line of boundary indicator 1718).

HMD X700 displays boundary indicator at a location centered around stability indicator 1704 (e.g., about 1.6° away from anchor location 1706) and with dimensions that visually indicate a "high motion" boundary to the user (e.g., 9°, 10°, and/or 12°). For example, if the movement of the viewpoint during capture has moved the current viewpoint (e.g., represented by viewpoint location 1708) out of alignment with the initial viewpoint (e.g., represented by anchor location 1706) by more than 10°, the ongoing spatial video capture is classified as an "unstable" or "high motion" video capture. Accordingly, to indicate the "high motion" boundary, boundary indicator 1718 is displayed with an initial radius that approximates the radius of the "high motion" boundary (e.g., 7.5°, 8.5°, and/or 10°). For example, for a "high motion" boundary radius of 10° from anchor location 1706, boundary indicator 1718 is displayed with a radius of approximately 8°, such that the point of boundary indicator 1718 farthest from anchor location 1706 falls at the edge of the "high motion" boundary radius (e.g., 9.6° away from anchor location 1706). Like stability indicator 1704 and alignment indicator 1714, although boundary indicator 1718 is displayed along with the environment being captured in the ongoing spatial video capture, boundary indicator 1718 does not appear in the captured media itself.

At FIG. 17E, HMD X700 detects movement 1720 changing the current viewpoint of the ongoing spatial video capture, for example, a vertical panning movement (e.g., translation) to the left and/or an upwards pitch rotation. As a result of movement 1720, at FIG. 17F, anchor location 1706 is displaced from viewpoint location 1708 by a fourth distance, for example, an angular distance of 9°. In response to detecting movement 1720, HMD X700 moves stability indicator 1704 and alignment indicator 1714 as described above, for example, moving stability indicator 1704 to about 1.8° away from anchor location 1706 (e.g., approximately 20% of the displacement between anchor location 1706 and viewpoint location 1708) and moving alignment indicator 1714 to about 8.5° away from anchor location 1706 (e.g., based on the one or more simulated physical properties). HMD X700 moves stability indicator 1704 and alignment indicator 1714 to remain colinear with anchor location 1706 and viewpoint location 1708, moving stability indicator 1704 down by a larger amount with respect to the display and moving alignment indicator 1714 down by a smaller amount with respect to the display. Accordingly, as movement 1720 includes movement in a different direction than the previous movements (e.g., the overall direction of movement 1710, movement 1712, and movement 1716), the angle between stability indicator 1704 and alignment indicator 1714 and anchor location 1706 (or viewpoint location 1708) also changes.

In response to movement 1720, HMD X700 moves boundary indicator 1718, for example, so that it remains centered around stability indicator 1704 (e.g., boundary indicator 1718 is "locked" to stability indicator 1704). As illustrated in FIG. 17E, HMD X700 also increases the opacity of both boundary indicator 1718 and alignment indicator 1714 in response to movement 1716 (e.g., indicated in FIG. 17F by the solid outlines of boundary indicator 1718 and alignment indicator 1714) and/or decreases the opacity of stability indicator 1704.

Figure 17F:
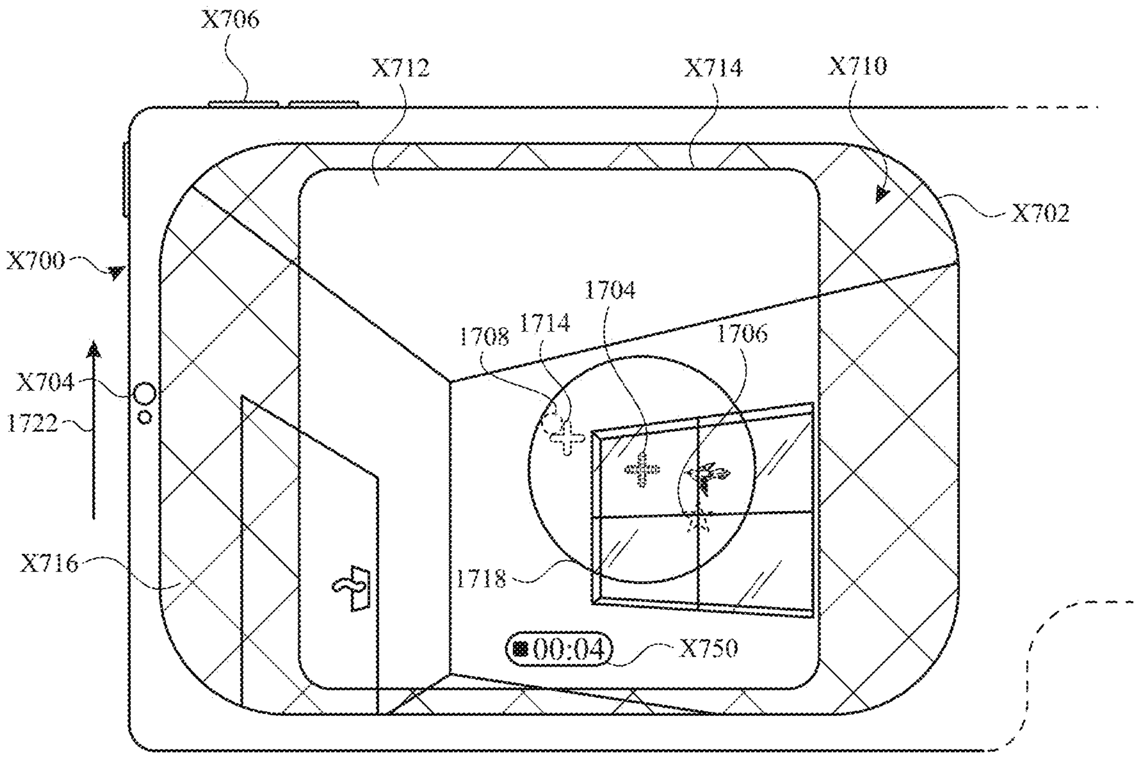

At FIG. 17F, HMD X700 detects movement 1722 changing the current viewpoint of the ongoing spatial video capture, for example, a further vertical panning movement (e.g., translation) to the left and/or an upwards pitch rotation. As a result of movement 1722, at FIG. 17G, anchor location 1706 is displaced from viewpoint location 1708 by a fifth distance, for example, an angular distance of 10°. In response to detecting movement 1722, HMD X700 moves stability indicator 1704, boundary indicator 1718, and alignment indicator 1714 as described above, for example, moving stability indicator 1704 to about 2° away from anchor location 1706 in the direction of viewpoint location 1708, moving boundary indicator 1718 to remain centered around stability indicator 1704, and moving alignment indicator 1714 to about 9.9° away from anchor location 1706 in the direction of viewpoint location 1708.

Figure 17G:
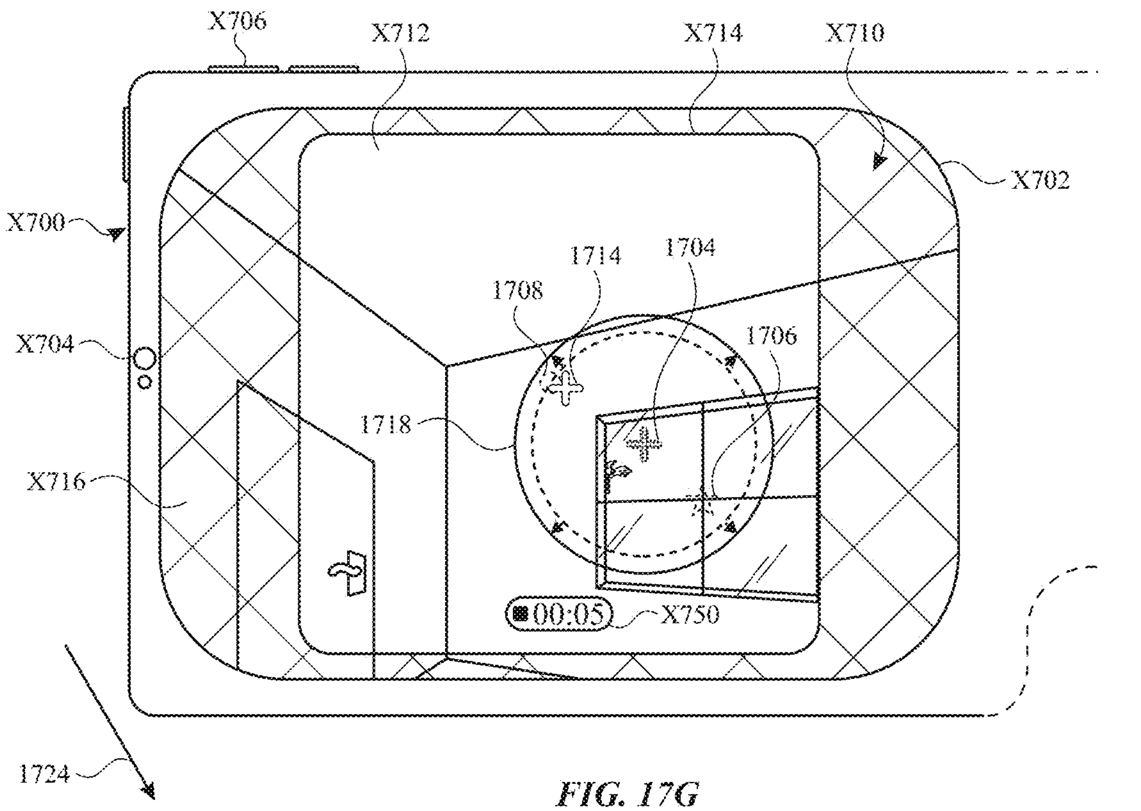

As illustrated in FIG. 17G, as alignment indicator 1714 approaches the edge of boundary indicator 1718, indicating that misalignment between the current viewpoint (e.g., represented by viewpoint location 1708) and the initial viewpoint (e.g., represented by anchor location 1706) is nearing the "high motion" boundary of 10°, HMD X700 slightly increases the dimensions of boundary indicator 1718. For example, HMD X700 increases the radius of boundary indicator 1718 from 8° to 8.2°, appearing to "stretch" slightly in response to alignment indicator 1714 "pushing" at the boundary.

Figure 17H:
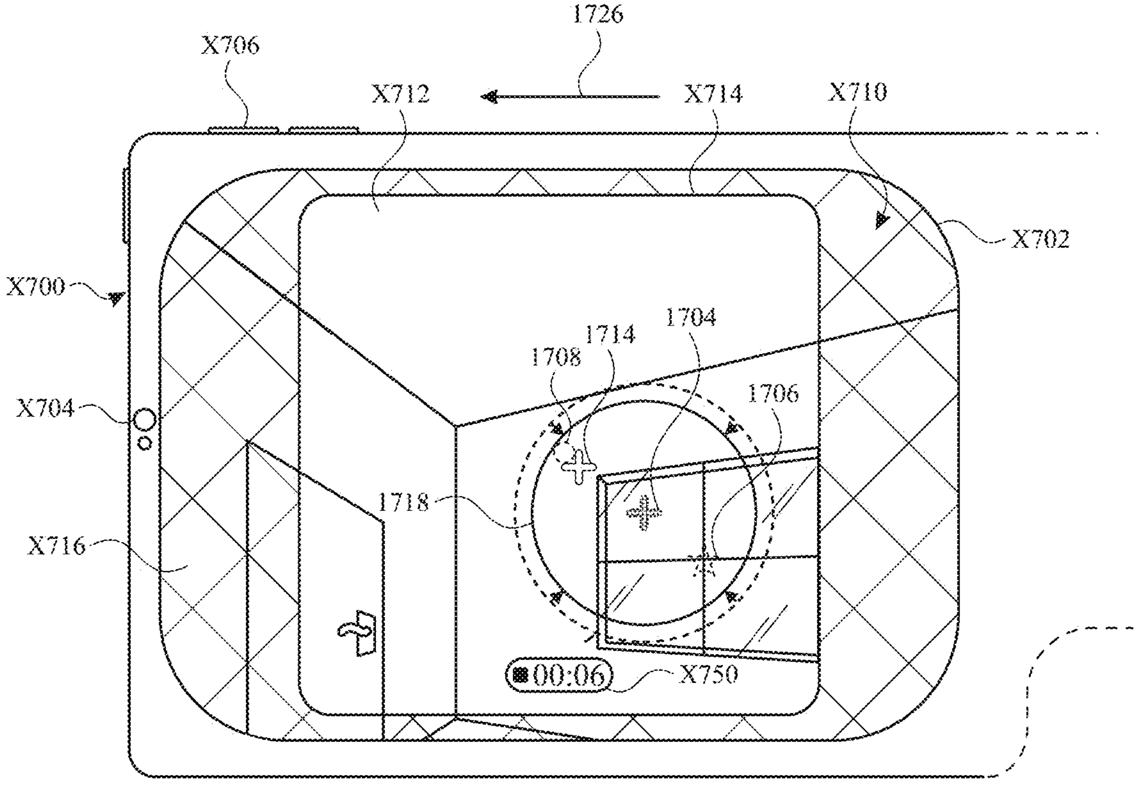

At FIG. 17G, HMD X700 detects movement 1724 changing the current viewpoint of the ongoing spatial video capture, for example, panning and/or rotating the viewpoint down and to the right. As a result of movement 1724, at FIG. 17H, the displacement between anchor location 1706 and viewpoint location 1708 decreases to a fifth distance, for example, reducing to an angular distance of 9°. In response to detecting movement 1724, HMD X700 moves stability indicator 1704, boundary indicator 1718, and alignment indicator 1714 as described above, for example, moving stability indicator 1704 to about 1.8° away from anchor location 1706 (e.g., approximately 20% of the displacement between anchor location 1706 and viewpoint location 1708), moving boundary indicator 1718 to remain centered around stability indicator 1704, and moving alignment indicator 1714 to about 8.5° away from anchor location 1706 (e.g., based on the one or more simulated physical properties). In some embodiments, as the displacement between anchor location 1706 and viewpoint location 1708 decreases, the displayed distance between stability indicator 1704 and alignment indicator 1714 decreases (overall and/or in proportion to the fifth distance), for example, increasing simulated force pulling alignment indicator 1714 towards anchor location 1706, and/or decreasing simulated force pulling alignment indicator 1714 towards viewpoint location 1708. As illustrated in FIG. 17H, as alignment indicator 1714 retreats from the edge of boundary indicator 1718, HMD X700 decreases the dimensions of boundary indicator 1718, for example, reversing the "stretching" of boundary indicator 1718 and returning to a radius of 8°.

At FIG. 17H, HMD X700 detects movement 1726 changing the current viewpoint of the ongoing spatial video capture, for example, panning and/or rotating the viewpoint to the left. As a result of movement 1724, at FIG. 17I, the displacement between anchor location 1706 and viewpoint location 1708 increases to a sixth distance, for example, an angular distance of 10°. In response to detecting movement 1726, HMD X700 moves stability indicator 1704, boundary indicator 1718, and alignment indicator 1714 and increases the dimensions of boundary indicator 1718 as described with respect to FIG. 10G.

Figure 17I:
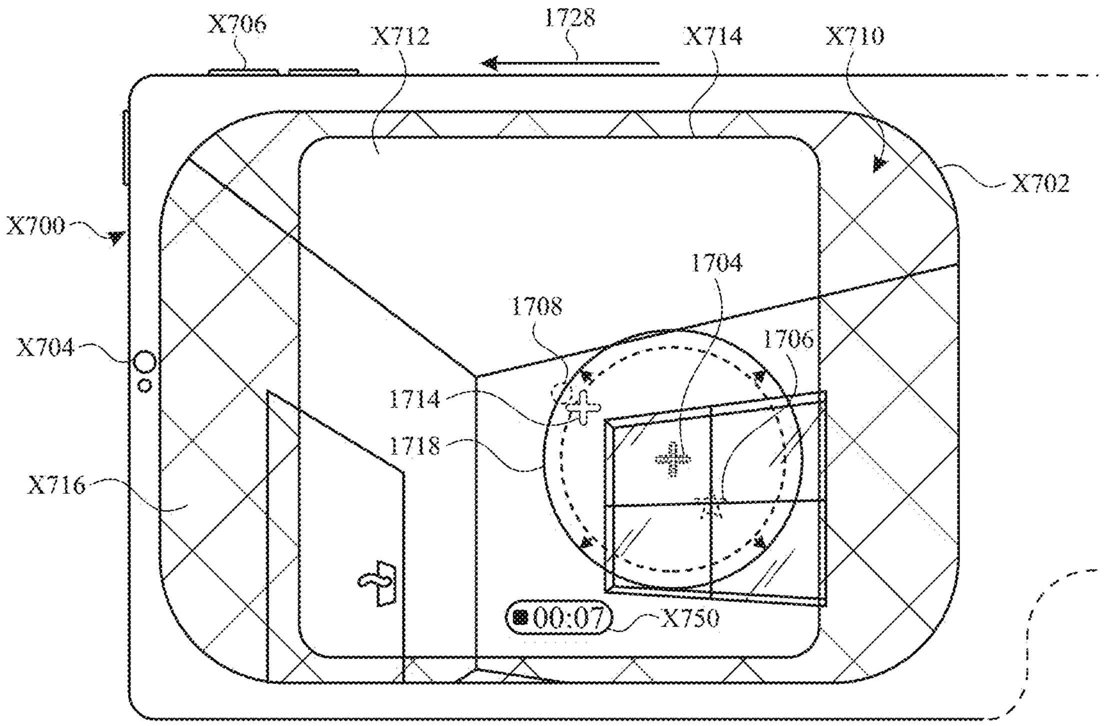
Figure 17J:
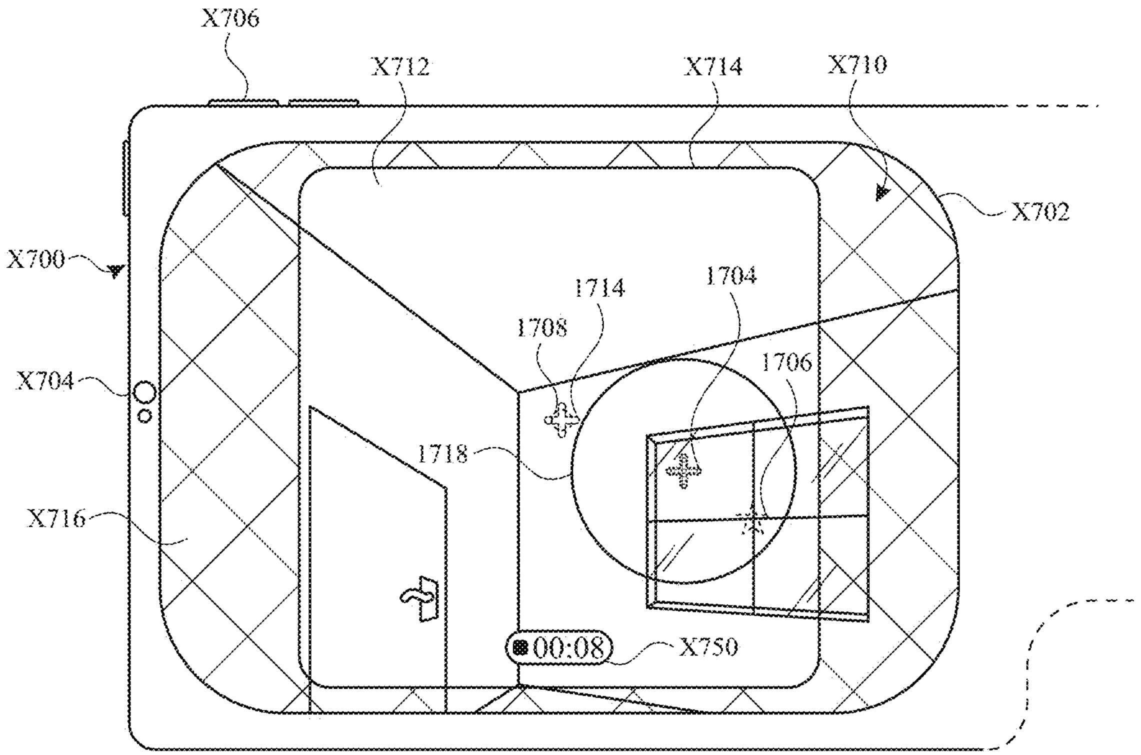

At FIG. 17I, HMD X700 detects movement 1728 changing the current viewpoint of the ongoing spatial video capture, for example, further panning and/or rotating the viewpoint to the left. As a result of movement 1728, at FIG. 17J, the displacement between anchor location 1706 and viewpoint location 1708 increases to a seventh distance, for example, an angular distance of 11°. Accordingly, as the "high motion" boundary of 10° has been crossed, at FIG. 17J, the spatial video capture is classified as "unstable" or "high-motion" video capture. In some embodiments, once the spatial video capture is classified as unstable or high-motion video capture, viewing options for the captured spatial media will be presented differently, for instance, hiding an expanded viewing option in a menu and/or presenting the expanded viewing option with a warning that the high-motion characteristics of the spatial media may cause physical discomfort, as discussed with respect to FIGS. 19A-19M, below. As illustrated in FIG. 17J, in response to detecting movement 1724, HMD X700 displays alignment indicator 1714 at a location representing viewpoint location 1708 (e.g., alignment indicator 1714 is displaced from anchor location 1706 by the seventh distance). For example, alignment indicator 1714 may be "locked" to viewpoint location 1708 (e.g., as a viewpoint-locked virtual object) during high motion video capture, or the simulated physics of alignment indicator 1714 may model alignment indicator 1714 as following viewpoint location 1708 with no resistance and/or with simulated forces that keep alignment indicator 1714 pinned to viewpoint location 1708.

Figure 17K:
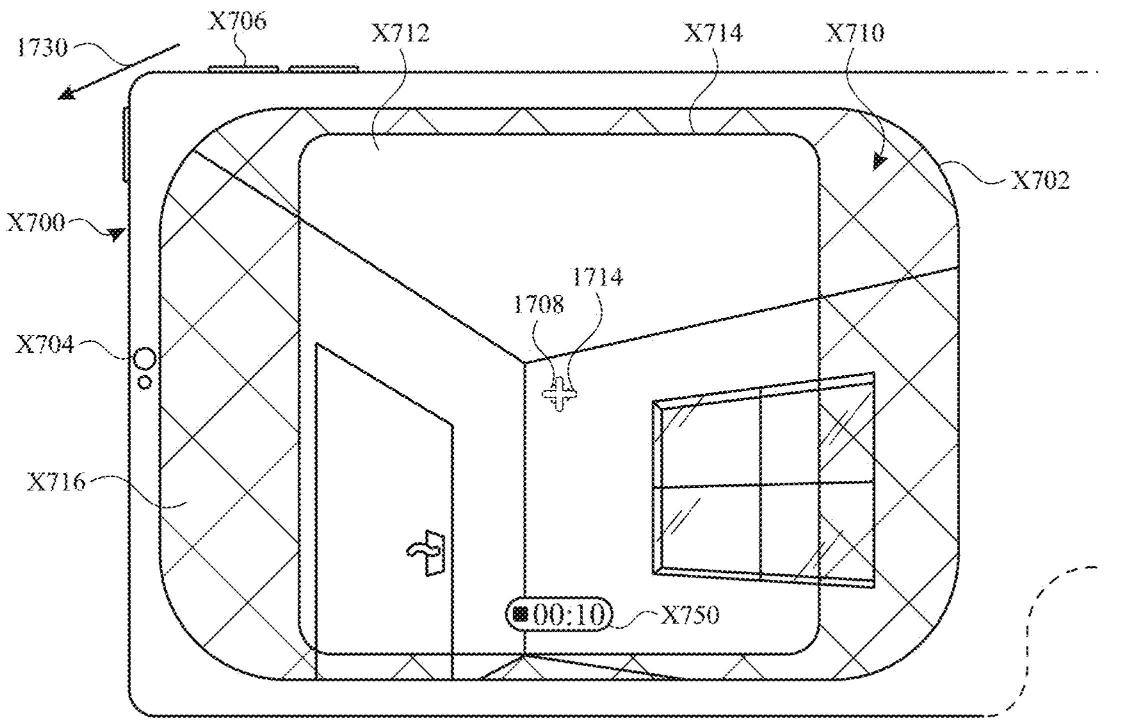

In some embodiments, in response to detecting movement 1724, HMD X700 initially moves stability indicator 1704 and boundary indicator 1718, as described above. Additionally, HMD X700 initially decreases the dimensions of boundary indicator 1718, for example, "snapping back" to a radius of 8°. Then, as the "high motion" boundary of 10° has been crossed, HMD X700 stops displaying stability indicator 1704 and boundary indicator 1718, as illustrated in FIG. 17K. In some embodiments, once "high motion" boundary of 10° has been crossed, anchor location 1706 is de-established as a reference or target point for HMD X700 to define "stable" or "low-motion" spatial video capture, and HMD X700 does not re-establish a reference/target point until the spatial video capture meets stability criteria. For example, the spatial video capture may meet the stability criteria when vertical translation, horizontal translation, yaw rotation, and/or pitch rotation movements of the viewpoint of the spatial video capture do not exceed a threshold angular velocity (e.g., 0.1°/s, 0.2°/s, and/or 0.5°/s) and/or a threshold linear velocity (e.g., 0.15 m/s, 0.3 m/s, and/or 1 m/s) for a threshold period of time (e.g., at least 2.5, 3, and/or 5 seconds), regardless of the displacement between viewpoint location 1708 and the original target point, anchor location 1706. Accordingly, as illustrated in FIG. 17K, although the movement of the current viewpoint temporarily stops between FIGS. 17J and 17K (e.g., for 2 seconds), HMD X700 does not re-establish a stable reference or target point or display a visual indication (e.g., such as stability indicator 1704 and/or boundary indicator 1718) of a corresponding target viewpoint.

HMD X700 continues displaying alignment indicator 1714 during high motion video capture. In particular, as illustrated at FIG. 17K, HMD X700 maintains displaying alignment indicator 1714 aligned with viewpoint location 1708 (e.g., as a viewpoint-locked virtual object). Accordingly, during high motion video capture, alignment indicator 1714 continues to visually indicate the viewpoint movement, as the location of alignment indicator 1714 relative to the environment changes with the changes to the current viewpoint (e.g., visually indicating the center of the current viewpoint of the environment).

At FIG. 17K, HMD X700 detects movement 1730 changing the current viewpoint of the ongoing spatial video capture, for example, panning and/or rotating the viewpoint down and to the left. In response to movement 1730, at FIG. 17L, HMD X700 maintains displaying alignment indicator 1714 in alignment with viewpoint location 1708.

Figure 17L:
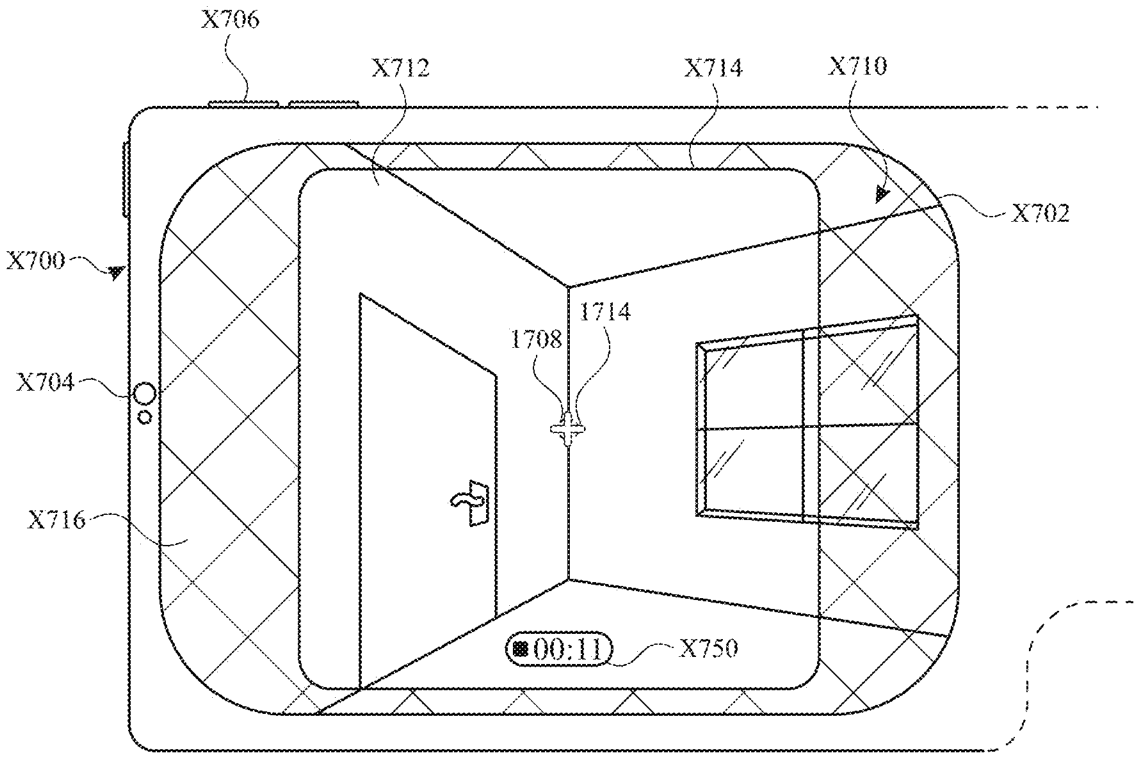
Figure 17M:
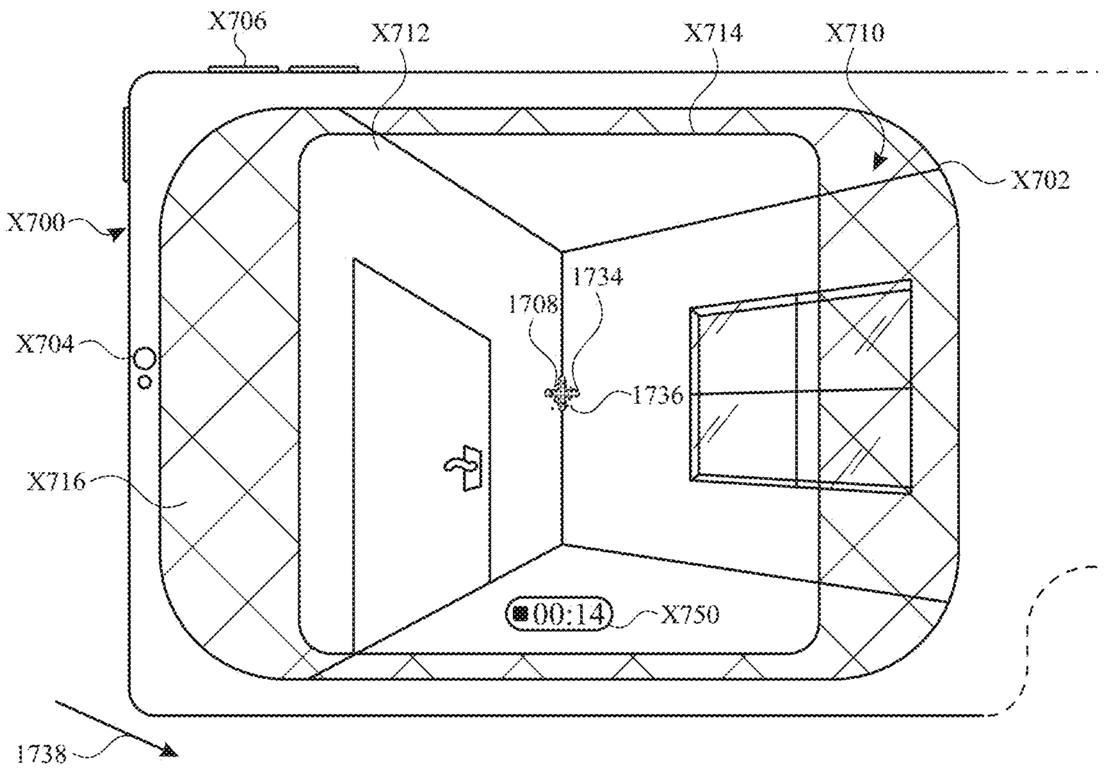

At FIG. 17M, as the viewpoint has not moved from the viewpoint illustrated in FIG. 17L, the spatial video capture meets the stability criteria, for example, having continued for three seconds without exceeding an angular velocity of 0.2°/s and/or linear velocity of 0.3 m/s. Accordingly, as illustrated in FIG. 17M, HMD X700 displays stability indicator 1734 as described above with respect to stability indicator 1704, for example, as an opaque virtual object of the same color as stability indicator 1704 (e.g., yellow, and/or any other initial color of spatial indicator 1704). HMD X700 initially displays stability indicator 1734 at anchor location 1736, which serves as a new reference or target point to define "stable" or "low-motion" spatial video capture. As described with respect to the beginning of the spatial video capture at FIG. 17B, when the spatial video capture meets the stability criteria at FIG. 17M, anchor location 1736 is initially aligned with viewpoint location 1708 (e.g., with no displacement between anchor location 1736 and viewpoint location 1708).

Once the spatial video capture satisfies the stability criteria and HMD X700 re-establishes a stable viewpoint, in response to further viewpoint movement, HMD X700 displays stability guidance in the manner described above with respect to stability indicator 1704, alignment indicator 1714, and boundary indicator 1718, but the displacement considered when moving and changing the stability guidance indicators is the displacement between anchor location 1736 (e.g., the current reference point) and viewpoint location 1708 instead of the displacement between anchor location 1706 (e.g., the former reference point) and viewpoint location 1708.

Figure 17N:
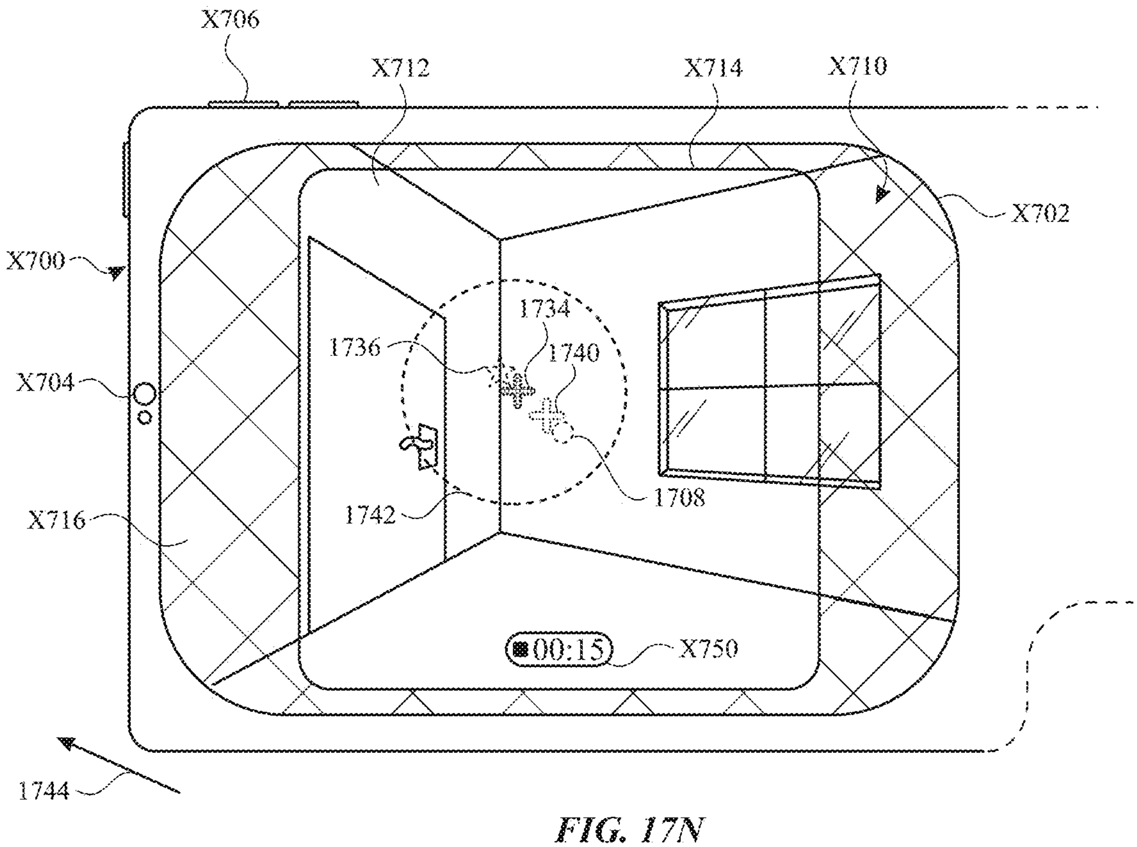

In particular, at FIG. 17M, HMD X700 detects movement 1738 changing the current viewpoint of the ongoing spatial video capture, for example, panning and/or rotating the viewpoint down and to the right. As a result of movement 1738, at FIG. 17N, the displacement between anchor location 1736 and viewpoint location 1708 increases, e.g., to an angular distance of 7°. In response to detecting movement 1738, at FIG. 17N, HMD X700 moves stability indicator 1704 to about 1.4° away from anchor location 1736 (e.g., approximately 20% of the displacement between anchor location 1736 and viewpoint location 1708) and decreases the opacity of stability indicator 1704 to indicate the misalignment from the stable viewpoint (e.g., the newly-established stable viewpoint). As the displacement between anchor location 1736 and viewpoint location 1708 exceeds the first alignment threshold (e.g., 2°), HMD X700 additionally displays alignment indicator 1740 as described above with respect to alignment indicator 1714, for example, as a semi-transparent virtual object of the same color as alignment indicator 1714 (e.g., white, and/or any other initial color of alignment indicator 1714). As illustrated in FIG. 17N, HMD X700 displays alignment indicator 1740 at a location between viewpoint location 1708 and anchor location 1736 that is closer to viewpoint location 1708 stability indicator 1734 is (e.g., based on the one or more simulated physical properties), for example, approximately 5° from anchor location 1736. As the displacement between anchor location 1736 and viewpoint location 1708 exceeds the second alignment threshold (e.g., 6.5°), HMD X700 additionally displays boundary indicator 1742 as described above with respect to boundary indicator 1718, for example, as a semi-transparent virtual object with an initial radius of 8° centered around anchor location 1736.

At FIG. 17N, HMD X700 detects movement 1744 changing the current viewpoint of the ongoing spatial video capture, for example, panning and/or rotating the viewpoint up and to the left. As a result of movement 1744, at FIG. 17O, the displacement between anchor location 1736 and viewpoint location 1708 decreases, e.g., to an angular distance of 4°. In response to detecting movement 1738, at FIG. 17O, HMD X700 moves stability indicator 1734 to about 0.8° away from anchor location 1736 and increases the opacity of stability indicator 1734 to indicate that movement 1744 has moved the current viewpoint closer to alignment with the stable viewpoint. As the displacement between anchor location 1736 and viewpoint location 1708 still exceeds a third alignment threshold (e.g., 1°), HMD X700 continues displaying alignment indicator 1740 as described above with respect to alignment indicator 1714, for example, moving alignment indicator 1740 to a location approximately 3° from anchor location 1736 (e.g., based on the one or more simulated physical properties) and decreasing the opacity of alignment indicator 1740. As the displacement between anchor location 1736 and viewpoint location 1708 no longer exceeds the second alignment threshold (e.g., 5°, 6.5°, and/or 7°), HMD X700 ceases displaying boundary indicator 1742.

Figure 17O:
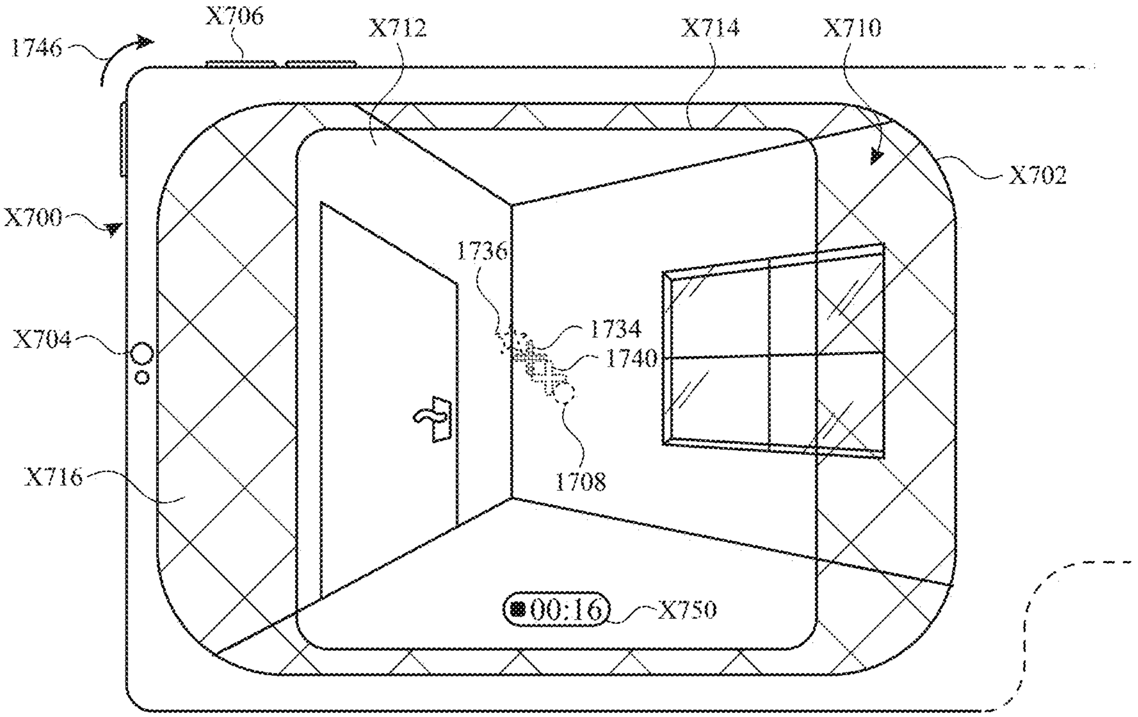

At FIG. 17O, HMD X700 detects movement 1746 changing the viewpoint of the spatial video capture, for example, a clockwise tilt and/or forward longitudinal translation (e.g., moving straight forward in the environment). In some embodiments, movements that do not include yaw rotation, pitch rotation, vertical translation, and horizontal translation components, such as movement 1746, are not considered in classifying video capture as "high-motion" or "low-motion." For example, tilt rotations and longitudinal translations do not change the angular distance between anchor location 1736 and viewpoint location 1708. Accordingly, as illustrated at FIG. 17P, following movement 1746, HMD X700 moves stability indicator 1734 and alignment indicator 1740 to the extent needed to remain aligned between anchor location 1736 (e.g., which is environment-locked) and viewpoint location 1708 (e.g., which is viewpoint locked), while maintaining the previous angular distance between stability indicator 1734 and alignment indicator 1740, along with any other indicia of alignment such as the previous opacity levels.

Figure 17P:
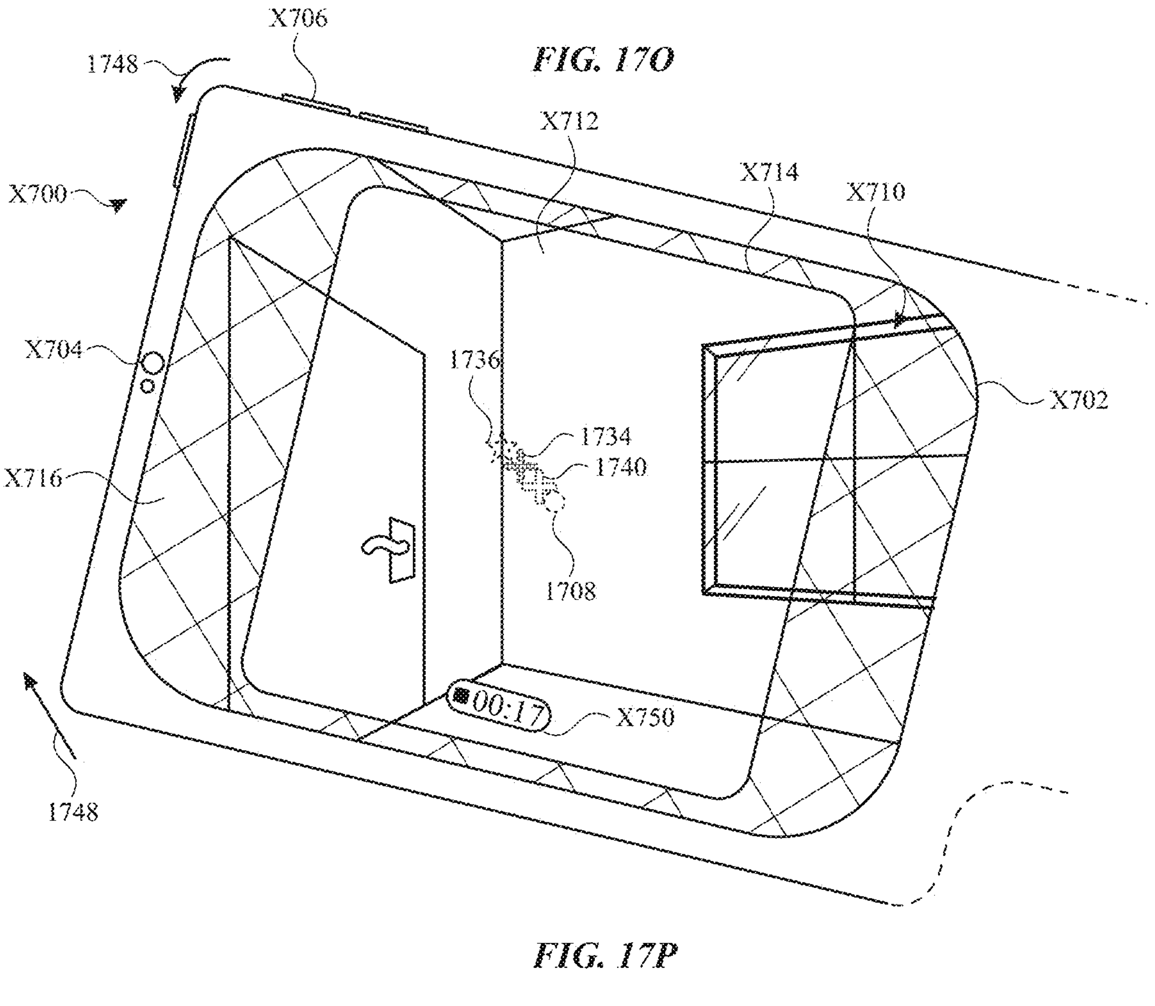

At FIG. 17P, HMD X700 detects movement 1748 changing the viewpoint of the spatial video capture, for example, a counterclockwise tilt and panning and/or rotating movement up and to the left. As a result of movement 1748, at FIG. 17Q, the displacement between anchor location 1736 and viewpoint location 1708 decreases, e.g., to an angular distance of 0.5°. In response to detecting movement 1748, at FIG. 17Q, HMD X700 moves stability indicator 1734 to about 0.1° away from anchor location 1736 and increases the opacity of stability indicator 1704 to indicate that movement 1744 has moved the current viewpoint closer to alignment with the stable viewpoint.

Figure 17Q:
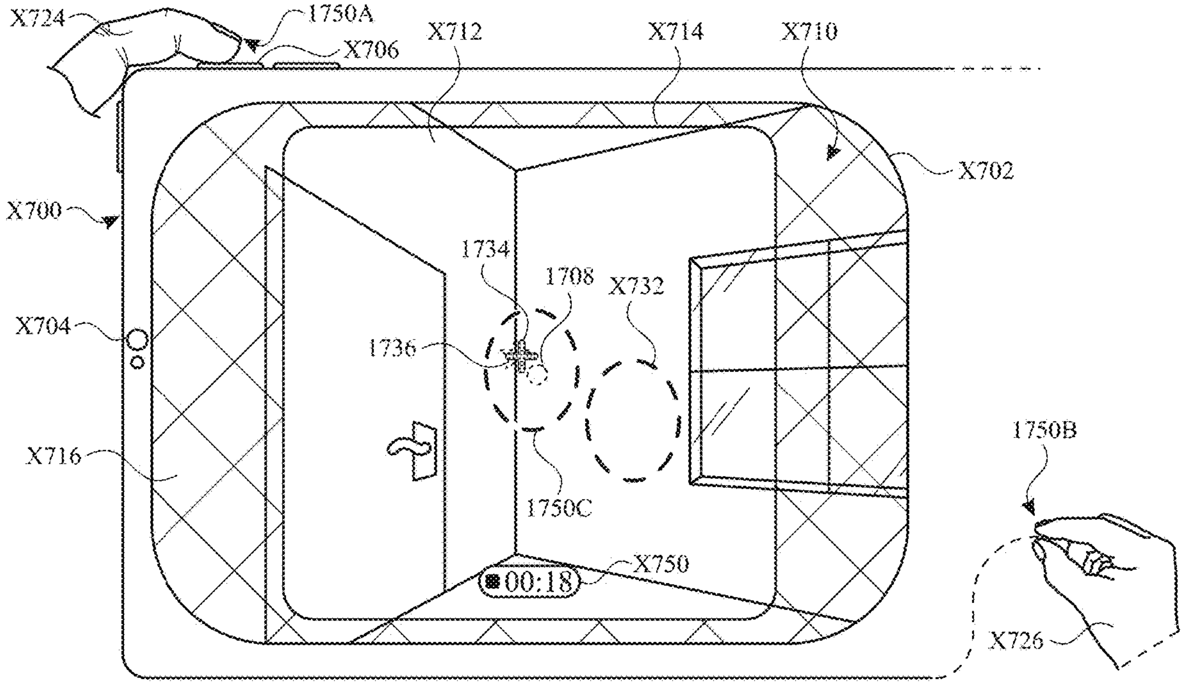

As a result of movement 1748, the displacement between anchor location 1736 and viewpoint location 1708 falls below the third alignment threshold (e.g., 1°). In some embodiments, as the displacement between anchor location 1736 and viewpoint location 1708 falls from the first alignment threshold (e.g., 2°) where alignment indicator 1740 is initially displayed to the third alignment threshold, HMD X700 displays alignment indicator 1740 at a location between stability indicator 1734 and viewpoint location 1708 (e.g., based on the one or more simulated physical properties). Then, when the displacement between anchor location 1736 and viewpoint location 1708 falls below the third alignment threshold, HMD X700 moves alignment indicator 1740 to "snap" to the location of stability indicator 1734, indicating that the movement of the viewpoint has substantially realigned the current viewpoint with the target viewpoint. As illustrated in FIG. 17Q, in response to movement 1748, HMD X700 then ceases displaying alignment indicator 1740. In some embodiments, HMD X700 outputs other indications that the movement of the viewpoint has substantially realigned the current viewpoint with the target viewpoint, such as displaying a green checkmark icon, displaying a glow animation, providing a haptic output, and/or playing a chime or other audio output. In some embodiments, HMD X700 may instead cease displaying stability indicator 1734 when the displacement between anchor location 1736 and viewpoint location 1708 falls below the third alignment threshold, e.g., continuing to display alignment indicator 1740 about 0.1° away from anchor location 1736 (e.g., where stability indicator 1734 had been located).

At FIG. 17Q, HMD X700 detects a potential media capture input, such as button press input 1750A of hardware button X706, air gesture input 1750B (e.g., a pinch air gesture), and/or tap input 1750C, while gaze X732 is directed to a central region of camera viewfinder X712 (e.g., near viewpoint location 1708). In response, at FIG. 17R, HMD X700 ceases capturing spatial video and displays captured media icon X738 with a thumbnail of the completed spatial video media item (e.g., as described with respect to FIGS. 7O-7Q). At FIG. 17R, HMD X700 detects input 1752 requesting to view the spatial video media item (e.g., a tap, gesture, air gesture, or other input directed to captured media icon X738), and, in response, displays a representation of the spatial video media item, for example, as described below with respect to FIGS. 19A-19M.

Additional descriptions regarding FIGS. 17A-17R are provided below in reference to method 1800 described with respect to FIG. 18.

FIG. 18 is a flow diagram of an exemplary method 1800 for displaying a camera preview for media capture with viewpoint stability guidance, in some embodiments. In some embodiments, method 1800 is performed at a computer system (e.g., 101, 1-100, 1-200, 3-100, 6-100, 6-200, 6-300, 6-400, 11.1.2-100, 700, X700, and/or 702) (e.g., a mobile computing device (e.g., a phone and/or tablet); e.g., a head-mounted display device) that is in communication with a display generation component (e.g., 1-102, 1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200, 11.3.2-204, 708, and/or X702) (e.g., a display controller; a touch-sensitive display system; a display (e.g., integrated and/or connected), a 3D display, a transparent display, a projector, a heads-up display, and/or a head-mounted display) and one or more cameras (e.g., 6-106, 6-114, 6-116, 6-118, 6-120, 6-122, 6-306, 6-416, 11.1.1-104*a-b*, 11.1.2-110*a-f*, 11.3.2-100, 11.3.2-106, and/or 11.3.2-206, 704A, 704B, and/or X704) (in some embodiments, a camera array/stereo camera for spatial capture, where the first camera and the second camera are located a fixed distance apart, such that the perspective of the first camera is different from the perspective of the second camera and thus at least a portion of a field of view of the first camera is outside of a field of view of the second camera; in some embodiments, the computer system further includes one or more rear (user-facing) cameras and/or one or more forward (environment-facing) cameras) (in some embodiments, the computer system include one or more sensors (e.g., 1-356, 1-456, 6-102, 6-106, 6-108, 6-110, 6-112, 6-114, 6-116, 6-118, 6-120, 6-122, 6-124, 6-126, 6-128, 6-202, 6-203, 6-302, 6-303, 6-306, 6-402, 6-416, **11.1.1-104*a*, 11.1.1-104*b*, 11.1.2-110*a-f*, 11.3.2-100, 11.3.2-106, 11.3.2-206, and/or X704) (e.g., as location sensors, motion sensors, orientation sensors, and/or depth sensors). In some embodiments, method 1800 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 1800** are, optionally, combined and/or the order of some operations is, optionally, changed.

The computer system (e.g., 101, 1-100, 1-200, 3-100, 6-100, 6-200, 6-300, 6-400, 11.1.2-100, 700, X700, and/or 702), while capturing (1802) spatial video media of an environment (e.g., a physical and/or virtual environment) using the one or more cameras (in some embodiments, while displaying a camera user interface with a camera preview, as described above (e.g., with respect to FIGS. 7A-7AB)), wherein the spatial video media includes a first video component corresponding to a viewpoint of a right eye and a second video component, different from the first video component, corresponding to a viewpoint of a left eye that when viewed concurrently create an illusion of a spatial representation of the environment (e.g., concurrently viewing the first video component and the second video component creates an illusion of a three-dimensional representation of the video media; e.g., viewing different images with the left and right eye creates the illusion of depth by simulating parallax of the image contents), displays (1804), via the display generation component (e.g., 1-102, **1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200, 11.3.2-204, 708, and/or X702), a virtual indicator element (e.g., 1704 and/or 1734) (e.g., an icon or glyph, such as crosshairs, a dot, and/or a small shape; in some embodiments, the indicator is displayed with a first color (e.g., yellow and/or another color); in some embodiments, the indicator is fully environment-locked (e.g., the displayed location of the indicator is locked at the anchor location); in some embodiments, the indicator is partially environment-locked (e.g., the displayed location of the indicator moves with respect to the anchor location)) of an anchor location in the environment (e.g., 1706 and/or 1736) that represents a respective viewpoint (e.g., the viewpoint illustrated in FIG. 17B) (e.g., a starting and/or stable viewpoint) corresponding to the spatial video media (e.g., as illustrated in FIGS. 17B-17J and 17M-17**Q), wherein the virtual indicator element is displayed while the environment is visible via the display generation component. (In some embodiments, while capturing the spatial video media from the respective viewpoint, a representation of a portion of the environment that includes the anchor location is visible via the display generation component; in some embodiments, while capturing the spatial video media from the respective viewpoint, the anchor location includes a reference point of the portion of the environment; in some embodiments, the respective viewpoint is a viewpoint at a specific time (e.g., an initial viewpoint (e.g., the viewpoint from which the spatial video media is being captured when the video media capture is initiated) and/or a viewpoint from which the spatial media is being captured when the viewpoint from which the spatial media is being captured meets stability criteria); in some embodiments, the respective viewpoint is a stable viewpoint (e.g., a viewpoint from which the spatial media is being captured that remains stable (e.g., not moving more than a threshold amount and/or with more than a threshold velocity for a threshold amount of time)); in some embodiments, the viewpoint from which the spatial media is being captured represents a viewpoint of a user (e.g., of an HMD with cameras that substantially align with the user's eyes, and move as the user moves their head, neck, and body); in some embodiments, the viewpoint from which the spatial media is being captured represents a viewpoint of the one or more cameras.)

The computer system, while displaying (1806) the virtual indicator element while the environment is visible via the display generation component, detects (1808) a first change in a viewpoint from which the spatial video media is being captured (e.g., 1710, 1712, 1716, 1720, 1722, 1724, 1726, 1728, 1738, 1744, and/or 1748) (e.g., movement (e.g., rotation and/or translation) of the one or more cameras with respect to the environment; in some embodiments, detected using one or more sensors (e.g., depth sensors, location sensors, and/or other sensors) of the computer system; in some embodiments, where media is being captured with an HMD, due to movement of the user's head, neck, and body; in some embodiments, the first change in the viewpoint is a translation or rotation in one or more directions (e.g., only horizontal, vertical, pitch, and/or yaw movements are considered) and not in one or more other directions (e.g., longitudinal and/or tilt movements are not considered)).

The computer system, in response to detecting (1810) the first change in the viewpoint from which the spatial video media is being captured, changes an appearance of the virtual indicator element (e.g., 1704 and/or 1734) (in some embodiments, a change in color, transparency, size, and/or display location (in some embodiments, the display location changes relative to the environment visible via the display generation component; in some embodiments, the display location changes relative to the display generation component (e.g., to remain fully or partially environment-locked)) to indicate the respective viewpoint (e.g., the starting and/or stable viewpoint) corresponding to the spatial video media (e.g., as illustrated in FIGS. 17C-17K and 17N-17Q) (e.g., after the viewpoint from which the spatial video media is being captured has changed; in some embodiments, the first change to the appearance of the virtual indicator element indicates that the viewpoint from which the spatial video media is being captured is no longer in alignment with the respective viewpoint; in some embodiments, the first change to the appearance of the virtual indicator element indicates that the viewpoint from which the spatial video media is being captured has returned to alignment with the respective viewpoint).

Displaying a virtual indicator element (e.g., anchor indicator) with an appearance that updates in response to changes to the viewpoint of an ongoing spatial media capture media in order to indicate an anchor location in the environment being captured provides improved visual feedback about a state of the computer system, which assists the user with composing media capture events and reduces the risk that transient media capture opportunities are miscaptured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, indicating a steady target location (e.g., anchor location) with the virtual indicator element intuitively prompts and guides a user to capture steady spatial media without visually uncomfortable and/or unwanted movement of the viewpoint.

In some embodiments, changing the appearance of the virtual indicator element to indicate the respective viewpoint corresponding to the spatial video media includes changing the appearance of the virtual indicator element relative to the environment visible via the display generation component (e.g., as illustrated in FIGS. 17C-17K and 17N-17Q) (e.g., changing a color (e.g., increasing or decreasing visual prominence with respect to the environment), transparency (e.g., allowing more or less of the environment to be seen underneath), size (e.g., growing or shrinking relative to the appearance of the environment), and or location (e.g., displaying the virtual indicator element at a location that appears to change with respect to the environment)).

In some embodiments, displaying the virtual indicator element includes displaying the virtual indicator element at a virtual location (e.g., the virtual indicator element is rendered at a particular location (in some embodiments, at the focal/convergence location of the user's viewpoint; in some embodiments, at a predetermined location (e.g., 0.5, 1, or 2 meters away from the user's viewpoint); in some embodiments, in a region where other virtual UI elements are rendered) in the extended reality (XR) environment) in the environment (e.g., displaying the virtual indicator element overlaying a location of the environment that corresponds to the virtual location; in some embodiments, displaying the virtual indicator element as an XR object at the virtual location). In some embodiments, the virtual indicator element is not included in the spatial video media (e.g., as illustrated by spatial media items 1904 and 1904A, discussed below with respect to FIGS. 19A-19M) (e.g., capturing the spatial video media of the environment does not include capturing the virtual indicator element; e.g., the virtual indicator element is not displayed or rendered while viewing the captured spatial video media of the environment). Displaying the virtual indicator element in the environment (e.g., as an XR object) without capturing it in the spatial video media provides improved visual feedback about a state of the computer system, assisting the user with composing media capture events, and reducing the risk that transient media capture opportunities are mis-captured (e.g., due to visually uncomfortable and/or unwanted camera movement) without visually obscuring the captured media.

In some embodiments, changing the appearance of the virtual indicator element includes moving (e.g., displaying movement of) the virtual indicator element to a respective location (e.g., displaying the virtual indicator element overlaying a location of the environment that corresponds to the respective location; in some embodiments, from a previous location; in some embodiments, from the anchor location (e.g., upon detecting initial movement of the viewpoint)) within an anchor region of the environment (e.g., as illustrated in FIGS. 17C-17K and 17N-17Q) (in some embodiments, based on the first change in the viewpoint from which the spatial video media is being captured (e.g., the movement of the one or more cameras with respect to the environment) with respect to the anchor location in the environment), wherein the anchor region is an environment-locked region (e.g., a region based on a location in the three-dimensional environment, such that, as the user's viewpoint shifts, the region shifts with respect to the viewport through which the environment is visible) that includes the anchor location (e.g., 1706 and/or 1736) (e.g., the steady target location; in some embodiments, the anchor region is centered around the anchor location) (e.g., the virtual indicator element is partially environment-locked, such that the virtual indicator element may appear to move somewhat relative the environment, but remains displayed within the same general region of the environment (e.g., near the anchor location)). Displaying the virtual indicator element as a partially environment-locked object provides improved visual feedback about a state of the computer system, assisting the user with composing media capture events, and reducing the risk that transient media capture opportunities are mis-captured (e.g., due to visually uncomfortable and/or unwanted camera movement) by indicating the anchor location (e.g., the steady target location) while also providing feedback on the movement of the viewpoint (e.g., by moving slightly in the environment with respect to the steady target location).

In some embodiments, moving the virtual indicator element to the respective location within the anchor region of the environment includes moving the virtual indicator element according to one or more simulated physical properties (e.g., simulated mass, inertia, gravitational attraction, magnetic attraction or repulsion, electrostatic attraction or repulsion, and/or a spring force) (in some embodiments, simulating the virtual indicator element as one or more physical objects reacting to detected change in the viewpoint of the spatial video media (e.g., the movement of the one or more cameras) with respect to the anchor location (e.g., within the frame of the reference of the environment); in some embodiments, determining the respective location within the anchor region based on the simulated physics (e.g., smoothing, reducing, increasing, and/or otherwise adjusting the location(s) determined using the simulated physics); in some embodiments, simulated spring resistance (e.g., simulating spring resistance between the anchor location and the location of the virtual indicator element); in some embodiments, simulated gravity (e.g., simulating the anchor location exerting a gravitational pull on the virtual indicator element)). Moving the virtual indicator element according to simulated physics provides improved visual feedback about a state of the computer system, assists the user with composing media capture events, and reduces the risk that transient media capture opportunities are mis-captured (e.g., due to visually uncomfortable and/or unwanted camera movement). For example, the simulated physics of the virtual indicator element intuitively convey information about the anchor location and/or the first change in the viewpoint, allowing the user to quickly adjust capture to avoid visually uncomfortable and/or unwanted camera movement in the captured media.

In some embodiments, the first change in the viewpoint from which the spatial video media is being captured includes a viewpoint movement (e.g., 1710, 1712, 1716, 1720, 1722, 1724, 1726, 1728, 1738, 1744, and/or 1748) (e.g., translation and/or rotation; e.g., of the one or more cameras) of a first distance (in some embodiments, an overall a magnitude of displacement normalized to a single frame of reference; in some embodiments, a first angular distance; in some embodiments, a first linear distance) in a first direction (in some embodiments, in one or more directions (e.g., the first direction is an overall direction of movement normalized to a single frame of reference)), and moving the virtual indicator element to the respective location within the anchor region of the environment includes moving the virtual indicator element a second distance in the first direction (e.g., the movement of the virtual indicator element follows the movement of the viewpoint), wherein the second distance is shorter than the first distance (e.g., as illustrated in FIGS. 17C-17K and 17N-17Q) (e.g., the virtual indicator element moves to follow the first change in the viewpoint, but with some attenuation (e.g., while remaining within the anchor region; in some embodiments, due to simulated physics, such as simulated spring resistance and/or simulated gravity); in some embodiments, the second distance is a particular percentage (e.g., 20%, 25%, and/or 30%) of the first distance). (E.g., if a 5° yaw rotation of the one or more cameras is detected, the virtual indicator may be moved to demonstrate an approximately 1° yaw rotation in the same direction; e.g., if a 5 cm horizontal translation of the one or more cameras is detected, the virtual indicator may be moved to demonstrate a 1 cm horizontal translation in the same direction.) Moving the virtual indicator element to appear to slightly follow the movement of the viewpoint provides improved visual feedback about a state of the computer system, assists the user with composing media capture events, and reduces the risk that transient media capture opportunities are mis-captured (e.g., due to visually uncomfortable and/or unwanted camera movement). For example, the movement of the virtual indicator element intuitively conveys information about both the anchor location and the first change in the viewpoint, allowing the user to quickly adjust capture to avoid visually uncomfortable and/or unwanted camera movement in the captured media, while also conveying some "forgiveness" of slight viewpoint movements.

In some embodiments, the virtual indicator element is environment-locked (in some embodiments, changing the appearance of the virtual indicator element includes moving the virtual indicator element (e.g., with respect to the display generation component) to be environment-locked (e.g., appearing located at the anchor location in the three-dimensional environment, such that, as the user's viewpoint shifts, the display location of the virtual indicator element shifts with respect to the viewport through which the environment is visible to appear as though it remains at the anchor location in the three-dimensional environment)). Moving the virtual indicator element to appear environment-locked at the anchor location provides improved visual feedback about a state of the computer system, assists the user with composing media capture events, and reduces the risk that transient media capture opportunities are mis-captured (e.g., due to visually uncomfortable and/or unwanted camera movement). For example, the movement of the virtual indicator element intuitively conveys information about the anchor location, guiding and allowing the user to quickly adjust capture to move back to the steady location and avoid visually uncomfortable and/or unwanted camera movement in the captured media.

In some embodiments, the computer system, while displaying the virtual indicator element while the environment is visible, via the display generation component, detects a second change (in some embodiments, the second change is the same as the first change) in the viewpoint from which the spatial video media is being captured (e.g., 1712, 1716, 1720, 1722, 1724, 1726, 1728, 1738, 1744, and/or 1748) (e.g., movement (e.g., rotation and/or translation) of the one or more cameras with respect to the environment; in some embodiments, where media is being captured with an HMD, due to movement of the user's head, neck, and body; in some embodiments, the second change in the viewpoint is a translation or rotation in one or more directions (e.g., only horizontal, vertical, pitch, and/or yaw movements are considered) and not in one or more other directions (e.g., longitudinal and/or tilt movements are not considered)). In some embodiments, in response to detecting the second change in the viewpoint from which the spatial video media is being captured and in accordance with a determination that the viewpoint from which the spatial video media is being captured satisfies a first set of one or more alignment criteria (e.g., criteria defining an initial (e.g., low) level of misalignment from an established stable/target viewpoint at which to initially display the alignment indicator; in some embodiments, when the second change results in the current viewpoint differing from the respective viewpoint (e.g., the viewpoint represented by the anchor location and/or indicated by the virtual indicator element) by at least a threshold amount; in some embodiments, when the second change results in "high movement" of the current viewpoint (e.g., the amount and/or rate of change of the location of the current viewpoint exceeds one or more thresholds)), the computer system displays (e.g., initially displaying), via the display generation component, a virtual alignment element (e.g., 1714 and/or 1740) (e.g., an icon or glyph, such as crosshairs, a dot, and/or a small shape; in some embodiments, the alignment element is displayed with a second color (e.g., white and/or another color) different from the color of the indicator element) while the environment is visible via the display generation component, wherein the virtual alignment element indicates a current location in the environment (e.g., 1708) that represents the viewpoint from which the spatial video media is being captured (e.g., as illustrated in FIGS. 17D-17L and 17N-17Q) (in some embodiments, a reference point in the portion of the environment currently included in the spatial media capture; in some embodiments the current location is a center point of the current viewpoint).

In some embodiments, while displaying the virtual alignment element (e.g., 1714 and/or 1740) while the environment is visible via the display generation component, the computer system detects a third change (in some embodiments, the third change is the same as the first change) in the viewpoint from which the spatial video media is being captured (e.g., 1716, 1720, 1722, 1724, 1726, 1728, 1730, 1744, and/or 1748) (e.g., movement (e.g., rotation and/or translation) of the one or more cameras with respect to the environment; in some embodiments, where media is being captured with an HMD, due to movement of the user's head, neck, and body; in some embodiments, the third change in the viewpoint is a translation or rotation in one or more directions (e.g., only horizontal, vertical, pitch, and/or yaw movements are considered) and not in one or more other directions (e.g., longitudinal and/or tilt movements are not considered)), and in response to detecting the third change in the viewpoint from which the spatial video media is being captured, the computer system moves (e.g., displaying movement of) the virtual alignment element to indicate the viewpoint (e.g., the current viewpoint), wherein moving the virtual alignment element is based on the third change in the viewpoint from which the spatial video media is being captured (e.g., as illustrated in FIGS. 17D-17M and 17O-17Q) (in some embodiments, the display location changes relative to the environment visible via the display generation component to remain fully or partially viewpoint-locked; in some embodiments, the display location changes relative to the display generation component). Displaying a virtual alignment element (e.g., alignment indicator) with an appearance that updates in response to changes to the viewpoint of an ongoing spatial media capture media in order to indicate the current viewpoint of the environment being captured provides improved visual feedback about a state of the computer system, which assists the user with composing media capture events and reduces the risk that transient media capture opportunities are mis-captured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, indicating the current viewpoint with the virtual alignment element intuitively prompts and guides a user to capture steady spatial media without visually uncomfortable and/or unwanted movement of the viewpoint.

In some embodiments, the first set of one or more alignment criteria includes a first criterion that is satisfied when the current location in the environment (e.g., 1708) that represents the viewpoint from which the spatial video media is being captured (e.g., the current viewpoint; e.g., as a result of the second change in the viewpoint) is at least a first threshold distance (in some embodiments, a minimum angular distance (e.g., 2°, 3°, and/or 5° yaw and/or pitch rotation); in some embodiments, a minimum cartesian distance (e.g., 3, 5, or 10 cm vertical or horizontal translation) from the anchor location (e.g., 1706 and/or 1736). (E.g., the first criterion is satisfied when the third change in the current viewpoint moves the viewport by more than a threshold amount.) (In some embodiments, the first criterion is satisfied when the current location in the environment that represents the viewpoint from which the spatial video media is being captured is at least a first threshold distance from the displayed location of the indicator element.) Conditionally displaying the virtual alignment element (e.g., alignment indicator) in response to movement of the viewpoint that exceeds a particular threshold provides improved visual feedback about a state of the computer system without cluttering the user interface, which assists the user with composing media capture events and reduces the risk that transient media capture opportunities are mis-captured (e.g., due to visually uncomfortable and/or unwanted camera movement). For example, the initial appearance of the virtual alignment element indicates to the user that the viewpoint of the spatial media capture is not steady, as the viewpoint has departed from its previous position by more than a certain amount, allowing the user to monitor and adjust the movement of the viewpoint.

In some embodiments, the computer system, while displaying the virtual alignment element (e.g., 1714 and/or 1740) while the environment is visible via the display generation component, detects a fourth change (e.g., 1716, 1720, 1722, 1724, 1726, 1728, 1730, 1744, and/or 1748) (in some embodiments, the fourth change is the same as the first change and/or the third change) in the viewpoint from which the spatial video media is being captured. In some embodiments, in response to detecting the fourth change in the viewpoint from which the spatial video media is being captured and in accordance with a determination that the viewpoint from which the spatial video media is being captured (e.g., the current viewpoint) satisfies a second set of alignment criteria (e.g., criteria defining a minimal misalignment from an established stable/target viewpoint where the viewpoint is considered substantially aligned (e.g., a misalignment margin of error) at which to hide the alignment indicator), the computer system ceases displaying the virtual alignment element (e.g., as illustrated in FIGS. 17M and 17Q), wherein the second set of alignment criteria includes a second criterion that is satisfied when the current location in the environment that represents the viewpoint from which the spatial video media is being captured (e.g., the current viewpoint) is less than a second threshold distance (in some embodiments, a minimum angular distance (e.g., 10, 1.5°, and/or 3° yaw and/or pitch rotation); in some embodiments, a minimum cartesian distance (e.g., 1, 2, or 5 cm vertical or horizontal translation)) from the anchor location (in some embodiments, the second criterion is satisfied when the current location in the environment that represents the viewpoint from which the spatial video media is being captured is less than a second threshold distance from the displayed location of the indicator element), wherein the second threshold distance is smaller than the first threshold distance (e.g., the viewpoint must return closer to its initial/steady position for the alignment indicator to disappear than point where the alignment indicator is initially displayed). (In some embodiments, the second set of alignment criteria include a criterion that is satisfied when the viewpoint has not yet departed from the respective viewpoint by more than a threshold amount (e.g., the movement has not yet exited a barrier/maximum threshold around the anchor location; in some embodiments, 8°, 10°, and/or 15° yaw and/or pitch rotation; in some embodiments, 15, 18, and/or 21 cm vertical or horizontal translation); in some embodiments, if the viewpoint movement has previously departed from the respective viewpoint by more than the threshold amount, the virtual alignment element remains displayed (e.g., even if the viewpoint returns to the initial/target viewpoint) until a new anchor location/respective viewpoint has been established as a steady viewpoint target (e.g., by maintaining a steady viewpoint for a threshold period of time).) Initially displaying the virtual alignment element at a larger threshold departure from the respective viewpoint and dismissing the virtual alignment element at a smaller threshold departure from the respective viewpoint reduces flicker of the text notice (e.g., as the movement of the viewpoint fluctuates around the respective threshold levels), which enhances the operability of the system and makes the user-system interface more efficient (e.g., by reducing distracting and/or confusing visual outputs). Doing so also reduces power usage and improves battery life of the system by preventing unnecessary changes to the displayed content. Dismissing the virtual alignment element also provides improved visual feedback about a state of the computer system without cluttering the user interface, for example, by intuitively indicating to the user when the viewpoint has returned to its initial/steady position.

In some embodiments, the third change in the viewpoint from which the spatial video media is being captured includes a viewpoint movement (e.g., translation and/or rotation; e.g., of the one or more cameras) of a third distance (in some embodiments, an overall a magnitude of displacement normalized to a single frame of reference; in some embodiments, a third angular distance; in some embodiments, a third linear distance in some embodiments, the third distance is the same as the first distance and/or the second distance) (in some embodiments, the movement is a movement in a respective direction), and moving the virtual alignment element based on the third change in the viewpoint from which the spatial video media is being captured includes, in accordance with a determination that the third change in the viewpoint from which the spatial video media is being captured satisfies a third set of one or more alignment criteria (e.g., criteria defining a state of viewpoint movement during which an anchor location remains established as the reference/target point for determining misalignment (e.g., a "high-motion" boundary has not yet been broken) and the alignment indicator is being displayed (e.g., the viewpoint has not yet substantially re-aligned with the stable/target viewpoint); in some embodiments, the third set of one or more alignment criteria includes a criterion that is satisfied when third change increases a distance (e.g., an angular and/or linear displacement) between the current location representing the viewpoint from which the spatial video media is being captured and the anchor location representing the respective viewpoint (e.g., the movement is a movement further away from alignment with the anchor location)), moving the virtual alignment element a fourth distance (in some embodiments, the fourth distance is the same as the first distance and/or the second distance), wherein the fourth distance is shorter than the third distance (e.g., as illustrated in FIGS. 17E-17I and 17O) (e.g., the virtual alignment element moves to follow the third change in the viewpoint, but with some resistance). (In some embodiments, the third set of one or more alignment criteria includes an additional criterion that is satisfied when the viewpoint has not yet departed from the respective viewpoint by more than a threshold amount (e.g., the movement has not yet broken a barrier/maximum threshold around the anchor location; in some embodiments, 8°, 10°, and/or 15° yaw and/or pitch rotation; in some embodiments, 15, 18, and/or 21 cm vertical or horizontal translation); in some embodiments, if the viewpoint has departed from the respective viewpoint by more than the threshold amount and a new steady viewpoint has not yet been established, moving the virtual alignment element by the third distance (e.g., following the change in viewpoint without resistance)) (in some embodiments, if the third change decreases the distance from the respective viewpoint/anchor location (e.g., the third criterion is not satisfied), the virtual alignment element is moved a distance that is greater than the third distance (e.g., the movement of the virtual alignment element is drawn more strongly towards alignment).) Moving the virtual alignment element differently from the movement of the viewpoint assists the user with composing media capture events, and reduces the risk that transient media capture opportunities are mis-captured (e.g., due to visually uncomfortable and/or unwanted camera movement) by intuitively encouraging and guiding the user to re-align the current viewpoint with the respective viewpoint (e.g., the initial and/or steady viewpoint). For example, the movement of the virtual alignment element may appear resistant to movements of the viewpoint that increase misalignment and more responsive to movements of the viewpoint that increase alignment.

In some embodiments, moving the virtual alignment element based on the third change in the viewpoint from which the spatial video media is being captured includes moving the virtual alignment element according to one or more simulated physical properties (e.g., simulated mass, inertia, gravitational attraction, magnetic attraction or repulsion, electrostatic attraction or repulsion, and/or a spring force (in some embodiments, simulating the virtual alignment element as one or more physical objects reacting to detected change in the viewpoint of the spatial video media (e.g., the movement of the one or more cameras) with respect to the anchor location (e.g., within the frame of the reference of the environment); in some embodiments, determining the fourth path based on the simulated physics; in some embodiments, the simulated physics includes simulating at least one force acting on the virtual alignment element that changes based on the virtual alignment element's distance from another simulated object (in some embodiments, the at least one force includes simulated spring resistance (e.g., simulating spring resistance between the anchor location and the location of the virtual alignment element and/or a location representing the current viewpoint); in some embodiments, the at least one force includes simulated gravity (e.g., simulating the anchor location and/or a location representing the current viewpoint exerting a gravitational pull on the virtual alignment element))). Moving the virtual indicator element according to simulated physics provides improved visual feedback about a state of the computer system, assists the user with composing media capture events, and reduces the risk that transient media capture opportunities are mis-captured (e.g., due to visually uncomfortable and/or unwanted camera movement). For example, the simulated physics of the virtual alignment element intuitively convey information about the change in the viewpoint and/or the anchor location, allowing the user to quickly adjust capture to avoid visually uncomfortable and/or unwanted camera movement in the captured media.

In some embodiments, the computer system, after moving the virtual alignment element according to the one or more simulated physical properties (in some embodiments, and without detecting further changes in the viewpoint), displays the virtual alignment element at a first location (in some embodiments, displaying an animation of the element shifting and/or moving to the first location), wherein the first location is closer to the anchor location than the current location in the environment that represents the viewpoint from which the spatial video media is being captured (e.g., as illustrated in FIGS. 17E-17I and 17N-17P) (e.g., the virtual alignment element is drawn back to the anchor location; in some embodiments, the one or more simulated physical properties include simulating a force (e.g., a gravitational and/or spring force) acting on the virtual alignment element that pulls the virtual alignment indicator towards the anchor location (in some embodiments, the simulated physics also include simulating a force (e.g., a gravitational and/or spring force) acting on the virtual alignment element that pulls the virtual alignment indicator towards the second location, and the second location represents an equilibrium position given the two countervailing gravitational and/or spring forces)). Moving the virtual indicator element according to simulated physics provides improved visual feedback about a state of the computer system, assists the user with composing media capture events, and reduces the risk that transient media capture opportunities are mis-captured (e.g., due to visually uncomfortable and/or unwanted camera movement). For example, the simulated physics of the virtual alignment element intuitively convey information about the change in the viewpoint and/or the anchor location, allowing the user to quickly adjust capture to avoid visually uncomfortable and/or unwanted camera movement in the captured media.

In some embodiments, displaying the virtual indicator element includes displaying the virtual indicator element in a first color (e.g., yellow and/or another color) and displaying the virtual alignment element includes displaying the virtual alignment element in a second color different from the first color (e.g., white and/or another color; e.g., the virtual indicator element and the virtual alignment element are visibly distinguishable by color). Displaying the virtual indicator element and the virtual alignment element in different colors provides improved visual feedback about a state of the computer system without cluttering the user interface. For example, by visually distinguishing the virtual indicator element and the virtual alignment element with color, the user can quickly and intuitively monitor both the anchor location and the movement of the viewpoint without the need for additional UI elements such as text labels.

In some embodiments, moving the virtual alignment element based on the third change in the viewpoint from which the spatial video media is being captured includes, while displaying the virtual indicator element at an indicator location (in some embodiments, displaying movement of the virtual indicator element to the indicator location in response to detecting the third change) in the environment (e.g., indicating the anchor location; in some embodiments, the indicator location is the anchor location; in some embodiments, the indicator location is the same as the virtual location and/or the respective location; in some embodiments, the indicator location is different from the virtual location and/or the respective location) and in accordance with a determination that the viewpoint from which the spatial video media is being captured (e.g., the current viewpoint) satisfies a fourth set of alignment criteria (e.g., criteria defining a minimal misalignment from an established stable/target viewpoint where the viewpoint is considered substantially aligned (e.g., a misalignment margin of error) at which to hide the alignment indicator), wherein the fourth set of alignment criteria includes a criterion that is satisfied when the current location in the environment that represents the viewpoint from which the spatial video media is being captured (e.g., the current viewpoint) is less than a third threshold distance (in some embodiments, a threshold angular distance (e.g., 1.5°, 2°, and/or 3.5° yaw and/or pitch rotation); in some embodiments, a threshold cartesian distance (e.g., 1.5, 2.5, or 4 cm vertical or horizontal translation; in some embodiments, the third threshold distance is different from the second threshold distance (e.g., the alignment element snaps back to the indicator element before reaching the displacement where the alignment indicator disappears); in some embodiments, the third threshold distance is the same as the second threshold distance (e.g., the alignment element snaps back to the indicator element and then disappears at the same point); in some embodiments, the third threshold distance is the same as the first threshold distance (e.g., the alignment element snaps back to the indicator element within the displacement where it originally appeared)) from the anchor location, moving (e.g., displaying movement of) the virtual alignment element to the indicator location (e.g., as illustrated in FIG. 17Q) (e.g., when the current viewpoint substantially or completely re-aligns with the respective viewpoint, displaying the alignment element "snapping back" into the indicator element). Moving the alignment element into alignment with the indicator element when the viewpoint of the spatial media capture represents a similar viewpoint to the initial/steady viewpoint (e.g., the viewpoint represented by the anchor location) assists the user with composing media capture events and reduces the risk that transient media capture opportunities are mis-captured (e.g., due to visually uncomfortable and/or unwanted camera movement), for example, by providing the user with positive reinforcement (e.g., "helping" the user align the alignment element and the indicator element) in response to changes in the viewpoint that reduce misalignment.

In some embodiments, the computer system, while displaying the virtual indicator element while the environment is visible via the display generation component, detects a fifth change (in some embodiments, the fifth change is the same as the first change, the second change, and/or the third change) in the viewpoint from which the spatial video media is being captured (e.g., 1716, 1720, 1722, 1724, 1726, 1728, 1730, 1744, and/or 1748) (e.g., movement (e.g., rotation and/or translation) of the one or more cameras with respect to the environment; in some embodiments, where media is being captured with an HMD, due to movement of the user's head, neck, and body; in some embodiments, the change in the viewpoint is a translation or rotation in one or more directions (e.g., only horizontal, vertical, pitch, and/or yaw movements are considered) and not in one or more other directions (e.g., longitudinal and/or tilt movements are not considered)). In some embodiments, the computer system, in response to detecting the fifth change in the viewpoint from which the spatial video media is being captured and in accordance with a determination that the viewpoint from which the spatial video media is being captured (e.g., the current viewpoint) satisfies a fifth set of alignment criteria (e.g., criteria defining a medium-high level (e.g., nearing, but still under the high-motion boundary threshold) of misalignment from an established stable/target viewpoint at which to initially display the boundary indicator), displays a virtual boundary element (e.g., 1718 and/or 1742) (e.g., a circle and/or other framing element; in some embodiments, the virtual boundary element frames a region that initially includes the virtual alignment element; in some embodiments, the virtual boundary element frames a region that includes the virtual indicator element (in some embodiments, the virtual boundary element is centered around the virtual indicator element); in some embodiments, the virtual boundary element frames a region that includes the anchor location) visually representing a predetermined (e.g., a respective, boundary, and/or maximum) threshold distance from the anchor location (in some embodiments, a threshold distance from the anchor location that, when exceeded, classifies the spatial video capture as a high-motion video capture; in some embodiments, a threshold angular distance (e.g., 8°, 10°, and/or 12° yaw and/or pitch rotation); in some embodiments, a threshold cartesian distance (e.g., 15, 17, or 20 cm vertical or horizontal translation)) (in some embodiments, a dimension (e.g., a radius, length, and/or width) of the virtual boundary element approximates the predetermined threshold distance (e.g., if the predetermined threshold distance from the anchor location is 10°, the virtual boundary element is displayed as a circle with a radius, such that, when centered on the virtual indicator element, the point of the virtual boundary element furthest from the anchor location is 10° from the anchor location (e.g., an 8°-10° radius, depending on the maximum distance the virtual indicator element can move from the anchor location)) while the environment is visible via the display generation component (e.g., as illustrated in FIGS. 17E and 17N), wherein the fifth set of alignment criteria includes a criterion that is satisfied when the current location in the environment that represents the viewpoint from which the spatial video media is being captured (e.g., the current viewpoint) is at least a fourth threshold distance (in some embodiments, a threshold angular distance (e.g., 5°, 6°, and/or 8° yaw and/or pitch rotation); in some embodiments, a threshold cartesian distance (e.g., 5, 6, or 7 cm vertical or horizontal translation; in some embodiments, the fourth threshold distance is greater than the first threshold distance (e.g., the boundary indicator appears further out of alignment than where the alignment element initially appears)) from the anchor location. Conditionally displaying a virtual boundary element (e.g., boundary indicator) in response to changes in the viewpoint of a spatial media capture that exceed a threshold distance from the initial/stable viewpoint provides improved visual feedback about a state of the computer system, which assists the user with composing media capture events and reduces the risk that transient media capture opportunities are mis-captured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, visually indicating the outer bounds of "low" or "steady" movement as the movement of the viewpoint increases intuitively prompts and guides a user to capture steady spatial media without visually uncomfortable and/or unwanted movement of the viewpoint.

In some embodiments, the computer system, while displaying the virtual boundary element visually representing the predetermined threshold distance from the anchor location (in some embodiments, while the viewpoint from which the spatial media is being captured satisfies the fourth set of one or more alignment criteria) while the environment is visible via the display generation component, detects a sixth change in the viewpoint from which the spatial video media is being captured (e.g., 1720, 1722, 1724, 1726, and/or 1728) (in some embodiments, the sixth change is the same change in the viewpoint as the first change and/or the third change), and in response to detecting the fifth change, the computer system moves (e.g., displaying movement of) the virtual indicator element (e.g., 1704 and/or 1734) along a first path (e.g., the anchor indicator moves in response to changes (e.g., movements) in the viewpoint) and moves the virtual boundary element (e.g., 1718 and/or 1742) along the first path (e.g., moving the boundary indicator along with the anchor indicator in response to changes in the viewpoint; in some embodiments, the virtual boundary element remains centered around the virtual indicator element). Moving the virtual boundary element along with the virtual indicator element in response to movement of the viewpoint provides improved visual feedback about a state of the computer system, assists the user with composing media capture events, and reduces the risk that transient media capture opportunities are mis-captured (e.g., due to visually uncomfortable and/or unwanted camera movement). For example, the movement of the virtual boundary element intuitively conveys information about both the anchor location and the outer bounds of "low" or "steady" movement, allowing the user to quickly adjust capture to avoid visually uncomfortable and/or unwanted camera movement in the captured media, while also conveying some "forgiveness" of slight viewpoint movements.

In some embodiments, the computer system, while displaying the virtual alignment element and the virtual boundary element, detects a seventh change in the viewpoint from which the spatial video media is being captured (e.g., 1720, 1722, 1724, 1726, and/or 1728) (in some embodiments, the seventh change is the same change in the viewpoint as the first change, the third change, and/or the sixth change). In some embodiments, in response to detecting the seventh change and in accordance with a determination that the viewpoint satisfies a set of one or more increase criteria (in some embodiments, the set of one or more increase criteria includes a criterion that is satisfied when the distance between the current viewpoint location and the anchor location still falls within a particular range (e.g., the range where the virtual boundary element is displayed, e.g., between the predetermined threshold distance and the fourth threshold distance)), wherein the set of one or more reduction criteria includes a criterion that is satisfied when a distance between the current location in the environment that represents the viewpoint from which the spatial video media is being captured and the anchor location increases as a result of the seventh change in the viewpoint (e.g., as the current viewpoint moves further out of alignment with the initial/steady viewpoint), the computer system increases an opacity of the virtual alignment element at a first rate and increases an opacity of the virtual boundary element by at a second rate (e.g., as illustrated in FIGS. 17E-17F) (e.g., increasing the opacities of both the virtual boundary element and the virtual alignment element as the viewpoint gets further from alignment; in some embodiments, the first and/or second increase amounts are based on a magnitude of the eighth change; in some embodiments, the opacities are increased at one or more increase rates (e.g., a particular reduction in opacity per unit change in distance (in some embodiments, linear distance (e.g., 1 cm); in some embodiments, angular distance (e.g., 1°)) between the current location of the viewpoint and the anchor location). (In some embodiments, in accordance with a determination that the viewpoint satisfies a set of one or more reduction criteria, wherein the set of one or more reduction criteria includes a criterion that is satisfied when a distance between the current location in the environment that represents the viewpoint from which the spatial video media is being captured and the anchor location decreases as a result of the seventh change in the viewpoint (e.g., as the current viewpoint moves closer to alignment with the initial/steady viewpoint): reducing an opacity of the virtual alignment element by a first reduction amount; and reducing an opacity of the virtual boundary element by a second reduction amount (in some embodiments, the rates of reduction of the opacity are the inverse of the rates of increase of the opacity (e.g., if a movement from a starting point changes the opacity by a particular amount, movement back to the starting point will reverse that change)).) Increasing the opacities of the boundary element and the alignment element as the current viewpoint moves further out of alignment with the initial/steady viewpoint provides improved visual feedback about a state of the computer system without cluttering the user interface, which assists the user with composing media capture events and reduces the risk that transient media capture opportunities are mis-captured (e.g., due to visually uncomfortable and/or unwanted camera movement). For example, the increasing visual prominence of the boundary element and alignment element warns the user when the movement of the viewpoint is approaching a maximum movement threshold, allowing the user to monitor and adjust the movement of the viewpoint to avoid visually uncomfortable and/or unwanted movement of the viewpoint. In some embodiments, the first rate is different from the second rate (e.g., the opacities of the virtual alignment element and the virtual boundary element change by different amounts in response to the same change in the viewpoint; e.g., the opacity increase rate for the virtual alignment element is different from the opacity increase rate for the virtual boundary element). In some embodiments, the first rate is the same as the second rate.

In some embodiments, the computer system, while displaying the virtual boundary element visually representing the predetermined threshold distance from the anchor location (in some embodiments, while the viewpoint from which the spatial media is being captured satisfies the fourth set of one or more alignment criteria) while the environment is visible via the display generation component, detects an eighth change in the viewpoint from which the spatial video media is being captured (e.g., 1720, 1722, 1724, 1726, and/or 1728) (in some embodiments, the eighth change is the same change in the viewpoint as the first change, the third change, the sixth change, and/or the seventh change), and in response to the eighth change in the viewpoint from which the spatial video media is being captured and in accordance with a determination that a distance between the current location in the environment that represents the viewpoint from which the spatial video media is being captured and the anchor location increases to within a boundary distance range (e.g., 0.5°, 1°, or 2°-wide range; e.g., a 1 cm, 2 cm, or 4 cm-wide range) as a result of the eighth change in the viewpoint (e.g., as the current viewpoint moves further out of alignment with the initial/steady viewpoint and approaches the edge of the boundary), the computer system increases (e.g., displaying an increase of) a size (e.g., a dimension (e.g., a radius, length, and/or width) of the boundary element) of the virtual boundary element from a first size to a second size (e.g., as illustrated in FIGS. 17G and 17I), wherein the boundary distance range includes the predetermined threshold distance (e.g., a range outside of, within, and/or surrounding the predetermined threshold distance; in some embodiments, the predetermined threshold distance is the upper boundary of the boundary distance range). (In some embodiments, in accordance with a determination that the distance between the current location in the environment that represents the viewpoint from which the spatial video media is being captured and the anchor location increases to a distance greater than the boundary distance range, ceasing displaying the virtual boundary element (in some embodiments, before ceasing displaying the virtual boundary element, increasing the size to the second size and then decreasing back to the first size); in some embodiments, in accordance with a determination that the distance between the current location in the environment that represents the viewpoint from which the spatial video media is being captured and the anchor location increases to a distance lower than the boundary distance range and/or decreases to a distance lower than the boundary distance range, foregoing increasing the size of the virtual boundary element (e.g., only increasing the size as the alignment element approaches the edges of the boundary element).) Increasing the size of the boundary element as the current viewpoint moves further out of alignment with the initial/steady viewpoint and approaches the outer bounds of "low" or "steady" movement provides improved visual feedback about a state of the computer system, which assists the user with composing media capture events and reduces the risk that transient media capture opportunities are mis-captured (e.g., due to visually uncomfortable and/or unwanted camera movement). For example, the increase in the size of the boundary element intuitively signals to the user that they are "pushing" against the edge of the low-motion boundary, providing the user an opportunity to re-align the viewpoint of the spatial video capture before the spatial video media is classified as high-motion.

In some embodiments, the computer system, while displaying the virtual boundary element at the second size, detects a ninth change in the viewpoint from which the spatial video media is being captured (e.g., 1726 and/or 1728) (in some embodiments, the ninth change is the same change in the viewpoint as the first change, the third change, the sixth change, the seventh change, and/or the eighth change), and in response to the ninth change in the viewpoint from which the spatial video media is being captured and in accordance with a determination that a distance between the current location in the environment that represents the viewpoint from which the spatial video media is being captured and the anchor location decreases to below the boundary distance range as a result of the ninth change in the viewpoint (e.g., as the current viewpoint moves closer to alignment with the initial/steady viewpoint from the edge of the boundary), the computer system decreases (e.g., displaying an decrease of) the size (e.g., a dimension (e.g., a radius, length, and/or width) of the boundary element) of the virtual boundary element from the second size to the first size (e.g., as illustrated in FIG. 17H) (e.g., reversing the stretching/expansion of the boundary element if the viewpoint moves back towards the anchor location from the boundary). Decreasing the size of the previously-expanded boundary element as the current viewpoint moves closer to alignment with the initial/steady viewpoint from the outer bounds of "low" or "steady" movement provides improved visual feedback about a state of the computer system, which assists the user with composing media capture events and reduces the risk that transient media capture opportunities are mis-captured (e.g., due to visually uncomfortable and/or unwanted camera movement). For example, the decrease in the size of the boundary element helps the user confirm that the change to the viewpoint reduced misalignment and provides the user with positive reinforcement (e.g., "helping" the user align the alignment element and the indicator element) in response to changes in the viewpoint that reduce misalignment.

In some embodiments, the computer system, while displaying the virtual boundary element visually representing the predetermined threshold distance from the anchor location while the environment is visible via the display generation component, detects a tenth change in the viewpoint from which the spatial video media is being captured (e.g., 1720, 1722, 1724, 1726, and/or 1728) (in some embodiments, the tenth change is the same change in the viewpoint as the first change, the third change, the sixth change, the seventh change, the eighth change, and/or the ninth change), and in response to the tenth change in the viewpoint from which the spatial video media is being captured and in accordance with a determination that a distance between the current location in the environment that represents the viewpoint from which the spatial video media is being captured and the anchor location exceeds the predetermined threshold distance as a result of the tenth change in the viewpoint (e.g., as the current viewpoint moves further out of alignment with the initial/steady viewpoint and approaches the edge of the boundary), the computer system decreases (e.g., displaying an decrease of) the size (e.g., a dimension (e.g., a radius, length, and/or width) of the boundary element) of the virtual boundary element (e.g., as illustrated in FIG. 17J) (e.g., when the movement of the viewpoint exceeds the boundary threshold, the boundary element "snaps back" to a smaller size; in some embodiments, the smaller size is the first size (e.g., the boundary element snaps back after initially expanding (e.g., to the second size) when the movement nears the boundary); in some embodiments, the size of the virtual boundary element is decreased prior to ceasing display of the virtual boundary element). Decreasing the size of the boundary element in response to the current viewpoint moving outside of the bounds of "low" or "steady" movement provides improved visual feedback about a state of the computer system, which assists the user with composing media capture events and reduces the risk that transient media capture opportunities are mis-captured (e.g., due to visually uncomfortable and/or unwanted camera movement). For example, the decrease in size conveys a "snapping back" or "popping" of the boundary, intuitively informing the user that the spatial video capture is now considered a high-motion capture.

In some embodiments, the computer system, while displaying the virtual boundary element visually representing the predetermined threshold distance from the anchor location (in some embodiments, while the viewpoint from which the spatial media is being captured satisfies the fourth set of one or more alignment criteria) while the environment is visible via the display generation component, detects an eleventh change in the viewpoint from which the spatial video media is being captured (e.g., 1720, 1722, 1724, 1726, and/or 1728) (in some embodiments, the eleventh change is the same change in the viewpoint as the first change, the third change, the sixth change, the seventh change, the eighth change, the ninth change, and/or the tenth change), and in response to the eleventh change in the viewpoint from which the spatial video media is being captured and in accordance with a determination that a distance between the current location in the environment that represents the viewpoint from which the spatial video media is being captured and the anchor location exceeds the predetermined threshold distance as a result of the eleventh change in the viewpoint (e.g., as the current viewpoint moves further out of alignment with the initial/steady viewpoint and approaches the edge of the boundary), the computer system ceases displaying the virtual boundary element (e.g., as illustrated in FIG. 17K) (e.g., when the movement of the viewpoint exceeds the boundary threshold, the boundary element disappears; in some embodiments, the size of the virtual boundary element is decreased prior to display of the virtual boundary element ceasing). In some embodiments, in accordance with a determination that a distance between the current location in the environment that represents the viewpoint from which the spatial video media is being captured and the anchor location exceeds the predetermined threshold distance as a result of the eleventh change in the viewpoint, the spatial video media being captured is classified or flagged as high-motion video (e.g., as discussed below with respect to FIGS. 19A-19M). Ceasing display of the boundary element in response to the current viewpoint moving outside of the bounds of "low" or "steady" movement provides improved visual feedback about a state of the computer system without cluttering the user interface, which assists the user with composing media capture events and reduces the risk that transient media capture opportunities are mis-captured (e.g., due to visually uncomfortable and/or unwanted camera movement). For example, hiding the boundary element intuitively informs the user that the spatial video capture is now considered a high-motion capture and reduces clutter in the UI while high-motion capture is ongoing.

In some embodiments, prior to detecting the third change in the viewpoint from which the spatial video media is being captured, the virtual alignment element is displayed at a first display location relative to the viewpoint from which the spatial video media is being captured (in some embodiments, relative to a display of the display generation component; in some embodiments, relative to a viewport through which the environment is visible), and moving the virtual alignment element based on the third change in the viewpoint from which the spatial video media is being captured includes, in accordance with a determination that the third change in the viewpoint meets a set of one or more movement criteria, displaying the virtual alignment element at a second display location that, relative to the viewpoint from which the spatial video media is being captured, is different than the first display location (e.g., displaying the virtual alignment element in a non-viewpoint locked state), wherein the set of one or more movement criteria include a criterion that is met when the third change in the viewpoint from which the spatial video media includes a movement in at least one direction of a plurality of directions (e.g., as illustrated in FIGS. 17E-17J, 17O, and 17Q) (in some embodiments, the plurality of directions includes horizontal (x) translation, vertical (y) translation, yaw rotation, and/or pitch rotation; in some embodiments, the plurality of directions does not include longitudinal (z) translation and/or tilt rotation; in some embodiments, the set of one or more movement criteria include an additional criterion that is met when the movement of the viewpoint has not exceeded the predetermined threshold distance (e.g., the boundary threshold for high movement) from the anchor location; in some embodiments, if the additional criterion is not met, the virtual alignment indicator is displayed in a viewpoint-locked state (e.g., following the movement of the viewpoint without resistance and/or attenuation, such that the virtual alignment indicator appears to move with respect to the environment, but remains in the same location with respect to the viewpoint)). In some embodiments, moving the virtual alignment element based on the third change in the viewpoint from which the spatial video media is being captured includes, in accordance with a determination that the third change in the viewpoint does not meet the set of one or more movement criteria (in some embodiments, if the third change does not include movement in one of the plurality of directions (e.g., the third change only includes longitudinal (z) movement and/or tilt rotation)), maintaining display of the virtual alignment element at the first display location relative to the viewpoint from which the spatial video media is being captured (e.g., as illustrated in FIG. 17O) (e.g., displaying the alignment element in a viewpoint-locked position; in some embodiments, even as the alignment element appears to "move" with respect to the environment; in some embodiments, moving the alignment element includes rotating the alignment element (e.g., to maintain an "upright" appearance with respect to the environment)). Displaying the virtual alignment element moving with respect to the viewpoint in response to viewpoint movements in certain directions while maintaining display of the virtual alignment element at a particular position with respect to the viewpoint in response to viewpoint movements in other directions provides improved visual feedback about a state of the computer system and improved ergonomics of media capture and playback devices. For example, the virtual alignment element may be moved in a more noticeable (e.g., apparent) manner in response to horizontal and vertical translation movements during spatial media capture, as those types of viewpoint movements increase the likelihood of physical discomfort (e.g. motion sickness) while viewing the captured media, while the alignment element may be moved in a less or un-noticeable manner in response to longitudinal (e.g., forwards/backwards) movements, as those types of movements are less likely to lead to physical discomfort while viewing the captured media.

In some embodiments, displaying the virtual indicator element (e.g., 1704 and/or 1734) includes positioning the virtual indicator element within a virtual plane in the environment (e.g., the virtual indicator element is rendered/displayed at a particular depth/distance away from a user in the extended reality (XR) environment (e.g., appearing at a particular focal plane); in some embodiments, other virtual UI elements (e.g., the alignment indicator, the boundary indicator, and/or other media capture UI elements) are also rendered within the virtual plane), wherein the virtual plane in the environment is spaced at least a threshold depth away from (in some embodiments, in front of) a user (e.g., the virtual plane including the virtual indicator appears spaced apart from the user's viewpoint; e.g., at least 10 cm (e.g., allowing a typical user's eyes to converge on the virtual plane), 50 cm, and/or 1 m away). Displaying the virtual indicator element in a virtual plane spaced at least a minimum depth apart from the user's viewpoint provides improved ergonomics of media capture devices, for example, by allowing the user to comfortably view the virtual indicator element without double vision, eye strain, blurring, and/or other visual degradation. Doing so also assists the user with composing media capture events and reduces the risk that transient media capture opportunities are mis-captured (e.g., due to visually uncomfortable and/or unwanted camera movement), for example, due to difficulty seeing the virtual indicator or difficulty adjusting focus between the virtual indicator element, other UI elements, and/or and other XR content.

In some embodiments, the computer system detects (in some embodiments, when initially displaying the virtual indicator element and/or other UI elements; in some embodiments, periodically (e.g., at a sampling rate) while displaying the virtual indicator element and/or other UI elements) a gaze of the user (e.g., 732 and/or X732) (e.g., the current gaze of the user) and positions (in some embodiments, when initially displaying the virtual indicator element and/or other UI elements; in some embodiments, periodically (e.g., at a display refresh rate) while displaying the virtual indicator element and/or other UI elements) the virtual plane based on the gaze of the user (in some embodiments, the virtual plane is selected based on the convergence point of the user's gaze (e.g., at a depth away from the user that falls at or near the convergence point); in some embodiments, the virtual plane is selected based on the direction of the user's gaze (e.g., the virtual plane is selected to be in front of the user and/or within a certain region of the viewport through which the environment is visible)). (In some embodiments, changing the appearance of the virtual indicator element (e.g., in response to the first change in the viewpoint) includes detecting the gaze of the user and updating the selection of the virtual plane (e.g., to maintain consistent display of the virtual indicator element in the user's view).) In some embodiments, the virtual plane is selected to be perpendicular or substantially perpendicular to a direction of the gaze of the user. Displaying the virtual indicator element in a virtual plane selected based on the user's gaze provides improved ergonomics of media capture devices, for example, by allowing the user to comfortably view the virtual indicator element without double vision, eye strain, blurring, and/or other visual degradation. Doing so also assists the user with composing media capture events and reduces the risk that transient media capture opportunities are mis-captured (e.g., due to visually uncomfortable and/or unwanted camera movement), for example, due to difficulty seeing the virtual indicator or difficulty adjusting focus between the virtual indicator element, other UI elements, and/or other XR content.

In some embodiments, positioning the virtual plane based on the gaze of the user includes determining a convergence location (e.g., a current convergence point and/or focal plane) of the gaze of the user (e.g., a virtual location at which the user's right eye sightline and left eye sightline intersect), wherein the virtual plane includes the convergence location (e.g., the virtual indicator element (in some embodiments, and other UI elements) are displayed where the user's eyes are focusing). (In some embodiments, positioning the virtual plane based on the gaze of the user includes: in accordance with a determination that the convergence location of the gaze of the user is a first distance from the user's eyes, positioning the virtual plane at a depth of the first distance (e.g., remaining perpendicular or substantially perpendicular to a direction of the gaze of the user); and in accordance with a determination that the convergence location of the gaze of the user is a second distance from the user's eyes, positioning the virtual plane at a depth of the second distance (e.g., remaining perpendicular or substantially perpendicular to a direction of the gaze of the user).) Displaying the virtual indicator element in a virtual plane selected based on the convergence of the user's gaze provides improved ergonomics of media capture devices, for example, by allowing the user to comfortably view the virtual indicator element without double vision, eye strain, blurring, and/or other visual degradation. Doing so also assists the user with composing media capture events and reduces the risk that transient media capture opportunities are mis-captured (e.g., due to visually uncomfortable and/or unwanted camera movement), for example, due to difficulty seeing the virtual indicator or difficulty adjusting focus between the virtual indicator element, other UI elements, and/or other XR content.

In some embodiments, changing the appearance of the virtual indicator element (e.g., 1704 and/or 1734) to indicate the respective viewpoint corresponding to the spatial video media includes, in accordance with a determination that a distance between a current location in the environment (e.g., 1708) that represents the viewpoint from which the spatial video media is being captured (in some embodiments, a reference point in the portion of the environment currently included in the spatial media capture; in some embodiments the current location is a center point of the current viewpoint; in some embodiments, the current location in the environment that represents the viewpoint from which the spatial video media is being captured is the same as the current location in the environment that represents the viewpoint from which the spatial video media is being captured) and the anchor location (e.g., 1706 and/or 1736) exceeds a second predetermined (e.g., a respective, boundary, and/or maximum) threshold distance (in some embodiments, a threshold distance from the anchor location that, when exceeded, classifies the spatial video capture as a high-motion video capture; in some embodiments, a threshold angular distance (e.g., 8°, 10°, and/or 12° yaw and/or pitch rotation); in some embodiments, a threshold cartesian distance (e.g., 15, 17, or 20 cm vertical or horizontal translation); in some embodiments, the second predetermined threshold distance is the same as the predetermined threshold distance), ceasing displaying the virtual indicator element (e.g., as illustrated in FIG. 17K). Ceasing displaying the virtual indicator element when the viewpoint has moved out of alignment with the initial/steady viewpoint by more than a threshold amount provides improved visual feedback about a state of the computer system without cluttering the user interface, which assists the user with composing media capture events and reduces the risk that transient media capture opportunities are mis-captured. For example, the disappearance of the virtual indicator element intuitively indicates to the user that the viewpoint movement has exited a "steady" state and/or is considered a "high" level of motion, while also avoiding unnecessarily cluttering the capture UI when the user is intentionally moving the viewpoint with a high level of motion.

In some embodiments, changing the appearance of the virtual indicator element to indicate the respective viewpoint corresponding to the spatial video media includes, in accordance with a determination that a distance between the current location in the environment (e.g., 1708) that represents the viewpoint from which the spatial video media is being captured (in some embodiments, a reference point in the portion of the environment currently included in the spatial media capture; in some embodiments the current location is a center point of the current viewpoint; in some embodiments, the current location in the environment that represents the viewpoint from which the spatial video media is being captured is the same as the current location in the environment that represents the viewpoint from which the spatial video media is being captured) and the anchor location (e.g., 1706 and/or 1736) increases to at least a fifth threshold distance (e.g., as a result of the first change in the viewpoint), decreasing an opacity of the virtual indicator element (e.g., as illustrated in FIGS. 17C-17J and 17N) (e.g., the visual indicator element is opaque when the viewpoint is aligned and/or substantially aligned (e.g., within the fifth threshold distance) with the initial/steady viewpoint and semi-transparent when not aligned (e.g., but still within the boundary threshold and being displayed); in some embodiments, the opacity moves between two states (opaque and semi-transparent)); in some embodiments, the opacity of the virtual indicator element is gradually decreased as the viewpoint moves out of alignment with the initial/steady viewpoint and approaches the boundary threshold), wherein the fifth threshold distance is less than the second predetermined threshold distance. Decreasing the opacity of the virtual indicator element provides improved visual feedback about a state of the computer system, assists the user with composing media capture events, and reduces the risk that transient media capture opportunities are mis-captured (e.g., due to visually uncomfortable and/or unwanted camera movement). For example, fading the indicator element intuitively indicates to the user that the current media capture is moving out of alignment with the initial/steady viewpoint.

In some embodiments, the computer system, after ceasing displaying the virtual indicator element and in accordance with a determination that the viewpoint from which the spatial video media is being captured meets a set of one or more stability criteria, wherein the set of one or more stability criteria includes a criterion that is met when movement of the viewpoint from which the spatial video media is being captured remains below a movement threshold (e.g., one or more maximum velocities and/or accelerations of viewpoint movement) for at least a threshold duration of time (e.g., the criterion is met when angular velocity remains below 0.2°/s, the angular acceleration remains below 0.5°/s, the linear velocity remains below 0.3 m/s, and/or the angular acceleration remains below 0.6 m/s for at least 2, 3, or 5 seconds), displays, via the display generation component, a second virtual indicator element (e.g., 1704 and/or 1734) (e.g., an icon or glyph, such as crosshairs, a dot, and/or a small shape; in some embodiments, the indicator is displayed with a first color (e.g., yellow and/or another color); in some embodiments, the indicator is fully environment-locked (e.g., the displayed location of the indicator is locked at the anchor location); in some embodiments, the indicator is partially environment-locked (e.g., the displayed location of the indicator moves with respect to the anchor location); in some embodiments, the second virtual indicator element is the same as, has the same appearance as, and/or behaves the same way as the original virtual indicator element (e.g., the virtual indicator element is respawned or redisplayed), e.g., as described above with respect to FIGS. 17A-17R and 18) of a second anchor location (e.g., 1706 and/or 1736) in the environment that represents a second respective viewpoint (e.g., an anchor location and a respective viewpoint are re-established based on the current viewpoint; in some embodiments, the second anchor location is different from the anchor location (e.g., if the viewpoint re-stabilizes centered at a different position); in some embodiments, the second anchor location is the same as the anchor location (e.g., if the viewpoint re-stabilizes centered at the same position as before); in some embodiments, the second respective viewpoint is different from the respective viewpoint (e.g., if the viewpoint re-stabilizes centered at a different position); in some embodiments, the second respective viewpoint is the same as the respective viewpoint (e.g., if the viewpoint re-stabilizes centered at the same position as before)) corresponding to the spatial video media, wherein the second virtual indicator element is displayed while the environment is visible via the display generation component (e.g., as illustrated in FIG. 17M). Re-displaying the indicator element to indicate a new or re-established anchor location when the movement of the viewpoint has sufficiently re-stabilized provides improved visual feedback about a state of the computer system, which assists the user with composing media capture events and reduces the risk that transient media capture opportunities are mis-captured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, automatically re-establishing a steady target location (e.g., anchor location) with the virtual indicator element after a period of low movement intuitively prompts and guides a user to capture steady spatial media without visually uncomfortable and/or unwanted movement of the viewpoint, allowing the user to continue capturing steady media even after a period of high motion.

In some embodiments, the computer system, after ceasing displaying the virtual indicator element and in accordance with a determination that the viewpoint from which the spatial video media is being captured does not meet the set of one or more stability criteria, foregoes displaying the second virtual indicator element (e.g., as illustrated in FIGS. 17K-17L) (e.g., the indicator element is only re-displayed once the viewpoint of the media capture has sufficiently stabilized). Foregoing re-displaying the indicator element to indicate a new or re-established anchor location when the movement of the viewpoint has not yet sufficiently re-stabilized provides improved visual feedback about a state of the computer system, which assists the user with composing media capture events and reduces the risk that transient media capture opportunities are mis-captured (e.g., due to visually uncomfortable and/or unwanted camera movement). Doing so also enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. For example, the continued lack of indicator element intuitively indicates to the user that the viewpoint has not yet sufficiently stabilized. Additionally, the duration requirement of the set of one or more stability criteria reduces flicker and/or premature reestablishment of the indicator element when the viewpoint continues to move.

In some embodiments, the computer system, while displaying the virtual indicator element (e.g., 1704 and/or 1734) while the environment is visible via the display generation component, displays (e.g., initially displaying), via the display generation component, a second virtual alignment element (e.g., 1714 and/or 1740) (e.g., an icon or glyph, such as crosshairs, a dot, and/or a small shape; in some embodiments, the alignment element is displayed with a second color (e.g., white and/or another color) different from the color of the indicator element;); in some embodiments, the second virtual alignment element is the same as, has the same appearance as, and/or behaves the same way as the virtual indicator element described above (e.g., the second virtual alignment element indicates the current location in the environment that represents the viewpoint from which the spatial video media is being captured)) while the environment is visible via the display generation component, and after ceasing displaying the virtual indicator element, the computer system continues displaying the second virtual alignment element (e.g., as illustrated in FIGS. 17K-17L) (in some embodiments, until the viewpoint re-stabilizes (e.g., until the set of one or more stability criteria are met); in some embodiments, ceasing displaying the second virtual alignment element when the viewpoint re-stabilizes and/or the virtual indicator element is re-displayed). Displaying an alignment element provides improved visual feedback about a state of the computer system, which assists the user with composing media capture events and reduces the risk that transient media capture opportunities are mis-captured (e.g., due to visually uncomfortable and/or unwanted camera movement). For example, even when the viewpoint is experiencing a high level of movement and the indicator element is hidden, the alignment element indicates the movement of the viewpoint to the user, which helps the user track the movement and re-stabilize the viewpoint if desired.

In some embodiments, changing the appearance of the virtual indicator element to indicate the respective viewpoint corresponding to the spatial video media includes, in accordance with a determination that a distance between a current location in the environment that represents the viewpoint from which the spatial video media is being captured (in some embodiments, a reference point in the portion of the environment currently included in the spatial media capture; in some embodiments the current location is a center point of the current viewpoint; in some embodiments, the current location in the environment that represents the viewpoint from which the spatial video media is being captured is the same as the current location in the environment that represents the viewpoint from which the spatial video media is being captured) and the anchor location falls below a maintenance threshold distance (in some embodiments, an alignment margin of error (e.g., when movement remains within the minimum threshold distance from the anchor location, the viewpoint is considered substantially aligned); in some embodiments, a minimum angular distance (e.g., 10, 1.5°, and/or 3° yaw and/or pitch rotation); in some embodiments, a minimum cartesian distance (e.g., 1, 2, or 5 cm vertical or horizontal translation); in some embodiments, the minimum threshold distance is the same as the second threshold distance), ceasing displaying the virtual indicator element. Ceasing displaying the virtual indicator element when the viewpoint has moved substantially into alignment with the initial/steady viewpoint provides improved visual feedback about a state of the computer system without cluttering the user interface, which assists the user with composing media capture events and reduces the risk that transient media capture opportunities are mis-captured. For example, the disappearance of the virtual indicator element intuitively indicates to the user that the user has successfully steadied the viewpoint, while also avoiding unnecessarily cluttering the capture UI during steady capture.

In some embodiments, changing the appearance of the virtual indicator element to indicate the respective viewpoint corresponding to the spatial video media includes, in accordance with a determination that a distance between the current location in the environment that represents the viewpoint from which the spatial video media is being captured (in some embodiments, a reference point in the portion of the environment currently included in the spatial media capture; in some embodiments the current location is a center point of the current viewpoint; in some embodiments, the current location in the environment that represents the viewpoint from which the spatial video media is being captured is the same as the current location in the environment that represents the viewpoint from which the spatial video media is being captured and/or the second location in the environment that represents the viewpoint from which the spatial video media is being captured) and the anchor location decreases to below a sixth threshold distance (e.g., as a result of the first change in the viewpoint), decreasing an opacity of the virtual indicator element (e.g., the visual indicator fades as it approaches the threshold where it disappears), wherein the sixth threshold distance is more than the maintenance threshold distance. Decreasing the opacity of the virtual indicator element provides improved visual feedback about a state of the computer system, assists the user with composing media capture events, and reduces the risk that transient media capture opportunities are mis-captured (e.g., due to visually uncomfortable and/or unwanted camera movement). For example, fading the indicator element intuitively indicates to the user that the current media capture is approaching alignment with the initial/steady viewpoint.

In some embodiments, the computer system, while capturing the spatial video media of the environment and in accordance with a determination that the viewpoint from which the spatial video media is being captured satisfies a sixth set of alignment criteria (e.g., criteria defining a minimal misalignment from an established stable/target viewpoint at which the viewpoint is considered substantially aligned (e.g., a misalignment margin of error); in some embodiments, the sixth set of alignment criteria includes a criterion that is satisfied when a distance between a current location representing the current viewpoint and the anchor location falls below an alignment threshold distance (in some embodiments, an alignment margin of error (e.g., when movement remains within the minimum threshold distance from the anchor location, the viewpoint is considered substantially aligned); in some embodiments, a minimum angular distance (e.g., 10, 1.5°, and/or 3° yaw and/or pitch rotation); in some embodiments, a minimum cartesian distance (e.g., 1, 2, or 5 cm vertical or horizontal translation); in some embodiments, the alignment threshold distance is the same as the second threshold distance and/or the minimum threshold distance) in some embodiments, the sixth set of alignment criteria includes a criterion that is satisfied when the movement of the viewpoint has stabilized (e.g., remains below one or more threshold velocities and/or accelerations for at least a respective duration)), displays a graphical alignment indication (e.g., as illustrated in FIGS. 17B and 17Q) (in some embodiments, the graphical alignment indication includes a change to the appearance of the virtual indicator element, the virtual alignment element, and/or the virtual boundary element (e.g., the behaviors described above, such as a change in opacity, movement, appearance, and/or disappearance); in some embodiments, the graphical alignment indication includes a graphical element such as an icon (e.g., a check mark, a thumbs up, an emoji, and/or another glyph), a notification (e.g., including text, pictures, and/or icons), and/or an animation (e.g., snapping two graphical elements together, fading graphical elements out, animating sparkles, and/or another animated indication)). Displaying the graphical alignment indication when alignment criteria are met provides improved visual feedback about a state of the computer system and assists the user with composing media capture events and reduces the risk that transient media capture opportunities are mis-captured (e.g., due to visually uncomfortable and/or unwanted camera movement), for example, by providing the user with positive reinforcement when the user successfully realigns the viewpoint.

In some embodiments, the computer system, after capturing the spatial video media of the environment, displays a playable representation of the spatial video media (e.g., as illustrated in FIGS. 19A-19M) (e.g., a representation of the spatial video media item that can be played back, e.g., automatically and/or in response to an input requesting playback; in some embodiments, the representation of the spatial video media is a representation of the spatial video media in a respective format, size, and/or other playback setting (e.g., the representation is a preview, a minimized view, a standard view, an immersive view, and/or another view of the spatial video media)). In some embodiments, the computer system, while displaying the playable representation of the spatial video media and in accordance with a determination that a respective playback mode (e.g., a particular format, size, and/or other playback setting (e.g., a minimized view, a standard view, an immersive view, and/or another view of the spatial video media); in some embodiments, the respective playback mode is a spatial viewing mode and/or an expanded viewing mode, as described below with respect to FIGS. 19A-19M) is available for playing the playable representation of the spatial video media, displays an indication of the respective playback mode (e.g., 1918A and/or 1928) with a first appearance (e.g., as illustrated in FIGS. 19J and 19M) (e.g., an icon, button, affordance, and/or menu item; in some embodiments, the indication of the respective playback mode is displayed as described below with respect to the spatial viewing indicator). In some embodiments, the computer system, while displaying the playable representation of the spatial video media and in accordance with a determination that a respective playback mode is not available for playing the playable representation of the spatial video media, foregoes displaying the indication of the respective playback mode with the first appearance (e.g., as illustrated in FIGS. 19A-19D) (e.g., forgoing displaying the indication of the respective playback mode or displaying the indication of the respective playback mode with a second appearance that is different from the first appearance). Conditionally displaying an indication of a playback mode based on whether or not the playback mode is available for the spatial video media provides improved feedback on a state of the computer system, improved control of media playback, and improved ergonomics of media playback devices. Doing so also makes the user-system interface more efficient by helping the user to provide proper inputs and reducing user mistakes when operating/interacting with the system which, additionally, reduces power usage and improves battery life of the system by enabling the user to use the system more quickly and efficiently. For example, displaying the indication proactively surfaces the viewing option to the user, while forgoing displaying the indication helps prevent extraneous inputs attempting to invoke the viewing option when unavailable.

In some embodiments, aspects/operations of methods 800, 1000, 1200, 1400, 1600, 1800, and 2000 may be interchanged, substituted, and/or added between these methods. For example, capturing spatial video media according to method 1800 may implement the user interfaces and indicators described with respect to methods 800, 1000, 1200, and/or 1400, and the spatial video media captured according to method 1800 may be viewed using the user interfaces and techniques described with respect to methods 1600 and 2000. For brevity, these details are not repeated here.

FIGS. 19A-19M illustrate exemplary methods for surfacing a view setting for media playback based on media stability characteristics. FIG. 20 is a flow diagram of an exemplary method 2000 for surfacing a view setting for media playback based on media stability characteristics. The user interfaces in FIGS. 19A-19M are used to illustrate the processes described below, including the process in FIG. 20.

Figure 19A:
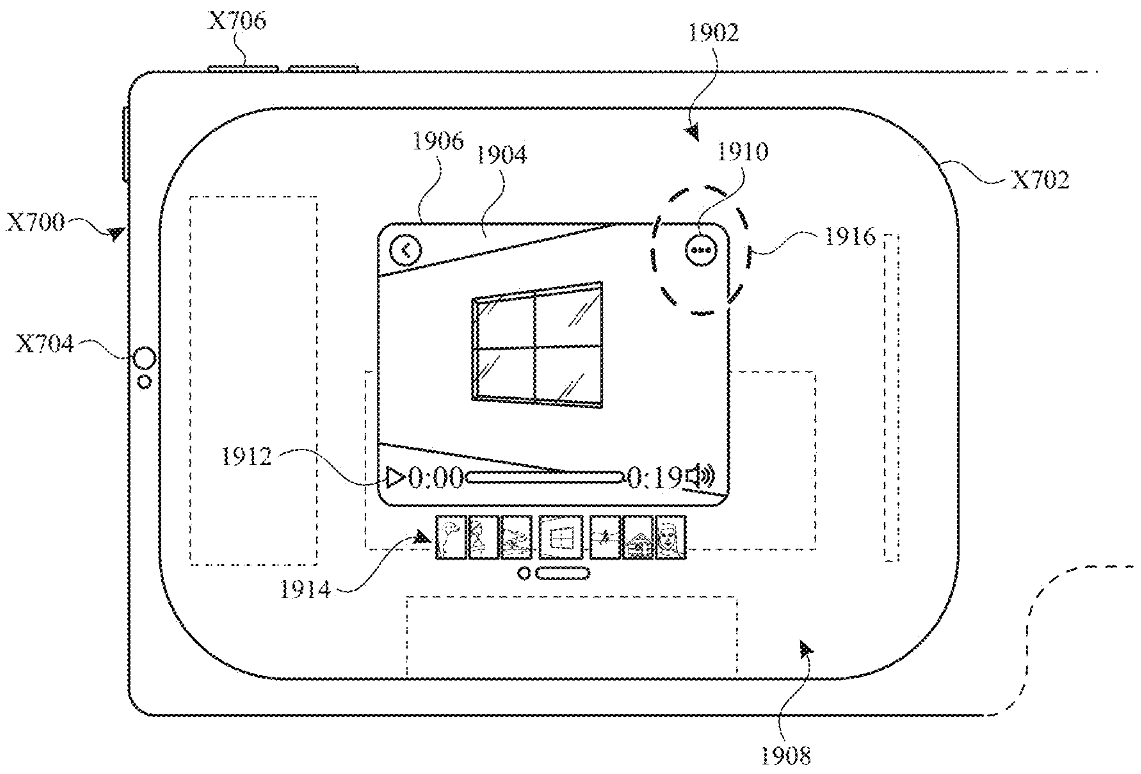
FIGS. 19A-19M illustrate example techniques for surfacing a view setting for media playback based on media stability characteristics, in some embodiments.

At FIG. 19A, HMD X700 displays (e.g., via display module X702) media viewer user interface 1902 including view 1906 of spatial media item 1904 (e.g., photo media (e.g., a still photo and/or a media capture of limited duration that includes content from before and/or after the capture input is detected (e.g., before and/or after an air pinch gesture is released, an air tap gesture is detected, a button press is detected or released), such as a brief animated photo where several frames are captured when a photo is taken, creating a "live" effect) and/or video media).

For example, as illustrated in FIG. 19A, spatial media item 1904 is the spatial video media item captured as described with respect to FIGS. 17A-17R, which includes at least one component for a viewer's right eye (e.g., captured using second camera 704B) and at least one component for a viewer's left eye (e.g., captured using first camera 704A) that, when viewed concurrently, create the appearance/illusion of depth. In some embodiments, HMD X700 displays view 1906 of spatial media item 1904 via media viewer user interface 1902 in response to a user request to view spatial media item 1904, such as input 1752 (e.g., described above) directed to the thumbnail of spatial media item 1904 in captured media icon X738 and/or another input selecting spatial media item 1904 from a media library, camera roll, file viewer, and/or other application or service. At FIG. 19A, spatial media item 1904 is not yet being played back (e.g., spatial media item 1904 is stopped or paused at 0:00), and view 1906 includes a still preview of spatial media item 1904.

In some embodiments, spatial media item 1904 may be a brief animated photo (e.g., a photo with a "live" effect) where each of the several frames captured when the photo is taken (e.g., before and/or after the input requesting capture of the photo was detected) includes stereoscopic depth information, for example, a first frame component for the viewer's right eye and a second frame component for the viewer's left eye. Like video media, a brief animated photo can be played back (e.g., as a brief animation, a loop, and/or a "bouncing" or "reversing" loop) or viewed as a still preview (e.g., including the first frame component and the second frame component for a single key frame).

HMD X700 displays media viewer user interface 1902 overlaying XR environment 1908 (e.g., a physical environment and/or an environment-locked virtual environment), such that portions of XR environment 1908 that are not currently overlaid and/or are semi-transparently overlaid by any of the elements of media user interface 1902 remain visible to the user via display module X702 of HMD X700, for example, as the rendered output of the virtual environment and/or optical and/or video passthrough of the physical environment.

View 1906 of spatial media item 1904 is an un-expanded media viewing option (e.g., format). In particular, as illustrated in FIG. 19A, view 1906 is displayed at a first size that occupies a first portion (e.g., 10-25%) of the display region of display module X702 and/or of a viewport through which the environment is visible (e.g., the user's field-of-view via HMD X700). Accordingly, while displaying view 1906 of spatial media item 1904 overlaying XR environment 1908, a relatively large portion of XR environment 1908 remains visible surrounding view 1906 and the other elements of media viewer user interface 1902. In some embodiments, HMD X700 displays view 1906 of spatial media item 1904 with a first set of three-dimensional effects. For example, displaying view 1906 includes concurrently displaying a first view component for the user's right eye and a second, different view component for the user's left eye, creating an appearance/illusion of depth. For example, the first and second view components may include different views of view 1906 such that view 1906 appears as a first virtual object (e.g., of the first size) placed at a particular depth in front of the user in XR environment 1908, and/or the first and second view components may include the different components of spatial media item 1904 such that the contents of spatial media item 1904 appear three-dimensional. In some embodiments, view 1906 is a standard media item view. For example, HMD X700 may display media items at the first size and/or with the first set of three-dimensional effects by default in response to a request to view the media items.

At FIG. 19A, HMD X700 displays media viewer user interface 1902 further including options affordance 1910, play button 1912, media library menu 1914 (e.g., a scrollable array or "carousel" of thumbnails of media items from a media library, including a thumbnail corresponding to spatial media item 1904 and thumbnails corresponding to other media items from the media library), and other user interface elements such as a playback status indicator (e.g., showing the current and remaining playback time), a volume button, and a back button (e.g., for navigating away from view 1906 of spatial media item 1904). However, as described with respect to FIGS. 17A-17R, spatial media item 1904 includes instances of high-motion video capture, in particular, the portion from 0:08-0:14 when the viewpoint movement had exceeded 10° angular distance from the original anchor location and a new anchor location had not yet been established. as described with respect to FIGS. 17J-17M. Because spatial media item 1904 includes instances of high-motion video capture and is thus classified as a high-motion or unstable video media item, at FIG. 19A, HMD X700 does not display an expanded view option in media viewer user interface 1902. In other embodiments, instead of entirely foregoing displaying an expanded view option for spatial media item 1904, HMD X700 may instead display an expanded view option using a visually de-emphasized appearance, for example, as illustrated in FIG. 19D.

At FIG. 19A, HMD X700 detects input 1916 (e.g., a touch, tap, gesture, air gesture, voice, and/or gaze input) directed to options affordance 1910. In response to input 1916, at FIG. 19B, HMD X700 displays options menu 1918 including selectable menu items 1918A-1918E, respectively corresponding to options to expand, edit, duplicate, hide, and add spatial media item 1904 to an album. In particular, selectable menu item 1918A represents an expanded viewing option (e.g., format), described in more detail below with respect to FIG. 19F, for spatial media item 1904. For example, in response to detecting an input selecting selectable menu item 1918A, HMD X700 will display an expanded view (e.g., 1938) of media item 1904, where the expanded view is displayed at a larger size that occupies a larger portion of the display region of display module X702 and/or of the viewport through which the environment is visible than is occupied by view 1906, as described below with respect to FIG. 19F. However, as relatively less (if any) of XR environment 1908 is concurrently visible, a user viewing media with the expanded viewing option may be more susceptible to physical discomfort caused by apparent camera movement or instability in the media, such as motion sickness, eye strain, headache, and/or disorientation, especially when using an HMD such as HMD X700 and/or when viewing media with three-dimensional effects. Accordingly, at FIG. 19B, HMD X700 displays selectable menu item 1918A with warning icon 1920, indicating that the expanded viewing option is not recommended for spatial media item 1904, which includes instances of high-motion video capture and is thus classified as a high-motion or unstable video media item.

Figure 19B:
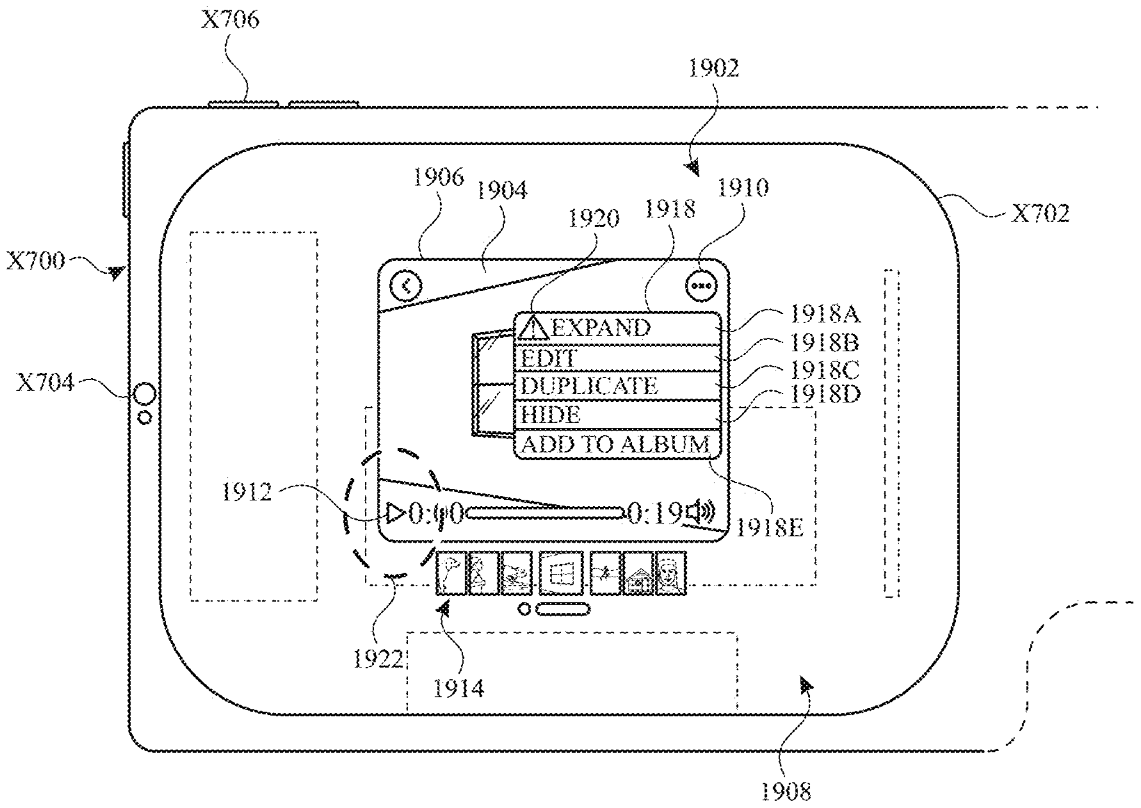

At FIG. 19B, while displaying view 1906 of spatial media item 1904, HMD X700 detects input 1922 (e.g., a touch, tap, gesture, air gesture, voice, and/or gaze input) directed to play button 1912. As spatial media item 1904 is a high-motion video media item, the apparent camera movement or instability during playback of the instances of high-motion video capture may lead to physical discomfort even when viewing with view 1906 of spatial media item 1904 (e.g., the un-expanded media viewing option). Accordingly, in response to detecting input 1922, at FIG. 19C, HMD X700 displays playback notification 1924, a warning notification indicating that spatial media item 1904 is a high-motion video that may cause physical discomfort when viewing playback. Playback notification 1924 includes confirmation affordance 1924A, which can be selected to proceed with playback of spatial media item 1904 (e.g., confirming the playback request of input 1922), and cancellation affordance 1924B, which can be selected to cancel playback of spatial media item 1904. In some embodiments, HMD X700 will dismiss playback notification 1924 in response to detecting an input directed to confirmation affordance 1924A, cancellation affordance 1924B, and/or a region outside of playback notification 1924.

Figure 19C:
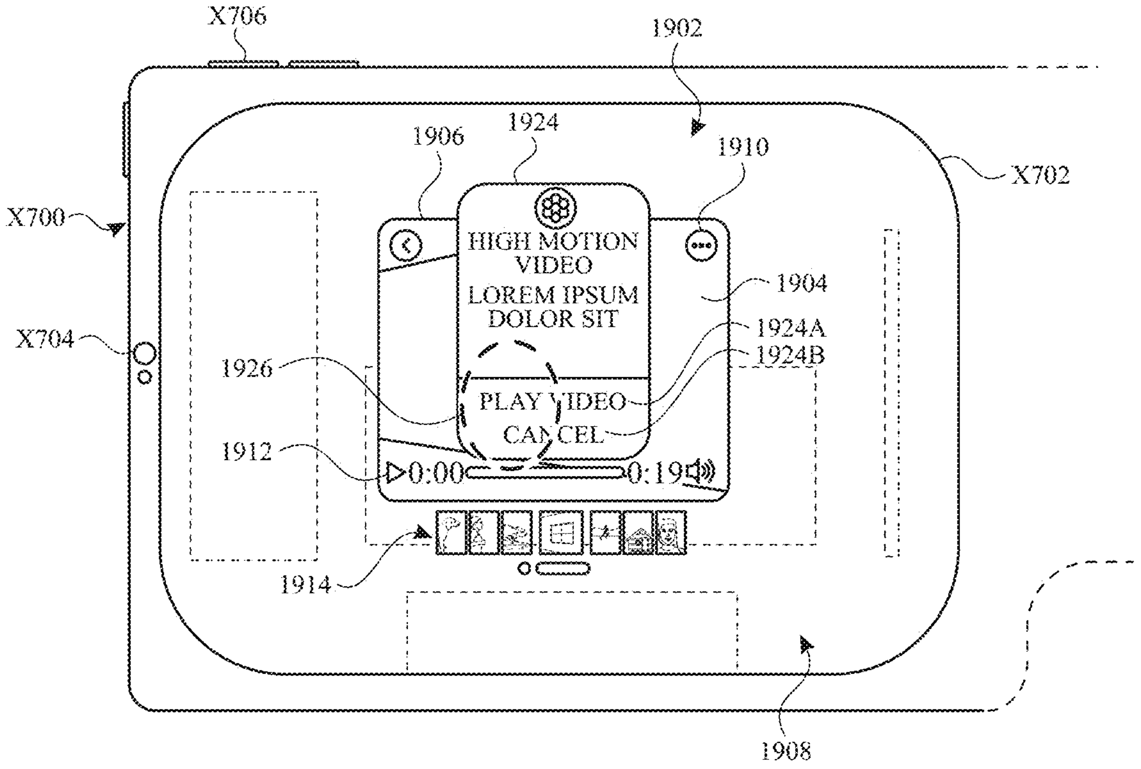
Figure 19D:
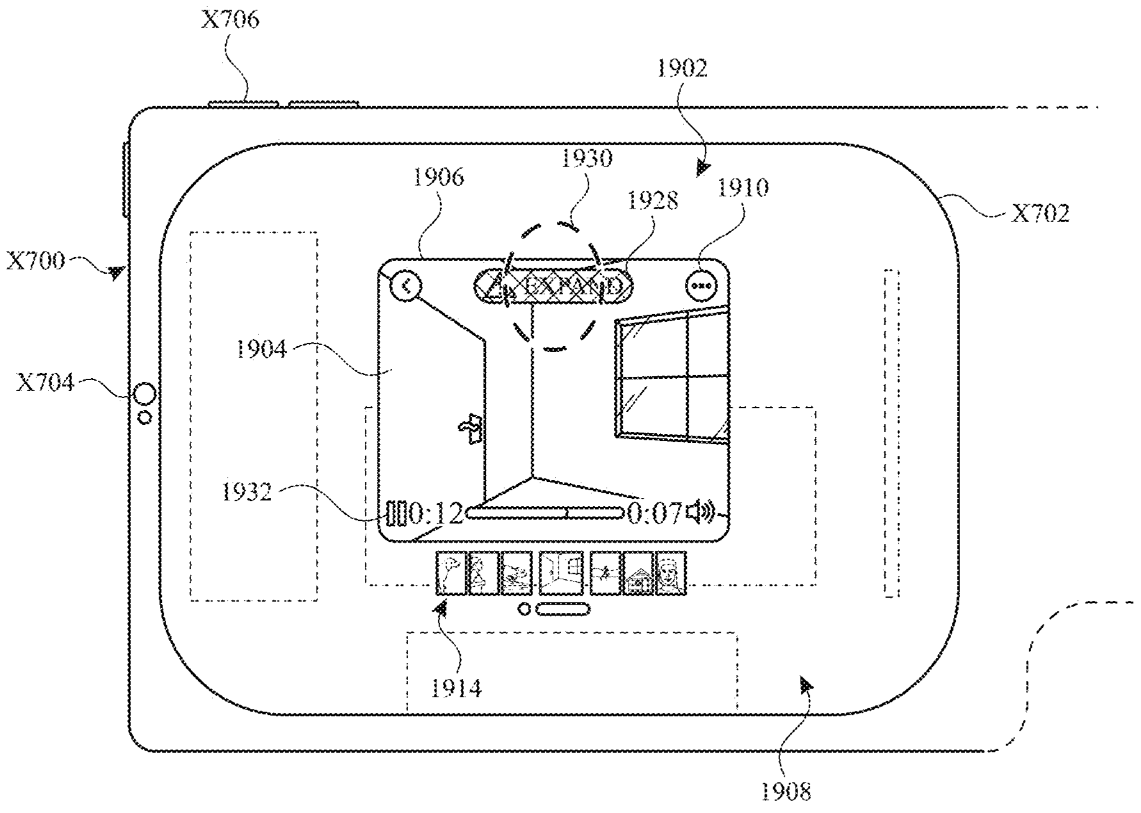

At FIG. 19C, HMD X700 detects input 1926 (e.g., a touch, tap, gesture, air gesture, voice, and/or gaze input) directed to confirmation affordance 1924A. In response, at FIG. 19D, HMD X700 stops displaying playback notification 1924 and initiates playback of spatial media item 1904 with view 1906, for instance, continuing to display view 1906 of spatial media item 1904 at the first size occupying the first portion (e.g., 10-25%) of the display region of display module X702 and/or of the viewport through which the environment is visible and continuing to apply the first set of three-dimensional effects. As illustrated in FIG. 19D, during playback of spatial media item 1904, HMD X700 replaces play button 1912 with pause button 1932 in media viewer user interface 1902. In some embodiments, HMD X700 applies one or more viewing comfort enhancements during playback of spatial media item 1904, such as the dynamic modification of frame size described with respect to FIGS. 15A-15N and 16 and/or digital stabilization techniques for reducing (e.g., via post-processing) the apparent movement of the viewpoint.

At FIG. 19D, while displaying view 1906 of spatial media item 1904 (e.g., during playback of spatial media item 1904), HMD X700 displays viewing mode affordance 1928 representing the expanded media viewing option (e.g., as described below with respect to FIG. 19F). As discussed above, because spatial media item 1904 is a high-motion video media item, the apparent camera movement or instability during playback of the instances of high-motion video capture may lead to physical discomfort even when viewing with the expanded media viewing option. Accordingly, HMD X700 displays viewing mode affordance 1928 with a visually de-emphasized appearance. As illustrated in FIG. 19D, displaying viewing mode affordance 1928 with the visually de-emphasized appearance includes reducing the brightness and/or contrast of (e.g., "graying out") viewing mode affordance 1928, represented in FIG. 19D by cross-hatching, and/or displaying viewing mode affordance 1928 with warning icon 1920. In other embodiments, while displaying view 1906 of spatial media item 1904 (e.g., during playback of spatial media item 1904), instead of displaying viewing mode affordance 1928 with the visually de-emphasized appearance, HMD X700 may instead hide the expanded media viewing option in options menu 1918 as described above and forego displaying viewing mode affordance 1928.

Figure 19E:
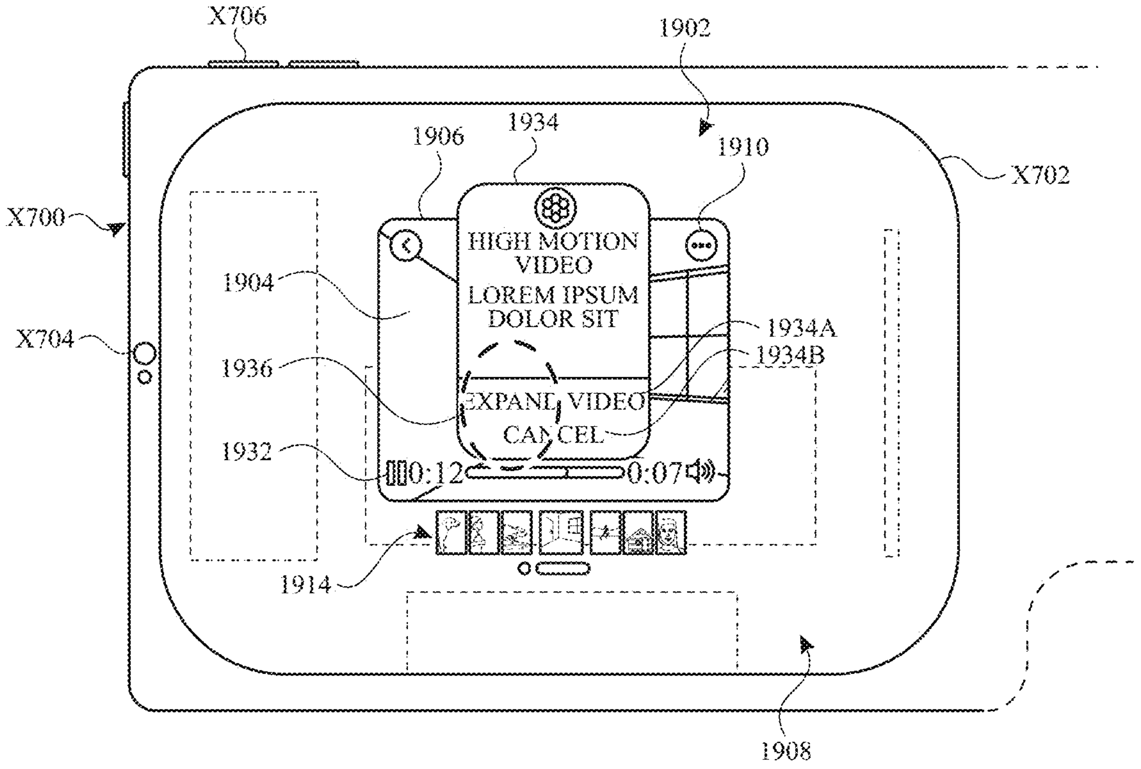

At FIG. 19D, HMD X700 detects input 1930 (e.g., a touch, tap, gesture, air gesture, voice, and/or gaze input) directed to viewing mode affordance 1928, requesting display of spatial media item 1904 with the expanded media viewing option (e.g., as playback of spatial media item 1904 continues). In response, at FIG. 19E, HMD X700 displays expansion notification 1934, a warning notification indicating that spatial media item 1904 is a high-motion video that may cause physical discomfort when viewing with the expanded media viewing option. Expansion notification 1934 includes confirmation affordance 1934A, which can be selected to proceed with expansion of spatial media item 1904 (e.g., confirming the expansion request of input 1930), and cancellation affordance 1934B, which can be selected to cancel expansion of spatial media item 1904 (e.g., continuing displaying view 1906 of spatial media item 1904). In some embodiments, as illustrated in FIG. 19E, HMD X700 pauses playback of spatial media item 1904 while displaying expansion notification 1934. In some embodiments, HMD X700 will dismiss expansion notification 1934, and, if playback was paused in response to input 1930, resume playback of spatial media item 1904 in response to detecting an input directed to confirmation affordance 1934A, cancellation affordance 1934B, and/or a region outside of expansion notification 1934.

At FIG. 19E, HMD X700 detects input 1936 (e.g., a touch, tap, gesture, air gesture, voice, and/or gaze input) directed to confirmation affordance 1934A. In response to detecting input 1936, at FIG. 19F, HMD X700 resumes playback of media item 1904, but updates media viewer user interface 1902 to display view 1938 of spatial media item 1904 instead of view 1906 of spatial media item 1904. View 1938 of spatial media item 1904 is the expanded media viewing option (e.g., format). In particular, as illustrated in FIG. 19F, view 1938 is displayed at a larger size than the first size (e.g., the size of view 1906) that occupies a larger portion of the display region of display module X702 and/or of the viewport through which the environment is visible than was occupied while displaying view 1906. In some embodiments, view 1938 may include a frameless view that darkens the visible portion of XR environment 1908 and blurs or feathers the edges of spatial media item 1904 (e.g., depicted in FIG. 19F by crosshatching surrounding view 1938), a full-screen view (e.g., occupying the entire display region of display module X702), and/or an immersive view that extends into and beyond the peripheries of the user's field-of-view. Accordingly, while displaying view 1938 of spatial media item 1904 overlaying XR environment 1908, a relatively smaller portion of XR environment 1908 may remain visible to the user, or XR environment 1908 may be entirely obscured by view 1938 of media item 1904.

In some embodiments, HMD X700 displays view 1938 (e.g., the expanded view) of spatial media item 1904 with a second set of three-dimensional effects, which may include additional or alternative three-dimensional effects than the first set of three-dimensional effects applied while displaying view 1706 of spatial media item 1904. For example, as with the first set of three-dimensional effects, displaying view 1938 may include concurrently displaying a first view component for the user's right eye and a second, different view component for the user's left eye, creating an appearance/illusion of depth. For example, the first and second view components may include the different components of spatial media item 1904 such that the contents of spatial media item 1904 appear three-dimensional. As another example, the first and second view components may include different views of view 1938 such that view 1938 appears as a different virtual object than view 1706, for instance, modeling view 1938 as a curved scrim (e.g., panorama), a hemisphere, or a sphere around the user in the XR environment.

Figure 19F:
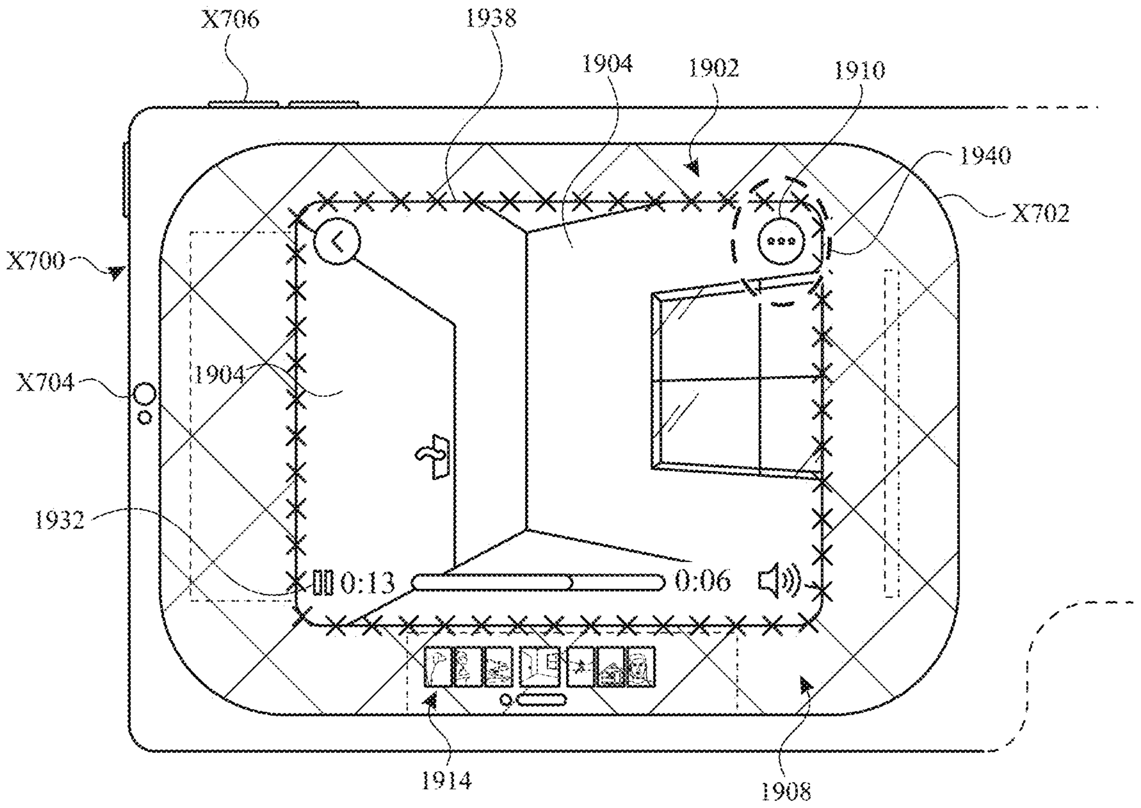
Figure 19G:
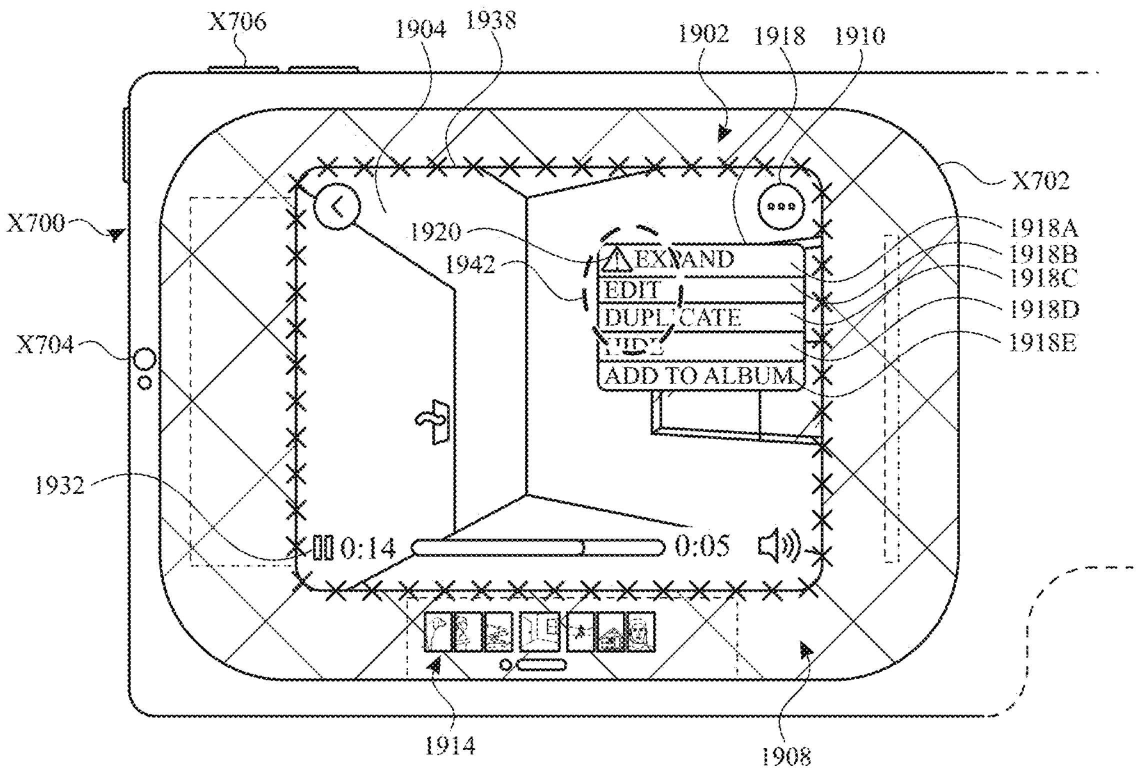

At FIG. 19F, HMD X700 detects input 1940 (e.g., a touch, tap, gesture, air gesture, voice, and/or gaze input) directed to options affordance 1910. In response to input 1940, at FIG. 19G, HMD X700 displays options menu 1918 as described above, and detects input 1942 (e.g., a touch, tap, gesture, air gesture, voice, and/or gaze input) directed to selectable menu item 1918B, requesting to edit spatial media item 1904. In response to detecting input 1942, at FIG. 19H, HMD X700 displays media editing user interface 1944 (e.g., instead of, included in, and/or overlaying media viewer user interface 1902). Media editing user interface 1944 includes representation 1946 of spatial media item 1904, trimming affordance 1948, and confirmation affordance 1950 along with other user interface elements such as a cancel affordance, mute affordance, and editing tool affordances.

Figure 19H:
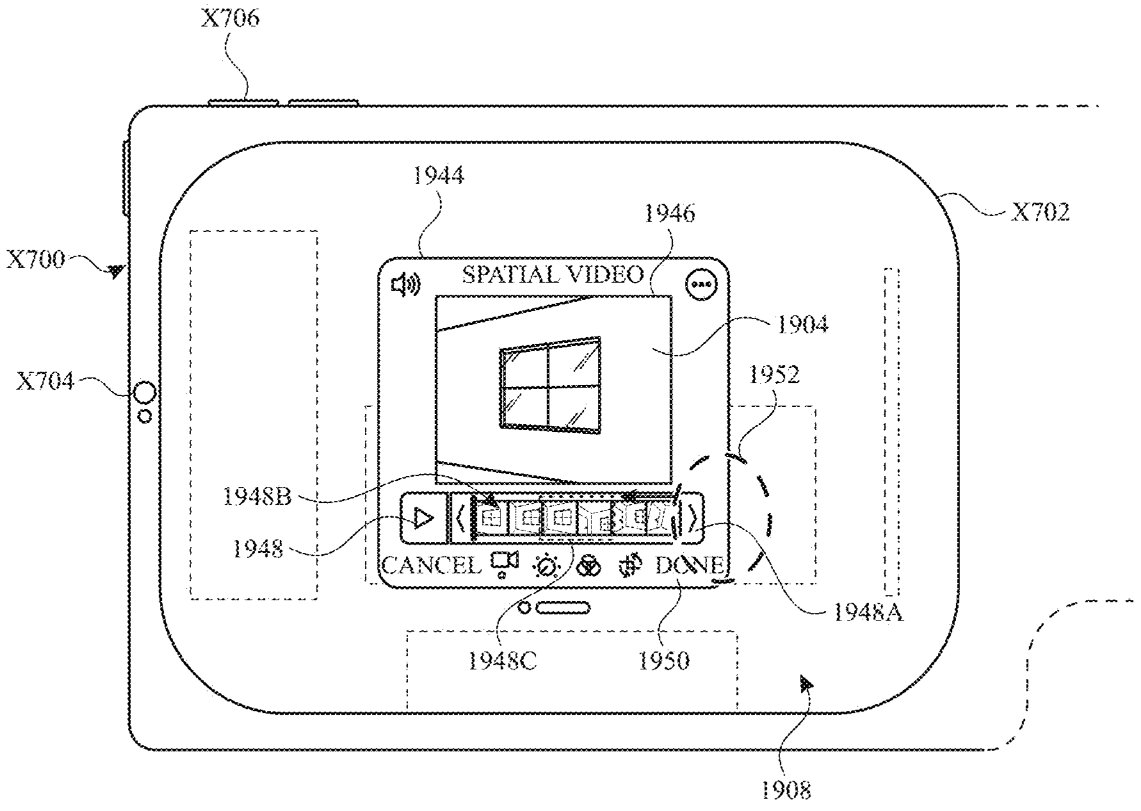

As illustrated in FIG. 19H, trimming affordance 1948 includes slider affordance 1948A; visual timeline 1948B, which includes frames of spatial media item 1904 arrayed from left to right in chronological order; and visual indication 1948C, which indicates instances of high-motion video capture in spatial media item 1904. For example, visual indication 1948C frames and/or highlights the frames of visual timeline 1948B corresponding to 0:08-0:14, when the viewpoint movement of the spatial video capture had exceeded 10° angular distance from the original anchor location and a new anchor location had not yet been established. At FIG. 19H, HMD X700 detects input 1952 (e.g., including a touch, gesture, air gesture, and/or gaze input)

swiping or dragging across slider affordance 1948A from the right end of visual timeline 1948B to a point corresponding to 0:07 seconds (e.g., to the left of visual indication 1948C).

Figure 19I:
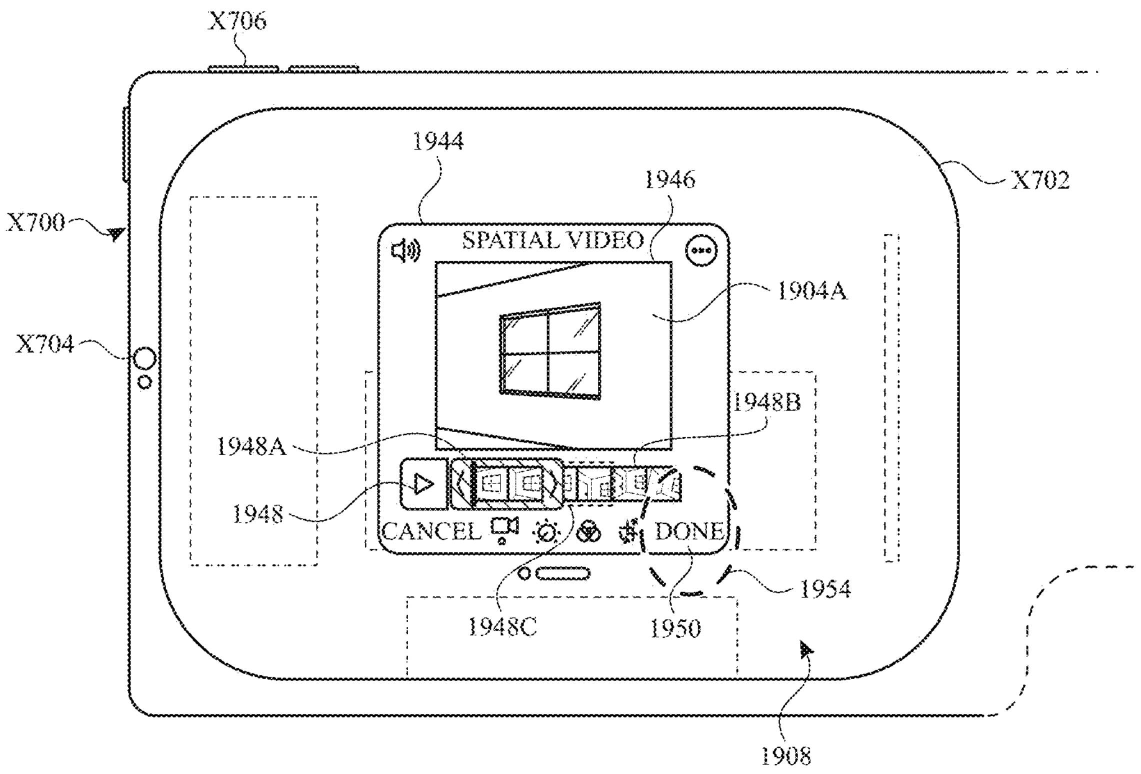
Figure 19J:
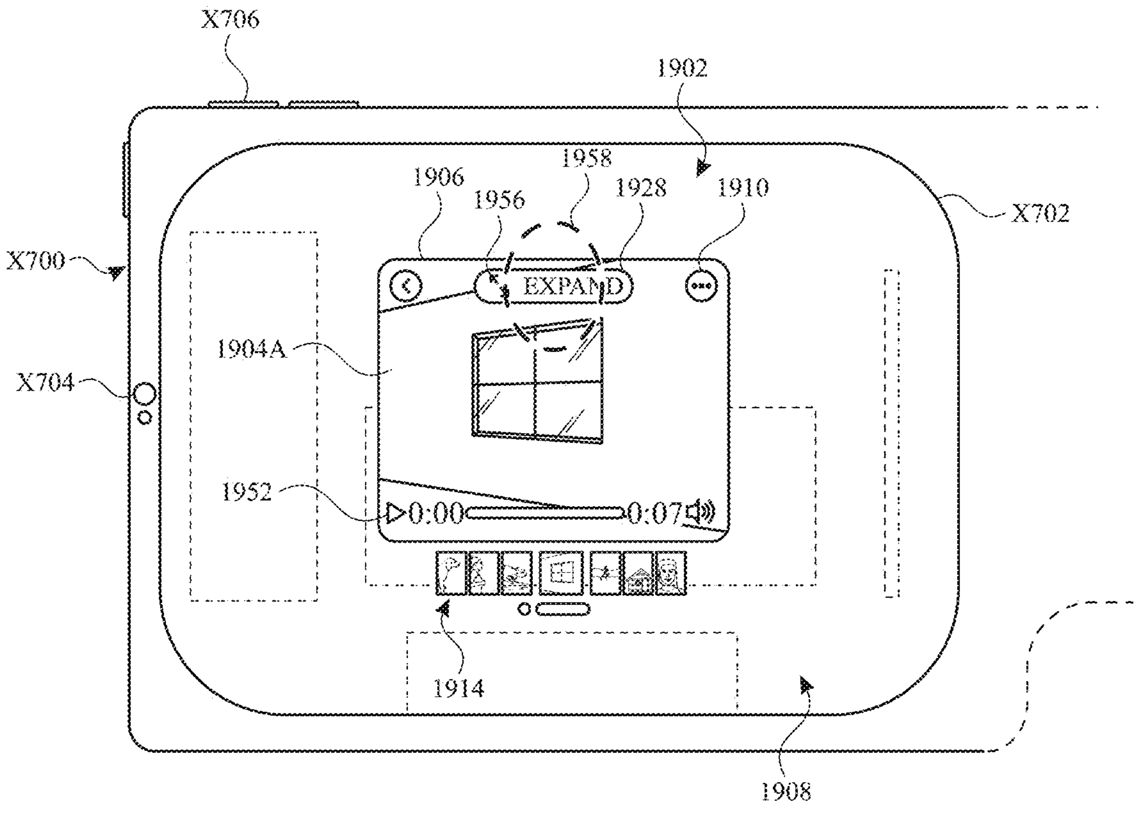

In response to input 1952, at FIG. 19I, HMD X700 generates spatial media item 1904A, a modified version of spatial media item 1904 that has been cut down to a runtime of 0:07 seconds, removing the instances of high-motion video capture in spatial media item 1904. Accordingly, spatial media item 1904A has a relatively low likelihood (e.g., compared to spatial media item 1904) of causing physical discomfort while viewing and is classified as a low-motion or stable video capture. At FIG. 19I, HMD X700 detects input 1954 (e.g., a touch, tap, gesture, air gesture, voice, and/or gaze input) directed to confirmation affordance 1950. In response to detecting input 1954, HMD X700 saves spatial media item 1904A (e.g., saving the modifications to spatial media item 1904 and/or saving spatial media item 1904A as a new, separate media item).

At FIG. 19J, HMD X700 displays (e.g., in response to detecting input 1954 and/or another input requesting to view spatial media item 1904A) media viewer user interface 1902 including view 1906 of spatial media item 1904A. As discussed with respect to spatial media item 1904 in FIG. 19A, view 1906 of spatial media item 1904A is the unexpanded media viewing option (e.g., format), displayed at the first size that occupies the first portion (e.g., 10-25%) of the display region of display module X702 and/or of the user's field of view and with the first set of three-dimensional effects applied. As spatial media item 1904A is classified as a low-motion or stable video capture, as illustrated in FIG. 19J, HMD X700 displays media viewer user interface 1902 including viewing mode affordance 1928 with a visually emphasized appearance. As illustrated in FIG. 19J, displaying viewing mode affordance 1928 with the visually emphasized appearance includes displaying viewing mode affordance with a standard brightness and/or contrast (e.g., without graying it out as described with respect to FIG. 19D), and/or displaying viewing mode affordance 1928 with expansion icon 1956 (e.g., instead of warning icon 1920). In some embodiments, in response to detecting a selection of options affordance 1910, HMD X700 will display selectable menu item 1918A (e.g., representing the expanded viewing option) in options menu 1918 without warning icon 1920.

Figure 19K:
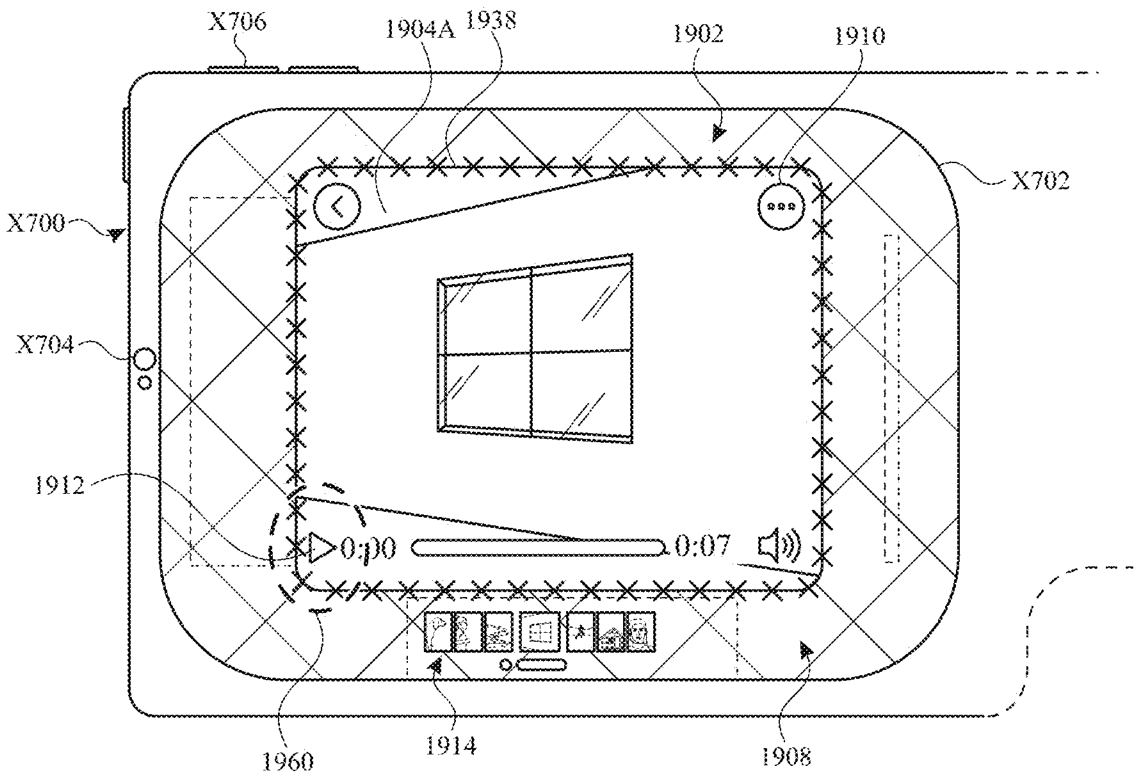

At FIG. 19J, HMD X700 detects input 1958 (e.g., a touch, tap, gesture, air gesture, voice, and/or gaze input) directed to viewing mode affordance 1928, requesting display of spatial media item 1904A with the expanded media viewing option. In response, at FIG. 19K, HMD X700 updates media viewer user interface 1902 to display view 1938 of spatial media item 1904A as described above with respect to FIG. 19E. As illustrated in FIG. 19K, view 1938 of spatial media item 1904A is displayed at the larger size than the first size, occupying the larger portion of the display region of display module X702 and/or of the viewport through which the environment is visible, and, in some embodiments, HMD X700 displays view 1938 of spatial media item 1904A with the second set of three-dimensional effects. Because spatial media item 1904A is classified as a low-motion or stable video capture, HMD X700 displays view 1938 of spatial media item 1904A without displaying expansion notification 1934 (e.g., proceeding with the requested expansion without providing a preliminary warning).

At FIG. 19K, HMD X700 detects input 1960 (e.g., a touch, tap, gesture, air gesture, voice, and/or gaze input) directed to play button 1912. In response to detecting input 1960, at FIG. 19L, initiates playback of spatial media item 1904A with view 1938. Because spatial media item 1904A is classified as a low-motion or stable video capture, HMD X700 initiates playback of spatial media item 1904A without displaying playback notification 1924 (e.g., starting playback without providing a preliminary warning). In some embodiments, as with playback of spatial media item 1904, HMD X700 applies one or more viewing comfort enhancements during playback of spatial media item 1904A, such as the dynamic modification of frame size described with respect to FIGS. 15A-15N and 16 and/or digital stabilization techniques for reducing (e.g., via post-processing) the apparent movement of the viewpoint.

Figure 19L:
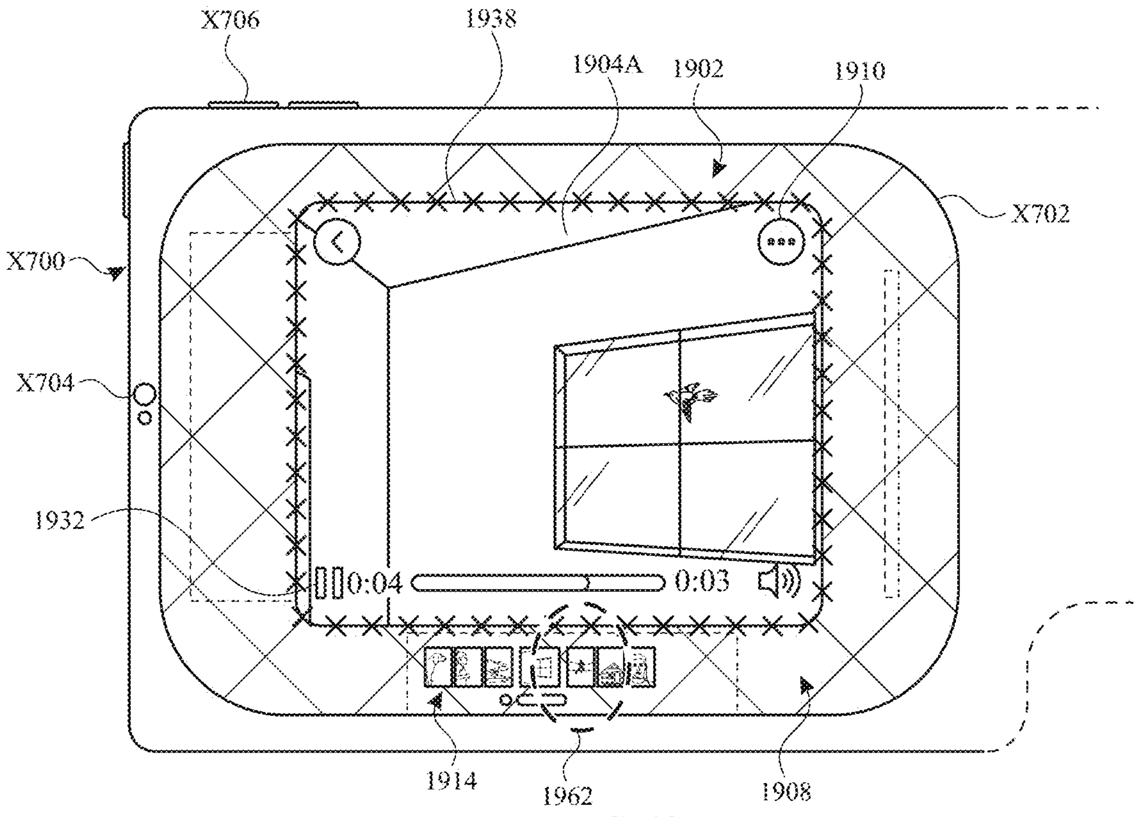
Figure 19M:
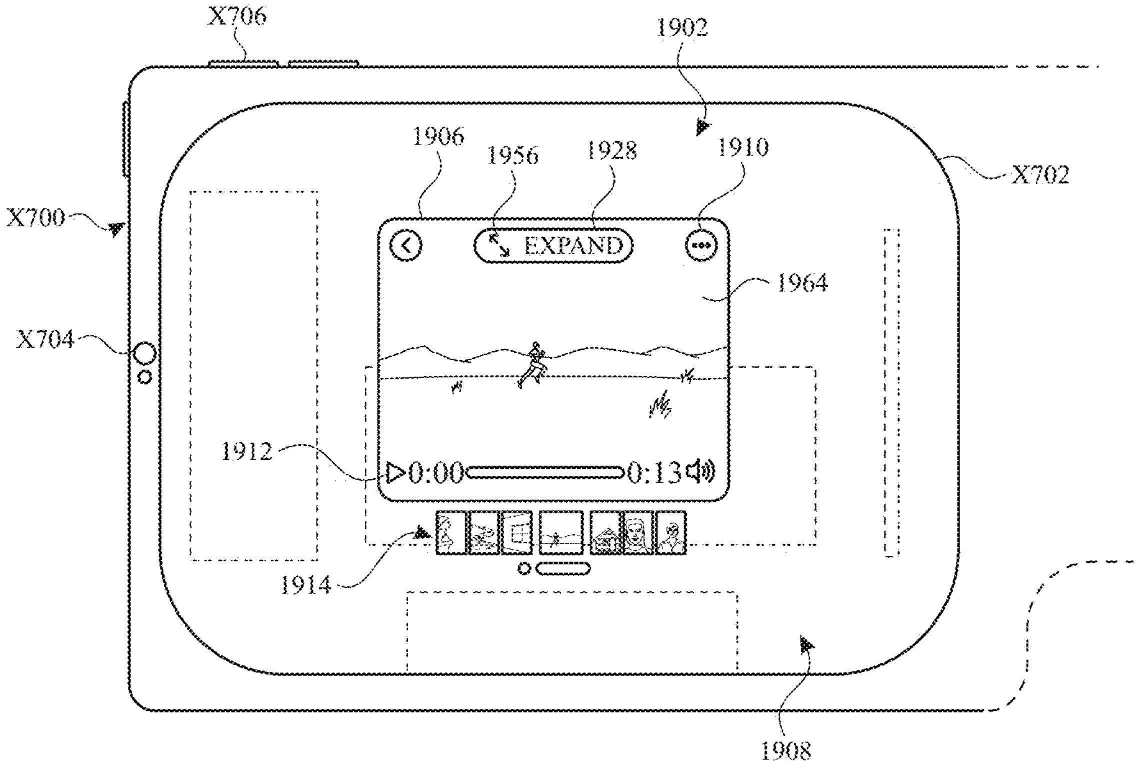

At FIG. 19L, HMD X700 detects input 1962 (e.g., a touch, tap, gesture, air gesture, voice, and/or gaze input) directed to a thumbnail in media library menu 1914 corresponding to media item 1964, another media item included in the media library (e.g., a spatial video media item and/or a spatial photo media item with a "live" effect (e.g., a brief animated photo)). In response to detecting input 1962, in FIG. 19M, HMD X700 updates media viewer user interface 1902 to display view 1906 of media item 1964. In some embodiments, as input 1962 is detected while displaying media with view 1938 (e.g., the expanded viewing option), HMD X700 may initially display view 1938 of media item 1964 instead of defaulting to view 1906.

Based on the stability characteristics of media item 1964, such as movements of the capture viewpoint detected during capture (e.g., while capturing as described above with respect to FIGS. 17A-17R and 18 and spatial media items 1904 and 1904A) and/or other apparent viewpoint movements present in media item 1964 (e.g., after processing, editing, and/or otherwise modifying captured video included in media item 1964), media item 1964 is classified as a low-motion or stable video capture. Accordingly, as described with respect to spatial media item 1904A at FIG. 19J, HMD X700 displays media viewer user interface 1902 including viewing mode affordance 1928 with the visually emphasized appearance. Additionally, in response to detecting a request to expand or initiate playback of media item 1964, HMD X700 would proceed to expand or initiate playback without providing preliminary warnings such as playback notification 1924 and/or expansion notification 1934. In some embodiments, if media item 1964 were instead classified as a high-motion or unstable video capture, HMD X700 would display media viewer user interface 1902 as described above with respect to spatial media item 1904, for example, hiding the expanded viewing option in options menu or displaying viewing mode affordance 1928 with the visually de-emphasized appearance, and would provide preliminary warnings such as playback notification 1924 and/or expansion notification 1934 in response to detecting a request to expand or initiate playback.

Additional descriptions regarding FIGS. 19A-19M are provided below in reference to method 2000 described with respect to FIG. 20.

FIG. 20 is a flow diagram of an exemplary method 2000 for surfacing a view setting for media playback based on media stability characteristics, in some embodiments. In some embodiments, method 2000 is performed at a computer system (e.g., 101, 1-100, 1-200, 3-100, 6-100, 6-200, 6-300, 6-400, 11.1.2-100, 700, X700, and/or 702) (e.g., a mobile computing device (e.g., a phone and/or tablet); e.g., a head-mounted display device) that is in communication with a display generation component (e.g., 1-102, 1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200,

11.3.2-204, 708, and/or X702) (e.g., a display controller; a touch-sensitive display system; a display (e.g., integrated and/or connected), a 3D display, a transparent display, a projector, a heads-up display, and/or a head-mounted display) (in some embodiments, the computer system includes a plurality of cameras including a first camera and a second camera (e.g., a camera array/stereo camera for spatial capture, where the first camera and the second camera are located a fixed distance apart, such that the perspective of the first camera is different from the perspective of the second camera and thus at least a portion of a field of view of the first camera is outside of a field of view of the second camera; in some embodiments, the computer system further includes one or more rear (user-facing) cameras and/or one or more forward (environment-facing) cameras)) (in some embodiments, the computer system include one or more sensors (e.g., as location sensors, motion sensors, orientation sensors, and/or depth sensors)). In some embodiments, method 2000 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 2000 are, optionally, combined and/or the order of some operations is, optionally, changed.

The computer system (e.g., 101, 1-100, 1-200, 3-100, 6-100, 6-200, 6-300, 6-400, 11.1.2-100, 700, X700, and/or 702), while displaying (2002) (in some embodiments, in a media viewing user interface (e.g., a gallery and/or library UI); in some embodiments, in a media playback user interface), via the display generation component (e.g., 1-102, **1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200, 11.3.2-204, 708, and/or X702), a representation (e.g., 1906) of a spatial media item (e.g., 1904, 1904A, and/or 1964) (in some embodiments, a thumbnail or preview of the media item; in some embodiments, while media playback of the media item is ongoing; in some embodiments, while media playback of the media item is not ongoing (e.g., paused/stopped)), wherein the spatial media item includes a first component corresponding to a viewpoint of a right eye and a second component, different from the first component, corresponding to a viewpoint of a left eye that when viewed concurrently create an illusion of a spatial representation (e.g., spatial video; e.g., concurrently viewing the first video component and the second video component creates an illusion of a three-dimensional representation of the video media; e.g., viewing different components with the left and right eye creates the illusion of depth by simulating parallax of the media contents) and in accordance with a determination (e.g., based on the contents of the media item (e.g., the video data) and/or metadata associated with the media item; in some embodiments, based on the amount of movement (e.g., translation, rotation, velocity, and/or acceleration) of a viewpoint of the media item and/or apparent camera movement in the media item) (in some embodiments, the apparent camera movement includes movement of the physical camera(s) used to capture the media item; in some embodiments, the apparent camera movement is a movement of a virtual camera (e.g., a “camera” capturing in and “moving” around a virtual environment))) that the spatial media item meets a set of one or more stability criteria (2004) (e.g., the media item has a more stable viewpoint during capture (e.g., relatively little apparent camera movement during capture) compared to a media item that does not meet the criterion; in some embodiments, the stability criteria include at least one criterion that is met when the apparent camera movement present in the media item does not exceed a threshold (e.g., overall angular movement of a radius less than 10°; angular velocity of less than 0.2 degrees/second; angular acceleration of less than 1 degree/second2, and/or another threshold movement amount)), displays (2006) a spatial viewing indicator (e.g., 1918A and/or 1928) (e.g., an icon, affordance, and/or other user interface element indicating an option (e.g., that is affected when the indicator is selected) of an alternative spatial viewing mode for the media item (e.g., an expanded (e.g., full screen and/or immersive) viewing mode, a viewing mode with particular three-dimensional output effect(s) applied, a viewing mode without attenuation effects applied, and/or another viewing mode)) with a first appearance (e.g., an appearance indicating that the alternative spatial viewing mode is available, recommended, and/or appropriate for the media item) concurrently with the representation of the spatial media item (e.g., as illustrated in FIGS. 19J and 19**M).

The computer system, while displaying (2002) the representation (e.g., 1906) of the spatial media item (e.g., 1904, 1904A, and/or 1964) and in accordance with a determination that the spatial media item does not meet the set of one or more stability criteria (e.g., the media item has a less stable viewpoint during capture (e.g., relatively more apparent camera movement during capture) compared to a media item that does meet the criterion; in some embodiments, the media item does not meet the set of one or more stability criteria when the apparent camera movement present in the media item exceeds one or more thresholds), forgoes displaying the spatial viewing indicator with the first appearance (in some embodiments, forgoing displaying the spatial viewing indicator (e.g., hiding the option of the alternative spatial viewing mode); in some embodiments, displaying the spatial viewing indicator with a different appearance (e.g., an appearance indicating that an alternative spatial viewing mode is not available, recommended, and/or appropriate for the media item, such as including a warning icon or glyph and/or visually deemphasizing (e.g., graying out, minimizing, and/or increasing the transparency) the appearance)) concurrently with the representation of the spatial media item (e.g., as illustrated in FIGS. 19A-19D). Conditionally changing the appearance of a spatial viewing indicator based on stability characteristics of the spatial media item provides improved feedback on a state of the computer system, improved control of media playback, and improved ergonomics of media playback devices. For example, displaying the spatial viewing indicator with the first appearance when the spatial media item meets stability criteria indicates to the user that the spatial media item is less to cause physical discomfort (e.g., motion sickness) when viewed in a spatial viewing mode and helps to surface the spatial viewing options to the user, while forgoing displaying the spatial viewing indicator with the first appearance when the spatial item does not meet the stability criteria indicates to the user that the media item is more likely to cause physical discomfort when viewed in the spatial viewing mode. Doing so also makes the user-system interface more efficient by helping the user to provide proper inputs and reducing user mistakes when operating/interacting with the system which, additionally, reduces power usage and improves battery life of the system by enabling the user to use the system more quickly and efficiently. For example, displaying the spatial viewing indicator with the first appearance when the spatial media item meets stability criteria assists the user with the spatial viewing controls for spatial media items that are less likely to cause discomfort when viewed in the spatial viewing mode, while forgoing displaying the spatial viewing indicator with the first appearance when the spatial item does not meet the stability criteria reduces extraneous inputs requesting to expand the view of spatial media items that are more likely to cause discomfort when viewed in the spatial viewing mode and/or inputs requesting to exit the spatial viewing mode due to discomfort caused by viewing.

In some embodiments, the computer system, prior to displaying the representation of the spatial media item, receives a request to display the representation of the spatial media item (e.g., 1752 in FIG. 17R) (e.g., via an input including a touch, tap, gesture, air gesture, voice, gaze, and/or other input type; e.g., a request to open a media item viewing application, a request to navigate through media items in a media viewing application, a request to view a media item that was embedded in other content such as a document, message or webpage, and/or a request to view content that includes an embedded version of the media item such as a request to view a document, message, or webpage), and in response to receiving the request to display the representation of the spatial media item, displays the representation of the spatial media item.

In some embodiments, the spatial viewing indicator (e.g., 1918A and/or 1928), when selected (e.g., via 1930, 1936, and/or 1958) (e.g., via a touch input, a gesture input, an air gesture input, a gaze input, and/or a button press input, such as a pinch air gesture input detected while a gaze input is directed to the spatial viewing indicator), causes the computer system to initiate providing an expanded representation (e.g., 1938) of the spatial media item (e.g., 1904, 1904A, and/or 1964) (in some embodiments, initiating displaying the expanded representation of the spatial media item; in some embodiments, initiating providing the expanded view includes performing a preliminary expansion step prior to displaying the spatial media item with the expanded view, such as providing a confirmation request or warning before proceeding with expanding the view), wherein a size of the expanded representation of the spatial media item (e.g., with respect to a viewport though which the environment is visible; in some embodiments, with respect to the size of the display (e.g., expanding to a "full screen" or "maximized" view of the spatial media item); in some embodiments, in embodiments using an HMD, expanding display of the spatial media item towards and/or beyond (e.g., a "frameless" or "immersive" view) the peripheries of the viewport though which the environment is visible)) exceeds a size of the representation of the spatial media item (e.g., the initially-displayed (e.g., default, un-expanded) representation of the spatial media item; e.g., with respect to the viewport though which the environment is visible) (e.g., as illustrated in FIGS. 19F-19G and 19K-19L). Conditionally changing the appearance of a spatial viewing indicator for entering an expanded view based on stability characteristics of the spatial media item provides improved feedback on a state of the computer system, improved control of media playback, and improved ergonomics of media playback devices. For example, in the expanded view controlled by the spatial viewing indicator, spatial media items that meet the stability criteria are less likely to cause physical discomfort (e.g., motion sickness), while spatial media items that do not meet the stability criteria are more likely to cause physical discomfort, as the stability of the spatial media impacts comfort more when viewed using a larger portion of a viewport though which the environment is visible.

In some embodiments, the computer system, while displaying the representation (e.g., 1906) of the spatial media item, provides a first three-dimensional effect (e.g., by adjusting display of the representation of the spatial media item to create the first three-dimensional effect) for the spatial media item (e.g., 1904, 1904A, and/or 1964) (in some embodiments, the first three-dimensional effect includes displaying the spatial media item as a first virtual object in a three-dimensional XR environment (e.g., a virtual display of a particular size and shape that can, e.g., cast shadow, cast light, and/or interact with the XR environment in other ways); in some embodiments, the first three-dimensional effect includes outputting both the first component and the second component to create the illusion of spatial representation; in some embodiments, the first three-dimensional effect includes outputting spatial audio for the spatial media item (e.g., audio including at least a first channel for a left ear of the user and a second, different channel for a right ear of the user, using binaural hearing to create the illusion of sound emanating from a particular location in three-dimensional space)). In some embodiments, the computer system, while displaying the expanded representation (e.g., 1938) of the spatial media item (in some embodiments, in response to detecting a selection of the spatial viewing indicator and/or another input (e.g., an additional confirmation input)), provides a second three-dimensional effect for the spatial media item (e.g., 1904, 1904A, and/or 1964), wherein the second three-dimensional effect is different from the first three-dimensional effect (in some embodiments, the second three-dimensional effect includes displaying the spatial media item as a different virtual object in a three-dimensional XR environment (e.g., a "frameless" or "immersive" object that extends into and beyond the peripheries of the viewport though which the environment is visible, such as a curved scrim, dome, or globe, that the user can view from different viewpoints); in some embodiments, the second three-dimensional effect includes rendering and/or recreating portions of the spatial media item in three-dimensions; in some embodiments, the second three-dimensional effect also includes one or more three-dimensional effects included in the first three-dimensional effect, such as outputting the both the first component and the second component of the spatial media item and/or outputting spatial audio). Providing the spatial media item with different three-dimensional effects in the expanded view and in the default (e.g., un-expanded) view provides improved control of media playback and improved ergonomics of media playback devices. For example, the three-dimensional effects used for the spatial media item are automatically changed based on whether the spatial media item is likely to cause physical discomfort when viewed with particular three-dimensional effects. Doing so also makes the user-system interface more efficient by helping the user to provide proper inputs and reducing user mistakes when operating/interacting with the system which, additionally, reduces power usage and improves battery life of the system by enabling the user to use the system more quickly and efficiently, for example, by automatically changing the three-dimensional effects without requiring extraneous inputs to select and apply the three-dimensional effects.

In some embodiments, the computer system detects an input (e.g., 1930 and/or 1958) selecting the spatial viewing indicator (e.g., via a touch input, a gesture input, an air gesture input, a gaze input, and/or a button press input, such as a pinch air gesture input detected while a gaze input is directed to the spatial viewing indicator; e.g., an input requesting the expanded view of the spatial media item), and in response to detecting the input selecting the spatial viewing indicator, initiates providing the expanded representation (e.g., 1938) of the spatial media item (e.g., 1904, 1904A, and/or 1964). In some embodiments, initiating providing the expanded representation of the spatial media item includes, in accordance with a determination that the spatial media item does not meet the set of one or more stability criteria, displaying, via the display generation component, an expansion notification interface (e.g., 1934) (in some embodiments, while displaying the representation of the spatial media item; in some embodiments, overlaying the representation of the spatial media item), wherein the expansion notification interface indicates that the spatial media item does not meet the set of one or more stability criteria (e.g., as illustrated in FIG. 19E) (in some embodiments, a warning indicating to the user that the stability characteristics of the spatial video media are likely to cause physical discomfort when viewing in the expanded mode) (in some embodiments, the notification interface is displayed prior to displaying the expanded representation of the spatial media item; in some embodiments, the computer system only proceeds to display the expanded representation of the spatial media item if further confirmation is received from the user (e.g., by selecting a confirmation affordance of the notification interface)). In some embodiments, initiating providing the expanded representation of the spatial media item includes, in accordance with a determination that the spatial media item meets the set of one or more stability criteria, displaying, via the display generation component, the expanded representation (e.g., 1938) of the spatial media item and forgoing displaying the expansion notification interface (e.g., as illustrated in FIG. 19K) (e.g., displaying the expanded version in response to the input selecting the spatial viewing indicator without first displaying the notification interface (e.g., without seeking further confirmation from the user)). Conditionally providing a notification interface prior to expanding the view of a spatial media item based on the stability characteristics of the spatial media item provides improved control of media playback and improved ergonomics of media playback devices. Doing so also makes the user-system interface more efficient by helping the user to provide proper inputs and reducing user mistakes when operating/interacting with the system which, additionally, reduces power usage and improves battery life of the system by enabling the user to use the system more quickly and efficiently. For example, the user can quickly expand the view of spatial media items that are unlikely to cause physical discomfort when viewing in the expanded state using a single input, whereas the user is provided with additional information and warning before the expanding the view of spatial media items that are likely to cause physical discomfort in the expanded state.

In some embodiments, the expansion notification (e.g., 1934) interface includes a selectable confirmation object (e.g., 1934A) (e.g., a confirmation affordance) that, when selected, causes the computer system to initiate displaying the expanded representation of the spatial media item (e.g., proceeds with expanding the view), and a selectable cancellation object (e.g., 1934B) (e.g., a cancel affordance) that, when selected, causes the computer system to forego displaying the expanded representation of the spatial media item (in some embodiments, and causes display of the notification interface to cease; in some embodiments, and resumes displaying the representation of the spatial media item (e.g., the default/un-expanded view)). Providing a notification interface with the option to confirm or cancel expanding the view of the spatial media item provides improved control of media playback and improved ergonomics of media playback devices, for example, by providing the user with additional information and the opportunity to cancel expanding the view of spatial media items that are likely to cause physical discomfort in the expanded state.

In some embodiments, the computer system, in accordance with the determination that the spatial media item does not meet the set of one or more stability criteria (e.g., the media item has a less stable viewpoint during capture (e.g., relatively more apparent camera movement during capture) compared to a media item that does meet the stability criteria; in some embodiments, the media item does not meet the set of one or more stability criteria when the apparent camera movement present in the media item exceeds one or more thresholds), displays the spatial viewing indicator (e.g., 1918A and/or 1928) with a second appearance, different from the first appearance (e.g., an appearance indicating that the alternative spatial viewing mode is not recommended and/or appropriate for the media item; in some embodiments, the second appearance visually deemphasizes the spatial viewing indicator in comparison to the first appearance; in some embodiments, the second appearance includes an additional warning indicator), concurrently with the representation of the spatial media item (e.g., as illustrated in FIGS. 19B and 19D). Conditionally changing the appearance of a spatial viewing indicator based on stability characteristics of the spatial media item provides improved feedback on a state of the computer system, improved control of media playback, and improved ergonomics of media playback devices. For example, displaying the spatial viewing indicator with the first appearance when the spatial media item meets stability criteria indicates to the user that the spatial media item is less to cause physical discomfort (e.g., motion sickness) when viewed in a spatial viewing mode and helps to surface the spatial viewing options to the user, while displaying the spatial viewing indicator with the second appearance when the spatial item does not meet the stability criteria affirmatively indicates to the user that the media item is more likely to cause physical discomfort when viewed in the spatial viewing mode. Doing so also makes the user-system interface more efficient by helping the user to provide proper inputs and reducing user mistakes when operating/interacting with the system which, additionally, reduces power usage and improves battery life of the system by enabling the user to use the system more quickly and efficiently. For example, displaying the spatial viewing indicator with the first appearance when the spatial media item meets stability criteria assists the user with the spatial viewing controls for spatial media items that are less likely to cause discomfort when viewed in the spatial viewing mode, while displaying the spatial viewing indicator with the second appearance when the spatial item does not meet the stability criteria reduces extraneous inputs requesting to expand the view of spatial media items that are more likely to cause discomfort when viewed in the spatial viewing mode and/or inputs requesting to exit the spatial viewing mode due to discomfort caused by viewing.

In some embodiments, displaying the spatial viewing indicator (e.g., 1918A and/or 1928) with the first appearance includes displaying the spatial viewing indicator at a first contrast level (e.g., as illustrated in FIGS. 19J and 19M), and displaying the spatial viewing indicator with the second appearance includes displaying the spatial viewing indicator at a second contrast level that is lower in contrast than the first contrast level (e.g., as illustrated in FIG. 19D) (e.g., the second appearance "grays out" or "fades" the spatial viewing indicator by reducing the overall contrast of the spatial viewing indicator, e.g., by reducing the saturation of colors, increasing the brightness of dark portions, decreasing the brightness of light portions, increasing the transparency, and/or adjusting other visual settings to decrease the visual prominence of the spatial viewing indicator). Graying or fading out the spatial viewing indicator when the spatial media does not meet the stability criteria provides improved feedback on a state of the computer system, improved control of media playback, and improved ergonomics of media playback devices. Doing so also makes the user-system interface more efficient by helping the user to provide proper inputs and reducing user mistakes when operating/interacting with the system which, additionally, reduces power usage and improves battery life of the system by enabling the user to use the system more quickly and efficiently. For example, graying out the spatial viewing indicator intuitively conveys that, while the spatial viewing option exists (e.g., is available), its use is not recommended and/or appropriate for spatial media items that are more likely to cause physical discomfort when viewed in the spatial viewing mode.

In some embodiments, displaying spatial viewing indicator with the second appearance includes displaying the spatial viewing indicator with a warning icon (e.g., 1920) (e.g., a warning glyph, such as an exclamation point, a stop sign, a caution triangle, a no/prohibited symbol, an X, a minus, a red symbol, a yellow symbol, and/or another symbol, icon, or text element) (e.g., as illustrated in FIGS. 19B and 19D), and displaying the spatial viewing indicator with the first appearance includes foregoing displaying the spatial viewing indicator with the warning icon (e.g., as illustrated in FIGS. 19J and 19M) (e.g., the first appearance does not include the warning glyph; in some embodiments, the first appearance includes displaying the spatial viewing indicator with a different icon, such as a full screen glyph (e.g., one or more arrows and/or one or more boxes indicating expansion) and/or another icon indicating availability, recommendation, and/or appropriateness of the feature). Displaying the spatial viewing indicator with a warning icon when the spatial media does not meet the stability criteria provides improved feedback on a state of the computer system, improved control of media playback, and improved ergonomics of media playback devices. Doing so also makes the user-system interface more efficient by helping the user to provide proper inputs and reducing user mistakes when operating/interacting with the system which, additionally, reduces power usage and improves battery life of the system by enabling the user to use the system more quickly and efficiently. For example, the presence of the warning icon with the spatial viewing indicator intuitively conveys that, while the spatial viewing option exists (e.g., is available), its use is not recommended and/or appropriate for spatial media items that are more likely to cause physical discomfort when viewed in the spatial viewing mode, reducing extraneous inputs requesting the spatial viewing mode.

In some embodiments, forgoing displaying the spatial viewing indicator with the first appearance (e.g., in accordance with a determination that the spatial media item does not meet the set of one or more stability criteria) includes forgoing displaying the spatial viewing indicator concurrently with the representation of the spatial media item (e.g., as illustrated in FIGS. 19A-19B) (e.g., the spatial viewing indicator is hidden and/or not provided if the media item has a less stable viewpoint during capture (e.g., relatively little apparent camera movement during capture) compared to a media item that does meet the criterion). Conditionally forgoing displaying the spatial viewing indicator based on the stability characteristics of the spatial media item provides improved feedback on a state of the computer system, improved control of media playback, and improved ergonomics of media playback devices. Doing so also makes the user-system interface more efficient by helping the user to provide proper inputs and reducing user mistakes when operating/interacting with the system which, additionally, reduces power usage and improves battery life of the system by enabling the user to use the system more quickly and efficiently. For example, forgoing displaying the spatial viewing indicator for media items that are more likely to cause physical discomfort when viewed in the spatial viewing mode reduces extraneous inputs requesting the spatial viewing mode.

In some embodiments, the computer system, after forgoing displaying the spatial viewing indicator concurrently with the representation of the spatial media item and while displaying the representation of the spatial media item without the spatial viewing indicator, displays, via the display generation component, a selectable menu user interface object (e.g., 1910) (e.g., a menu affordance, such as an icon, text, and/or other user interface object). In some embodiments, the computer system detects an input (e.g., 1910) selecting the selectable menu user interface object (e.g., via a touch input, a gesture input, an air gesture input, a gaze input, and/or a button press input, such as a pinch air gesture input detected while a gaze input is directed to the menu affordance), and in response to detecting a selection of the selectable menu user interface object, the computer system displays, via the display generation component, an option menu interface (e.g., 1918) (in some embodiments, concurrently with the representation of the spatial media item (e.g., overlaying, next to, and/or near the spatial media item)), wherein displaying the option menu interface includes displaying a second spatial viewing indicator (e.g., 1918A) (e.g., a spatial viewing indicator menu option; in some embodiments, the second spatial viewing indicator includes one or more of the properties discussed herein with respect to the spatial viewing indicator (e.g., in some embodiments, in accordance with a determination that the spatial media item meets the set of one or more stability criteria, displaying the second spatial viewing indicator with the first appearance in the options menu; in some embodiments, in accordance with a determination that the spatial media item does not meet the set of one or more stability criteria, displaying the second spatial viewing indicator with the second appearance in the options menu; in some embodiments, the second spatial viewing indicator, when selected, causes the computer system to initiate providing the expanded representation of the spatial media item); e.g., the second spatial viewing indicator is hidden in the options menu when the spatial viewing indicator is not displayed). Providing the spatial viewing indicator in a separate options menu provides improved feedback on a state of the computer system, improved control of media playback, and improved ergonomics of media playback devices. For example, the options menu provides users with the option to explicitly request the spatial viewing mode even for media items that are more likely to cause physical discomfort when viewed in the spatial viewing mode while still conveying when the spatial viewing mode is not recommended and/or appropriate based on the stability characteristics (e.g., when the spatial viewing indicator is not being displayed with the representation of the spatial media otherwise).

In some embodiments, the computer system detects a request (e.g., 1942, 1952, and/or 1954) (e.g., a touch input, a gesture input, an air gesture input, a gaze input, and/or a button press input; in some embodiments, while displaying the representation of the spatial media item (e.g., using an edit function embedded in the spatial media viewer); in some embodiments, via a separate editing application, service, or user interface) to edit the spatial media item (in some embodiments, the request to edit the spatial media item includes one or more inputs for adding visual effects, applying post-processing effects (e.g., automatic video stabilization, color correction, smoothing, and/or other post-processing techniques), cutting, splicing, cropping, reordering, slowing down, speeding up, and/or other media editing actions) (in some embodiments, while editing the spatial media item, providing an indication of portions of the spatial media item that do not meet the stability criteria (e.g., flagging and/or highlighting high-motion portions of the spatial media item for cutting/cropping)), and in response to detecting the request to edit the spatial media item, the computer system generates a modified version of the spatial media item (e.g., 1904A) (in some embodiments, saving, outputting, and/or compiling the edited spatial media item; in some embodiments, as a new spatial media item (e.g., a new file or object); in some embodiments, updating the original spatial media item itself). In some embodiments, the computer system, while displaying (in some embodiments, in a media viewing user interface (e.g., a gallery and/or library UI); in some embodiments, in a media playback user interface), via the display generation component, a representation (e.g., 1906) of the modified version of the spatial media item (e.g., 1904A) (in some embodiments, a thumbnail or preview of the edited media item; in some embodiments, while media playback of the edited media item is ongoing; in some embodiments, while media playback of the edited media item is not ongoing (e.g., paused/stopped)) and in accordance with a determination that the modified version of the spatial media item meets the set of one or more stability criteria (in some embodiments, even if the (unmodified) spatial media item does not meet the set of one or more stability criteria (e.g., the editing performed on the spatial media item removed, stabilized, or otherwise corrected the portions of the spatial media item that caused the spatial media item to not meet the set of one or more stability criteria)), displays the spatial viewing indicator with the first appearance concurrently with the representation of the modified version of the spatial media item (e.g., as illustrated in FIG. 19J). In some embodiments, the computer system, while displaying the representation of the modified version of the spatial media item and in accordance with a determination that the modified version of the spatial media item does not meet the set of one or more stability criteria (in some embodiments, even if the (unmodified) spatial media item meets the set of one or more stability criteria (e.g., the editing performed on the spatial media item added, destabilized, or otherwise created portions of the spatial media item that cause the spatial media item to no longer meet the set of one or more stability criteria)), forgoes displaying the spatial viewing indicator with the first appearance concurrently with the representation of the modified version of the spatial media item (e.g., the display of the spatial viewing indicator is changed based on the current stability characteristics of the spatial media item, taking into account edits or updates to the spatial media item). Conditionally changing the appearance of a spatial viewing indicator based on current (e.g., updated/edited) stability characteristics of the spatial media item provides improved feedback on a state of the computer system, improved control of media playback, and improved ergonomics of media playback devices. For example, displaying the spatial viewing indicator with the first appearance when the updated/edited spatial media item meets stability criteria indicates to the user that the updated/edited spatial media item is less to cause physical discomfort (e.g., motion sickness) when viewed in a spatial viewing mode and helps to surface the spatial viewing options to the user, while forgoing displaying the spatial viewing indicator with the first appearance when the updated/edited spatial item does not meet the stability criteria indicates to the user that the updated/edited media item is more likely to cause physical discomfort when viewed in the spatial viewing mode. Doing so also makes the user-system interface more efficient by helping the user to provide proper inputs and reducing user mistakes when operating/interacting with the system which, additionally, reduces power usage and improves battery life of the system by enabling the user to use the system more quickly and efficiently. For example, displaying the spatial viewing indicator with the first appearance when the updated/edited spatial media item meets stability criteria assists the user with the spatial viewing controls for updated/edited spatial media items that are less likely to cause discomfort when viewed in the spatial viewing mode, while forgoing displaying the spatial viewing indicator with the first appearance when the updated/edited spatial item does not meet the stability criteria reduces extraneous inputs requesting to expand the view of updated/edited spatial media items that are more likely to cause discomfort when viewed in the spatial viewing mode and/or inputs requesting to exit the spatial viewing mode due to discomfort caused by viewing.

In some embodiments, the request to edit the spatial media item includes a request (e.g., 1952) to remove a portion of the spatial media item (e.g., as illustrated in FIGS. 19H-19I) (e.g., editing the spatial media item includes trimming/cutting the spatial media item; in some embodiments, one or more portions; in some embodiments, the portion of the spatial media item does not meet (e.g., taken on its own) the stability criteria (e.g., the portion has a less stable viewpoint during capture (e.g., relatively more apparent camera movement during capture) than portions of the spatial media item that do meet the stability criteria)), and the modified version of the spatial media item does not include the portion of the spatial media item (e.g., as illustrated in FIG. 19J) (in some embodiments, if the removed portion includes all portions of the spatial media item that do not meet the stability criteria (e.g., if all high-motion portions are cut), the modified version of the spatial media item meets the stability criteria).

In some embodiments, the computer system, while displaying, via the display generation component, the representation of the spatial media item, detects an input (e.g., 1922, 1926, and/or 1960) requesting to play the spatial media item. In some embodiments, the computer system, in response to detecting the input requesting to play the spatial media item and in accordance with a determination that the spatial media item does not meet the set of one or more stability criteria, displays a playback notification interface (e.g., 1924) (in some embodiments, while displaying the representation of the spatial media item; in some embodiments, overlaying the representation of the spatial media item), wherein the expansion notification interface indicates that the spatial media item does not meet the set of one or more stability criteria (in some embodiments, a warning indicating to the user that the stability characteristics of the spatial video media are likely to cause physical discomfort during playback) (in some embodiments, the notification interface is displayed prior to playing the spatial media item; in some embodiments, the computer system only proceeds with playing of the spatial media item if further confirmation is received from the user (e.g., by selecting a confirmation affordance of the notification interface)) (e.g., as illustrated in FIG. 19C). In some embodiments, the computer system, in response to detecting the input requesting to play the spatial media item and in accordance with a determination that the spatial media item meets the set of one or more stability criteria, plays the spatial media item and forgoes displaying the playback notification interface (e.g., as illustrated in FIG. 19L) (e.g., playing the spatial media item in response to the input requesting playback without first displaying the notification interface (e.g., without seeking further confirmation from the user)). Conditionally providing a notification interface prior to playing back spatial media item based on the stability characteristics of the spatial media item provides improved control of media playback and improved ergonomics of media playback devices. Doing so also makes the user-system interface more efficient by helping the user to provide proper inputs and reducing user mistakes when operating/interacting with the system which, additionally, reduces power usage and improves battery life of the system by enabling the user to use the system more quickly and efficiently. For example, the user can quickly initiate playback of spatial media items that are unlikely to cause physical discomfort using a single input, whereas the user is provided with additional information and warning before playing back spatial media items that are likely to cause physical discomfort.

In some embodiments, the computer system, while playing the spatial media item, modifies playback of the spatial media item to reduce an appearance of movement of a viewpoint corresponding to the spatial media item while the spatial media item was being captured (e.g., reducing and/or attenuating perceived/apparent camera movement present in the spatial media item; in some embodiments, automatically applying digital stabilization techniques to the playback; in some embodiments, changing the visual prominence of the video media item relative to a border region (e.g., as described with respect to FIGS. 15A-15N and 16)). Automatically stabilizing playback of a spatial media item to reduce the appearance of viewpoint movement improved ergonomics of media playback devices (e.g., reducing the likelihood of physical discomfort such as motion sickness while viewing video media). Doing so also makes the user-system interface more efficient by helping the user to provide proper inputs and reducing user mistakes when operating/interacting with the system which, additionally, reduces power usage and improves battery life of the system by enabling the user to use the system more quickly and efficiently.

In some embodiments, the computer system, while displaying the representation of the spatial media item, detects an input (e.g., 1962) requesting to view a second spatial media item different from the spatial media item (e.g., via a touch input, a gesture input, an air gesture input, a gaze input, and/or a button press input; in some embodiments, selecting an affordance for navigating to another media item (in some embodiments, a "next" or "previous" button; in some embodiments, a thumbnail in a media carousel and/or other media library representation); in some embodiments, detecting a gesture or air gesture (e.g., a swipe forward or backwards motion) for navigating to another media item), and in response to detecting the input requesting to view the second spatial media item, the computer system ceases displaying the representation of the spatial media item and displays, via the display generation component, a representation (e.g., 1906) (in some embodiments, a thumbnail or preview of the second media item; in some embodiments, while media playback of the second media item is ongoing; in some embodiments, while media playback of the second media item is not ongoing (e.g., paused/stopped)) of the second spatial media item (e.g., 1964) (in some embodiments, while displaying the representation of the second spatial media item, in accordance with a determination that the second spatial media item meets the stability criteria, displaying the spatial viewing indicator with the first appearance concurrently with the representation of the second spatial media item, and in accordance with a determination that the second spatial media item does not meet the stability criteria, forgoing displaying the spatial viewing indicator with the first appearance concurrently with the representation of the second spatial media item) (e.g., as illustrated in FIG. 19M).

In some embodiments, the set of one or more stability criteria includes a criterion that is met when movement of a viewpoint corresponding to the spatial media item while the spatial media item was being captured (e.g., detected (e.g., by one or more motion sensors during capture of the spatial media item) and/or estimated movement of the viewpoint of the spatial media (e.g., of one or more cameras used to capture the spatial media item)) does not exceed (e.g., at any point in the playback time of the spatial media item) a threshold displacement (e.g., a maximum movement amount, e.g., as described with respect to FIGS. 17A-17R and 18; in some embodiments, a maximum angular distance (e.g., 8°, 10°, and/or 12° pitch and/or yaw rotation); in some embodiments, a maximum linear distance (e.g., 15, 18, and/or 21 cm horizontal and/or vertical translation)) from an anchor location representing a target viewpoint (e.g., a location representing an initial and/or steady viewpoint, as described with respect to FIGS. 17A-17R and 18; in some embodiments, one or more anchor locations (e.g., the displacement may be measured with respect to a respective anchor location for each respective shot, scene, and/or clip in the spatial media item)). (In some embodiments, for spatial media captured as described with respect to FIGS. 17A-17R and 18, movement of the viewpoint does not meet the criterion if the movement "breaks" out of the region represented by the boundary element (e.g., as illustrated in FIGS. 17A-17R and 18); in some embodiments, for spatial media captured as described with respect to FIGS. 17A-17R and 18, movement of the viewpoint does not meets the criterion if the movement remains within the region represented by the boundary element and/or if the spatial media is edited to remove portions of the spatial media captured after the movement has broken out of the region represented by the boundary element and before another steady viewpoint has been established.) Conditionally changing the appearance of the spatial viewing indicator based on whether the viewpoint of the spatial media item moves more than a threshold amount provides improved control of media playback and improved ergonomics of media playback devices. For example, when viewed using an HMD and/or with three-dimensional effects, noticeable (e.g., above-threshold) viewpoint movement can increase the likelihood physical discomfort (e.g., motion sickness) even if the movement is slow or gradual, so the spatial viewing option may not be available, recommended, and/or appropriate for a media item that does not meet a displacement threshold criterion.

In some embodiments, the set of one or more stability criteria includes a criterion that is met when movement of a viewpoint corresponding to the spatial media item while the spatial media item was being captured (e.g., detected (e.g., by one or more motion sensors during capture of the spatial media item) and/or estimated movement of the viewpoint of the spatial media (e.g., of one or more cameras used to capture the spatial media item)) does not exceed (in some embodiments, at any point in the playback time of the spatial media item; in some embodiments, on average for a particular sampling period (e.g., 0.5, 1, and/or 3 seconds)) a threshold rate of change (e.g., a maximum magnitude of velocity and/or acceleration; e.g., maximum linear acceleration of 1.5 m/s2, 2 m/s2, and/or 2.5 m/s2; e.g., a maximum linear velocity of 1 m/s, 1.5 m/s, and/or 2 m/s; e.g., a maximum angular acceleration of 45°/s2, 50°/s2, and/or 55°/s2; e.g., a maximum angular velocity of 25°/s, 30°/s, and/or 35°/s; in some embodiments, a combined (e.g., normalized) magnitude of velocity and/or acceleration of any vertical translation component, any horizontal translation component, any pitch rotation component, and/or any yaw rotation component included in the viewpoint movement). (In some embodiments, for spatial media captured as described with respect to FIGS. 13A-13P and 14, movement of the viewpoint does not meet the criterion if the visual indicator (e.g., 1304, X1304, and/or 1312) and/or the text notice (e.g., 1324) is displayed during capture; in some embodiments, for spatial media captured as described with respect to FIGS. 13A-13P and 14, movement of the viewpoint meets the criterion if the visual indicator (e.g., 1304, X1304, and/or 1312) and/or the text notice (e.g., 1324) is not displayed during capture and/or if the spatial media is edited to remove portions of the spatial media captured while the visual indicator and/or text notice were being displayed.) Conditionally changing the appearance of the spatial viewing indicator based on whether the viewpoint of the spatial media item moves with more than a threshold rate of change (e.g., acceleration and/or velocity) provides improved control of media playback and improved ergonomics of media playback devices. For example, when viewed using an HMD and/or with three-dimensional effects, sudden or fast (e.g., above-threshold) viewpoint movements can increase the likelihood physical discomfort (e.g., motion sickness) even if the movement is not large in magnitude, so the spatial viewing option may not be available, recommended, and/or appropriate for a media item that does not meet a velocity and/or acceleration threshold criterion.

In some embodiments, aspects/operations of methods 800, 1000, 1200, 1400, 1600, 1800, and 2000 may be interchanged, substituted, and/or added between these methods. For example, the spatial media being viewed in method 2000 may be media captured using the user interfaces and indicators described with respect to methods 800, 1000, 1200, 1400, and/or 1800, and the video playback interfaces and techniques described with respect to method 1600 may be applied while viewing spatial media according to method 2000. For brevity, these details are not repeated here.

FIGS. 21A-21O illustrate example techniques for displaying one or more camera user interfaces for capture of media, in some embodiments. FIG. 22 is a flow diagram of methods of providing a spatial media capture mode, in some embodiments. FIG. 23 is a flow diagram of methods of providing a spatial media capture mode option, in some embodiments. The user interfaces in FIGS. 21A-21O are used to illustrate the processes below, including the processes in FIG. 22 and FIG. 23.

Figure 21A:
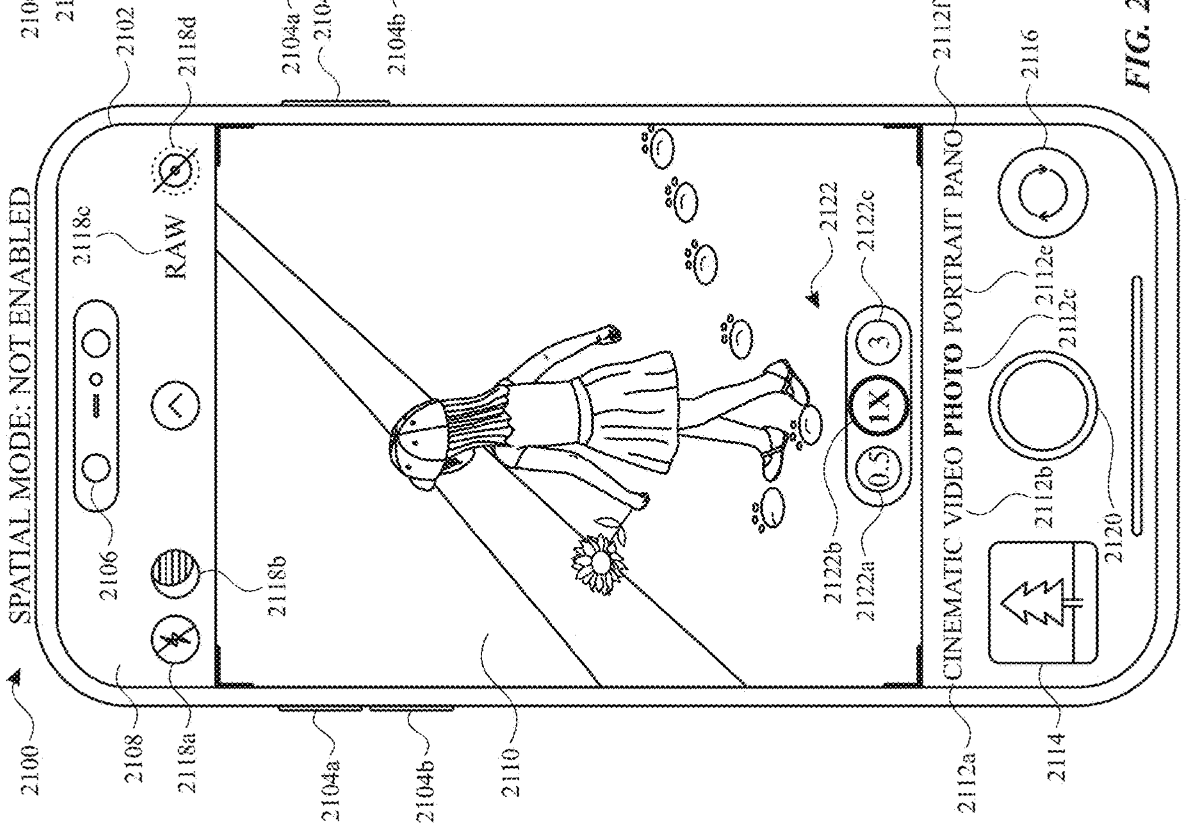
Figures 21D, 21E:
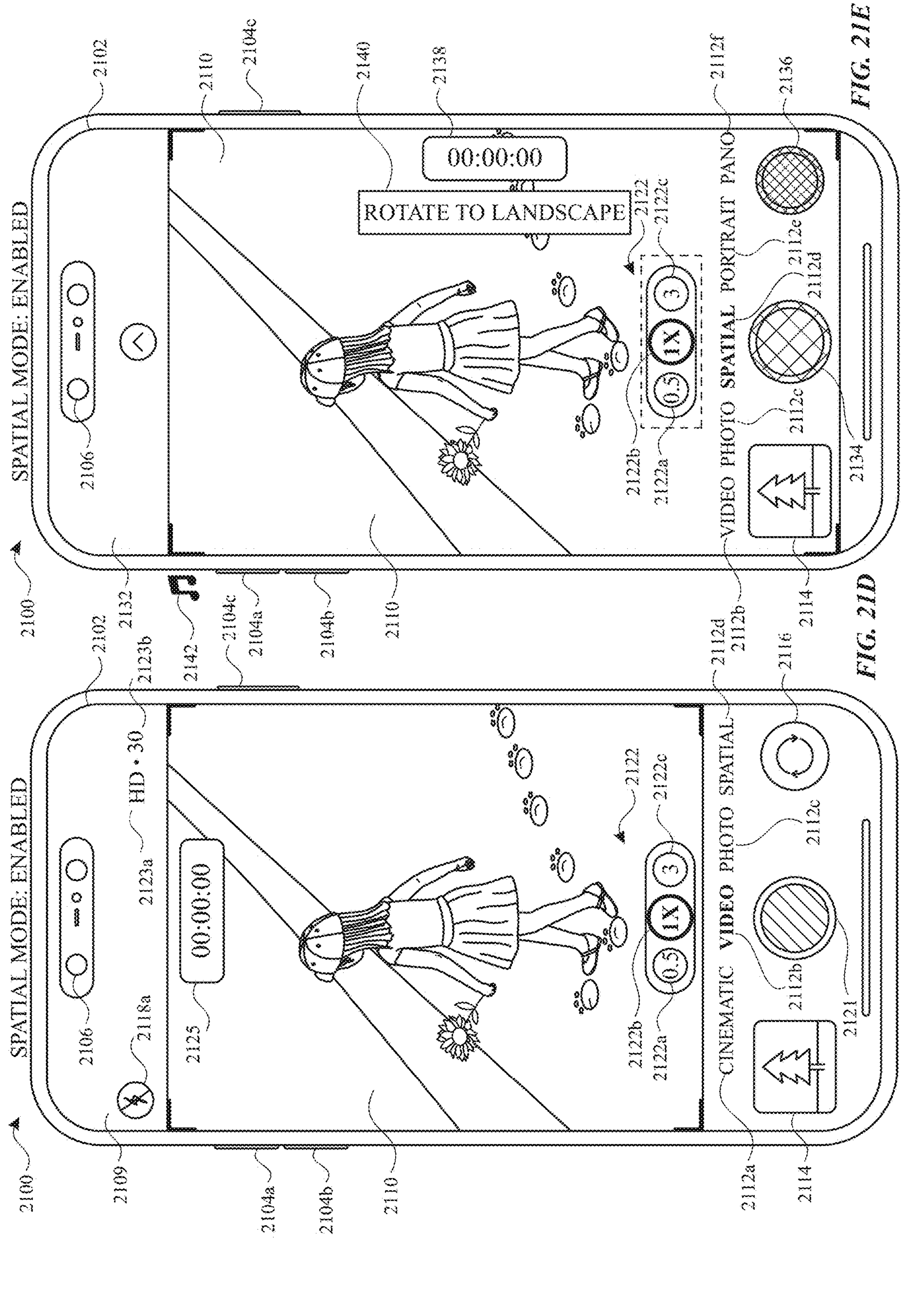
Figure 21F:
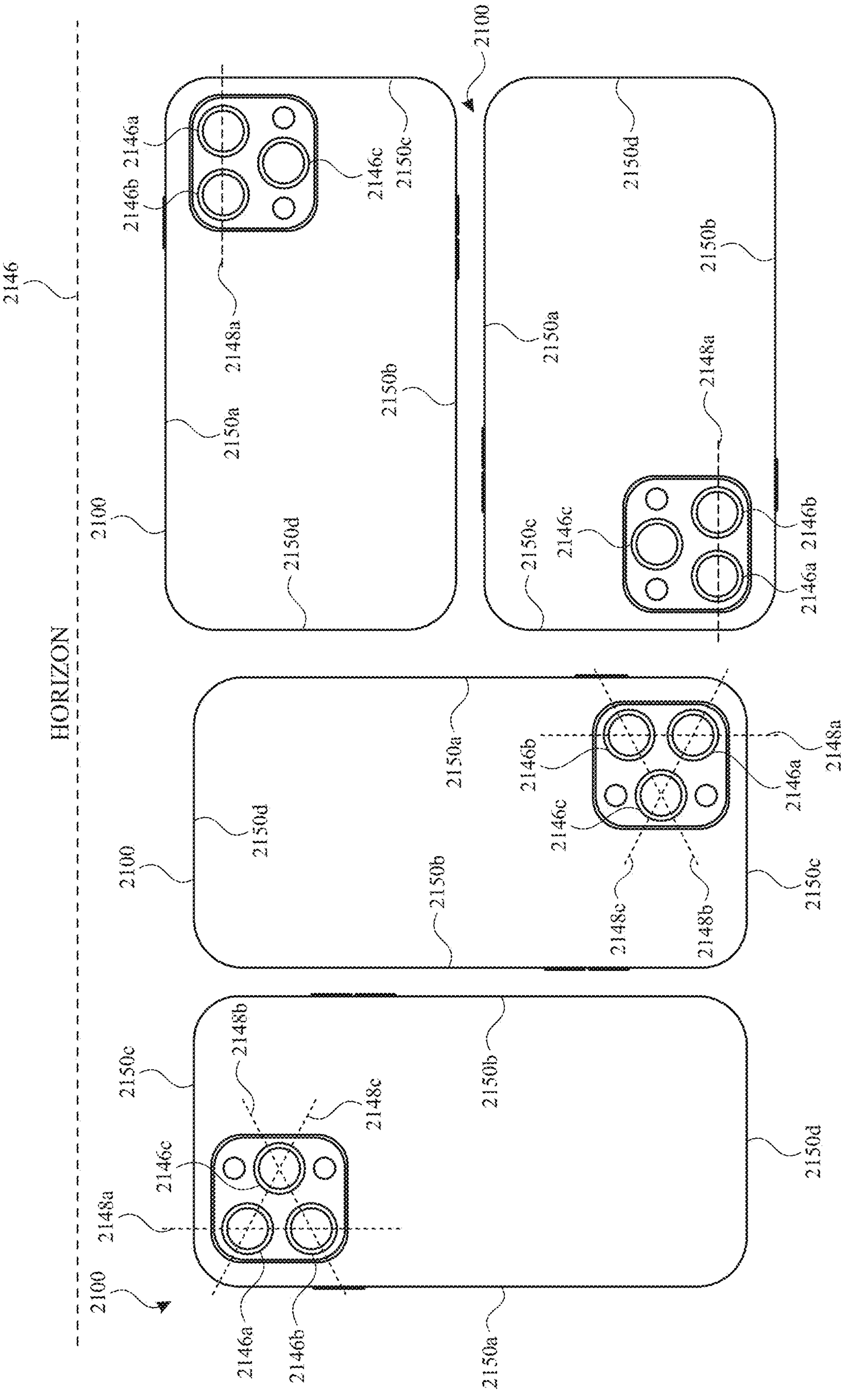

FIG. 21A depicts computer system 2100, which is a smart phone with touch-sensitive display 2102, buttons 2104*a*-2104*c*, front-facing camera 2106, and rear-facing cameras 2146*a*-2146*c* (shown in FIG. 21F). At FIG. 21A, computer system 2100 displays photo capture user interface 2108. In some embodiments, photo capture user interface 2108 corresponds to and/or is part of a camera application of computer system 2100. In some embodiments, the camera application of computer system 2100 includes a plurality of media capture modes for capturing different types of media, including a cinematic media capture mode (e.g., for capturing non-spatial cinematic video), a video capture mode (e.g., for capturing non-spatial video), a photo capture mode (e.g., for capturing non-spatial still images), a portrait capture mode (e.g., for capturing non-spatial portrait images), and a panoramic image capture mode (e.g., for capturing non-spatial portrait images). In some embodiments, these media capture modes are non-spatial media capture modes for capturing non-spatial media. In some embodiments, computer system 2100 also includes a spatial media capture mode (e.g., one or more spatial media capture modes) for capturing spatial media. As described above, in some embodiments, spatial media includes a first visual component corresponding to a viewpoint of a right eye (e.g., a first still image component that corresponds to an image from a viewpoint of the right eye and/or a first video component that corresponds to a sequence of images from a viewpoint of the right eye) and a second visual component different from the first visual component and that corresponds to a viewpoint of a left eye (e.g., a second still image component that corresponds to an image from a viewpoint of the left eye and/or a second video component that corresponds to a sequence of images from a viewpoint of the left eye) that, when viewed concurrently, create an illusion of a spatial representation of captured visual content. For example, in some embodiments, concurrently viewing the first visual component and the second visual component creates an illusion of a three-dimensional representation of the media; and/or viewing different images with the left and right eye creates the illusion of depth by simulating parallax of the image contents. In some embodiments, the first visual component is captured by a first camera, and the second visual component is (e.g., concurrently) captured by a second camera different from the first camera. In some embodiments, non-spatial media does not include separate and/or different visual components to be viewed concurrently by different eyes of a user.

In FIG. 21A, photo capture user interface 2108 corresponds to and is indicative of the camera application being in a non-spatial photo capture mode for capturing non-spatial photos. Photo capture user interface 2108 includes preview region 2110 that provides a preview of visual content that is being received and/or detected via one or more cameras of computer system 2100 (and visual content that would be captured and saved as media (e.g., a media file) if the user selects shutter button 2120). Photo capture user interface 2108 also includes flash affordance 2118*a* for selectively enabling or disabling a flash feature; long exposure affordance 2118*b* for selectively enabling or disabling a long exposure feature; file format affordance 2118*c* for changing between image file formats; live photo affordance 2118*d* for selectively enabling and/or disabling a live photo feature; media library affordance 2114 for opening a media library user interface; and camera flip affordance 2116 for switching between one or more front-facing cameras (e.g., 2106) and one or more rear-facing cameras (e.g., 2146*a*-2146*c*). Photo capture user interface 2108 also includes zoom affordances 2122*a*-2122*c* for changing between different zoom levels. In some embodiments, zoom affordance 2122*a* corresponds to a first camera having a first focal length, zoom affordance 2122*b* corresponds to a second camera having a second focal length different from the first focal length, and zoom affordance 2122*c* corresponds to a third camera having a third focal length different from the first and second focal lengths.

As mentioned above, in the depicted embodiments, computer system 2100 includes a plurality of non-spatial media capture modes. Photo capture user interface 2108 includes option 2112*a* that is selectable to switch to a non-spatial cinematic video capture mode (e.g., for capturing non-spatial cinematic videos); option 2112*b* that is selectable to switch to a non-spatial video capture mode (e.g., for capturing non-spatial videos); option 2112*c* that is selectable to switch to a non-spatial photo capture mode (e.g., for capturing non-spatial still images) (and which is currently selected in FIG. 21A); option 2112*e* that is selectable to switch to a non-spatial portrait image capture mode (e.g., for capturing non-spatial portrait images); and option 2112*f* that is selectable to switch to a non-spatial panoramic image capture mode (e.g., for capturing non-spatial panoramic images).

As also mentioned above, in the depicted embodiments, computer system 2100 also includes at least one spatial media capture mode for capturing spatial media. However, in FIG. 21A, photo capture user interface 2108 does not include an option for switching to the spatial media capture mode. In some embodiments, the spatial media capture mode is not automatically enabled and/or is not provided (e.g., as a default setting) in the camera application when computer system 2100 is not associated with a head-mounted device. In some embodiments, the spatial media capture mode is automatically enabled and/or is automatically provided in the camera application when computer system 2100 is associated with a head-mounted device. In some embodiments, computer system 2100 is associated with a head-mounted device when computer system 2100 is logged into a user account, and the user account is associated with and/or is also logged into a head-mounted device. In FIG. 21A, computer system 2100 is not associated with a head-mounted device and, as such, photo capture user interface 2108 does not include an option for switching to the spatial media capture mode. As will be described in greater detail below, when computer system 2100 is associated with a head-mounted device and/or when the spatial media capture mode is manually enabled, option 2112*d* (shown in FIG. 21C) is displayed within user interface 2108 to allow a user to switch to the spatial media capture mode for capturing spatial media.

At FIG. 21B, computer system 2100 displays settings user interface 2124 that includes a plurality of settings pertaining to the camera application of computer system 2100. Settings user interface 2124 includes option 2126, that is selectable to selectively enable and/or disable the spatial media capture mode. In FIG. 21B, option 2126 is in a disabled state, and the spatial media capture mode is disabled. In some embodiments, this results in option 2112*d* (shown in FIG. 21C) corresponding to the spatial media capture mode not being displayed within the camera application (e.g., within user interface 2108 and/or other camera application user interfaces). At FIG. 21B, computer system 2100 detects user input 2128 (e.g., a tap input, an air gesture, or a mouse click input) corresponding to selection of option 2126. In response to detecting user input 2128, computer system 2100 enables the spatial media capture mode.

At FIG. 21C, the spatial media capture mode is enabled on computer system 2100. In some embodiments, computer system 2100 enables the spatial media capture mode based on a determination that computer system 2100 is now associated with a head-mounted device (e.g., a user account associated with computer system 2100 is now associated with a head-mounted device). In some embodiments, computer system 2100 enables the spatial media capture mode in response to user input 2128 (e.g., regardless of whether computer system 2100 is associated with a head-mounted device). At FIG. 21C, due to the spatial media capture mode being enabled, photo capture user interface 2108 now includes option 2112*d*, which is selectable to switch from the non-spatial photo capture mode (currently selected in FIG. 21C) to the spatial media capture mode. At FIG. 21C, computer system 2100 detects user input 2129*a* (e.g., a right swipe user input), user input 2129*b* (e.g., a tap input, an air gesture, or a mouse click input corresponding to selection of option 2112*b*), user input 2130*a* (e.g., a swipe input such as a left swipe user input), and user input 2130*b* (e.g., a tap input corresponding to selection of option 2112*d*). Each of these user inputs, and the response of computer system 2100, will be described below.

In some embodiments, as illustrated in FIG. 21C1, computer system 2100 displays spatial capture icon 2112*d*1 within user interface 2108 to allow a user to switch to the spatial media capture mode for capturing spatial media, which is initially displayed with a first appearance (e.g., displaying a headset icon with a strikethrough line, and/or a grayed-out and/or otherwise visually deemphasized appearance) indicating that computer system 2100 is not in a spatial media (e.g., photo and/or video) capture mode. At FIG. 21C1, computer system 2100 detects user input 2130*b*1 (e.g., a tap input, an air gesture, or a mouse click input) corresponding to selection of spatial capture icon 2112*d* 1. The response of computer system 2100 to user input 2130*b*1 will be described below with respect to FIGS. 21E and 21E1.

At FIG. 21D, in response to user input 2129*a* and/or user input 2129*b*, computer system 2100 transitions from the non-spatial photo capture mode to the non-spatial video capture mode, and displays video capture user interface 2109 that corresponds to the non-spatial video capture mode. Video capture user interface 2109 includes preview region 2110, flash affordance 2118*a*, zoom affordances 2122*a*-2122*c*, media library affordance 2114, and camera flip affordance 2116, each of which were described above with reference to FIG. 21A. Video capture user interface 2109 also includes shutter button 2121 that is selectable to initiate capture of a non-spatial video; timer 2125 that indicates the length of a video that is currently being captured; video resolution affordance 2123*a* that is selectable to change the resolution of video to be captured; and video frame rate affordance 2134*b* that is selectable to change the frame rate at which video is to be captured.

At FIG. 21E-21E1, in response to user input 2130*a* and/or user input 2130*b* in FIG. 21C and/or user input 2130*b*1 in FIG. 21C1, computer system 2100 transitions from the non-spatial photo capture mode to the spatial media capture mode, and transitions from display photo capture user interface 2108 to displaying spatial media capture user interface 2132 that corresponds to the spatial media capture mode. In the depicted embodiments, spatial media capture user interface 2132 includes media library affordance 2114 and zoom affordances 2122*a*-2122*c*, which were discussed above with reference to FIG. 21A. In some embodiments, spatial media capture user interface 2132 does not include zoom affordances 2122*a*-2122*c*. Spatial media capture user interface 2132 includes timer 2138, which indicates the duration and/or length of a spatial video that is currently being captured. In some embodiments, as illustrated in FIG. 21E1, computer system 2100 displays spatial capture icon 2112*d*1 with a second, different appearance (e.g., displaying a headset icon without the strikethrough line and/or visually emphasized appearance) indicating that computer system 2100 is in a spatial media (e.g., photo and/or video) capture mode.

Spatial media capture user interface 2132 includes spatial video shutter button 2134 and spatial photo shutter button 2136. Spatial video shutter button 2134 (when enabled and/or selectable) is selectable to initiate and/or stop capture of a spatial video, and spatial photo shutter button 2136 (when enabled and/or selectable) is selectable to capture a spatial photo (e.g., still image, or a live image that includes some content before and/or after a request to capture the spatial photo was received). Spatial media capture user interface 2132 includes preview region 2110, which provides a preview of visual content that is being received and/or detected via one or more cameras of computer system 2100 (and visual content that would be captured and saved as spatial media (e.g., a spatial media file) if the user selects shutter button 2134 and/or shutter button 2136).

In FIG. 21E, computer system 2100 determines that computer system 2100 is in an orientation that is outside of a threshold range of orientations. For example, in the depicted embodiments, computer system 2100 determines that computer system 2100 is not in a landscape orientation and/or is not within a threshold number of degrees (e.g., 10°, 25°, and/or 60°) of a landscape orientation. In response to this determination, computer system 2100 disables spatial video shutter button 2134 and spatial photo shutter button 2136 (e.g., such that they are not selectable by a user to initiate capture of spatial media), and computer system 2100 displays prompt 2140 and outputs audio prompt 2142 prompting the user to rotate computer system 2100 into a particular orientation (e.g., in the depicted embodiment, a landscape orientation). In some embodiments, as illustrated in FIG. 21E1, in response to the determination that computer system 2100 is not in the landscape orientation and/or is not within the threshold number of degrees of a landscape orientation, computer system 2100 displays prompt **2140*b*1 (e.g., a text prompt and/or an icon illustrating the rotation of a device from a portrait orientation to a landscape orientation) and, in some embodiments, changes the appearance of preview 2110, for example, blacking- or graying-out preview 2110 (e.g., such that the visual content that is being received and/or detected via one or more cameras of computer system 2100 is no longer visible) and/or blurring preview 2110. In some embodiments, in order to capture spatial media, computer system 2100 requires that computer system 2100 be in a particular orientation (and/or within a threshold number of degrees of being in the particular orientation (e.g., in the depicted embodiments, a landscape orientation)). In some embodiments, when computer system 2100 determines that computer system 2100 is outside of this threshold range of orientations, computer system 2100 prevents capture of spatial media (e.g., by disabling shutter buttons 2134, 2136), and displays prompt 2140 prompting the user to rotate computer system 2100 into the threshold range of orientations. While the depicted embodiments and examples use a landscape orientation as a target orientation, in some embodiments, different target orientations are used. For example, in some embodiments, the target orientation is determined based on the orientations of two or more cameras relative to one another, as will be described in greater detail below with reference to FIG. 21F. As such, in some embodiments, the target orientation is determined based on the positions and/or configurations of two or more cameras of computer system 2100 relative to each other. The reasons for requiring that computer system 2100 be in a particular orientation to capture spatial media are described in greater detail below with reference to FIG. 21**F.

As mentioned above, in some embodiments, capture of spatial media comprises concurrently capturing different visual content from two different cameras such that first visual content of the spatial media, captured with a first camera, corresponds to the viewpoint of a right eye of a user (and will be presented to the right eye of the user), and second visual content of the spatial media, captured with a second camera, corresponds to the viewpoint of a left eye of a user (and will be presented to the left eye of the user). In some embodiments, in order to correctly capture spatial media in this manner, it is beneficial for the first camera and the second camera to be horizontally aligned such that the first camera and the second camera are oriented in a manner that is consistent with the typical orientation of human eyes. As such, in some embodiments, the target orientation for computer system 2100 to capture spatial media is an orientation in which a first camera and a second camera are horizontally aligned.

At FIG. 21F, computer system 2100 is shown having three rear-facing cameras **2146*a*-2146*c*. Camera 2146*a* and camera 2146*b* define a first axis 2148*a*; camera 2146*b* and camera 2146*c* define a second axis 2148*b*; and camera 2146*a* and camera 2146*c* define a third axis 2148*c*. On the left side of FIG. 21F, computer system 2100 is shown in two portrait (e.g., vertical) orientations, and on the right side of FIG. 21F, computer system 2100 is shown in two landscape (e.g., horizontal) orientations. In the two portrait orientations on the left, none of axes 2148*a*-2148*c* are aligned with horizontal axis 2146. In other words, in the two portrait orientations on the left, none of cameras 2146*a*-2146*c* are horizontally aligned. However, in the two landscape orientations on the right, axis 2148*b*, defined by camera 2146*a* and camera 2146*b*, is aligned with horizontal axis 2146 (e.g., camera 2146*a* and camera 2146*b* are horizontally aligned). As such, in the depicted embodiments, the target orientation for capturing spatial media on computer system 2100 is a landscape orientation so that camera 2146*a* and camera 2146*b* are horizontally aligned. Accordingly, in the depicted embodiments, computer system 2100 requires that computer system 2100 be within a threshold number of degrees of being in a landscape orientation in order for a user to capture spatial media. In some embodiments, computer system 2100 is in the target orientation when side 2150*a* and/or side 2150*b* of computer system 2100 is parallel to (and/or within a threshold number of degrees of being parallel to) horizontal axis 2146; and/or when side 2150*c* and/or side 2150*d* of computer system 2100 is perpendicular to (and/or within a threshold number of degrees of being perpendicular to) horizontal axis 2146. In some embodiments, when computer system 2100 is oriented in the orientation shown on the top right of FIG. 21F and is capturing spatial media, camera 2146*b* captures first visual content corresponding to the right eye of a user, and camera 2146*a* concurrently captures second visual content corresponding to the left eye of a user. In some embodiments, when computer system 2100 is oriented in the orientation shown on the bottom right of FIG. 21F and is capturing spatial media, camera 2146*a* captures first visual content corresponding to the right eye of a user, and camera 2146*b* concurrently captures second visual content corresponding to the left eye of the user. In the depicted embodiments and examples, a landscape orientation results in camera 2146*a* and camera 2146*b* being aligned horizontally. However, it can be appreciated that different camera configurations can require different orientations of computer system 2100 in order to horizontally align two or more cameras. As such, in different embodiments, different target orientations can be used (e.g., in order to align two or more cameras of computer system 2100** horizontally). For example if the cameras used for capturing spatial media were arranged on the computer system so that they were horizontally aligned with each other when the computer system was in a portrait orientation, then the target orientation would be the portrait orientation. In some embodiments a device can have multiple different target orientations when the device has multiple sets of cameras that can be used to capture spatial media, where the different target orientations correspond to different orientations where two or more cameras are horizontally aligned. In some embodiments, different sets of cameras are used for capturing spatial media based on a current orientation of the computer system. In some embodiments, if the computer system is in a portrait orientation a first set of two or more cameras is used to capture spatial media, and if the computer system is in a landscape orientation a second set of two or more cameras (e.g., different from the first set of two or more cameras) is used to capture spatial media, where the first set of cameras includes at least one camera that is not included in the second set of cameras, the second set of cameras includes at least one camera that is not included in the first set of cameras. Optionally, the first set of cameras and the second set of cameras include one or more cameras in common. Alternatively the first set of cameras and the second set of cameras do not include any cameras in common.

At FIG. 21G, computer system 2100 determines that it is within the threshold range of orientations (e.g., it is in a landscape orientation and/or within a threshold number of degrees of a landscape orientation) and, in response, ceases display of prompt 2140 and makes shutter button 2134 and shutter button 2136 selectable. It can be seen in FIG. 21E and FIG. 21G, that certain camera functions that were available in the photo capture mode and the video capture mode are not available in the spatial media capture mode. For example, in the depicted embodiments, flash affordance 2118*a*, long exposure affordance 2118*b*, file format affordance 2118*c*, live photo affordance 2118*d*, video resolution affordance 2123*a*, and video frame rate affordance 2123*b* are not displayed within spatial media capture user interface 2132. In some embodiments, the flash feature is not available when capturing spatial media (e.g., the user is not able to turn flash on and/or off); the long exposure feature is not available when capturing spatial media; the user is not permitted to change the file format when capturing spatial media; the user is not permitted to capture live photos when capturing spatial media; the user is not permitted to change the video resolution when capturing spatial media; and/or the user is not permitted to change the frame rate at which video is captured when capturing spatial media.

At FIG. 21G, spatial media capture user interface 2132 includes orientation indication 2152, which displays a line that is aligned with a target horizontal axis, thereby providing the user with an indication of the orientation of computer system 2100 relative to the target horizontal axis. For example, when computer system 2100 is in a landscape orientation (e.g., is perfectly aligned with the target horizontal axis), the line of orientation indication 2152 is parallel to side 2150*a* and/or side 2150*b* of computer system 2100, but when computer system 2100 begins to rotate away from the landscape orientation, orientation indication 2152 will not be parallel to side 2150*a* and/or side 2150*b* of computer system 2100. In some embodiments, as illustrated in FIG. 21G1, when computer system 2100 is in the landscape orientation, computer system 2100 displays spatial capture icon 2112*d*1 rotated from its initial orientation. At FIG. 21G, computer system 2100 detects user input 2154*a* corresponding to selection of spatial video shutter button 2134; and also detects user input 2154*b* corresponding to selection of spatial photo shutter button 2136. In some embodiments, in response to detecting user input 2154*b*, computer system 2100 captures a spatial still image (e.g., using camera 2146*a* and camera 2146*b*).

At FIG. 21H, in response to detecting user input 2154*a*, computer system 2100 initiates capture of a spatial video (e.g., using camera 2146*a* and camera 2146*b* to concurrently capture two different visual components of the spatial video). At FIG. 21H, to indicate that a spatial video is being captured, computer system 2100 updates display of timer 2138 (e.g., to show that the current video capture is one second in length) and also updates display of spatial video shutter button 2134 to show a stop recording symbol. In some embodiments, as illustrated in FIG. 21H1, computer system additionally displays spatial capture indicator 2138*a*, indicating that the ongoing capture is a capture of a spatial video. In the depicted embodiments, while capturing spatial video, computer system 2100 maintains display of spatial photo shutter button 2136. In some embodiments, while computer system 2100 is capturing spatial video, spatial photo shutter button 2136 remains selectable by a user to also capture spatial photos.

Figure 21I:
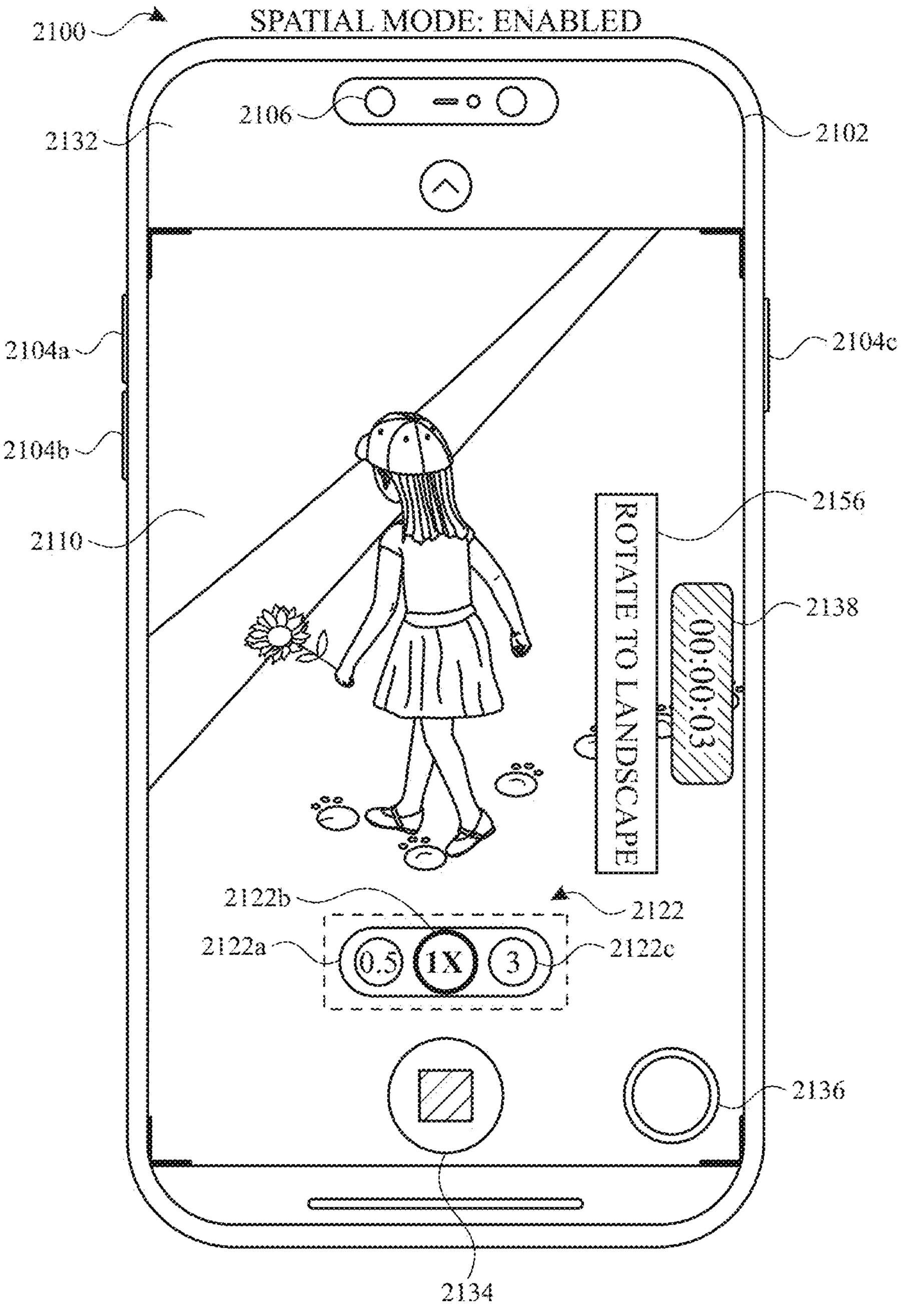

At FIG. 21I, while recording spatial video, computer system 2100 detects that computer system 2100 has been rotated to be outside of the threshold range of orientations. In response to this determination, computer system 2100 displays prompt 2156 prompting the user to rotate computer system 2100 back into the threshold range of orientations (e.g., a landscape orientation). At FIG. 21J, computer system 2100 detects that computer system 2100 has been rotated back to within the threshold range of orientations, and ceases display of prompt 2156.

Figure 21J:
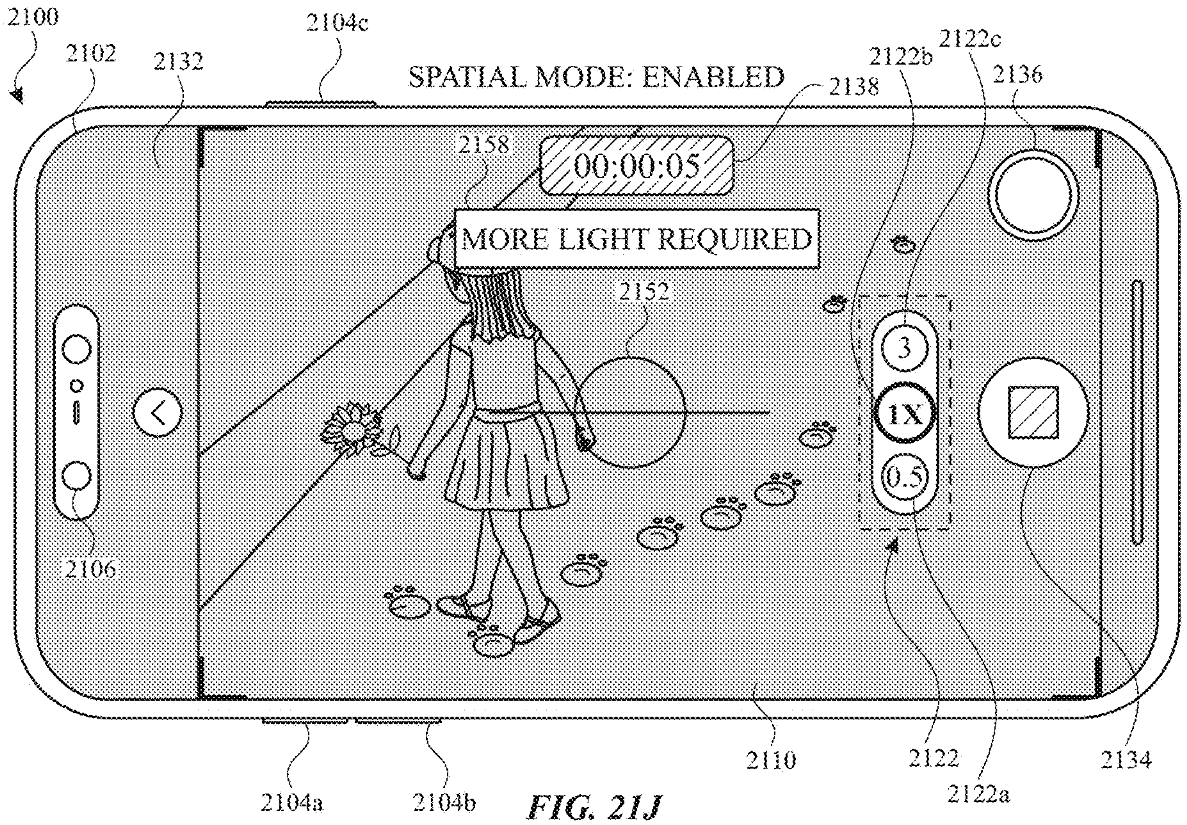

At FIG. 21J, while recording spatial video, computer system 2100 determines that less than a threshold amount of light is detected by computer system 2100 (e.g., less than a threshold amount of light is detected by one or more sensors of computer system 2100). In response to this determination, computer system 2100 displays prompt 2158, which indicates that less than the threshold amount of light is detected by computer system 2100 and/or more light is required to correctly and/or optimally capture spatial media. At FIG. 21K, computer system 2100 determines that greater than the threshold amount of light is detected by computer system 2100, and ceases display of prompt 2158.

Figure 21K:
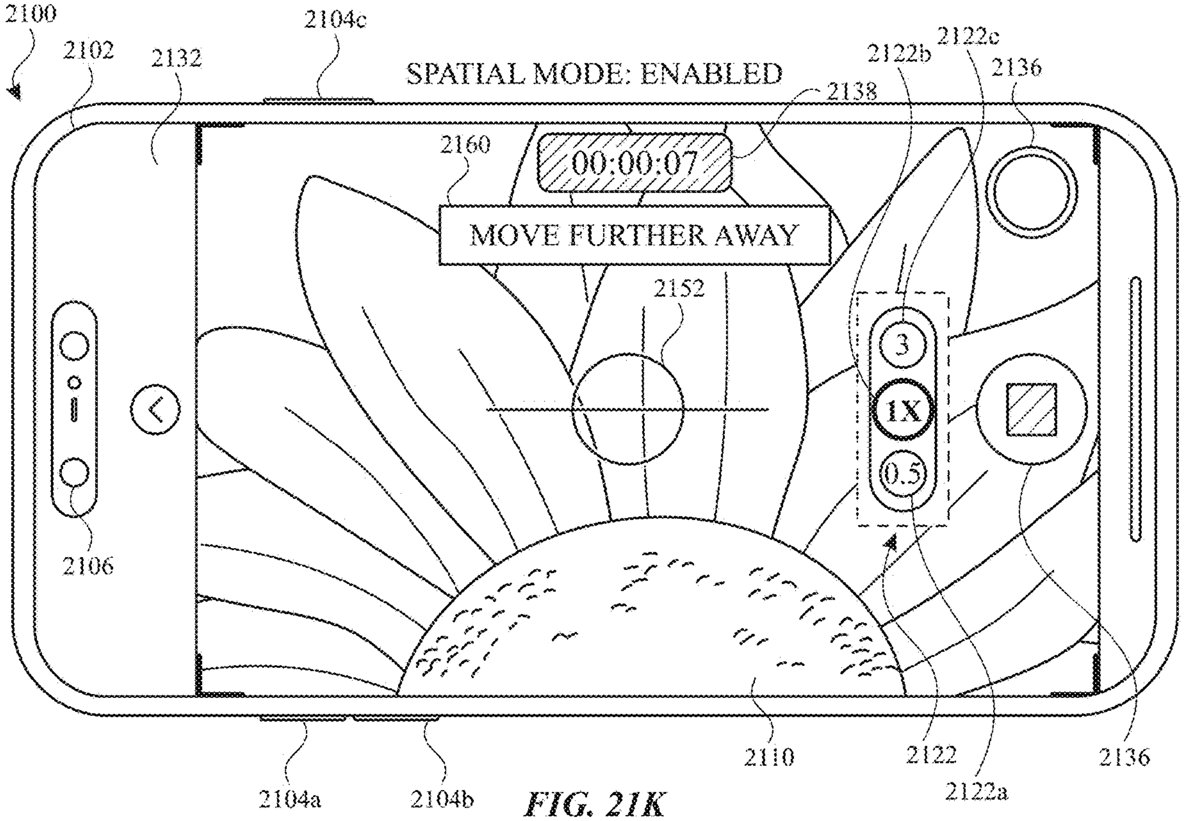

At FIG. 21K, while recording spatial video, computer system 2100 determines that computer system 2100 (and/or at least a portion of computer system 2100 (e.g., cameras 2146*a*-2146*c*)) is less than a threshold distance from one or more detected subjects being captured by one or more cameras of computer system 2100 (e.g., camera 2146*a*, camera 2146*b*, and/or camera 2146*c*)). In response to this determination, computer system 2100 displays prompt 2160 prompting the user to move further away from the subject (e.g., in order to correctly and/or optimally capture spatial media). At FIG. 21L, computer system 2100 determines that computer system 2100 is no longer less than the threshold distance from one or more detected subjects, and ceases display of prompt 2160.

Figure 21L:
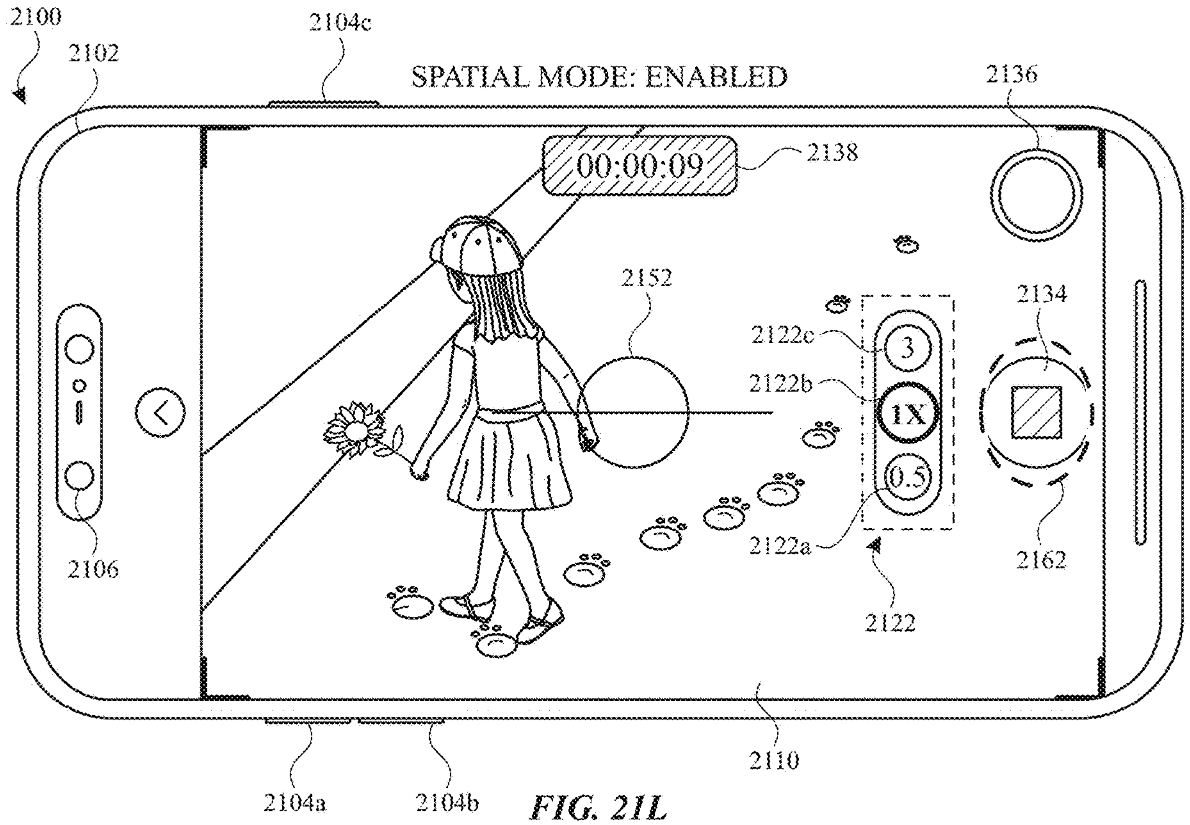
Figure 21M:
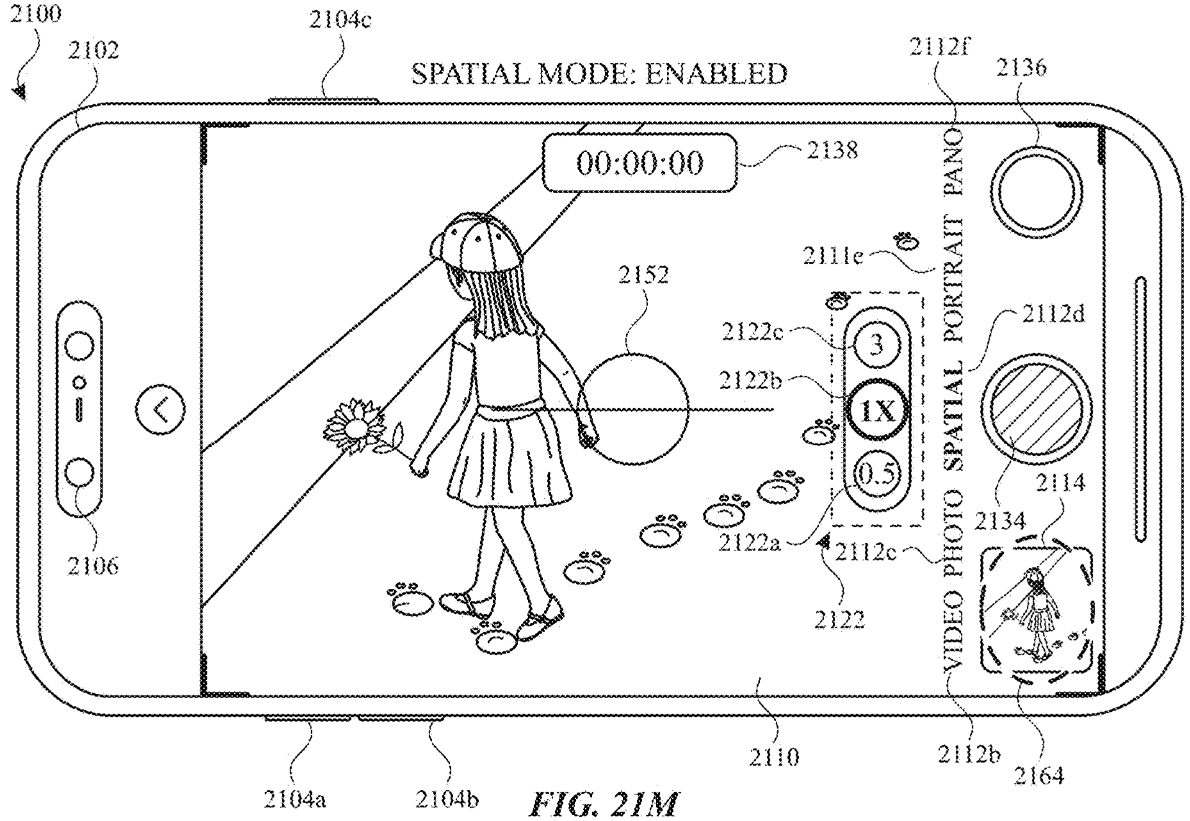
Figures 21N, 21O:
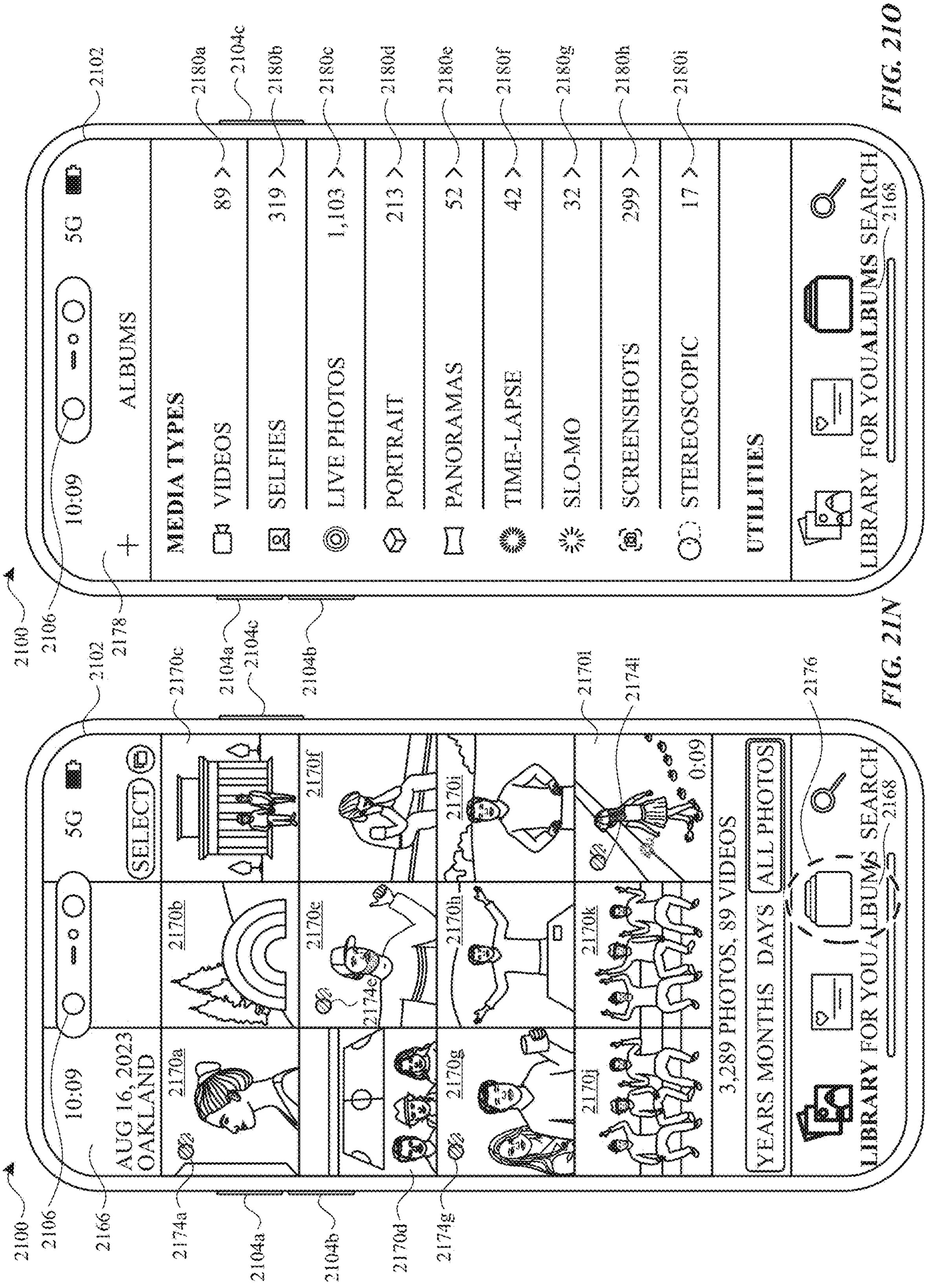

At FIG. 21L, while recording spatial video, computer system 2100 detects user input 2162 (e.g., a tap input, an air gesture, or a mouse click input) corresponding to selection of spatial video shutter button 2134. At FIG. 21M, in response to detecting user input 2162, computer system 2100 ends recording of spatial video, changes the appearance of spatial video 2134 to indicate that computer system 2100 is not currently recording spatial video, and resets timer 2138. Additionally, media library affordance 2114 is updated to show a representation (e.g., a thumbnail) of the spatial video that was just captured. At FIG. 21M, computer system 2100 detects user input 2164 (e.g., a tap input) corresponding to selection of media library affordance 2114.

At FIG. 21N, in response to detecting user input 2164, computer system 2100 displays media library user interface 2166. In some embodiments, media library user interface 2166 displays representations 2170*a*-2170*l* of a plurality of media items (e.g., spatial photos, spatial videos, non-spatial photos, and/or non-spatial videos) that are stored on computer system 2100 and/or associated with computer system 2100 (e.g., associated with a user and/or a user account that corresponds to computer system 2100). In some embodiments, spatial media items are visually distinguished from non-spatial media items within media library user interface 2166. For example, representation 2170*a* is displayed with badge 2174*a* indicating that representation 2170*a* is representative of a spatial media item. Similarly, representations 2170*e*, 2170*g*, and 2170*l* are displayed with badges 2174*e*, 2174*g*, and 2174*l*, respectively, to indicate that these representations are representative of spatial media items. In contrast, representations 2170*b*, 2170*c*, 2170*d*, 2170*f*, 2170*h*, 2170*i*, 2170*j*, and 2170*k* are displayed without badges, indicating that these representations are representative of non-spatial media items.

In some embodiments, each representation 2170*a*-2170*l* is selectable to display a larger version of the corresponding media item, and/or initiate playback of the corresponding media item. However, as discussed above, in order for spatial media items to be viewed in a spatial manner (e.g., to give the illusion of depth and/or simulating parallax), different visual content must be displayed concurrently to the right and left eyes of a user. In some embodiments, computer system 2100 is not configured and/or is not able to display spatial media items in this spatial manner (e.g., because computer system 2100 has only one display and/or does not have separate displays for concurrently displaying different content to the right eye and left eye of a user). As such, in some embodiments, when spatial media is displayed and/or played on computer system 2100, only one of the two visual components of the spatial media is displayed (e.g., only the first visual component corresponding to the right eye of a user or only the second visual component corresponding to the left eye of the user). However, when spatial media is displayed on a head-mounted device or other device that is configured to display the spatial media in the spatial manner, first visual content of the spatial media item is displayed to the right eye of the user while second visual content different from the first visual content is concurrently displayed to the left eye of the user.

At FIG. 21N, computer system 2100 detects user input 2176 corresponding to selection of albums option 2168. At FIG. 210, in response to detecting user input 2176, computer system 2100 displays albums user interface 2178. Albums user interface 2178 displays a plurality of album representations 2180*a*-2180*i*. Each album representation 2180*a*-2180*i* is selectable to display a subset of media items from a media library (e.g., a media library that was displayed in media library user interface 2166). Album representation 2180*a* is selectable to display representations of video media items (e.g., spatial videos and/or non-spatial videos); album representation 2180*b* is selectable to display representations of selfie media items (e.g., non-spatial images captured using front-facing camera 2106); album representation 2180*c* is selectable to display representations of live photo media items (e.g., non-spatial live photos); album representation 2180*d* is selectable to display representations of portrait photo media items (e.g., non-spatial portrait photos); album representation 2180*e* is selectable to display representations of panoramic photo media items (e.g., non-spatial panoramic images); album representation 2180*f* is selectable to display representations of time-lapse video media items (e.g., non-spatial time lapse videos and/or spatial time lapse videos); album representation 2180*g* is selectable to display representations of slow motion video media items (e.g., non-spatial slow motion videos and/or spatial slow motion videos); album representation 2180*h* is selectable to display representations of screenshot media items (e.g., non-spatial screenshot images); and album representation 2180*i* is selectable to display representations of spatial media items (e.g., spatial photos and/or spatial videos) (e.g., without displaying representations of non-spatial media items).

Additional descriptions regarding FIGS. 21A-21O are provided below in reference to method 2200 described with respect to FIG. 22 and method 2300 described with respect to FIG. 23.

FIG. 22 is a flow diagram of an exemplary method 2200 for providing a spatial media capture mode, in some embodiments. In some embodiments, method 2200 is performed at a computer system (e.g., 101, 1-100, 1-200, 3-100, 6-100, 6-200, 6-300, 6-400, 11.1.2-100, 700, X700, 702, and/or 2100) (e.g., a mobile computing device (e.g., a phone and/or tablet); e.g., a head-mounted display device) (e.g., a smart phone, a smart watch, a tablet, a laptop, a desktop, a wearable device, wrist-worn device, and/or head-mounted device) that is in communication with one or more display generation components (e.g., 1-102, 1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200, 11.3.2-204, 708, X702, and/or 2102) (e.g., a display controller; a touch-sensitive display system; a display (e.g., integrated and/or connected), a 3D display, a transparent display, a projector, a heads-up display, and/or a head-mounted display) and one or more cameras (e.g., 2106, 2146*a*, 2146*b*, and/or 2146*c*) (in some embodiments, a camera array/stereo camera for spatial capture, where the first camera (e.g., 2146*a*, 2146*b*, and/or 2146*c*) and the second camera (e.g., 2146*a*, 2146*b*, and/or 2146*c*) are located a fixed distance apart, such that the perspective of the first camera is different from the perspective of the second camera and thus at least a portion of a field of view of the first camera is outside of a field of view of the second camera; in some embodiments, the computer system further includes one or more rear (user-facing) cameras (e.g., 2106) and/or one or more forward (environment-facing) cameras (e.g., 2146*a*-2146*c*)) (in some embodiments, the computer system includes one or more other sensors, such as location sensors, motion sensors, orientation sensors, and/or depth sensors). In some embodiments, method 2200 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 2200 are, optionally, combined and/or the order of some operations is, optionally, changed.

In some embodiments, while the computer system (e.g., 2100) is in a spatial media capture mode (2202) (e.g., FIG. 21E; and/or while spatial media capture mode option 2112*d* is selected) (in some embodiments, a spatial media capture mode of a plurality of different media capture modes (e.g., 2112*a*-2112*f*) (e.g., a plurality of different media capture modes includes a plurality of non-spatial media capture modes (e.g., a non-spatial still image capture mode, a non-spatial video capture mode, a non-spatial panoramic still image capture mode, a non-spatial time-lapse video capture mode, and/or a non-spatial slow motion video capture mode)) that corresponds to spatial media (e.g., corresponds to capturing and/or recording spatial media) that includes a first visual component corresponding to a viewpoint of a right eye (e.g., a first still image component that corresponds to an image from a viewpoint of the right eye and/or a first video component that corresponds to a sequence of images from a viewpoint of the right eye) and a second visual component different from the first visual component and that corresponds to a viewpoint of a left eye (e.g., a second still image component that corresponds to an image from a viewpoint of the left eye and/or a second video component that corresponds to a sequence of images from a viewpoint of the left eye) that, when viewed concurrently, create an illusion of a spatial representation of captured visual content (e.g., concurrently viewing the first visual component and the second visual component creates an illusion of a three-dimensional representation of the media; e.g., viewing different images with the left and right eye creates the illusion of depth by simulating parallax of the image contents) and while the computer system is not capturing spatial media (e.g., FIG. 21F) (e.g., spatial video media, spatial image media, spatial still image media, and/or spatial photo media) (e.g., while the computer system is not actively recording spatial media and/or while the computer system is not actively saving spatial media to non-volatile memory) (in some embodiments, the first visual component is captured by a first camera of the one or more cameras, and the second visual component is captured by a second camera of the one or more cameras different from the first camera; in some embodiments, the first visual component is captured by the first camera while the second visual component is concurrently captured by the second camera): in accordance with a determination that an orientation of the computer system (e.g., 2100) is outside of a threshold range of orientations (2204) (e.g., the computer system is greater than a threshold number of degrees (e.g., greater than 5 degrees, greater than 10 degrees, greater than 15 degrees, greater than 20 degrees, or greater than 45 degrees) from being in a landscape orientation, a portrait orientation, a horizontal orientation, and/or a vertical orientation) (in some embodiments, the determination that the orientation of the computer system is outside of the threshold range of orientations comprises a determination that a first axis of the computer system (e.g., an axis defined by a first camera and second camera of the computer system, an axis defined by two or more cameras of the computer system, and/or an axis defined by a first side of the computer system) is rotated by greater than a threshold number of degrees (e.g., greater than 5 degrees, greater than 10 degrees, greater than 15 degrees, greater than 20 degrees, or greater than 45 degrees) relative to a target axis (e.g., relative to the horizon, and/or relative to an axis that is perpendicular to the direction of gravity)), the computer system outputs (2206) a first prompt (e.g., 2140 and/or 2142) (e.g., a visual prompt, an audio prompt, and/or a haptic prompt) that prompts the user to rotate the computer system into the threshold range of orientations (e.g., before starting to capture spatial media and/or before allowing the computer system to start to capture spatial media).

In some embodiments, while the computer system is in the spatial media capture mode (e.g., while spatial media capture option 2112*d* is selected) and while the computer system is not capturing spatial media (e.g., FIG. 21E): in accordance with a determination that the orientation of the computer system is within the threshold range of orientations (e.g., the computer system is less than the threshold number of degrees (e.g., less than 5 degrees, less than 10 degrees, less than 15 degrees, less than 20 degrees, or less than 45 degrees) from being in a landscape orientation, a portrait orientation, a horizontal orientation, and/or a vertical orientation), the computer system forgoes outputting the first prompt (e.g., FIG. 21G). In some embodiments, the determination that the orientation of the computer system is within the threshold range of orientations comprises a determination that a first axis of the computer system (e.g., 2148*a*) (e.g., an axis defined by a first camera (e.g., 2146*a*, 2146*b*, and/or 2146*c*) and second camera (e.g., 2146*a*, 2146*b*, and/or 2146*c*) of the computer system, an axis defined by two or more cameras (e.g., 2146*a*, 2146*b*, and/or 2146*c*) of the computer system, and/or an axis defined by a first side (e.g., 2150*a*, 2150*b*, 2150*c*, and/or 2150*d*) of the computer system) is rotated by less than a threshold number of degrees (e.g., less than 5 degrees, less than 10 degrees, less than 15 degrees, less than 20 degrees, or less than 45 degrees) relative to a target axis (e.g., relative to the horizon, and/or relative to an axis that is perpendicular to the direction of gravity). Outputting a prompt that prompts the user to rotate the computer system into the threshold range of orientations when the computer system is outside of the threshold range of orientations enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, while the computer system is in the spatial media capture mode (e.g., FIG. 21E; and/or while spatial media capture mode option 2212*d* is selected) and while the computer system is not capturing spatial media (e.g., FIG. 21E): in accordance with a determination that the orientation of the computer system (e.g., 2100) is within the threshold range of orientations (e.g., the computer system is less than a threshold number of degrees (e.g., less than 5 degrees, less than 10 degrees, less than 15 degrees, less than 20 degrees, or less than 45 degrees) from being in a landscape orientation, a portrait orientation, a horizontal orientation, and/or a vertical orientation) (in some embodiments, the determination that the orientation of the computer system is within the threshold range of orientations comprises a determination that a first axis of the computer system (e.g., 2148*a*, 2148*b*, and/or 2148*c*) (e.g., an axis defined by a first camera (e.g., 2146*a*, 2146*b*, and/or 2146*c*) and second camera (e.g., 2146*a*, 2146*b*, and/or 2146*c*) of the computer system, an axis defined by two or more cameras (e.g., 2146*a*, 2146*b*, and/or 2146*c*) of the computer system, and/or an axis defined by a first side (e.g., 2150*a*, 2150*b*, 2150*c*, and/or 2150*d*) of the computer system) is rotated by less than a threshold number of degrees (e.g., less than 5 degrees, less than 10 degrees, less than 15 degrees, less than 20 degrees, or less than 45 degrees) relative to a target axis (e.g., relative to the horizon, and/or relative to an axis that is perpendicular to the direction of gravity)), the computer system forgoes outputting the first prompt (e.g., FIG. 21G). Outputting a prompt that prompts the user to rotate the computer system into the threshold range of orientations when the computer system is outside of the threshold range of orientations, and forgoing outputting the prompt when the computer system is within the threshold range of orientations, enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, outputting the first prompt comprises displaying, via the one or more display generation components (e.g., 2102), a first visual prompt (e.g., 2140) that prompts the user to rotate the computer system into the threshold range of orientations (e.g., a text prompt that provides text instructions to rotate the computer system and/or a graphic prompt that instructs the user to rotate the computer system). Displaying a visual prompt that prompts the user to rotate the computer system into the threshold range of orientations when the computer system is outside of the threshold range of orientations enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, outputting the first prompt comprises outputting a first audio prompt (e.g., 2142) that prompts the user to rotate the computer system into the threshold range of orientations (e.g., one or more sounds and/or one or more spoken or verbal instructions that instruct the user to rotate the computer system). Outputting an audio prompt that prompts the user to rotate the computer system into the threshold range of orientations when the computer system is outside of the threshold range of orientations enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, while the computer system (e.g., 2100) is in the spatial media capture mode (e.g., while option 2112*d* is selected) and while the computer system is not capturing spatial media (e.g., FIG. 21E): in accordance with a determination that the orientation of the computer system is outside of the threshold range of orientations, the computer system disables capture of spatial media (e.g., FIG. 21E, shutter button 2134 and shutter button 2136 are disabled and/or not selectable) (e.g., preventing the device and/or the user from initiating capture of spatial media; and/or disabling a spatial media capture affordance that is selectable by a user to initiate capture of spatial media). While capture of spatial media is disabled (e.g., FIG. 21E) (e.g., while the orientation of the computer system is outside of the threshold range of orientations), the computer system detects that the computer system has transitioned from being outside of the threshold range of orientations to being within the threshold range of orientations (e.g., FIG. 21G, computer system 2100 has been rotated from a vertical orientation to a horizontal orientation). In response to detecting that the computer system is within the threshold range of orientations, the computer system enables capture of spatial media (e.g., in FIG. 21G, shutter button 2134 and shutter button 2136 are enabled and/or selectable) (e.g., displays a spatial media capture affordance and/or enables a spatial media capture affordance that is selectable by a user to initiate capture of spatial media (e.g., transitions the spatial media capture affordance from a disabled (e.g., non-selectable) state to an enabled (e.g., selectable) state)). In some embodiments, capture of spatial media is disabled and/or not enabled prior to detecting that the computer system is within the threshold range of orientations (e.g., while the computer system is not within the threshold range of orientations) and/or prior to enabling capture of spatial media. In some embodiments, enabling capture of spatial media comprises displaying, via the one or more display generation components (e.g., 2102), a spatial media capture affordance (e.g., 2134 and/or 2136) that is selectable by a user to initiate capture of spatial media. In some embodiments, while displaying the spatial media capture affordance (e.g., 2134 and/or 2136), the computer system receives, via one or more input devices, one or more user inputs (e.g., 2154*a* and/or 2154*b*) corresponding to selection of the spatial media capture affordance (e.g., one or more touch inputs, one or more gesture inputs, one or more mechanical inputs, one or more presses of one or more buttons, and/or one or more rotations of a rotatable input mechanism); and in response to receiving the one or more user inputs corresponding to selection of the spatial media capture affordance, the computer system initiates capture of spatial media (e.g., begins recording and/or saving data corresponding to captured spatial media to non-volatile memory). Disabling and/or preventing capture of spatial media when the computer system is outside of the threshold range of orientations enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the determination that the orientation of the computer system (e.g., 2100) is outside of the threshold range of orientations comprises a determination that a first axis (e.g., 2148*a*, 2148*b*, and/or 2148*c*) defined by a first camera (e.g., 2146*a*, 2146*b*, and/or 2146*c*) of the one or more cameras and a second camera (e.g., 2146*a*, 2146*b*, and/or 2146*c*) of the one or more cameras different from the first camera is rotated by greater than a threshold number of degrees (e.g., greater than 5 degrees, greater than 10 degrees, greater than 15 degrees, greater than 20 degrees, or greater than 45 degrees) relative to a target axis (e.g., 2146) (e.g., a target axis that corresponds to the horizon, and/or a target axis that is perpendicular to the direction of gravity). In some embodiments, the first camera and the second camera are used to capture spatial media, the first camera is used to capture the first visual component corresponding to the viewpoint of the right eye, and the second camera is used to capture the second visual component that corresponds to the viewpoint of the left eye. Horizontally aligning the first camera and the second camera allows for correct capture of spatial media, as this ensures that the first camera (which, in some embodiments, corresponds to the viewpoint of the right eye) and the second camera (which, in some embodiments, corresponds to the viewpoint of the left eye) are aligned in a manner that is consistent with the typical orientation of human eyes. Accordingly, outputting a prompt that prompts the user to rotate the computer system so that the first camera and the second camera are substantially horizontally aligned ensures that spatial media is correctly captured, which enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the computer system comprises a first side (e.g., 2150*a* and/or 2150*b*) and a second side (e.g., 2150*c* and/or 2150*d*) that is perpendicular to the first side; the first side defines a first device axis; the second side defines a second device axis; the first side is longer than the second side; and the first axis corresponds to (e.g., is parallel to and/or aligns with) the first device axis (e.g., the target orientation for the device is when the device is oriented in a landscape orientation). Outputting a prompt that prompts the user to rotate the computer system so that the first camera and the second camera are substantially horizontally aligned ensures that spatial media is correctly captured, which enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, while the computer system is in the spatial media capture mode (e.g., while option 2112*d* is selected) and while the computer system is not capturing spatial media (e.g., FIG. 21E and/or FIG. 21G): the computer system displays, via the one or more display generation components (e.g., 2102), a spatial photo capture affordance (e.g., 2136) that is selectable to capture spatial photo media (e.g., a spatial still image and/or a one or more spatial images) (e.g., one or more images that include a first visual component corresponding to the viewpoint of the right eye and a second visual component different from the first visual component that corresponds to the viewpoint of a left eye that, when viewed concurrently, create an illusion of a spatial representation of captured visual content). While displaying the spatial photo capture affordance, the computer system receives (e.g., via one or more input devices of the computer system) one or more user inputs (e.g., 2154*b*) (e.g., one or more touch inputs, one or more gesture inputs, one or more mechanical inputs, one or more presses of one or more buttons, and/or one or more rotations of a rotatable input mechanism) corresponding to selection of the spatial photo capture affordance (e.g., 2136). In response to receiving the one or more user inputs corresponding to selection of the spatial photo capture affordance, the computer system captures a first spatial photo (e.g., stores data pertaining to a first spatial photo in non-volatile memory; and/or stores (e.g., in non-volatile memory of the computer system) first data (e.g., a first still image) captured by a first camera (e.g., 2146*a*, 2146*b*, and/or 2146*c*) of the one or more cameras as the first visual component corresponding to the viewpoint of a right eye, and second data (e.g., a second still image) captured by a second camera (e.g., 2146*a*, 2146*b*, and/or 2146*c*) of the one or more cameras as the second visual component corresponding to the viewpoint of the left eye). In some embodiments, the computer system receives one or more user inputs (e.g., 2154*b*) corresponding to selection of the spatial photo capture affordance (e.g., 2136) (e.g., at a display position and/or input position that corresponds to the spatial photo capture affordance). In response to receiving the one or more user inputs corresponding to selection of the spatial photo capture affordance: in accordance with a determination that the orientation of the computer system is within the threshold range of orientations (e.g., FIG. 21G) (e.g., when the one or more user inputs corresponding to selection of the spatial photo capture affordance is received), the computer system captures a first spatial photo; and in accordance with a determination that the orientation of the computer system is outside of the threshold range of orientations (e.g., FIG. 21E) (e.g., when the one or more user inputs corresponding to selection of the spatial photo capture affordance is received), the computer system forgoes capturing a spatial photo (e.g., does not capture a spatial photo). In some embodiments, when the orientation of the computer system is within the threshold range of orientations, the spatial photo capture affordance (e.g., 2136) is enabled (e.g., FIG. 21G); and when the orientation of the computer system is outside of the threshold range of orientations, the spatial photo capture affordance (e.g., 2136) is disabled (e.g., FIG. 21E) (e.g., is not displayed and/or is displayed but not selectable). Providing a spatial photo capture affordance that is selectable to capture spatial photo media enhances the operability of the system and makes the user-system intertece more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, while the computer system is in the spatial media capture mode (e.g., while option 2112*d* is selected) and while the computer system is not capturing spatial media: the computer system displays, via the one or more display generation components (e.g., 2102), a spatial video capture affordance (e.g., 2134) that is selectable to capture spatial video media (e.g., a video that include a first visual component corresponding to the viewpoint of the right eye and a second visual component different from the first visual component that corresponds to the viewpoint of a left eye that, when viewed concurrently, create an illusion of a spatial representation of captured visual content). While displaying the spatial video capture affordance (e.g., 2134), the computer system receives (e.g., via one or more input devices of the computer system) one or more user inputs (e.g., 2154*a*) (e.g., one or more touch inputs, one or more gesture inputs, one or more mechanical inputs, one or more presses of one or more buttons, and/or one or more rotations of a rotatable input mechanism) corresponding to selection of the spatial video capture affordance. In response to receiving the one or more user inputs (e.g., 2154*a*) corresponding to selection of the spatial video capture affordance (e.g., 2134), the computer system captures a first spatial video (e.g., FIG. 21H, computer system 2100 capturing a spatial video) (e.g., stores data pertaining to a first spatial video in non-volatile memory; and/or stores (e.g., in non-volatile memory of the computer system) first data (e.g., a first video) captured by a first camera (e.g., 2146*a*, 2146*b*, and/or 2146*c*) of the one or more cameras as the first visual component corresponding to the viewpoint of a right eye, and second data (e.g., a second video different from the first video) captured by a second camera (e.g., 2146*a*, 2146*b*, and/or 2146*c*) of the one or more cameras as the second visual component corresponding to the viewpoint of the left eye). In some embodiments, the computer system receives one or more user inputs (e.g., 2154*a*) corresponding to selection of the spatial video capture affordance (e.g., 2134) (e.g., at a display position and/or input position that corresponds to the spatial video capture affordance). In response to receiving the one or more user inputs corresponding to selection of the spatial video capture affordance: in accordance with a determination that the orientation of the computer system is within the threshold range of orientations (e.g., FIG. 21G) (e.g., when the one or more user inputs corresponding to selection of the spatial video capture affordance is received), the computer system captures a first spatial video; and in accordance with a determination that the orientation of the computer system is outside of the threshold range of orientations (e.g., FIG. 21E) (e.g., when the one or more user inputs corresponding to selection of the spatial video capture affordance is received), the computer system forgoes capturing a spatial video (e.g., does not capture a spatial video). In some embodiments, when the orientation of the computer system is within the threshold range of orientations (e.g., FIG. 21G), the spatial video capture affordance (e.g., 2134) is enabled; and when the orientation of the computer system is outside of the threshold range of orientations (e.g., FIG. 21E), the spatial video capture affordance (e.g., 2134) is disabled (e.g., is not displayed and/or is displayed but not selectable). In some embodiments, while displaying the spatial video capture affordance (e.g., 2134), the computer system receives a first set of one or more user inputs (e.g., 2154*a*) corresponding to selection of the spatial video capture affordance. In response to receiving the first set of one or more user inputs corresponding to selection of the spatial video capture affordance, the computer system initiates capturing a first spatial video (e.g., FIG. 21H). In some embodiments, while capturing the first spatial video, the computer system receives a second set of one or more user inputs (e.g., 2162) corresponding to selection of the spatial video capture affordance. In response to receiving the second set of one or more user inputs (e.g., 2162) corresponding to selection of the spatial video capture affordance (e.g., 2134), the computer system ends (e.g., ceases and/or stops) capturing the first spatial video (e.g., FIG. 21M). Providing a spatial video capture affordance that is selectable to capture spatial video media enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, while displaying the spatial video capture affordance (e.g., 2134) (e.g., while the computer system is in the spatial media capture mode and while the computer system is not capturing spatial media), the computer system displays, via the one or more display generation components (e.g., 2102), a spatial photo capture affordance (e.g., 2136) that is selectable to capture spatial photo media (e.g., a spatial still image and/or a one or more spatial images) (e.g., one or more images that include a first visual component corresponding to the viewpoint of the right eye and a second visual component different from the first visual component that corresponds to the viewpoint of a left eye that, when viewed concurrently, create an illusion of a spatial representation of captured visual content). While displaying the spatial photo capture affordance (e.g., 2136), the computer system receives (e.g., via one or more input devices of the computer system) one or more user inputs (e.g., 2154*b*) (e.g., one or more touch inputs, one or more gesture inputs, one or more mechanical inputs, one or more presses of one or more buttons, and/or one or more rotations of a rotatable input mechanism) corresponding to selection of the spatial photo capture affordance. In response to receiving the one or more user inputs (e.g., 2154*b*) corresponding to selection of the spatial photo capture affordance (e.g., 2136), the computer system captures a first spatial photo (e.g., stores data pertaining to a first spatial photo in non-volatile memory; and/or stores (e.g., in non-volatile memory of the computer system) first data (e.g., a first still image) captured by a first camera (e.g., 2146*a*, 2146*b*, and/or 2146*c*) of the one or more cameras as the first visual component corresponding to the viewpoint of a right eye, and second data (e.g., a second still image) captured by a second camera (e.g., 2146*a*, 2146*b*, and/or 2146*c*) of the one or more cameras as the second visual component corresponding to the viewpoint of the left eye). Providing a spatial photo capture affordance that is selectable to capture spatial photo media enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, while capturing (e.g., while recording) a second spatial video (e.g., FIGS. 21H-21L) (e.g., storing data pertaining to a second spatial video in non-volatile memory; and/or storing (e.g., in non-volatile memory of the computer system) first data (e.g., a first video) captured by a first camera (e.g., 2146*a*, 2146*b*, and/or 2146*c*) of the one or more cameras as the first visual component corresponding to the viewpoint of a right eye, and second data (e.g., a second video different from the first video) captured by a second camera (e.g., 2146*a*, 2146*b*, and/or 2146*c*) of the one or more cameras as the second visual component corresponding to the viewpoint of the left eye), the computer system displays, via the one or more display generation components, the spatial photo capture affordance (e.g., 2136). While capturing the second spatial video (e.g., FIGS. 21H-21L) and displaying the spatial photo capture affordance (e.g., 2136), the computer system receives (e.g., via one or more input devices of the computer system) a second set of one or more user inputs (e.g., one or more touch inputs, one or more gesture inputs, one or more mechanical inputs, one or more presses of one or more buttons, and/or one or more rotations of a rotatable input mechanism) corresponding to selection of the spatial photo capture affordance (e.g., a tap input or other input selecting spatial photo capture affordance 2136 in FIGS. 21H-21L). In response to receiving the second set of one or more user inputs corresponding to selection of the spatial photo capture affordance, the computer system captures a second spatial photo (e.g., stores data pertaining to a second spatial photo in non-volatile memory; and/or stores (e.g., in non-volatile memory of the computer system) first data (e.g., a first still image) captured by a first camera of the one or more cameras as the first visual component corresponding to the viewpoint of a right eye, and second data (e.g., a second still image) captured by a second camera of the one or more cameras as the second visual component corresponding to the viewpoint of the left eye). Providing a spatial photo capture affordance that is selectable to capture spatial photo media enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, while the computer system is in the spatial media capture mode (e.g., while option 2112*d* is selected) (e.g., while the computer system is not capturing spatial media, while the computer system is capturing spatial media, and/or regardless of whether the computer system is capturing spatial media): in accordance with a determination that first error criteria corresponding to a first error are met, wherein the first error pertains to capture of spatial media (e.g., the first error will result in erroneous capture of spatial media and/or poor quality capture of spatial media), the computer system outputs an error correction prompt (e.g., 2156, 2158, and/or 2160) (e.g., a visual prompt, an audio prompt, and/or a haptic prompt) that prompts the user to perform one or more actions to correct the first error. In some embodiments, while the computer system is in the spatial media capture mode: in accordance with a determination that the first error criteria are not met, the computer system forgoes outputting the error correction prompt (e.g., FIGS. 21G, 21H, and/or 21L). Outputting the error correction prompt when the first error criteria are met enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the determination that first error criteria are met comprises a determination that less than a threshold amount of light is detected by the computer system (e.g., FIG. 21J) (e.g., less than 1 lux, less than 5 lux, less than 10 lux, less than 25 lux, less than 50 lux, or less than 100 lux); and outputting the error correction prompt comprises outputting a light correction prompt (e.g., 2158) that informs the user that less than the threshold amount of light is detected by the computer system. Outputting the light correction prompt when the first error criteria are met enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the determination that first error criteria are met comprises a determination that at least a portion of the computer system (e.g., at least a first respective camera of the one or more cameras) is less than a threshold distance (e.g., less than six inches, less than one foot, less than two feet, less than three feet, less than five feet, or less than eight feet) from one or more detected subjects (e.g., one or more detected objects) being captured by at least some of the one or more cameras (e.g., FIG. 21K); and outputting the error correction prompt comprises outputting a distance correction prompt (e.g., 2160) that informs the user that the computer system is less than the threshold distance from one or more detected subjects being captured by at least some of the one or more cameras. In some embodiments, the distance of the one or more detected subjects from the at least the portion of the computer system is automatically detected by the computer system (e.g., 2100) based on sensor measurement(s) from one or more sensors of the computer system. Outputting the distance correction prompt when the first error criteria are met enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the computer system (e.g., 2100) is a head-mounted device (e.g., 101, 1-100, 1-200, 1-302, 1-406, 3-100, 6-100, 6-200, 6-300, 6-400, 11.1.2-100, and/or X700) that is configured to be worn on the head of a user (e.g., a head-mounted device that includes a first display generation component (and/or a first set of display generation components) corresponding to and/or that is configured to be displayed to a right eye of the user (e.g., that is configured to display the first visual component of spatial media without displaying the second visual component of spatial media); and a second display generation component (and/or a second set of display generation components) corresponding to and/or that is configured to be displayed to the left eye of the user (e.g., that is configured to display the second visual component of spatial media without displaying the first visual component of spatial media)). Allowing a user to capture spatial media on a head-mounted device enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the computer system (e.g., 2100) is not a head-mounted device (e.g., the computer system is a stand-alone digital camera, a smartphone, tablet, or other multifunction electronic device that is not designed to be worn on a head of a user). In some embodiments, the computer system does not comprise separate display generation components for the left eye of the user and the right eye of the user. As such, in some embodiments, the computer system is not able to separately display the first and second visual components of spatial media to the left and right eyes of the user in order to create the illusion of spatial representation of the spatial media. In some embodiments, the computer system is able to capture spatial media with separate visual components for the left and right eyes of the user so that the spatial media can be viewed in this manner on a different device (e.g., a head-mounted device) that includes separate display generation components for the left and right eyes of a user. Allowing a user to capture spatial media on a non-head-mounted device (e.g., for display at a later time on a head-mounted device) enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, aspects/operations of methods 800, 1000, 1200, 1400, 1600, 1800, 2000, 2200, and/or 2300 may be interchanged, substituted, and/or added between these methods. For example, the spatial media being viewed in method 2000 may be media captured using the user interfaces and indicators described with respect to methods 800, 1000, 1200, 1400, 1800, 2200, and/or 2300, and the video playback interfaces and techniques described with respect to method 1600 may be applied while viewing spatial media according to method 2000. For brevity, these details are not repeated here.

FIG. 23 is a flow diagram of an exemplary method 2300 for providing a spatial media capture mode option, in some embodiments. In some embodiments, method 2300 is performed at a computer system (e.g., 101, 1-100, 1-200, 3-100, 6-100, 6-200, 6-300, 6-400, 11.1.2-100, 700, X700, 702, and/or 2100) (e.g., a mobile computing device (e.g., a phone and/or tablet); e.g., a head-mounted display device) (e.g., a smart phone, a smart watch, a tablet, a laptop, a desktop, a wearable device, wrist-worn device, and/or head-mounted device) that is in communication with one or more display generation components (e.g., 1-102, **1-120*a*, 1-120*b*, 11.1.1-104*a*, 11.1.1-104*b*, 1-108, 1-122*a*, 1-122*b*, 1-202, 1-306, 1-308, 1-320, 1-322*a*, 1-322*b*, 1-406, 1-402, 1-421, 3-108, 6-334, 11.3.2-100, 11.3.2-104, 11.3.2-200, 11.3.2-204, 708, X702, and/or 2102) (e.g., a display controller; a touch-sensitive display system; a display (e.g., integrated and/or connected), a 3D display, a transparent display, a projector, a heads-up display, and/or a head-mounted display) and one or more cameras (e.g., 2106, 2146*a*, 2146*b*, and/or 2146*c*) (in some embodiments, a camera array/stereo camera for spatial capture, where the first camera (e.g., 2146*a*, 2146*b*, and/or 2146*c*) and the second camera (e.g., 2146*a*, 2146*b*, and/or 2146*c*) are located a fixed distance apart, such that the perspective of the first camera is different from the perspective of the second camera and thus at least a portion of a field of view of the first camera is outside of a field of view of the second camera; in some embodiments, the computer system further includes one or more rear (user-facing) cameras (e.g., 2106) and/or one or more forward (environment-facing) cameras (e.g., 2146*a*-2146*c*)) (in some embodiments, the computer system includes one or more other sensors, such as location sensors, motion sensors, orientation sensors, and/or depth sensors). In some embodiments, method 2200 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 2300** are, optionally, combined and/or the order of some operations is, optionally, changed.

In some embodiments, the computer system (e.g., 2100) displays (2302), via the one or more display generation components (e.g., 2102), a first user interface (e.g., 2108, 2109, and/or 2132) corresponding to a camera application of the computer system (e.g., a camera application that is installed on and/or that is being run on the computer system) (e.g., a first user interface that corresponds to capture and/or recording of visual media using at least some of the one or more cameras; and/or a first user interface that displays a preview (e.g., 2110) of visual content that is within a viewpoint of at least some of the one or more cameras). While displaying the first user interface (e.g., 2108, 2109, and/or 2132) corresponding to the camera application of the computer system (2304): in accordance with a determination that the computer system is associated with a head-mounted device (e.g., 101, 1-100, 1-200, 1-302, 1-406, 3-100, 6-100, 6-200, 6-300, 6-400, 11.1.2-100, and/or X700) separate from the computer system (e.g., 2100) (2306) (e.g., the computer system and the head-mounted device are logged into the same user account, the computer system and the head-mounted device correspond to the same user, and/or the computer system and the head-mounted device correspond to the same user account), the computer system provides (2308) (e.g., displaying (e.g., within the first user interface), providing access to, and/or otherwise making available for selection) a spatial media capture mode option (e.g., **2112*d*) corresponding to a spatial media capture mode (in some embodiments, a spatial media capture mode of a plurality of different media capture modes (e.g., 2112*a*-2112*e*) (e.g., a plurality of different media capture modes includes a plurality of non-spatial media capture modes (e.g., a non-spatial still image capture mode, a non-spatial video capture mode, a non-spatial panoramic still image capture mode, a non-spatial time-lapse video capture mode, and/or a non-spatial slow motion video capture mode)) for capturing spatial media (e.g., corresponds to capturing and/or recording spatial media) that includes a first visual component corresponding to a viewpoint of a right eye (e.g., a first still image component that corresponds to an image from a viewpoint of the right eye and/or a first video component that corresponds to a sequence of images from a viewpoint of the right eye) and a second visual component different from the first visual component and that corresponds to a viewpoint of a left eye (e.g., a second still image component that corresponds to an image from a viewpoint of the left eye and/or a second video component that corresponds to a sequence of images from a viewpoint of the left eye) that, when viewed concurrently, create an illusion of a spatial representation of captured visual content (e.g., concurrently viewing the first visual component and the second visual component creates an illusion of a three-dimensional representation of the media; e.g., viewing different images with the left and right eye creates the illusion of depth by simulating parallax of the image contents) (in some embodiments, the first visual component is captured by a first camera (e.g., 2146*a*, 2146*b*, and/or 2146*c*) of the one or more cameras, and the second visual component is captured by a second camera (e.g., 2146*a*, 2146*b*, and/or 2146*c*) of the one or more cameras different from the first camera; in some embodiments, the first visual component is captured by the first camera while the second visual component is concurrently captured by the second camera); and in accordance with a determination that the computer system (e.g., 2100) is not associated with a head-mounted device separate from the computer system (2310) (e.g., the computer system is not logged into the same user account as a head-mounted device, and/or a user and/or user account that corresponds to the computer system is not associated with and/or does not correspond to a head-mounted device), the computer system forgoes providing (231) (e.g., forgoing displaying, forgoing providing access to, and/or forgoing making available) the spatial media capture mode option (e.g., 2112*d*) (e.g., FIG. 21A) (optionally, in some embodiments, the computer system displays a plurality of selectable options (e.g., 2112*a*, 2112*b*, 2112*c*, 2112*e*, and/or 2112*f*) corresponding to a plurality of different non-spatial media capture modes (e.g., a non-spatial still image capture mode, a non-spatial video capture mode, a non-spatial panoramic still image capture mode, a non-spatial time-lapse video capture mode, and/or a non-spatial slow motion video capture mode) without displaying the spatial media capture mode option (e.g., 2112*d*)). In some embodiments, the first user interface (e.g., 2108) displays a plurality of selectable options (e.g., 2112*a*, 2112*b*, 2112*c*, 2112*e*, and/or 2112*f*) (e.g., regardless of whether the computer system is associated with a head-mounted device) corresponding to a plurality of different media capture modes (e.g., a plurality of non-spatial media capture modes (e.g., a non-spatial still image capture mode, a non-spatial video capture mode, a non-spatial panoramic still image capture mode, a non-spatial time-lapse video capture mode, and/or a non-spatial slow motion video capture mode)). In some embodiments, the computer system (e.g., 2100) is not a head-mounted system and/or a head-mounted device. In some embodiments, the head-mounted device (e.g., 101, 1-100, 1-200, 1-302, 1-406, 3-100, 6-100, 6-200, 6-300, 6-400, 11.1.2-100, and/or X700) includes a first set of display generation components configured to display content to a right eye of a user (e.g., without displaying content to the left eye of the user), and a second set of display generation components configured to display content to the left eye of the user (e.g., without displaying content to the right eye of the user), such that the head-mounted device can concurrently display the first visual component of spatial media to the right eye of the user and the second visual component of the spatial media to the left eye of the user to create the illusion of a spatial representation of captured visual content. In some embodiments, the computer system (e.g., 2100**) does not include separate display generation components for the left and right eyes of a user such that the computer system is not able to concurrently display the first and second visual components to different eyes of the user to create the illusion of spatial representation of the captured visual content. Providing the spatial media capture mode option when the computer system is associated with a head-mounted device, and forgoing providing the spatial media capture mode option when the computer system is not associated with a head-mounted device, enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, while displaying the first user interface (e.g., 2108 and/or 2109) corresponding to the camera application of the computer system, the computer system receives (e.g., via one or more input devices of the computer system) one or more user inputs (e.g., 2129*a*, 2129*b*, 2130*a*, and/or 2130*b*) (e.g., one or more touch inputs, one or more gesture inputs, one or more button presses, and/or one or more rotations of a rotatable input mechanism) corresponding to a user request to change a current media capture mode (e.g., a user request to transition from the current media capture mode to a different media capture mode) (e.g., a spatial media capture mode; a non-spatial media capture mode; a non-spatial still image capture mode, a non-spatial video capture mode, a non-spatial panoramic still image capture mode, a non-spatial time-lapse video capture mode, and/or a non-spatial slow motion video capture mode). In response to receiving the one or more user inputs corresponding to the user request to change the current media capture mode: in accordance with a determination that the spatial media capture mode option is enabled (e.g., FIG. 21C) (e.g., in some embodiments, in accordance with a determination that the computer system is associated with a head-mounted device separate from the computer system), the computer system transitions from the current media capture mode to the spatial media capture mode (e.g., corresponding to option 2112*d*; and/or FIG. 21E) (in some embodiments, the first user interface corresponds to the current media capture mode, and transitioning from the current media capture mode to the spatial media capture mode includes transitioning from displaying the first user interface corresponding to the current media capture mode to a spatial media capture user interface that corresponds to the spatial media capture mode and is different from the first user interface); and in accordance with a determination that the spatial media capture mode option is not enabled (e.g., FIG. 21A) (e.g., in some embodiments, in accordance with a determination that the computer system is not associated with a head-mounted device separate from the computer system), the computer system forgoes transitioning from the current media capture mode to the spatial media capture mode (e.g., in some embodiments, transitioning from the current media capture mode to a second media capture mode different from the current media capture mode and the spatial media capture mode; and/or, in some embodiments, maintaining the current media capture mode) (e.g., user input 2129*a* in FIG. 21C results in transitioning to the spatial media capture mode because the spatial media capture mode is enabled in FIG. 21C; however, in some embodiments, had user input 2129*a* been received in FIG. 21A, computer system 2100 would transition to the non-spatial portrait image capture mode rather than the spatial media capture mode because in FIG. 21A, the spatial media capture mode is not enabled). Transitioning to the spatial media capture mode in response to a user input when the spatial media capture mode option is enabled, and forgoing transitioning to the spatial media capture mode in response to the same user input when the spatial media capture mode is not enabled, enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In response to receiving the one or more user inputs (e.g., 2129*a*, 2129*b*, 2130*a*, and/or 2130*b*) corresponding to the user request to change the current media capture mode: in accordance with a determination that the spatial media capture mode option is not enabled (e.g., FIG. 21A), the computer system transitions from the current media capture mode to a second media capture mode different from the current media capture mode and the spatial media capture mode (e.g., a non-spatial media capture mode; a non-spatial still image capture mode, a non-spatial video capture mode, a non-spatial panoramic still image capture mode, a non-spatial time-lapse video capture mode, and/or a non-spatial slow motion video capture mode) (e.g., user input 2129*a* in FIG. 21C results in transitioning to the spatial media capture mode because the spatial media capture mode is enabled in FIG. 21C; however, in some embodiments, had user input 2129*a* been received in FIG. 21A, computer system 2100 would transition to the non-spatial portrait image capture mode rather than the spatial media capture mode because in FIG. 21A, the spatial media capture mode is not enabled). In some embodiments, the first user interface (e.g., 2108 and/or 2109) corresponds to the current media capture mode, and transitioning from the current media capture mode to the second media capture mode includes transitioning from displaying the first user interface (e.g., 2109) corresponding to the current media capture mode to a second user interface that corresponds to the second media capture mode and is different from the first user interface (e.g., 2108 and/or 2109) and/or a spatial media capture user interface (e.g., 2132)). Transitioning to the spatial media capture mode in response to a user input when the spatial media capture mode option is enabled, and transitioning to a second, different media capture mode in response to the same user input when the spatial media capture mode is not enabled, enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the one or more user inputs corresponding to the user request to change the current media capture mode includes one or more tap inputs (e.g., 2129*b* and/or 2130*b*) (e.g., one or more tap inputs on a touch-sensitive surface; and/or one or more tap inputs on a spatial media capture mode affordance). In some embodiments, the one or more user inputs corresponding to the user request to change the current media capture mode includes one or more air gestures (e.g., one or more air tap gestures). In some embodiments, an air gesture is a gesture that is detected without the user touching (or independently of) an input element that is part of a device and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body). Allowing a user to transition between different media capture modes with a tap input enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the one or more user inputs corresponding to the user request to change the current media capture mode includes one or more swipe inputs (e.g., 2129*a* and/or 2130*a*) (e.g., one or more touch inputs on a touch-sensitive surface that include movement in at least a first direction (e.g., up, down, left, and/or right)). In some embodiments, the one or more user inputs corresponding to the user request to change the current media capture mode includes one or more air gestures (e.g., one or more air swipe gestures (e.g., one or more movements of the user's hand and/or finger(s) that include movement in at least a first direction)). Allowing a user to transition between different media capture modes with a swipe input enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the camera application includes a plurality of media capture modes (e.g., 2112*a*, 2112*b*, 2112*c*, 2112*d*, 2112*e*, and/or 2112*f*), including the spatial media capture mode (e.g., 2112*d*) and a non-spatial still image capture mode (e.g., 2112*c*) (e.g., a mode in which the computer system captures and/or is configured to capture non-spatial still images); the plurality of media capture modes are arranged in a defined order, and the spatial media capture mode is adjacent to (e.g., immediately adjacent to) the non-spatial still image capture mode within the defined order (e.g., option 2112*d* is adjacent to option 2112*c*). Allowing a user to transition between different media capture modes with a swipe input enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the determination that the computer system (e.g., 2100) is associated with a head-mounted device (e.g., 101, 1-100, 1-200, 1-302, 1-406, 3-100, 6-100, 6-200, 6-300, 6-400, 11.1.2-100, and/or X700) comprises a determination that the computer system and the head-mounted device are both associated with a same user account (e.g., the computer system and the head-mounted device are logged into the same user account). In some embodiments, the determination that the computer system is not associated with a head-mounted device comprises a determination that the computer system is not associated with the same user account as a head-mounted device (e.g., as any head-mounted device). In some embodiments, the determination that the computer system is not associated with a head-mounted device comprises a determination that the computer system is associated with a first user account, and the first user account is not associated with a head-mounted device (e.g., is not associated with any head-mounted device) (e.g., no head-mounted device is logged into the first user account). Providing the spatial media capture mode option when the computer system is associated with a head-mounted device, and forgoing providing the spatial media capture mode option when the computer system is not associated with a head-mounted device, enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, while the computer system (e.g., 2100) is not associated with a head-mounted device (e.g., 101, 1-100, 1-200, 1-302, 1-406, 3-100, 6-100, 6-200, 6-300, 6-400, 11.1.2-100, and/or X700) separate from the computer system: the computer system receives (e.g., via one or more input devices of the computer system) one or more user inputs (e.g., 2128) (e.g., one or more touch inputs, one or more gesture inputs, one or more button presses, and/or one or more rotations of a rotatable input mechanism) corresponding to a user request to enable the spatial media capture mode option. In response to receiving the one or more user inputs corresponding to the user request to enable the spatial media capture mode option, the computer system enables the spatial media capture mode option (e.g., making the spatial media capture mode option available to the user within the first user interface and/or within the camera application) (e.g., transitioning the spatial media capture mode option from a disabled state to an enabled state) (e.g., FIG. 21C). The computer system displays, via the one or more display generation components, the first user interface (e.g., 2108) corresponding to the camera application of the computer system. While displaying the first user interface corresponding to the camera application of the computer system: in accordance with a determination that the spatial media capture mode option is enabled (e.g., FIG. 21C), the computer system provides (e.g., displaying (e.g., within the first user interface), providing access to, and/or otherwise making available for selection) the spatial media capture mode option (e.g., 2112*d*). In some embodiments, while displaying the first user interface (e.g., 2108) corresponding to the camera application of the computer system: in accordance with a determination that the spatial media capture mode option is not enabled (e.g., FIG. 21A), the computer system forgoes providing (e.g., forgoes displaying, forgoes providing access to, and/or otherwise makes unavailable for selection) the spatial media capture mode option (e.g., 2112*d*). Allowing a user to manually enable the spatial media capture mode option (e.g., even if the computer system is not associated with a head-mounted device) enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the camera application includes a plurality of media capture modes (e.g., 2112*a*-2112*f*), including the spatial media capture mode (e.g., 2112*d*) and a first media capture mode (e.g., 2112*a*, 2112*b*, 2112*c*, 2112*e*, and/or 2112*f*) different from the spatial media capture mode (e.g., a non-spatial still image capture mode, a non-spatial video capture mode, a non-spatial panoramic still image capture mode, a non-spatial time-lapse video capture mode, and/or a non-spatial slow motion video capture mode); and the first user interface (e.g., 2108) corresponds to the first media capture mode (e.g., 2112*c* and/or the non-spatial photo capture mode) (e.g., the first user interface is indicative of the computer system being in the first media capture mode; and/or the computer system is configured to capture media items corresponding to the first media capture mode while displaying the first user interface). While displaying the first user interface (e.g., 2108) that corresponds to the first media capture mode, and while the computer system is in the first media capture mode, the computer system receives (e.g., via one or more input devices of the computer system) one or more user inputs (e.g., 2130*a* and/or 2130*b*) (e.g., one or more touch inputs, one or more gesture inputs, one or more button presses, and/or one or more rotations of a rotatable input mechanism) corresponding to a user request to transition from the first media capture mode to the spatial media capture mode. In response to receiving the one or more user inputs corresponding to the user request to transition from the first media capture mode to the spatial media capture mode: the computer system transitions from the first media capture mode to the spatial media capture mode (e.g., FIG. 21C and FIG. 21E); and displays, via the one or more display generation components, a spatial media capture user interface (e.g., 2132) that is different from the first user interface (e.g., 2108) and corresponds to the spatial media capture mode (e.g., is indicative of the computer system being in the spatial media capture mode) (and, in some embodiments, ceasing display of the first user interface), wherein: the spatial media capture user interface (e.g., 2132) includes a camera level control (e.g., 2152) that is indicative of an orientation of the computer system (e.g., is indicative of the computer system's rotation relative to a target axis (e.g., a horizontal axis, a vertical axis, a landscape axis, and/or a portrait axis)); and the first user interface (e.g., 2108) does not include the camera level control. In some embodiments, the camera application includes a plurality of media capture modes, including the spatial media capture mode and a first media capture mode different from the spatial media capture mode (e.g., a non-spatial still image capture mode, a non-spatial video capture mode, a non-spatial panoramic still image capture mode, a non-spatial time-lapse video capture mode, and/or a non-spatial slow motion video capture mode); the first user interface (e.g., 2108) corresponds to the first media capture mode (e.g., the first user interface is indicative of the computer system being in the first media capture mode; and/or the computer system is configured to capture media items corresponding to the first media capture mode while displaying the first user interface); the spatial media capture mode corresponds to a spatial media capture user interface (e.g., 2132) different from the first user interface (e.g., when the computer system is in the spatial media capture mode, the computer system displays the spatial media capture user interface); the spatial media capture user interface (e.g., 2132) includes a camera level control (e.g., 2152) that is indicative of an orientation of the computer system (e.g., is indicative of the computer system's rotation relative to a target axis (e.g., a horizontal axis, a vertical axis, a landscape axis, and/or a portrait axis)); and the first user interface (e.g., 2108) does not include the camera level control. Providing a camera level control when the computer system is in the spatial media capture mode, and not providing the camera level control when the computer system is not in the spatial media capture mode, enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the camera application includes a plurality of media capture modes (e.g., 2112*a*-2112*f*), including the spatial media capture mode and a first media capture mode different from the spatial media capture mode (e.g., a non-spatial still image capture mode, a non-spatial video capture mode, a non-spatial panoramic still image capture mode, a non-spatial time-lapse video capture mode, and/or a non-spatial slow motion video capture mode); while the computer system is in the first media capture mode (e.g., FIG. 21C (e.g., a non-spatial photo capture mode) and/or FIG. 21D (e.g., a non-spatial video capture mode)) (and, in some embodiments, not in the spatial media capture mode), one or more camera options (e.g., 2116, 2118*a*, 2118*b*, 2118*c*, 2118*d*, 2123*a*, and/or 2123*b*) are available (e.g., a camera flip option for switching from a first set of cameras (e.g., a front facing camera and/or a rear facing camera) to a second set of cameras (e.g., a front facing camera and/or a rear facing camera)); a flash option (e.g., for selectively enabling and/or disabling a camera flash); a frame rate option (e.g., for changing a frame rate of the camera); and/or a zoom function (e.g., for changing a zoom level of the camera, image, and/or video)); and while the computer system is in the spatial media capture mode (e.g., FIG. 21E and/or FIG. 21G), the one or more camera options (e.g., 2116, 2118*a*, 2118*b*, 2118*c*, 2118*d*, 2123*a*, and/or 2123*b*) are not available (e.g., are not displayed or, if they are displayed, are not selectable by a user and/or are not modifiable by a user). In some embodiments, the first media capture mode corresponds to the first user interface (e.g., 2108 and/or 2109) (e.g., the first user interface is indicative of the computer system being in the first media capture mode); and the spatial media capture mode corresponds to a spatial media capture user interface (e.g., 2132) different from the first user interface. In some embodiments, the first user interface (e.g., 2108 and/or 2109) includes one or more affordances (e.g., 2116, 2118*a*, 2118*b*, 2118*c*, 2118*d*, 2123*a*, and/or 2123*b*) corresponding to the one or more camera options (e.g., one or more affordances that are selectable to selectively enable and/or disable the one or more camera options and/or selectable to modify the one or more camera options). In some embodiments, the spatial media capture user interface (e.g., 2132) does not include the one or more affordances (e.g., 2116, 2118*a*, 2118*b*, 2118*c*, 2118*d*, 2123*a*, and/or 2123*b*). Disabling one or more camera options when the computer system is in the spatial media capture mode enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the one or more camera options includes a camera flip option (e.g., 2116) for switching from a first set of cameras (e.g., one or more cameras) (e.g., a front facing camera and/or a rear facing camera) (e.g., 2106; and/or 2146*a*-2146*c*) of the one or more cameras to a second set of cameras (e.g., one or more cameras) (e.g., 2106; and/or 2146*a*-2146*c*) (e.g., a front facing camera and/or a rear facing camera) of the one or more cameras, wherein the second set of cameras is different from the first set of cameras. In some embodiments, the first media capture mode corresponds to the first user interface (e.g., 2108 and/or 2109) (e.g., the first user interface is indicative of the computer system being in the first media capture mode); and the spatial media capture mode corresponds to a spatial media capture user interface (e.g., 2132) different from the first user interface. In some embodiments, the first user interface (e.g., 2108 and/or 2109) includes a camera flip affordance (e.g., 2116) that is selectable to switch from a first set of cameras (e.g., one or more cameras) (e.g., 2106; and/or 2146*a*-2146*c*) (e.g., a front facing camera and/or a rear facing camera) of the one or more cameras to a second set of cameras (e.g., one or more cameras) (e.g., 2106; and/or 2146*a*-2146*c*) (e.g., a front facing camera and/or a rear facing camera) of the one or more cameras. In some embodiments, the spatial media capture user interface (e.g., 2132) does not include the camera flip affordance (e.g., 2116) (e.g., in some embodiments, a user is prohibited from and/or prevented from switching between different sets of cameras). Disabling one or more camera options when the computer system is in the spatial media capture mode enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the one or more camera options includes a flash option (e.g., 2118*a*) for selectively enabling and/or disabling a flash feature. In some embodiments, the first media capture mode corresponds to the first user interface (e.g., 2108 and/or 2109) (e.g., the first user interface is indicative of the computer system being in the first media capture mode); and the spatial media capture mode corresponds to a spatial media capture user interface (e.g., 2132) different from the first user interface. In some embodiments, the first user interface (e.g., 2108 and/or 2109) includes a flash affordance (e.g., 2118*a*) that is selectable to selectively enable and/or disable a flash feature. In some embodiments, when the flash feature is enabled, the computer system and/or one or more camera systems of the computer system emit light and/or a flash when capturing a media item (e.g., a photo and/or video (e.g., spatial and/or non-spatial)); and when the flash feature is disabled, the computer system and/or the one or more camera systems do not emit light and/or do not emit a flash when capturing a media item. In some embodiments, the spatial media capture user interface (e.g., 2132) does not include the flash affordance (e.g., 2118*a*) (e.g., in some embodiments, a user is prohibited from and/or prevented from enabling and/or disabling the flash feature). Disabling one or more camera options when the computer system is in the spatial media capture mode enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the one or more camera options includes a frame rate option (e.g., 2123*b*) for modifying a media capture frame rate. In some embodiments, the first media capture mode corresponds to the first user interface (e.g., 2109) (e.g., the first user interface is indicative of the computer system being in the first media capture mode); and the spatial media capture mode corresponds to a spatial media capture user interface (e.g., 2132) different from the first user interface. In some embodiments, the first user interface includes a frame rate affordance (e.g., 2123*b*) that is selectable to modify a media capture frame rate (e.g., switch between a plurality of frame rate options (e.g., 24 frames per second, 30 frames per second, 48 frames per second, 50 frames per second, 60 frames per second, and/or 120 frames per second)). In some embodiments, the spatial media capture user interface (e.g., 2132) does not include the frame rate affordance (e.g., in some embodiments, a user is prohibited from and/or prevented from modifying the media capture frame rate). Disabling one or more camera options when the computer system is in the spatial media capture mode enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the one or more camera options includes a zoom option (e.g., 2122, 2122*a*, 2122*b*, and/or 2122*c*) for modifying a media capture zoom level. In some embodiments, the first media capture mode corresponds to the first user interface (e.g., 2108 and/or 2109) (e.g., the first user interface is indicative of the computer system being in the first media capture mode); and the spatial media capture mode corresponds to a spatial media capture user interface (e.g., 2132) different from the first user interface. In some embodiments, the first user interface includes a zoom affordance (e.g., 2122, 2122*a*, 2122*b*, and/or 2122*c*) that is selectable to modify a media capture zoom level (e.g., in various embodiments, modifying a digital zoom level, modifying an optical zoom level, and/or switching between a plurality of different cameras that have different zoom levels). In some embodiments, the spatial media capture user interface (e.g., 2132) does not include the zoom affordance (e.g., in some embodiments, a user is prohibited from and/or prevented from modifying the media capture zoom level) (e.g., in some embodiments, user interface 2132 does not includes zoom level affordance(s) 2122, 2122*a*, 2122*b*, and/or 2122*c*). Disabling one or more camera options when the computer system is in the spatial media capture mode enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the computer system displays, via the one or more display generation components (e.g., 2102), a media library user interface (e.g., 2166 and/or 2178) that includes representations of a plurality of media items (e.g., 2170*a*-2170*l*) (e.g., a plurality of media items that are stored on the computer system; a plurality of media items that correspond to the computer system; and/or a plurality of media items that correspond to a user account associated with the computer system), including displaying, within the media library user interface, a representation of a first respective media item, wherein: in accordance with a determination that the first respective media item is spatial media (e.g., 2170*a*, 2170*e*, 2170*g*, and/or 2170*l*) (e.g., that includes a first visual component corresponding to a viewpoint of a right eye (e.g., a first still image component that corresponds to an image from a viewpoint of the right eye and/or a first video component that corresponds to a sequence of images from a viewpoint of the right eye) and a second visual component different from the first visual component and that corresponds to a viewpoint of a left eye (e.g., a second still image component that corresponds to an image from a viewpoint of the left eye and/or a second video component that corresponds to a sequence of images from a viewpoint of the left eye) that, when viewed concurrently, create an illusion of a spatial representation of captured visual content (e.g., concurrently viewing the first visual component and the second visual component creates an illusion of a three-dimensional representation of the media; e.g., viewing different images with the left and right eye creates the illusion of depth by simulating parallax of the image contents) (in some embodiments, the first visual component is captured by a first camera of the one or more cameras, and the second visual component is captured by a second camera of the one or more cameras different from the first camera; in some embodiments, the first visual component is captured by the first camera while the second visual component is concurrently captured by the second camera)), the representation of the first respective media item is displayed in a first manner (e.g., the representation of the first respective media item is displayed with a first set of visual characteristics and/or displayed at a first display location); and in accordance with a determination that the first respective media item is not spatial media (e.g., 2170*b*, 2170*c*, 2170*d*, 2170*f*, 2170*h*, 2170*i*, 2170*j*, and/or 2170*k*) (e.g., is non-spatial media; is a media item that does not include a first visual component corresponding to a viewpoint of a right eye and a second visual component corresponding to a viewpoint of a left eye; is a media item that does not include a first visual component that is to be displayed to the right eye of a user while a second visual component different from the first visual component is concurrently displayed to the left eye of the user; and/or is a media item that was captured by a single camera), the representation of the first respective media item is displayed in a second manner different from the first manner (e.g., the representation of the first respective media item is displayed with a second set of visual characteristics and/or displayed at a second display location). In some embodiments, displaying the media library user interface (e.g., 2166) comprises concurrently displaying representations of one or more spatial media items displayed in the first manner and representations of one or more non-spatial media items displayed in the second manner. Visually distinguishing spatial media items and non-spatial media items within a media library enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, displaying the representation of the first respective media item in the first manner includes displaying the representation of the first respective media item with a first visual badge (e.g., 2174*a*, 2174*b*, 2174*g* and/or 2174*l*) (e.g., an icon, graphic, and/or visual indicator) indicative of the first respective media item being spatial media; and displaying the representation of the first respective media item in the second manner includes displaying the representation of the first respective media item without the first visual badge (e.g., representations 2170*b*, 2170*c*, 2170*d*, 2170*f*, 2170*h*, 2170*i*, 2170*j*, and 2170*k* displayed without badges in FIG. 21N). Visually distinguishing spatial media items and non-spatial media items within a media library enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, displaying the representation of the first respective media item in the first manner includes displaying the representation of the first respective media item within a first media collection (e.g., a first storage location and/or a first folder) (e.g., 2180*i*) indicative of the first respective media item being spatial media, where the first media collection does not include non-spatial media items; and displaying the representation of the first respective media item in the second manner includes displaying the representation of the first respective media item in a second media collection (e.g., 2180*a*-2180*h*) (e.g., a second storage location and/or a second folder) different from the first media collection that includes non-spatial media items that are not included in the first media-collection (e.g., a second storage location indicative of the first respective media item not being spatial media and/or a second media storage location that includes both spatial media items and non-spatial media items). In some embodiments, the second media collection includes one or more non-spatial media items and does not include spatial media items. In some embodiments, the second media collection includes one or more non-spatial media items and one or more spatial media items. Visually distinguishing spatial media items and non-spatial media items within a media library enhances the operability of the system and makes the user-system interface more efficient (e.g., by preventing erroneous inputs. and helping the user to provide proper inputs and reducing errors) which, additionally, reduces power usage and improves battery life of the device by enabling the user to use the systcm more quickly and efficiently.

In some embodiments, aspects/operations of methods 800, 1000, 1200, 1400, 1600, 1800, 2000, 2200, and/or 2300 may be interchanged, substituted, and/or added between these methods. For example, the spatial media being viewed in method 2000 may be media captured using the user interfaces and indicators described with respect to methods 800, 1000, 1200, 1400, 1800, 2200, and/or 2300, and the video playback interfaces and techniques described with respect to method 1600 may be applied while viewing spatial media according to method 2000. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with a display generation component and one or more cameras, the computer system comprising:

one or more processors; and memory storing one or more programs configured to be executed by the one or more processors, the one or more programs including instructions for:

while capturing spatial video media of an environment using the one or more cameras, wherein the spatial video media includes a first video component corresponding to a viewpoint of a right eye and a second video component, different from the first video component, corresponding to a viewpoint of a left eye that when viewed concurrently create an illusion of a spatial representation of the environment, displaying, via the display generation component, a virtual indicator element of an anchor location in the environment that represents a respective viewpoint corresponding to the spatial video media, wherein the virtual indicator element is displayed while the environment is visible via the display generation component, wherein the respective viewpoint corresponds to an initial viewpoint from which capture of the spatial video media is initiated;

while displaying the virtual indicator element while the environment is visible via the display generation component, detecting a first change in a viewpoint from which the spatial video media is being captured; and in response to detecting the first change in the viewpoint from which the spatial video media is being captured, changing an appearance of the virtual indicator element to indicate the respective viewpoint corresponding to the spatial video media, wherein changing the appearance of the virtual indicator element includes:

in accordance with a determination that a viewpoint of the computer system has moved away from the respective viewpoint by a first amount, displaying the virtual indicator element at a first distance from a center of a current viewpoint of the computer system; and in accordance with a determination that the viewpoint of the computer system has moved away the respective viewpoint by a second amount, different from the first amount, displaying the virtual indicator element at a second distance from a center of the current viewpoint of the computer system, different from the first distance.

2. The computer system of claim 1, wherein changing the appearance of the virtual indicator element to indicate the respective viewpoint corresponding to the spatial video media includes changing the appearance of the virtual indicator element relative to the environment visible via the display generation component.

3. The computer system of claim 1, wherein:

displaying the virtual indicator element includes displaying the virtual indicator element at a virtual location in the environment; and the virtual indicator element is not included in the spatial video media.

4. The computer system of claim 1, wherein changing the appearance of the virtual indicator element includes moving the virtual indicator element to a respective location within an anchor region of the environment, wherein the anchor region is an environment-locked region that includes the anchor location.

5. The computer system of claim 4, wherein moving the virtual indicator element to the respective location within the anchor region of the environment includes moving the virtual indicator element according to one or more simulated physical properties.

6. The computer system of claim 4, wherein:

the first change in the viewpoint from which the spatial video media is being captured includes a viewpoint movement of a first distance in a first direction; and moving the virtual indicator element to the respective location within the anchor region of the environment includes moving the virtual indicator element a second distance in the first direction, wherein the second distance is shorter than the first distance.

7. The computer system of claim 1, wherein the virtual indicator element is environment-locked.

8. The computer system of claim 1, wherein the one or more programs include instructions for:

while displaying the virtual indicator element while the environment is visible, via the display generation component, detecting a second change in the viewpoint from which the spatial video media is being captured; and in response to detecting the second change in the viewpoint from which the spatial video media is being captured and in accordance with a determination that the viewpoint from which the spatial video media is being captured satisfies a first set of one or more alignment criteria, displaying, via the display generation component, a virtual alignment element while the environment is visible via the display generation component, wherein the virtual alignment element indicates a current location in the environment that represents the viewpoint from which the spatial video media is being captured;

while displaying the virtual alignment element while the environment is visible via the display generation component, detecting a third change in the viewpoint from which the spatial video media is being captured; and in response to detecting the third change in the viewpoint from which the spatial video media is being captured, moving the virtual alignment element to indicate the viewpoint, wherein moving the virtual alignment element is based on the third change in the viewpoint from which the spatial video media is being captured.

9. The computer system of claim 8, wherein the first set of one or more alignment criteria includes a first criterion that is satisfied when the current location in the environment that represents the viewpoint from which the spatial video media is being captured is at least a first threshold distance from the anchor location.

10. The computer system of claim 9, wherein the one or more programs include instructions for:

while displaying the virtual alignment element while the environment is visible via the display generation component, detecting a fourth change in the viewpoint from which the spatial video media is being captured; and in response to detecting the fourth change in the viewpoint from which the spatial video media is being captured:

in accordance with a determination that the viewpoint from which the spatial video media is being captured satisfies a second set of alignment criteria, ceasing displaying the virtual alignment element, wherein the second set of alignment criteria includes a second criterion that is satisfied when the current location in the environment that represents the viewpoint from which the spatial video media is being captured is less than a second threshold distance from the anchor location, wherein the second threshold distance is smaller than the first threshold distance.

11. The computer system of claim 8, wherein:

the third change in the viewpoint from which the spatial video media is being captured includes a viewpoint movement of a first distance; and moving the virtual alignment element based on the third change in the viewpoint from which the spatial video media is being captured includes:

in accordance with a determination that the third change in the viewpoint from which the spatial video media is being captured satisfies a second set of one or more alignment criteria, moving the virtual alignment element a second distance, wherein the second distance is shorter than the first distance.

12. The computer system of claim 11, wherein moving the virtual alignment element based on the third change in the viewpoint from which the spatial video media is being captured includes moving the virtual alignment element according to one or more simulated physical properties.

13. The computer system of claim 12, wherein the one or more programs include instructions for:

after moving the virtual alignment element according to the one or more simulated physical properties, displaying the virtual alignment element at a first location, wherein the first location is closer to the anchor location than the current location in the environment that represents the viewpoint from which the spatial video media is being captured.

14. The computer system of claim 8, wherein displaying the virtual indicator element includes displaying the virtual indicator element in a first color and displaying the virtual alignment element includes displaying the virtual alignment element in a second color different from the first color.

15. The computer system of claim 8, wherein moving the virtual alignment element based on the third change in the viewpoint from which the spatial video media is being captured includes:

while displaying the virtual indicator element at an indicator location in the environment:

in accordance with a determination that the viewpoint from which the spatial video media is being captured satisfies a second set of alignment criteria, wherein the second set of alignment criteria includes a criterion that is satisfied when the current location in the environment that represents the viewpoint from which the spatial video media is being captured is less than a threshold distance from the anchor location, moving the virtual alignment element to the indicator location.

16. The computer system of claim 8, wherein the one or more programs include instructions for:

while displaying the virtual indicator element while the environment is visible via the display generation component, detecting a fourth change in the viewpoint from which the spatial video media is being captured; and in response to detecting the fourth change in the viewpoint from which the spatial video media is being captured and in accordance with a determination that the viewpoint from which the spatial video media is being captured satisfies a second set of alignment criteria, displaying a virtual boundary element visually representing a predetermined threshold distance from the anchor location while the environment is visible via the display generation component, wherein the second set of alignment criteria includes a criterion that is satisfied when the current location in the environment that represents the viewpoint from which the spatial video media is being captured is at least a fourth threshold distance from the anchor location.

17. The computer system of claim 16, wherein the one or more programs include instructions for:

while displaying the virtual boundary element visually representing the predetermined threshold distance from the anchor location while the environment is visible via the display generation component, detecting a fifth change in the viewpoint from which the spatial video media is being captured; and in response to detecting the fourth change:

moving the virtual indicator element along a first path; and moving the virtual boundary element along the first path.

18. The computer system of claim 16, wherein the one or more programs include instructions for:

while displaying the virtual alignment element and the virtual boundary element, detecting a fifth change in the viewpoint from which the spatial video media is being captured; and in response to detecting the fifth change:

in accordance with a determination that the viewpoint satisfies a set of one or more increase criteria, wherein the set of one or more reduction criteria includes a criterion that is satisfied when a distance between the current location in the environment that represents the viewpoint from which the spatial video media is being captured and the anchor location increases as a result of the fifth change in the viewpoint:

increasing an opacity of the virtual alignment element at a first rate; and increasing an opacity of the virtual boundary element by at a second rate.

19. The computer system of claim 18, wherein the first rate is different from the second rate.

20. The computer system of claim 16, wherein the one or more programs include instructions for:

while displaying the virtual boundary element visually representing the predetermined threshold distance from the anchor location while the environment is visible via the display generation component, detecting an fifth change in the viewpoint from which the spatial video media is being captured; and in response to the fifth change in the viewpoint from which the spatial video media is being captured and in accordance with a determination that a distance between the current location in the environment that represents the viewpoint from which the spatial video media is being captured and the anchor location increases to within a boundary distance range as a result of the fifth change in the viewpoint, increasing a size of the virtual boundary element from a first size to a second size, wherein the boundary distance range includes the predetermined threshold distance.

21. The computer system of claim 20, wherein the one or more programs include instructions for:

while displaying the virtual boundary element at the second size, detecting a sixth change in the viewpoint from which the spatial video media is being captured; and in response to the sixth change in the viewpoint from which the spatial video media is being captured and in accordance with a determination that a distance between the current location in the environment that represents the viewpoint from which the spatial video media is being captured and the anchor location decreases to below the boundary distance range as a result of the sixth change in the viewpoint, decreasing the size of the virtual boundary element from the second size to the first size.

22. The computer system of claim 20, wherein the one or more programs include instructions for:

while displaying the virtual boundary element visually representing the predetermined threshold distance from the anchor location while the environment is visible via the display generation component, detecting a sixth change in the viewpoint from which the spatial video media is being captured; and in response to the sixth change in the viewpoint from which the spatial video media is being captured and in accordance with a determination that a distance between the current location in the environment that represents the viewpoint from which the spatial video media is being captured and the anchor location exceeds the predetermined threshold distance as a result of the sixth change in the viewpoint, decreasing the size of the virtual boundary element.

23. The computer system of claim 16, wherein the one or more programs include instructions for:

while displaying the virtual boundary element visually representing the predetermined threshold distance from the anchor location while the environment is visible via the display generation component, detecting a fifth change in the viewpoint from which the spatial video media is being captured; and in response to the fifth change in the viewpoint from which the spatial video media is being captured and in accordance with a determination that a distance between the current location in the environment that represents the viewpoint from which the spatial video media is being captured and the anchor location exceeds the predetermined threshold distance as a result of the fifth change in the viewpoint, ceasing displaying the virtual boundary element.

24. The computer system of claim 8, wherein:

prior to detecting the third change in the viewpoint from which the spatial video media is being captured, the virtual alignment element is displayed at a first display location relative to the viewpoint from which the spatial video media is being captured; and moving the virtual alignment element based on the third change in the viewpoint from which the spatial video media is being captured includes:

in accordance with a determination that the third change in the viewpoint meets a set of one or more movement criteria, displaying the virtual alignment element at a second display location that, relative to the viewpoint from which the spatial video media is being captured, is different than the first display location, wherein the set of one or more movement criteria include a criterion that is met when the third change in the viewpoint from which the spatial video media includes a movement in at least one direction of a plurality of directions; and in accordance with a determination that the third change in the viewpoint does not meet the set of one or more movement criteria, maintaining display of the virtual alignment element at the first display location relative to the viewpoint from which the spatial video media is being captured.

25. The computer system of claim 1, wherein displaying the virtual indicator element includes positioning the virtual indicator element within a virtual plane in the environment, wherein the virtual plane in the environment is spaced at least a threshold depth away from a user.

26. The computer system of claim 25, wherein the one or more programs include instructions for:

detecting a gaze of the user; and positioning the virtual plane based on the gaze of the user.

27. The computer system of claim 26, wherein positioning the virtual plane based on the gaze of the user includes determining a convergence location of the gaze of the user, wherein the virtual plane includes the convergence location.

28. The computer system of claim 1, wherein changing the appearance of the virtual indicator element to indicate the respective viewpoint corresponding to the spatial video media includes:

in accordance with a determination that a distance between a current location in the environment that represents the viewpoint from which the spatial video media is being captured and the anchor location exceeds a predetermined threshold distance, ceasing displaying the virtual indicator element.

29. The computer system of claim 28, wherein changing the appearance of the virtual indicator element to indicate the respective viewpoint corresponding to the spatial video media includes:

in accordance with a determination that a distance between the current location in the environment that represents the viewpoint from which the spatial video media is being captured and the anchor location increases to at least a threshold distance, decreasing an opacity of the virtual indicator element, wherein the threshold distance is less than a predetermined threshold distance.

30. The computer system of claim 28, wherein the one or more programs include instructions for:

after ceasing displaying the virtual indicator element and in accordance with a determination that the viewpoint from which the spatial video media is being captured meets a set of one or more stability criteria, wherein the set of one or more stability criteria includes a criterion that is met when movement of the viewpoint from which the spatial video media is being captured remains below a movement threshold for at least a threshold duration of time:

displaying, via the display generation component, a second virtual indicator element of a second anchor location in the environment that represents a second respective viewpoint corresponding to the spatial video media, wherein the second virtual indicator element is displayed while the environment is visible via the display generation component.

31. The computer system of claim 30, wherein the one or more programs include instructions for:

after ceasing displaying the virtual indicator element and in accordance with a determination that the viewpoint from which the spatial video media is being captured does not meet the set of one or more stability criteria, foregoing displaying the second virtual indicator element.

32. The computer system of claim 28, wherein the one or more programs include instructions for:

while displaying the virtual indicator element while the environment is visible via the display generation component, displaying, via the display generation component, a second virtual alignment element while the environment is visible via the display generation component; and after ceasing displaying the virtual indicator element, continuing displaying the second virtual alignment element.

33. The computer system of claim 1, wherein changing the appearance of the virtual indicator element to indicate the respective viewpoint corresponding to the spatial video media includes:

in accordance with a determination that a distance between a current location in the environment that represents the viewpoint from which the spatial video media is being captured and the anchor location falls below a maintenance threshold distance, ceasing displaying the virtual indicator element.

34. The computer system of claim 33, wherein changing the appearance of the virtual indicator element to indicate the respective viewpoint corresponding to the spatial video media includes:

in accordance with a determination that a distance between the current location in the environment that represents the viewpoint from which the spatial video media is being captured and the anchor location decreases to below a threshold distance, decreasing an opacity of the virtual indicator element, wherein the threshold distance is more than the maintenance threshold distance.

35. The computer system of claim 1, wherein the one or more programs include instructions for:

while capturing the spatial video media of the environment and in accordance with a determination that the viewpoint from which the spatial video media is being captured satisfies a set of alignment criteria, displaying a graphical alignment indication.

36. The computer system of claim 1, wherein the one or more programs include instructions for:

after capturing the spatial video media of the environment, displaying a playable representation of the spatial video media.

37. The computer system of claim 36, wherein the one or more programs include instructions for:

while displaying the playable representation of the spatial video media:

in accordance with a determination that a respective playback mode is available for playing the playable representation of the spatial video media, displaying an indication of the respective playback mode with a first appearance; and in accordance with a determination that a respective playback mode is not available for playing the playable representation of the spatial video media, foregoing displaying the indication of the respective playback mode with the first appearance.

38. A non-transitory computer-readable storage medium storing one or more programs configured to be executed by one or more processors of a computer system that is in communication with a display generation component and one or more cameras, the one or more programs including instructions for:

while capturing spatial video media of an environment using the one or more cameras, wherein the spatial video media includes a first video component corresponding to a viewpoint of a right eye and a second video component, different from the first video component, corresponding to a viewpoint of a left eye that when viewed concurrently create an illusion of a spatial representation of the environment, displaying, via the display generation component, a virtual indicator element of an anchor location in the environment that represents a respective viewpoint corresponding to the spatial video media, wherein the virtual indicator element is displayed while the environment is visible via the display generation component, wherein the respective viewpoint corresponds to an initial viewpoint from which capture of the spatial video media is initiated;

while displaying the virtual indicator element while the environment is visible via the display generation component, detecting a first change in a viewpoint from which the spatial video media is being captured; and in response to detecting the first change in the viewpoint from which the spatial video media is being captured, changing an appearance of the virtual indicator element to indicate the respective viewpoint corresponding to the spatial video media, wherein changing the appearance of the virtual indicator element includes:

in accordance with a determination that a viewpoint of the computer system has moved away from the respective viewpoint by a first amount, displaying the virtual indicator element at a first distance from a center of a current viewpoint of the computer system; and in accordance with a determination that the viewpoint of the computer system has moved away the respective viewpoint by a second amount, different from the first amount, displaying the virtual indicator element at a second distance from a center of the current viewpoint of the computer system, different from the first distance.

39. A method, comprising:

at a computer system that is in communication with a display generation component and one or more cameras:

while capturing spatial video media of an environment using the one or more cameras, wherein the spatial video media includes a first video component corresponding to a viewpoint of a right eye and a second video component, different from the first video component, corresponding to a viewpoint of a left eye that when viewed concurrently create an illusion of a spatial representation of the environment, displaying, via the display generation component, a virtual indicator element of an anchor location in the environment that represents a respective viewpoint corresponding to the spatial video media, wherein the virtual indicator element is displayed while the environment is visible via the display generation component, wherein the respective viewpoint corresponds to an initial viewpoint from which capture of the spatial video media is initiated;

while displaying the virtual indicator element while the environment is visible via the display generation component, detecting a first change in a viewpoint from which the spatial video media is being captured; and in response to detecting the first change in the viewpoint from which the spatial video media is being captured, changing an appearance of the virtual indicator element to indicate the respective viewpoint corresponding to the spatial video media, wherein changing the appearance of the virtual indicator element includes:

in accordance with a determination that a viewpoint of the computer system has moved away from the respective viewpoint by a first amount, displaying the virtual indicator element at a first distance from a center of a current viewpoint of the computer system; and in accordance with a determination that the viewpoint of the computer system has moved away the respective viewpoint by a second amount, different from the first amount, displaying the virtual indicator element at a second distance from a center of the current viewpoint of the computer system, different from the first distance.

40. The non-transitory computer-readable storage medium of claim 38, wherein:

displaying the virtual indicator element includes displaying the virtual indicator element at a virtual location in the environment; and the virtual indicator element is not included in the spatial video media.

41. The non-transitory computer-readable storage medium of claim 38, wherein changing the appearance of the virtual indicator element includes moving the virtual indicator element to a respective location within an anchor region of the environment, wherein the anchor region is an environment-locked region that includes the anchor location.

42. The non-transitory computer-readable storage medium of claim 41, wherein moving the virtual indicator element to the respective location within the anchor region of the environment includes moving the virtual indicator element according to one or more simulated physical properties.

43. The computer system of claim 41, wherein:

the first change in the viewpoint from which the spatial video media is being captured includes a viewpoint movement of a first distance in a first direction; and moving the virtual indicator element to the respective location within the anchor region of the environment includes moving the virtual indicator element a second distance in the first direction, wherein the second distance is shorter than the first distance.

44. The non-transitory computer-readable storage medium of claim 38, wherein the virtual indicator element is environment-locked.

45. The non-transitory computer-readable storage medium of claim 38, wherein the one or more programs include instructions for:

while displaying the virtual indicator element while the environment is visible, via the display generation component, detecting a second change in the viewpoint from which the spatial video media is being captured; and in response to detecting the second change in the viewpoint from which the spatial video media is being captured and in accordance with a determination that the viewpoint from which the spatial video media is being captured satisfies a first set of one or more alignment criteria, displaying, via the display generation component, a virtual alignment element while the environment is visible via the display generation component, wherein the virtual alignment element indicates a current location in the environment that represents the viewpoint from which the spatial video media is being captured;

while displaying the virtual alignment element while the environment is visible via the display generation component, detecting a third change in the viewpoint from which the spatial video media is being captured; and in response to detecting the third change in the viewpoint from which the spatial video media is being captured, moving the virtual alignment element to indicate the viewpoint, wherein moving the virtual alignment element is based on the third change in the viewpoint from which the spatial video media is being captured.

46. The non-transitory computer-readable storage medium of claim 45, wherein the first set of one or more alignment criteria includes a first criterion that is satisfied when the current location in the environment that represents the viewpoint from which the spatial video media is being captured is at least a first threshold distance from the anchor location.

47. The non-transitory computer-readable storage medium of claim 46, wherein the one or more programs include instructions for:

while displaying the virtual alignment element while the environment is visible via the display generation component, detecting a fourth change in the viewpoint from which the spatial video media is being captured; and in response to detecting the fourth change in the viewpoint from which the spatial video media is being captured:

in accordance with a determination that the viewpoint from which the spatial video media is being captured satisfies a second set of alignment criteria, ceasing displaying the virtual alignment element, wherein the second set of alignment criteria includes a second criterion that is satisfied when the current location in the environment that represents the viewpoint from which the spatial video media is being captured is less than a second threshold distance from the anchor location, wherein the second threshold distance is smaller than the first threshold distance.

48. The non-transitory computer-readable storage medium of claim 38, wherein changing the appearance of the virtual indicator element to indicate the respective viewpoint corresponding to the spatial video media includes:

in accordance with a determination that a distance between a current location in the environment that represents the viewpoint from which the spatial video media is being captured and the anchor location exceeds a predetermined threshold distance, ceasing displaying the virtual indicator element.

49. The non-transitory computer-readable storage medium of claim 38, wherein changing the appearance of the virtual indicator element to indicate the respective viewpoint corresponding to the spatial video media includes:

in accordance with a determination that a distance between a current location in the environment that represents the viewpoint from which the spatial video media is being captured and the anchor location falls below a maintenance threshold distance, ceasing displaying the virtual indicator element.

50. The method of claim 39, wherein:

displaying the virtual indicator element includes displaying the virtual indicator element at a virtual location in the environment; and the virtual indicator element is not included in the spatial video media.

51. The method of claim 39, wherein changing the appearance of the virtual indicator element includes moving the virtual indicator element to a respective location within an anchor region of the environment, wherein the anchor region is an environment-locked region that includes the anchor location.

52. The method of claim 51, wherein moving the virtual indicator element to the respective location within the anchor region of the environment includes moving the virtual indicator element according to one or more simulated physical properties.

53. The method of claim 51, wherein:

the first change in the viewpoint from which the spatial video media is being captured includes a viewpoint movement of a first distance in a first direction; and moving the virtual indicator element to the respective location within the anchor region of the environment includes moving the virtual indicator element a second distance in the first direction, wherein the second distance is shorter than the first distance.

54. The method of claim 39, wherein the virtual indicator element is environment- locked.

55. The method of claim 39, further comprising:

while displaying the virtual indicator element while the environment is visible, via the display generation component, detecting a second change in the viewpoint from which the spatial video media is being captured; and in response to detecting the second change in the viewpoint from which the spatial video media is being captured and in accordance with a determination that the viewpoint from which the spatial video media is being captured satisfies a first set of one or more alignment criteria, displaying, via the display generation component, a virtual alignment element while the environment is visible via the display generation component, wherein the virtual alignment element indicates a current location in the environment that represents the viewpoint from which the spatial video media is being captured;

while displaying the virtual alignment element while the environment is visible via the display generation component, detecting a third change in the viewpoint from which the spatial video media is being captured; and in response to detecting the third change in the viewpoint from which the spatial video media is being captured, moving the virtual alignment element to indicate the viewpoint, wherein moving the virtual alignment element is based on the third change in the viewpoint from which the spatial video media is being captured.

56. The method of claim 55, wherein the first set of one or more alignment criteria includes a first criterion that is satisfied when the current location in the environment that represents the viewpoint from which the spatial video media is being captured is at least a first threshold distance from the anchor location.

57. The method of claim 56, further comprising:

while displaying the virtual alignment element while the environment is visible via the display generation component, detecting a fourth change in the viewpoint from which the spatial video media is being captured; and in response to detecting the fourth change in the viewpoint from which the spatial video media is being captured:

in accordance with a determination that the viewpoint from which the spatial video media is being captured satisfies a second set of alignment criteria, ceasing displaying the virtual alignment element, wherein the second set of alignment criteria includes a second criterion that is satisfied when the current location in the environment that represents the viewpoint from which the spatial video media is being captured is less than a second threshold distance from the anchor location, wherein the second threshold distance is smaller than the first threshold distance.

58. The method of claim 39, wherein changing the appearance of the virtual indicator element to indicate the respective viewpoint corresponding to the spatial video media includes:

in accordance with a determination that a distance between a current location in the environment that represents the viewpoint from which the spatial video media is being captured and the anchor location exceeds a predetermined threshold distance, ceasing displaying the virtual indicator element.

59. The method of claim 39, wherein changing the appearance of the virtual indicator element to indicate the respective viewpoint corresponding to the spatial video media includes:

in accordance with a determination that a distance between a current location in the environment that represents the viewpoint from which the spatial video media is being captured and the anchor location falls below a maintenance threshold distance, ceasing displaying the virtual indicator element.

* * * * *